US009989742B2

(12) United States Patent
Shibayama

(10) Patent No.: US 9,989,742 B2
(45) Date of Patent: Jun. 5, 2018

(54) OPTICAL SYSTEM, IMAGING DEVICE, AND METHOD FOR MANUFACTURING THE OPTICAL SYSTEM

(71) Applicant: Nikon Corporation, Minato-ku, Tokyo (JP)

(72) Inventor: Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 132 days.

(21) Appl. No.: 15/212,230

(22) Filed: Jul. 16, 2016

(65) Prior Publication Data

US 2017/0038566 A1 Feb. 9, 2017

Related U.S. Application Data

(63) Continuation of application No. PCT/JP2015/000235, filed on Jan. 20, 2015.

(30) Foreign Application Priority Data

Jan. 20, 2014 (JP) ................................ 2014-007358
Jan. 20, 2014 (JP) ................................ 2014-007973
(Continued)

(51) Int. Cl.
*G02B 15/14* (2006.01)
*G02B 15/177* (2006.01)
(Continued)

(52) U.S. Cl.
CPC ............. *G02B 15/14* (2013.01); *G02B 5/005* (2013.01); *G02B 13/009* (2013.01); *G02B 13/18* (2013.01);
(Continued)

(58) Field of Classification Search
CPC ...... G02B 15/15; G02B 15/155; G02B 15/16; G02B 15/161; G02B 15/177; G02B 15/20;
(Continued)

(56) References Cited

U.S. PATENT DOCUMENTS 4,346,966 A 8/1982 Nakamura et al.
5,257,137 A * 10/1993 Suzuki .................. G02B 13/00 359/684
(Continued)

FOREIGN PATENT DOCUMENTS

JP 07-159687 A 6/1995
JP 07-159689 A 6/1995
(Continued)

OTHER PUBLICATIONS

Partial Supplementary European search report for European Patent Application No. 15737254.1, dated Aug. 24, 2017.
(Continued)

*Primary Examiner* — Darryl J Collins
(74) *Attorney, Agent, or Firm* — Shapiro, Gabor and Rosenberger, PLLC

(57) ABSTRACT

In an optical system (ZL) capable of imaging in a plurality of object side media (for instance, air and water) whose refractive indexes are different from each other, the optical system is composed of, in order from an object, a front lens group (G1) whose position in an optical axis fixed, and a rear lens group (for instance, G2 to G4), and the rear lens group comprises at least two moving lens groups (for instance, G2 and G3), and at least two moving lens groups in the rear lens group are moved along the optical axis upon changing between object side media.

52 Claims, 209 Drawing Sheets

(30) Foreign Application Priority Data

| | | |
|---|---|---|
| Oct. 1, 2014 | (JP) | 2014-202995 |
| Jan. 16, 2015 | (JP) | 2015-007272 |

(51) Int. Cl.

| | |
|---|---|
| ***G02B 15/20*** | (2006.01) |
| ***G02B 13/00*** | (2006.01) |
| ***G02B 13/18*** | (2006.01) |
| ***G03B 17/08*** | (2006.01) |
| ***G02B 15/17*** | (2006.01) |
| ***G03B 3/00*** | (2006.01) |
| ***G03B 17/12*** | (2006.01) |
| ***G02B 5/00*** | (2006.01) |
| ***G02B 15/173*** | (2006.01) |
| ***G02B 27/00*** | (2006.01) |
| ***H04N 5/225*** | (2006.01) |
| ***H04N 5/232*** | (2006.01) |

(52) U.S. Cl.
CPC ........... *G02B 15/17* (2013.01); *G02B 15/173* (2013.01); *G02B 15/177* (2013.01); *G02B 15/20* (2013.01); *G02B 27/0025* (2013.01); *G03B 3/00* (2013.01); *G03B 17/08* (2013.01); *G03B 17/12* (2013.01); *H04N 5/2254* (2013.01); *H04N 5/23212* (2013.01)

(58) Field of Classification Search
CPC ........ G02B 15/22; G02B 15/24; G02B 15/26; G02B 15/28; G02B 13/009; G03B 17/08
USPC .................................................. 359/676–693
See application file for complete search history.

(56) References Cited

U.S. PATENT DOCUMENTS

| | | | | |
|---|---|---|---|---|
| 5,490,012 | A * | 2/1996 | Ohshita | G02B 15/177 359/684 |
| 5,519,540 | A * | 5/1996 | Suzuki | G02B 15/16 359/684 |
| 5,644,434 | A | 7/1997 | Hagimori | |
| 2008/0231696 | A1 | 9/2008 | Kodama et al. | |
| 2011/0102908 | A1 | 5/2011 | Murayama | |
| 2016/0299338 | A1* | 10/2016 | Aoki | G02B 27/0068 |

FOREIGN PATENT DOCUMENTS

| | | | |
|---|---|---|---|
| JP | 07-311339 | A | 11/1995 |
| JP | 63-318511 | A | 12/1998 |

OTHER PUBLICATIONS

English translation of International Search Report from International Patent Application No. PCT/JP2015/000235, dated Apr. 7, 2015.
English translation of Written Opinion of the International Searching Authority from International Patent Application No. PCT/JP2015/000235, dated Apr. 7, 2015.
Extended European Search Report issued Dec. 1, 2017, in European Patent Application No. 15737254.1.
Office Action issued Nov. 6, 2017, in Chinese Patent Application No. 201580005222.5.

* cited by examiner

OPTICAL SYSTEM, IMAGING DEVICE, AND METHOD FOR MANUFACTURING THE OPTICAL SYSTEM

TECHNICAL FIELD

The present invention relates to an optical system, an imaging device, and a method for manufacturing the optical system.

TECHNICAL BACKGROUND

Conventionally, an optical system which is available to a plurality of media (for example, air and water) having mutually different refractive indexes is provided (for instance, refer to Patent Document 1).

Moreover, conventionally an anphibious zoom lens is proposed (for instance, refer to Patent Documents 2 and 3).

PRIOR ART LIST

Patent Document

[Patent Document 1] Japanese Laid-Open Patent Publication No. H7-311339 (A)
[Patent Document 2] Japanese Laid-Open Patent Publication No. H7-159687 (A)
[Patent Document 3] Japanese Laid-Open Patent Publication No. H7-159689 (A)

SUMMARY OF THE INVENTION

Problems to be Solved by the Invention

However, in the conventional optical system an aberration correction regarding each medium would not be sufficient.

Moreover, in the conventional amphibious zoom lens, zooming is not possible and an attachment lens system is needed in an underwater imaging state, thus it was not convenient upon using.

Moreover, in both a land imaging state and the underwater imaging state, there was no zoom lens having good optical performance covering a whole imaging range from a short distance to a long distance.

Means to Solve the Problem

An optical system according to a first present invention is an optical system capable of imaging in a plurality of object side media whose refractive indexes are different from each other, the system being composed of, in order from an object, a front lens group whose position in an optical axis direction is fixed, and a rear lens group, the rear lens group comprising at least two moving lens groups, the at least two moving lens groups in the rear lens group being moved along the optical axis when the object side media is changed.

An optical apparatus according to the first present invention comprises the optical system according to the first invention.

A method for manufacturing an optical system according to the first present invention is a method for manufacturing an optical system capable of imaging in a plurality of object side media whose refractive indexes are different from each other, the optical system comprising, in order from an object, a front lens group whose position is fixed in an optical direction, and a rear lens group, the rear lens group comprising at least two moving lens groups, and each lens is disposed in an lens-barrel so that the at least two moving lens groups in the rear lens group are moved along the optical axis when the object side media is changed.

An optical system according to a second present invention is an optical system which is capable of switching between a first imaging state in a first medium having a first refractive index and a second imaging state in a second medium having a second refractive index which is different from the first refractive index, the optical system comprising a first lens group, and a second lens group disposed closer to an image than the first lens group, upon zooming in the first medium and zooming in the second medium, a distance between the first lens group and the second lens group is changed while a focal length of the optical system is not changed, upon switching from the first imaging state to the second imaging state, the distance between the first lens group and the second lens group is changed.

In the optical system according to the second present invention, it is preferable that a position of a lens group disposed closest to the object is fixed in an optical axis direction when zooming.

It is preferable that the optical system according to the second present invention comprises, in order from an object, a first lens group having positive refractive power, a second lens group having negative refractive power, a third lens group having positive refractive power, and a fourth lens group having positive refractive power.

In the optical system according to the second present invention, it is preferable that the second lens group and the third lens group are moved along an optical axis when switching from the first imaging state to the second imaging state.

In the optical system according to the second present invention, it is preferable that the following conditional expression is satisfied.

$$1.00<R1/Enpw<4.00$$

where, R1 denotes a radius of curvature of a lens surface closest to the object of the first lens group, and Enpw denotes a distance on the optical axis from a lens surface closest to the object in the first lens group to a paraxial incident pupil position in an infinity imaging state in a wide-angle end state of the second imaging state in the optical system.

In the optical system according to the second present invention, it is preferable that the following conditional expression is satisfied.

$$-0.15<\varphi 1/\varphi w<0.15$$

where, φ1 denotes refractive power in the second medium of the first lens group, and φw denotes refractive power in a wide-angle end state in the second imaging state of the optical system.

In the optical system according to the second present invention, it is preferable that the following conditional expression is satisfied.

$$0.30<\Delta 2w/\Delta 3w<1.20$$

where, Δ2w denotes amount of movement of the second lens group when switching from an infinity imaging state in a wide-angle end state in the second imaging state to an infinity imaging state in a wide-angle end state in the first imaging state, and

Δ3w denotes amount of movement of the third lens group when switching from an infinity imaging state in a wide-angle end state in the second imaging state to an infinity imaging state in a wide-angle end state in the first imaging state.

In the optical system according to the second present invention, it is preferable that the following conditional expression is satisfied.

$$-1.00<\varphi 2/\varphi w<-0.30$$

where, φ2 denotes refractive power in the second medium of the second lens group, and φw denotes refractive power in a wide-angle end state in the second imaging state of the optical system.

In the optical system according to the second present invention, it is preferable that the following conditional expression is satisfied.

$$0.20<\varphi 3/\varphi 4<1.00$$

where, φ3 denotes refractive power in the second medium of the third lens group, and φ4 denotes refractive power in the second medium of the fourth lens group.

In the optical system according to the second present invention, it is preferable that the first medium having the first refractive index is water, and the second medium having the second refractive index is air.

An optical apparatus according to a second present invention comprises the optical system according to the second invention.

A method for manufacturing an optical system according to the second present invention is a method for manufacturing an optical system capable of switching between the first imaging state in the first medium having a first refractive index and the second imaging state in the second medium having a second refractive index which is different from the first refractive index, the optical system comprises a first lens group, and a second lens group disposed closer to an image than the first lens group, and each lens is disposed in a lens-barrel so that a distance between the first lens group and the second lens group is changed while a focal length of the optical system is not changed upon zooming in the first medium and zooming in the second medium, and the distance between the first lens group and the second lens group is changed upon switching from the first imaging state to the second imaging state.

An optical system according to a third present invention is an optical system capable of switching between a first imaging state in a first medium having a first refractive index and a second imaging state in a second medium having a second refractive index, the optical system comprises, in order from an object, a first lens group, and at least three lens groups, and zooming is performed by fixing a position of the first lens group on an optical axis, and moving at least one of the three lens groups on an optical axis, and focusing in the first medium is performed by moving at least a part of the three lens groups on the optical axis as a first focusing lens group, and focusing in the second medium is performed by moving at least a part of the three lens groups on the optical axis as a second focusing lens group, and in the first focusing lens group and the second focusing lens group at least one of configurations and moving loci are different from each other.

In the optical system according to the third present invention, the three lens groups comprise lens groups having negative refractive power, a lens group closest to an object among the lens groups having the negative refractive power is a first focusing lens group, and a lens group arranged in order along an optical axis and closer to an image of the first focusing lens group is the second focusing lens group.

In the optical system according to the third present invention, when a state changes between the first imaging state and the second imaging state, it is preferable that at least two lens groups of the three lens groups are moved along the optical axis.

In the optical system according to the third present invention, it is preferable that the three lens groups are composed of, in order from the object, a second lens group having negative refractive power, a third lens group having positive refractive power, and fourth lens group having positive refractive power, and zooming is performed by changing a distance between the first lens group and the second lens group and a distance between the second lens group and the third lens group.

In the optical system according to the third present invention, it is preferable that the first medium having the first refractive index is water, and the second medium having the second refractive index is air.

An optical apparatus according to the third present invention comprises the optical system according to the third invention.

A method for manufacturing an optical system according to the third invention is a method for manufacturing an optical system capable of switching between a first imaging state in a first medium having a first refractive index and a second imaging state in a second medium having a second refractive index which is different from the first refractive index, the optical system comprises, in order from an object, a first lens group, and at least three lens groups, and zooming is performed by fixing a position of the first lens group on an optical axis and moving at least one of the three lens groups on the optical axis, and focusing in the first medium is performed by moving at least a part of the three lens groups on the optical axis as a first focusing lens group, and focusing in the second medium is performed by moving at least a part of the three lens groups on the optical axis as a second focusing lens group, and in the first focusing lens group and the second focusing lens group at least one of configurations and moving loci are different from each other.

An optical system according to a fourth present invention is an optical system capable of switching between a first imaging state in a first medium having a first refractive index and a second imaging state in a second medium having a second refractive index which is different from the first refractive index, the optical system comprises a moving lens group whose position against an image surface on an optical axis direction changed upon zooming in the first medium and zooming in the second medium, and in the moving lens group a moving locus upon zooming in the first medium is different from a moving locus upon zooming in the second medium.

It is preferable that the optical system according to the fourth present invention comprises a plurality of the moving lens groups.

It is preferable that the optical system according to the fourth present invention comprises a first lens group closest to an object, and the following conditional expression is satisfied.

$$0.80<R1/Enpw<4.00$$

where, R1 denotes a radius of curvature of a lens surface closest to the object of the first lens group G1, and Enpw denotes a distance on the optical axis from a lens surface closest to the object of the first lens group to an incident pupil position in an infinity imaging state in a wide-angle end state in the second imaging state of the optical system.

In the optical system according to the fourth present invention, it is preferable that the following conditional expressions are satisfied.

$$-0.90<\Delta 1U/\Delta 1A<0.90$$

$$0.20<\Delta 2U/\Delta 2A<2.00$$

where, Δ1U denotes amount of movement necessary to change from an infinity imaging state in a wide-angle end state to an infinity imaging state in a telephoto end state in the first imaging state of a lens group located closest to the image among the at least two moving lens groups (however, a positive symbol is assigned to amount of movement in an image surface direction, while a negative symbol is assigned to amount of movement in an object direction), Δ1A denotes amount of movement necessary to change from an infinity imaging state in a wide-angle end state to an infinity imaging state in a telephoto end state in the second imaging state of a lens group located closest to the image among the at least two moving lens groups (however, a positive symbol is assigned to amount of movement in the image surface direction, while a negative symbol is assigned to amount of movement in the object direction), Δ2U denotes amount of movement necessary to change from an infinity imaging state in a wide-angle end state to an infinity imaging state in a telephoto end state in the first imaging state of a lens group located in the second closest to the image among the at least two moving lens groups (however, a positive symbol is assigned to amount of movement in the image surface direction, while a negative symbol is assigned to amount of movement in the object direction), and Δ2A denotes amount of movement necessary to change from an infinity imaging state in a wide-angle end state to an infinity imaging state in a telephoto end state in the second imaging state of a lens group located in the second closest to the image among the at least two moving lens groups (however, a positive symbol is assigned to amount of movement in the image surface direction, while a negative symbol is assigned to amount of movement in the object direction).

In the optical system according to the fourth present invention, it is preferable that the first medium having the first refractive index is water, and the second medium having the second refractive index is air.

An optical apparatus according to the fourth present invention comprises the optical system according to the fourth invention.

A method for manufacturing an optical system is a method for manufacturing an optical system capable of switching between a first imaging state in a first medium having a first refractive index and a second imaging state in a second medium having a second refractive index which is different from the first refractive index, a moving lens group whose position against an image surface on an optical axis changed upon zooming in the first medium and zooming in the second medium, and each lens is disposed in a lens-barrel so that in the moving lens group a moving locus upon zooming in the first medium is different from a moving locus upon zooming in the second medium.

BRIEF DESCRIPTION OF THE DRAWINGS

FIG. 2A depicts a wide-angle end state, FIG. 2B depicts an intermediate focal length state, and FIG. 2C depicts a telephoto end state.

FIG. 3A depicts a wide-angle end state, FIG. 3B depicts an intermediate focal length state, and FIG. 3C depicts a telephoto end state.

FIG. 5A depicts a wide-angle end state, FIG. 5B depicts an intermediate focal length state, and FIG. 5C depicts a telephoto end state.

FIG. 6A depicts a wide-angle end state, FIG. 6B depicts an intermediate focal length state, and FIG. 6C depicts a telephoto end state.

FIG. 8A depicts a wide-angle end state, FIG. 8B depicts an intermediate focal length state, and FIG. 8C depicts a telephoto end state.

FIG. 9A depicts a wide-angle end state, FIG. 9B depicts an intermediate focal length state, and FIG. 9C depicts a telephoto end state.

FIG. 11A depicts a wide-angle end state, FIG. 11B depicts an intermediate focal length state, and FIG. 11C depicts a telephoto end state.

FIG. 12A depicts a wide-angle end state, FIG. 12B depicts an intermediate focal length state, and FIG. 12C depicts a telephoto end state.

FIG. 14A depicts a wide-angle end state, FIG. 14B depicts an intermediate focal length state, and FIG. 14C depicts a telephoto end state.

FIG. 15A depicts a wide-angle end state, FIG. 15B depicts an intermediate focal length state, and FIG. 15C depicts a telephoto end state.

FIG. 17A depicts a wide-angle end state, FIG. 17B depicts an intermediate focal length state, and FIG. 17C depicts a telephoto end state.

FIG. 18A depicts a wide-angle end state, FIG. 18B depicts an intermediate focal length state, and FIG. 18C depicts a telephoto end state.

FIG. 20A depicts the wide-angle end state, FIG. 20B depicts the intermediate focal length state, and FIG. 20C depicts the telephoto end state.

FIG. 21A depicts the wide-angle end state, FIG. 21B depicts the intermediate focal length state, and FIG. 21C depicts the telephoto end state.

FIG. 23A depicts the wide-angle end state, FIG. 23B depicts the intermediate focal length state, and FIG. 23C depicts the telephoto end state.

FIG. 24A depicts the wide-angle end state, FIG. 24B depicts the intermediate focal length state, and FIG. 24C depicts the telephoto end state.

FIG. 26A depicts the wide-angle end state, FIG. 26B depicts the intermediate focal length state, and FIG. 26C depicts the telephoto end state.

FIG. 27A depicts the wide-angle end state, FIG. 27B depicts the intermediate focal length state, and FIG. 27C depicts the telephoto end state.

FIG. 29A depicts the wide-angle end state, FIG. 29B depicts the intermediate focal length state, and FIG. 29C depicts the telephoto end state.

FIG. 30A depicts a wide-angle end state, FIG. 30B depicts an intermediate focal length state, and FIG. 30C depicts a telephoto end state.

FIG. 32A depicts the wide-angle end state, FIG. 32B depicts the intermediate focal length state, and FIG. 32C depicts the telephoto end state.

FIG. 33A depicts the wide-angle end state, FIG. 33B depicts the intermediate focal length state, and FIG. 33C depicts the telephoto end state.

FIG. 35A depicts a wide-angle end state, FIG. 35B depicts an intermediate focal length state, and FIG. 35C depicts a telephoto end state.

FIG. 36A depicts the wide-angle end state, FIG. 36B depicts the intermediate focal length state, and FIG. 36C depicts the telephoto end state.

FIG. 38A depicts the wide-angle end state, FIG. 38B depicts the intermediate focal length state, and FIG. 38C depicts the telephoto end state.

FIG. 39A depicts the wide-angle end state, FIG. 39B depicts the intermediate focal length state, and FIG. 39C depicts the telephoto end state.

FIG. 41A depicts the wide-angle end state, FIG. 41B depicts the intermediate focal length state, and FIG. 41C depicts the telephoto end state.

FIG. 42A depicts the wide-angle end state, FIG. 42B depicts the intermediate focal length state, and FIG. 42C depicts the telephoto end state.

FIG. 44A depicts the wide-angle end state, FIG. 44B depicts the intermediate focal length state, and FIG. 44C depicts the telephoto end state.

FIG. 45A depicts the wide-angle end state, FIG. 45B depicts the intermediate focal length state, and FIG. 45C depicts the telephoto end state.

FIG. 47A depicts the wide-angle end state, FIG. 47B depicts the intermediate focal length state, and FIG. 47C depicts the telephoto end state.

FIG. 48A depicts the wide-angle end state, FIG. 48B depicts the intermediate focal length state, and FIG. 48C depicts the telephoto end state.

FIG. 50A depicts the wide-angle end state, FIG. 50B depicts the intermediate focal length state, and FIG. 50C depicts the telephoto end state.

FIG. 51A depicts the wide-angle end state, FIG. 51B depicts the intermediate focal length state, and FIG. 51C depicts the telephoto end state.

FIG. 53A depicts the wide-angle end state, FIG. 53B depicts the intermediate focal length state, and FIG. 53C depicts the telephoto end state.

FIG. 54A depicts the wide-angle end state, FIG. 54B depicts the intermediate focal length state, and FIG. 54C depicts the telephoto end state.

FIG. 58A depicts a wide-angle end state, FIG. 58B depicts an intermediate focal length state, and FIG. 58C depicts a telephoto end state.

FIG. 59A depicts the wide-angle end state, FIG. 59B depicts the intermediate focal length state, and FIG. 59C depicts the telephoto end state.

FIG. 60A depicts the wide-angle end state, FIG. 60B depicts the intermediate focal length state, and FIG. 60C depicts the telephoto end state.

FIG. 61A depicts the wide-angle end state, FIG. 61B depicts the intermediate focal length state, and FIG. 61C depicts the telephoto end state.

FIG. 63A depicts a wide-angle end state, FIG. 63B depicts an intermediate focal length state, and FIG. 63C depicts a telephoto end state.

FIG. 64A depicts the wide-angle end state, FIG. 64B depicts the intermediate focal length state, and FIG. 64C depicts the telephoto end state.

FIG. 65A depicts the wide-angle end state, FIG. 65B depicts the intermediate focal length state, and FIG. 65C depicts the telephoto end state.

FIG. 66A depicts the wide-angle end state, FIG. 66B depicts the intermediate focal length state, and FIG. 66C depicts the telephoto end state.

FIG. 68A depicts the wide-angle end state, FIG. 68B depicts the intermediate focal length state, and FIG. 68C depicts the telephoto end state.

FIG. 69A depicts the wide-angle end state, FIG. 69B depicts the intermediate focal length state, and FIG. 69C depicts the telephoto end state.

FIG. 70A depicts the wide-angle end state, FIG. 70B depicts the intermediate focal length state, and FIG. 70C depicts the telephoto end state.

FIG. 71A depicts the wide-angle end state, FIG. 71B depicts the intermediate focal length state, and FIG. 71C depicts the telephoto end state.

FIG. 73A depicts a wide-angle end state, FIG. 73B depicts an intermediate focal length state, and FIG. 73C depicts a telephoto end state.

FIG. 74A depicts the wide-angle end state, FIG. 74B depicts the intermediate focal length state, and FIG. 74C depicts the telephoto end state.

FIG. 75A depicts the wide-angle end state, FIG. 75B depicts the intermediate focal length state, and FIG. 75C depicts the telephoto end state.

FIG. 76A depicts the wide-angle end state, FIG. 76B depicts the intermediate focal length state, and FIG. 76C depicts the telephoto end state.

FIG. 87A depicts the wide-angle end state, FIG. 87B depicts an intermediate focal length state, and FIG. 87C depicts the telephoto end state.

FIG. 88A depicts the wide-angle end state, FIG. 88B depicts the intermediate focal length state, and FIG. 88C depicts the telephoto end state.

FIG. 93A depicts the wide-angle end state, FIG. 93B depicts an intermediate focal length state, and FIG. 93C depicts the telephoto end state.

FIG. 94A depicts the wide-angle end state, FIG. 94B depicts the intermediate focal length state, and FIG. 94C depicts the telephoto end state.

DESCRIPTION OF THE EMBODIMENTS

First Embodiment

A first embodiment will be now described with reference to drawings. An optical system ZL according to the first embodiment is an optical system is, as shown in FIG. 1 and FIG. 4, capable of imaging in a plurality of object side media (for instance, air and water) whose refractive indexes mutually differ from each other, the optical system ZL comprises, in order from an object, a front lens group whose position in an optical axis direction is fixed, and a rear lens group, wherein the rear lens group comprises at least two moving lens groups, wherein when the object side media is changed to an object medium having a different refractive index, and imaging afterwards, at least two moving lens groups in the rear lens group are moved along the optical axis.

Figure 1:
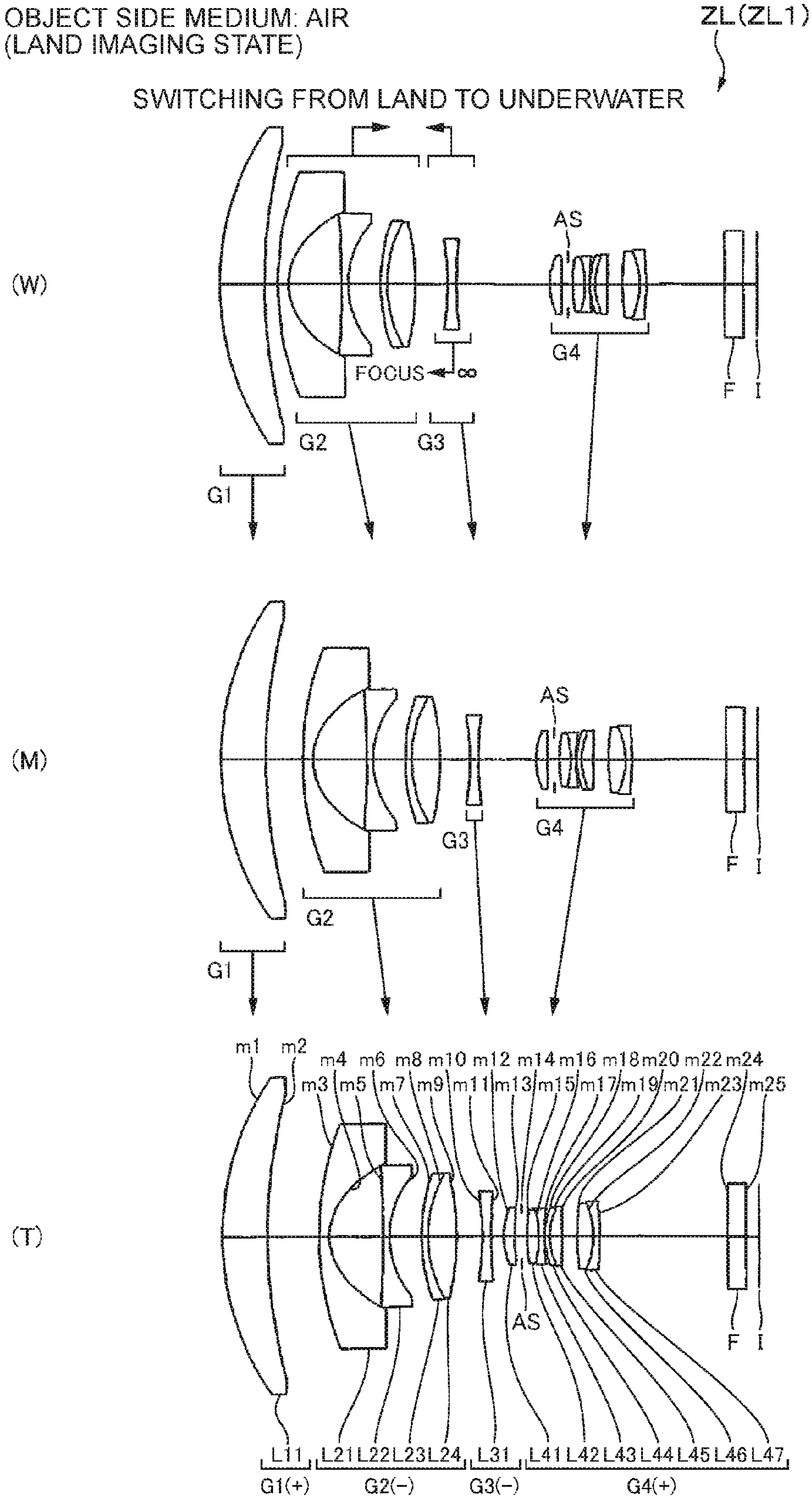
FIG. 1 illustrates a sectional view showing a lens configuration of an optical system according to Example 1 in case an object side medium is air, and a diagram showing a moving locus of each group from a wide-angle end state (W) to a telephoto end state (T) through an intermediate focal length state (M).
Figure 4:
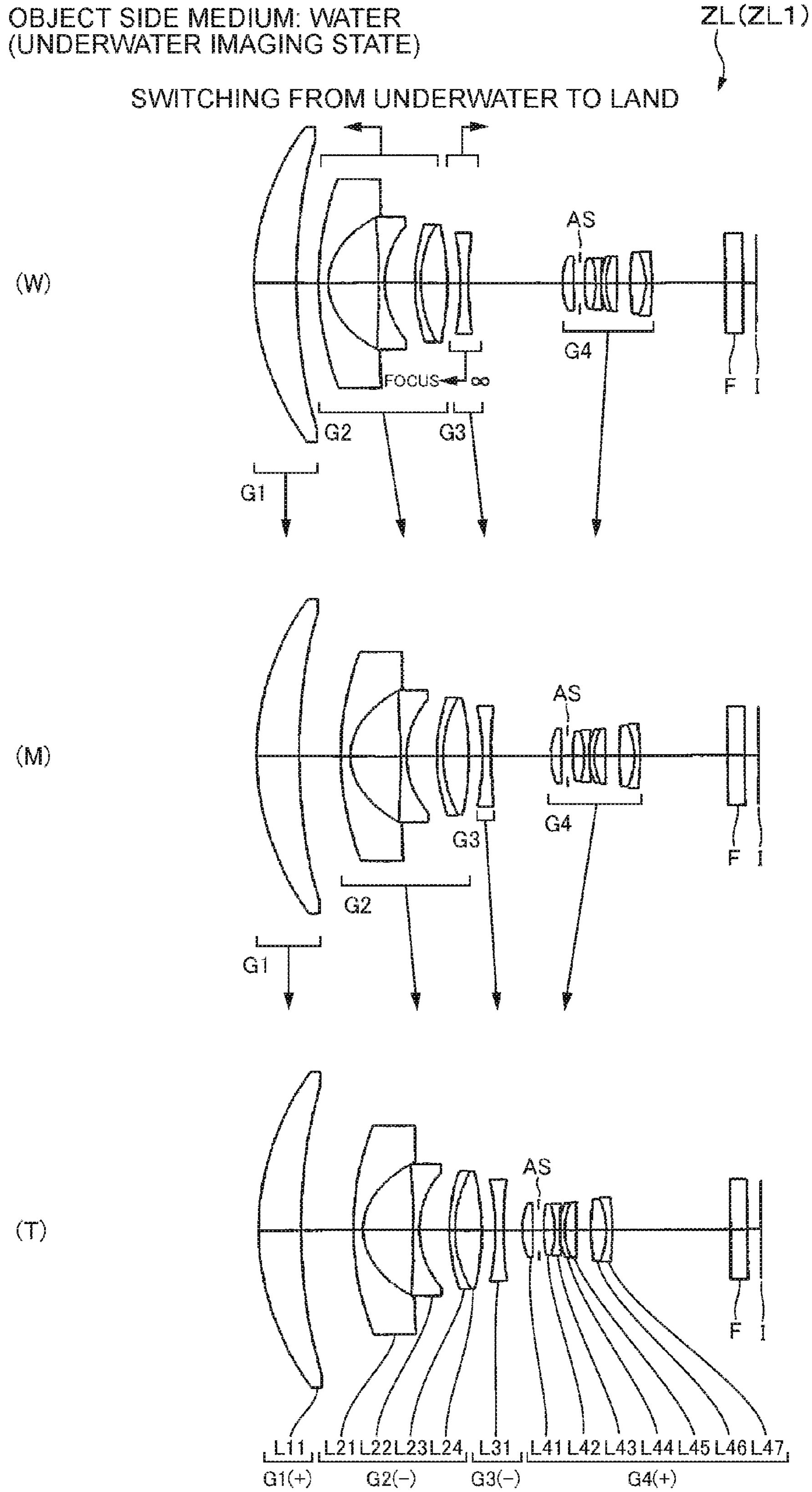
FIG. 4 illustrates a sectional view showing a lens configuration of the optical system according to Example 1 in case the object side medium is water, and a diagram showing the moving locus of each group from a wide-angle end state (W) to a telephoto end state (T) through an intermediate focal length state (M).

For example, in FIG. 1 and FIG. 4, the first lens group G1 corresponds to a front lens group. The second to fourth lens groups G2 to G4 (disposed closer to the image than the first lens group G1) correspond to the rear lens group. The second lens group G2 and the third lens group G3 correspond to two moving lens groups.

By fixing a position of the lens group closest to the object, it is possible to secure drip-proof and hermetic regarding the object side media. When the object side media is changed, generally, any one of or both of fluctuation of chromatic aberration of magnification and distortion and fluctuation of distortion may be generated. Upon changing between the object side media, by moving at least two moving lens groups in the rear lens group, it is possible to reduce various aberrations such as chromatic aberration of magnification, distortion, and curvature of an image surface, etc. and to achieve good image-forming performance.

In the optical system ZL according to the first embodiment, it is appreciated that the rear lens group comprises at least two negative lenses, wherein at least two lenses in the rear lens group are moved along the optical axis upon changing between the object side media.

With the two lens groups configured with negative lenses as above, it is possible to appropriately correct fluctuation of curvature of image surface when the object side media is changed. Moreover, it is possible to suppress change of an image-forming position when the object side media is change.

In the optical system ZL according to the first embodiment, it is appreciated that the following conditional expression (1) is satisfied.

$$2.000<R1/Y\max<8.000 \qquad (1)$$

where, R1 denotes a radius of curvature of an object side surface of a lens component disposed closest to the object in the front lens group, and Ymax denotes a maximum image height.

Note that “lens component” means a single lens or a cemented lens.

The conditional expression (1) defines a conditional expression for restraining both of fluctuation of distortion and chromatic aberration of magnification, and fluctuation of curvature of image surface in association with a change of a refractive index when the object side media is changed.

In case of exceeding an upper limit of the conditional expression (1), a radius of curvature of a front end surface of the front lens group becomes large, thus fluctuation of chromatic aberration of magnification and distortion when the object side media is changed, thus a correction becomes impossible.

In order to ensure the advantageous effect of the first embodiment, it is appreciated to set the upper limit of the conditional expression (1) to 7.000. In order to further ensure the advantageous effect of the first embodiment, it is appreciated that the upper limit of the conditional expression (1) is set to 6.000.

In case of deceeding the lower limit of the conditional expression (1), a radius of curvature of the front end surface of the front lens group becomes small, and a variate of the Petzval sum becomes large when the object side media is changed, as a result, fluctuation of curvature of image surface becomes too large to be corrected even if lenses in the rear lens group are moved, it is not preferable.

In order to ensure the advantageous effect of the first embodiment, it is appreciated to set the lower limit of the conditional expression (1) to 3.000. In order to ensure the advantageous effect of the first embodiment, it is appreciated to set the lower limit of the conditional expression (1) to 4.000.

It is preferable that the optical system ZL according to the first embodiment comprises, in order from an object, a first lens group G1 whose position in the optical axis direction is fixed, a second lens group G2, a third lens group G3, and a fourth lens group G4, wherein a front lens group is composed of the first lens group G1, and a rear lens group comprises the second lens group G2, the third lens group G3, and the fourth lens group G4, wherein the second lens group G2 in the rear lens group and the third lens group G3 are moved along the optical axis when the object side media is changed.

As described above, by moving the second lens group G2 and the third lens group G3 when the object side media is changed, it is possible to appropriately correct fluctuation of curvature of image surface. Moreover, this enables to suppress a change of an image-forming position when the object side media is changed.

In the optical system ZL according to the first embodiment, it is appreciated to zoom by moving the second lens group G2, the third lens group G3, and the fourth lens group G4 along the optical axis regardless of a refractive index of the object side medium.

With this arrangement, it is possible to zoom by moving the second lens group G2 to the fourth lens group G4, and improve convenience upon imaging.

In the optical system ZL according to the first embodiment, it is appreciated that an distance between the first lens group G1 and the second lens group G2 is changed depending on when zooming or changing between the object side media, a distance between the second lens group G2 and the third lens group G3 is changed depending on when zooming or changing between the object side media, and a distance between the third lens group G3 and the fourth lens group G4 is changed depending on when zooming or changing between the object side media.

With this arrangement, it is possible to appropriately correct both of fluctuation of aberrations when zooming (for instance, spherical aberration, and curvature of image surface), and fluctuation of an aberration which occur when the object side media is changed (for instance, curvature of image surface).

In the optical system ZL according to the first embodiment, it is appreciated to move the second lens group G2 in an image surface direction along the optical axis, and the third lens group G3 in an object direction along the optical axis, when changing to a high refractive index medium (for instance, water) as one of the object side media from a low refractive index medium (for instance, air) as one of the object side media.

With this arrangement, it is possible to appropriately correct both of fluctuation of curvature of image surface and a change of an image-forming position, which occur when the object side media is changed.

In the optical system ZL according to the first embodiment, it is appreciated that the distance between the second lens group G2 and the third lens group G3 is maintained constant upon zooming in an infinity imaging state at least in any one of a imaging state in a medium before changed and a imaging state in a medium after changed, when the object side media is changed.

With this arrangement, it is possible to simplify a drive mechanism and control for moving the second lens group G2 and the third lens group G3 upon zooming.

In the optical system ZL according to the first embodiment, it is appreciated that when changing from a low refractive index medium (for instance, air) to a high refractive index medium (for instance, water) regarding the object side media, a moving locus (curve) upon zooming of the second lens group G2 in the low refractive index medium is, when moving in parallel with the optical axis, identical with a moving locus of the second lens group G2 in the high refractive index medium.

With this arrangement, it is possible to drive the second lens group G2 using a mechanical cam for moving in parallel with the optical axis in association with changing between the object side media, and simplify the drive mechanism and control for moving the second lens group G2.

In the optical system ZL according to the first embodiment, it is appreciated that focusing is performed by moving the third lens G3 in the optical axis direction as a focusing lens group.

With this arrangement, it is possible to focus with a single lens group regardless of changing between the object side media, and simplify the drive mechanism upon focusing. Moreover, by focusing with the negative third lens group G3, it is possible to suppress fluctuation of spherical aberration and curvature of image surface when focusing to each object side medium, and realize good image-formation performance from an infinity distance to a point-blank range.

In the optical system ZL according to the first embodiment, it is appreciated that the following conditional expression (2) is satisfied.

$$1.000<f2/f3<6.000 \quad (2)$$

where, f2 denotes a focal length of the second lens group G2, and f3 denotes a focal length of the third lens group G3.

The conditional expression (2) defines a conditional expression for specifying a suitable ratio between focal lengths of the second lens group G2 and the third lens group G3. By satisfying the conditional expression (2), it is possible to suppress spherical aberration and fluctuation of curvature of image surface when changing the object side media and focusing, and achieve good image-formation performance.

In case of exceeding the upper limit of the conditional expression (2), refractive power of the second lens group G2 becomes small, thus fluctuation of curvature of image surface when changing the object side media in unable to be corrected by moving the second lens group G2.

In order to ensure the advantageous effect of the first embodiment, it is appreciated to set the upper limit of the conditional expression (2) to 5.000. In order to ensure the advantageous effect of the first embodiment, it is preferable to set the upper limit of the conditional expression (2) to 4.000.

In case of deceeding the lower limit of the conditional expression (2), the refractive index of the third lens group G3 will become small, and it becomes difficult to appropriately correct spherical aberration upon focusing and fluctuation of curvature of image surface.

In order to ensure the advantageous effect of the first embodiment, it is appreciated to set the lower limit of the conditional expression (2) to 1.250. In order to further ensure the advantageous effect of the first embodiment, it is preferable to set the lower limit of the conditional expression (2) to 1.500.

In the optical system ZL according to the first embodiment, it is appreciated that a lens component disposed closest to the object in the front group has a meniscus shape having a convex surface facing the object.

With this arrangement, it is possible to appropriately suppress fluctuation of distortion and chromatic aberration of magnification in association with changing between the object side media. In case that this shape is not applicable, fluctuation of distortion and chromatic aberration of magnification in association with changing between the object side media, thus it is not preferable.

In the optical system ZL according to the first embodiment, it is appreciated that the following conditional expression (3) is satisfied.

$$0.200<R1/R2<2.000 \quad (3)$$

where, R1 denotes a radius of curvature of the object side surface of a lens component disposed closest to the object in the front lens group, and R2 denotes a radius of curvature of the image side surface of a lens component disposed closest to the object in the front lens group.

The conditional expression (3) defines a conditional expression for specifying a suitable shape of a lens component having a meniscuses shape disposed closest to the object in the front lens group.

In case of exceeding the upper limit of the conditional expression (3), a lens component closest to the object is a negative meniscus lens, and a radius of curvature of object side surface becomes large. As a result, this causes to increase fluctuation of distortion and chromatic aberration of magnification in association with changing between the object side media.

In order to ensure the advantageous effect of the first embodiment, it is preferable to set the upper limit of the conditional expression (3) to 1.700. In order to further ensure the advantageous effect of the first embodiment, it is preferable to set the upper limit of the conditional expression (3) to 1.400.

In case of deceeding the lower limit of the conditional expression (3), a lens component closest to the object is a positive meniscus lens, and a radius of curvature of object side surface becomes small. As a result, this causes to increase fluctuation of curvature of image surface in association with changing between the object side media.

In order to ensure the advantageous effect of the first embodiment, it is preferable to set the lower limit of the conditional expression (3) to 0.300. In order to further ensure the advantageous effect of the first embodiment, it is appreciated that the lower limit of the conditional expression (3) is set to 0.400.

In the optical system ZL according to the first embodiment, it is appreciated that focusing is performed by moving at least one of moving lens groups included in the rear lens group in the optical axis direction as a focusing lens group, regardless of refractive indexes of the object side media.

With this arrangement, it is possible to perform focusing with a single lens group without changing between the object side media, and simplify a drive mechanism for focusing.

It is appreciated that the optical system ZL according to the first embodiment is, as mentioned above, an optical system capable of imaging in a first imaging state (land imaging state) in which the object side medium is a first medium (for instance, air) having a first refractive index, and in a second imaging state (underwater imaging state) in which the object side medium is a second medium (for instance, water) having a second refractive index which is different from the first refractive index, wherein the optical system ZL comprises, in order from an object, a first lens group whose position is fixed in an optical axis direction, a middle group (corresponding to the second lens group G2 to the third lens group G3 in FIG. 1 and FIG. 4) having negative refractive power, and an image side group (corresponding to the fourth lens group G4 in FIG. 1 and FIG. 4), wherein a lens component disposed closest to the image in the middle group is a lens component closest to the image and configuring a focusing lens group (corresponding to the third lens group G3 in FIG. 1 and FIG. 4) moved in the optical axis direction upon focusing at least in any one of the first imaging state and the second imaging state, wherein at least any one of a distance between the first lens group G1 and the middle group and a distance between the middle group and the image group are changed when switching from the first imaging state to the second imaging state.

As described above, by changing at least any one of the distance between the first lens group G1 and the middle group and the distance between the middle group and the image group upon switching imaging states, it is possible to suppress fluctuation of each aberration of chromatic aberration of magnification, distortion and curvature of image surface, and achieve good image-forming performance.

Moreover, it is appreciated that the optical system ZL according to the first embodiment is, as mentioned above is an optical system capable of imaging in a first imaging state (land imaging state) in which a medium on the object side is a first medium (for instance, air) having a first refractive index, and in a second imaging state (underwater imaging state) in which a medium is a second medium (for instance, water) having a second refractive index which is different from the first refractive index, wherein the optical system ZL comprises, in order from the object, a first lens group (G1) whose position on the optical axis direction is fixed, a focusing lens group (corresponding to the third lens group G3) moved along the optical axis direction when focusing in both of the first imaging state and second imaging state, wherein the focusing lens group has negative refractive power.

As described above, this enables to perform focusing with a single lens without changing between the object side media, and simplify a mechanism. By focusing with the negative focusing lens group disposed closer to the image than the first lens group G1, it is possible to suppress fluctuation of curvature of image and spherical aberration surface due to each object side medium, and realize good image-forming performance from an infinity distance to a point-blank range.

The optical system ZL according to the first embodiment may comprise a configuration using a mechanical mechanism, a configuration electrically moving via switch manipulation using an electric signal or optical signal, and a sensor detecting a material side medium, as a configuration in which a moving lens group in the rear lens group is moved in association with changing between the object side media, further comprise a configuration in which a lens group is electrically moved in response to output of the sensor. However, it is not limited to these configurations.

In the optical system ZL according to the first embodiment, it is appreciated parameter values used for focusing control and image processing are switched in association with changing between the object side media. It is preferable that the parameter values are recorded on a memory apparatus (ROM) equipped within a lens. Moreover, it is preferable that they are recorded not only in the lens, but also on a memory apparatus (RIM) in a camera body. Regarding the parameter values recorded in the lens or the camera body, it is preferable to record at least two sets of data depending on a kind of the object side medium.

In the optical system ZL according to the first embodiment, it is appreciated that a plurality of object side media whose refractive indexes are different from each other are air and water. By adopting these media, it is possible to have an optical system suitable for a general amphibious lens, thus this practical.

Moreover, as the plurality of object side media, it can be considered to adopt various gas and liquid such as ethanol (refractive index=1.362 in d-line), kerosene (refractive index=1.447 in d-line), and benzene (refractive index=1.501 in d-line), etc., other than air (refractive index=1.000 in d-line) and water (refractive index=1.333 in d-line), any of the above are available in the optical system ZL according to the first embodiment. Note that water is not limited to fresh water, however aqueous solution such as sea water may be adopted.

As mentioned above, according to the first embodiment, it is possible to realize the optical system ZL capable of imaging in the plurality of object side media (for instance, air and water, etc.) whose refractive indexes are different from each other, having good optical performance even in a imaging state in any one of media.

Figure 55:
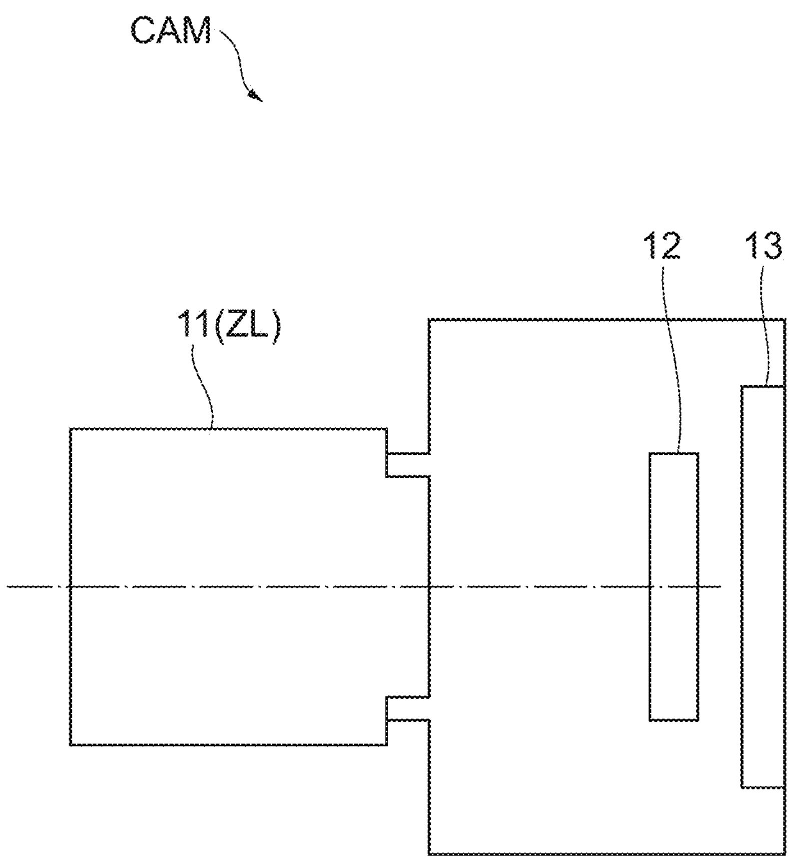
FIG. 55 illustrates a diagram showing a configuration of the camera equipped with the optical system according to the first and second embodiments.

Next, a camera (imaging device) having the optical system ZL according to the first embodiment is described with reference to FIG. 55. The camera CAM is, as shown in FIG. 55, a lens-interchangeable amphibious camera having the optical system ZL in an attachable and detachable manner, as a imaging lens 11. In this camera CAM, light from an unillustrated photographic subject is condensed by the imaging lens 11, and is imaged on the image sensor 12. An image of the photographic subject imaged on the image sensor 12 is converted into a video signal by an unillustrated electric circuit, and is displayed on a monitoring screen 13, then is observable by a photographer. The photographer observes the photographic subject image through the monitoring screen 13 while half-pressing an unillustrated release button, and decides an imaging composition. While doing so, an object side medium is identified by an unillustrated identification unit (for example, such as whether it is in the land imaging state or in the underwater imaging state, etc.), a distance between the photographic subject and the camera CAM is measured by an unillustrated measurement unit, the imaging lens 11 moves to a focusing position corresponding to these results, and an autofocus operation is completed. Next, if the release button is fully pressed by the photographer, in camera CAM the light from the photographic subject is received by the image sensor 12 so that an imaging picture is acquired and recorded on an unillustrated memory.

Note that in the first embodiment there are several methods for identifying what is between the object side media, that is, for example, a method of identifying if the imaging state is land (in the air) or underwater, such as a method in which two terminals exposed from the camera CAM are prepared and whether the camera CAM is put in water or not is automatically detected by whether the two terminals become conductive when the camera CAM is put in water, or a method in which a mode switching switch manipulated by the photographer when switching between a land imaging mode and a underwater imaging mode is prepared and the mode is identified in response to manual manipulation by the photographer, etc. However, it is not limited to these methods.

According to the camera CAM equipped with the above configurations in the first embodiment, by having the optical system ZL mentioned above as the imaging lens 11, it is possible to shoot against any one of the plurality of object side media, and realize a camera (imaging device) having good optical performance even if the camera CAM is in the imaging states in any medium.

Note that the camera CAM set forth in FIG. 55 may be not only a type in which the optical system ZL is provided in an attachable and detachable manner, but also a type in which the camera body is integrated with the optical system ZL. Moreover, the camera CAM may be a so-called single-lens reflex camera having a quick return mirror, or a video camera which primarily performs moving imaging.

Figure 56:
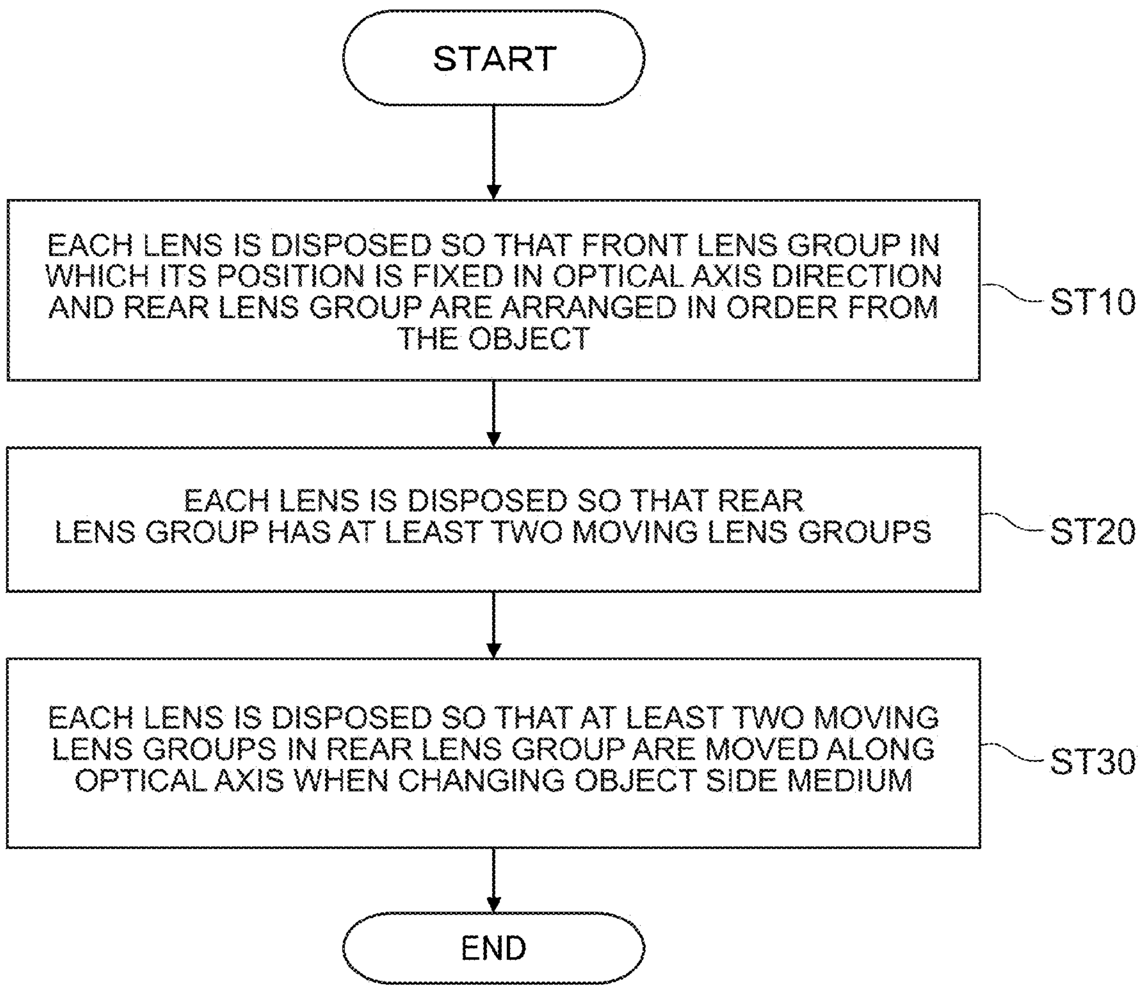
FIG. 56 illustrates a flowchart showing a method for manufacturing the optical system according to the first embodiment.

Next, a method for manufacturing the optical system ZL is outlined with reference to FIG. 56. Firstly, each lens is disposed in a lens lens-barrel so that a front lens group whose position in the optical direction is fixed, and a rear lens group are arranged in order from an object (Step ST10). Each lens is disposed so that the rear lens group comprises at least two moving lens groups (Step ST20). Upon changing between the object side media, each lens is disposed so that the at least two moving lens groups in the rear lens group are moved along the optical axis (Step ST30).

Exampling a lens arrangement in the first embodiment, as shown in FIG. 1 and FIG. 4, in order from an object, a first lens group G1 is configured by arranging a positive meniscus lens L11 having a convex surface facing the object, a second lens group G2 is configured by arranging a negative meniscus lens L21 having a concave surface facing an image, a biconcave lens L22, and a cemented lens composed of a negative meniscus lens L23 having a concave surface facing the image and a biconvex lens L24, a third lens group G is configured by arranging a biconcave lens L31, a fourth lens group G4 is configured by arranging a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a concave surface facing the object, and a cemented lens composed of a biconvex lens L46 and a negative meniscus lens L47 having a concave surface facing the object. The front lens group is composed of the first lens groups G1, the rear lens group is composed of the second lens group G2 to the fourth lens group G4, and the two moving lens groups are composed of the second lens group G2 and the third lens group G3. Each lens group prepared as above is arranged in accordance with the above-mentioned procedures so that the optical system ZL is manufactured.

According to a method for manufacturing set forth in the first embodiment, it is possible to manufacture the optical system ZL capable of imaging in the plurality of object side media whose refractive indexes are different from each other, and which has good optical performance in any imaging state in any media.

Example According to the First Embodiment

Hereinafter, each example according to a first embodiment is described with reference to drawings. FIG. 1 and FIG. 4, FIG. 7 and FIG. 10, FIG. 13 and FIG. 16, FIG. 19 and FIG. 22, FIG. 25 and FIG. 28, FIG. 31 and FIG. 34, FIG. 37 and FIG. 40, FIG. 43 and FIG. 46, FIG. 49 and FIG. 52 illustrate a sectional view showing a configuration of optical systems ZL (ZL1 to ZL9) and refractive power distribution according to each example. In a bottom of the sectional view of the optical systems ZL1 to ZL9, an arrow indicates a moving direction along the optical axis of each lens group upon zooming from a wide-angle end state (W) to a telephoto end state (T) through an intermediate focal length state (M). In a top of the sectional view of the optical systems ZL1 to ZL9, an arrow indicates a moving direction of a focusing lens group upon focusing on a short distance object from infinity.

Note that each reference sign to FIG. 1 according to Example 1 is used independently for every example, in order to avoid complicating explanations due to swelling of the digit number of reference signs. Therefore, even if attached with the same reference signs as those in drawings according to other examples, this does not necessarily mean the same configurations as those in the other examples.

Tables 1 to 9 are illustrated below, these are tables showing each general data in Examples 1 to 9.

In each example, d-line (wave length of 587.562 nm) and g-line (wave length of 435.835 nm) are selected as subjects for calculating aberration characteristics.

[Object side medium] in tables shows a refractive index n (d) in d-line and an Abbe number νd regarding the object side medium (medium 1) having a low refractive index, and the object side medium (medium 2) having a high refractive index.

In the [Lens data] in tables, a surface number means an order of each optical surface from the object side along a direction light travels, R means a radius of curvature of each optical surface, D means a surface distance on the optical axis from each optical surface to the next optical surface (or image surface), n (d) means a refractive index in d-line of a material of a light member, and νd means an Abbe number on the basis of d-line of a material of the light member. (Di) means a surface distance from an i-th surface and a (i+1)-th surface, and (Stopper AS) means an aperture stop AS. "0.00000" of a radius of curvature means a plane. In case the optical surface is an aspherical surface, a sign "*" is assigned to the surface number and a paraxial radius of curvature is shown in a column of a radius of curvature R.

In [aspherical surface data] in tables, regarding the aspherical surfaces in the [Lens data], the configuration is defined by the following expression (a). X(y) means a distance along the optical axis direction from a tangent plane in a vertex of the aspherical surface to a position on the aspherical surface in height y, and R means a radius of curvature (paraxial radius of curvature) of a criterion spherical surface, κ means a conic constant, and, Ai means an i-th aspherical surface coefficient. "E-n" means "$\times10^{-n}$." For example, it is $1.234E-05=1.234\times10^{-5}$. Note that a secondary aspherical surface coefficient A2 is 0, and is omitted.

$$X(y)=(y^2/R)/\{1+(1-\kappa\times y^2/R^2)^{1/2}\}+A4\times y^4+A6\times y^6+A8\times y^8+A10\times y^{10} \quad (a)$$

In [Various data] in tables, f means a focal length of a lens whole system, and FNo means a f number, ω means a semi angle of view (unit: degree), Y means a maximum image height, TL means a distance from a lens front end surface to an image surface I on the optical axis upon focusing on infinity, BF means a distance from a lens rear end surface to the image surface I on the optical axis upon focusing on infinity, and BF (Air) means what is described using air equivalent distance from the distance from the lens rear end surface to the image surface I on the optical axis upon focusing on infinity.

In [Variable distance data] in tables, Di means a distance between an i-th surface and an (i+1)-th surface, and D0 means an axial air space between an object surface and a lens surface closest to the object in the first lens group G1, f means a focal length of the lens whole system, and β means magnification upon imaging.

In [lens group data] in tables, a front end surface and a focal length regarding each lens group are shown.

In [Values corresponding to the conditional expressions] in tables, values corresponding to the conditional expressions (1) to (3) are shown.

Hereinafter, in all general data values, regarding the focal length f shown, a radius of curvature R, a distance D, and other lengths, etc. "mm" is generally used except a specific request, however an optical system is not limited to the above, since equivalent optical performance can be obtained even if the optical system is proportionally enlarged or proportionally shrinked. Moreover, the unit is not limited to "mm," another appropriate unit is available, instead.

The explanations concerning the tables are common among all the examples, thus hereinafter the explanations are omitted.

EXAMPLE 1

Example 1 is described using FIG. 1 to FIGS. 6A, 6B and 6C, and Table 1. The optical system ZL (ZL1) according to the present example is an optical system enabling to shoot in two object side media whose refractive indexes are different from each other. Note that the object side medium of the low refractive index is "air," while the object side medium of the high refractive index is "Water." FIG. 1 illustrates a sectional view showing a lens configuration of an optical system according to Example 1 in case the object side medium is air (land imaging state). FIG. 4 illustrates a sectional view showing a lens configuration of the optical system according to Example 1 in case the object side medium is water (underwater imaging state).

The optical system ZL1 according to Example 1 is, as shown in FIG. 1 and FIG. 4, composed, in order from an object, a first lens group G1 having positive refractive power, a second lens group G2 having negative refractive power, a third lens group G3 having negative refractive power, and a fourth lens group G4 having positive refractive power.

The first lens group G1 is composed of a positive meniscus lens L11 having a convex surface facing the object.

The second lens group G2 is composed of, in order from the object, a negative meniscus lens L21 having a concave surface facing an image, a biconcave lens L22, and a cemented lens composed of a negative meniscus lens L23 having a concave surface facing the image and a biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from an object, a positive meniscus lens L41 having a convex surface to the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens composed of a biconvex lens L46 and a negative meniscus lens L47 having a concave surface facing the object. The image side surface of the negative meniscus lens L47 is an aspherical surface.

A filter group F is disposed on an image side of the fourth lens group G4. The filter group F is composed of a low-pass filter for cutting a spatial frequency more than a marginal dissector of image sensors such as a CCD and CMOS disposed on the image surface I, a cover-glass of an image sensor, etc.

The image surface I is formed on the image sensor which is composed of unillustrated CCDs, CMOSs, etc.

A position of the first lens group G1 on the optical axis fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state), the second lens group G2 and the third lens group G3 are independently moved upon zooming. In case the object side medium is water (underwater imaging state), the second lens group G2 and the third lens group G3 are independently moved upon zooming. Moreover, in case the object side medium is any one of air and water (also in any one of the land underwater imaging states), the fourth lens group G4 is moved upon zooming so that the same locus is drawn.

Upon focusing on from infinity to a point-blank range object, the third lens group G3 is moved to the object side.

When changing the object side media, the second lens group G2 and the third lens group G3 are moved along the optical axis. When changing the object side media from air (land imaging state) having a low refractive index medium to water (underwater imaging state) having a high refractive index medium, as shown in FIG. 1, the second lens group G2 is moved to the image side, and the third lens group G3 is moved to the object side. Moreover, when changing the object side media from water (underwater imaging state) having a high refractive index medium to air (land imaging state) having a low refractive index medium, as shown in FIG. 4, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes between when zooming and when changing the object side media. The distance between the second lens group G2 and the third lens group G3 changes between when zooming and when changing the object side media. The distance between the third lens group G3 and the fourth lens group G4 changes between when zooming and when changing the object side media.

The following Table 1 illustrates values of each general data in Example 1. The surface numbers 1 to 25 in Table 1 correspond to each optical surface of m1 to m25 shown in FIG. 1.

TABLE 1

[Object side medium]

| | |
|---|---|
| Medium 1: Air | n(d) = 1.00000 |
| Medium 2: Water | n(d) = 1.33306, νd = 54.0 |

[Lens data]

| Surface number | R | D | n(d) | νd |
|---|---|---|---|---|
| 1 | 43.27880 | 7.000 | 1.51680 | 63.9 |
| 2 | 89.27908 | (D2) | 1.00000 | |
| 3 | 47.47655 | 1.600 | 1.69412 | 53.4 |
| *4 | 9.29586 | 8.216 | 1.00000 | |
| 5 | −162.68535 | 1.000 | 1.77387 | 47.2 |
| *6 | 14.57417 | 4.969 | 1.00000 | |
| 7 | 28.78616 | 1.000 | 1.49782 | 82.6 |
| 8 | 19.40903 | 4.413 | 1.83400 | 37.2 |
| 9 | −40.74271 | (D9) | 1.00000 | |
| 10 | −41.81921 | 1.350 | 1.80400 | 46.6 |
| 11 | 69.83858 | (D11) | 1.00000 | |
| 12 | 11.73222 | 1.786 | 1.51680 | 63.9 |
| 13 | 393.56227 | 1.000 | 1.00000 | |
| 14 | (Aperture stop AS) | 0.800 | 1.00000 | |
| 15 | 22.84889 | 1.835 | 1.49782 | 82.6 |
| 16 | −15.32293 | 0.800 | 1.74400 | 44.8 |
| 17 | 31.63046 | 0.100 | 1.00000 | |
| 18 | 13.04613 | 0.800 | 1.85026 | 32.4 |
| 19 | 10.45159 | 1.847 | 1.51680 | 63.9 |
| 20 | 134.50975 | 2.428 | 1.00000 | |
| 21 | 38.22493 | 2.578 | 1.49782 | 82.6 |

TABLE 1-continued

| | | | | |
|---|---|---|---|---|
| 22 | −11.91993 | 1.000 | 1.77387 | 47.2 |
| *23 | −34.41387 | (D23) | 1.00000 | |
| 24 | 0.00000 | 2.790 | 1.51680 | 64.1 |
| 25 | 0.00000 | (D25) | 1.00000 | |

[Aspheric surface data]

| Surface | κ | A4 | A6 | A8 | A10 |
|---|---|---|---|---|---|
| 4 | −1.14130e+00 | 2.59719e−04 | −1.05957e−06 | 9.23990e−09 | −3.21550e−11 |
| 6 | −4.22670e+00 | 2.17094e−04 | −1.28487e−06 | 1.01069e−08 | −3.46010e−11 |
| 23 | 7.54800e−01 | 2.00428e−04 | 6.42540e−07 | 3.58877e−08 | −3.98413e−10 |

[Various data]

| | W | M | T |
|---|---|---|---|
| (Medium 1: Air) | | | |
| f | 7.20 | 9.25 | 13.60 |
| FNo | 3.45 | 3.78 | 4.49 |
| ω | 48.8 | 41.0 | 30.3 |
| Y | 8.00 | 8.00 | 8.00 |
| TL | 83.000 | 83.000 | 83.000 |
| BF | 16.990 | 19.349 | 24.587 |
| BF(Air) | 16.040 | 18.398 | 23.636 |
| (Medium 2: Water) | | | |
| f | 6.13 | 7.61 | 10.93 |
| FNo | 3.45 | 3.78 | 4.50 |
| ω | 45.2 | 38.7 | 28.7 |
| Y | 8.00 | 8.00 | 8.00 |
| TL | 83.000 | 83.000 | 83.000 |
| BF | 16.990 | 19.349 | 24.587 |
| BF(Air) | 16.040 | 18.398 | 23.636 |

[Variable distance data]

| | Upon focusing on infinity | | | Upon focusing on point-blank range | | |
|---|---|---|---|---|---|---|
| | W | M | T | W | M | T |
| (Medium 1: Air) | | | | | | |
| D0 | ∞ | ∞ | ∞ | 217.00 | 217.00 | 217.00 |
| β | — | — | — | −0.0299 | −0.0376 | −0.0545 |
| f | 7.20 | 9.25 | 13.60 | — | — | — |
| D2 | 2.000 | 5.614 | 7.898 | 2.000 | 5.614 | 7.898 |
| D9 | 5.005 | 4.620 | 3.993 | 4.352 | 3.940 | 3.296 |
| D11 | 14.481 | 8.895 | 2.000 | 15.134 | 9.576 | 2.698 |
| D23 | 12.100 | 14.458 | 19.696 | 12.100 | 14.458 | 19.696 |
| D25 | 2.100 | 2.100 | 2.100 | 2.100 | 2.100 | 2.100 |
| (Medium 2: Water) | | | | | | |
| D0 | ∞ | ∞ | ∞ | 217.00 | 217.00 | 217.00 |
| β | — | — | — | −0.0333 | −0.0406 | −0.0578 |
| f | 6.13 | 7.61 | 10.93 | — | — | — |
| D2 | 3.706 | 6.933 | 8.594 | 3.706 | 6.933 | 8.594 |
| D9 | 2.222 | 2.201 | 2.198 | 1.600 | 1.600 | 1.600 |
| D11 | 15.558 | 9.995 | 3.098 | 16.182 | 10.598 | 3.698 |
| D23 | 12.100 | 14.458 | 19.696 | 12.100 | 14.458 | 19.696 |
| D25 | 2.100 | 2.100 | 2.100 | 2.100 | 2.100 | 2.100 |

[Lens group data]
(Medium 1: Air)

| Lens group | Front end surface | Focal length |
|---|---|---|
| First lens group | 1 | 154.52 |
| Second lens group | 3 | −58.85 |
| Third lens group | 10 | −32.36 |
| Fourth lens group | 12 | 16.40 |

[Values corresponding to the conditional expressions]

Conditional expression (1) R1/Ymax = 5.410
Conditional expression (2) f2/f3 = 1.819
Conditional expression (3) R1/R2 = 0.485

Table 1 shows that in the optical system ZL1 according to Example 1 it is understandable that the conditional expressions (1) to (3) are satisfied.

Figure 2A:
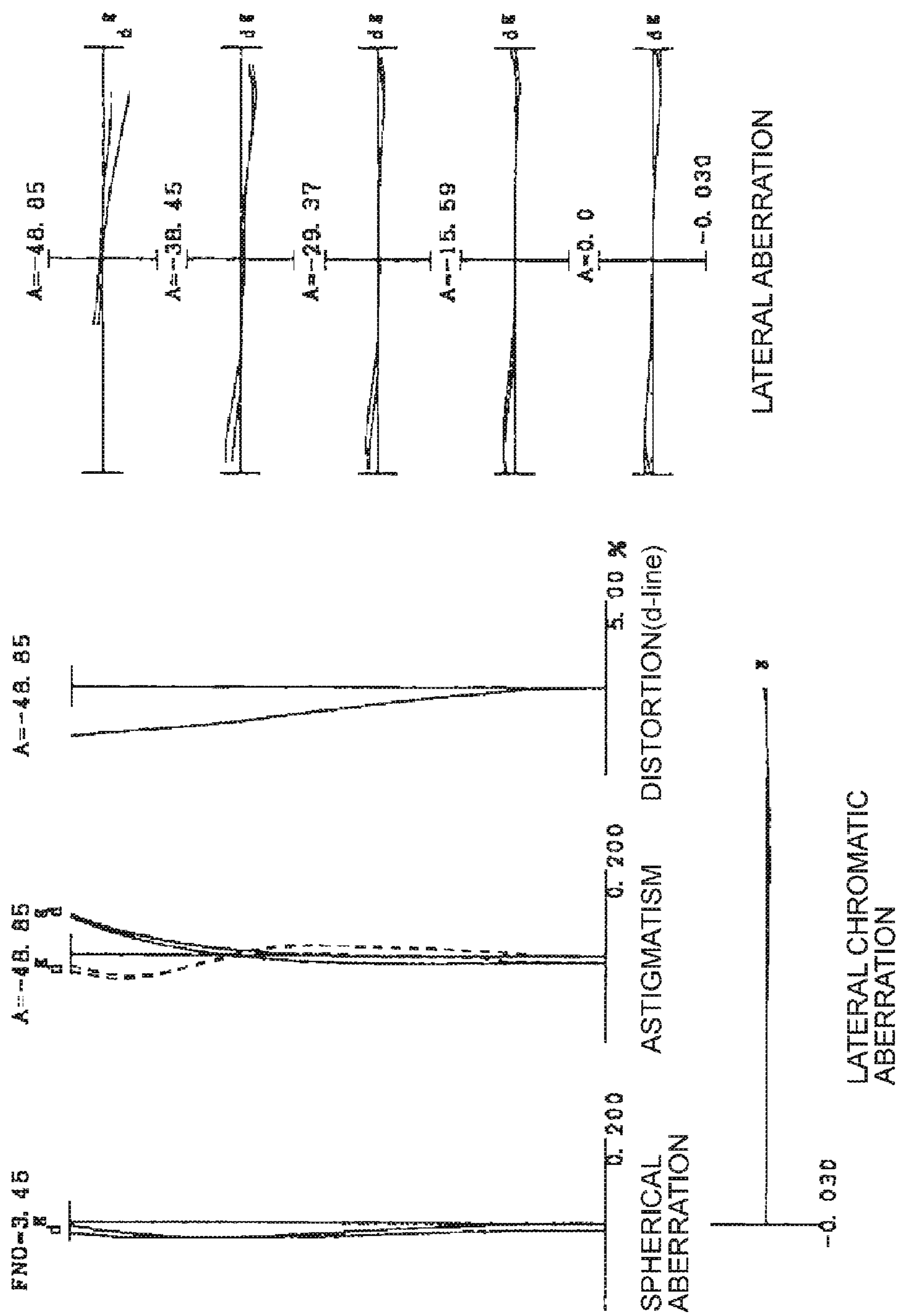
FIGS. 2A, 2B and 2C illustrate a graph showing aberrations in an infinity focusing state of the optical system according to Example 1 in case the object side medium is air, where
Figure 2B:
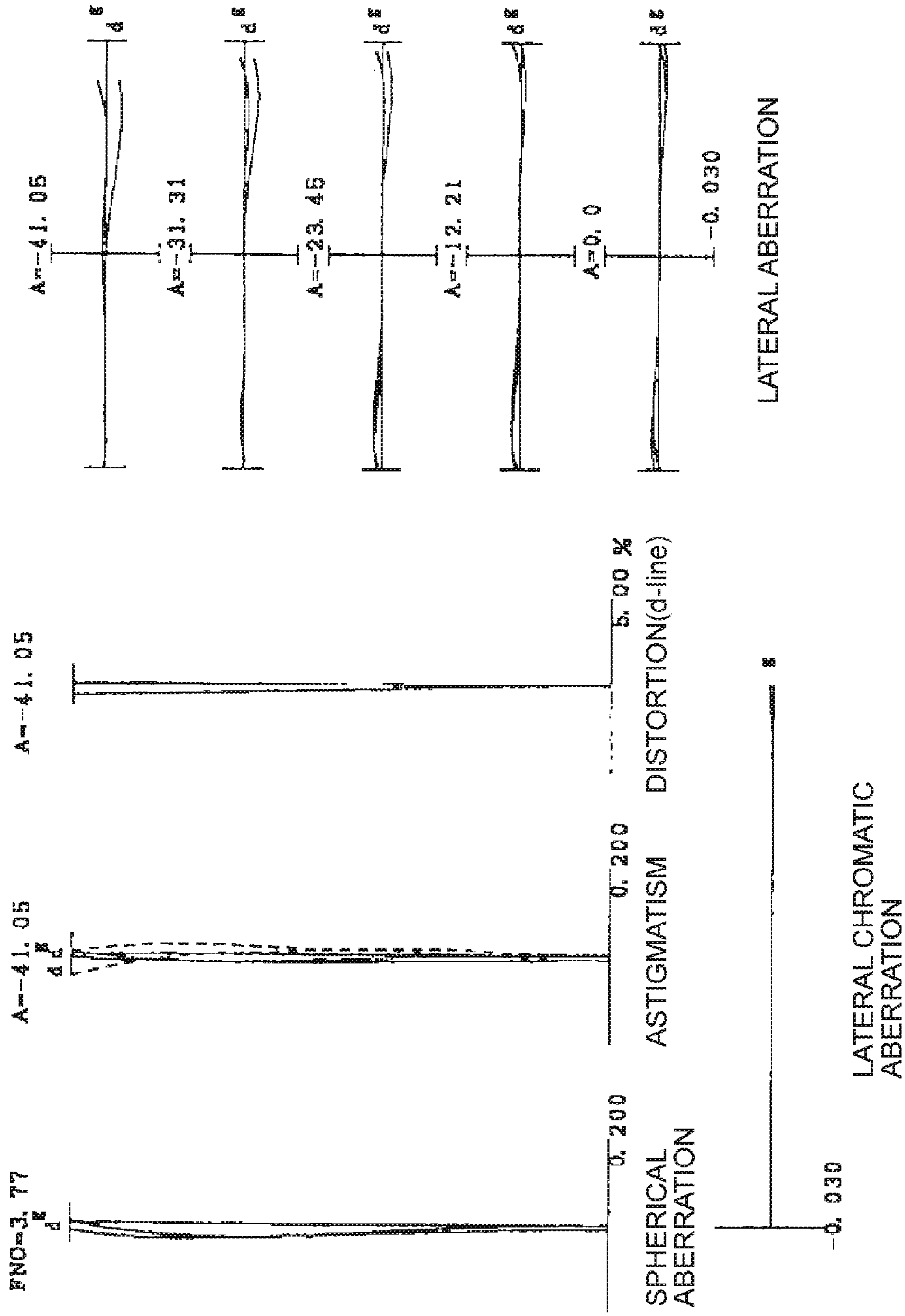
Figure 2C:
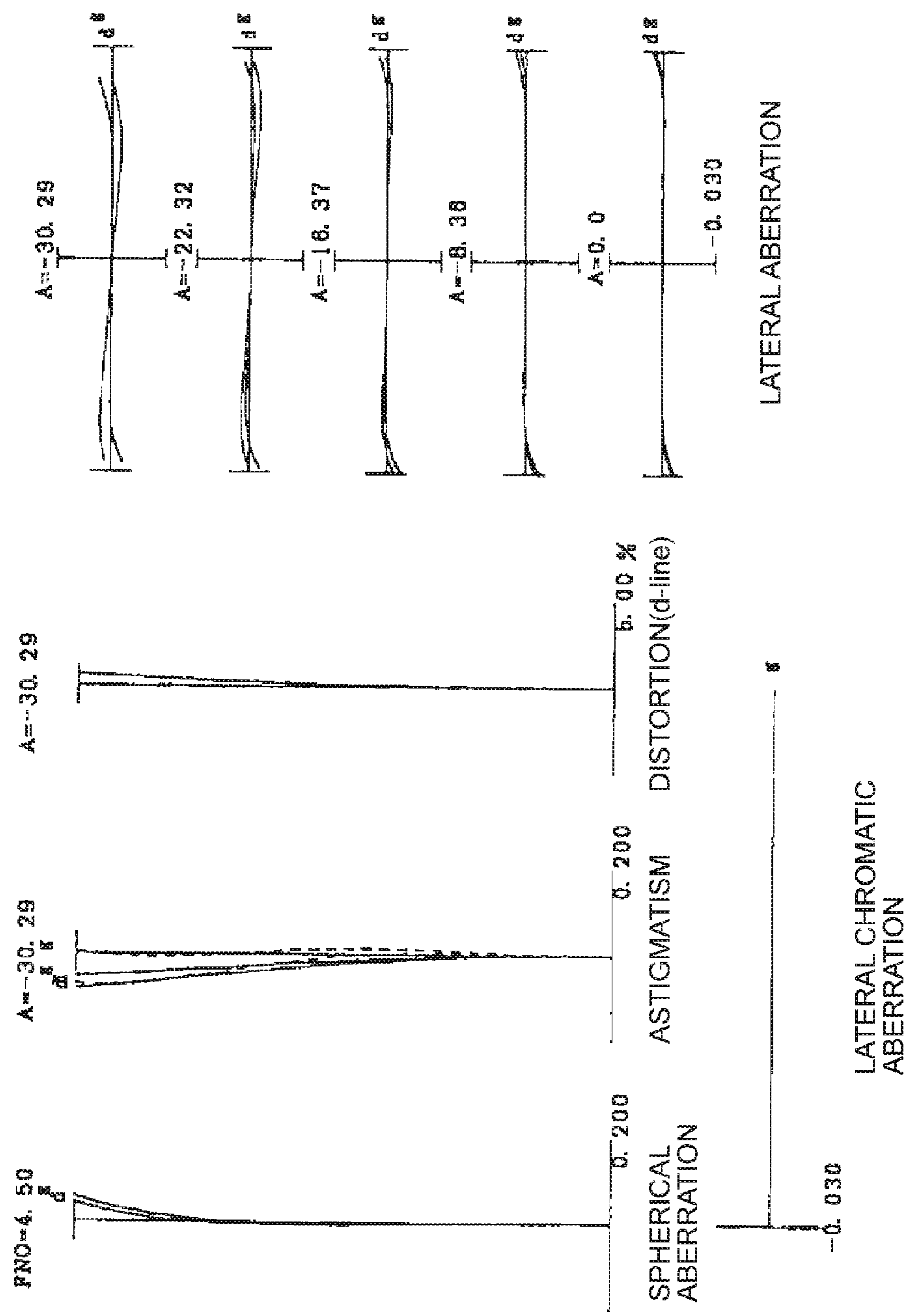
Figure 3A:
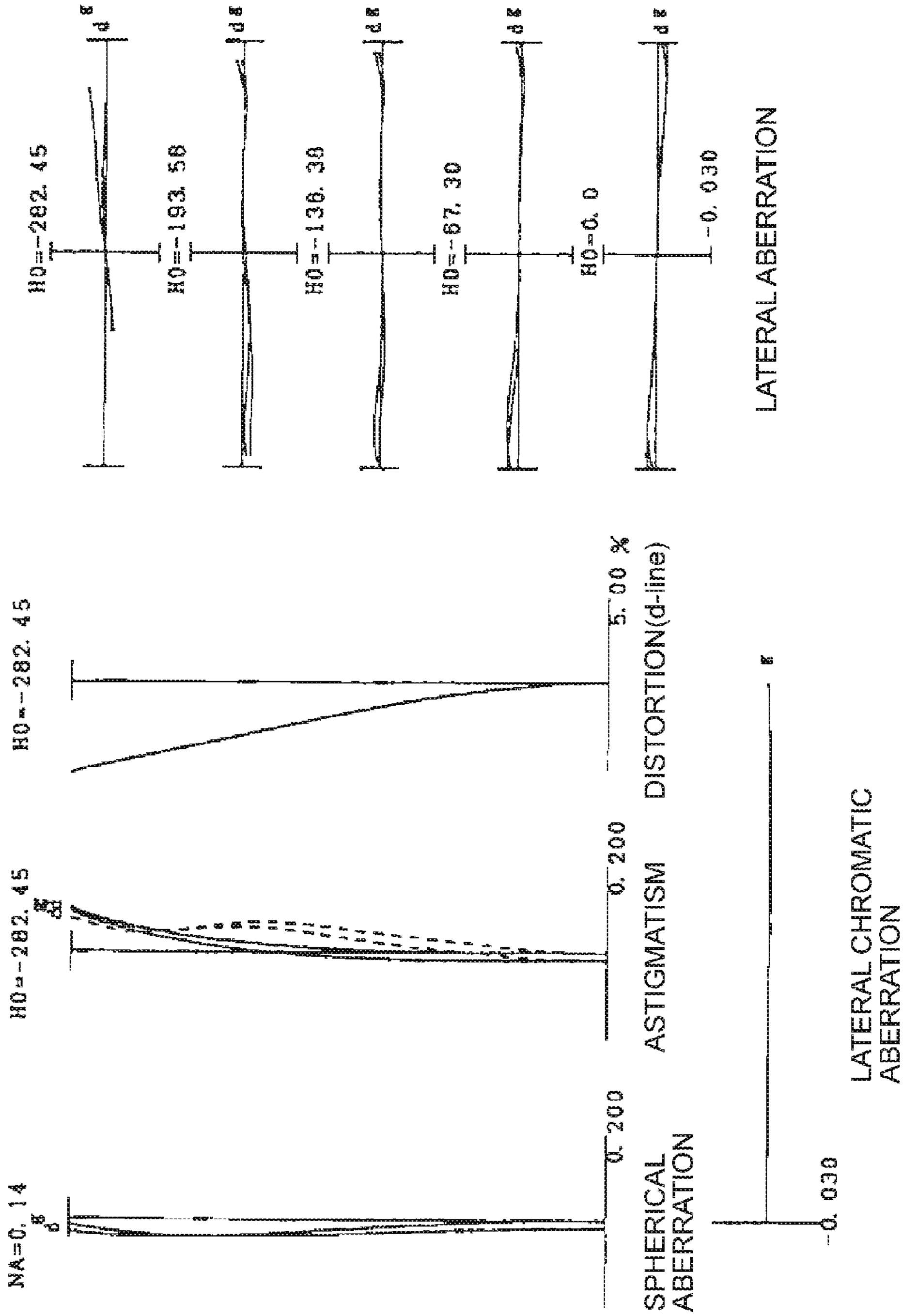
FIGS. 3A, 3B and 3C illustrate a graph showing aberrations in a point-blank range focusing state of the optical system according to Example 1 in case the object side medium is air, where
Figure 3B:
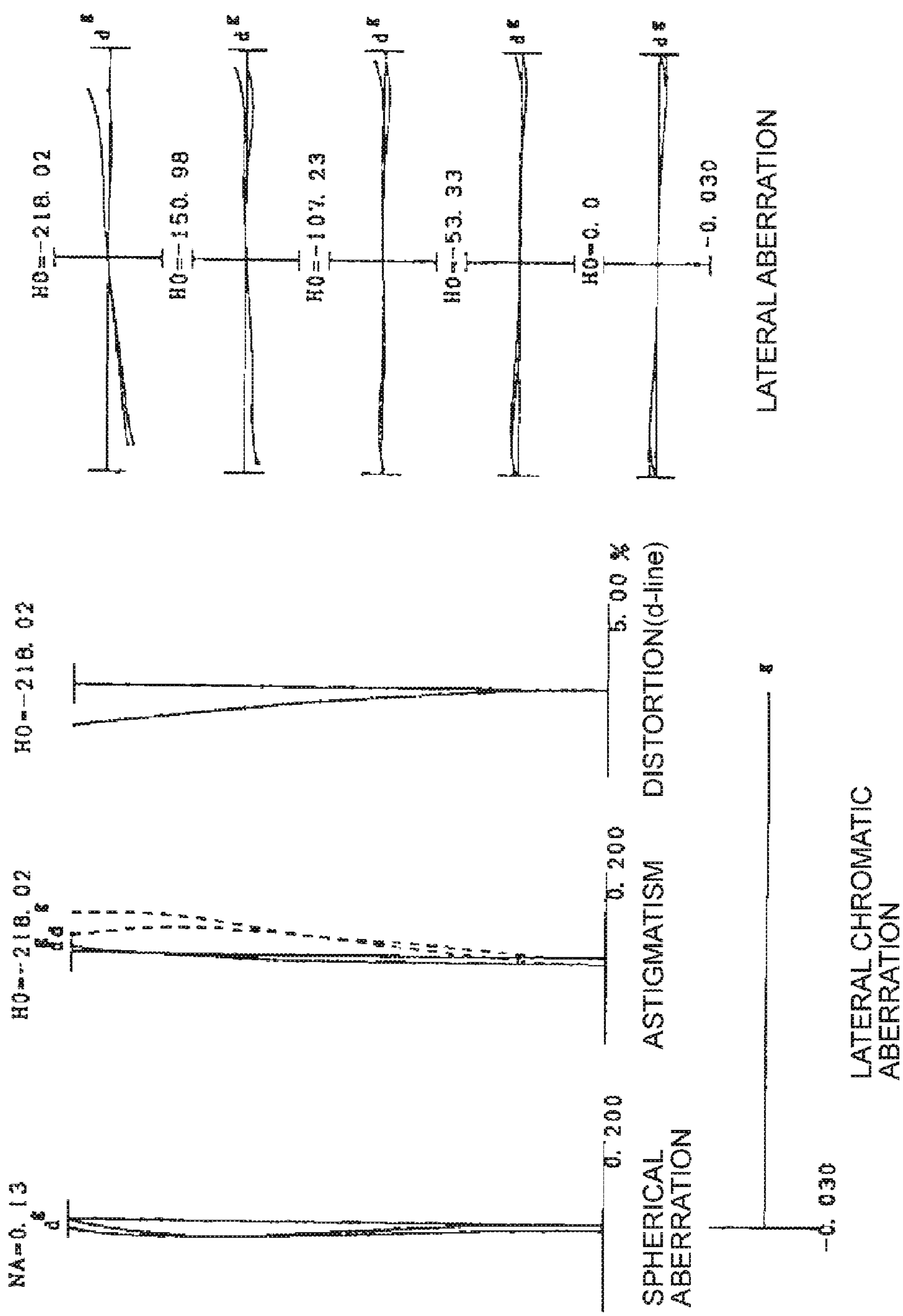
Figure 3C:
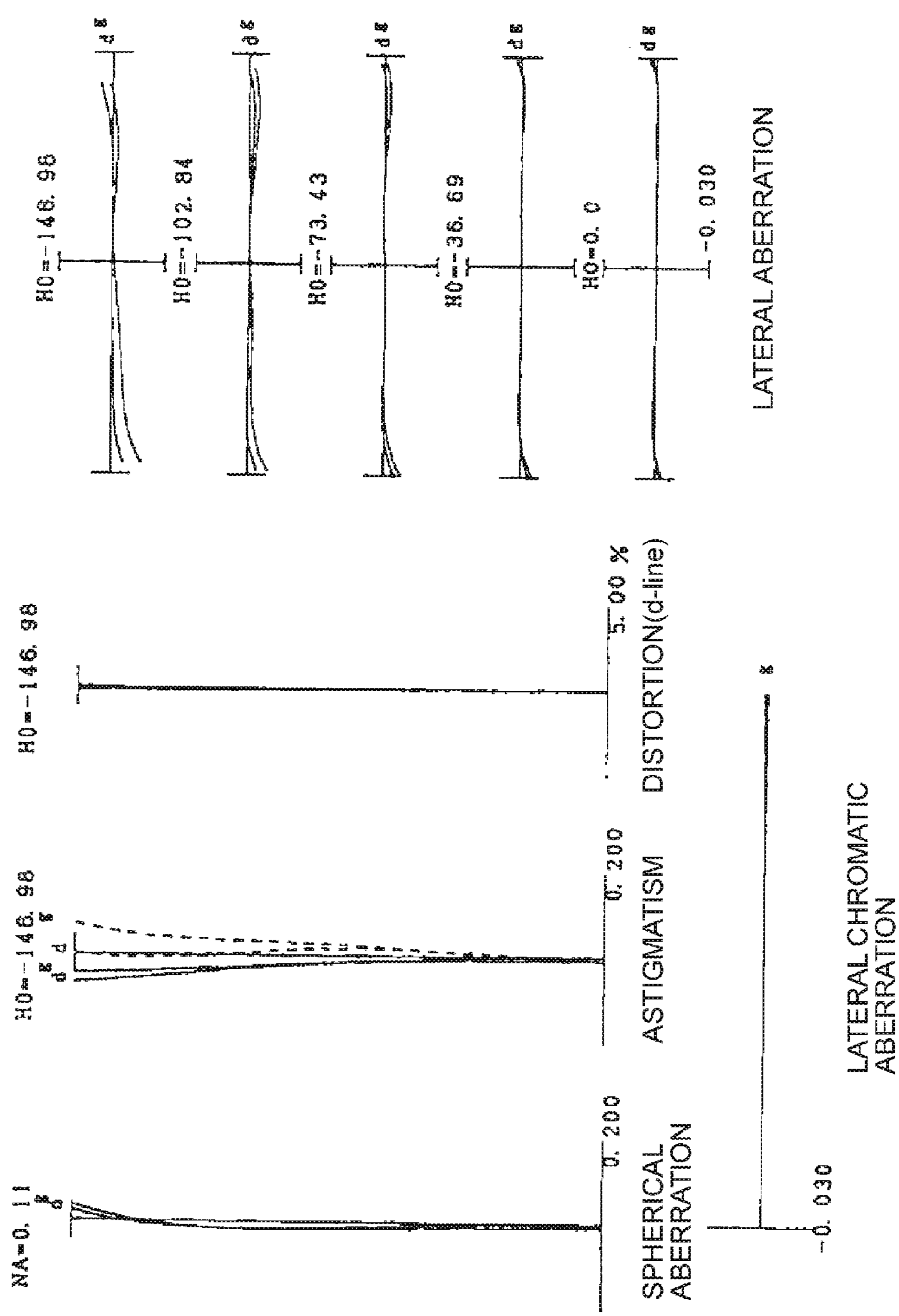
Figure 5A:
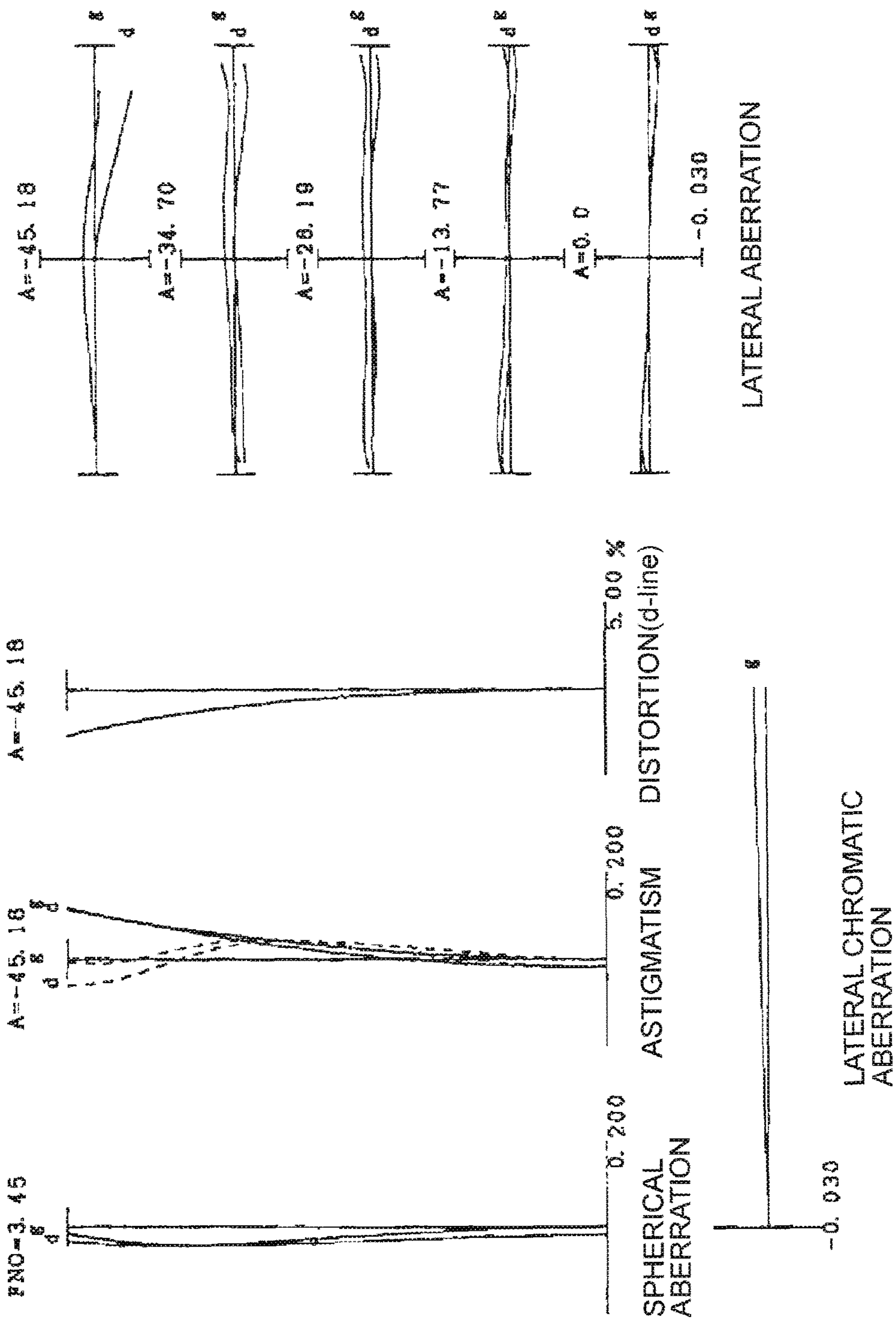
FIGS. 5A, 5B and 5C illustrate a graph showing aberrations in an infinity focusing state of the optical system according to Example 1 in case the object side medium is water, where
Figure 5B:
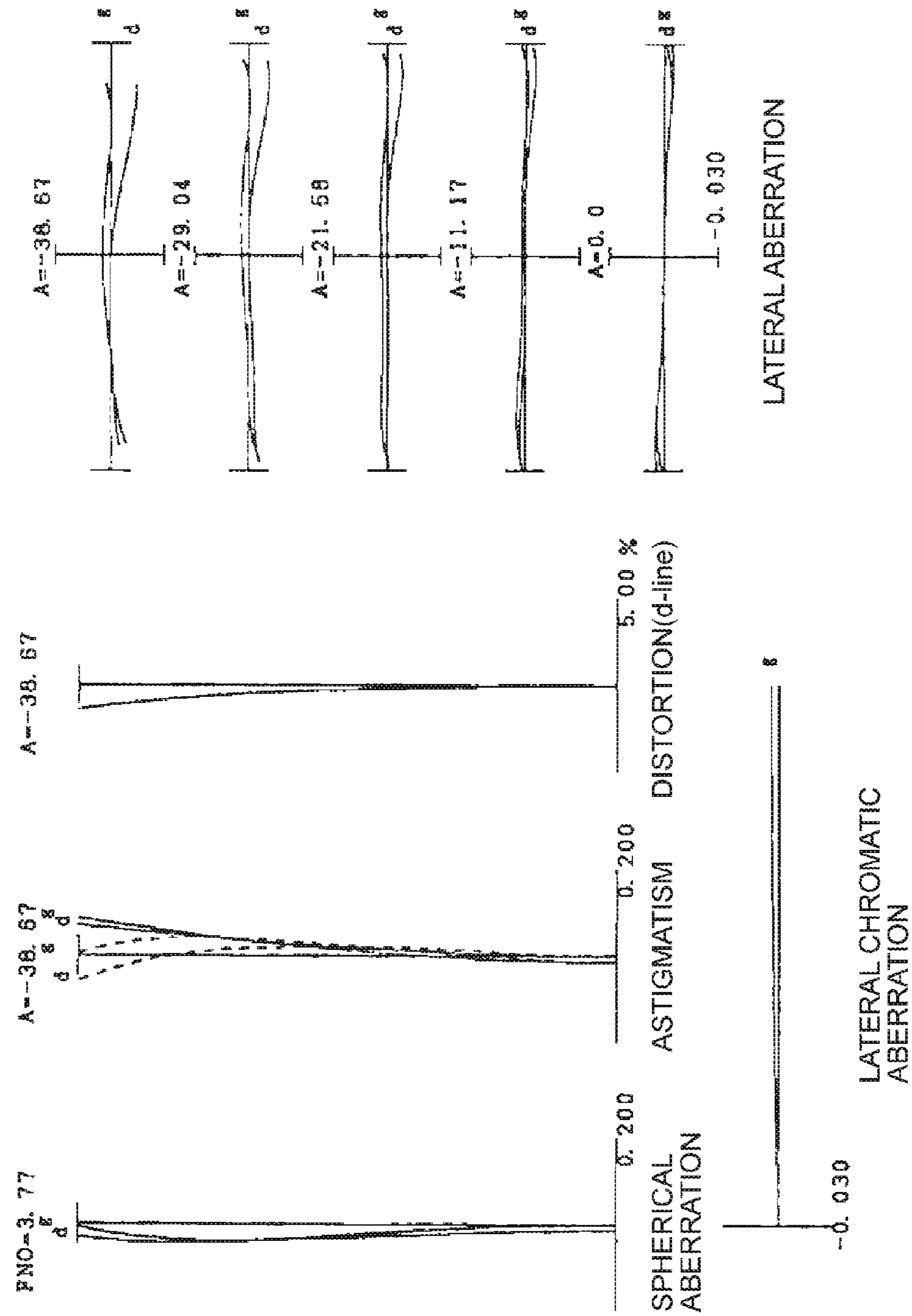
Figure 5C:
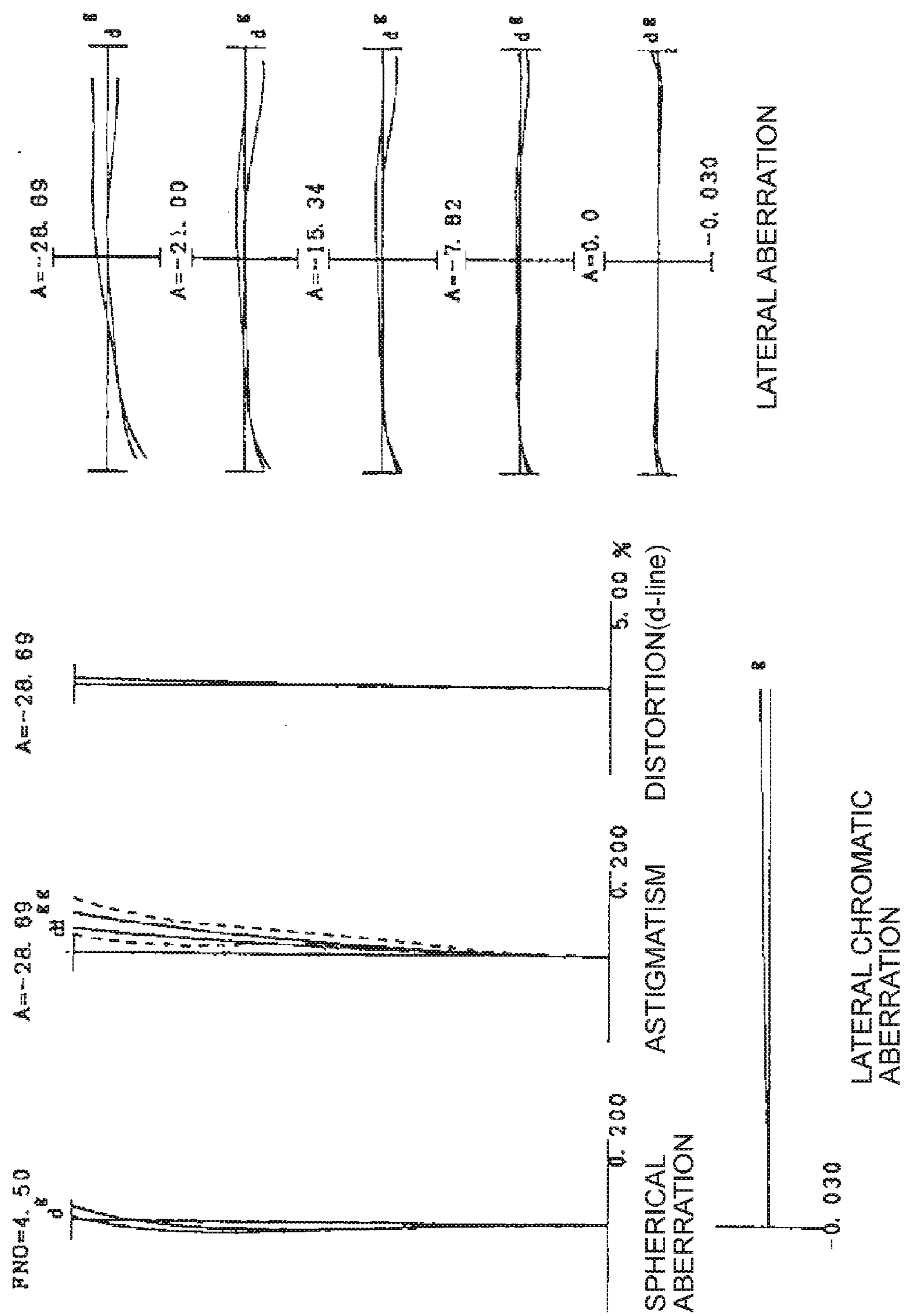
Figure 6A:
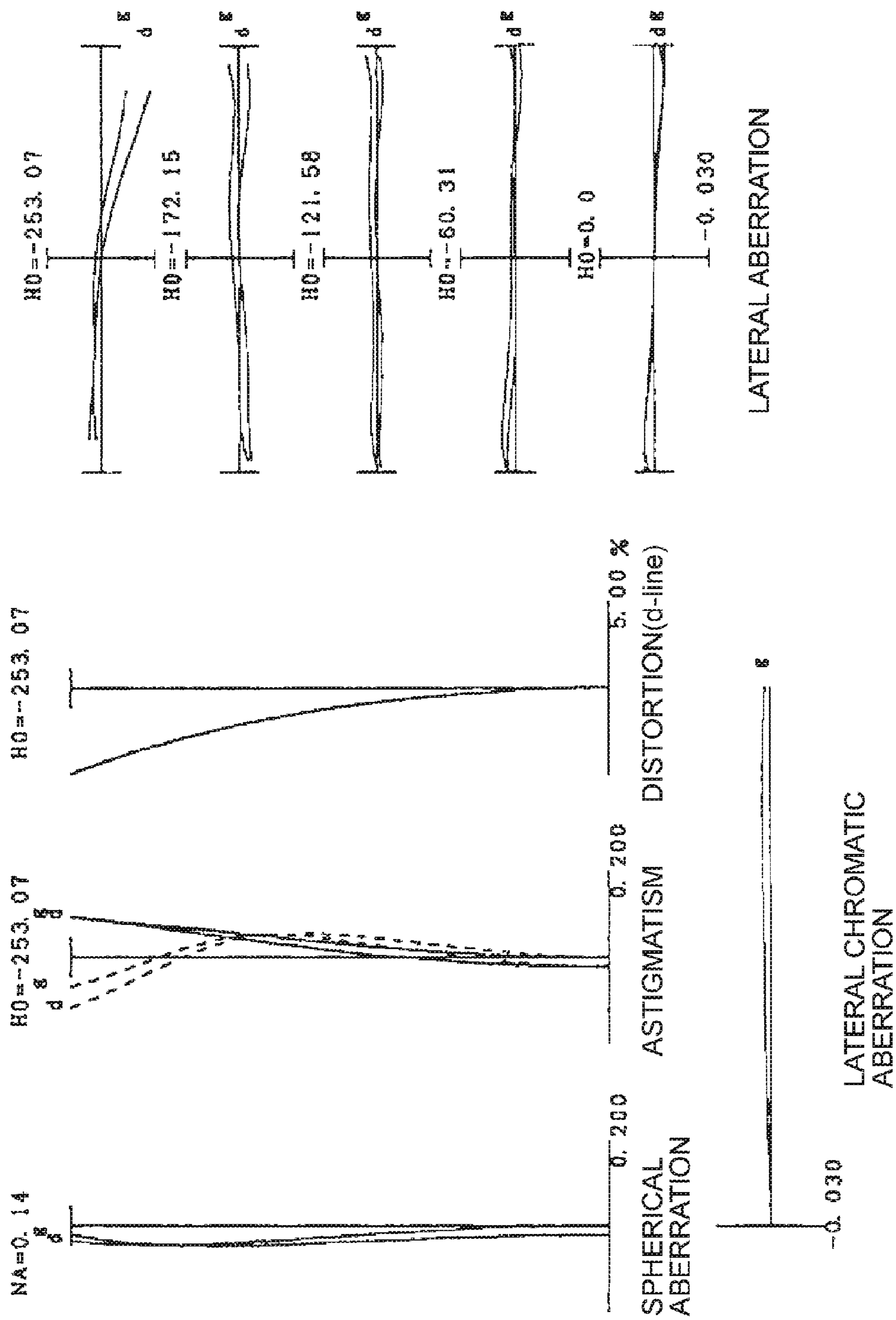
FIGS. 6A, 6B and 6C illustrate a graph showing aberrations in a point-blank range focusing state of the optical system according to Example 1 in case the object side medium is water.
Figure 6B:
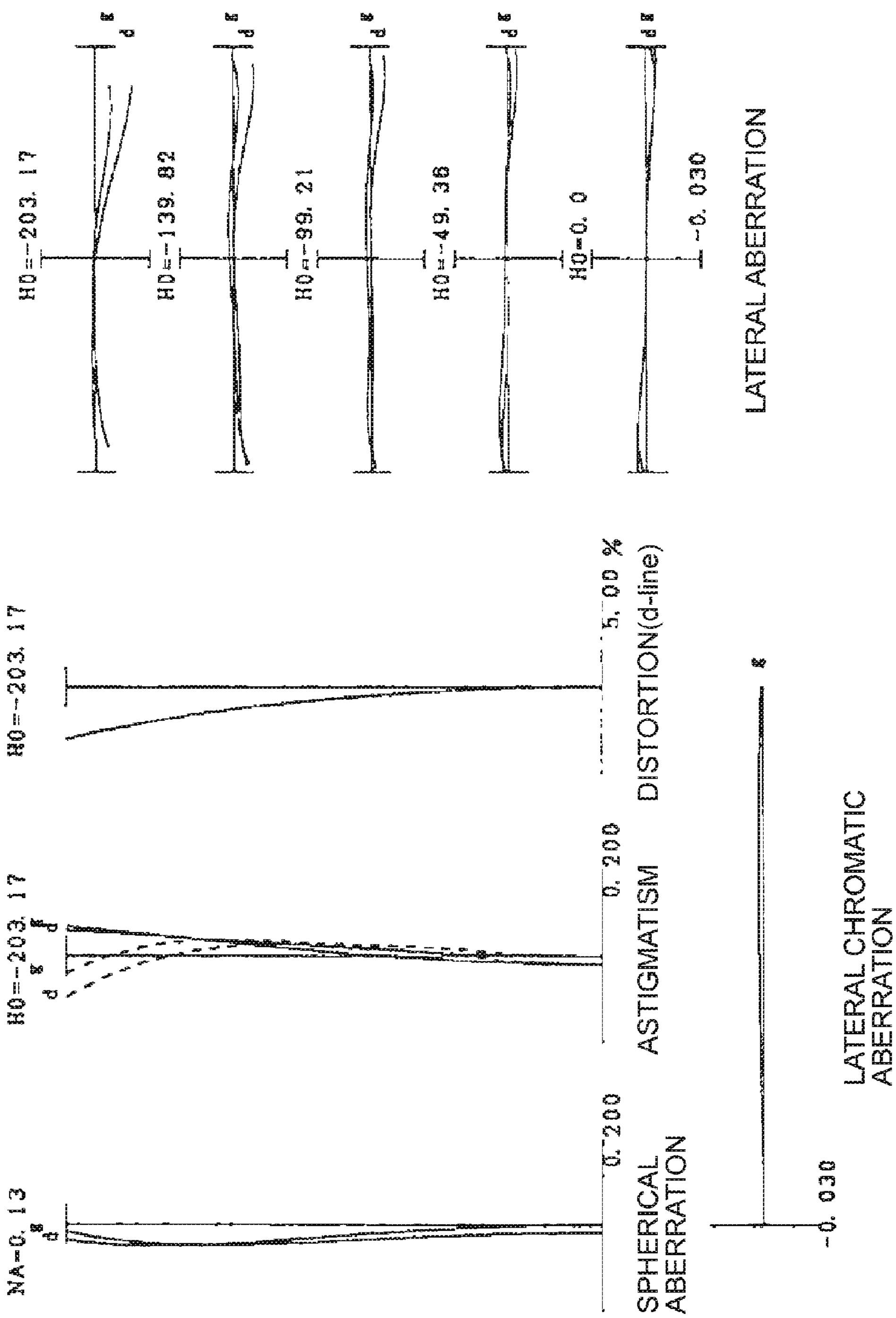
Figure 6C:
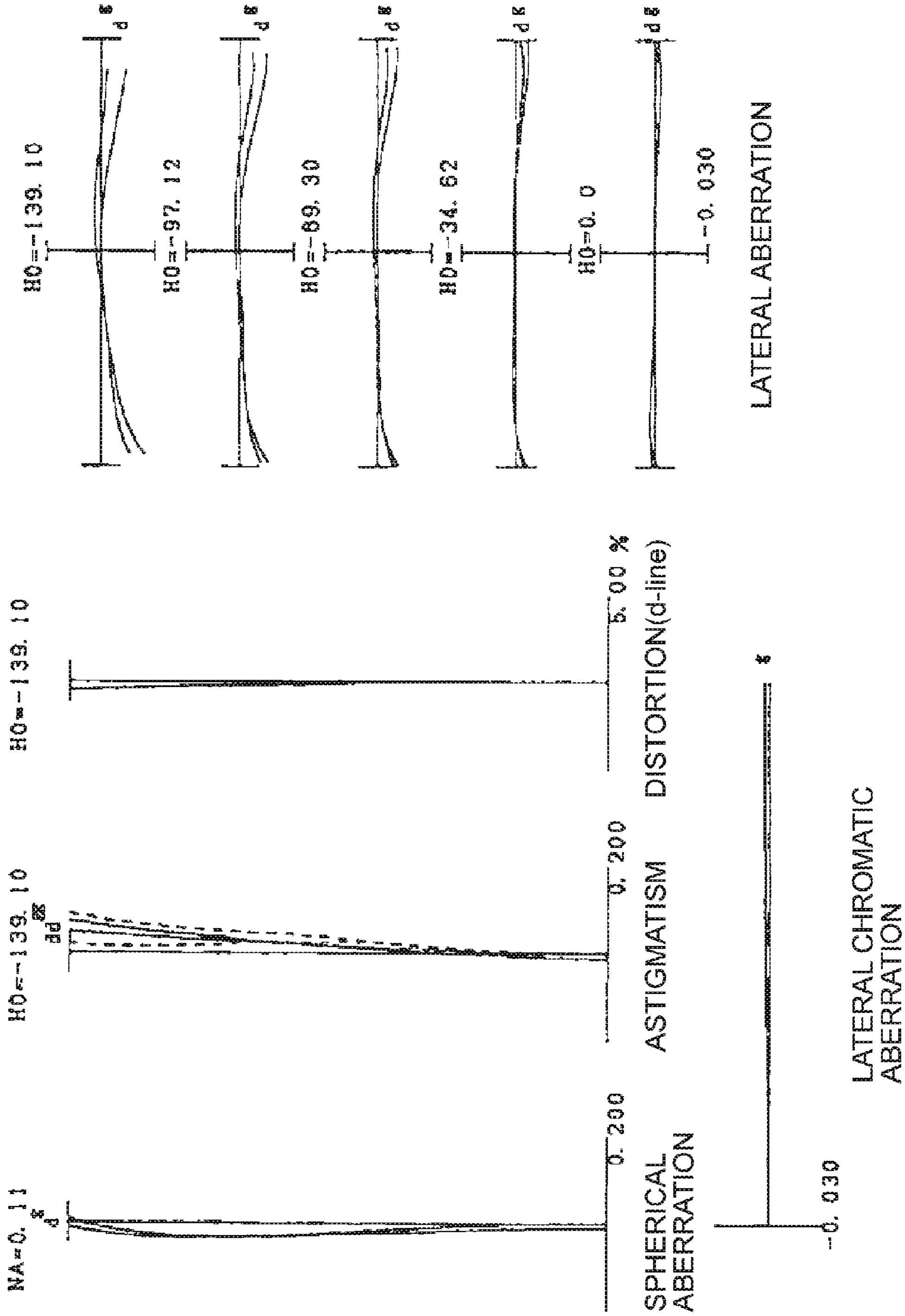

FIGS. 2A, 2B and 2C illustrate a graph showing various aberrations (aspherical aberration, astigmatism, distortion, chromatic aberration of magnification, and lateral aberration) in an infinity focusing state of the optical system ZL1 according to Example 1 in case the object side medium is air, where FIG. 2A depicts a wide-angle end state, FIG. 2B depicts an intermediate focal length state, and FIG. 2C depicts a telephoto end state. FIGS. 3A, 3B and 3C illustrate a graph showing various aberrations in a point-blank range focusing state of the optical system ZL1 according to Example 1 in case the object side medium is air, where FIG. 3A depicts a wide-angle end state, FIG. 3B depicts an intermediate focal length state, and FIG. 3C depicts a telephoto end state. FIGS. 5A, 5B and 5C illustrate a graph showing aberrations in an infinity focusing state of the optical system ZL1 according to Example 1 in case the object side medium is water, where FIG. 5A depicts a wide-angle end state, FIG. 5B depicts an intermediate focal length state, and FIG. 5C depicts a telephoto end state. FIGS. 6A, 6B and 6C illustrate a graph showing aberrations in a point-blank range focusing state of the optical system ZL1 according to Example 1 in case the object side medium is water, and FIG. 6A depicts a wide-angle end state, FIG. 6B depicts an intermediate focal length state, and FIG. 6C depicts a telephoto end state.

In each graph showing aberrations, FNO means a f number, NA means a numerical aperture, A means a half angle of view to each image height (unit: degree), and H0 means an object height. d means an aberration of d-line, g means an aberration of g-line. Moreover, what are described without those mean aberrations of d-line. However, in a graph showing spherical aberration upon focusing on infinity this means a value of the f number corresponding to the maximum aperture. In a graph showing spherical aberration upon focusing on a point-blank range means a value of the numerical aperture corresponding to the maximum aperture. In a graph showing astigmatism, a solid-line means a sagittal image surface, and a dashed-line means a meridional image surface.

Also in a graph showing aberration in each example mentioned below, the same reference signs as the present example are used.

According to each graph showing aberrations in FIGS. 2A, 2B and 2C, FIGS. 3A, 3B and 3C, FIGS. 5A, 5B and 5C and FIGS. 6A, 6B and 6C, in the optical system ZL1 according to Example 1, it is possible to appropriately correct, regardless of the object side medium, various aberrations in any imaging states covering a range from a wide-angle end state to a telephoto end state and a range from an infinity focusing state to a point-blank focusing state, and have good optical performance.

EXAMPLE 2

Figure 7:
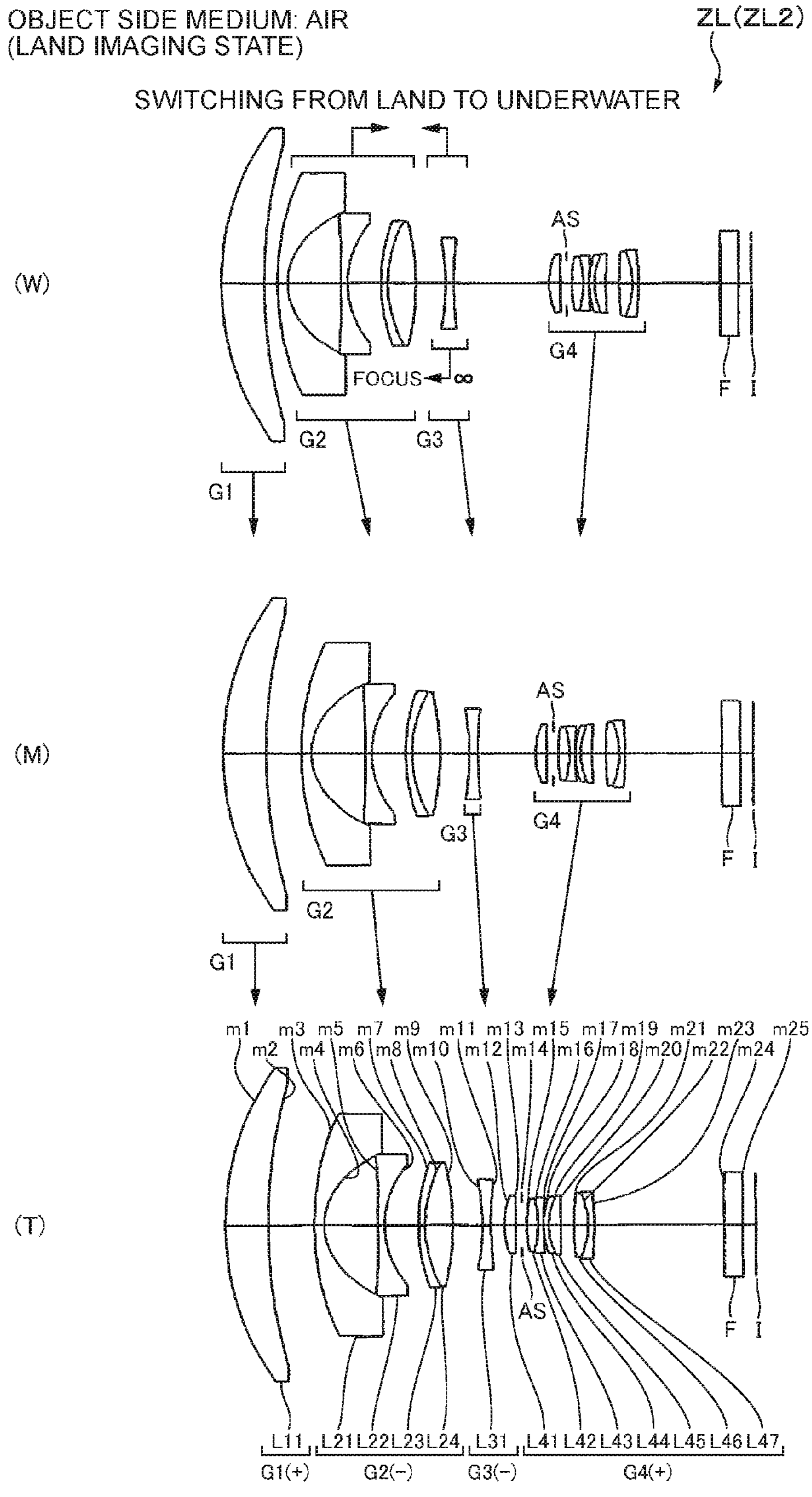
FIG. 7 illustrates a sectional view showing the lens configuration of the optical system according to Example 2 in case the object side medium is air, and a diagram showing the moving locus of each group from a wide-angle end state (W) to a telephoto end state (T) through an intermediate focal length state (M).
Figure 9A:
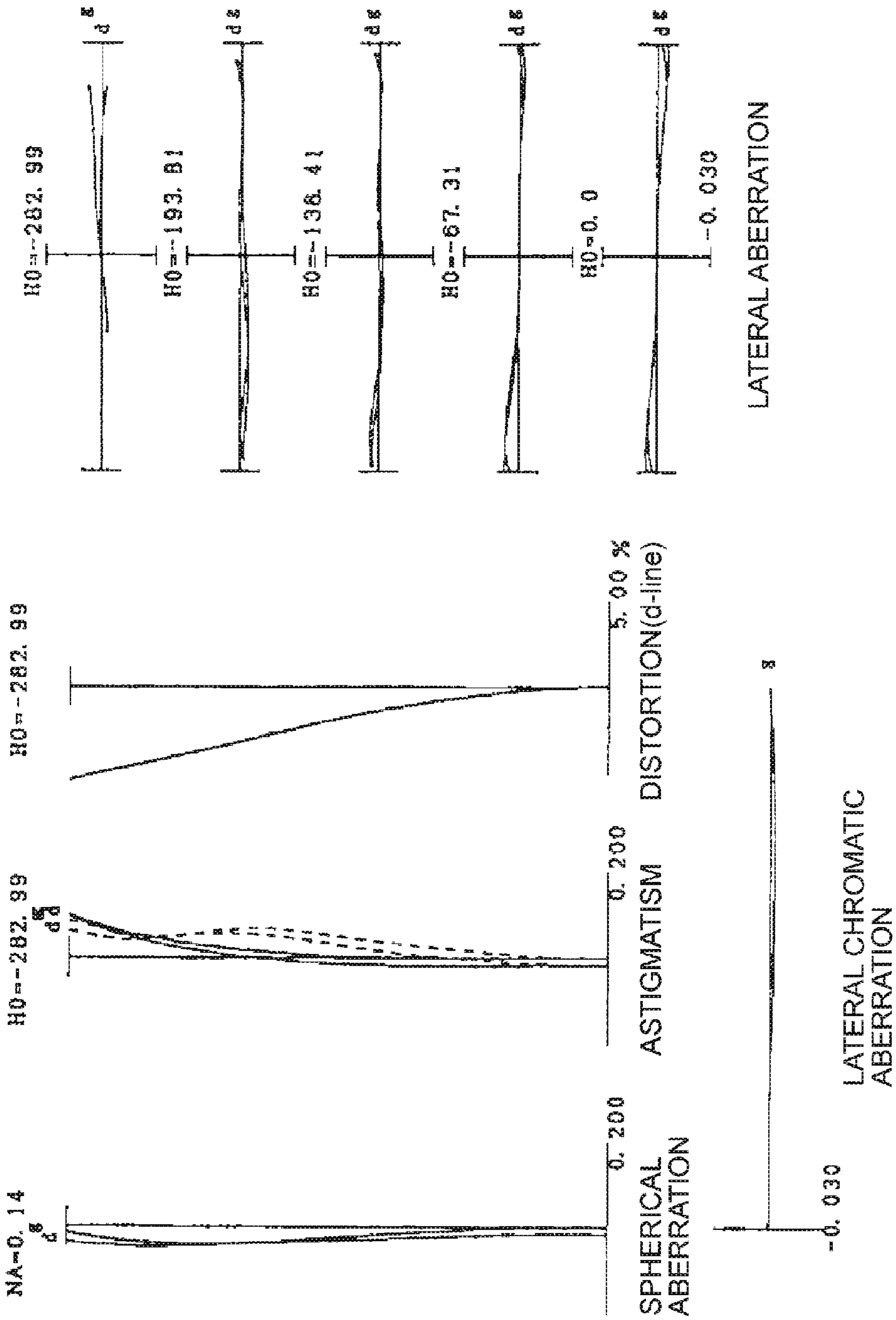
FIGS. 9A, 9B and 9C illustrate a graph showing aberrations in a point-blank range focusing state of the optical system according to Example 2 in case the object side medium is air.
Figure 9B:
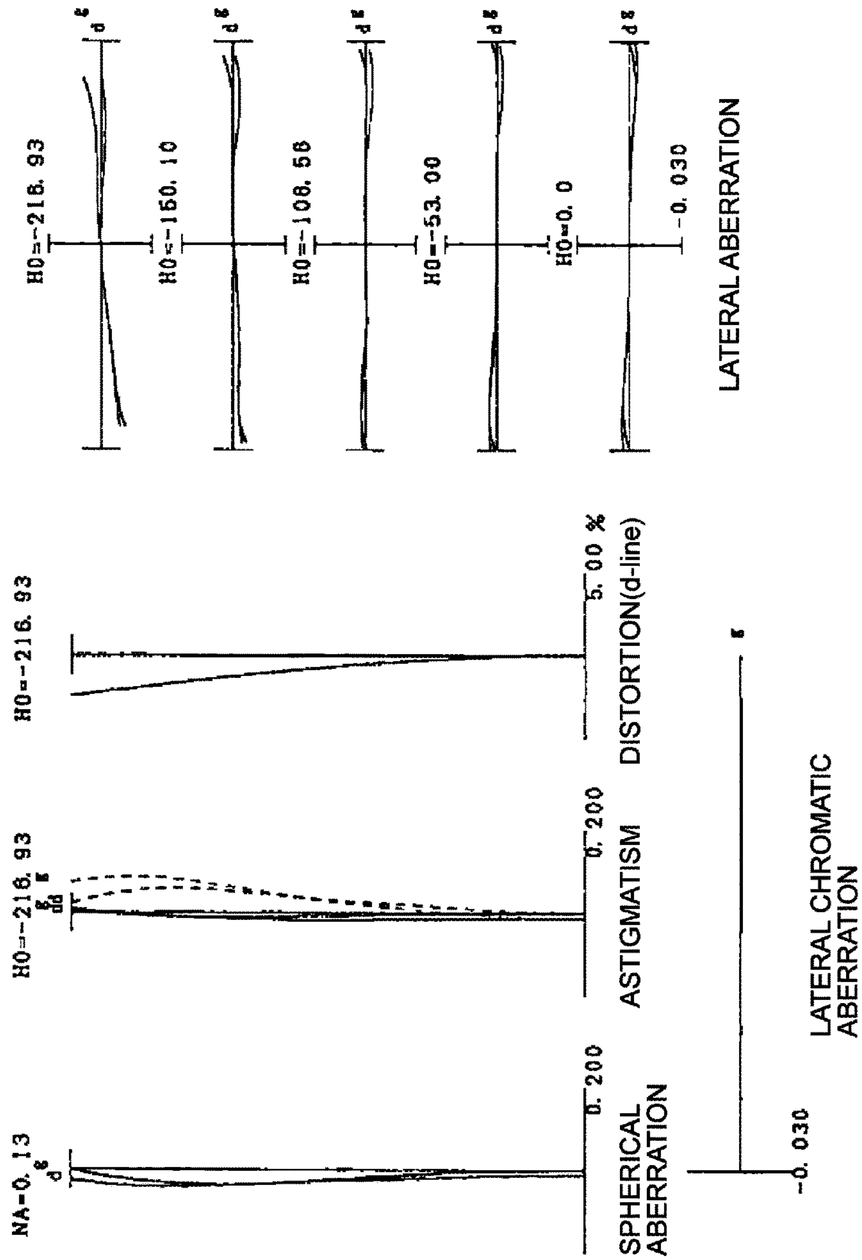
Figure 9C:
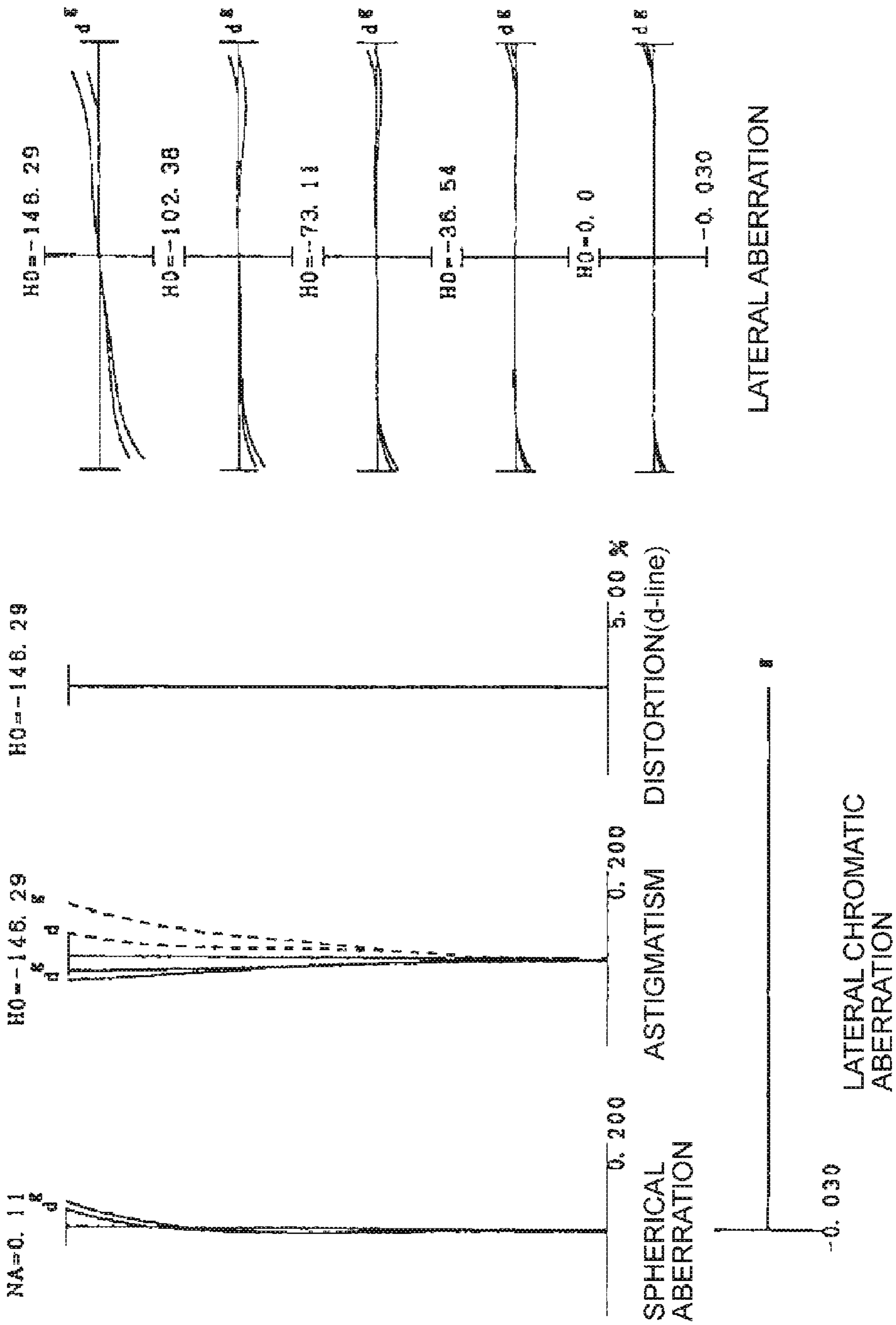
Figure 10:
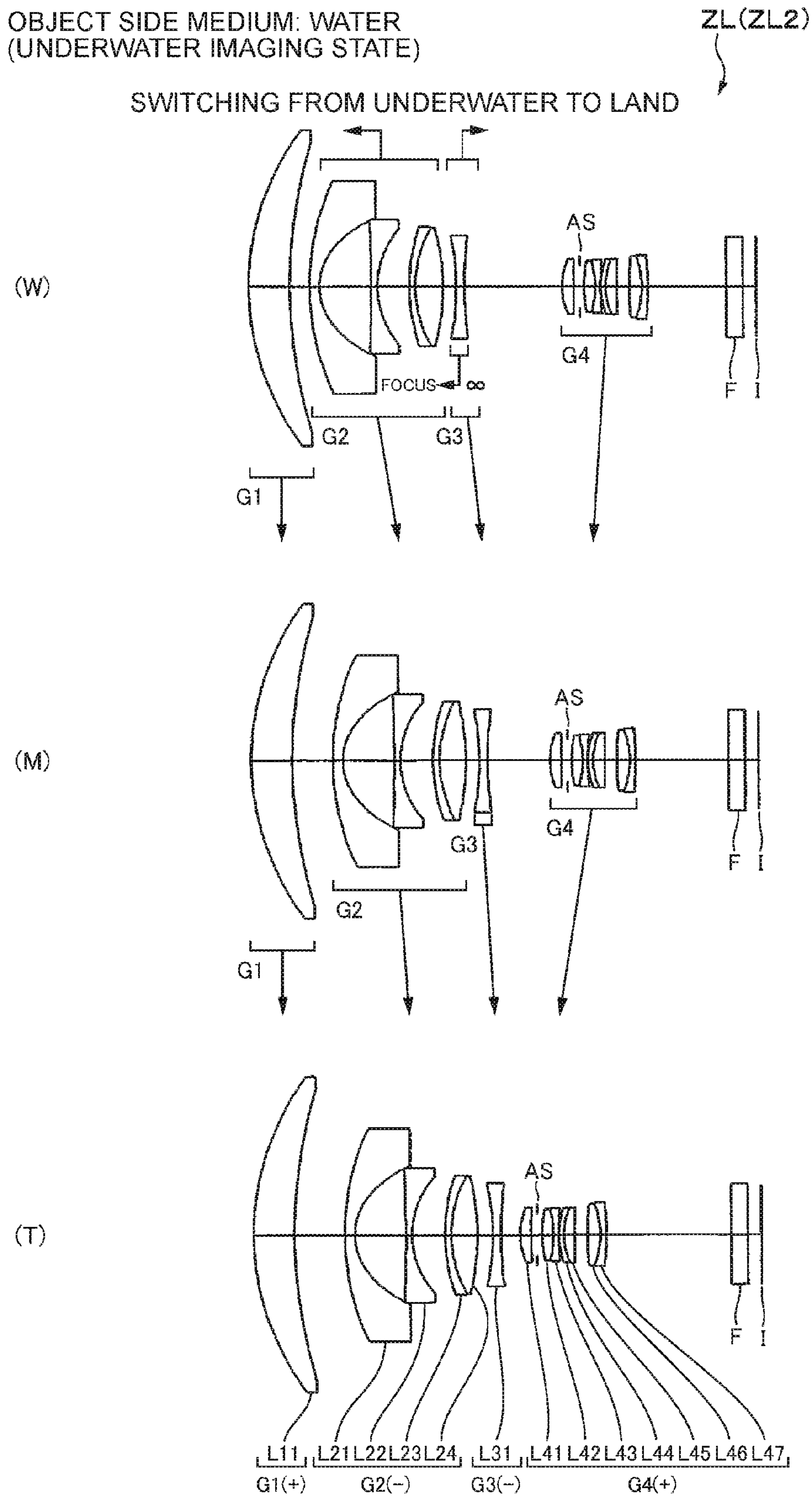
FIG. 10 illustrates a sectional view showing the lens configuration of the optical system according to Example 2 in case the object side medium is water, and a diagram showing the moving locus of each group from a wide-angle end state (W) to a telephoto end state (T) through an intermediate focal length state (M).

Example 2 is described with reference to FIG. 7 to FIGS. 12A, 12B and 12C, and Table 2. An optical system ZL (ZL2) according to the present example is an optical system capable of imaging in two object side media whose refractive indexes are different from each other. Note that the object side medium of a low refractive index is "air," while the object side medium of a high refractive index is "water." FIG. 7 illustrates a sectional view showing a lens configuration of the optical system according to Example 2 in case the object side medium is air (land imaging state). FIG. 10 illustrates a sectional view showing a lens configuration of the optical system according to Example 2 in case the object side medium is water (underwater imaging state).

The optical system ZL2 according to Example 2 is composed of, as shown in FIG. 7 and FIG. 10, in order from an object, a first lens group G1 having positive refractive power, a second lens group G2 having negative refractive power, a third lens group G3 having negative refractive power, and a fourth lens group G4 having positive refractive power.

The first lens group G1 is composed of a positive meniscus lens L11 having a convex surface facing the object.

The second lens group G2 is composed of, in order from the object, a negative meniscus lens L21 having a concave surface facing the image, a biconcave lens L22, and a cemented lens composed of a negative meniscus lens L23 having a concave surface facing the image and a biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from the object, a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens composed of a biconvex lens L46 and a negative meniscus lens L47 having a concave surface facing the object. The image side surface of the negative meniscus lens L47 is an aspherical surface.

A filter group F is disposed on the image side of the fourth lens group G4. The filter group F is composed of a low-pass filter for cutting a spatial frequency more than a marginal dissector of image sensors such as a CCD disposed on the image surface I, and a CMOS, a cover-glass of an image sensor, etc.

The image surface I is formed on the image sensor configured with unillustrated CCDs, CMOSs, etc.

A position of the first lens group G1 on the optical axis fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state) and it is in the infinity focusing state, the second lens group G2 and the third lens group G3 are independently moved upon zooming. In case the object side medium is water (underwater imaging state), the second lens group G2 and the third lens group G3 are independently moved upon zooming. Moreover, in case the object side medium is any one of air and water (also in any one of the land underwater imaging states), the fourth lens group G4 is moved upon zooming so that the same locus is drawn.

Upon focusing on from infinity to a point-blank range object, the third lens group G3 is moved to the object side.

When changing the object side media, the second lens group G2 and the third lens group G3 are independently moved on the optical axis. When changing the object side media, for example, from air (land imaging state) having a low refractive index medium to water (underwater imaging state) having a high refractive index medium, as shown in FIG. 7, the second lens group G2 is moved to the image side, and the third lens group G3 is moved to the object side. Moreover, when changing the object side media from water (underwater imaging state) having a high refractive index medium to air (land imaging state) having a low refractive index medium, as shown in FIG. 10, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes upon zooming and when changing the object side media. The distance between the second lens group G2 and the third lens group G3 is constant only upon zooming in an infinity focusing state in case the object side medium is air (land imaging state), and changes upon zooming in an underwater imaging state and when changing the object side media. The distance between the third lens group G3 and the fourth lens group G4 changes upon zooming and when changing the object side media.

The following Table 2 illustrates values of each general data in Example 2. The surface numbers 1 to 25 in Table 2 correspond to each optical surface of m1 to m25 shown in FIG. 7.

TABLE 2

[Object side medium]

| | |
|---|---|
| Medium 1: Air | n(d) = 1.00000 |
| Medium 2: Water | n(d) = 1.33306, νd = 54.0 |

[Lens data]

| Surface number | R | D | n(d) | νd |
|---|---|---|---|---|
| 1 | 42.86279 | 6.623 | 1.51680 | 63.9 |
| 2 | 80.46615 | (D2) | 1.00000 | |
| 3 | 41.29624 | 1.600 | 1.69412 | 53.4 |
| *4 | 9.29586 | 8.419 | 1.00000 | |
| 5 | −210.43639 | 1.000 | 1.77387 | 47.2 |
| *6 | 14.49349 | 5.260 | 1.00000 | |
| 7 | 29.42743 | 1.000 | 1.49782 | 82.6 |
| 8 | 19.95586 | 4.356 | 1.83400 | 37.2 |
| 9 | −38.99901 | (D9) | 1.00000 | |
| 10 | −39.61122 | 1.350 | 1.80400 | 46.6 |
| 11 | 67.83388 | (D11) | 1.00000 | |
| 12 | 11.38442 | 1.804 | 1.51680 | 63.9 |
| 13 | 291.35906 | 1.000 | 1.00000 | |
| 14 | (Aperture stop AS) | 0.800 | 1.00000 | |
| 15 | 24.44322 | 1.809 | 1.49782 | 82.6 |
| 16 | −15.36848 | 0.800 | 1.74400 | 44.8 |
| 17 | 32.86180 | 0.100 | 1.00000 | |
| 18 | 13.06986 | 0.800 | 1.85026 | 32.4 |
| 19 | 10.13338 | 1.847 | 1.51680 | 63.9 |
| 20 | 142.93022 | 2.117 | 1.00000 | |
| 21 | 48.70449 | 2.156 | 1.49782 | 82.6 |
| 22 | −12.73084 | 1.000 | 1.77387 | 47.2 |
| *23 | −32.51804 | (D23) | 1.00000 | |
| 24 | 0.00000 | 2.790 | 1.51680 | 64.1 |
| 25 | 0.00000 | (D25) | 1.00000 | |

[Aspheric surface data]

| Surface | κ | A4 | A6 | A8 | A10 |
|---|---|---|---|---|---|
| 4 | −1.14130e+00 | 2.62319e−04 | −9.56800e−07 | 8.86436e−09 | −2.40962e−11 |
| 6 | −4.22670e+00 | 2.18331e−04 | −1.38641e−06 | 1.06850e−08 | −3.52491e−11 |
| 23 | 7.54800e−01 | 1.99760e−04 | 5.90524e−07 | 4.37715e−08 | −5.38847e−10 |

[Various data]

| | W | M | T |
|---|---|---|---|
| (Medium 1: Air) | | | |
| f | 7.20 | 9.30 | 13.60 |
| FNo | 3.46 | 3.80 | 4.53 |
| ω | 48.9 | 40.9 | 30.3 |
| Y | 8.00 | 8.00 | 8.00 |
| TL | 83.000 | 83.000 | 83.000 |
| BF | 17.597 | 20.070 | 25.396 |
| BF(Air) | 16.646 | 19.119 | 24.445 |
| (Medium 2: Water) | | | |
| f | 6.09 | 7.62 | 10.97 |
| FNo | 3.46 | 3.80 | 4.53 |
| ω | 45.4 | 38.6 | 28.6 |

TABLE 2-continued

| | | | |
|---|---|---|---|
| Y | 8.00 | 8.00 | 8.00 |
| TL | 83.000 | 83.000 | 83.000 |
| BF | 17.597 | 20.070 | 25.396 |
| BF(Air) | 16.646 | 19.119 | 24.445 |

[Variable distance data]

| | Upon focusing on infinity | | | Upon focusing on point-blank range | | |
|---|---|---|---|---|---|---|
| | W | M | T | W | M | T |
| (Medium 1: Air) | | | | | | |
| D0 | ∞ | ∞ | ∞ | 217.00 | 217.00 | 217.00 |
| β | — | — | — | −0.0299 | −0.0378 | −0.0548 |
| f | 7.20 | 9.30 | 13.60 | — | — | — |
| D2 | 2.000 | 5.472 | 7.160 | 2.000 | 5.472 | 7.160 |
| D9 | 4.604 | 4.604 | 4.604 | 3.943 | 3.922 | 3.916 |
| D11 | 14.958 | 9.016 | 2.000 | 15.619 | 9.699 | 2.690 |
| D23 | 12.710 | 15.183 | 20.506 | 12.710 | 15.183 | 20.506 |
| D25 | 2.097 | 2.097 | 2.097 | 2.097 | 2.097 | 2.097 |
| (Medium 2: Water) | | | | | | |
| D0 | ∞ | ∞ | ∞ | 217.00 | 217.00 | 217.00 |
| β | — | — | — | −0.0331 | −0.0407 | −0.0582 |
| f | 6.09 | 7.62 | 10.97 | — | — | — |
| D2 | 3.320 | 6.715 | 8.201 | 3.320 | 6.715 | 8.201 |
| D9 | 2.217 | 2.271 | 2.472 | 1.600 | 1.673 | 1.881 |
| D11 | 16.026 | 10.105 | 3.087 | 16.643 | 10.703 | 3.681 |
| D23 | 12.710 | 15.183 | 20.506 | 12.710 | 15.183 | 20.506 |
| D25 | 2.097 | 2.097 | 2.097 | 2.097 | 2.097 | 2.097 |

[Lens group data]
(Medium 1: Air)

| Lens group | Front end surface | Focal length |
|---|---|---|
| First lens group | 1 | 167.43 |
| Second lens group | 3 | −81.36 |
| Third lens group | 10 | −30.93 |
| Fourth lens group | 12 | 16.51 |

[Values corresponding to the conditional expressions]

Conditional expression (1) R1/Ymax = 5.358
Conditional expression (2) f2/f3 = 2.630
Conditional expression (3) R1/R2 = 0.533

Based on Table 2, in the optical system ZL2 according to Example 2 it is understandable that the conditional expressions (1) to (3) are satisfied.

Figure 8A:
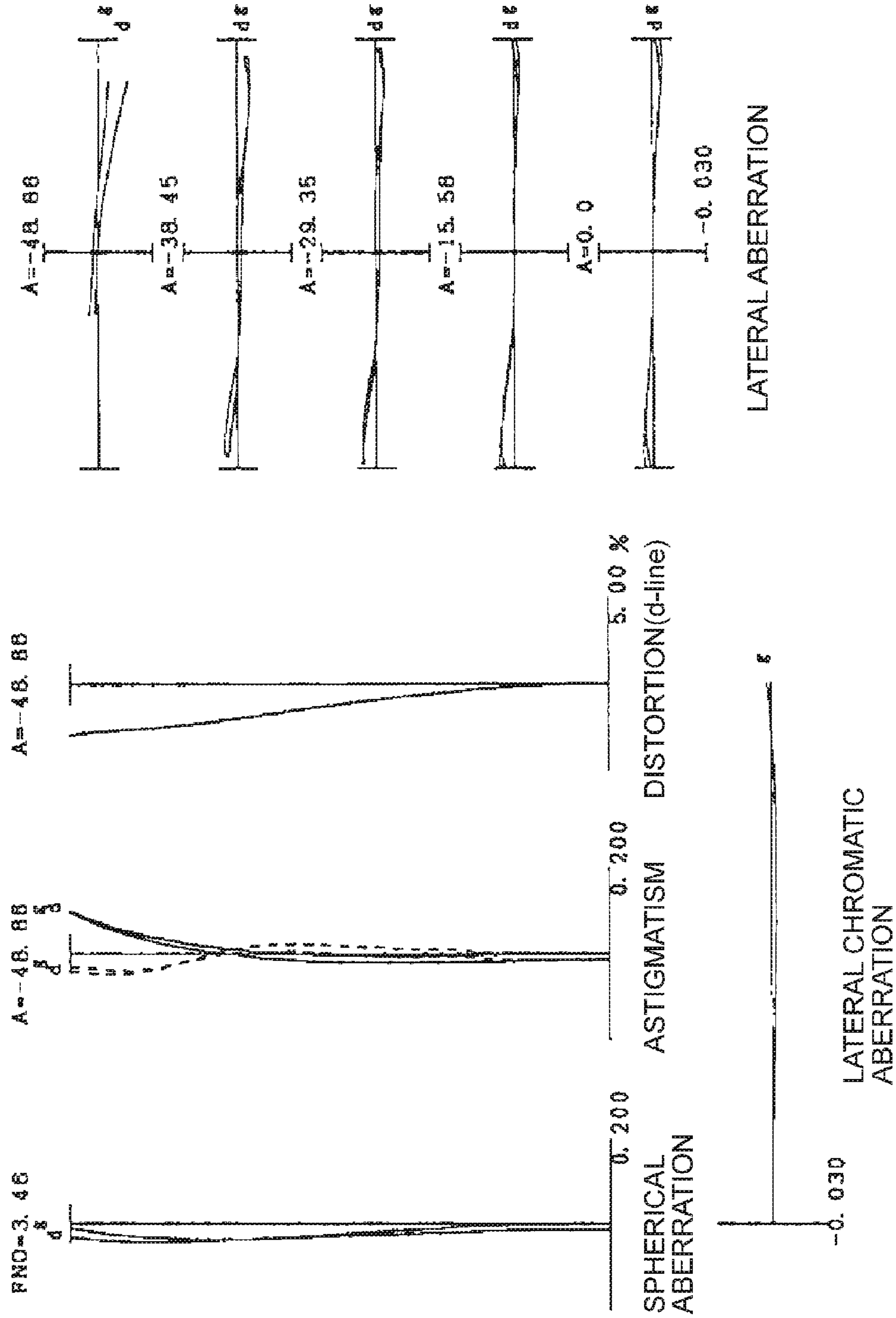
FIGS. 8A, 8B and 8C illustrate a graph showing aberrations in an infinity focusing state of an optical system according to Example 2 in case the object side medium is air.
Figure 8B:
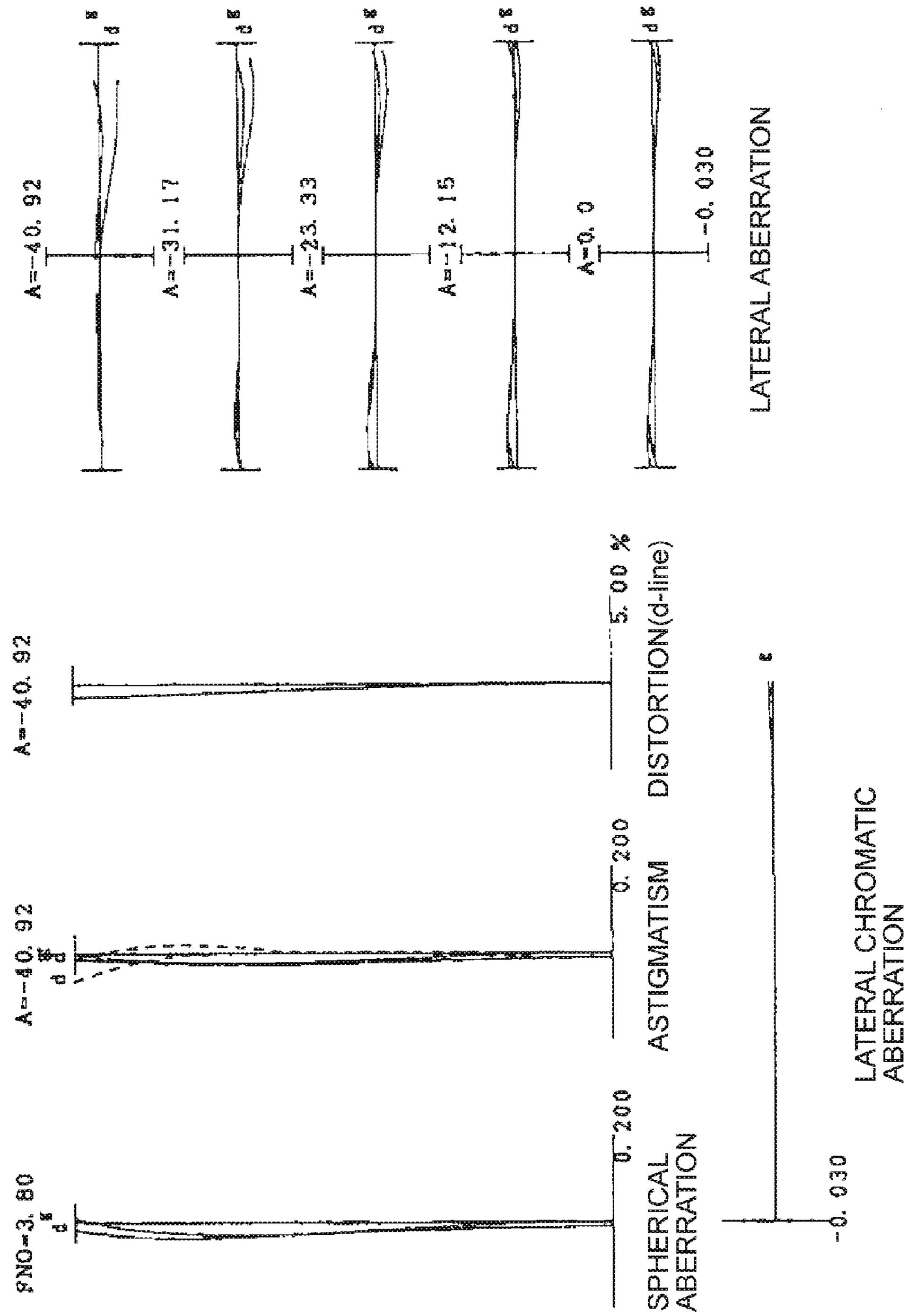
Figure 8C:
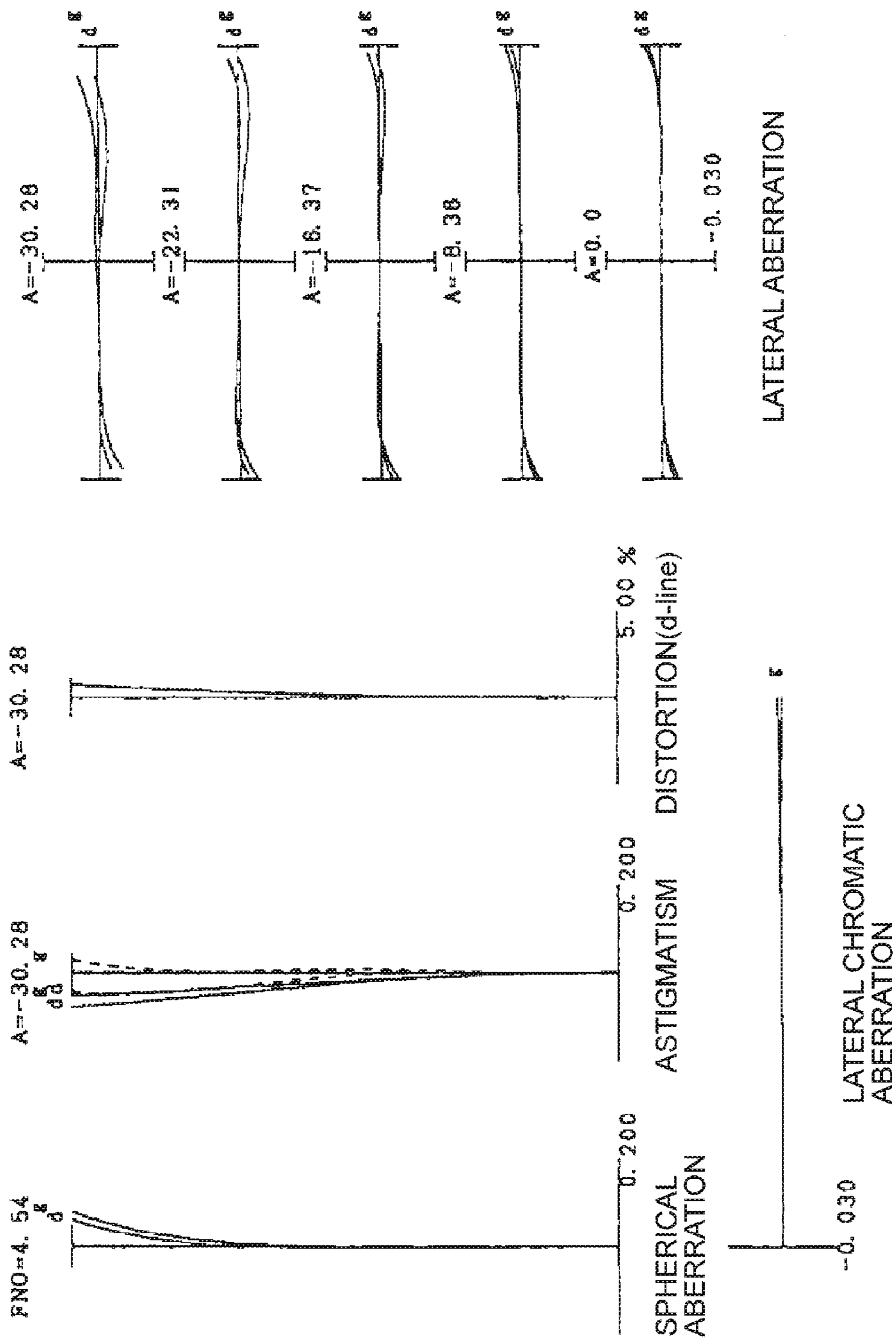
Figure 11A:
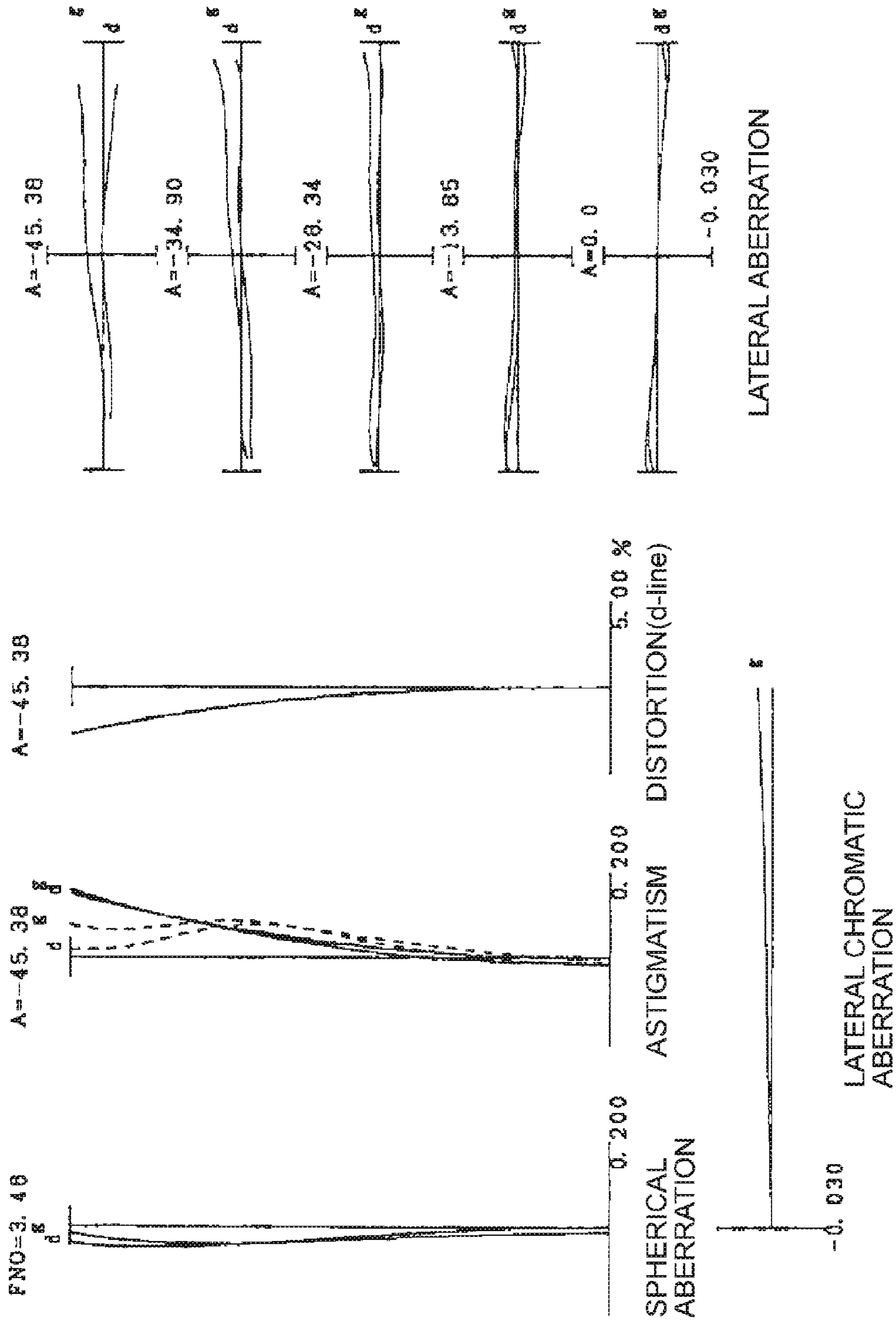
FIGS. 11A, 11B and 11C illustrate a graph showing aberrations in an infinity focusing state of the optical system according to Example 2 in case the object side medium is water, where
Figure 11B:
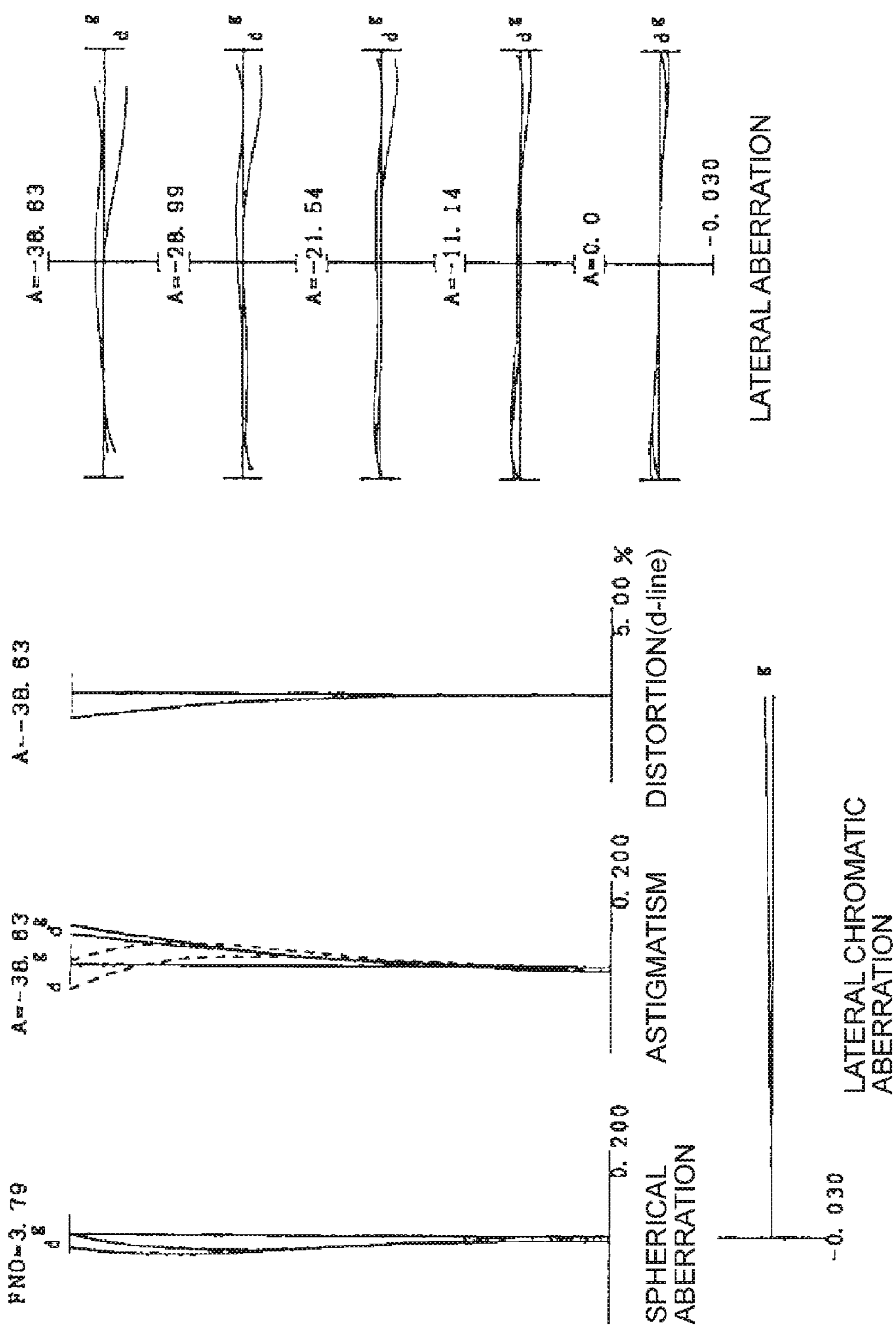
Figure 11C:
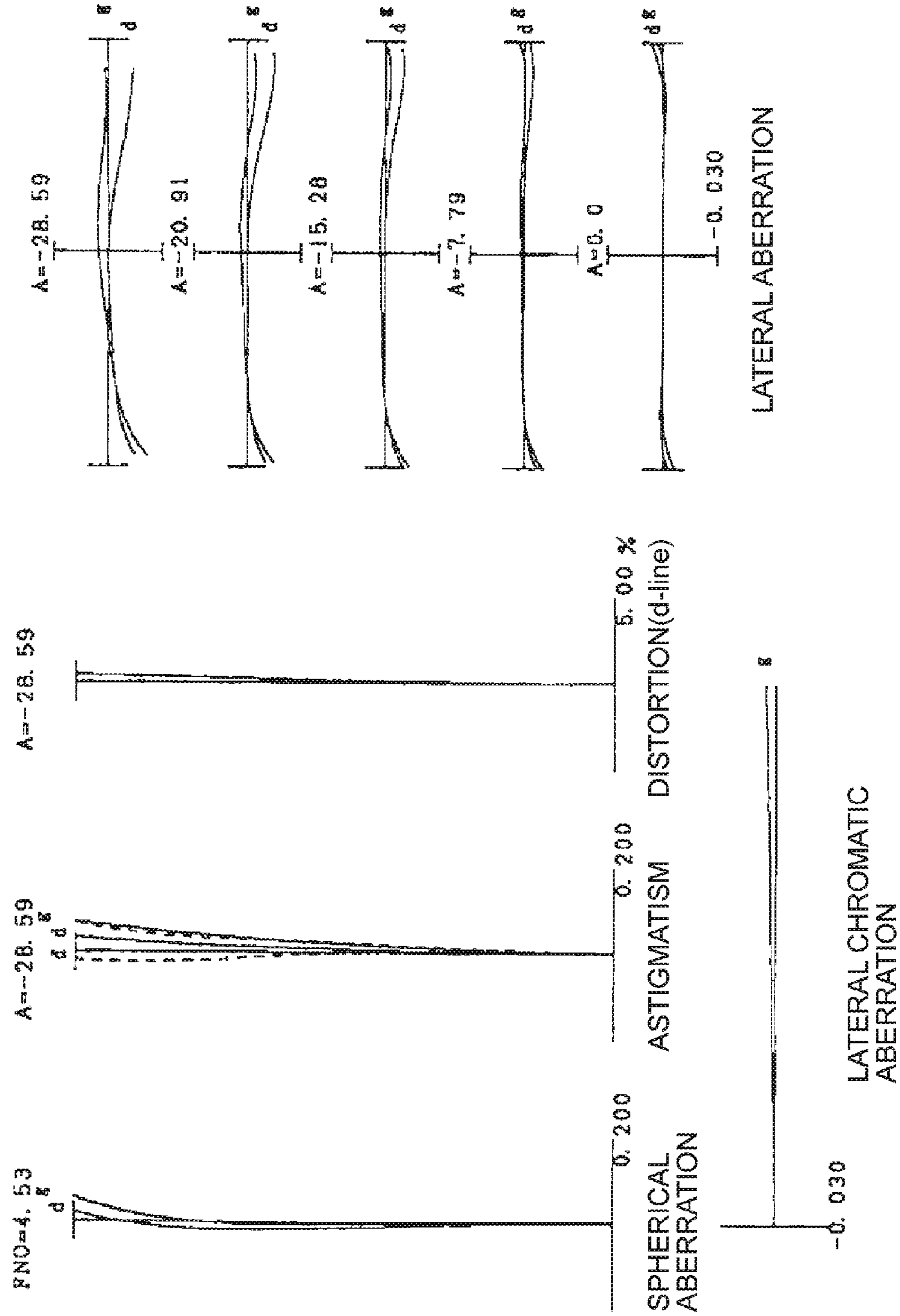
Figure 12A:
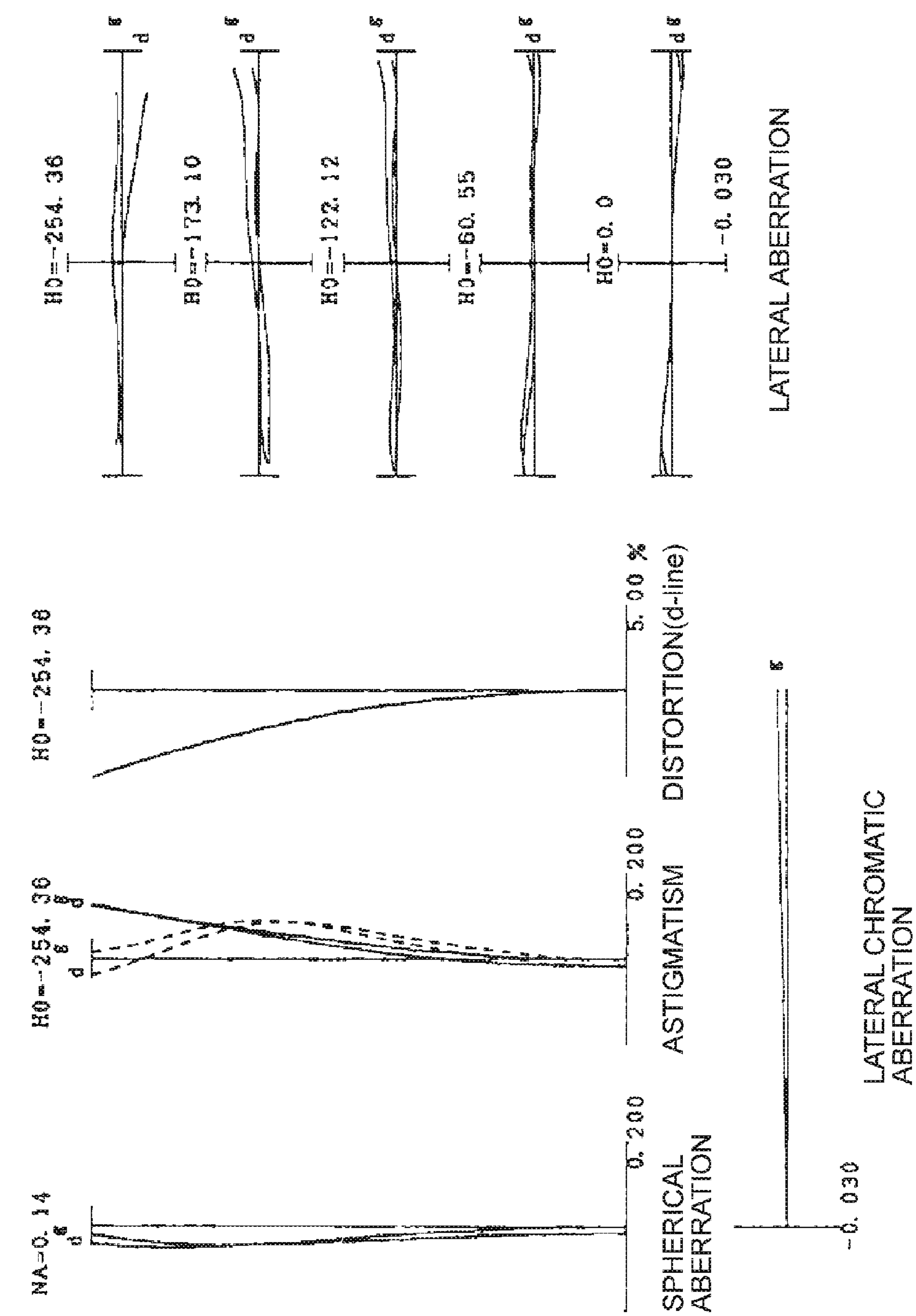
FIGS. 12A, 12B and 12C illustrate a graph showing aberrations in a point-blank range focusing state of the optical system according to Example 2 in case the object side medium is water, where
Figure 12B:
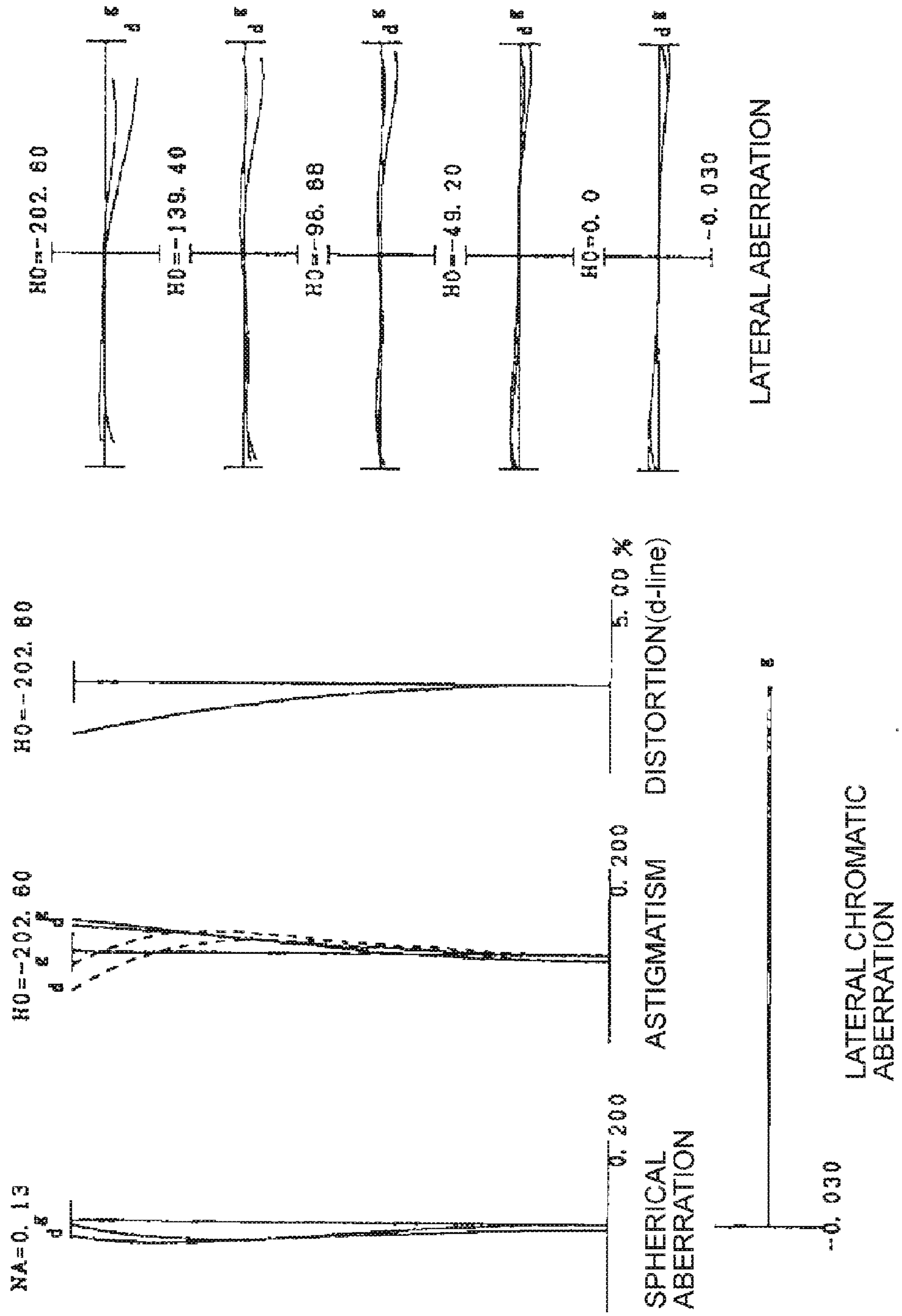
Figure 12C:
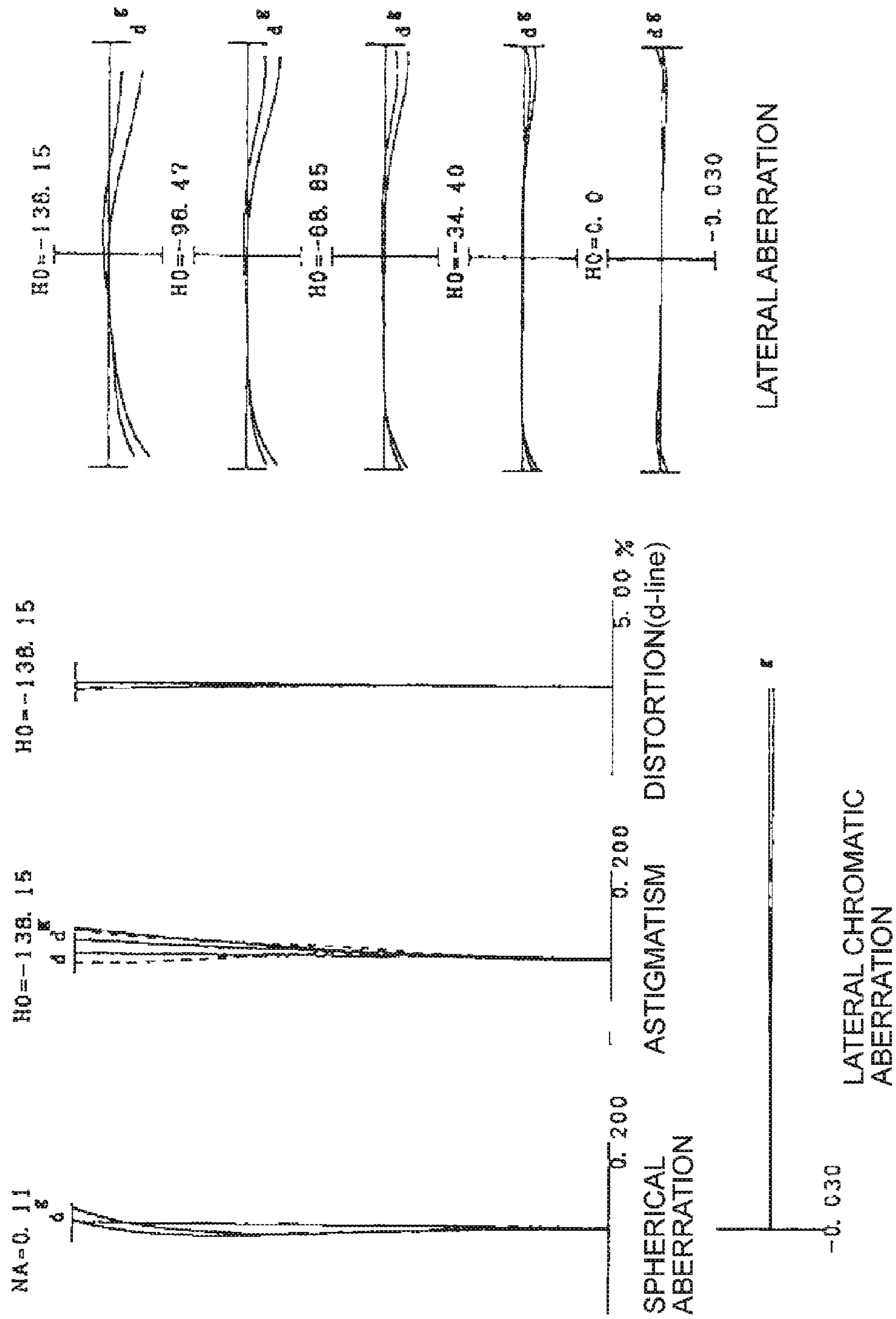

FIGS. 8A, 8B and 8C illustrate a graph showing various aberrations in an infinity focusing state of the optical system ZL2 according to Example 2 in case the object side medium is air, and FIG. 8A depicts a wide-angle end state, FIG. 8B depicts an intermediate focal length state, and FIG. 8C depicts a telephoto end state. FIGS. 9A, 9B and 9C illustrate a graph showing various aberrations in a point-blank range focusing state of the optical system ZL2 according to Example 2 in case the object side medium is air, and FIG. 9A depicts a wide-angle end state, FIG. 9B depicts an intermediate focal length state, and FIG. 9C depicts a telephoto end state. FIGS. 11A, 11B and 11C illustrate a graph showing various aberrations in an infinity focusing state of the optical system ZL2 according to Example 2 in case the object side medium is water, where FIG. 11A depicts a wide-angle end state, FIG. 11B depicts an intermediate focal length state, and FIG. 11C depicts a telephoto end state. FIGS. 12A, 12B and 12C illustrate a graph showing various aberrations in a point-blank range focusing state of the optical system ZL2 according to Example 2 in case the object side medium is water, and FIG. 12A depicts a wide-angle end state, FIG. 12B depicts an intermediate focal length state, and FIG. 12C depicts a telephoto end state.

According to each graph showing aberrations in FIGS. 8A, 8B and 8C, FIGS. 9A, 9B and 9C, FIGS. 11A, 11B and 11C, and FIGS. 12A, 12B and 12C, in the optical system ZL2 according to Example 2, it is possible to appropriately correct, regardless of the object side medium, various aberrations in any imaging states covering a range from a wide-angle end state to a telephoto end state and a range from an infinity focusing state to a point-blank focusing state, and have good optical performance.

EXAMPLE 3

Figure 13:
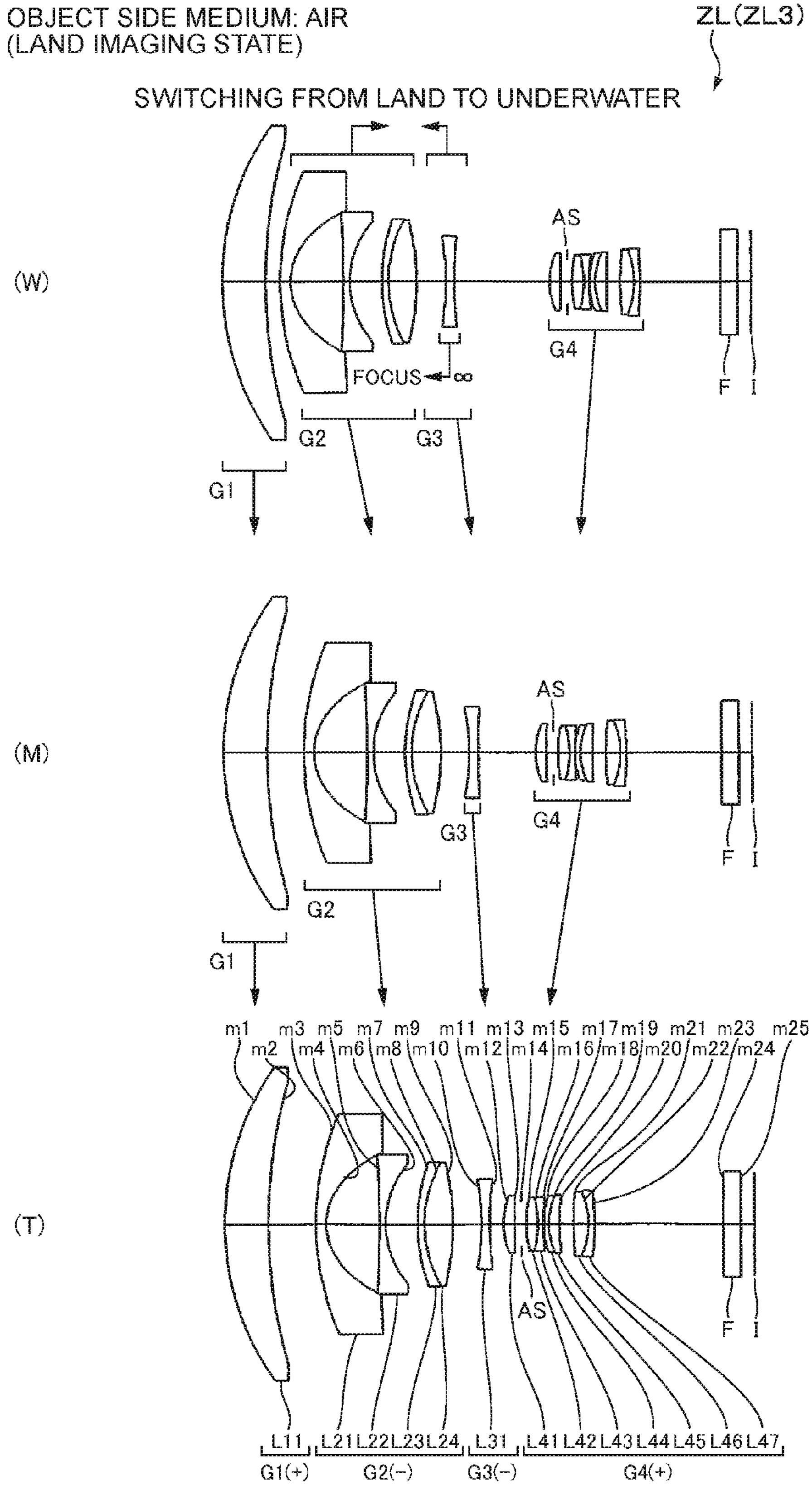
FIG. 13 illustrates a sectional view showing the lens configuration of an optical system according to Example 3 in case the object side medium is air, and a diagram showing the moving locus of each group from a wide-angle end state (W) to a telephoto end state (T) through an intermediate focal length state (M).
Figure 15A:
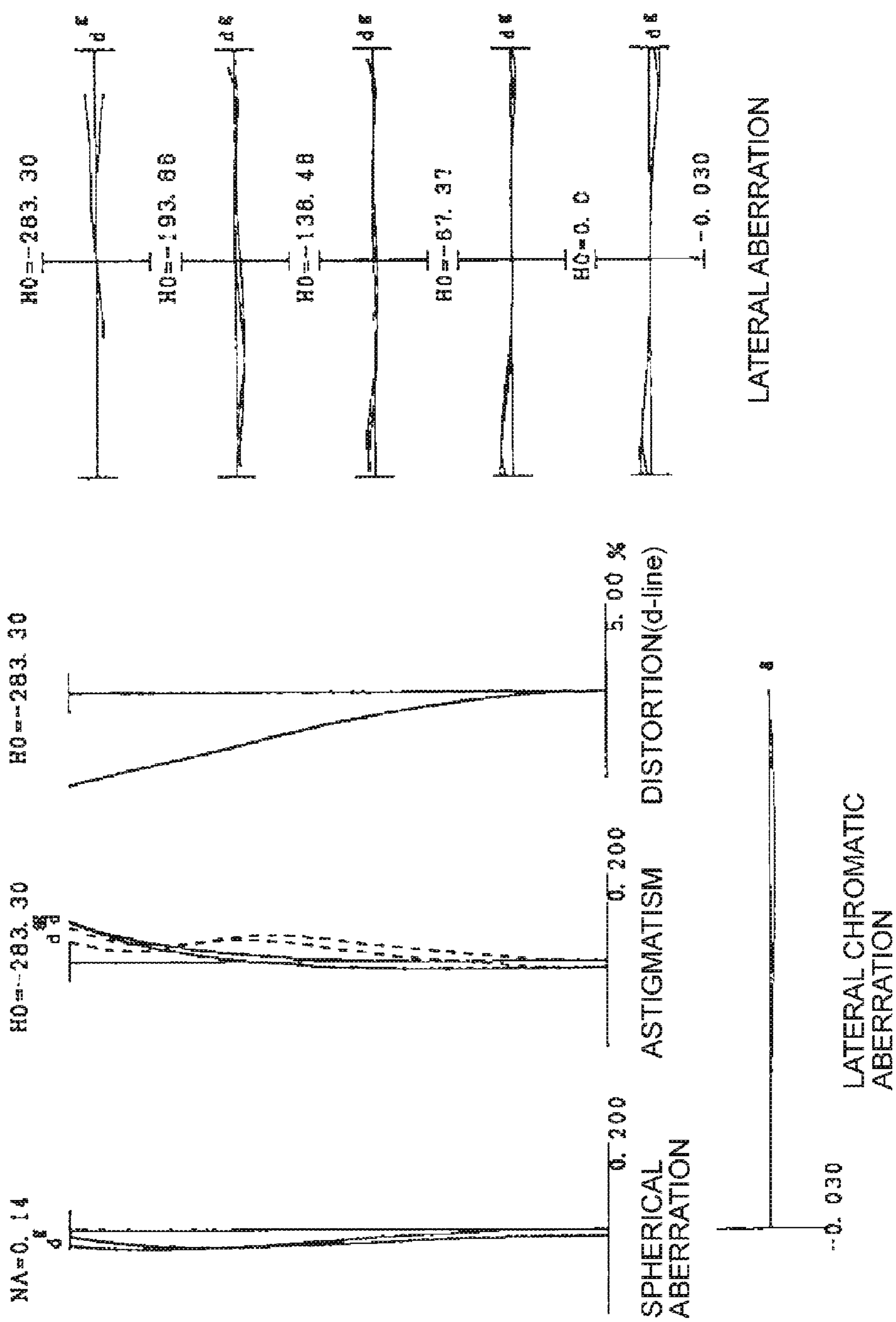
FIGS. 15A, 15B and 15C illustrate a graph showing aberrations in a point-blank range focusing state of the optical system according to Example 3 in case the object side medium is air, where
Figure 15B:
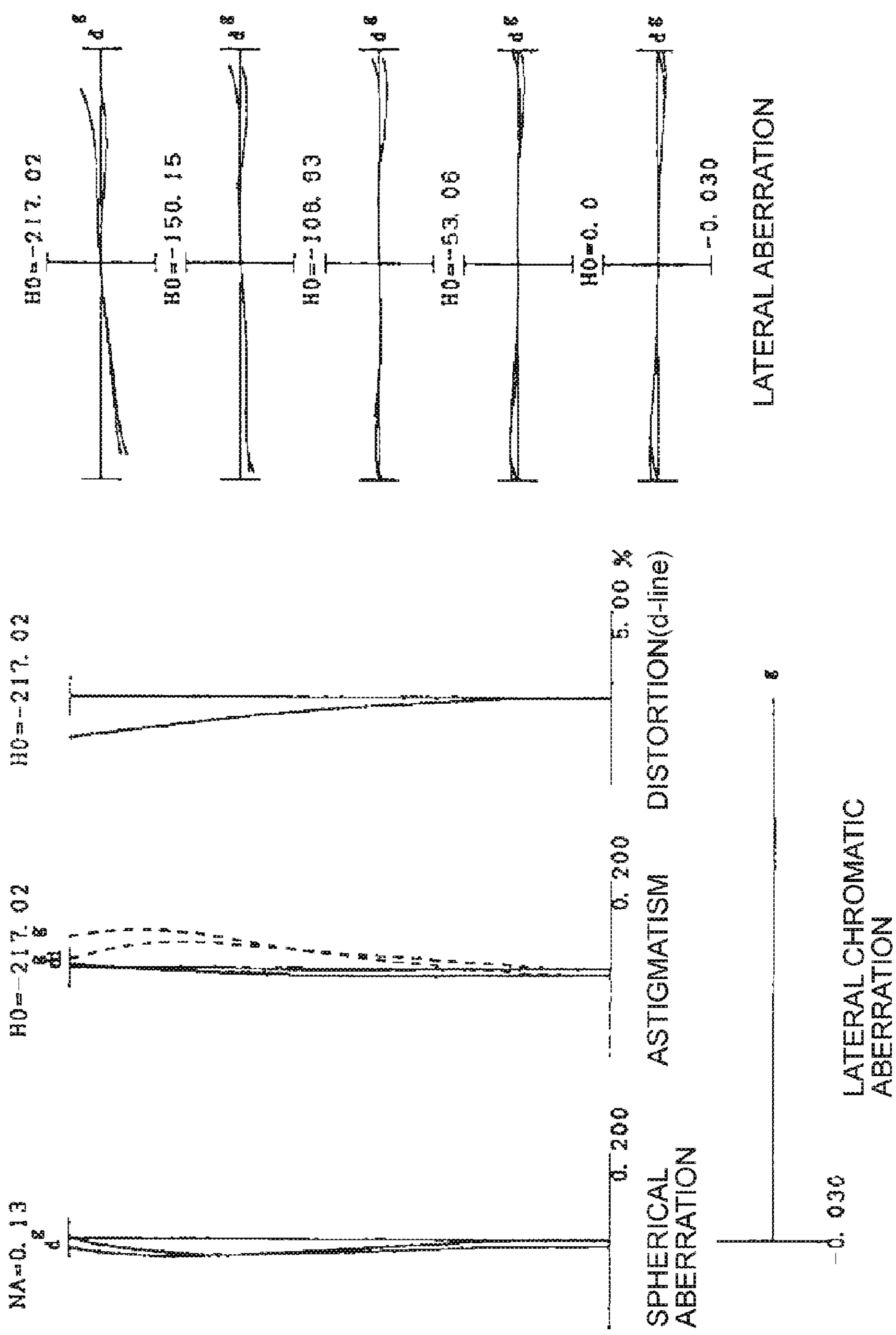
Figure 15C:
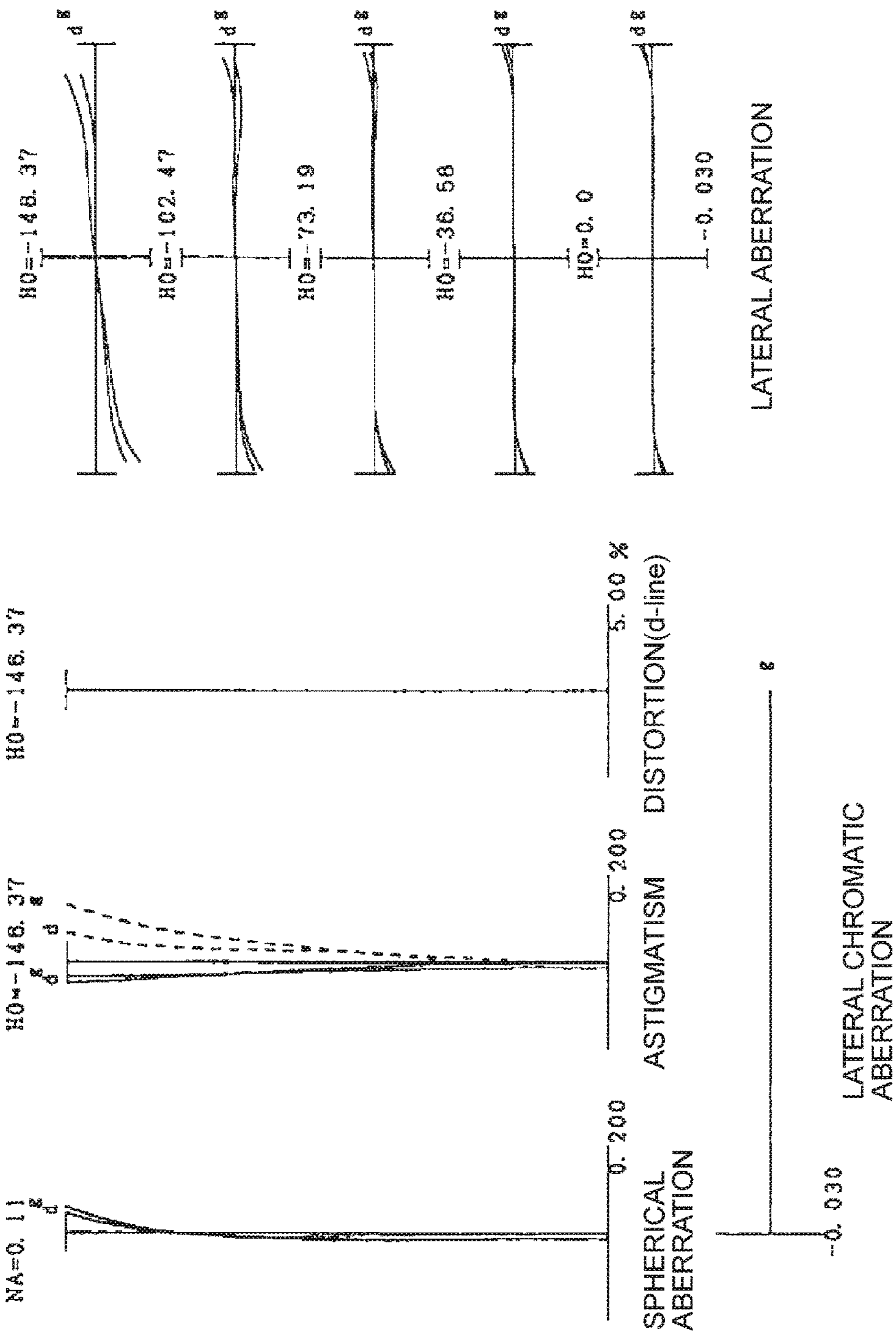
Figure 16:
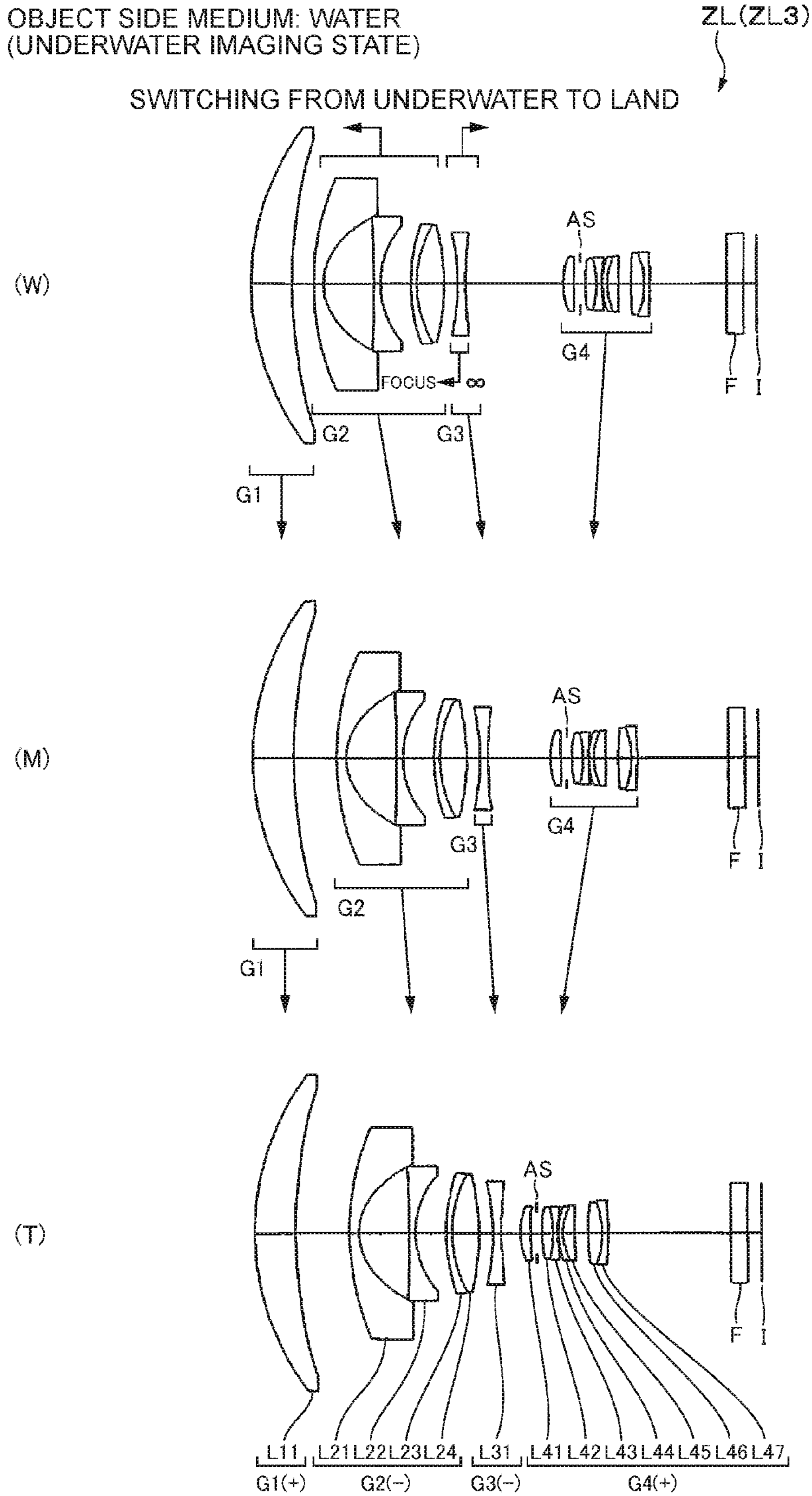
FIG. 16 illustrates a sectional view showing the lens configuration of the optical system according to Example 3 in case the object side medium is water, and a diagram showing the moving locus of each group from a wide-angle end state (W) to a telephoto end state (T) through an intermediate focal length state (M).

Example 3 is described with reference to FIG. 13 to FIGS. 18A, 18B and 18C, and Table 3. An optical system ZL (ZL3) according to the present example is an optical system capable of imaging in two object side media whose refractive indexes are different from each other. Note that the object side medium of a low refractive index is "air," while the object side medium of a high refractive index is "water." FIG. 13 illustrates a sectional view showing a lens configuration of the optical system according to Example 3 in case the object side medium is air (land imaging state). FIG. 16 is a sectional view showing the lens configuration of the optical system according to Example 3 in case the object side medium is water (underwater imaging state).

The optical system ZL3 according to Example 3 is composed of, as shown in FIG. 13 and FIG. 16, in order from an object, a first lens group G1 having positive refractive power, a second lens group G2 having negative refractive power, a third lens group G3 having negative refractive power, and a fourth lens group G4 having positive refractive power.

The first lens group G1 is composed of a positive meniscus lens L11 having convex surface facing the object.

The second lens group G2 is composed of, in order from the object, a negative meniscus lens L21 having a concave surface facing the image, a biconcave lens L22, and a cemented lens composed of a negative meniscus lens L23 having a concave surface facing the image and a biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from the object, a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens composed of a biconvex lens L46 and a negative meniscus lens L47 having a concave surface facing the object. The image side surface of the negative meniscus lens L47 is an aspherical surface.

A filter group F is disposed on the image side of the fourth lens group G4. The filter group F is composed of a low-pass filter for cutting a spatial frequency more than a marginal dissector of image sensors such as a CCD disposed at the image surface I, and a CMOS, a cover-glass of an image sensor, etc.

The image surface I is formed on the image sensor which is composed of unillustrated CCDs, CMOSs, etc.

A position of the first lens group G1 on the optical axis fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state) and it is in the infinity focusing state, the second lens group G2 and the third lens group G3 are moved together upon zooming. In case the object side medium is water (underwater imaging state), the second lens group G2 and the third lens group G3 are moved together upon zooming. Moreover, in case the object side medium is any one of air and water (also in any one of the land underwater imaging states), the fourth lens group G4 is moved upon zooming so that the same locus is drawn.

Upon focusing on from infinity to a point-blank range object, the third lens group G3 is moved to the object side.

When changing the object side media, the second lens group G2 and the third lens group G3 are moved on the optical axis. When changing the object side media, for example, from air (land imaging state) having a low refractive index medium to water (underwater imaging state) having a high refractive index medium, as shown in FIG. 13, the second lens group G2 is moved to the image side, and the third lens group G3 is moved to the object side. Moreover, when changing the object side media from water (underwater imaging state) having a high refractive index medium to air (land imaging state) having a low refractive index medium, as shown in FIG. 16, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes upon zooming and when changing the object side media. The distance between the second lens group G2 and the third lens group G3 is constant upon zooming in an infinity focusing state regardless of the object side medium (in any one of the land water photographic states), and changes when the object side media is changed. The distance between the third lens group G3 and the fourth lens group G4 changes upon zooming and when changing the object side media.

The following table 3 illustrates values of each general data in Example 3. The surface numbers 1 to 25 in Table 3 correspond to each optical surface of m1 to m25 shown in FIG. 13.

TABLE 3

| [Object side medium] | |
|---|---|
| Medium 1: Air | n(d) = 1.00000 |
| Medium 2: Water | n(d) = 1.33306, νd = 54.0 |

[Lens data]

| Surface number | R | D | n(d) | νd |
|---|---|---|---|---|
| 1 | 43.17525 | 6.635 | 1.51680 | 63.9 |
| 2 | 81.42500 | (D2) | 1.00000 | |
| 3 | 43.36398 | 1.600 | 1.69412 | 53.4 |
| *4 | 9.29586 | 8.313 | 1.00000 | |
| 5 | −191.34347 | 1.000 | 1.77387 | 47.2 |
| *6 | 14.57981 | 5.042 | 1.00000 | |
| 7 | 29.56085 | 1.000 | 1.49782 | 82.6 |
| 8 | 19.68633 | 4.461 | 1.83400 | 37.2 |

TABLE 3-continued

| | | | | |
|---|---|---|---|---|
| 9 | −37.73965 | (D9) | 1.00000 | |
| 10 | −37.58927 | 1.350 | 1.80400 | 46.6 |
| 11 | 73.72379 | (D11) | 1.00000 | |
| 12 | 11.49660 | 1.791 | 1.51680 | 63.9 |
| 13 | 311.02882 | 1.000 | 1.00000 | |
| 14 | (Aperture stop AS) | 0.800 | 1.00000 | |
| 15 | 23.31032 | 1.824 | 1.49782 | 82.6 |
| 16 | −15.19403 | 0.800 | 1.74400 | 44.8 |
| 17 | 31.76652 | 0.100 | 1.00000 | |
| 18 | 13.24177 | 0.800 | 1.85026 | 32.4 |
| 19 | 10.23531 | 1.869 | 1.51680 | 63.9 |
| 20 | 244.46311 | 2.134 | 1.00000 | |
| 21 | 54.05739 | 2.254 | 1.49782 | 82.6 |
| 22 | −13.20080 | 1.000 | 1.77387 | 47.2 |
| *23 | −32.55715 | (D23) | 1.00000 | |
| 24 | 0.00000 | 2.790 | 1.51680 | 64.1 |
| 25 | 0.00000 | (D25) | 1.00000 | |

[Aspheric surface data]

| Surface | κ | A4 | A6 | A8 | A10 |
|---|---|---|---|---|---|
| 4 | −1.14130e+00 | 2.58212e−04 | −1.00454e−06 | 9.13244e−09 | −2.83138e−11 |
| 6 | −4.22670e+00 | 2.17952e−04 | −1.36259e−06 | 1.04550e−08 | −3.44838e−11 |
| 23 | 7.54800e−01 | 1.98737e−04 | 6.46235e−07 | 3.97532e−08 | −4.46170e−10 |

[Various data]

| | W | M | T |
|---|---|---|---|
| (Medium 1: Air) | | | |
| f | 7.20 | 9.30 | 13.60 |
| FNo | 3.45 | 3.78 | 4.51 |
| ω | 48.9 | 40.9 | 30.3 |
| Y | 8.00 | 8.00 | 8.00 |
| TL | 83.000 | 83.000 | 83.000 |
| BF | 17.453 | 19.915 | 25.215 |
| BF(Air) | 16.502 | 18.965 | 24.264 |
| (Medium 2: Water) | | | |
| f | 6.09 | 7.62 | 10.97 |
| FNo | 3.45 | 3.78 | 4.51 |
| ω | 45.4 | 38.6 | 28.6 |
| Y | 8.00 | 8.00 | 8.00 |
| TL | 83.000 | 83.000 | 83.000 |
| BF | 17.453 | 19.915 | 25.215 |
| BF(Air) | 16.502 | 18.965 | 24.264 |

[Variable distance data]

| | Upon focusing on infinity | | | Upon focusing on point-blank range | | |
|---|---|---|---|---|---|---|
| | W | M | T | W | M | T |
| (Medium 1: Air) | | | | | | |
| D0 | ∞ | ∞ | ∞ | 217.00 | 217.00 | 217.00 |
| β | — | — | — | −0.0298 | −0.0378 | −0.0547 |
| f | 7.20 | 9.30 | 13.60 | — | — | — |
| D2 | 2.305 | 5.786 | 7.500 | 2.305 | 5.786 | 7.500 |
| D9 | 4.514 | 4.514 | 4.514 | 3.851 | 3.831 | 3.823 |
| D11 | 14.956 | 9.013 | 2.000 | 15.619 | 9.697 | 2.691 |
| D23 | 12.563 | 15.024 | 20.324 | 12.563 | 15.024 | 20.324 |
| D25 | 2.100 | 2.100 | 2.100 | 2.100 | 2.100 | 2.100 |
| (Medium 2: Water) | | | | | | |
| D0 | ∞ | ∞ | ∞ | 217.00 | 217.00 | 217.00 |
| β | — | — | — | −0.0331 | −0.0408 | −0.0580 |
| f | 6.09 | 7.62 | 10.97 | — | — | — |
| D2 | 3.532 | 6.987 | 8.694 | 3.532 | 6.987 | 8.694 |
| D9 | 2.230 | 2.230 | 2.230 | 1.600 | 1.627 | 1.637 |
| D11 | 16.013 | 10.096 | 3.090 | 16.643 | 10.699 | 3.684 |
| D23 | 12.563 | 15.024 | 20.324 | 12.563 | 15.024 | 20.324 |
| D25 | 2.100 | 2.100 | 2.100 | 2.100 | 2.100 | 2.100 |

TABLE 3-continued

[Lens group data]
(Medium 1: Air)

| Lens group | Front end surface | Focal length |
|---|---|---|
| First lens group | 1 | 167.92 |
| Second lens group | 3 | −81.18 |
| Third lens group | 10 | −30.80 |
| Fourth lens group | 12 | 16.48 |

[Values corresponding to the conditional expressions]

Conditional expression (1) R1/Ymax = 5.397
Conditional expression (2) f2/f3 = 2.636
Conditional expression (3) R1/R2 = 0.530

Base on Table 3, in the optical system ZL3 according to Example 3 it is understandable that the conditional expressions (1) to (3) are satisfied.

Figure 14A:
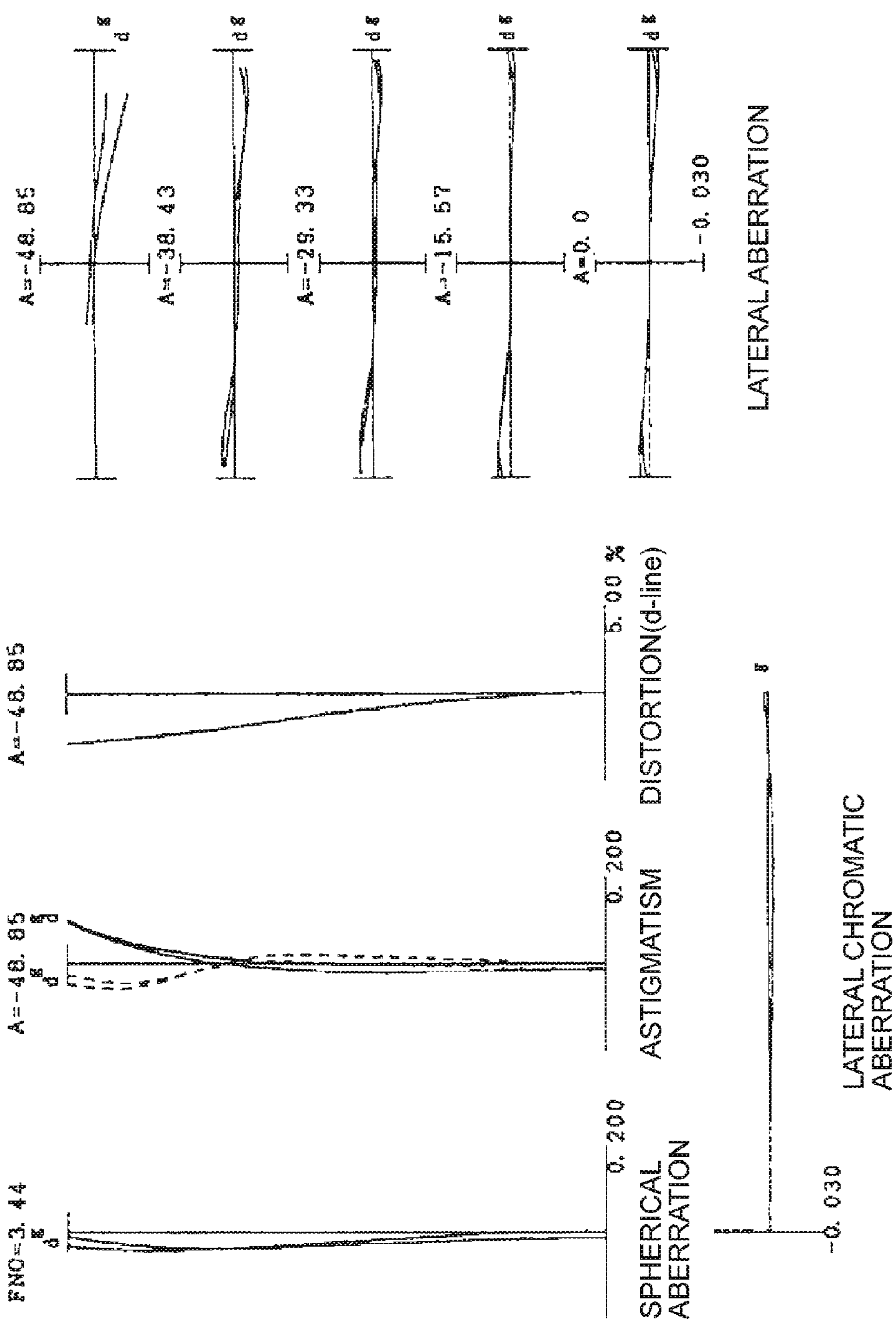
FIGS. 14A, 14B and 14C illustrate a graph showing aberrations in an infinity focusing state of the optical system according to Example 3 in case the object side medium is air, where
Figure 14B:
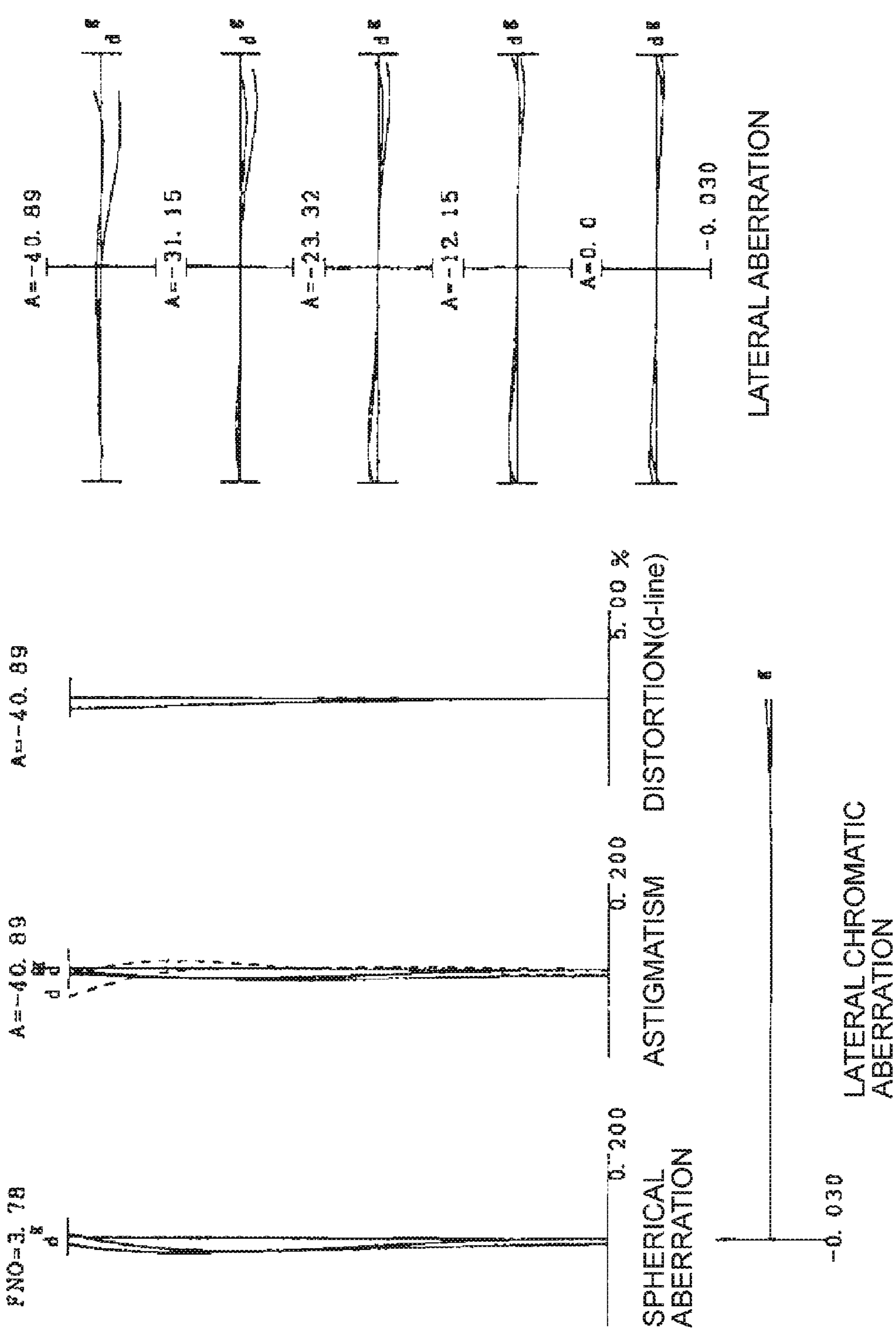
Figure 14C:
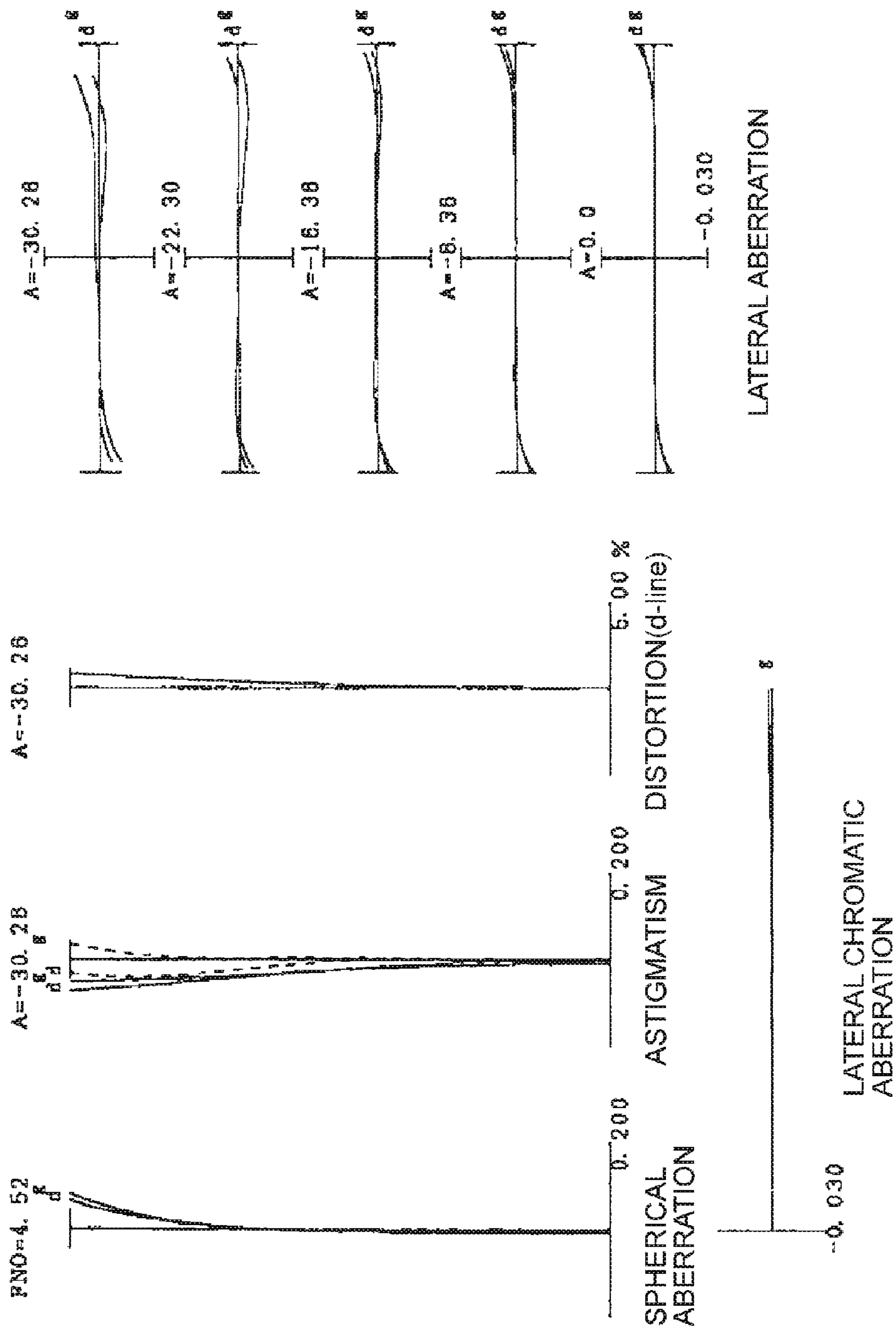
Figure 17A:
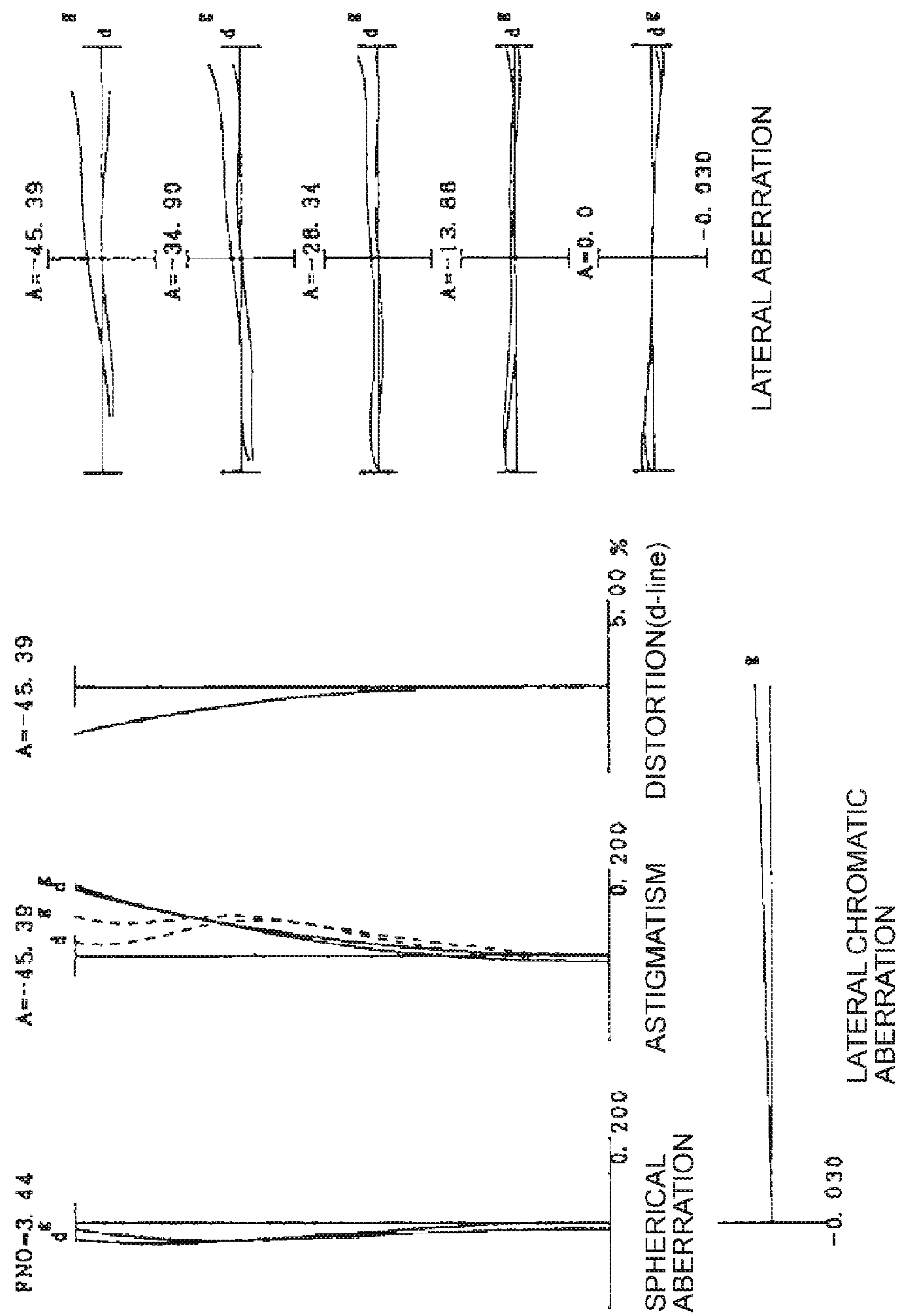
FIGS. 17A, 17B and 17C illustrate a graph showing aberrations in an infinity focusing state of the optical system according to Example 3 in case the object side medium is water, where
Figure 17B:
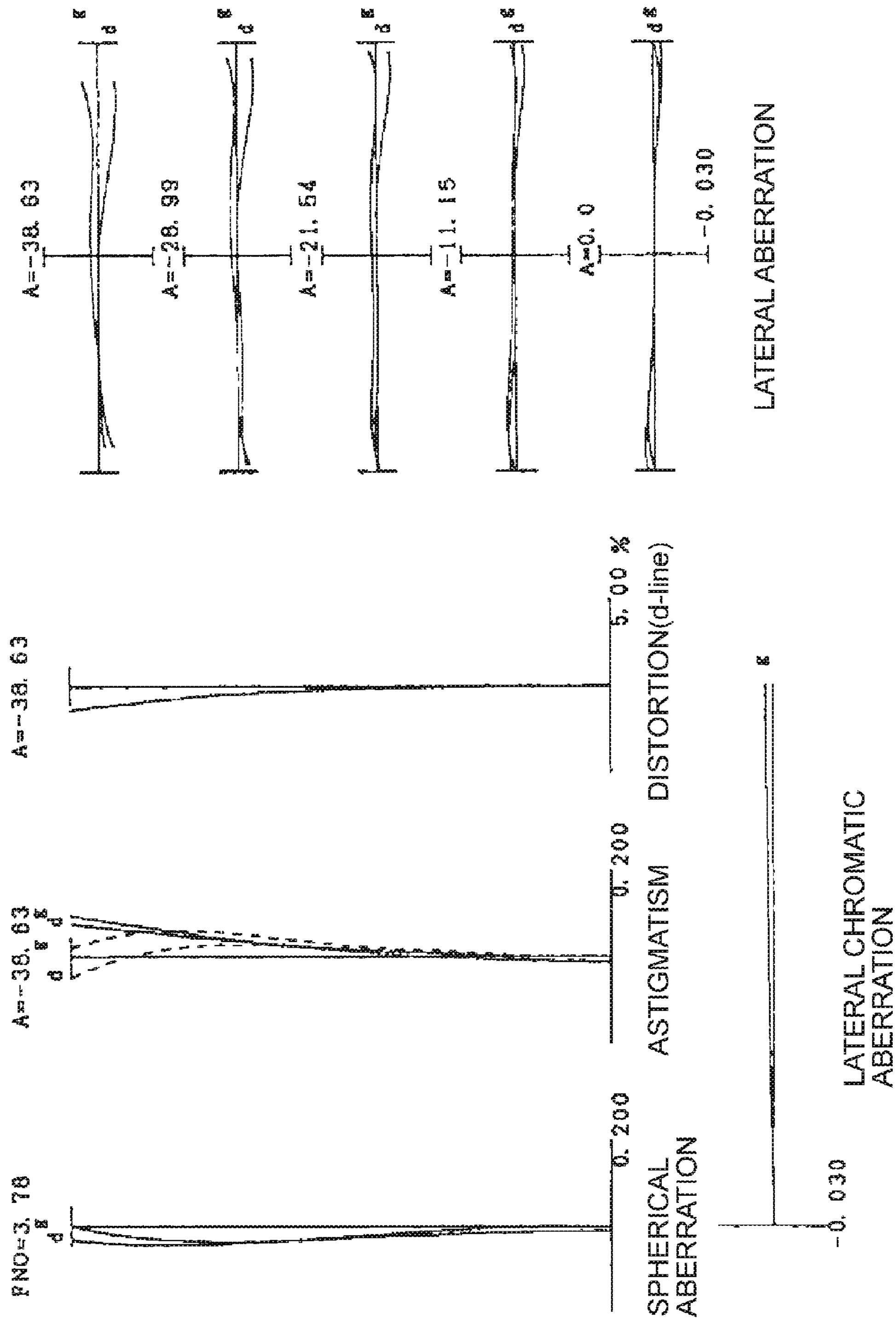
Figure 17C:
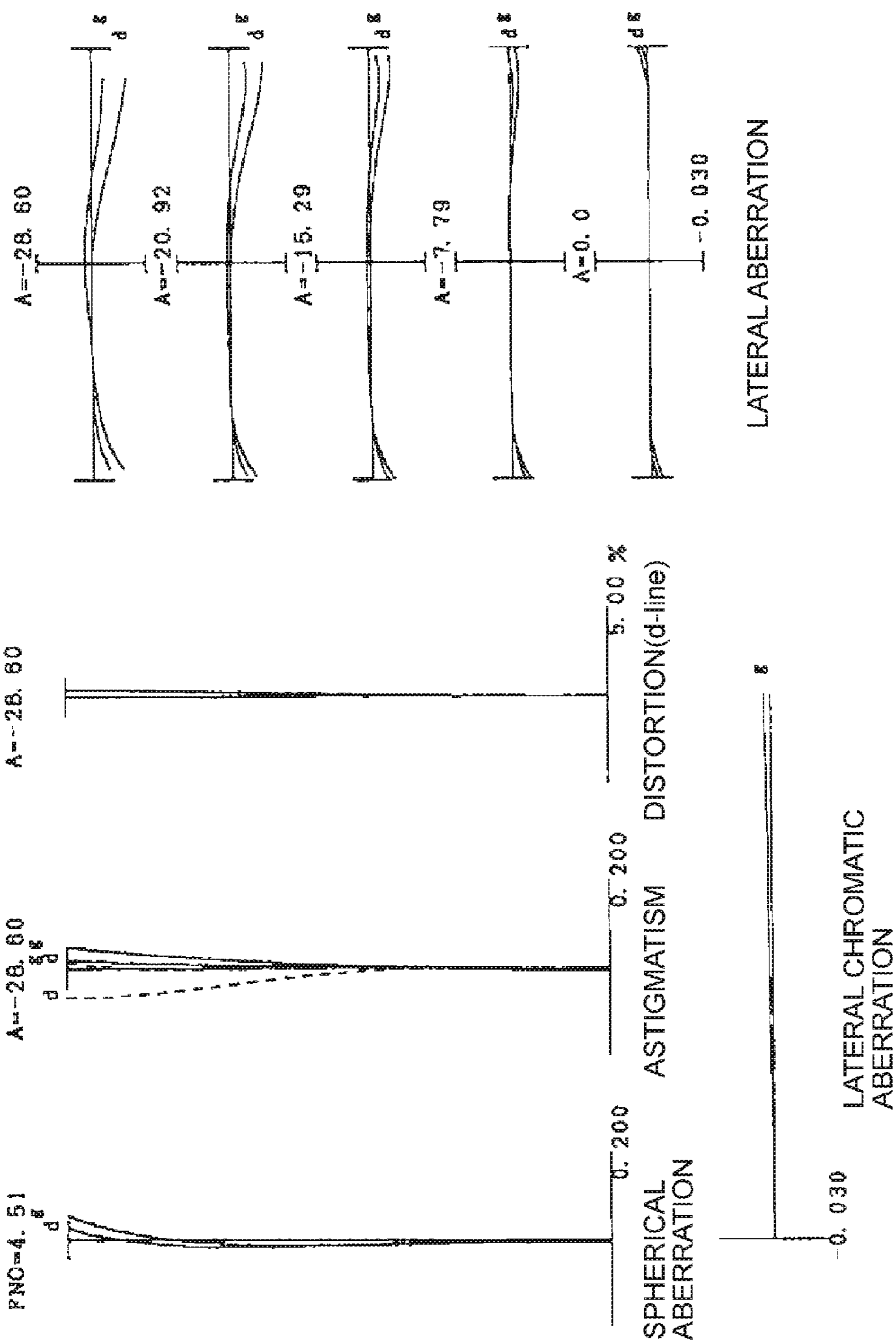
Figure 18A:
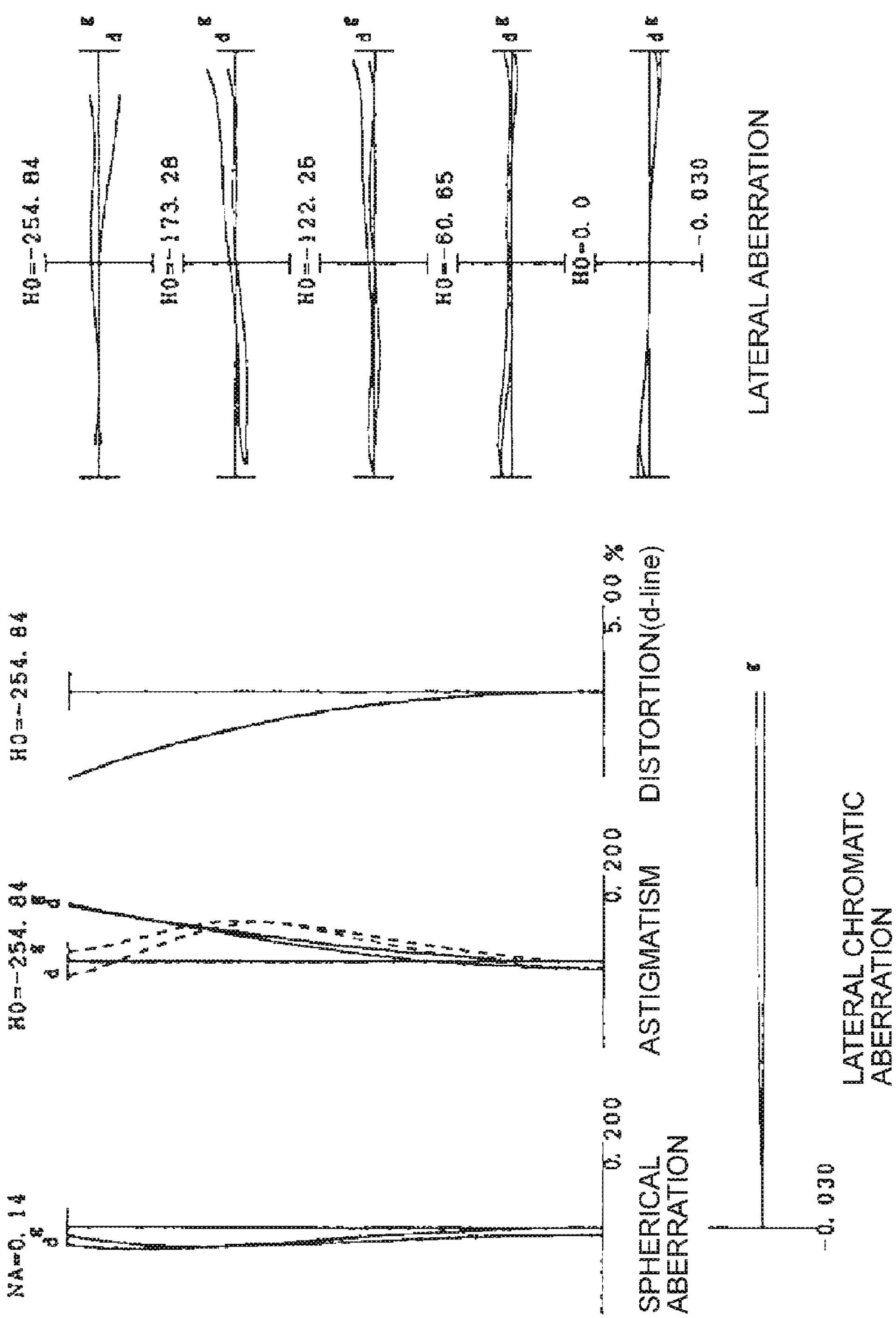
FIGS. 18A, 18B and 18C illustrate a graph showing aberrations in a point-blank range focusing state of the optical system according to Example 3 in case the object side medium is water, where
Figure 18B:
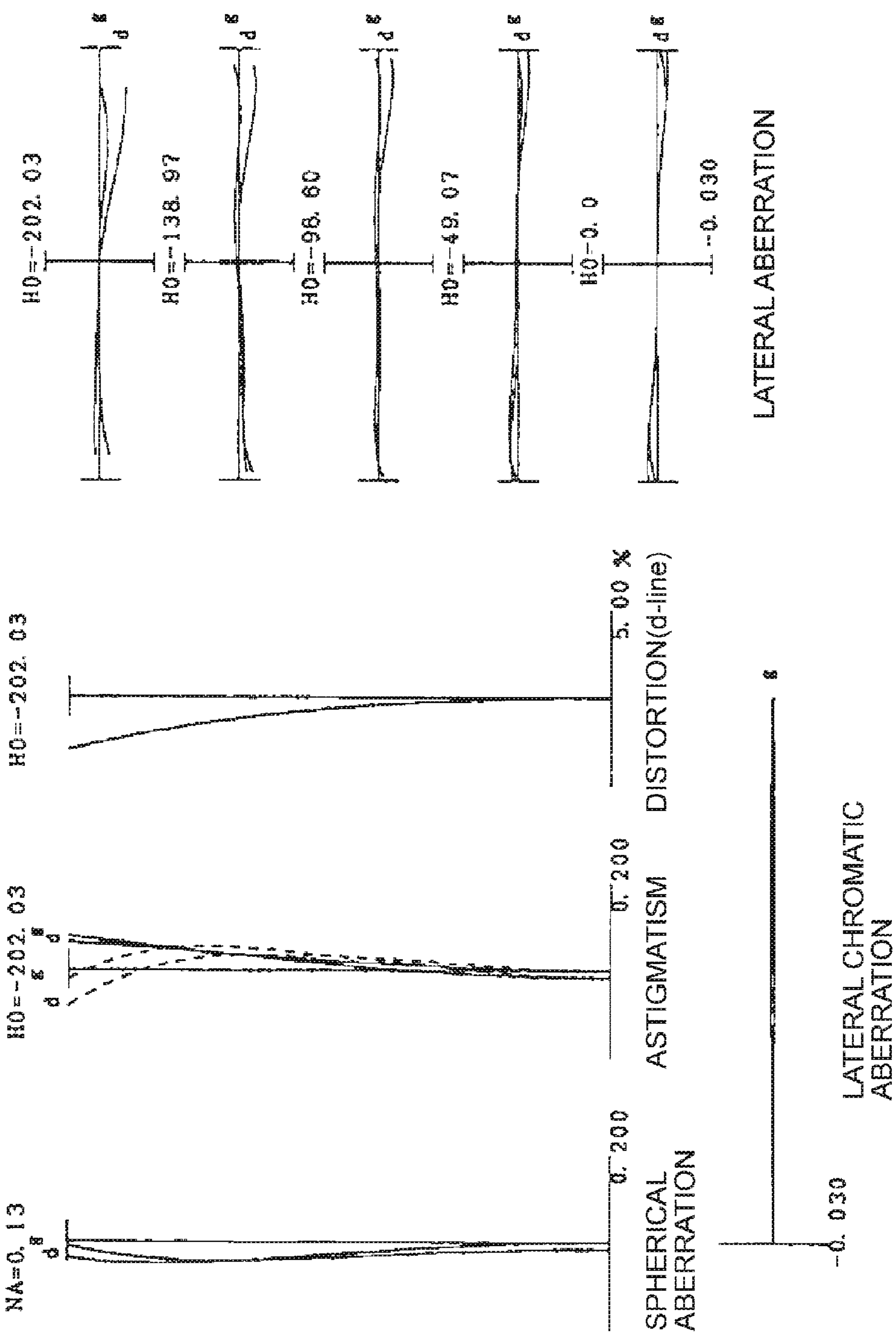
Figure 18C:
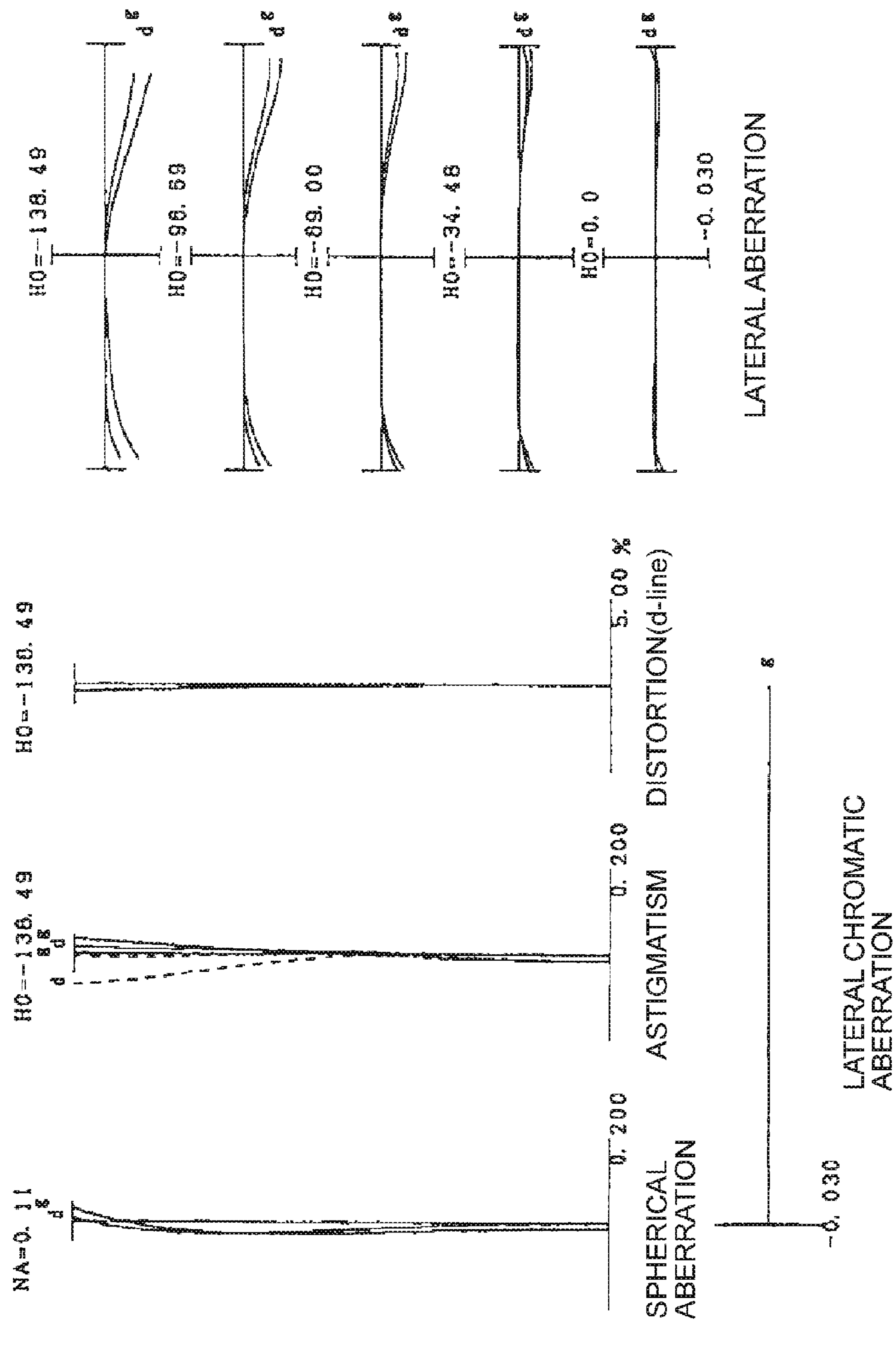

FIGS. 14A, 14B and 14C illustrate a graph showing various aberrations in an infinity focusing state of the optical system ZL3 according to Example 3 in case the object side medium is air, and FIG. 14A depicts a wide-angle end state, FIG. 14B depicts an intermediate focal length state, and FIG. 14C depicts a telephoto end state. FIGS. 15A, 15B and 15C illustrate a graph showing various aberrations in a point-blank range focusing state of the optical system ZL3 according to Example 3 in case the object side medium is air, where FIG. 15A depicts a wide-angle end state, FIG. 15B depicts an intermediate focal length state, and FIG. 15C depicts a telephoto end state. FIGS. 17A, 17B and 17C illustrate a graph showing various aberrations in an infinity focusing state of the optical system ZL3 according to Example 3 in case the object side medium is water, where FIG. 17A depicts a wide-angle end state, FIG. 17B depicts an intermediate focal length state, and FIG. 17C depicts a telephoto end state. FIGS. 18A, 18B and 18C illustrate a graph showing various aberrations in a point-blank range focusing state of the optical system ZL3 according to Example 3 in case the object side medium is water, where FIG. 18A depicts a wide-angle end state, FIG. 18B depicts an intermediate focal length state, and FIG. 18C depicts a telephoto end state.

According to each graph showing aberrations in FIGS. 14A, 14B and 14C, FIGS. 15A, 15B and 15C, FIGS. 17A, 17B and 17C, and FIGS. 18A, 18B and 18C, in the optical system ZL3 according to Example 3, it is possible to appropriately correct, regardless of the object side medium, various aberrations in any imaging states covering a range from a wide-angle end state to a telephoto end state and a range from an infinity focusing state to a point-blank focusing state, and have good optical performance.

EXAMPLE 4

Figure 19:
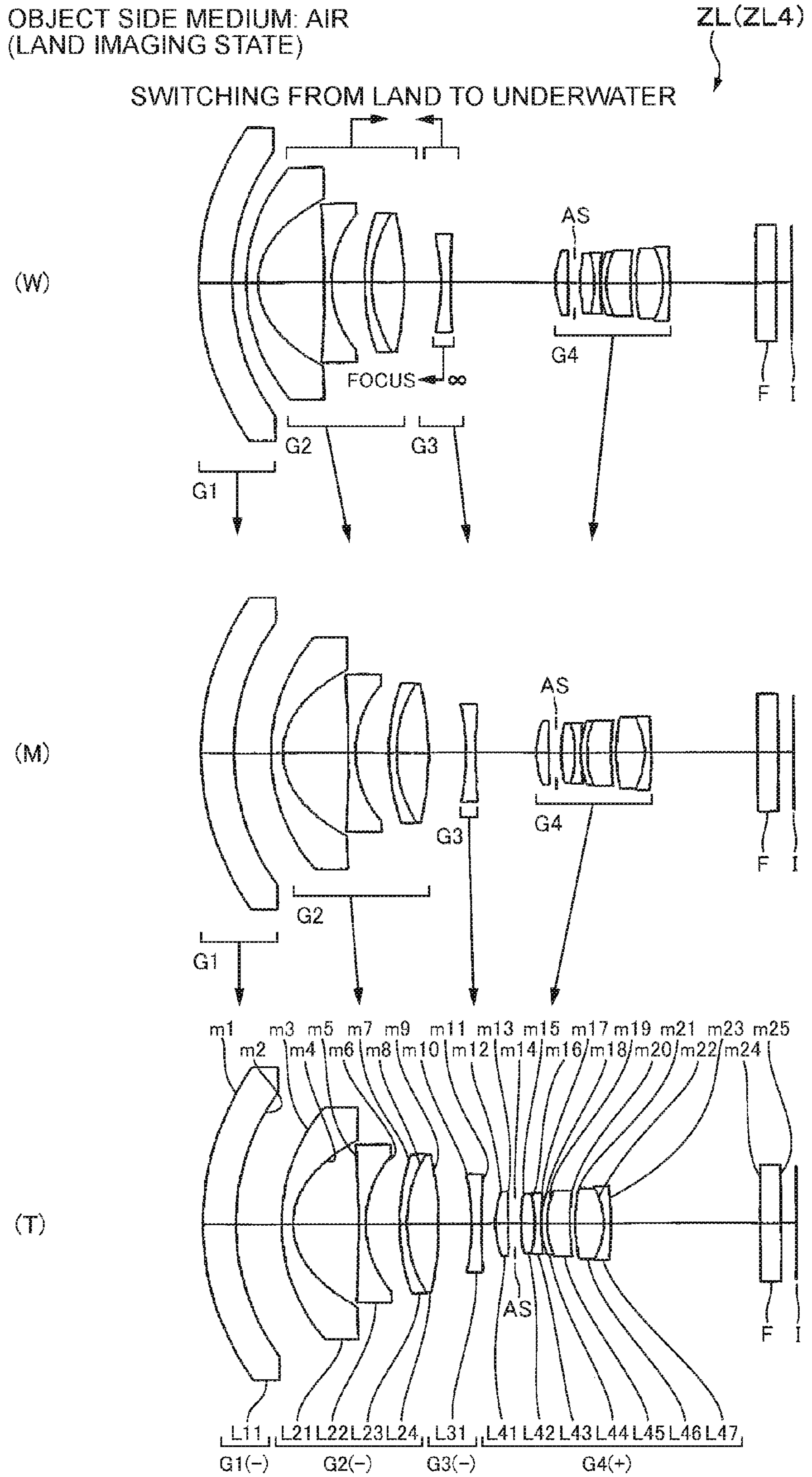
FIG. 19 illustrates a sectional view showing a lens configuration of the optical system according to Example 4 in case the object side medium is air, and a diagram showing a moving locus of each group from a wide-angle end state (W) to a telephoto end state (T) through an intermediate focal length state (M).
Figure 21A:
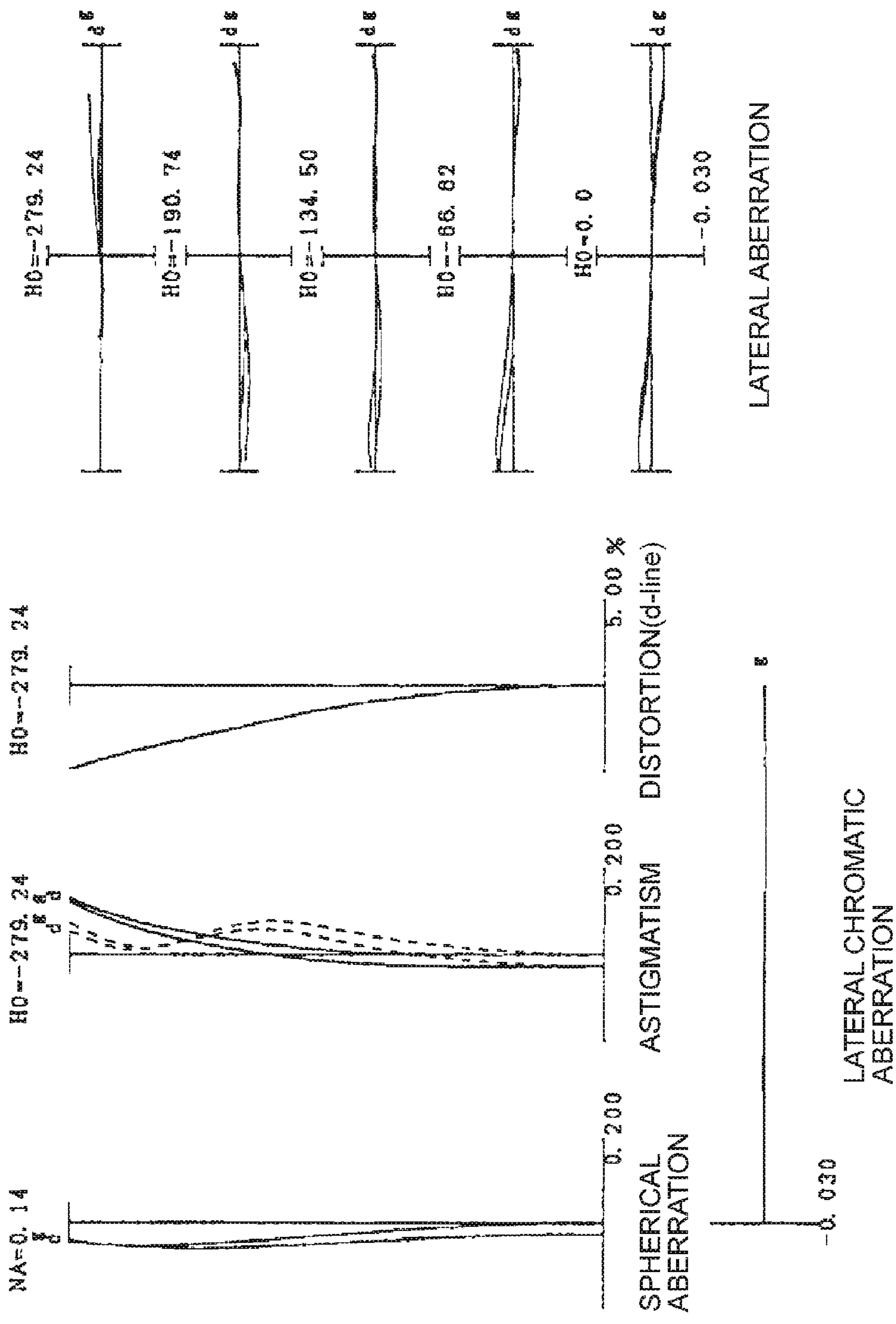
FIGS. 21A, 21B and 21C illustrate a graph showing aberrations in a point-blank range focusing state of the optical system according to Example 4 in case the object side medium is air, where
Figure 21B:
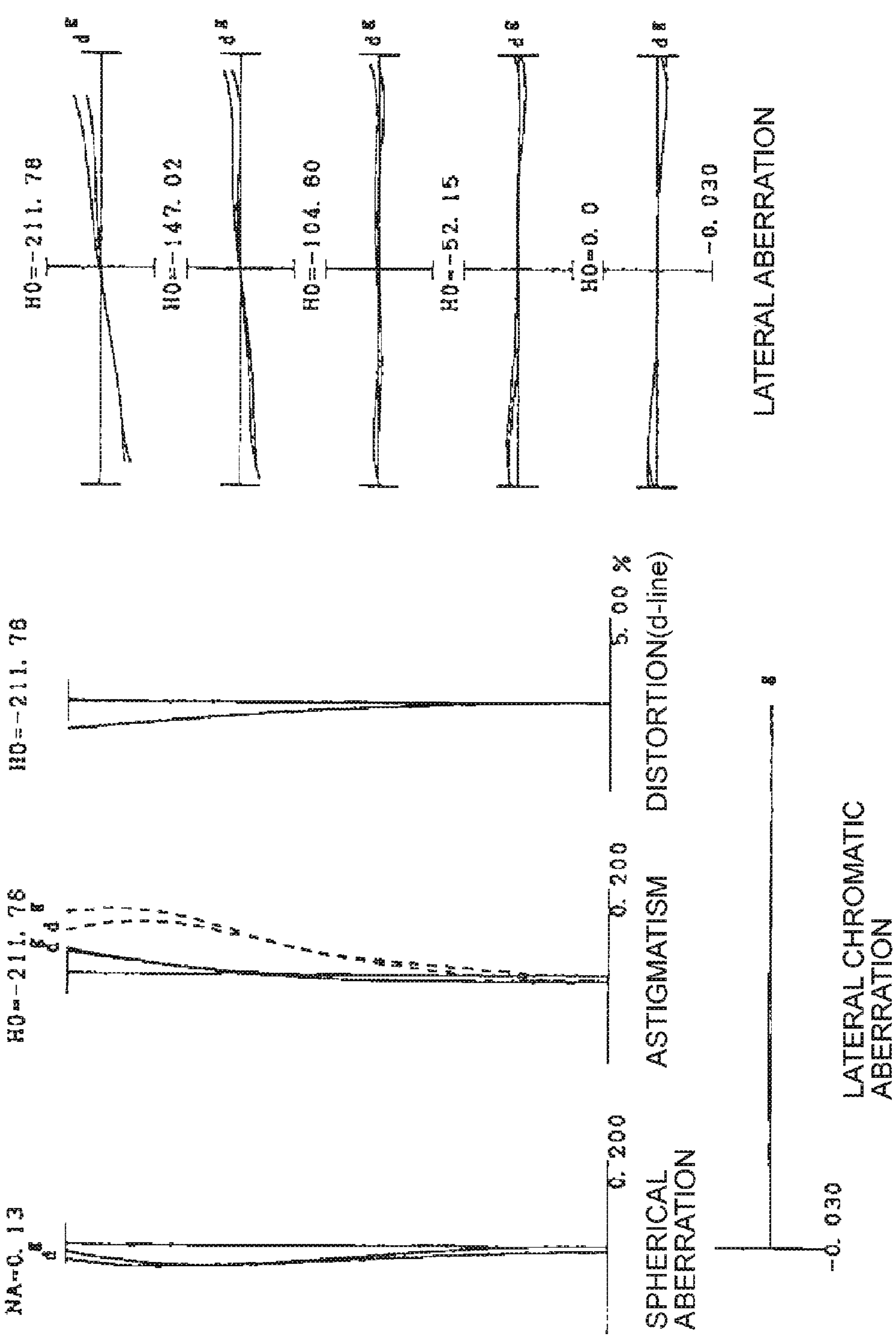
Figure 21C:
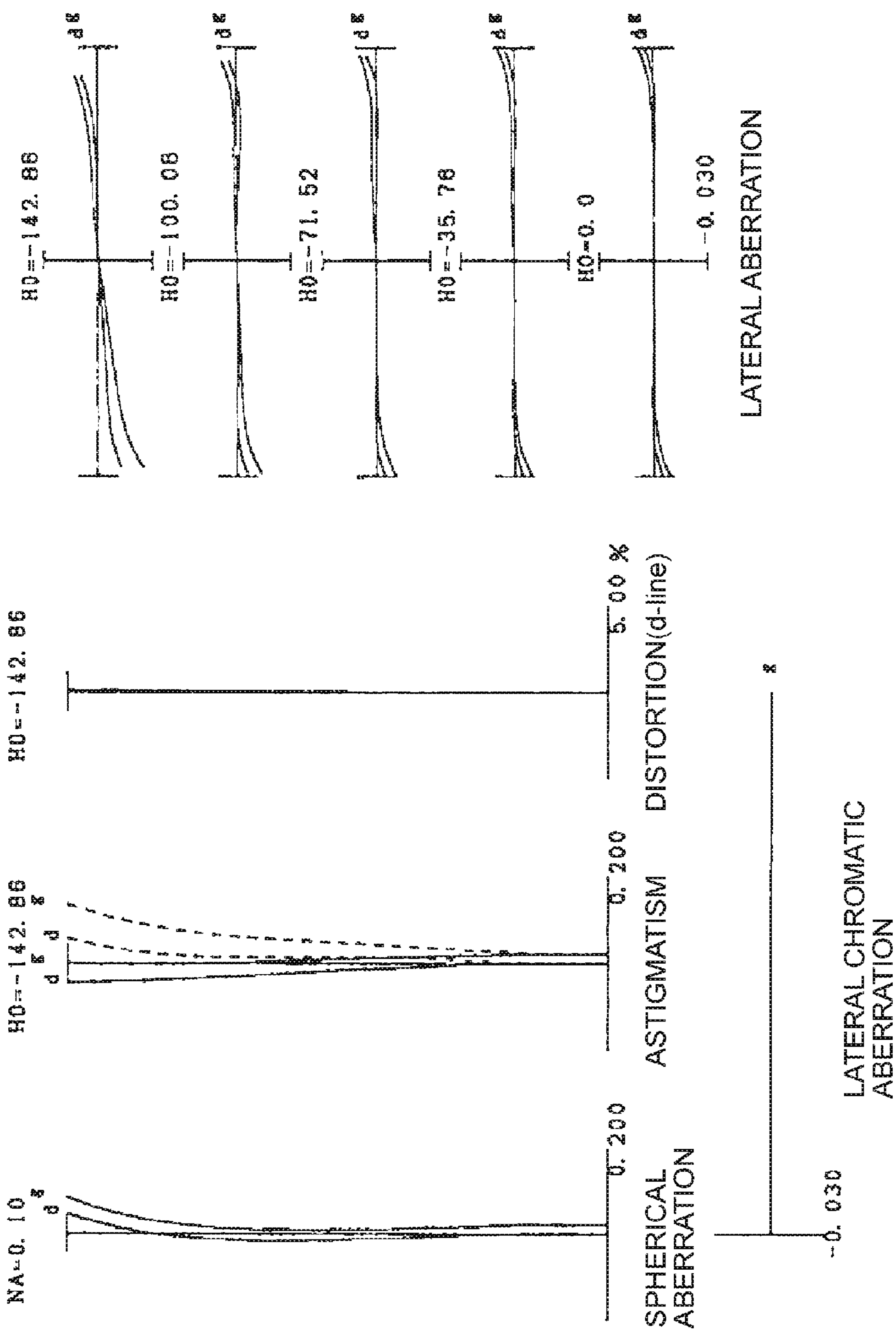
Figure 22:
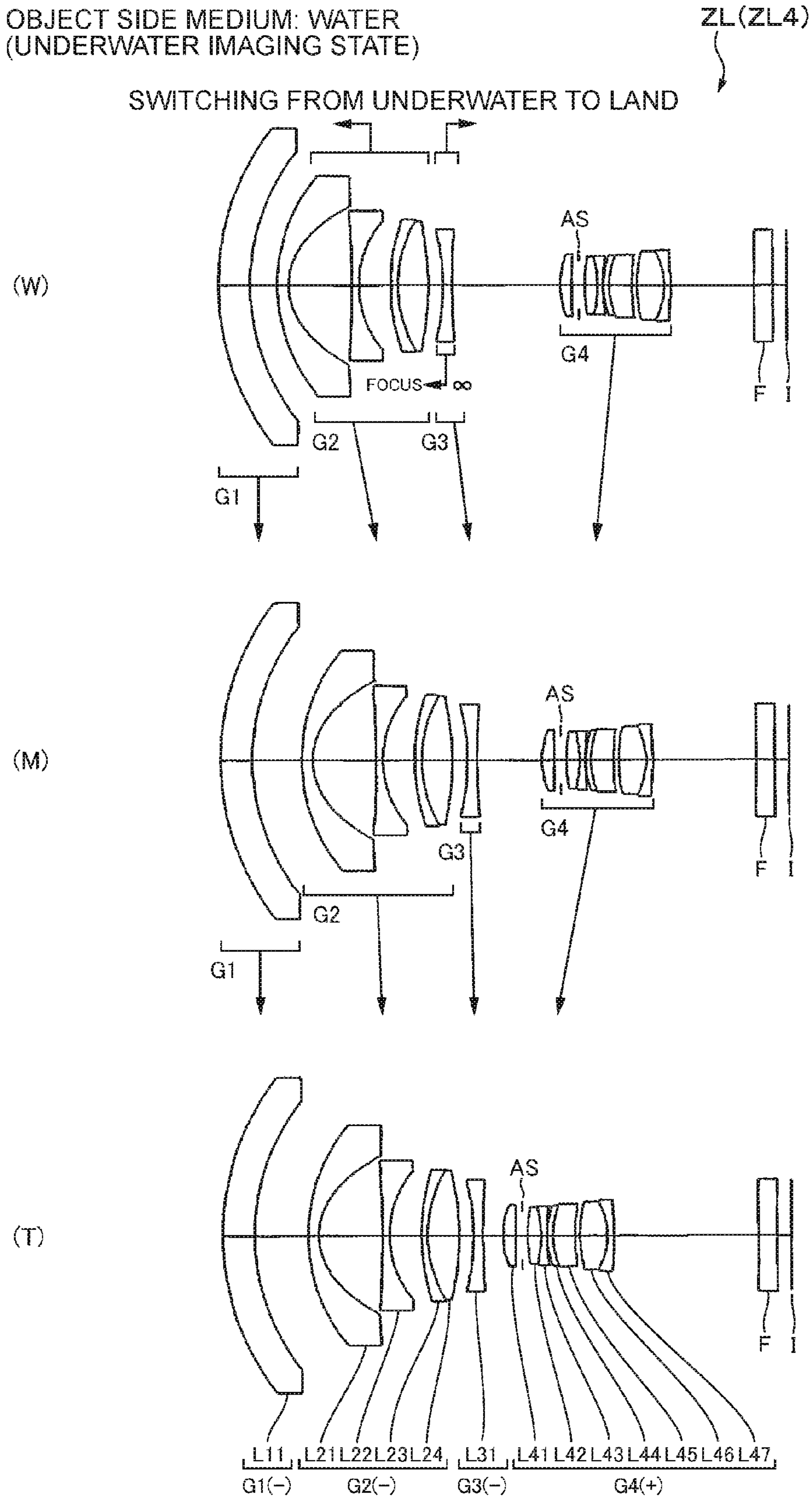
FIG. 22 illustrates a sectional view showing the lens configuration of the optical system according to Example 4 in case the object side medium is water, and a diagram showing a moving locus of each group from the wide-angle end state (W) to the telephoto end state (T) through the intermediate focal length state (M).

Example 4 is described with reference to FIGS. 19 to 24A, 24B and 24C, and Table 4. An optical system ZL (ZL4) according to the present example is an optical system capable of imaging in two object side media whose refractive indexes are different from each other. Note that the object side medium of a low refractive index is "air," while the object side medium of a high refractive index is "water." FIG. 19 illustrates a sectional view showing a lens configuration of the optical system according to Example 4 in case the object side medium is air (land imaging state). FIG. 22 illustrates a sectional view showing a lens configuration of the optical system according to Example 4 in case the object side medium is water (underwater imaging state).

The optical system ZL4 according to Example 4 is composed of, as shown in FIG. 19 and FIG. 22, in order from an object, a first lens group G1 having negative refractive power, a second lens group G2 having negative refractive power, a third lens group G3 having negative refractive power, and a fourth lens group G4 having positive refractive power.

The first lens group G1 is composed of a negative meniscus lens L11 having a concave surface facing the image.

The second lens group G2 is composed of, in order from the object, a negative meniscus lens L21 having a concave surface facing the image, a biconcave lens L22, and a cemented lens composed of a negative meniscus lens L23 having a concave surface facing the image and a biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from the object, a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens composed of a biconvex lens L46 and a negative meniscus lens L47 having a concave surface facing the object. The image side surface of the negative meniscus lens L47 is an aspherical surface.

A filter group F is disposed on the image side of the fourth lens group G4. The filter group F is composed of a low-pass filter for cutting a spatial frequency more than a marginal dissector of image sensors such as a CCD disposed at the image surface I, and a CMOS, a cover-glass of an image sensor, etc.

The image surface I is formed on the image sensor which is composed of unillustrated CCDs, CMOSs, etc.

A position of the first lens group G1 on the optical axis fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state) and it is in the infinity focusing state, the second lens group G2 and the third lens group G3 are independently moved upon zooming. In case the object side medium is water (underwater imaging state), the second lens group G2 and the third lens group G3 are independently moved upon zooming. Moreover, in case the object side medium is any one of air and water (also in any one of the land underwater imaging states), the fourth lens group G4 is moved upon zooming so that the same locus is drawn.

Upon focusing on from infinity to a point-blank range object, the third lens group G3 is moved to the object side.

When changing the object side media, the second lens group G2 and the third lens group G3 are moved on the optical axis. When changing the object side media, for example, from air (land imaging state) having a low refractive index medium to water (underwater imaging state) having a high refractive index medium, as shown in FIG. 19, the second lens group G2 is moved to the image side, and the third lens group G3 is moved to the object side. Moreover, when changing the object side media from water (underwater imaging state) having a high refractive index medium to air (land imaging state) having a low refractive index medium, as shown in FIG. 22, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes upon zooming and when changing the object side media. The distance between the second lens group G2 and the third lens group G3 changes in upon zooming and when changing the object side media. The distance between the third lens group G3 and the fourth lens group G4 changes in upon zooming and when changing the object side media.

The following table 4 illustrates values of each general data in Example 4. The surface numbers 1 to 25 in Table 4 correspond to each optical surface of m1 to m25 shown in FIG. 19.

TABLE 4

[Object side medium]

| | |
|---|---|
| Medium 1: Air | n(d) = 1.00000 |
| Medium 2: Water | n(d) = 1.33306, νd = 54.0 |

[Lens data]

| Surface number | R | D | n(d) | νd |
|---|---|---|---|---|
| 1 | 38.05721 | 4.593 | 1.51680 | 63.9 |
| 2 | 31.80831 | (D2) | 1.00000 | |
| 3 | 24.94172 | 1.600 | 1.69412 | 53.4 |
| *4 | 9.29586 | 9.233 | 1.00000 | |
| 5 | −146.35107 | 1.000 | 1.77387 | 47.2 |
| *6 | 14.89220 | 4.678 | 1.00000 | |
| 7 | 29.95492 | 1.000 | 1.49782 | 82.6 |
| 8 | 18.43531 | 4.518 | 1.83400 | 37.2 |
| 9 | −41.39595 | (D9) | 1.00000 | |
| 10 | −32.47753 | 1.350 | 1.80400 | 46.6 |
| 11 | 98.49830 | (D11) | 1.00000 | |
| 12 | 11.74324 | 1.775 | 1.51680 | 63.9 |
| 13 | 619.03546 | 1.000 | 1.00000 | |
| 14 | (Aperture stop AS) | 0.800 | 1.00000 | |
| 15 | 23.46307 | 1.923 | 1.49782 | 82.6 |
| 16 | −16.20563 | 0.800 | 1.74400 | 44.8 |
| 17 | 31.01703 | 0.100 | 1.00000 | |
| 18 | 13.25577 | 0.800 | 1.85026 | 32.4 |
| 19 | 11.26487 | 3.298 | 1.51680 | 63.9 |
| 20 | 36.45309 | 0.729 | 1.00000 | |
| 21 | 21.87462 | 3.970 | 1.49782 | 82.6 |
| 22 | −10.28577 | 1.000 | 1.77387 | 47.2 |
| *23 | −32.75697 | (D23) | 1.00000 | |
| 24 | 0.00000 | 2.790 | 1.51680 | 64.1 |
| 25 | 0.00000 | (D25) | 1.00000 | |

[Aspheric surface data]

| Surface | κ | A4 | A6 | A8 | A10 |
|---|---|---|---|---|---|
| 4 | −1.14130e+00 | 2.50589e−04 | −1.03859e−06 | 9.17991e−09 | −3.59220e−11 |
| 6 | −4.22670e+00 | 2.08688e−04 | −1.25463e−06 | 1.08410e−08 | −3.79158e−11 |
| 23 | 7.54800e−01 | 2.06373e−04 | 8.15386e−07 | 2.83677e−08 | −4.14939e−10 |

TABLE 4-continued

[Various data]

| | W | M | T |
|---|---|---|---|
| (Medium 1: Air) | | | |
| f | 7.20 | 9.30 | 13.60 |
| FNo | 3.55 | 3.97 | 4.81 |
| ω | 48.8 | 40.8 | 30.3 |
| Y | 8.00 | 8.00 | 8.00 |
| TL | 82.992 | 82.992 | 82.992 |
| BF | 17.011 | 20.013 | 26.014 |
| BF(Air) | 16.060 | 19.062 | 25.064 |
| (Medium 2: Water) | | | |
| f | 6.00 | 7.57 | 11.01 |
| FNo | 3.55 | 3.97 | 4.81 |
| ω | 45.8 | 38.5 | 28.4 |
| Y | 8.00 | 8.00 | 8.00 |
| TL | 82.992 | 82.992 | 82.992 |
| BF | 17.011 | 20.013 | 26.014 |
| BF(Air) | 16.060 | 19.062 | 25.064 |

[Variable distance data]

| | Upon focusing on infinity | | | Upon focusing on point-blank range | | |
|---|---|---|---|---|---|---|
| | W | M | T | W | M | T |
| (Medium 1: Air) | | | | | | |
| D0 | ∞ | ∞ | ∞ | 217.00 | 217.00 | 217.00 |
| β | — | — | — | −0.0301 | −0.0384 | −0.0559 |
| f | 7.20 | 9.30 | 13.60 | — | — | — |
| D2 | 1.999 | 5.107 | 6.253 | 1.999 | 5.107 | 6.253 |
| D9 | 5.116 | 5.208 | 4.570 | 4.519 | 4.627 | 3.993 |
| D11 | 14.701 | 8.505 | 2.000 | 15.298 | 9.086 | 2.576 |
| D23 | 12.122 | 15.123 | 21.125 | 12.122 | 15.123 | 21.125 |
| D25 | 2.099 | 2.099 | 2.099 | 2.099 | 2.099 | 2.099 |
| (Medium 2: Water) | | | | | | |
| D0 | ∞ | ∞ | ∞ | 217.00 | 217.00 | 217.00 |
| β | — | — | — | −0.0329 | −0.0413 | −0.0596 |
| f | 6.00 | 7.57 | 11.01 | — | — | — |
| D2 | 3.905 | 7.098 | 7.691 | 3.905 | 7.098 | 7.691 |
| D9 | 2.141 | 2.183 | 2.102 | 1.600 | 1.668 | 1.600 |
| D11 | 15.779 | 9.545 | 3.026 | 16.319 | 10.059 | 3.529 |
| D23 | 12.122 | 15.123 | 21.125 | 12.122 | 15.123 | 21.125 |
| D25 | 2.099 | 2.099 | 2.099 | 2.099 | 2.099 | 2.099 |

[Lens group data]
(Medium 1: Air)

| Lens group | Front end surface | Focal length |
|---|---|---|
| First lens group | 1 | −500.07 |
| Second lens group | 3 | −95.84 |
| Third lens group | 10 | −30.24 |
| Fourth lens group | 12 | 16.38 |

[Values corresponding to the conditional expressions]

Conditional expression (1) R1/Ymax = 4.757
Conditional expression (2) f2/f3 = 3.169
Conditional expression (3) R1/R2 = 1.196

Based on Table 4, in the optical system ZL4 according to Example 4 it is understandable that the conditional expressions (1) to (3) are satisfied.

Figure 20A:
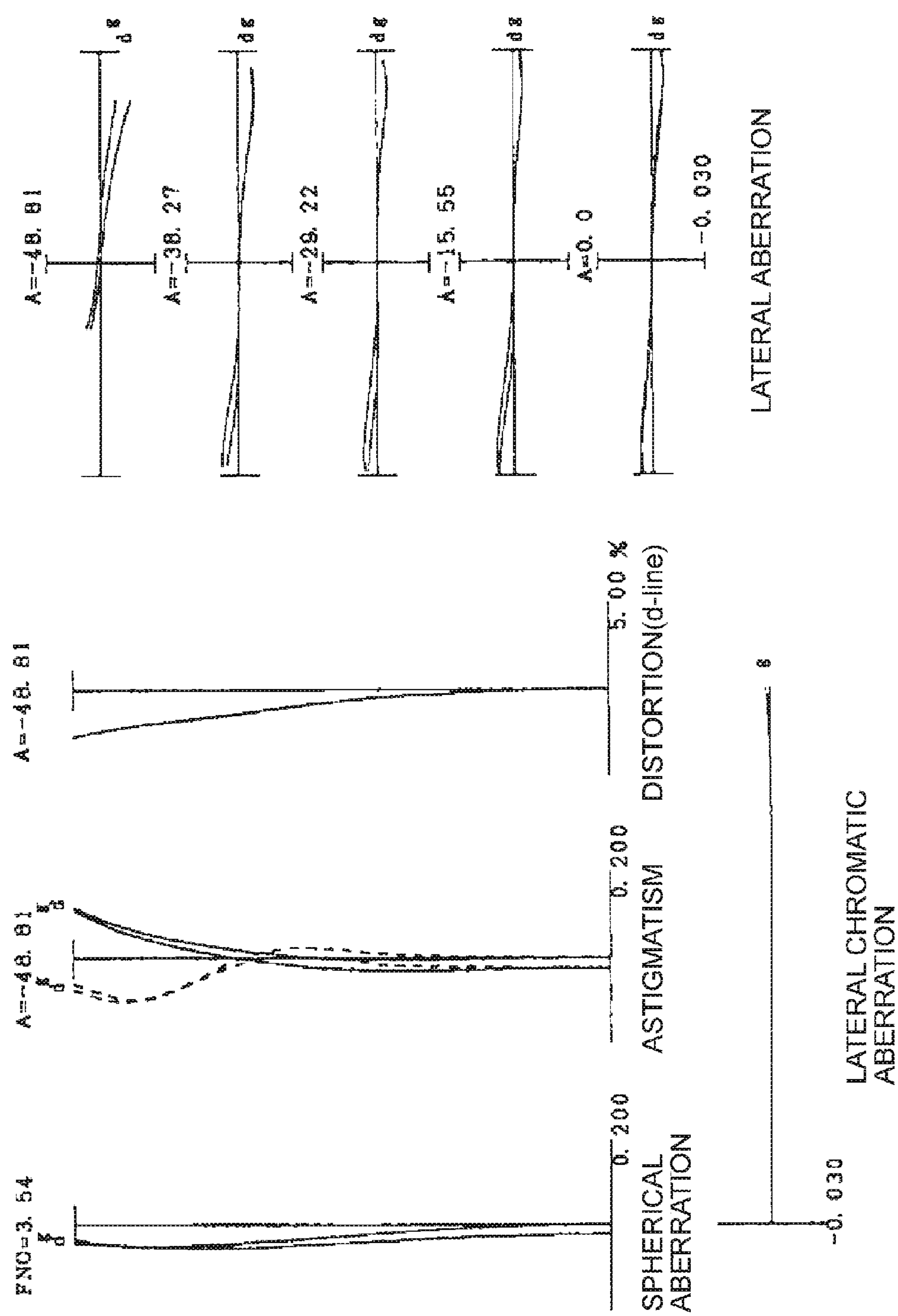
FIGS. 20A, 20B and 20C illustrate a graph showing aberrations in an infinity focusing state of the optical system according to Example 4 in case the object side medium is air, where
Figure 20B:
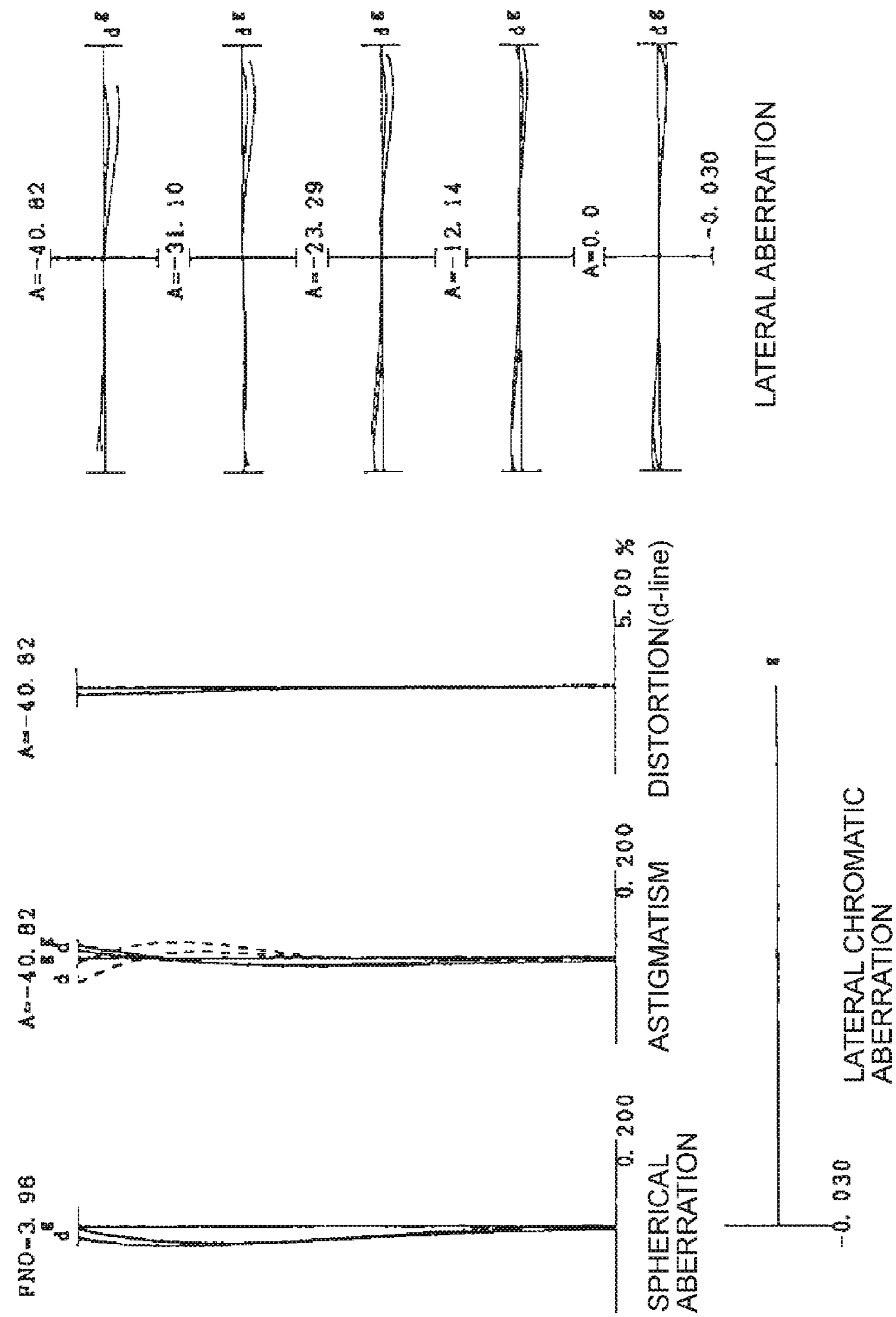
Figure 20C:
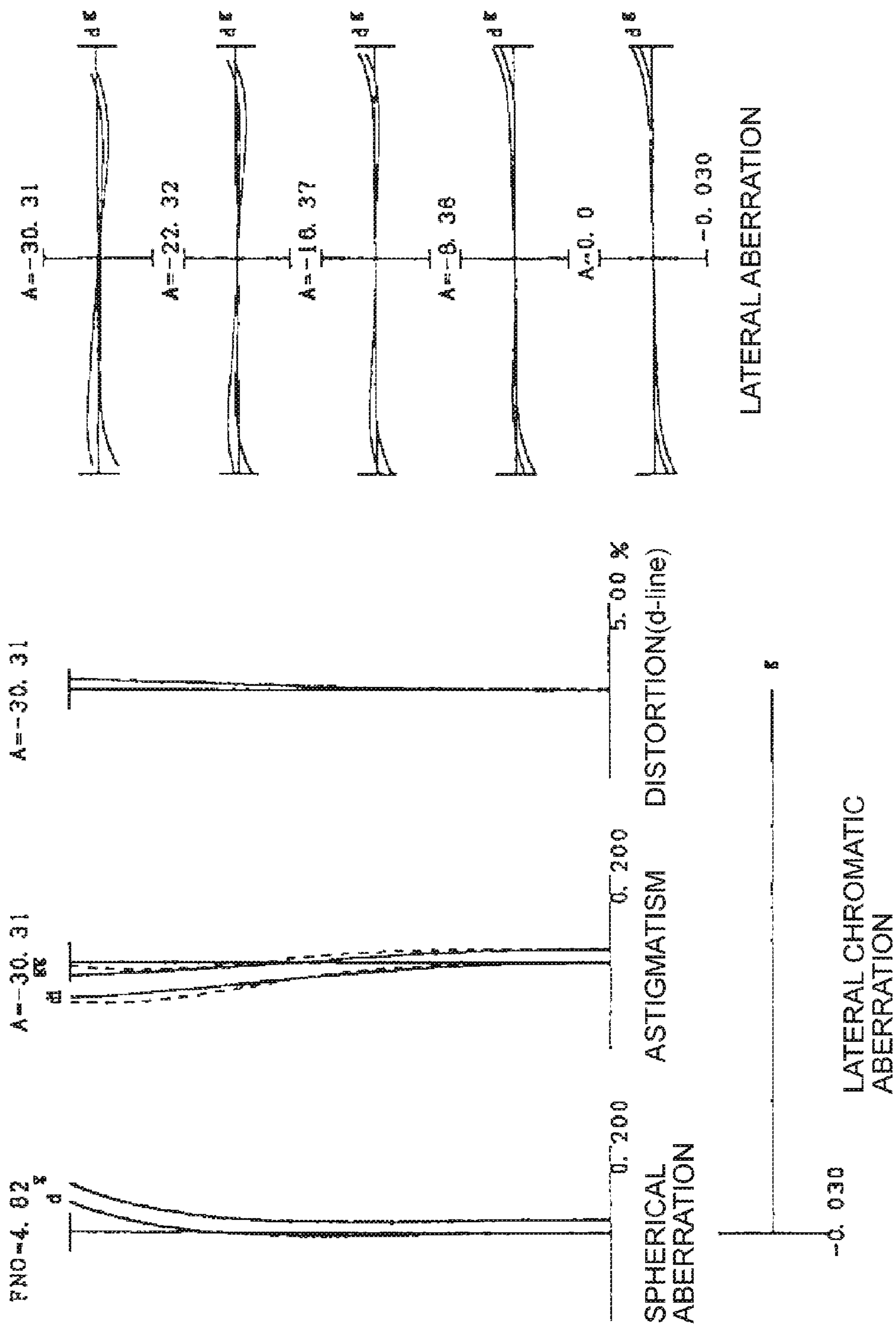
Figure 23A:
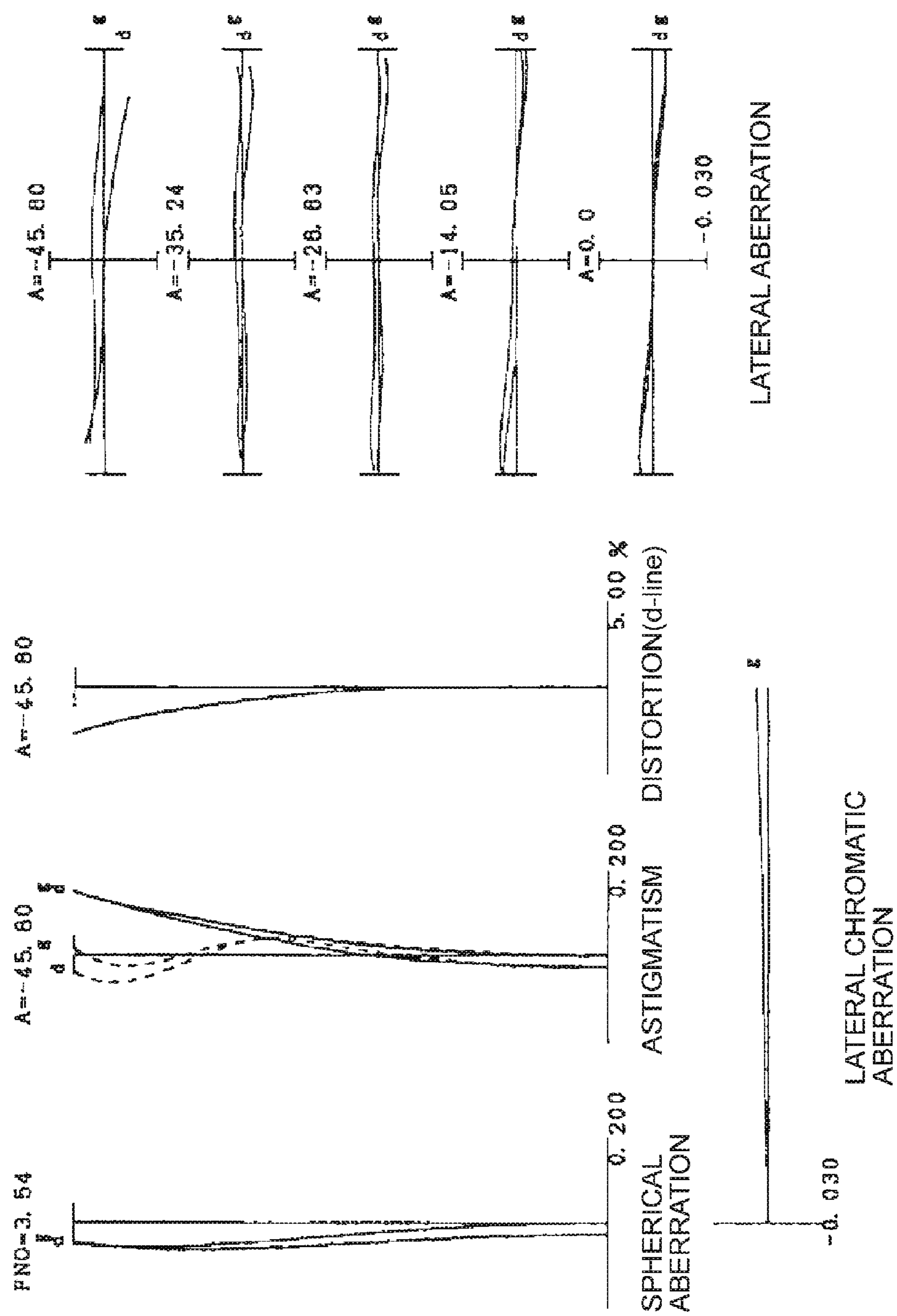
FIGS. 23A, 23B and 23C illustrate a graph showing aberrations in an infinity focusing state of the optical system according to Example 4 in case the object side medium is water, where
Figure 23B:
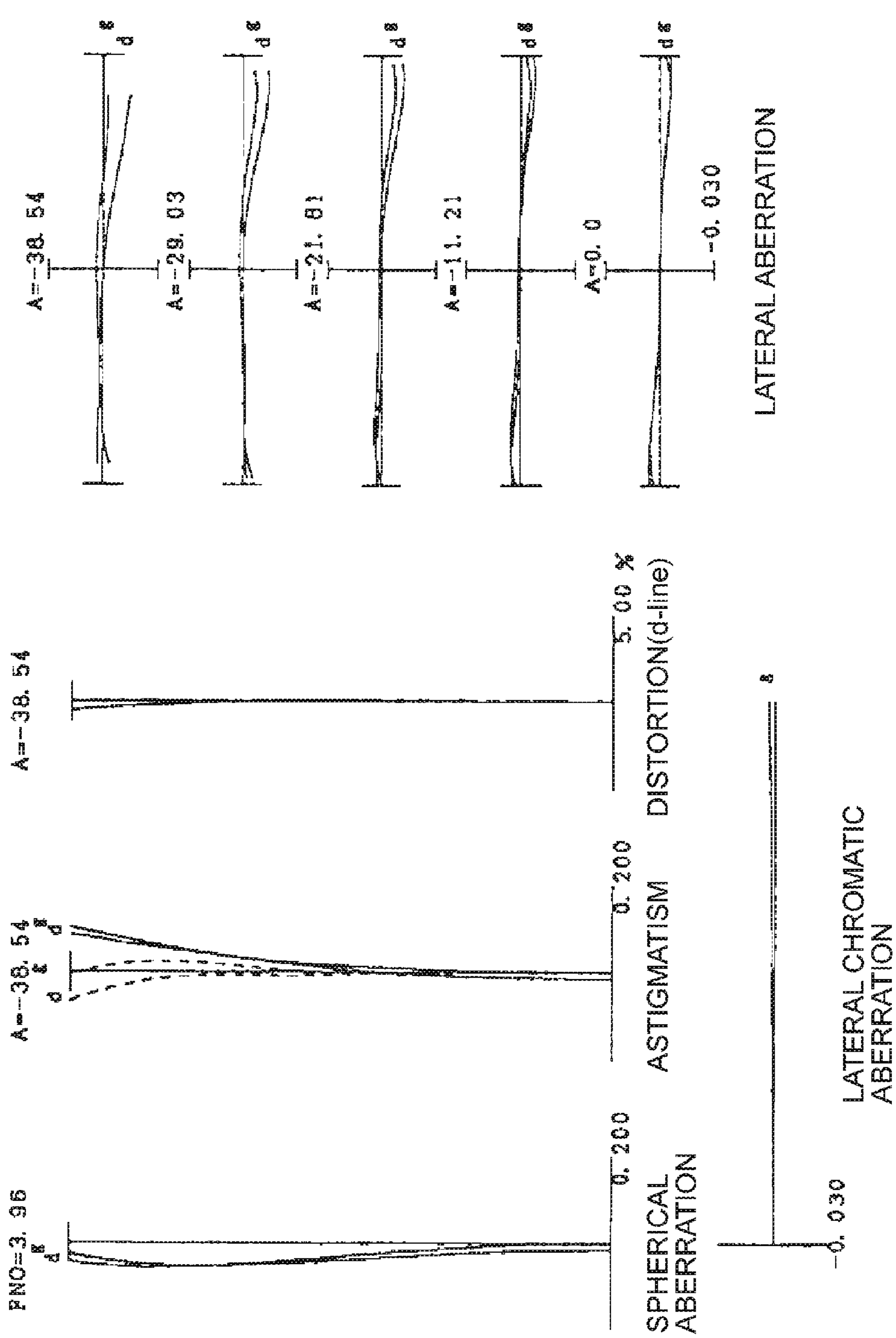
Figure 23C:
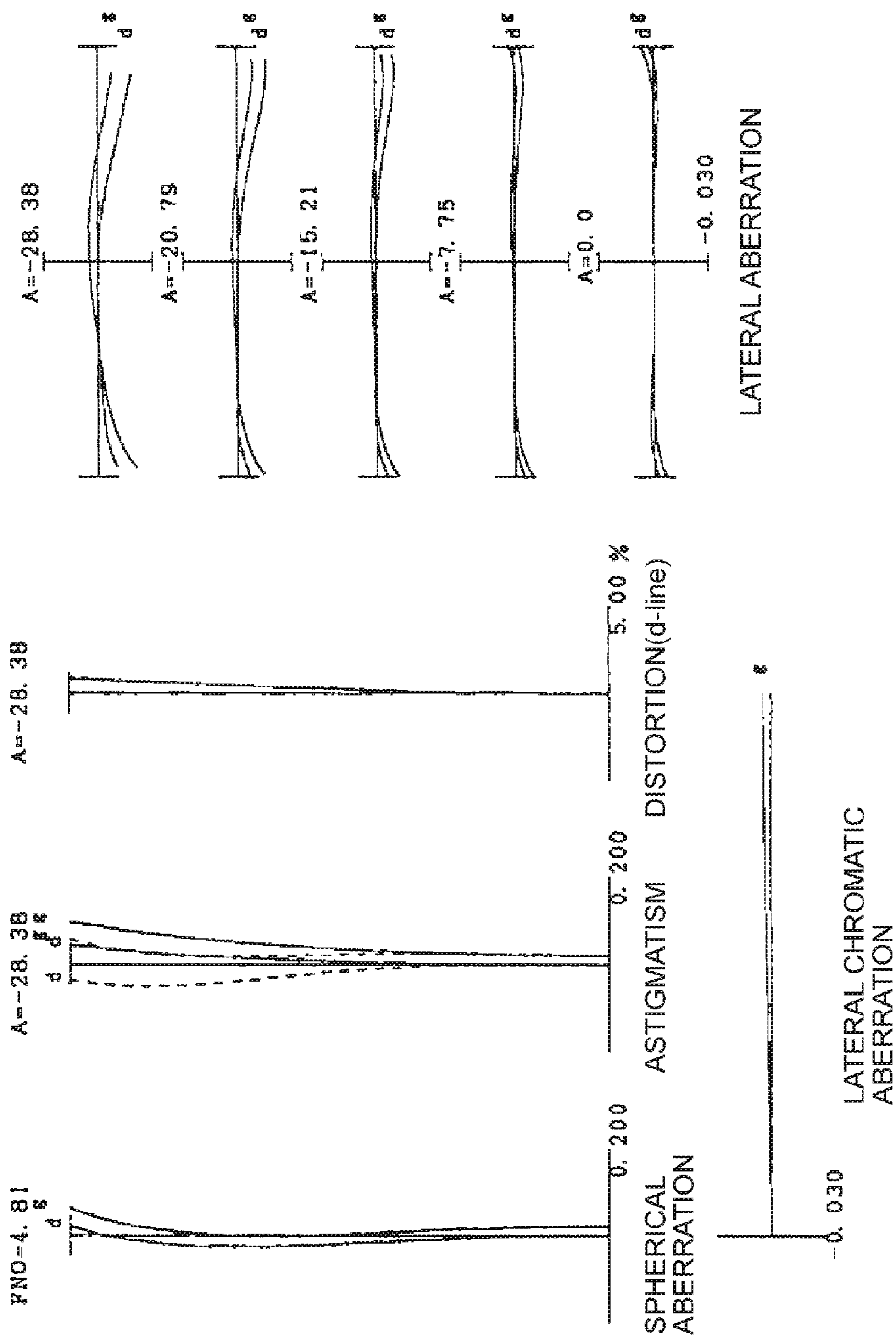
Figure 24A:
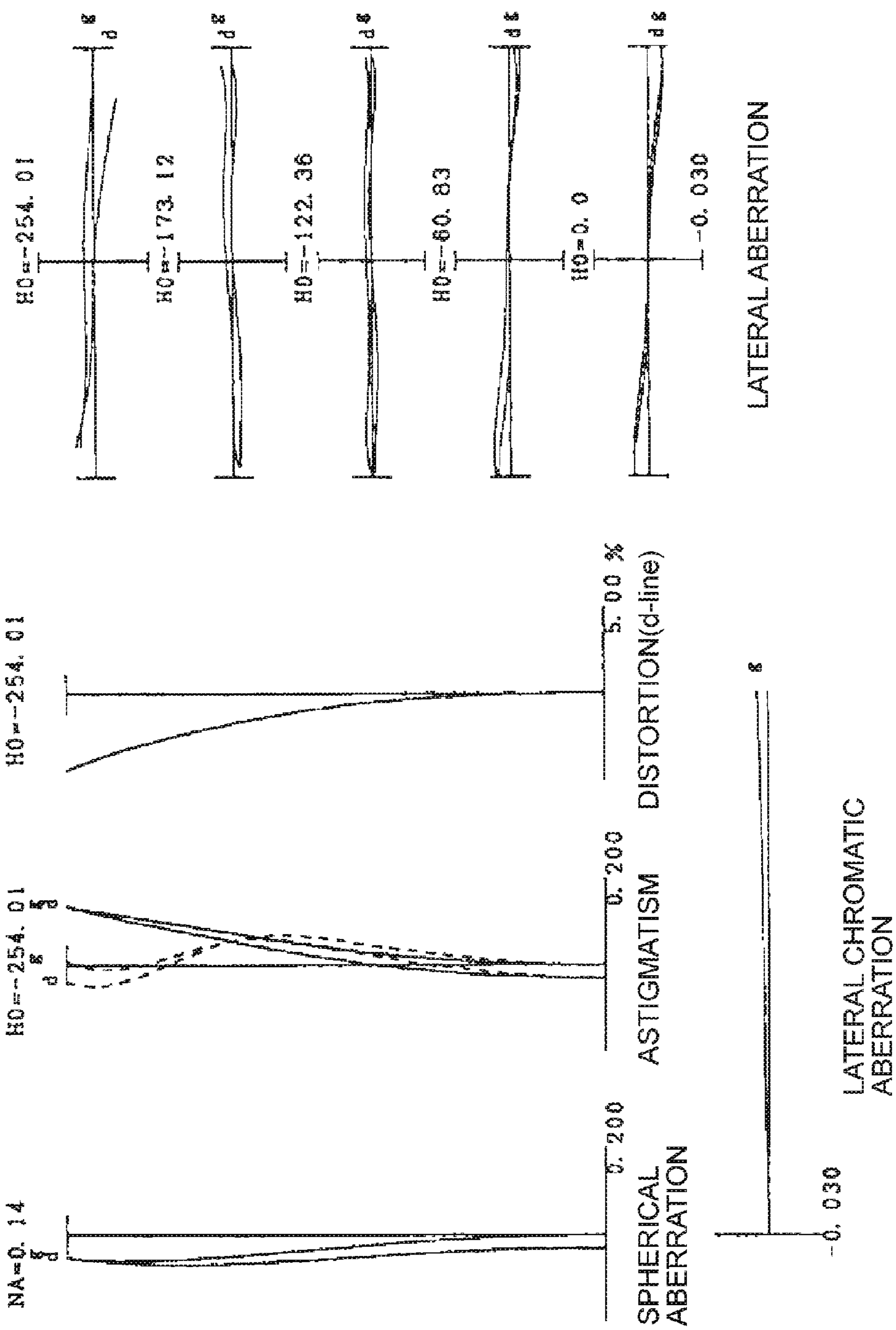
FIGS. 24A, 24B and 24C illustrate a graph showing aberrations in a point-blank range focusing state of the optical system according to Example 4 in case the object side medium is water, where
Figure 24B:
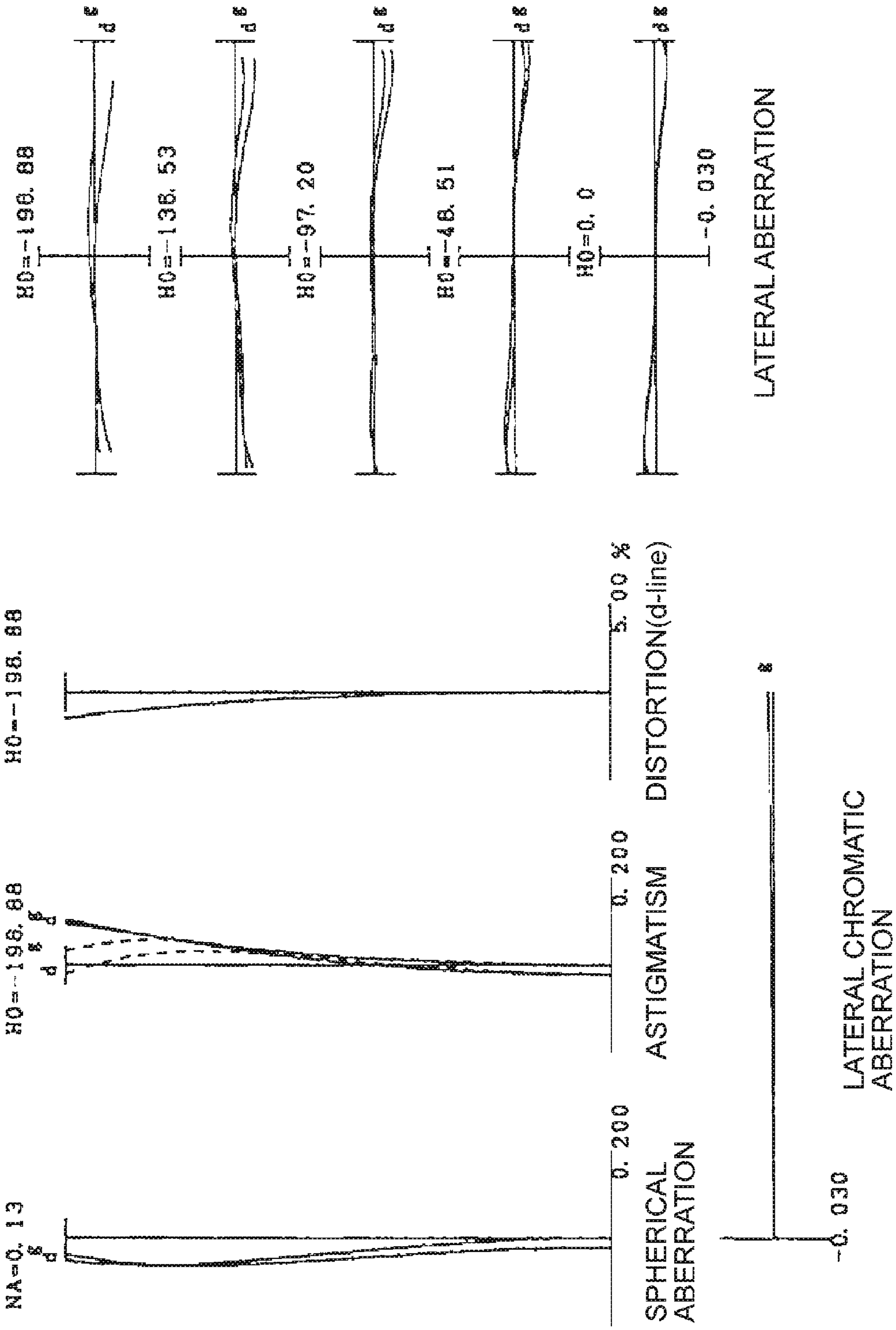
Figure 24C:
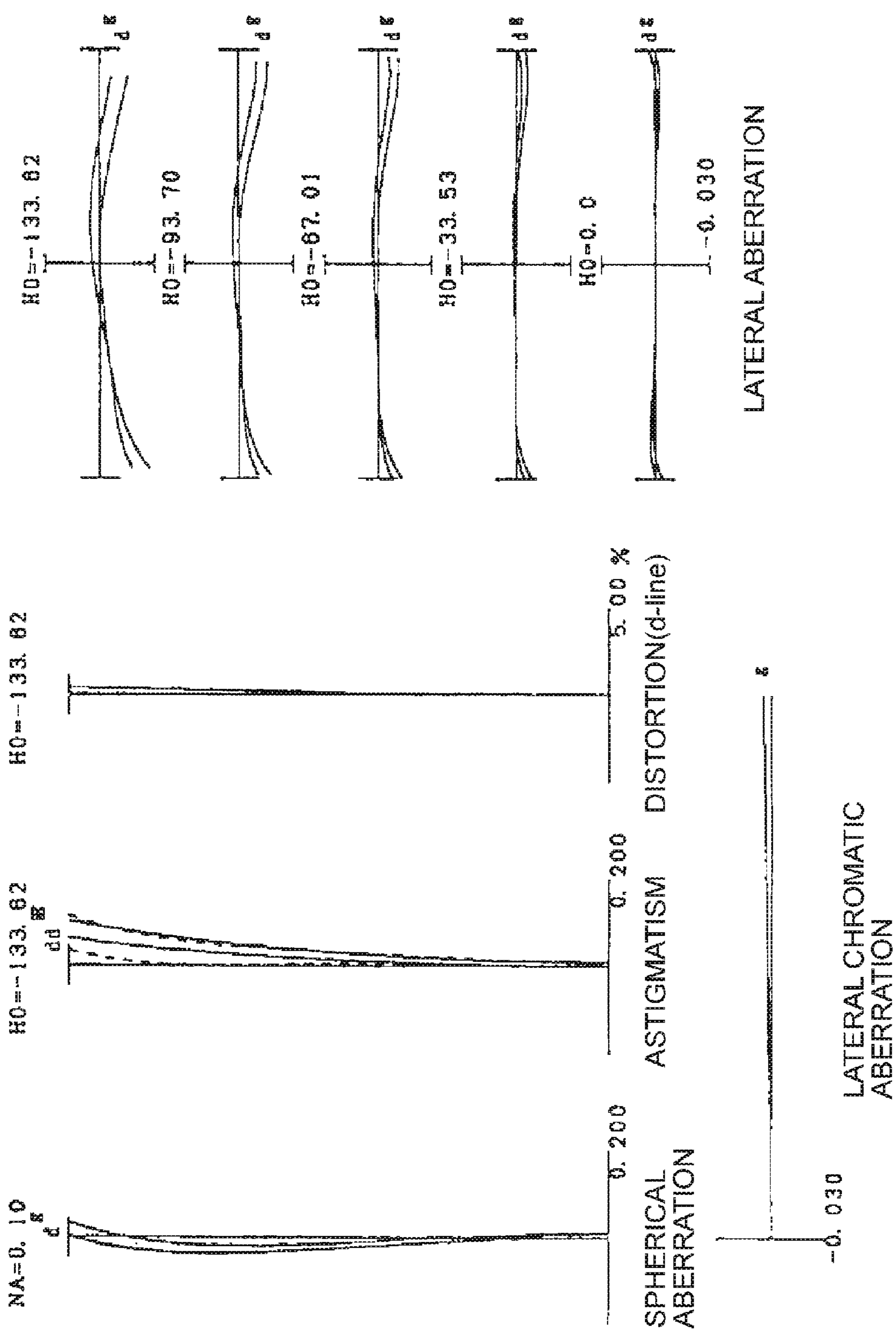

FIGS. 20A, 20B and 20C illustrate a graph showing various aberrations in an infinity focusing state of the optical system ZL4 according to Example 4 in case the object side medium is air, where FIG. 20A depicts the wide-angle end state, FIG. 20B depicts the intermediate focal length state, and FIG. 20C depicts the telephoto end state. FIGS. 21A, 21B and 21C illustrate a graph showing various aberrations in a point-blank range focusing state of the optical system ZL4 according to Example 4 in case the object side medium is air, where FIG. 21A depicts the wide-angle end state, FIG. 21B depicts the intermediate focal length state, and FIG. 21C depicts the telephoto end state. FIGS. 23A, 23B and 23C illustrate a graph showing various aberrations in an infinity focusing state of the optical system ZL4 according to Example 4 in case the object side medium is water, where FIG. 23A depicts the wide-angle end state, FIG. 23B depicts the intermediate focal length state, and FIG. 23C depicts the telephoto end state. FIGS. 24A, 24B and 24C illustrate a graph showing various aberrations in a point-blank range focusing state of the optical system ZL4 according to Example 4 in case the object side medium is water, where FIG. 24A depicts the wide-angle end state, FIG. 24B depicts the intermediate focal length state, and FIG. 24C depicts the telephoto end state.

According to each graph showing aberrations in FIGS. 20A, 20B and 20C, FIGS. 21A, 21B and 21C, FIGS. 23A, 23B and 23C, and FIGS. 24A, 24B and 24C, in the optical system ZL4 according to Example 4, it is possible to appropriately correct, regardless of the object side medium, various aberrations in any imaging states covering a range from a wide-angle end state to a telephoto end state and a range from an infinity focusing state to a point-blank focusing state, and have good optical performance.

EXAMPLE 5

Figure 25:
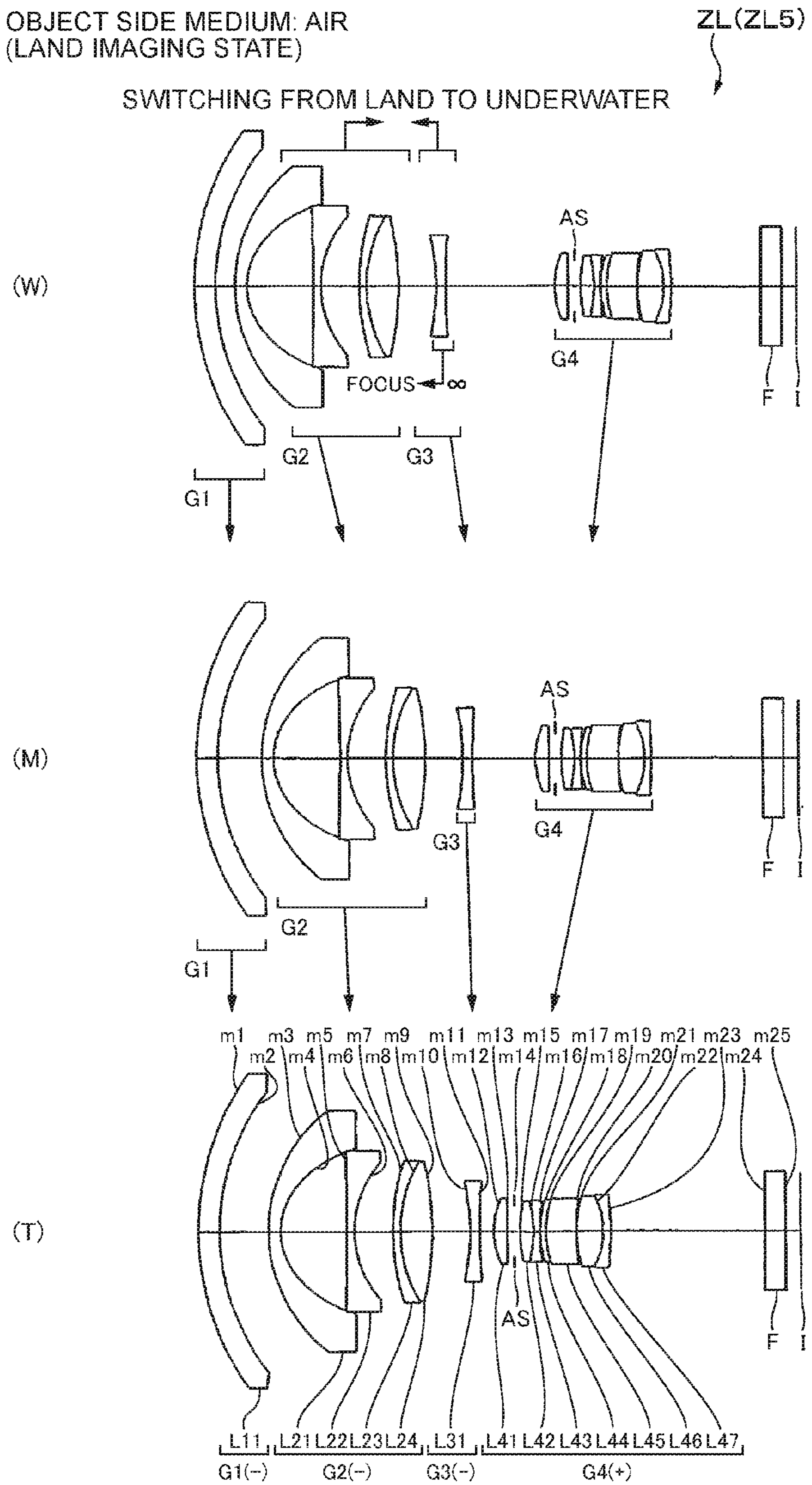
FIG. 25 illustrates a sectional view showing a lens configuration of the optical system according to Example 5 in case the object side medium is air, and a diagram showing a moving locus of each group from a wide-angle end state (W) to a telephoto end state (T) through an intermediate focal length state (M).
Figure 27A:
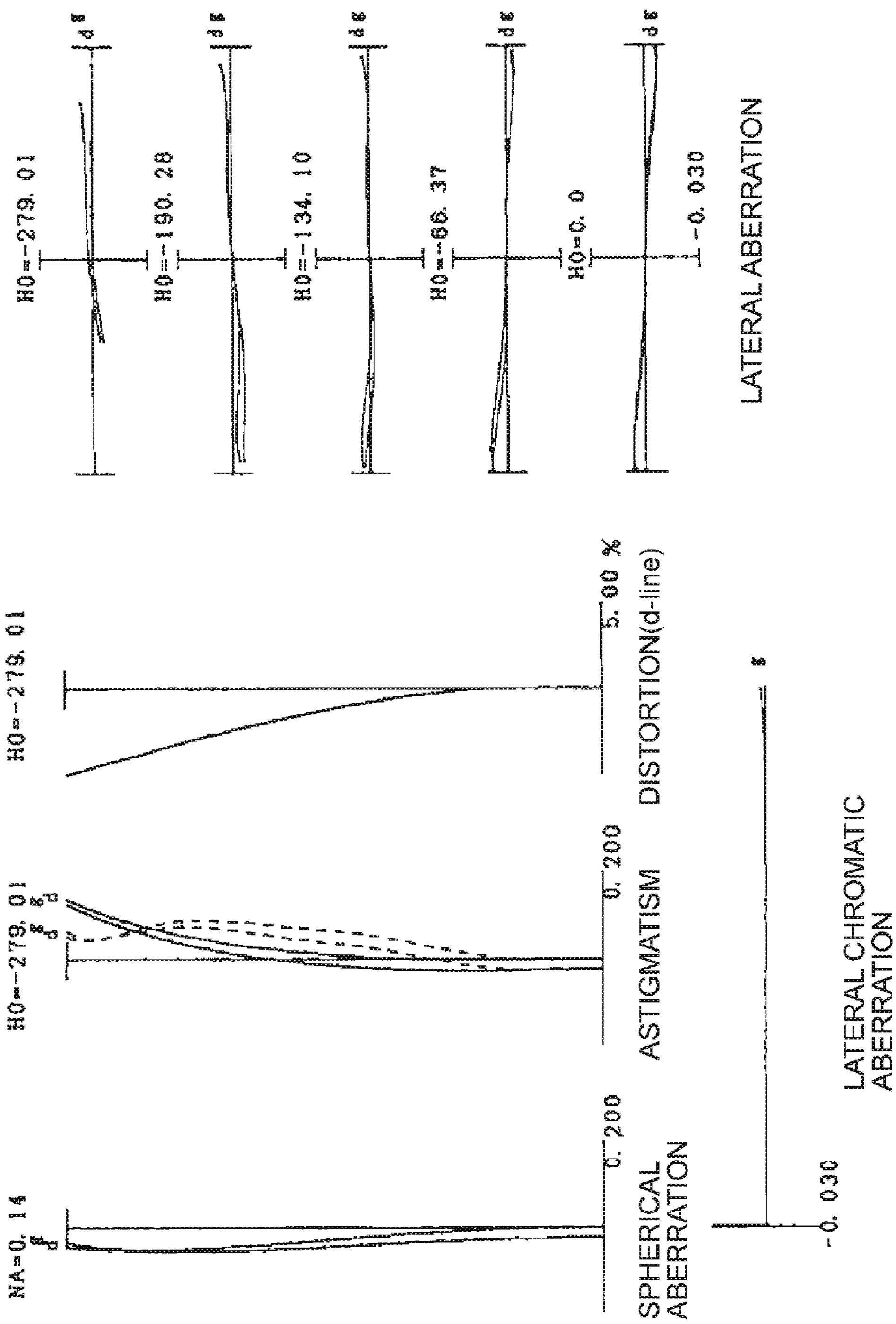
FIGS. 27A, 27B and 27C illustrate a graph showing aberrations in a point-blank range focusing state of the optical system according to Example 5 in case the object side medium is air, where
Figure 27B:
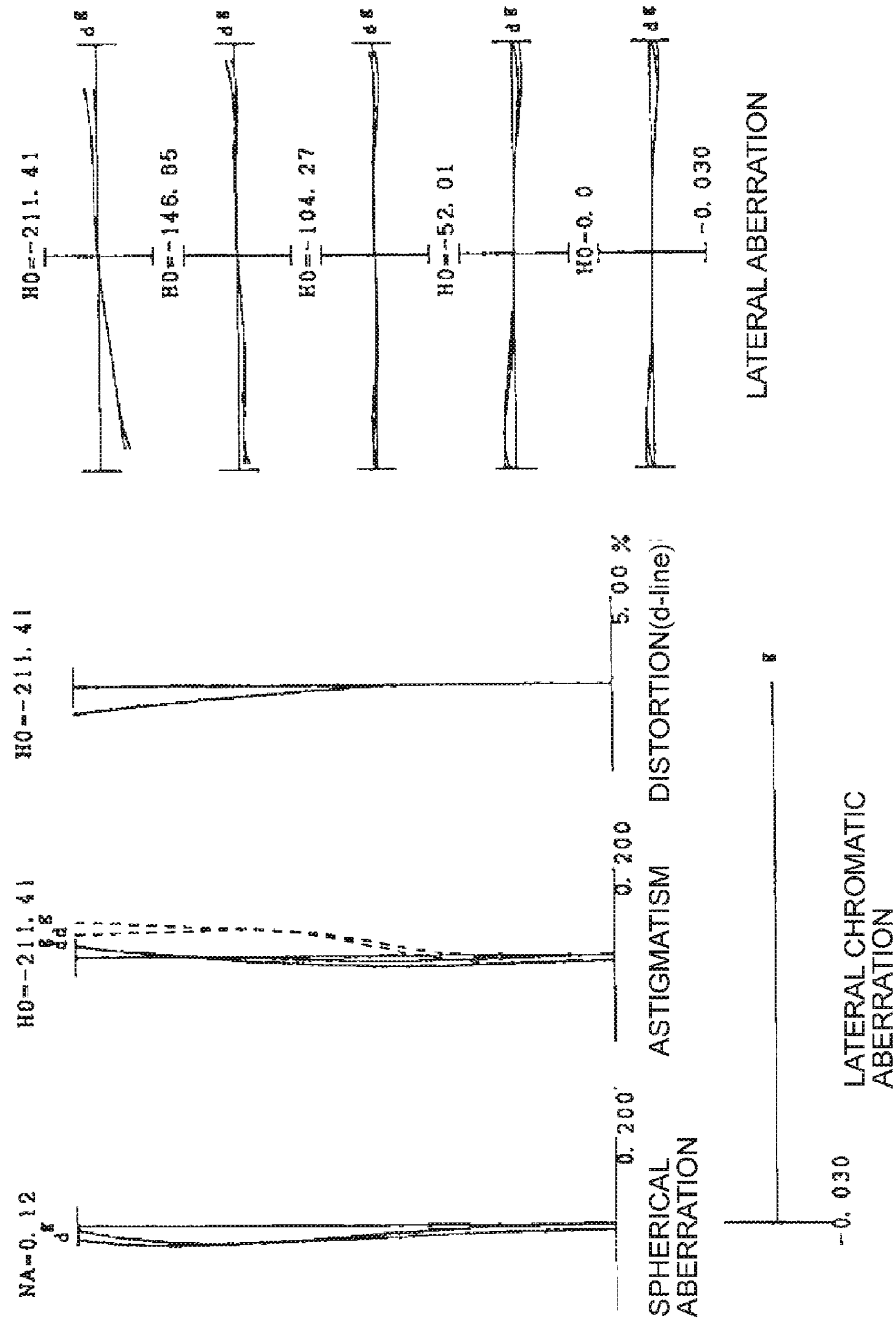
Figure 27C:
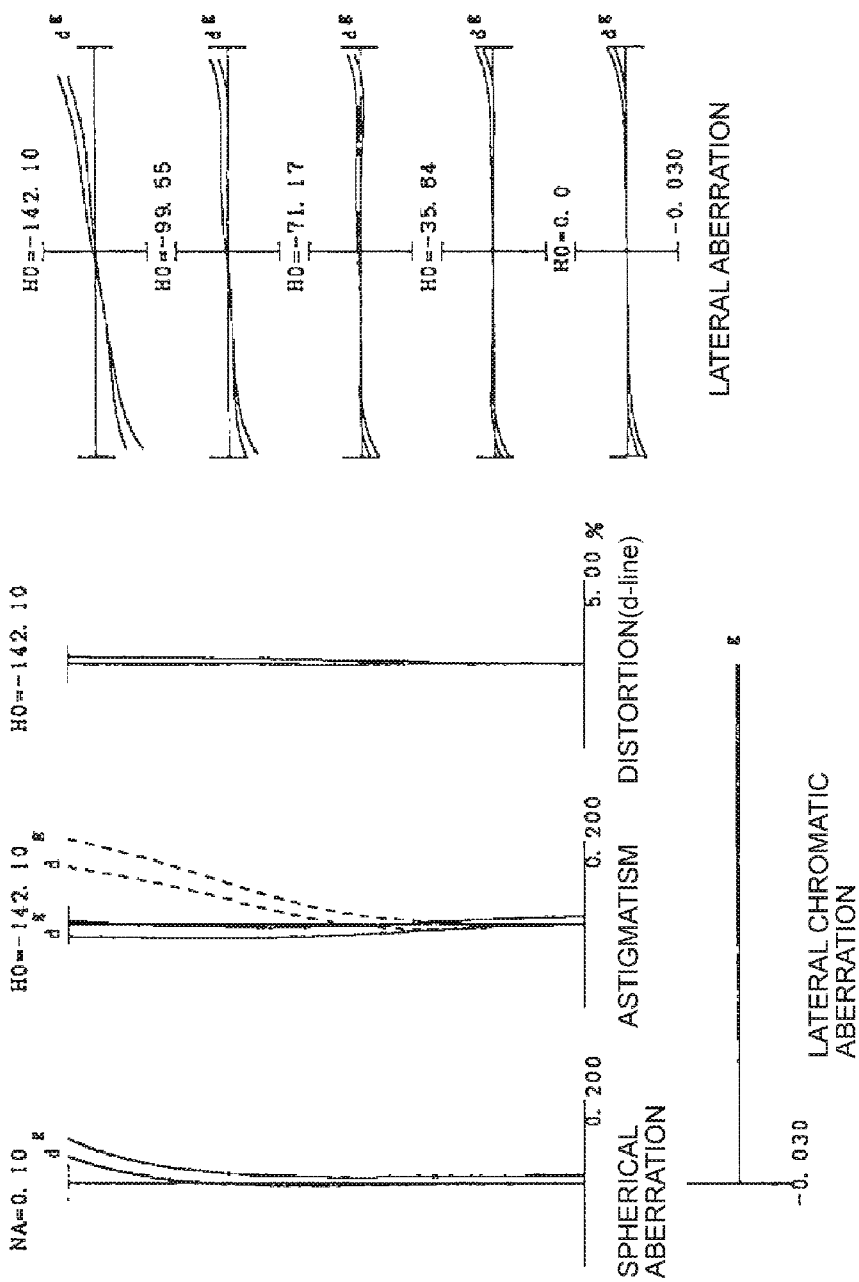
Figure 28:
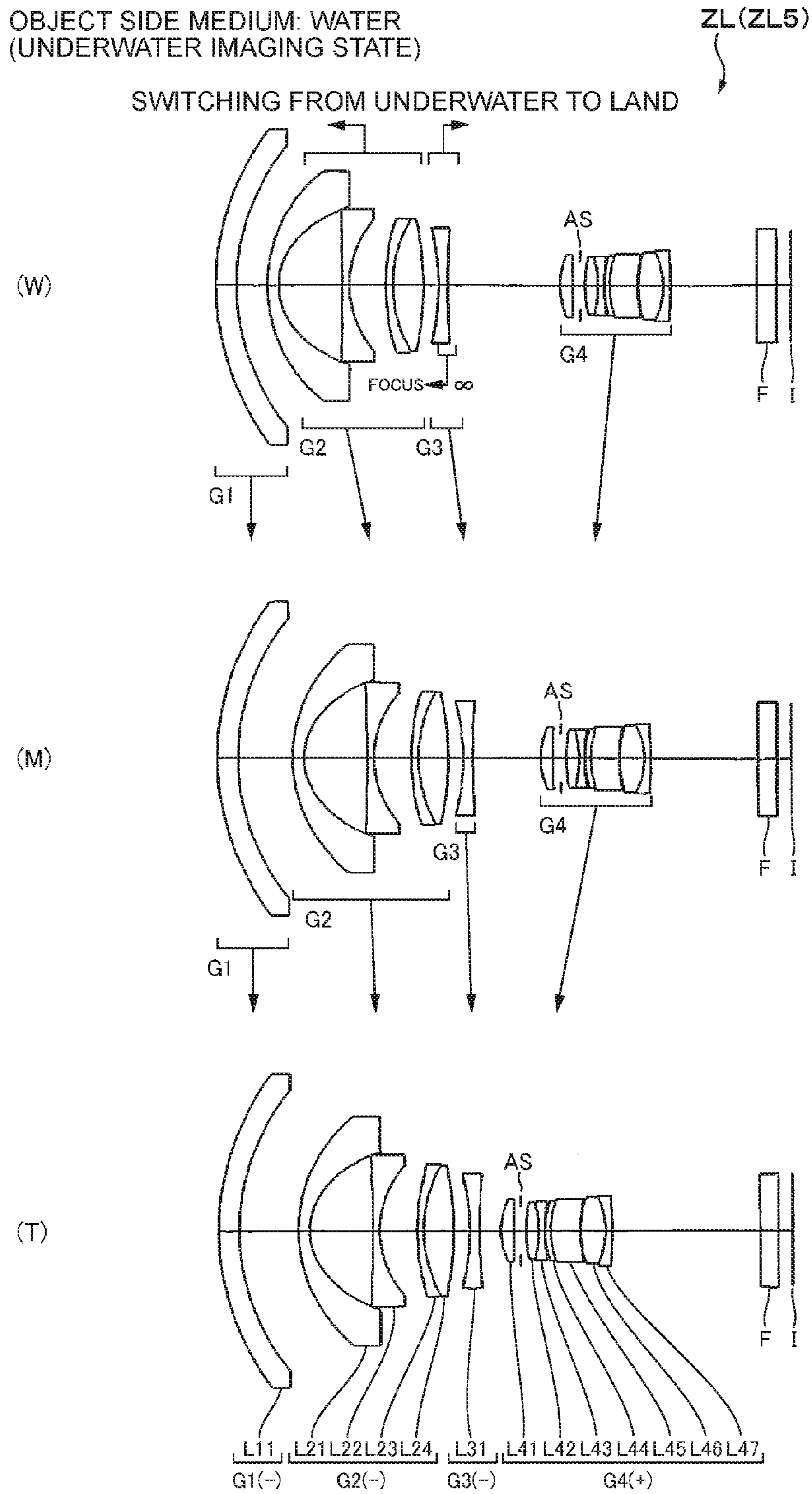
FIG. 28 illustrates a sectional view showing a lens configuration of the optical system according to Example 5 in case the object side medium is water, and a diagram showing a moving locus of each group from the wide-angle end state (W) to the telephoto end state (T) through the intermediate focal length state (M).

Example 5 is described with reference to FIG. 25 to FIGS. 30A, 30B and 30C, and Table 5. The optical system ZL (ZL5) according to the present example is an optical system enabling to shoot in two object side media whose refractive indexes are different from each other. Note that the object side medium of the low refractive index is "air," while the object side medium of the high refractive index is "Water." FIG. 25 illustrates a sectional view showing a lens configuration of the optical system according to Example 5 in case the object side medium is water (land imaging state). FIG. 28 illustrates a sectional view showing a lens configuration of the optical system according to Example 5 in case the object side medium is water (underwater imaging state).

The optical system ZL5 according to Example 5 is composed of, as shown in FIG. 25 and FIG. 28, in order from an object, a first lens group G1 having negative refractive power, a second lens group G2 having negative refractive power, a third lens group G3 having negative refractive power, and a fourth lens group G4 having positive refractive power.

The first lens group G1 is composed of a negative meniscus lens L11 having a concave surface facing the image.

The second lens group G2 is composed of, in order from the object, a negative meniscus lens L21 having a concave surface facing the image, a biconcave lens L22, and a cemented lens composed of a negative meniscus lens L23 having a concave surface facing the image and a biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from the object, a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens of a biconvex lens L46 and a negative meniscus lens L47 having a concave surface facing the object. The image side surface of the negative meniscus lens L47 is an aspherical surface.

A filter group F is disposed on the image side of the fourth lens group G4. The filter group F is composed of a low-pass filter for cutting a spatial frequency more than a marginal dissector of image sensors such as a CCD disposed on the image surface I, and a CMOS, a cover-glass of an image sensor, etc.

The image surface I is formed on the image sensor which is composed of unillustrated CCDs, CMOSs, etc.

A position of the first lens group G1 on the optical axis fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state), the second lens group G2 and the third lens group G3 are independently moved upon zooming. In case the object side medium is water (underwater imaging state), the second lens group G2 and the third lens group G3 are independently moved upon zooming. Moreover, in case the object side medium is any one of air and water (also in any one of the land underwater imaging states), the fourth lens group G4 is moved upon zooming so that the same locus is drawn.

Upon focusing on from an infinity object to a point-blank range object, the third lens group G3 is moved to the object side.

When changing the object side media, the second lens group G2 and the third lens group G3 are moved along the optical axis. When changing the object side media from air (land imaging state) having a low refractive index medium to water (underwater imaging state) having a high refractive index medium, as shown in FIG. 25, the second lens group G2 is moved to the image side, and the third lens group G3 is moved to the object side. Moreover, when changing the object side media from water (underwater imaging state) having a high refractive index medium to air (land imaging state) having a low refractive index medium, as shown in FIG. 28, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes between when zooming and when changing the object side media. The distance between the second lens group G2 and the third lens group G3 is constant only upon zooming in an infinity focusing state in case the object side medium is air (land imaging state), and changes upon zooming in an underwater imaging state and when changing the object side media. The distance of the third lens group G3 and the fourth lens group G4 changes between when zooming and when changing the object side media.

The following Table 5 illustrates values of each general data in Example 5. The surface numbers 1 to 25 in Table 5 correspond to each optical surface of m1 to m25 shown in FIG. 25.

TABLE 5

| [Object side medium] | |
|---|---|
| Medium 1: Air | n(d) = 1.00000 |
| Medium 2: Water | n(d) = 1.33306, νd = 54.0 |

[Lens data]

| Surface number | R | D | n(d) | νd |
|---|---|---|---|---|
| 1 | 37.16044 | 2.965 | 1.51680 | 63.9 |
| 2 | 31.60486 | (D2) | 1.00000 | |
| 3 | 21.17948 | 1.600 | 1.69412 | 53.4 |
| *4 | 9.11338 | 9.123 | 1.00000 | |
| 5 | −324.79847 | 1.000 | 1.77387 | 47.2 |
| *6 | 13.83676 | 5.298 | 1.00000 | |
| 7 | 32.24109 | 1.000 | 1.49782 | 82.6 |
| 8 | 18.93875 | 4.383 | 1.83400 | 37.2 |
| 9 | −42.79084 | (D9) | 1.00000 | |
| 10 | −33.32110 | 1.350 | 1.80400 | 46.6 |
| 11 | 102.37680 | (D11) | 1.00000 | |
| 12 | 11.42798 | 1.816 | 1.51680 | 63.9 |
| 13 | 601.19143 | 1.000 | 1.00000 | |
| 14 | (Aperture stop AS) | 0.800 | 1.00000 | |
| 15 | 20.04023 | 1.836 | 1.49782 | 82.6 |
| 16 | −16.81682 | 0.800 | 1.74400 | 44.8 |
| 17 | 23.28490 | 0.100 | 1.00000 | |
| 18 | 14.21346 | 0.800 | 1.85026 | 32.4 |
| 19 | 12.65138 | 4.216 | 1.51680 | 63.9 |
| 20 | 24.06321 | 0.100 | 1.00000 | |
| 21 | 15.91799 | 3.689 | 1.49782 | 82.6 |
| 22 | −10.51522 | 1.000 | 1.77387 | 47.2 |
| *23 | −31.67087 | (D23) | 1.00000 | |
| 24 | 0.00000 | 2.790 | 1.51680 | 64.1 |
| 25 | 0.00000 | (D25) | 1.00000 | |

[Aspheric surface data]

| Surface | κ | A4 | A6 | A8 | A10 |
|---|---|---|---|---|---|
| 4 | 0.00000e+00 | 8.03256e−05 | 5.92373e−07 | −2.47868e−09 | 2.84787e−11 |
| 6 | 1.00000e+00 | −4.38815e−06 | −2.16530e−07 | 1.29463e−09 | −7.65216e−12 |
| 23 | 1.00000e+00 | 2.17507e−04 | 7.24045e−07 | 3.62554e−08 | −5.94664e−10 |

[Various data]

| | W | M | T |
|---|---|---|---|
| (Medium 1: Air) | | | |
| f | 7.20 | 9.30 | 13.60 |
| FNo | 3.57 | 4.00 | 4.85 |
| ω | 48.8 | 40.8 | 30.2 |
| Y | 8.00 | 8.00 | 8.00 |
| TL | 83.001 | 83.001 | 83.001 |
| BF | 17.273 | 20.269 | 26.294 |
| BF(Air) | 16.323 | 19.319 | 25.343 |
| (Medium 2: Water) | | | |
| f | 5.99 | 7.56 | 11.00 |
| FNo | 3.57 | 4.00 | 4.85 |
| ω | 45.8 | 38.6 | 28.4 |
| Y | 8.00 | 8.00 | 8.00 |
| TL | 83.001 | 83.001 | 83.001 |
| BF | 17.273 | 20.269 | 26.294 |
| BF(Air) | 16.323 | 19.319 | 25.343 |

[Variable distance data]

| | Upon focusing on infinity | | | Upon focusing on point-blank range | | |
|---|---|---|---|---|---|---|
| | W | M | T | W | M | T |
| (Medium 1: Air) | | | | | | |
| D0 | ∞ | ∞ | ∞ | 217.01 | 217.01 | 217.01 |
| β | — | — | — | −0.0302 | −0.0384 | −0.0561 |
| f | 7.20 | 9.30 | 13.60 | — | — | — |

TABLE 5-continued

| | | | | | | |
|---|---|---|---|---|---|---|
| D2 | 2.671 | 6.041 | 6.736 | 2.671 | 6.041 | 6.736 |
| D9 | 5.094 | 5.094 | 5.094 | 4.478 | 4.494 | 4.498 |
| D11 | 15.085 | 8.720 | 2.000 | 15.701 | 9.320 | 2.595 |
| D23 | 12.384 | 15.378 | 21.403 | 12.384 | 15.378 | 21.403 |
| D25 | 2.100 | 2.100 | 2.100 | 2.100 | 2.100 | 2.100 |
| (Medium 2: Water) | | | | | | |
| D0 | ∞ | ∞ | ∞ | 217.01 | 217.01 | 217.01 |
| β | — | — | — | −0.0330 | −0.0413 | −0.0597 |
| f | 5.99 | 7.56 | 11.00 | — | — | — |
| D2 | 4.475 | 7.876 | 8.456 | 4.475 | 7.876 | 8.456 |
| D9 | 2.157 | 2.169 | 2.292 | 1.600 | 1.640 | 1.776 |
| D11 | 16.218 | 9.813 | 3.082 | 16.774 | 10.340 | 3.597 |
| D23 | 12.384 | 15.378 | 21.403 | 12.384 | 15.378 | 21.403 |
| D25 | 2.100 | 2.100 | 2.100 | 2.100 | 2.100 | 2.100 |

[Lens group data]
(Medium 1: Air)

| Lens group | Front end surface | Focal length |
|---|---|---|
| First lens group | 1 | −499.98 |
| Second lens group | 3 | −97.39 |
| Third lens group | 10 | −31.13 |
| Fourth lens group | 12 | 16.58 |

[Values corresponding to the conditional expressions]

Conditional expression (1) R1/Ymax = 4.645
Conditional expression (2) f2/f3 = 3.128
Conditional expression (3) R1/R2 = 1.176

Based on Table 5, the optical system ZL5 according to Example 5 it is understandable that the conditional expressions (1) to (3) are satisfied.

Figure 26A:
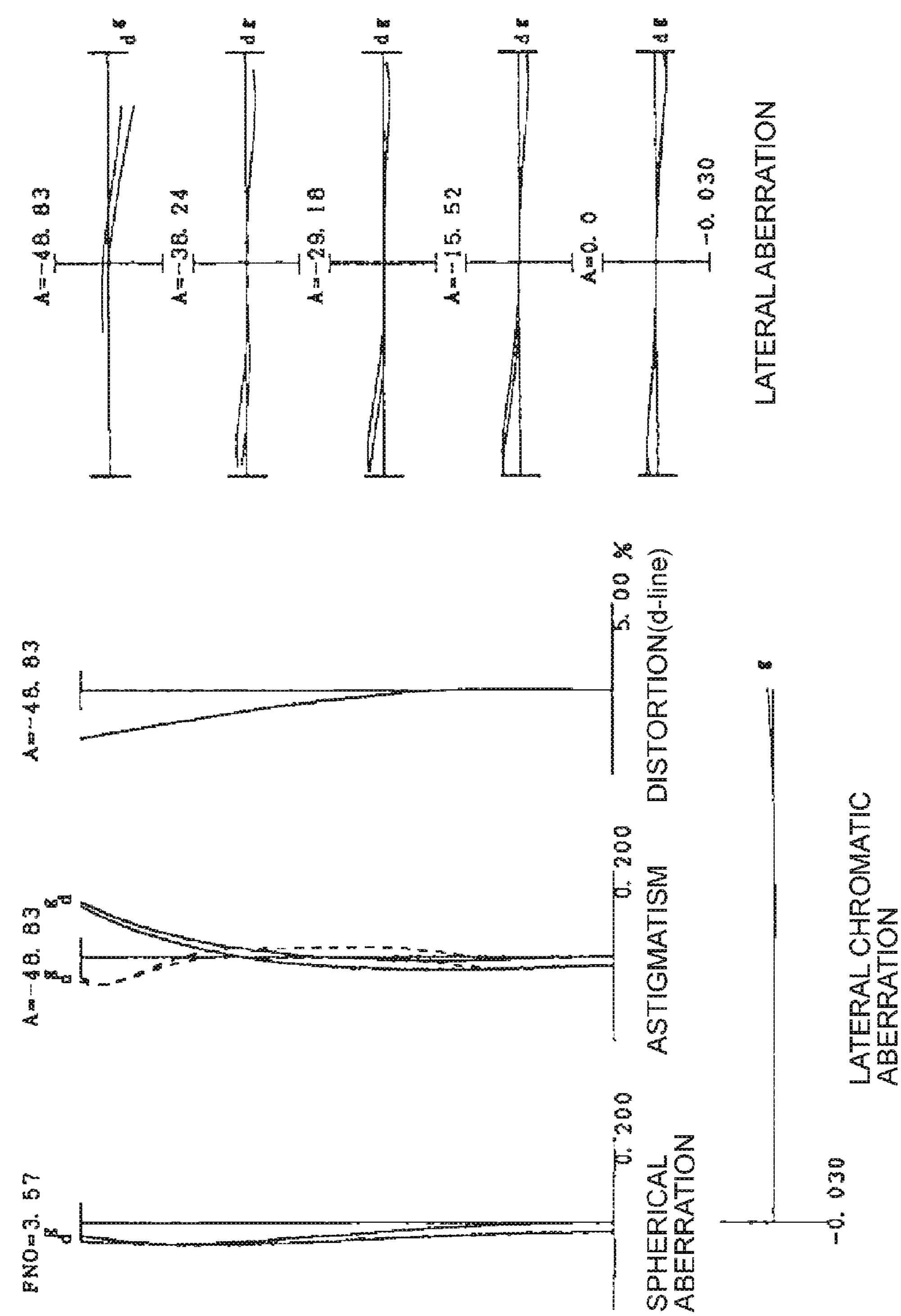
FIGS. 26A, 26B and 26C illustrate a graph showing aberrations in an infinity focusing state of the optical system according to Example 5 in case the object side medium is air, where
Figure 26B:
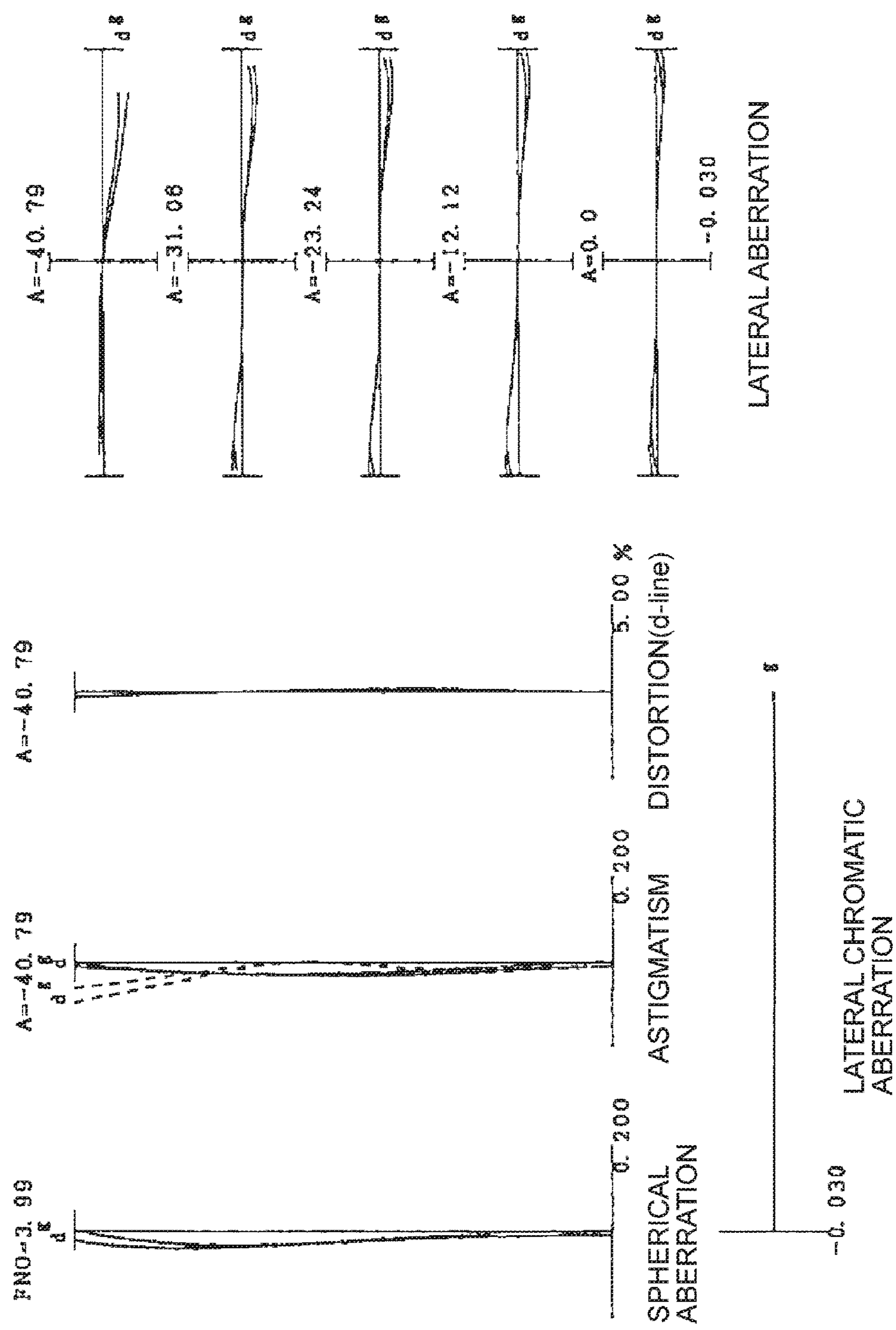
Figure 26C:
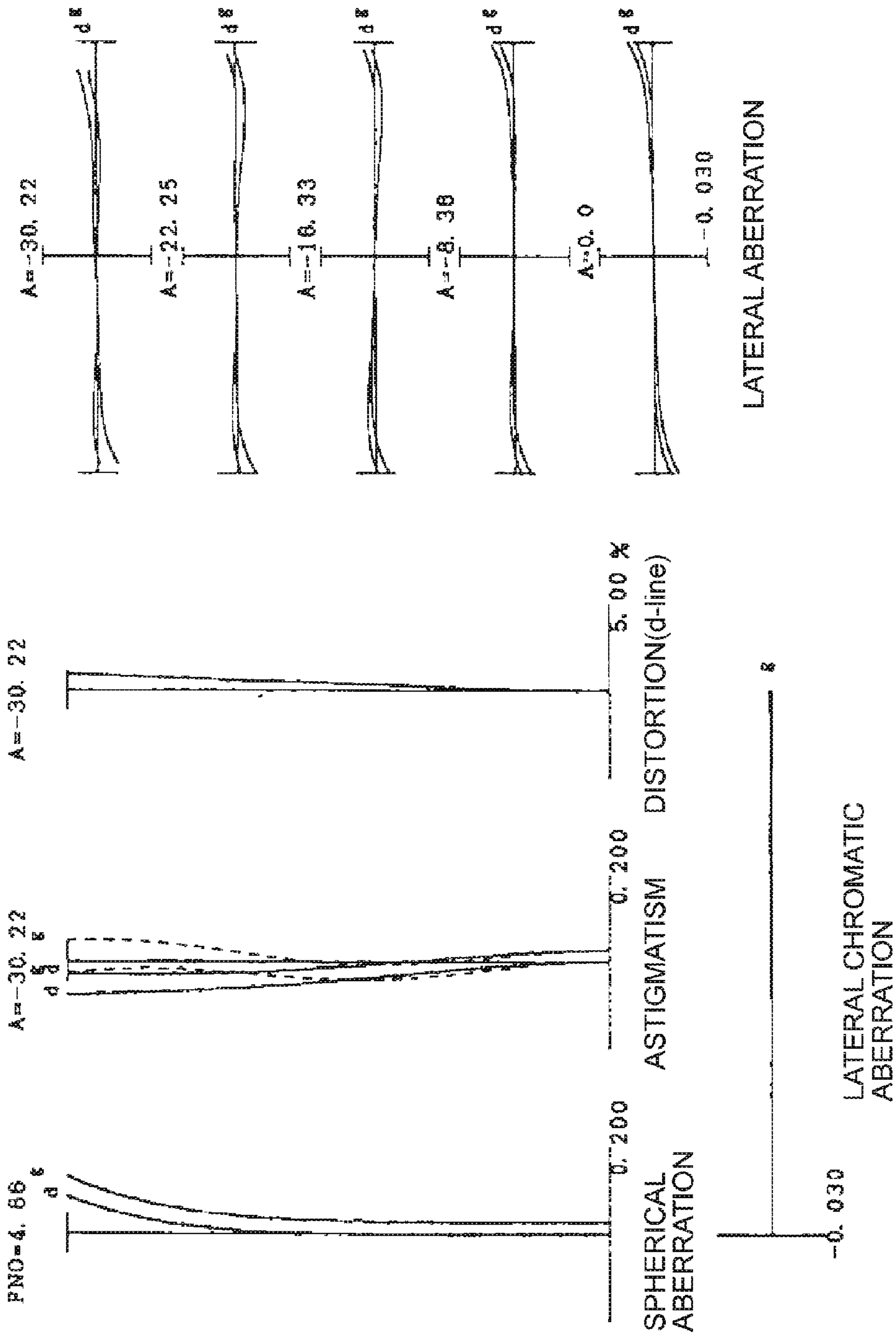
Figure 29A:
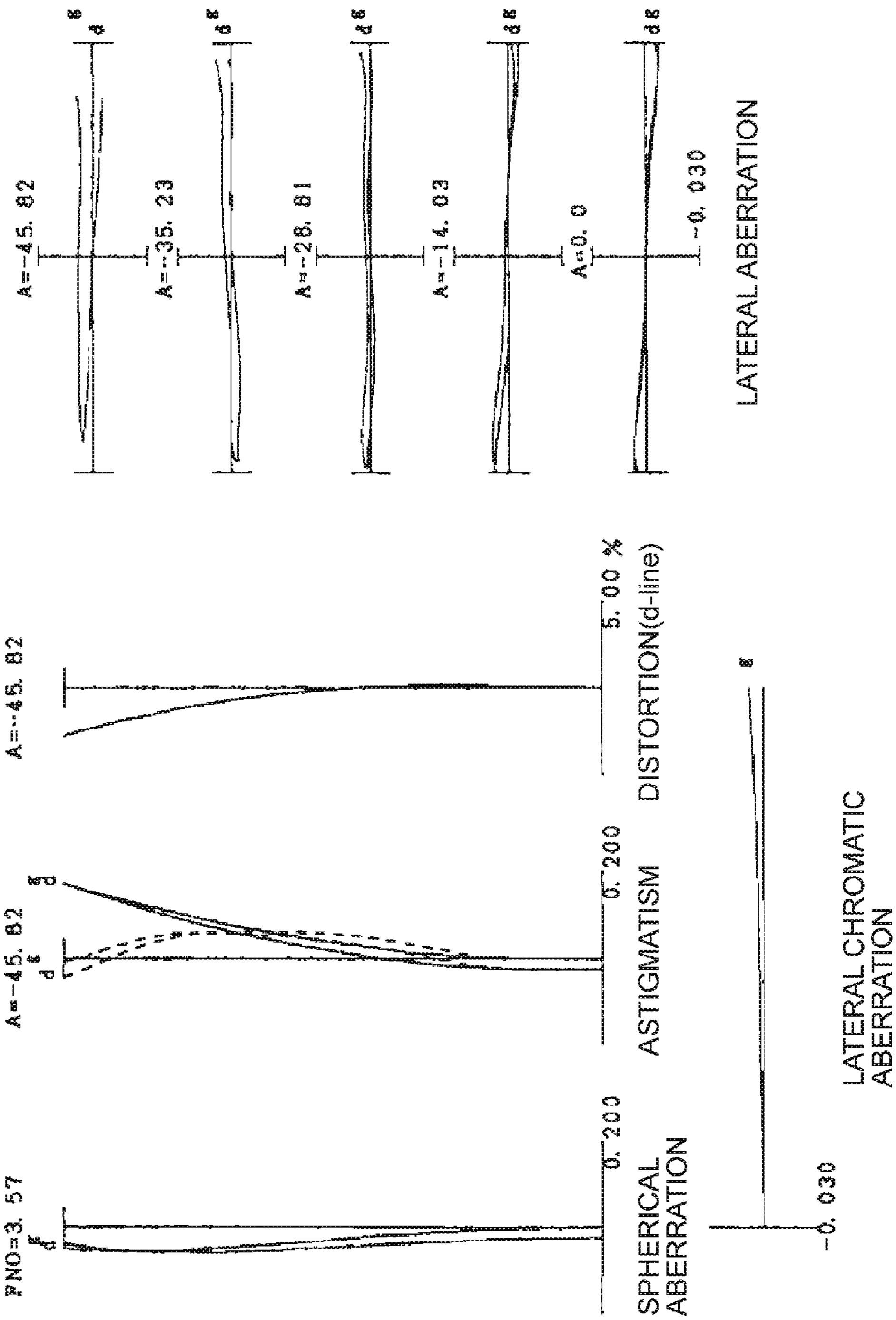
FIGS. 29A, 29B and 29C illustrate a graph showing aberrations in an infinity focusing state of the optical system according to Example 5 in case the object side medium is water, where
Figure 29B:
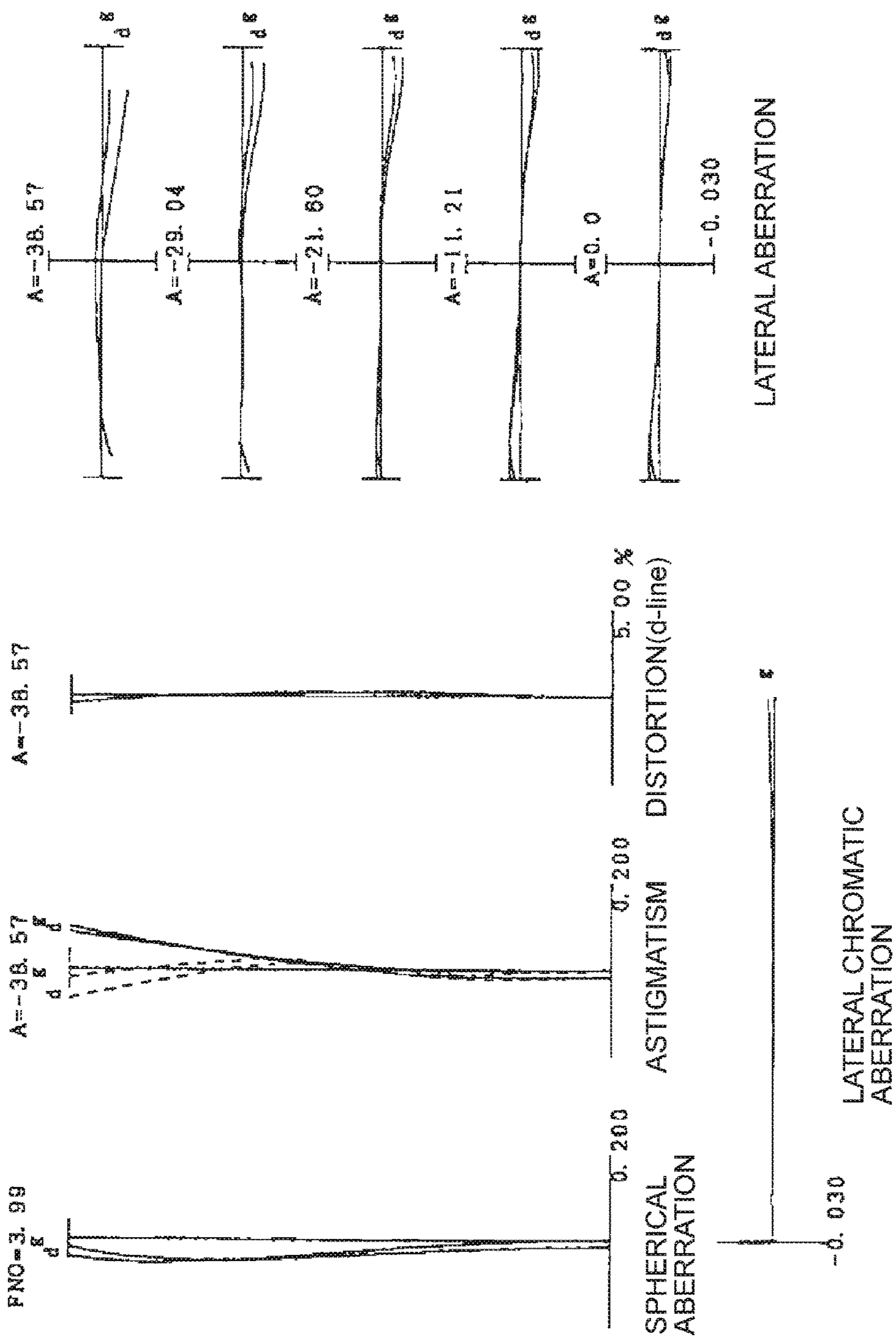
Figure 29C:
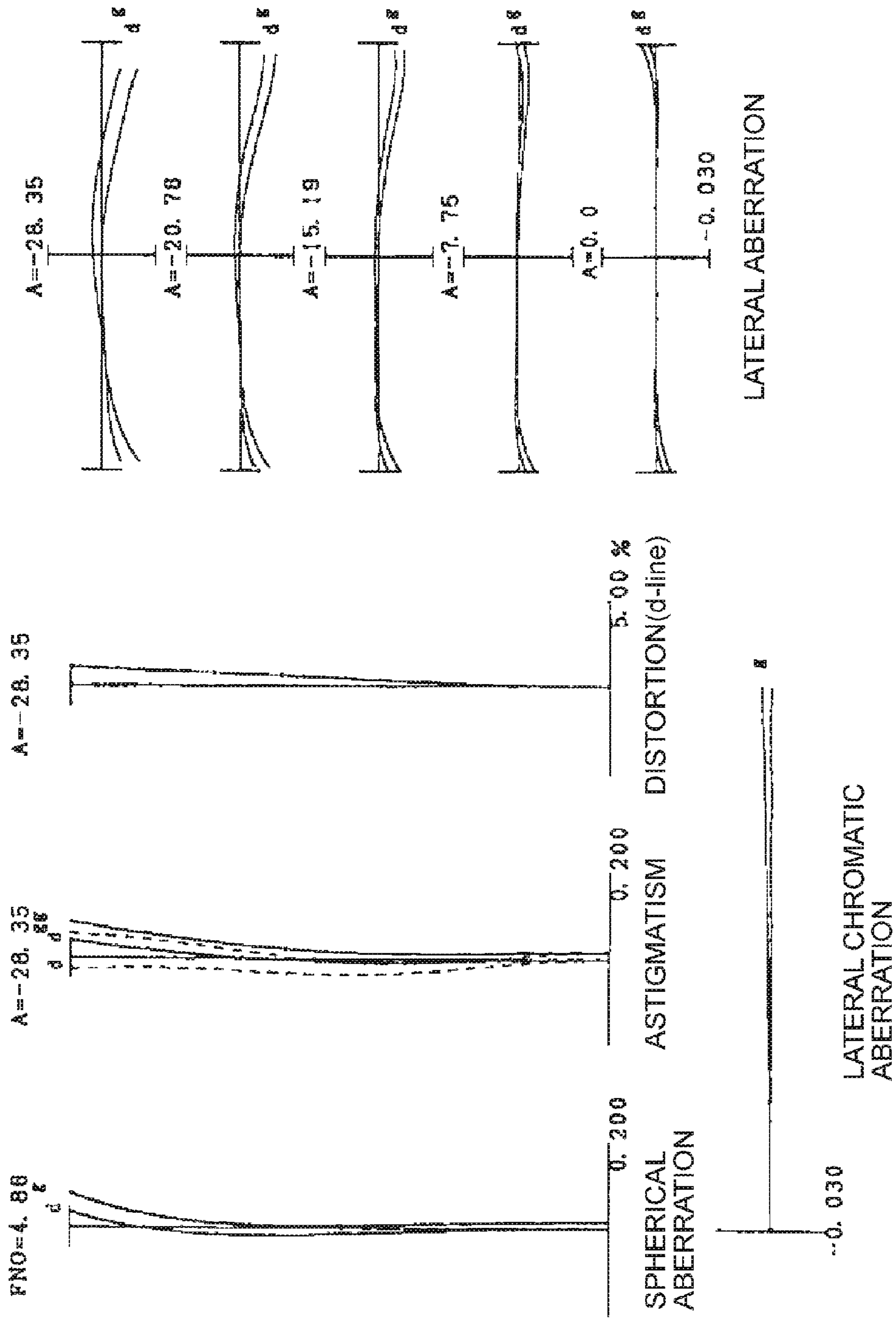
Figure 30A:
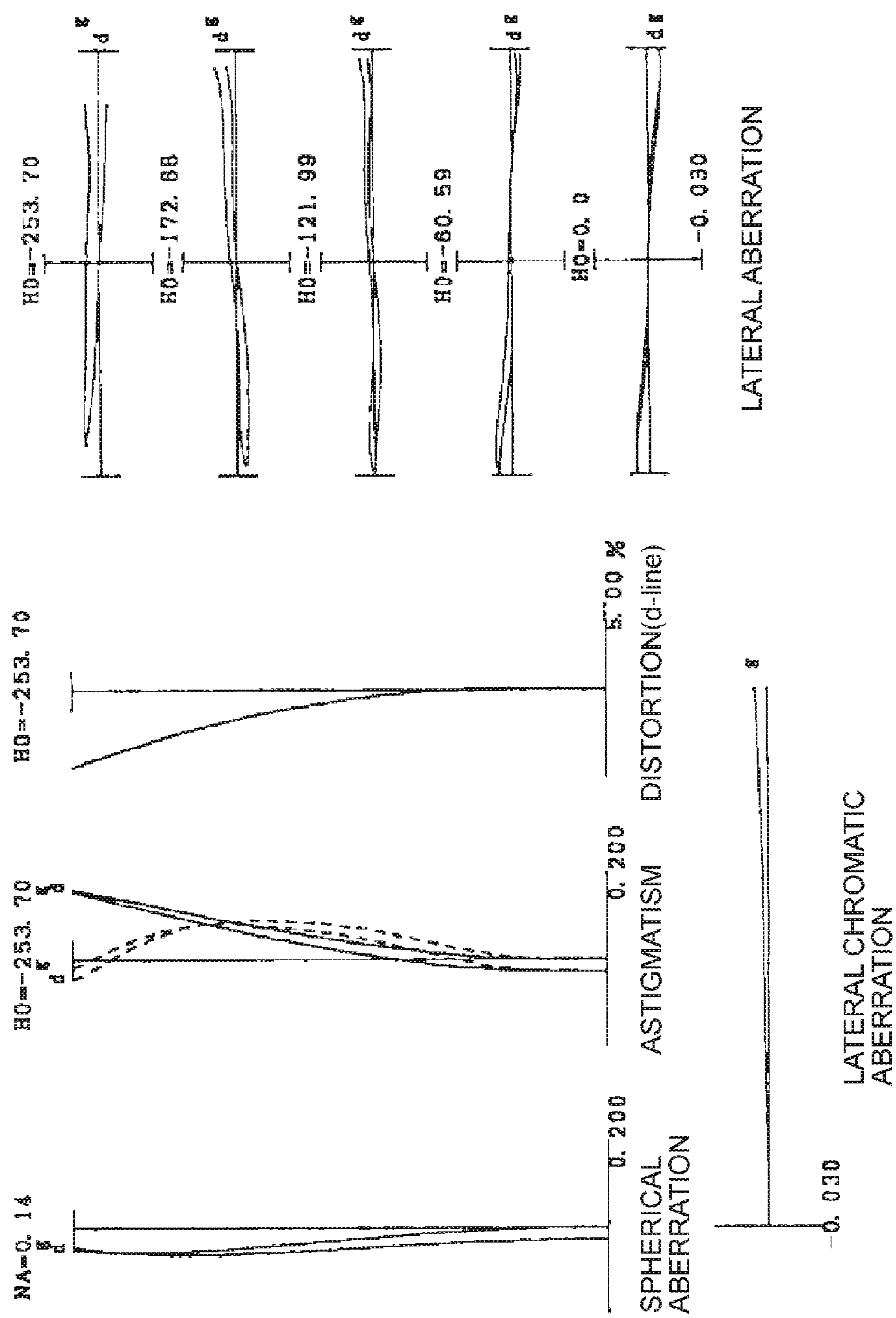
FIGS. 30A, 30B and 30C illustrate a graph showing aberrations in a point-blank range focusing state of the optical system according to Example 5 in case the object side medium is water, where
Figure 30B:
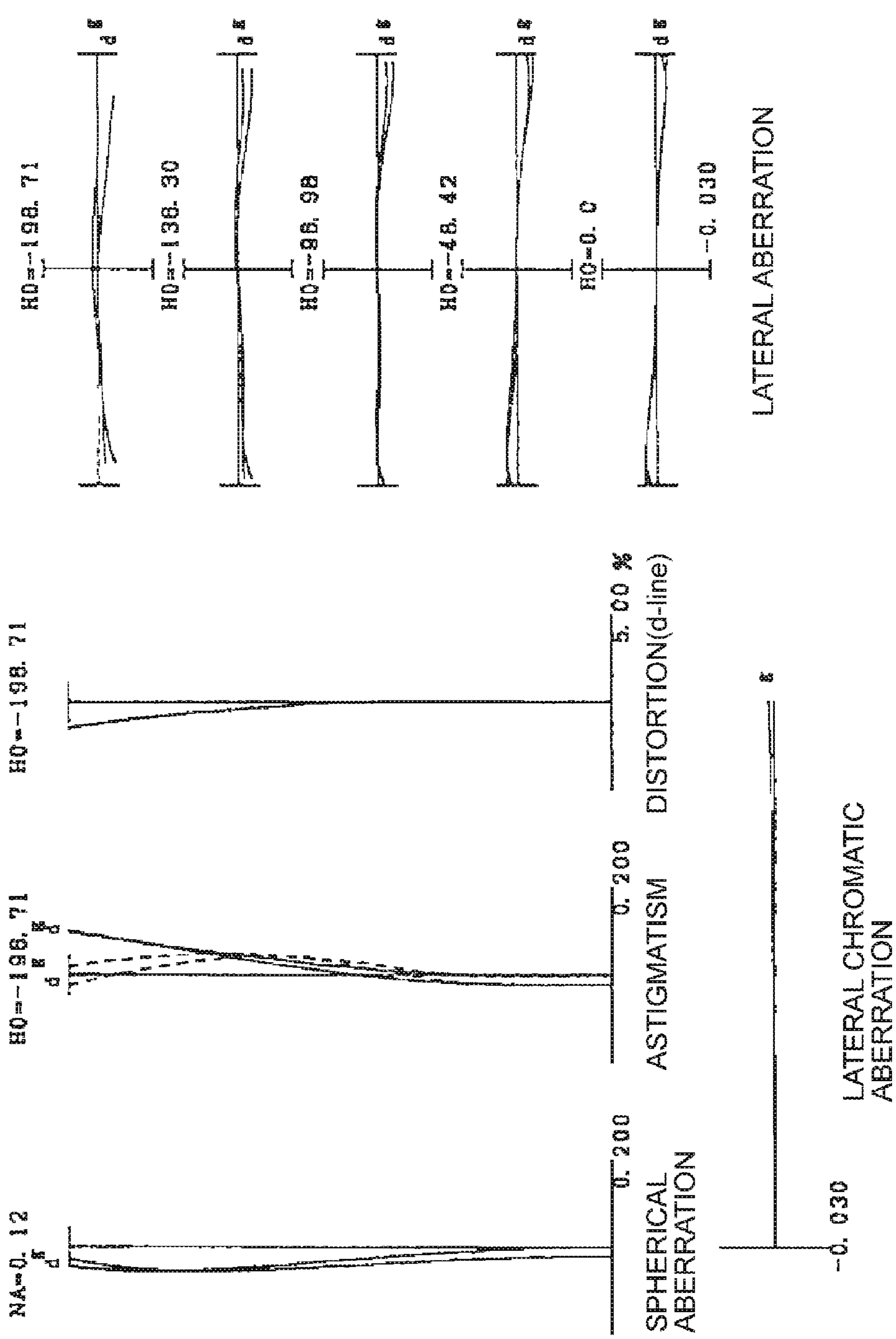
Figure 30C:
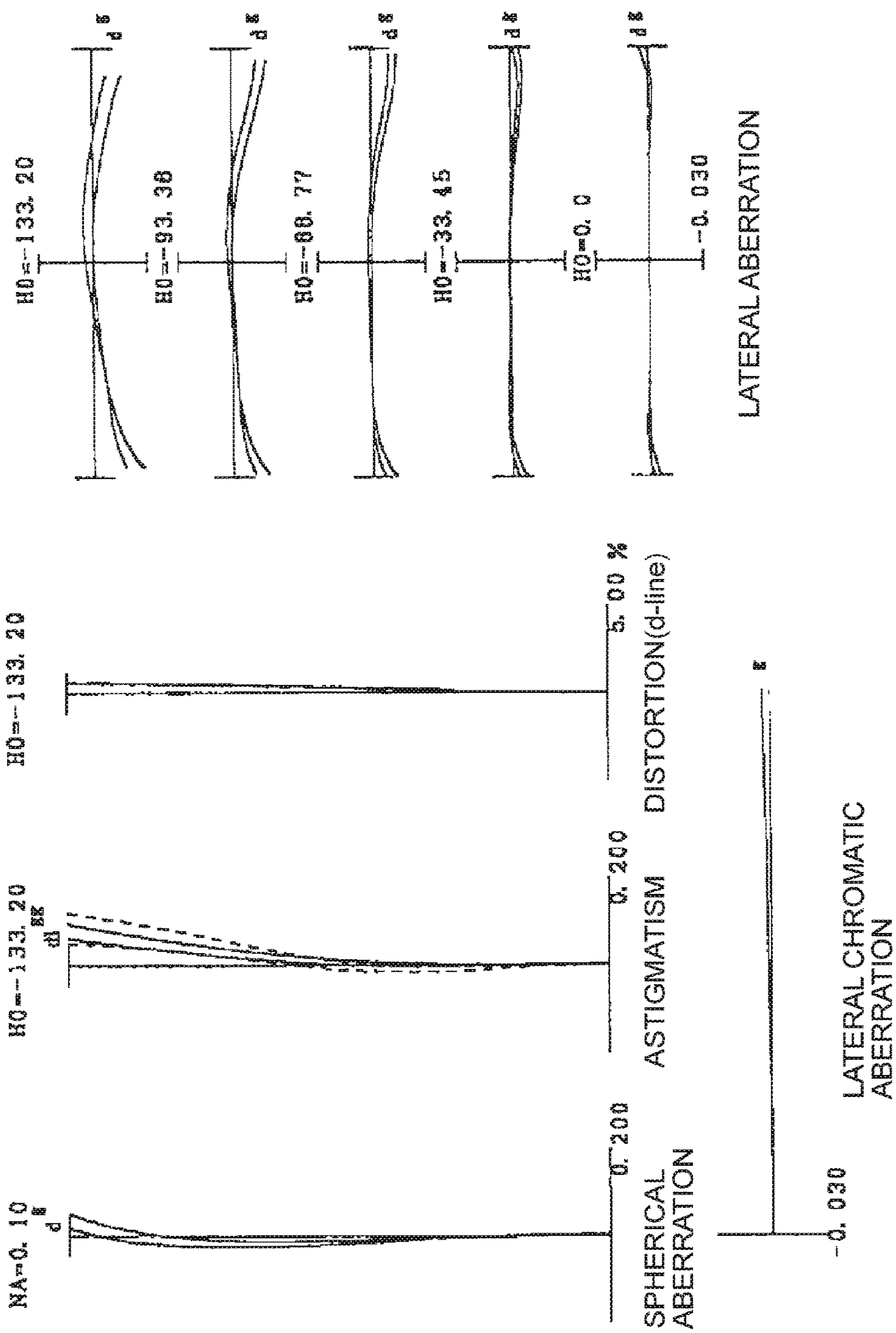

FIGS. 26A, 26B and 26C illustrate a graph showing various aberrations in an infinity focusing state of the optical system ZL5 according to Example 5 in case the object side medium is air, where FIG. 26A depicts the wide-angle end state, FIG. 26B depicts the intermediate focal length state, and FIG. 26C depicts the telephoto end state. FIGS. 27A, 27B and 27C illustrate a graph showing various aberrations in a point-blank range focusing state of the optical system ZL5 according to Example 5 in case the object side medium is air, where FIG. 27A depicts the wide-angle end state, FIG. 27B depicts the intermediate focal length state, and FIG. 27C depicts the telephoto end state. FIGS. 29A, 29B and 29C illustrate a graph showing various aberrations in an infinity focusing state of the optical system ZL5 according to Example 5 in case the object side medium is water, where FIG. 29A depicts the wide-angle end state, FIG. 29B depicts the intermediate focal length state, and FIG. 29C depicts the telephoto end state. FIGS. 30A, 30B and 30C illustrate a graph showing various aberrations in a point-blank range focusing state of the optical system ZL5 according to Example 5 in case the object side medium is water, where FIG. 30A depicts a wide-angle end state, FIG. 30B depicts an intermediate focal length state, and FIG. 30C depicts a telephoto end state.

According to each graph showing aberrations in FIGS. 26, 27, 29 and 30, in the optical system ZL5 according to Example 5, it is possible to appropriately correct, regardless of the object side medium, various aberrations in any imaging states covering a range from a wide-angle end state to a telephoto end state and a range from an infinity focusing state to a point-blank focusing state, and have good optical performance.

EXAMPLE 6

Figure 31:
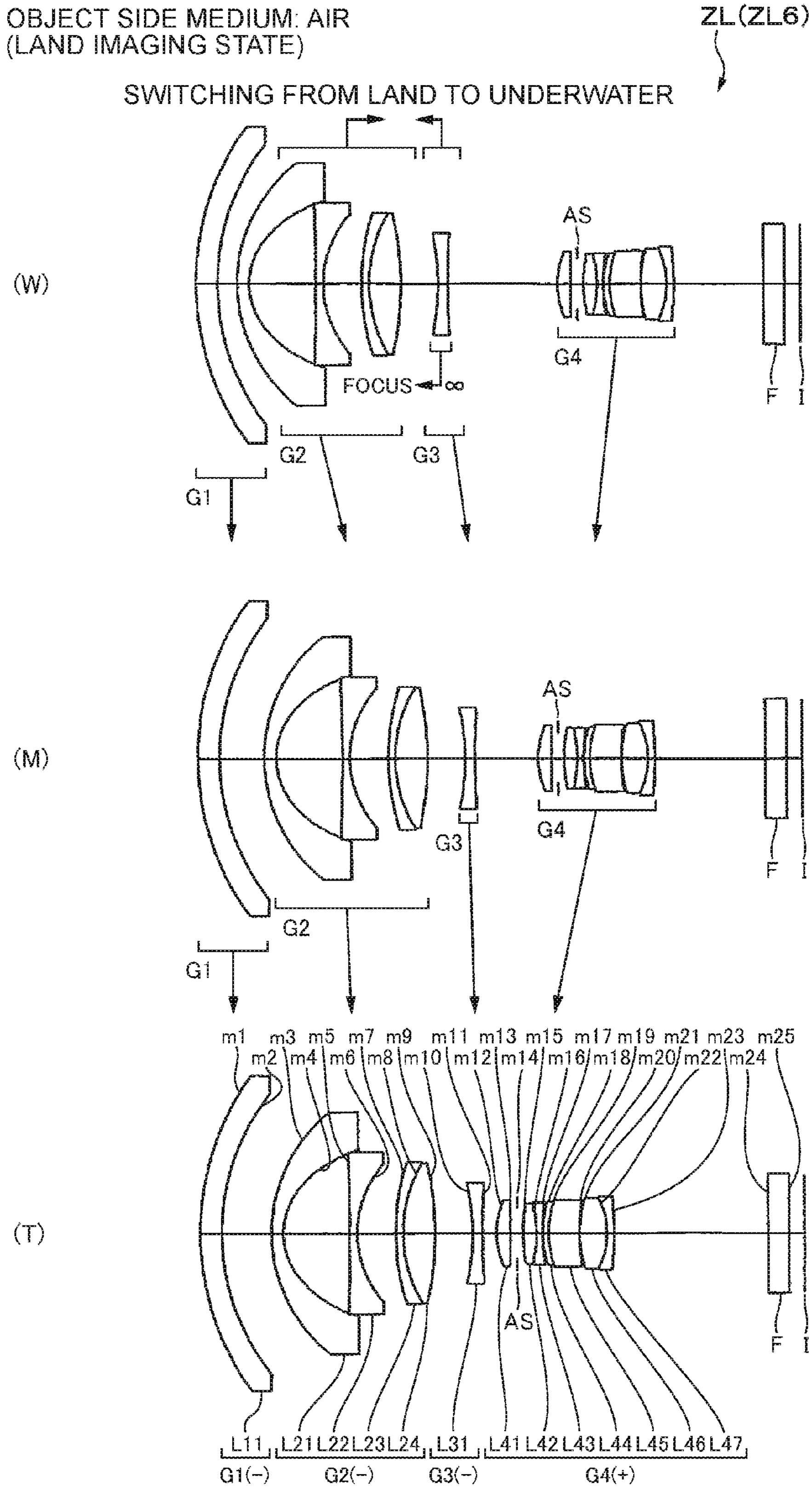
FIG. 31 illustrates a sectional view showing a lens configuration of the optical system according to Example 6 in case the object side medium is air, and a diagram showing a moving locus of each group from a wide-angle end state (W) to a telephoto end state (T) through an intermediate focal length state (M).
Figure 33A:
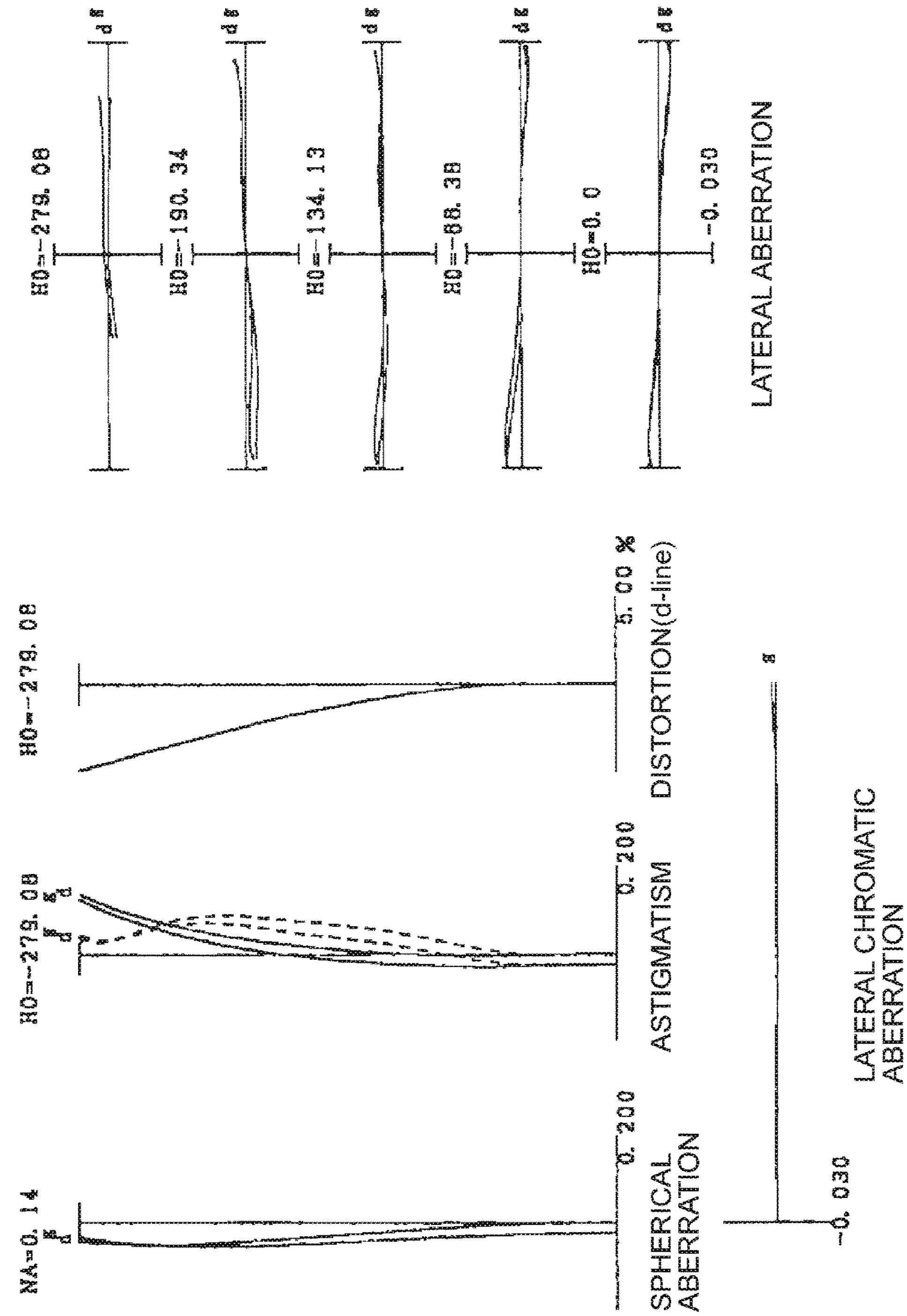
FIGS. 33A, 33B and 33C illustrate a graph showing aberrations in a point-blank range focusing state of the optical system according to Example 6 in case the object side medium is air, where
Figure 33B:
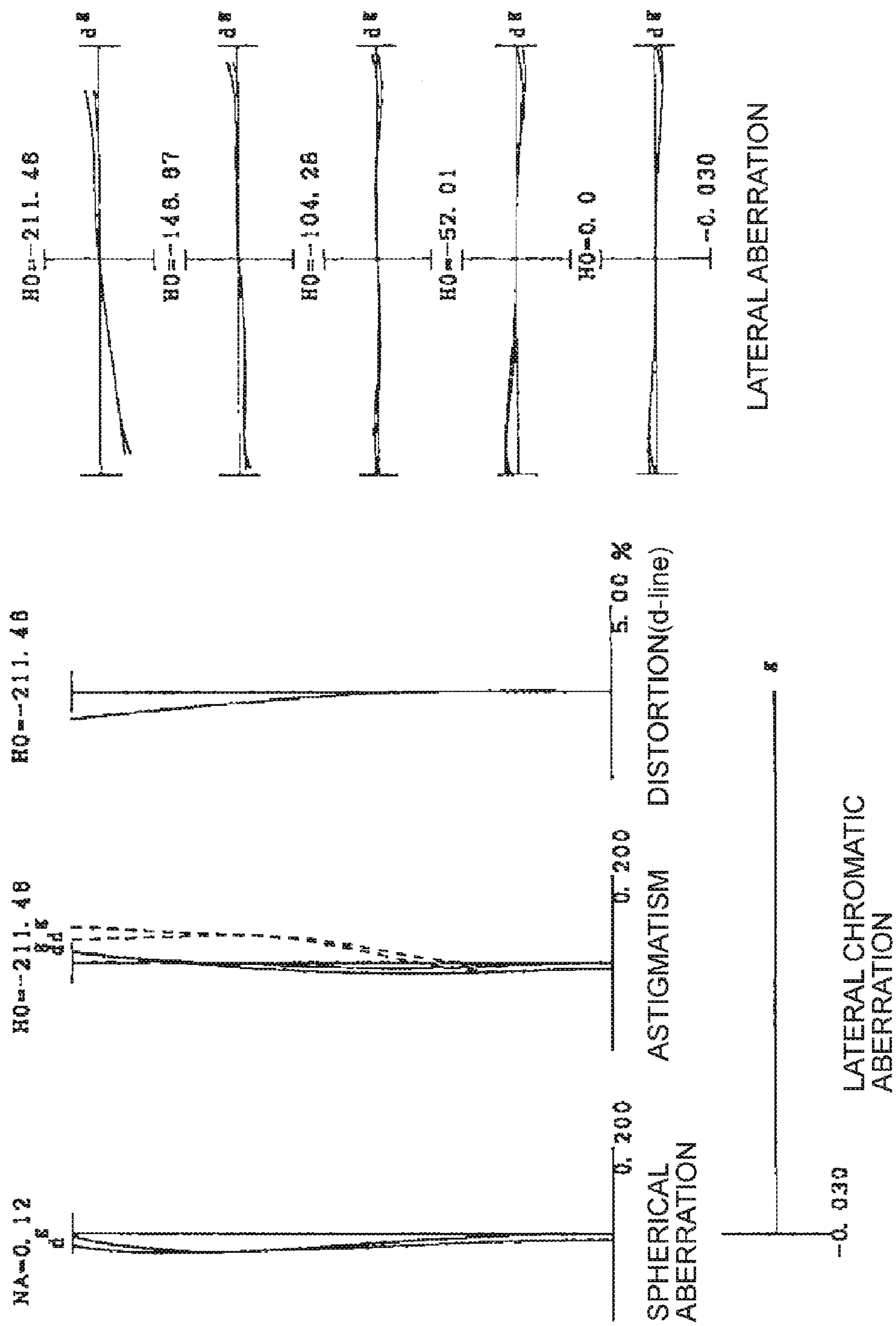
Figure 33C:
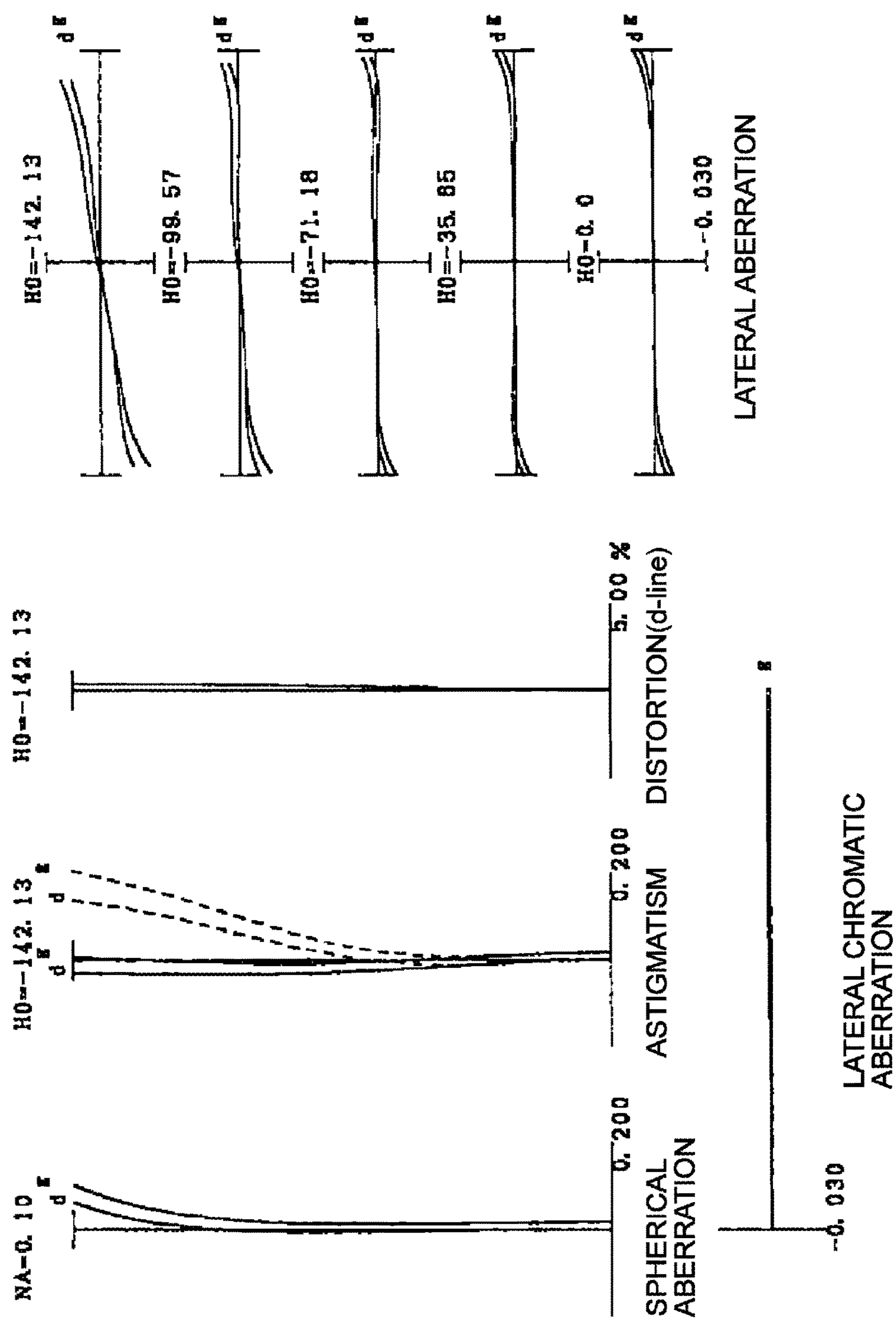
Figure 34:
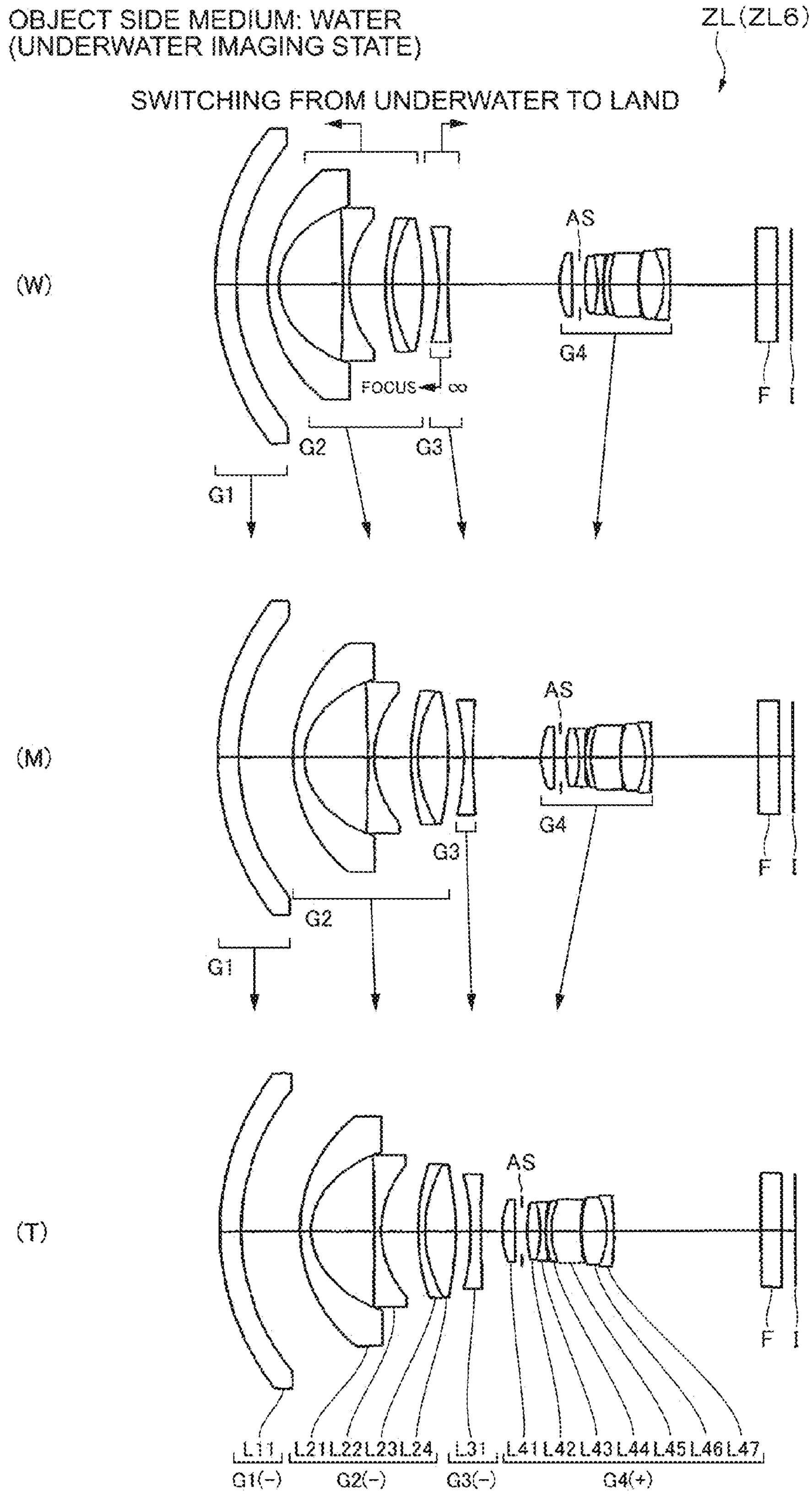
FIG. 34 illustrates a sectional view showing a lens configuration of the optical system according to Example 6 in case the object side medium is water, and a diagram showing a moving locus of each group from the wide-angle end state (W) to the telephoto end state (T) through the intermediate focal length state (M).

Example 6 is described with reference to FIG. 31 to FIGS. 36A, 36B and 36C, and Table 6. An optical system ZL (ZL6) according to the present example is an optical system capable of imaging in two object side media whose refractive indexes are different from each other. Note that the object side medium of a low refractive index is "air," while the object side medium of a high refractive index is "water." FIG. 31 illustrates a sectional view showing a lens configuration of the optical system according to Example 6 in case the object side medium is air (land imaging state). FIG. 34 illustrates a sectional view showing a lens configuration of the optical system according to Example 6 in case the object side medium is water (underwater imaging state).

The optical system ZL6 according to Example 6 is composed of, as shown in FIG. 31 and FIG. 34, in order from an object, a first lens group G1 having negative refractive power, a second lens group G2 having negative refractive power, a third lens group G3 having negative refractive power, and a fourth lens group G4 having positive refractive power.

The first lens group G1 is composed of a negative meniscus lens L11 having a concave surface facing the image.

The second lens group G2 is composed of, in order from the object, a negative meniscus lens L21 having a concave surface facing the image, a biconcave lens L22, and a cemented lens composed of a negative meniscus lens L23 having a concave surface facing the image and a biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from the object, a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens composed of a biconvex lens L46 and a negative meniscus lens L47 having a concave surface facing the object. The image side surface of the negative meniscus lens L47 is an aspherical surface.

A filter group F is disposed on the image side of the fourth lens group G4. The filter group F is composed of a low-pass filter for cutting a spatial frequency more than a marginal dissector of image sensors such as a CCD disposed at the image surface I, and a CMOS, a cover-glass of an image sensor, etc.

The image surface I is formed on the image sensor which is composed of unillustrated CCDs, CMOSs, etc.

A position of the first lens group G1 on the optical axis is fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state) and it is in the infinity focusing state, the second lens group G2 and the third lens group G3 are independently moved upon zooming. In case the object side medium is water (underwater imaging state), the second lens group G2 and the third lens group G3 are independently moved upon zooming. Moreover, in case the object side medium is any one of air and water (also in any one of the land underwater imaging states), the fourth lens group G4 is moved upon zooming so that the same locus is drawn.

Upon focusing on from infinity to a point-blank range object, the third lens group G3 is moved to the object side.

When changing the object side media, the second lens group G2 and the third lens group G3 are moved on the optical axis. When changing the object side media, for example, from air (land imaging state) having a low refractive index medium to water (underwater imaging state) having a high refractive index medium, as shown in FIG. 31, the second lens group G2 is moved to the image side, and the third lens group G3 is moved to the object side. Moreover, when changing an object side medium from water (underwater imaging state) having a high refractive index medium (land imaging state) to air having a low refractive index medium, as shown in FIG. 34, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes upon zooming and when changing the object side media. The distance between the second lens group G2 and the third lens group G3 is constant only upon zooming in an infinity focusing state in case the object side medium is air (land imaging state), and changes upon zooming in an underwater imaging state and when changing the object side media. The distance between the third lens group G3 and the fourth lens group G4 changes upon zooming and when changing the object side media.

The following Table 6 illustrates values of each general data in Example 6. The surface numbers 1 to 25 in Table 6 correspond to each optical surface of m1 to m25 shown in FIG. 31.

TABLE 6

[Object side medium]

| | |
|---|---|
| Medium 1: Air | n(d) = 1.00000 |
| Medium 2: Water | n(d) = 1.33306, vd = 54.0 |

[Lens data]

| Surface number | R | D | n(d) | vd |
|---|---|---|---|---|
| 1 | 37.01501 | 2.981 | 1.51680 | 63.9 |
| 2 | 31.48861 | (D2) | 1.00000 | |
| 3 | 21.15803 | 1.600 | 1.69412 | 53.4 |
| *4 | 9.11338 | 9.140 | 1.00000 | |
| 5 | −321.92820 | 1.000 | 1.77387 | 47.2 |
| *6 | 13.83902 | 5.301 | 1.00000 | |
| 7 | 32.14393 | 1.000 | 1.49782 | 82.6 |
| 8 | 18.90828 | 4.386 | 1.83400 | 37.2 |
| 9 | −42.82560 | (D9) | 1.00000 | |
| 10 | −33.16729 | 1.350 | 1.80400 | 46.6 |
| 11 | 102.70762 | (D11) | 1.00000 | |
| 12 | 11.43039 | 1.815 | 1.51680 | 63.9 |
| 13 | 587.56549 | 1.000 | 1.00000 | |
| 14 | (Aperture stop AS) | 0.800 | 1.00000 | |
| 15 | 20.02052 | 1.836 | 1.49782 | 82.6 |
| 16 | −16.81816 | 0.800 | 1.74400 | 44.8 |
| 17 | 23.28158 | 0.100 | 1.00000 | |
| 18 | 14.21372 | 0.800 | 1.85026 | 32.4 |
| 19 | 12.65753 | 4.212 | 1.51680 | 63.9 |
| 20 | 24.04355 | 0.100 | 1.00000 | |
| 21 | 15.90510 | 3.684 | 1.49782 | 82.6 |
| 22 | −10.52252 | 1.000 | 1.77387 | 47.2 |
| *23 | −31.65440 | (D23) | 1.00000 | |

TABLE 6-continued

| | | | | |
|---|---|---|---|---|
| 24 | 0.00000 | 2.790 | 1.51680 | 64.1 |
| 25 | 0.00000 | (D25) | 1.00000 | |

[Aspheric surface data]

| Surface | κ | A4 | A6 | A8 | A10 |
|---|---|---|---|---|---|
| 4 | 0.00000e+00 | 8.04854e−05 | 5.92552e−07 | −2.46879e−09 | 2.85869e−11 |
| 6 | 1.00000e+00 | −4.40348e−06 | −2.16389e−07 | 1.29378e−09 | −7.65886e−12 |
| 23 | 1.00000e+00 | 2.17529e−04 | 7.23471e−07 | 3.62228e−08 | −5.93760e−10 |

[Various data]

| | W | M | T |
|---|---|---|---|
| (Medium 1: Air) | | | |
| f | 7.20 | 9.30 | 13.60 |
| FNo | 3.57 | 3.99 | 4.85 |
| ω | 48.8 | 40.8 | 30.2 |
| Y | 8.00 | 8.00 | 8.00 |
| TL | 83.000 | 83.000 | 83.000 |
| BF | 17.277 | 20.273 | 26.295 |
| BF(Air) | 16.326 | 19.322 | 25.344 |
| (Medium 2: Water) | | | |
| f | 6.00 | 7.56 | 11.00 |
| FNo | 3.58 | 4.00 | 4.85 |
| ω | 45.8 | 38.6 | 28.4 |
| Y | 8.00 | 8.00 | 8.00 |
| TL | 83.000 | 83.000 | 83.000 |
| BF | 17.277 | 20.273 | 26.295 |
| BF(Air) | 16.326 | 19.322 | 25.344 |

[Variable distance data]

| | Upon focusing on infinity | | | Upon focusing on point-blank range | | |
|---|---|---|---|---|---|---|
| | W | M | T | W | M | T |
| (Medium 1: Air) | | | | | | |
| D0 | ∞ | ∞ | ∞ | 217.00 | 217.00 | 217.00 |
| β | — | — | — | −0.0302 | −0.0384 | −0.0561 |
| f | 7.20 | 9.30 | 13.60 | — | — | — |
| D2 | 2.657 | 6.039 | 6.709 | 2.657 | 6.039 | 6.709 |
| D9 | 5.081 | 5.081 | 5.081 | 4.463 | 4.477 | 4.484 |
| D11 | 15.079 | 8.716 | 2.000 | 15.697 | 9.316 | 2.595 |
| D23 | 12.388 | 15.382 | 21.404 | 12.388 | 15.382 | 21.404 |
| D25 | 2.099 | 2.099 | 2.099 | 2.099 | 2.099 | 2.099 |
| (Medium 2: Water) | | | | | | |
| D0 | ∞ | ∞ | ∞ | 217.00 | 217.00 | 217.00 |
| β | — | — | — | −0.0330 | −0.0413 | −0.0597 |
| f | 6.00 | 7.56 | 11.00 | — | — | — |
| D2 | 4.478 | 7.814 | 8.470 | 4.478 | 7.814 | 8.470 |
| D9 | 2.224 | 2.224 | 2.224 | 1.600 | 1.664 | 1.707 |
| D11 | 16.129 | 9.786 | 3.082 | 16.761 | 10.331 | 3.599 |
| D23 | 12.388 | 15.382 | 21.404 | 12.388 | 15.382 | 21.404 |
| D25 | 2.099 | 2.099 | 2.099 | 2.099 | 2.099 | 2.099 |

[Lens group data]
(Medium 1: Air)

| Lens group | Front end surface | Focal length |
|---|---|---|
| First lens group | 1 | −499.99 |
| Second lens group | 3 | −98.76 |
| Third lens group | 10 | −31.05 |
| Fourth lens group | 12 | 16.58 |

[Values corresponding to the conditional expressions]

Conditional expression (1) R1/Ymax = 4.627
Conditional expression (2) f2/f3 = 3.181
Conditional expression (3) R1/R2 = 1.176

Based on Table 6, in the optical system ZL6 according to Example 6 it is understandable that the conditional expressions (1) to (3) are satisfied.

Figure 32A:
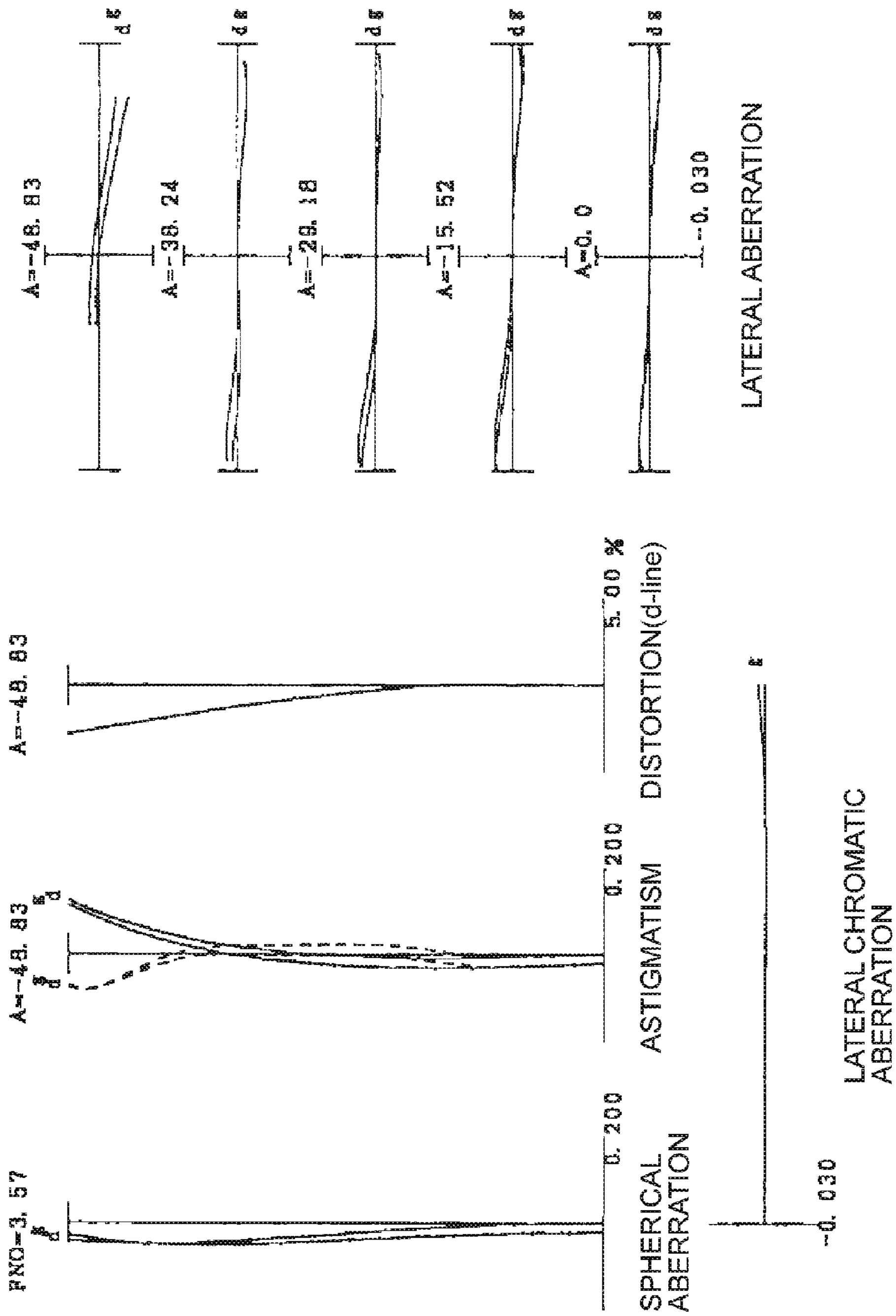
FIGS. 32A, 32B and 32C illustrate a graph showing aberrations in an infinity focusing state of the optical system according to Example 6 in case the object side medium is air, where
Figure 32B:
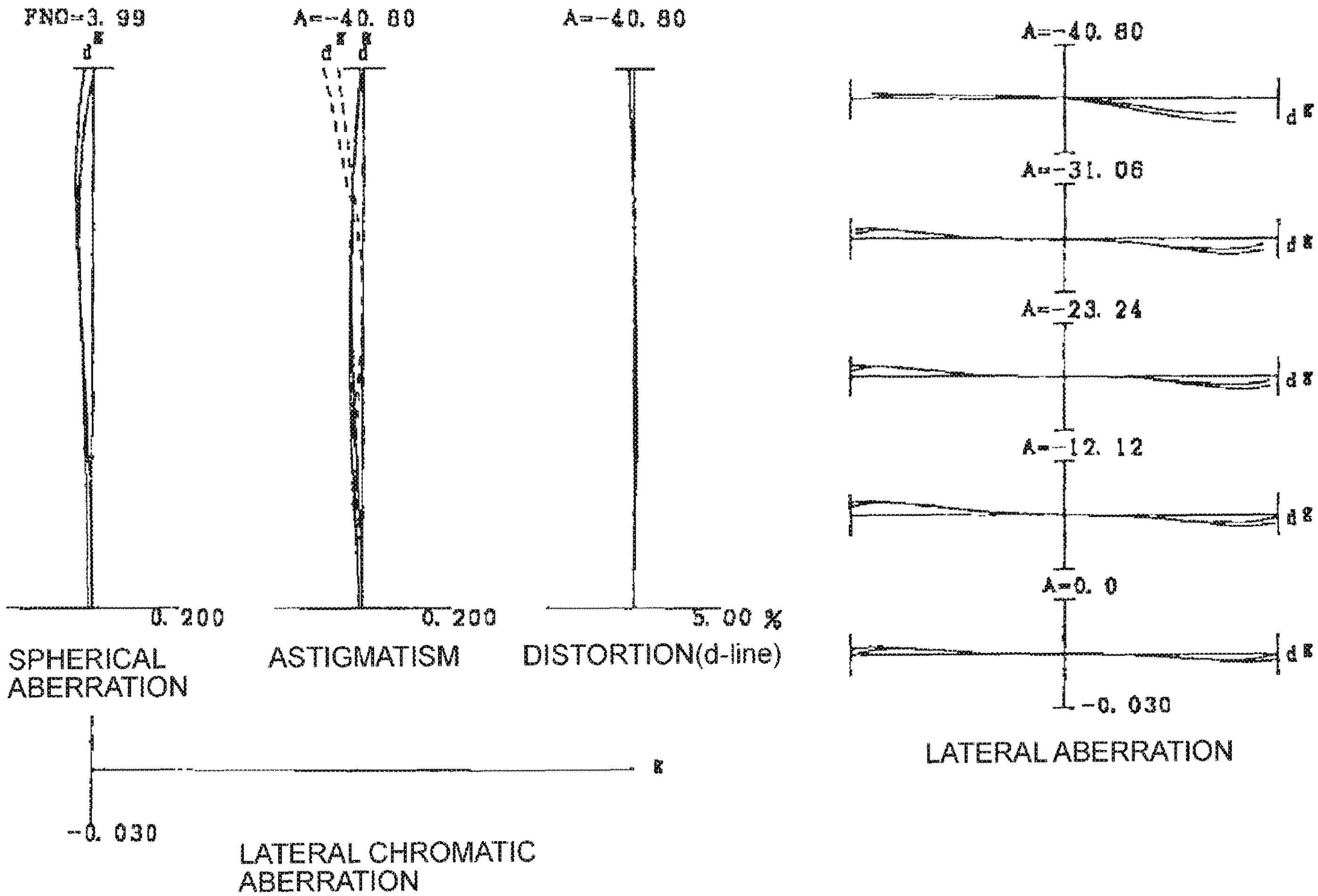
Figure 32C:
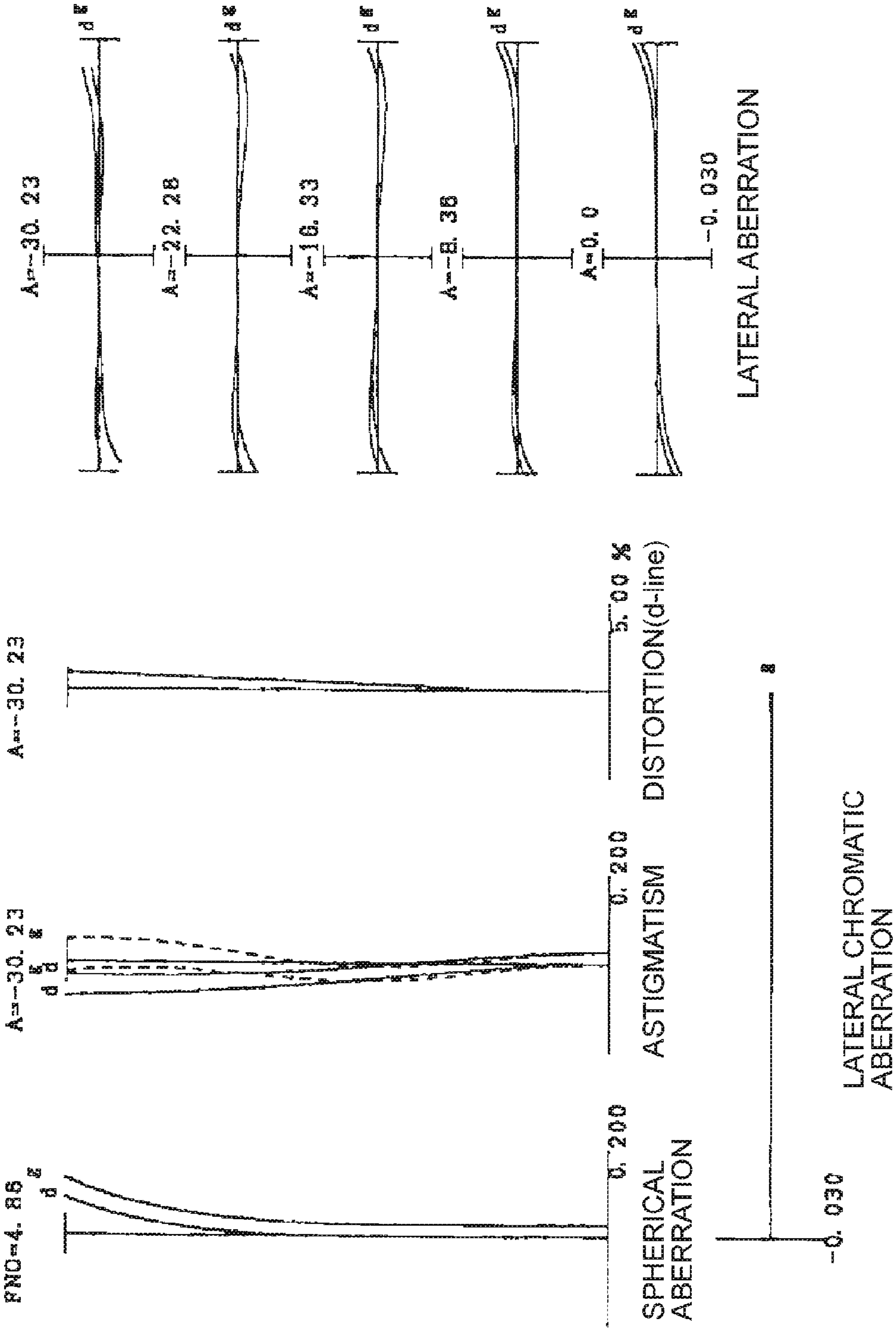
Figure 35A:
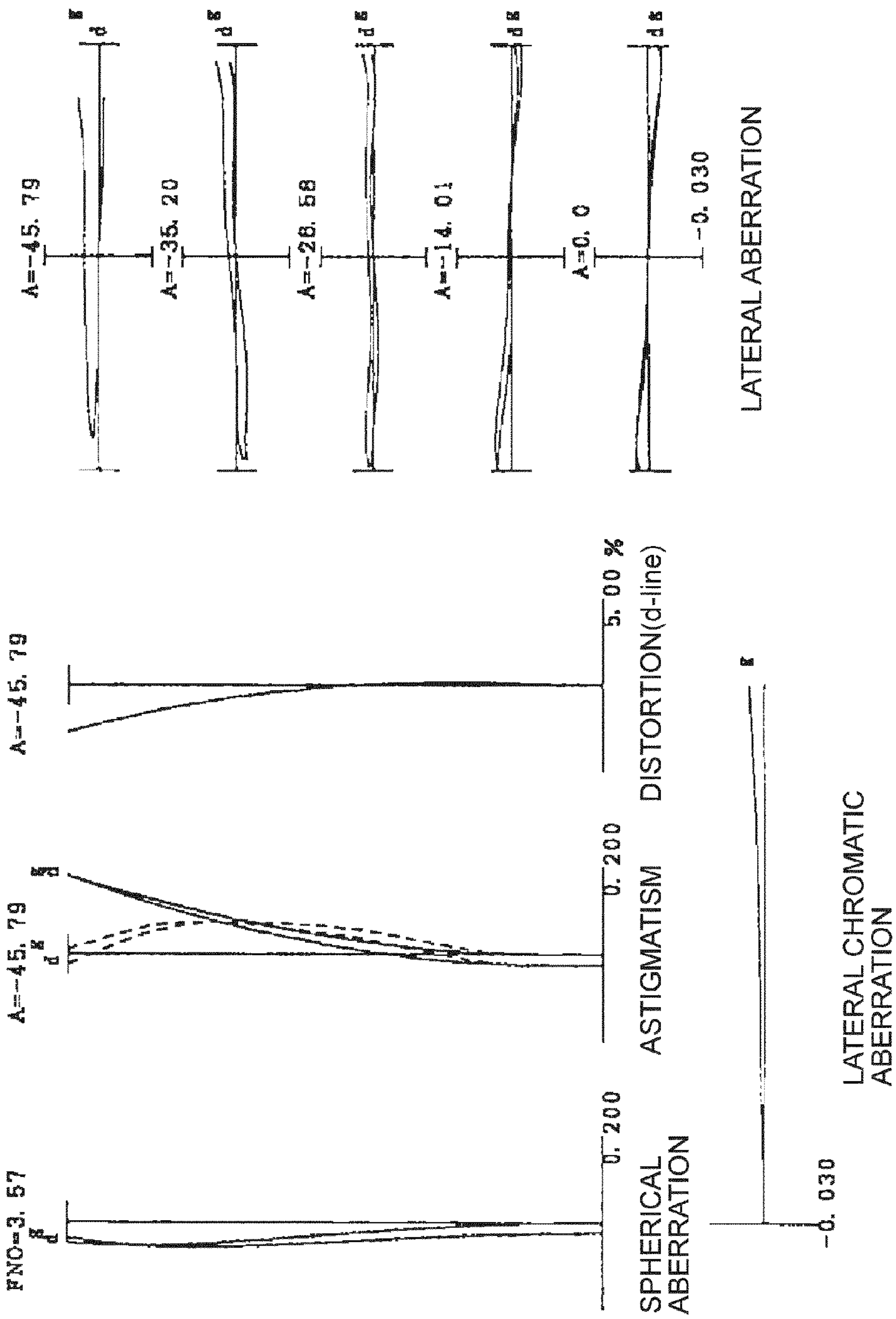
FIGS. 35A, 35B and 35C illustrate a graph showing aberrations in an infinity focusing state of the optical system according to Example 6 in case the object side medium is water, where
Figure 35B:
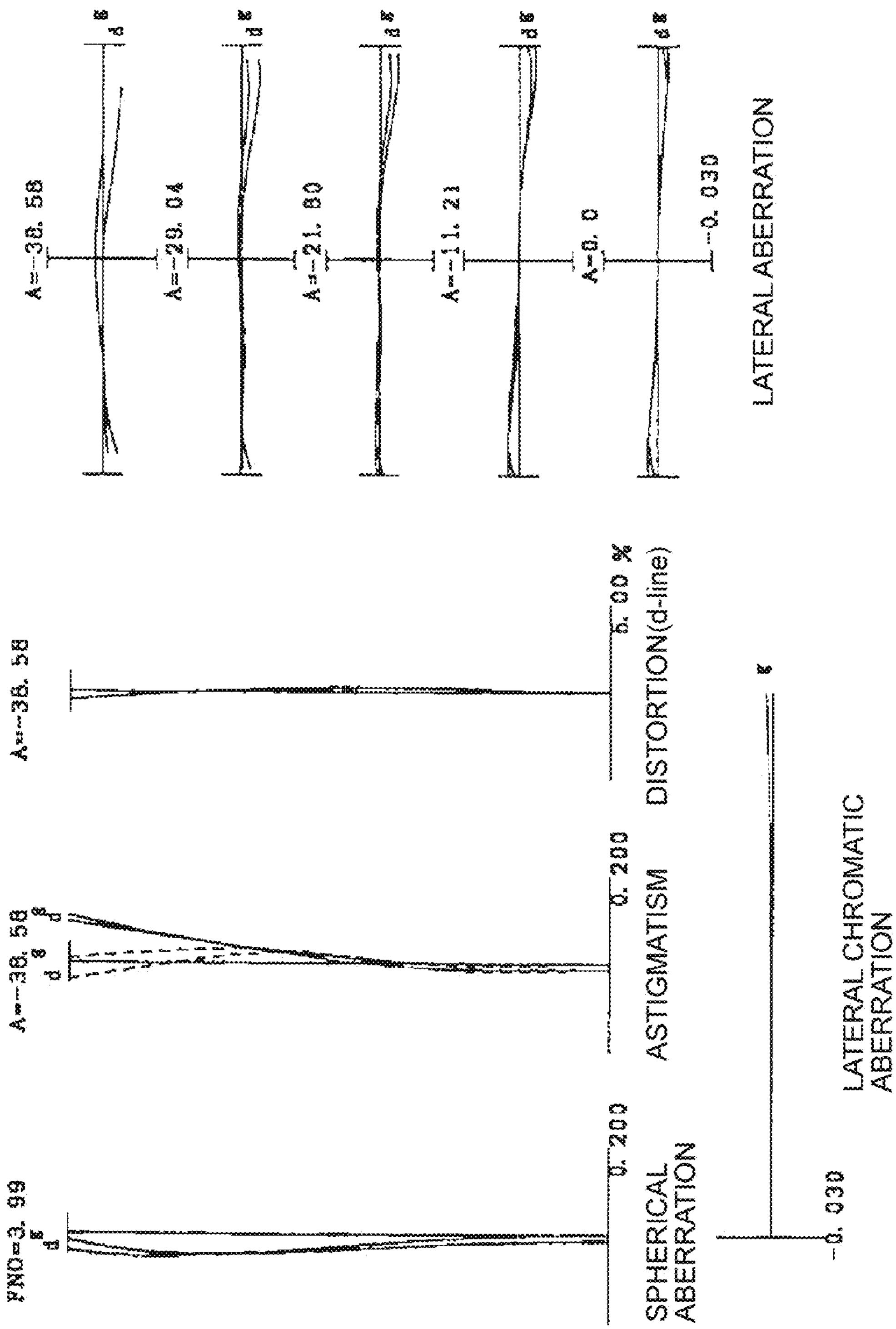
Figure 35C:
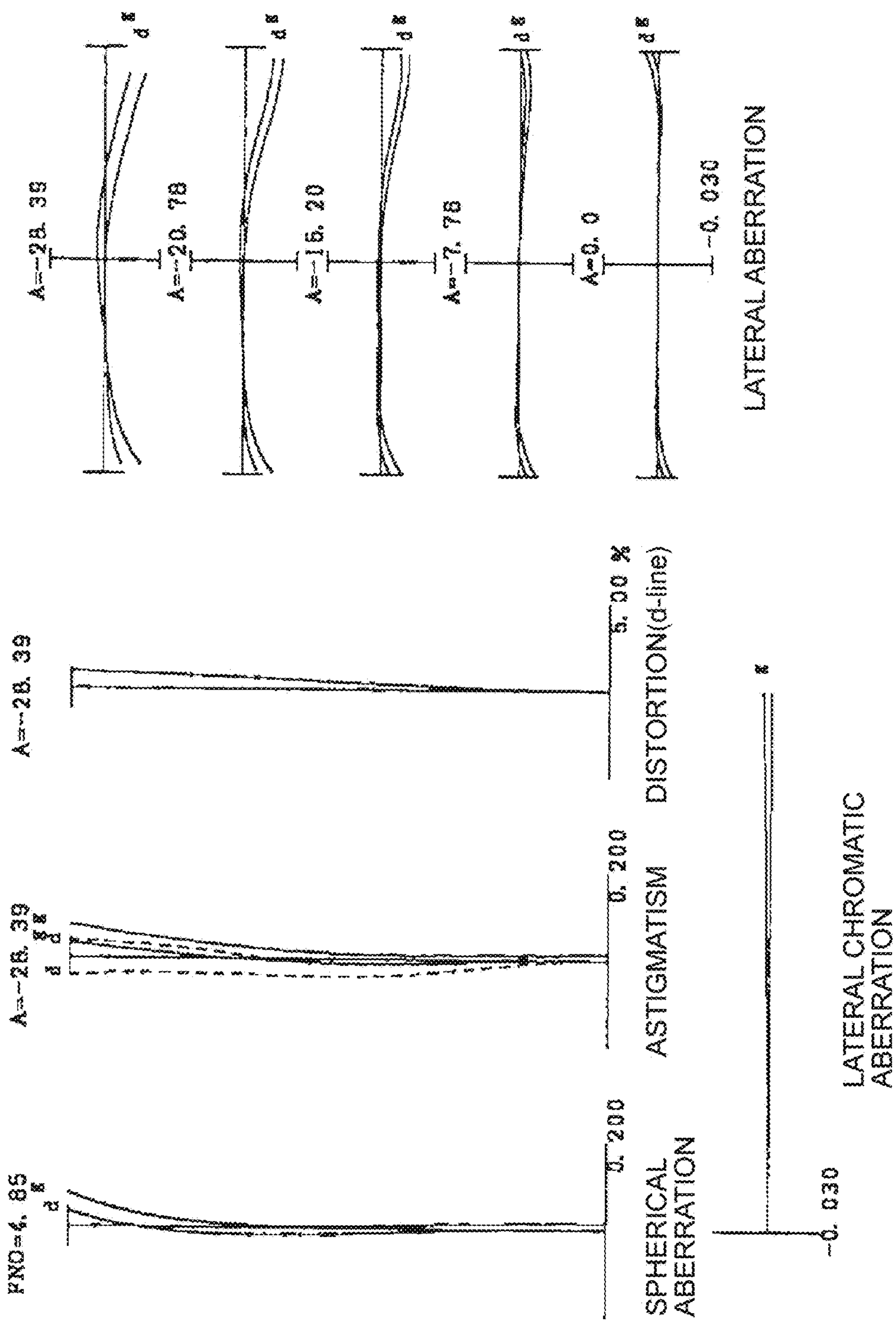
Figure 36A:
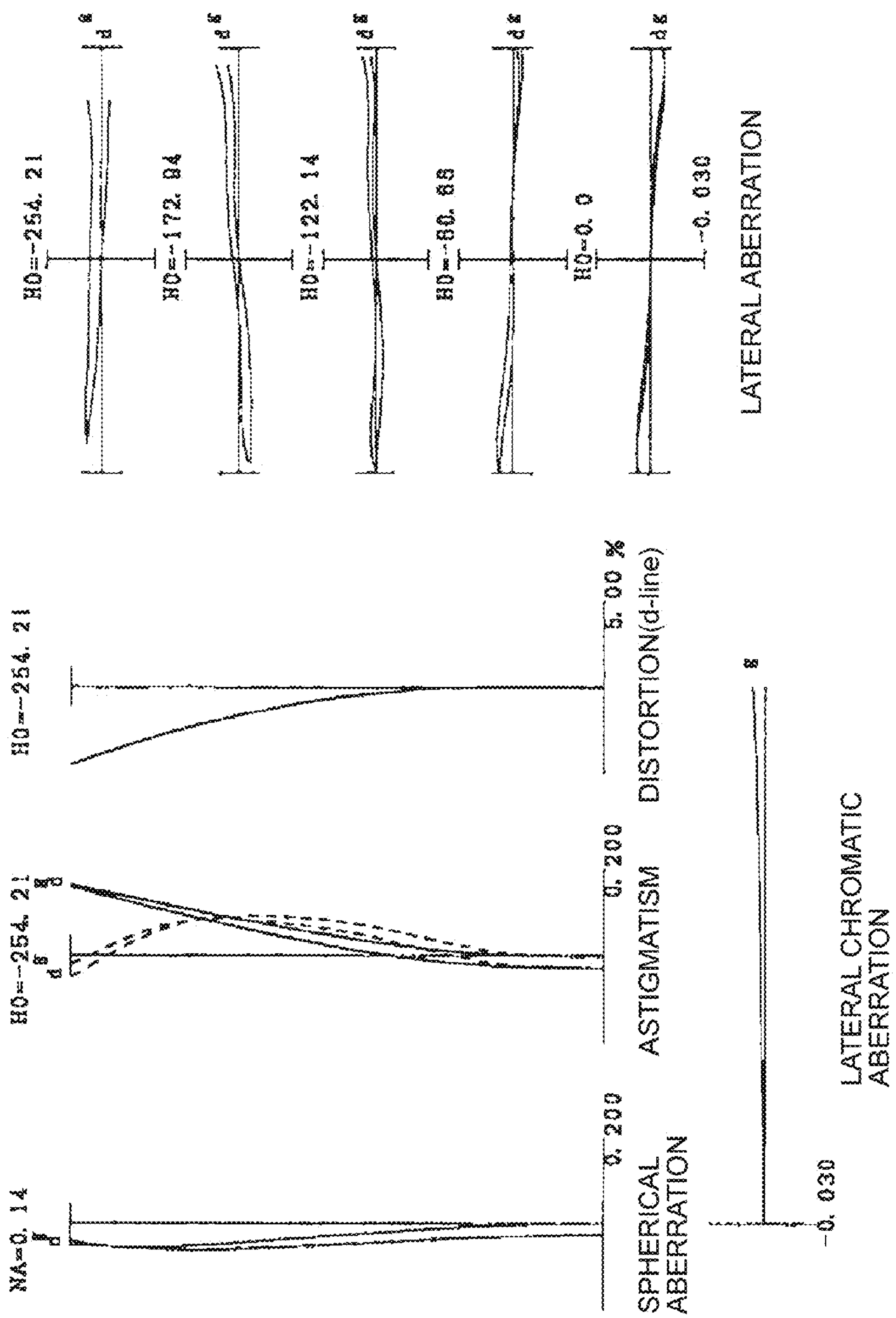
FIGS. 36A, 36B and 36C illustrate a graph showing aberrations in a point-blank range focusing state of the optical system according to Example 6 in case the object side medium is water, where
Figure 36B:
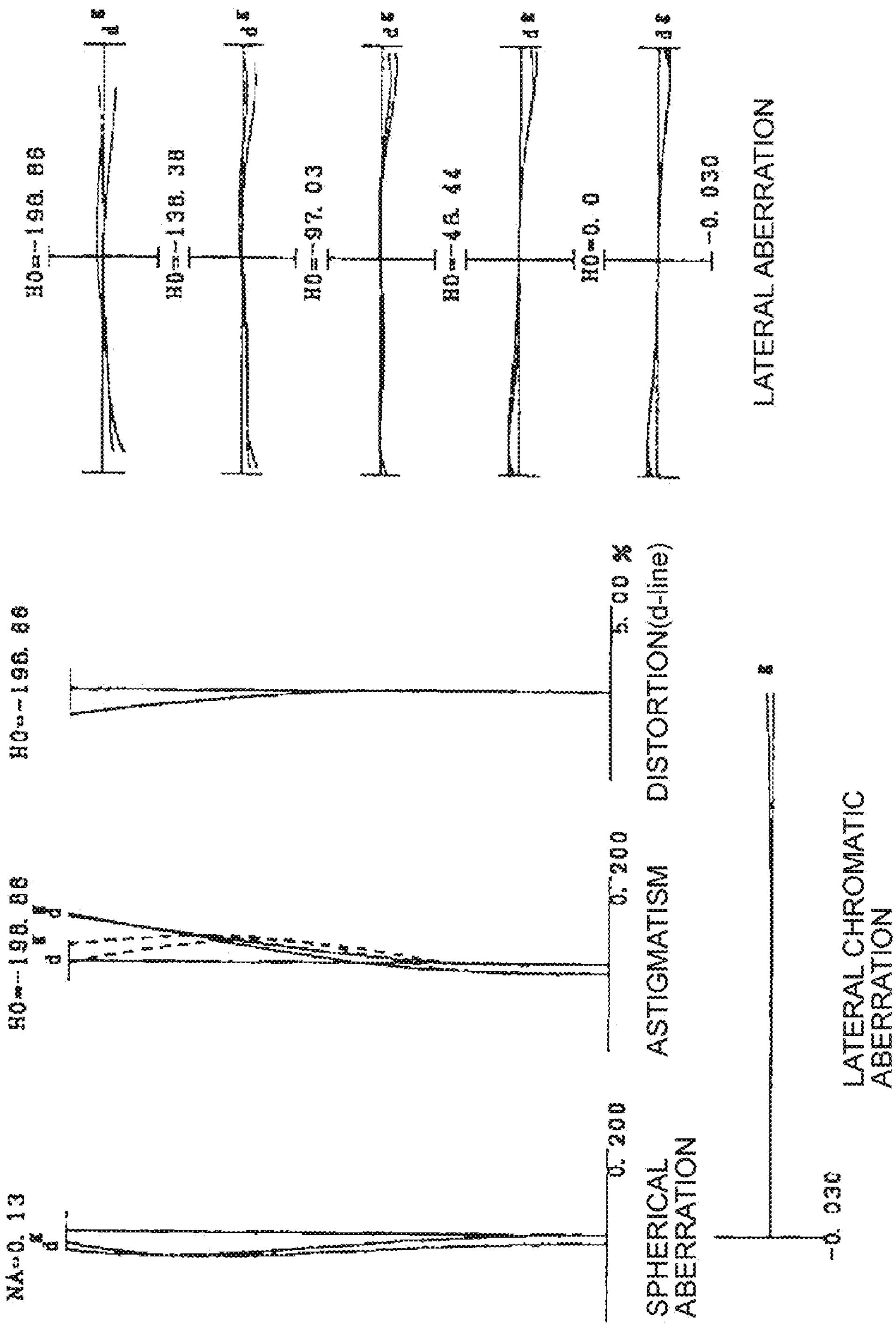
Figure 36C:
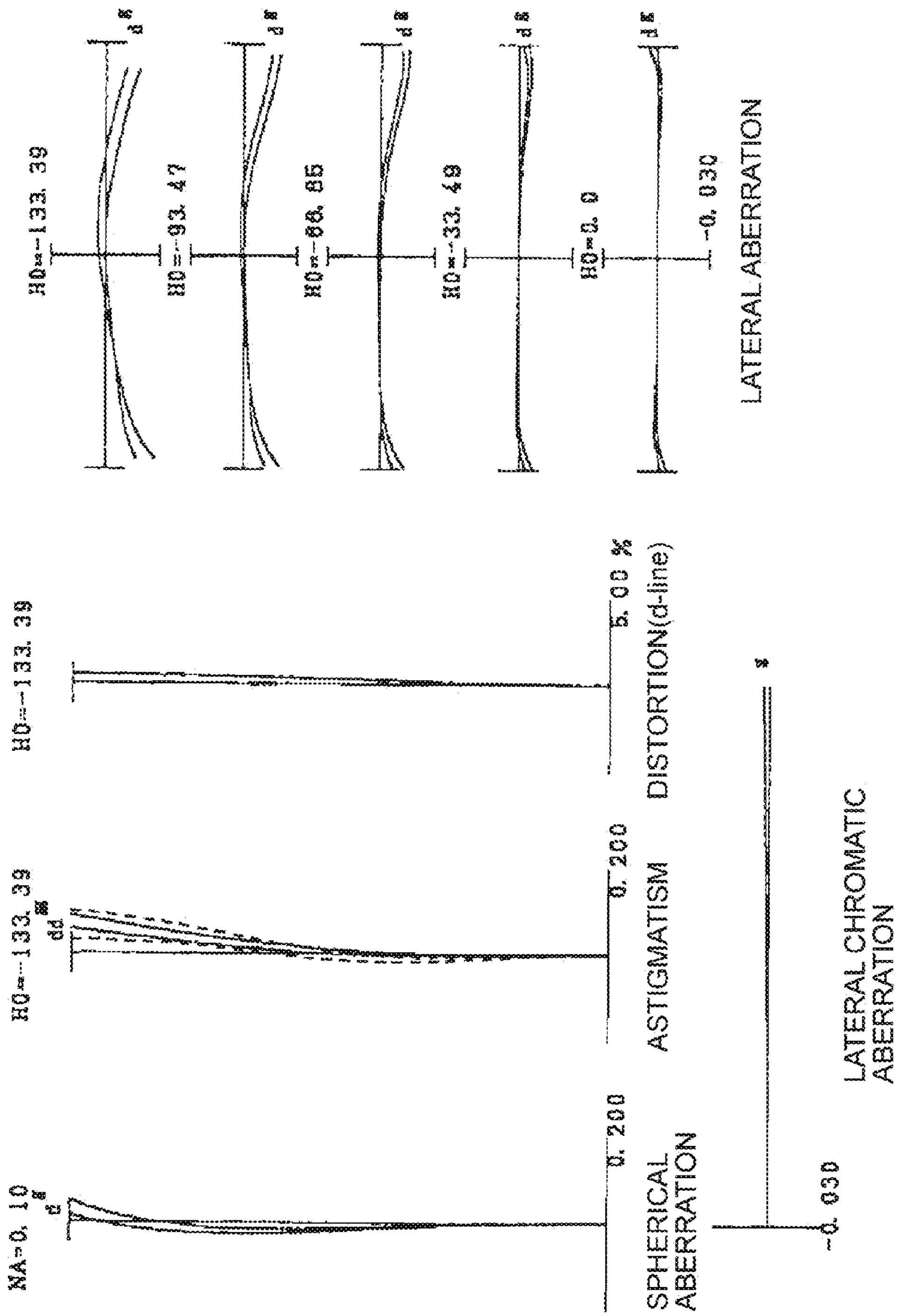

FIGS. 32A, 32B and 32C illustrate a graph showing various aberrations in an infinity focusing state of the optical system ZL6 according to Example 6 in case the object side medium is air, where FIG. 32A depicts the wide-angle end state, FIG. 32B depicts the intermediate focal length state, and FIG. 32C depicts the telephoto end state. FIGS. 33A, 33B and 33C illustrate a graph showing various aberrations in a point-blank range focusing state of the optical system ZL6 according to Example 6 in case the object side medium is air, where FIG. 33A depicts the wide-angle end state, FIG. 33B depicts the intermediate focal length state, and FIG. 33C depicts the telephoto end state. FIGS. 35A, 35B and 35C illustrate a graph showing various aberrations in an infinity focusing state of the optical system ZL6 according to Example 6 in case the object side medium is water, where FIG. 35A depicts a wide-angle end state, FIG. 35B depicts an intermediate focal length state, and FIG. 35C depicts a telephoto end state. FIGS. 36A, 36B and 36C illustrate a graph showing various aberrations in a point-blank range focusing state of the optical system ZL6 according to Example 6 in case the object side medium is water, where FIG. 36A depicts the wide-angle end state, FIG. 36B depicts the intermediate focal length state, and FIG. 36C depicts the telephoto end state.

According to each graph showing aberrations in FIGS. 32A, 32B and 32C, FIGS. 33A, 33B and 33C, FIGS. 35A, 35B and 35C, and FIGS. 36A, 36B and 36C, in the optical system ZL6 according to Example 6, it is possible to appropriately correct, regardless of the object side medium, various aberrations in any imaging states covering a range from a wide-angle end state to a telephoto end state and a range from an infinity focusing state to a point-blank focusing state, and have good optical performance.

EXAMPLE 7

Figure 37:
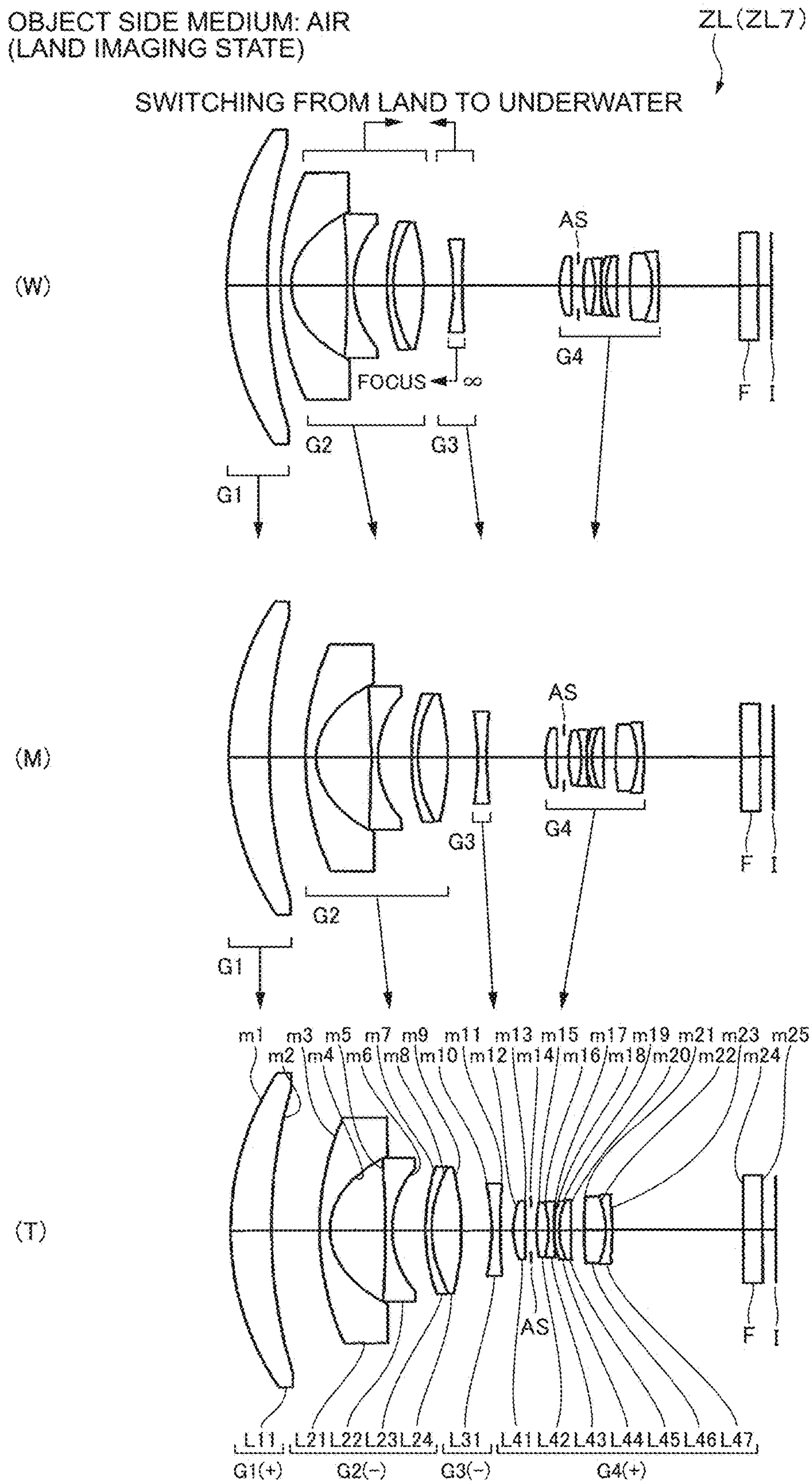
FIG. 37 illustrates a sectional view showing a lens configuration of the optical system according to Example 7 in case the object side medium is air, and a diagram showing a moving locus of each group from a wide-angle end state (W) to a telephoto end state (T) through an intermediate focal length state (M).
Figure 39A:
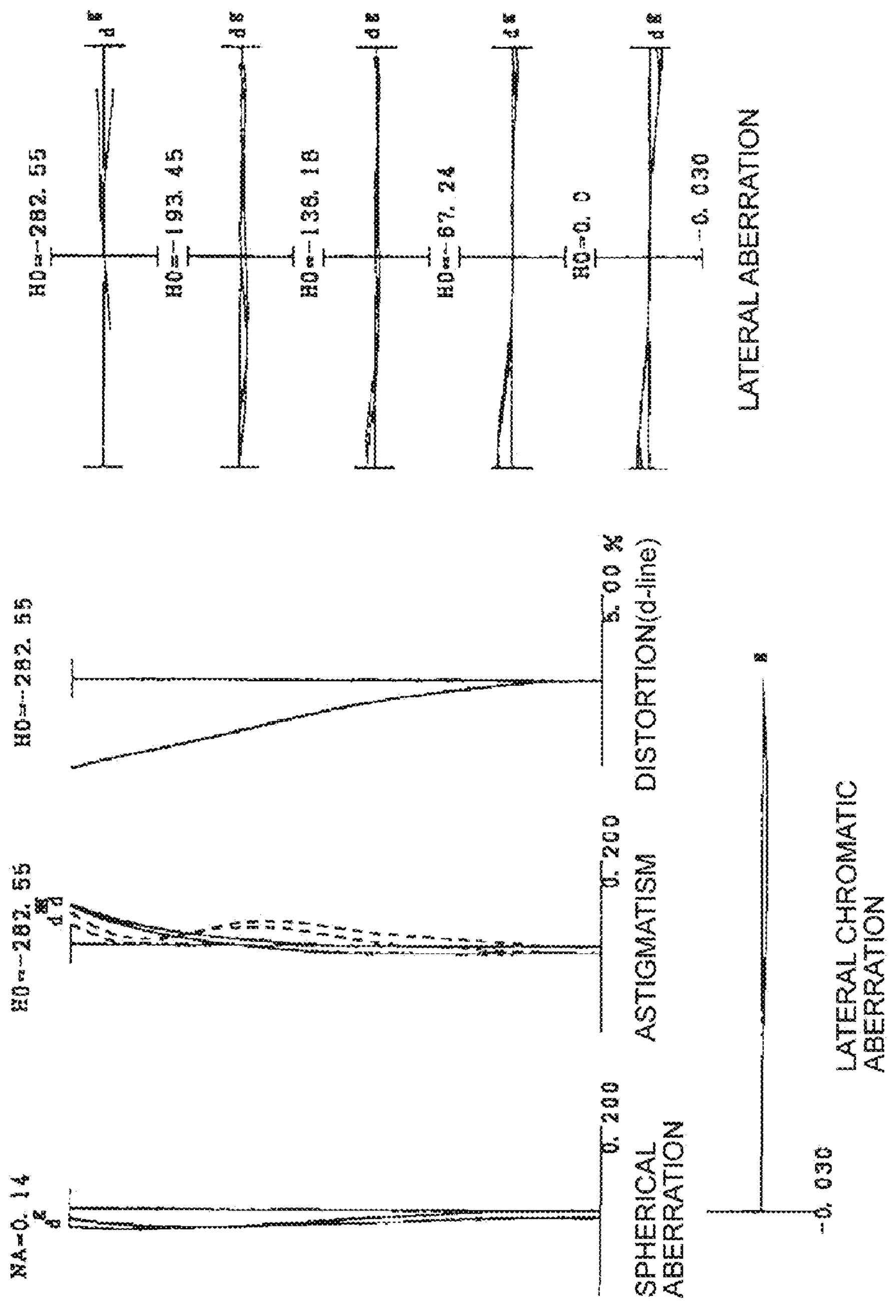
FIGS. 39A, 39B and 39C illustrate a graph showing aberrations in a point-blank range focusing state of the optical system according to Example 7 in case the object side medium is air, where
Figure 39B:
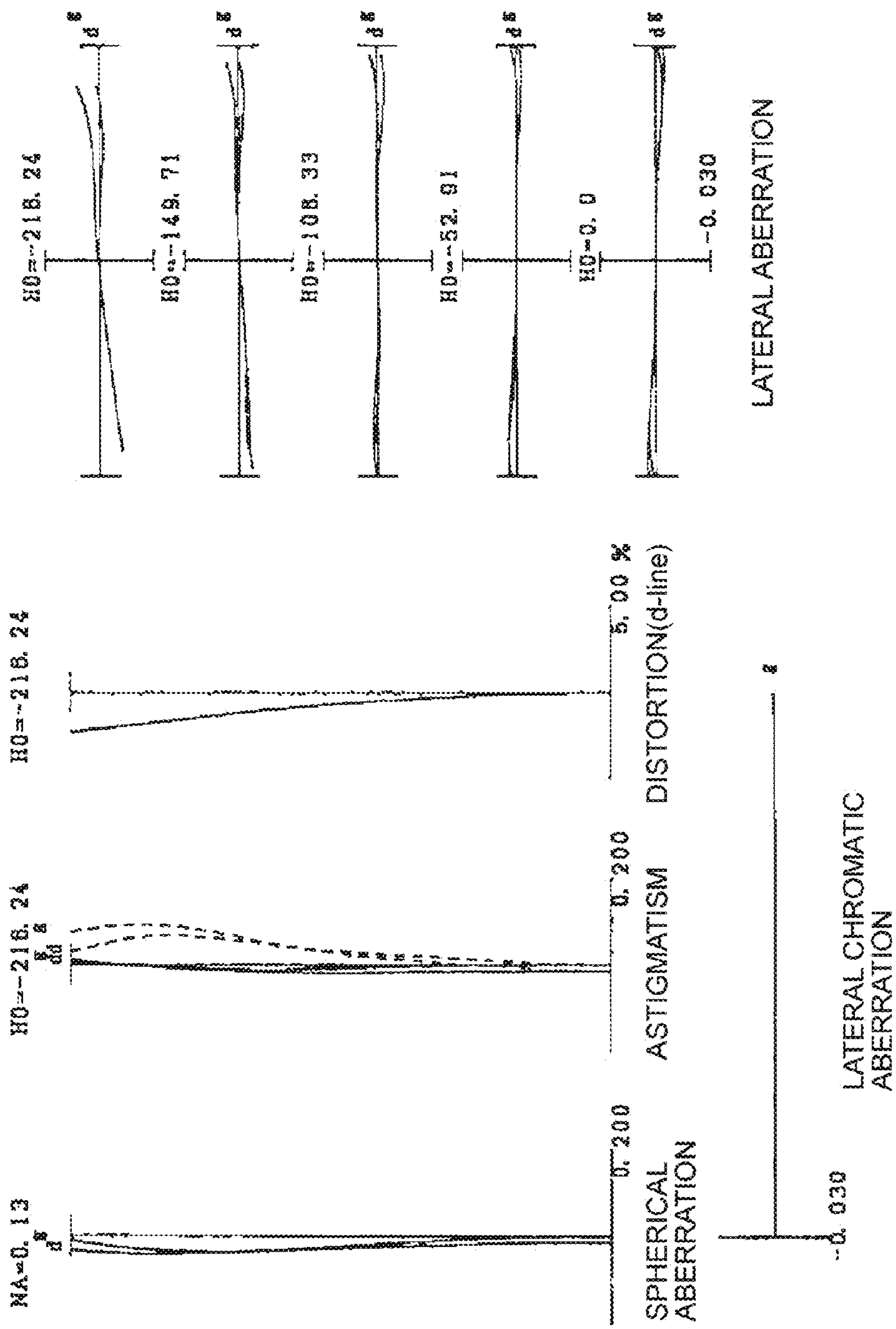
Figure 39C:
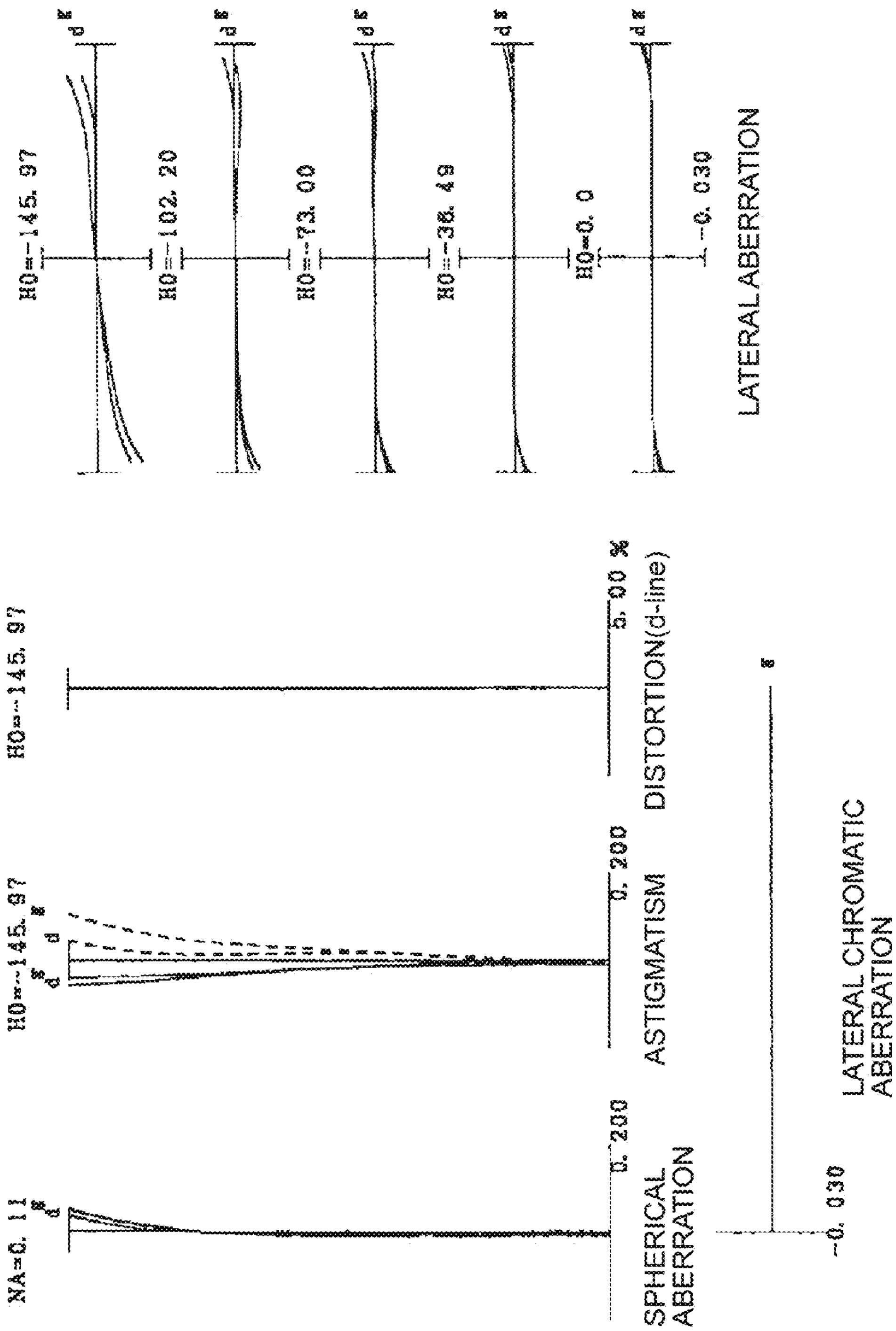
Figure 40:
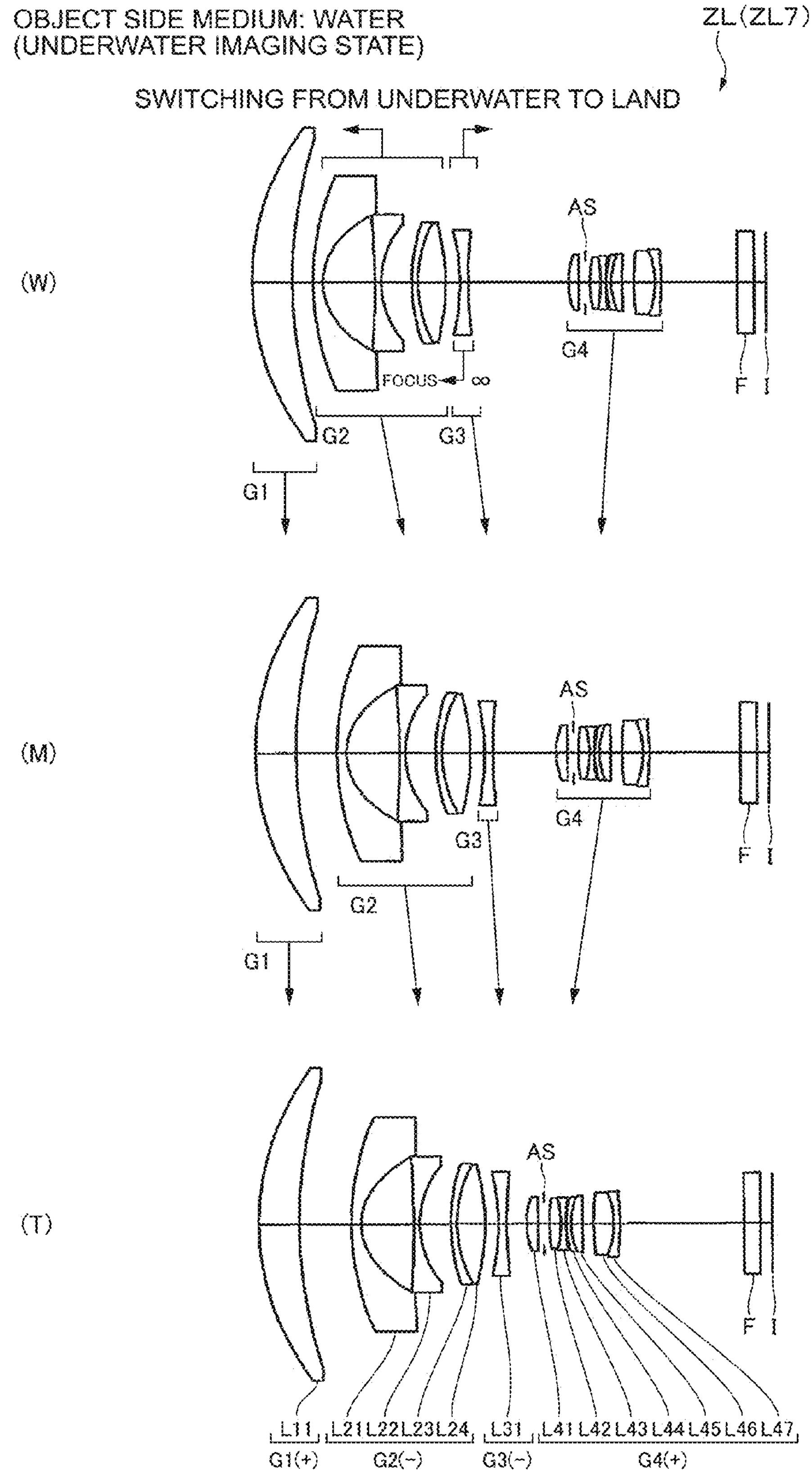
FIG. 40 illustrates a sectional view showing a lens configuration of the optical system according to Example 7 in case the object side medium is water, and a diagram showing a moving locus of each group from the wide-angle end state (W) to the telephoto end state (T) through the intermediate focal length state (M).

Example 7 is described with reference to FIG. 37 to FIG. 42, and Table 7. An optical system ZL (ZL2) according to the present example is an optical system capable of imaging in two object side media whose refractive indexes are different from each other. Note that the object side medium of a low refractive index is a "air," while the object side medium of a high refractive index is "water." FIG. 37 illustrates a sectional view showing a lens configuration of the optical system according to Example 7 in case the object side medium is air (land imaging state). FIG. 40 illustrates a sectional view showing a lens configuration of the optical system according to Example 7 in case the object side medium is water (underwater imaging state).

The optical system ZL7 according to Example 7 is composed of, as shown in FIG. 37 and FIGS. 40A, 40B and 40C, in order from the object, a first lens group G1 having positive refractive power, a second lens group G2 having negative refractive power, a third lens group G3 having negative refractive power, and a fourth lens group G4 having positive refractive power.

The first lens group G1 is composed of a positive meniscus lens L11 having a convex surface facing the object.

The second lens group G2 is composed of, in order from the object, a negative meniscus lens L21 having a concave surface facing the image, a biconcave lens L22, and a cemented lens composed of a negative meniscus lens L23 having a concave surface facing the image and the biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from the object, a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens composed of a biconvex lens L46 and a negative meniscus lens L47 having a concave surface facing the object. The image side surface of the negative meniscus lens L47 is an aspherical surface.

A filter group F is disposed on the image side of the fourth lens group G4. The filter group F is composed of a low-pass filter for cutting a spatial frequency more than a marginal dissector of image sensors such as a CCD disposed on the image surface I, and a CMOS, a cover-glass of an image sensor, etc.

The image surface I is formed on the image sensor which is composed of unillustrated CCDs, CMOSs, etc.

A position of the first lens group G1 on the optical axis fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state), the second lens group G2 and the third lens group G3 are independently moved upon zooming. In case the object side medium is water (underwater imaging state), the second lens group G2 and the third lens group G3 are independently moved upon zooming. Note that in the present embodiment, when changing the object side media the second lens group G2 is moved along the optical axis (a cam can be driven), and even the object side medium is air or water the second lens group G2 is configured so that the same moving locus is drawn upon zooming. Moreover, in case the object side medium is any one of air and water (also in any one of the land underwater imaging states), the fourth lens group G4 is moved upon zooming so that the same locus is drawn.

Upon focusing on from an infinity object to a point-blank range object, the third lens group G3 is moved to the object side.

When changing the object side media, the second lens group G2 and the third lens group G3 are moved along the optical axis. When changing the object side media from air (land imaging state) having a low refractive index medium to water (underwater imaging state) having a high refractive index medium, as shown in FIG. 37, the second lens group G2 is moved to the image side, and the third lens group G3 is moved to the object side. Moreover, when changing the object side media from water (underwater imaging state) having a high refractive index medium to air (land imaging state) having a low refractive index medium, as shown in FIG. 40, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes between when zooming and when changing the object side media. The distance between the second lens group G2 and the third lens group G3 changes between when zooming and when changing the object side media. The distance of the third lens group G3 and the fourth lens group G4 changes between when zooming and when changing the object side media.

The following Table 7 illustrates values of each general data in Example 7. The surface numbers 1 to 25 in Table 7 correspond to each optical surface of m1 to m25 shown in FIG. 37.

TABLE 7

[Object side medium]

| | |
|---|---|
| Medium 1: Air | n(d) = 1.00000 |
| Medium 2: Water | n(d) = 1.33306, νd = 54.0 |

[Lens data]

| Surface number | R | D | n(d) | νd |
|---|---|---|---|---|
| 1 | 42.22733 | 6.335 | 1.51680 | 63.9 |
| 2 | 75.54140 | (D2) | 1.00000 | |
| 3 | 42.10297 | 1.600 | 1.69412 | 53.4 |
| *4 | 9.29586 | 8.428 | 1.00000 | |
| 5 | −152.58688 | 1.000 | 1.77387 | 47.2 |
| *6 | 14.74406 | 4.980 | 1.00000 | |
| 7 | 29.06565 | 1.000 | 1.49782 | 82.6 |
| 8 | 20.13290 | 4.533 | 1.83400 | 37.2 |
| 9 | −36.31856 | (D9) | 1.00000 | |
| 10 | −36.35405 | 1.350 | 1.80400 | 46.6 |
| 11 | 75.12258 | (D11) | 1.00000 | |
| 12 | 12.03690 | 1.788 | 1.51680 | 63.9 |
| 13 | 2194.56530 | 1.000 | 1.00000 | |
| 14 | (Aperture stop AS) | 0.800 | 1.00000 | |
| 15 | 20.41730 | 1.851 | 1.49782 | 82.6 |
| 16 | −16.19242 | 0.800 | 1.74400 | 44.8 |
| 17 | 28.46364 | 0.100 | 1.00000 | |
| 18 | 14.03153 | 0.800 | 1.85026 | 32.4 |
| 19 | 10.89846 | 1.787 | 1.51680 | 63.9 |
| 20 | 158.99167 | 1.903 | 1.00000 | |
| 21 | 39.29941 | 3.389 | 1.49782 | 82.6 |
| 22 | −12.97070 | 1.000 | 1.77387 | 47.2 |
| *23 | −34.48678 | (D23) | 1.00000 | |
| 24 | 0.00000 | 2.790 | 1.51680 | 64.1 |
| 25 | 0.00000 | (D25) | 1.00000 | |

[Aspheric surface data]

| Surface | κ | A4 | A6 | A8 | A10 |
|---|---|---|---|---|---|
| 4 | −1.14130e+00 | 2.58750e−04 | −1.05251e−06 | 9.80656e−09 | −3.48780e−11 |
| 6 | −4.22670e+00 | 2.12413e−04 | −1.26388e−06 | 1.00891e−08 | −3.41847e−11 |
| 23 | 7.54800e−01 | 1.87344e−04 | 6.69036e−07 | 2.69878e−08 | −2.35562e−10 |

[Various data]

| | W | M | T |
|---|---|---|---|
| (Medium 1: Air) | | | |
| f | 7.20 | 9.30 | 13.60 |
| FNo | 3.46 | 3.80 | 4.53 |
| ω | 48.8 | 40.9 | 30.3 |
| Y | 8.00 | 8.00 | 8.00 |
| TL | 83.000 | 83.000 | 83.000 |
| BF | 17.002 | 19.496 | 24.817 |
| BF (Air) | 16.051 | 18.545 | 23.867 |
| (Medium 2: Water) | | | |
| f | 6.08 | 7.61 | 10.95 |
| FNo | 3.46 | 3.80 | 4.54 |
| ω | 45.4 | 38.6 | 28.6 |
| Y | 8.00 | 8.00 | 8.00 |
| TL | 83.000 | 83.000 | 83.000 |
| BF | 17.002 | 19.496 | 24.817 |
| BF (Air) | 16.051 | 18.545 | 23.867 |

TABLE 7-continued

[Variable distance data]

| | Upon focusing on infinity | | | Upon focusing on point-blank range | | |
|---|---|---|---|---|---|---|
| | W | M | T | W | M | T |
| (Medium 1: Air) | | | | | | |
| D0 | ∞ | ∞ | ∞ | 217.00 | 217.00 | 217.00 |
| β | — | — | — | −0.0299 | −0.0379 | −0.0548 |
| f | 7.20 | 9.30 | 13.60 | — | — | — |
| D2 | 2.062 | 5.439 | 7.215 | 2.062 | 5.439 | 7.215 |
| D9 | 4.533 | 4.639 | 4.525 | 3.876 | 3.965 | 3.841 |
| D11 | 14.959 | 8.982 | 2.000 | 15.616 | 9.656 | 2.684 |
| D23 | 12.112 | 14.606 | 19.928 | 12.112 | 14.606 | 19.928 |
| D25 | 2.100 | 2.100 | 2.100 | 2.100 | 2.100 | 2.100 |
| (Medium 2: Water) | | | | | | |
| D0 | ∞ | ∞ | ∞ | 217.00 | 217.00 | 217.00 |
| β | — | — | — | −0.0331 | −0.0407 | −0.0581 |
| f | 6.08 | 7.61 | 10.95 | — | — | — |
| D2 | 3.305 | 6.682 | 8.455 | 3.305 | 6.682 | 8.455 |
| D9 | 2.216 | 2.310 | 2.188 | 1.600 | 1.714 | 1.600 |
| D11 | 16.032 | 10.068 | 3.096 | 16.649 | 10.665 | 3.684 |
| D23 | 12.112 | 14.606 | 19.928 | 12.112 | 14.606 | 19.928 |
| D25 | 2.100 | 2.100 | 2.100 | 2.100 | 2.100 | 2.100 |

[Lens group data]
(Medium 1: Air)

| Lens group | Front end surface | Focal length |
|---|---|---|
| First lens group | 1 | 174.01 |
| Second lens group | 3 | −91.93 |
| Third lens group | 10 | −30.31 |
| Fourth lens group | 12 | 16.49 |

[Values corresponding to the conditional expressions]

Conditional expression (1) R1/Ymax = 5.278
Conditional expression (2) f2/f3 = 3.033
Conditional expression (3) R1/R2 = 0.566

Based on Table 7, in the optical system ZL7 according to Example 7 it is understandable that the conditional expressions (1) to (3) are satisfied.

Figure 38A:
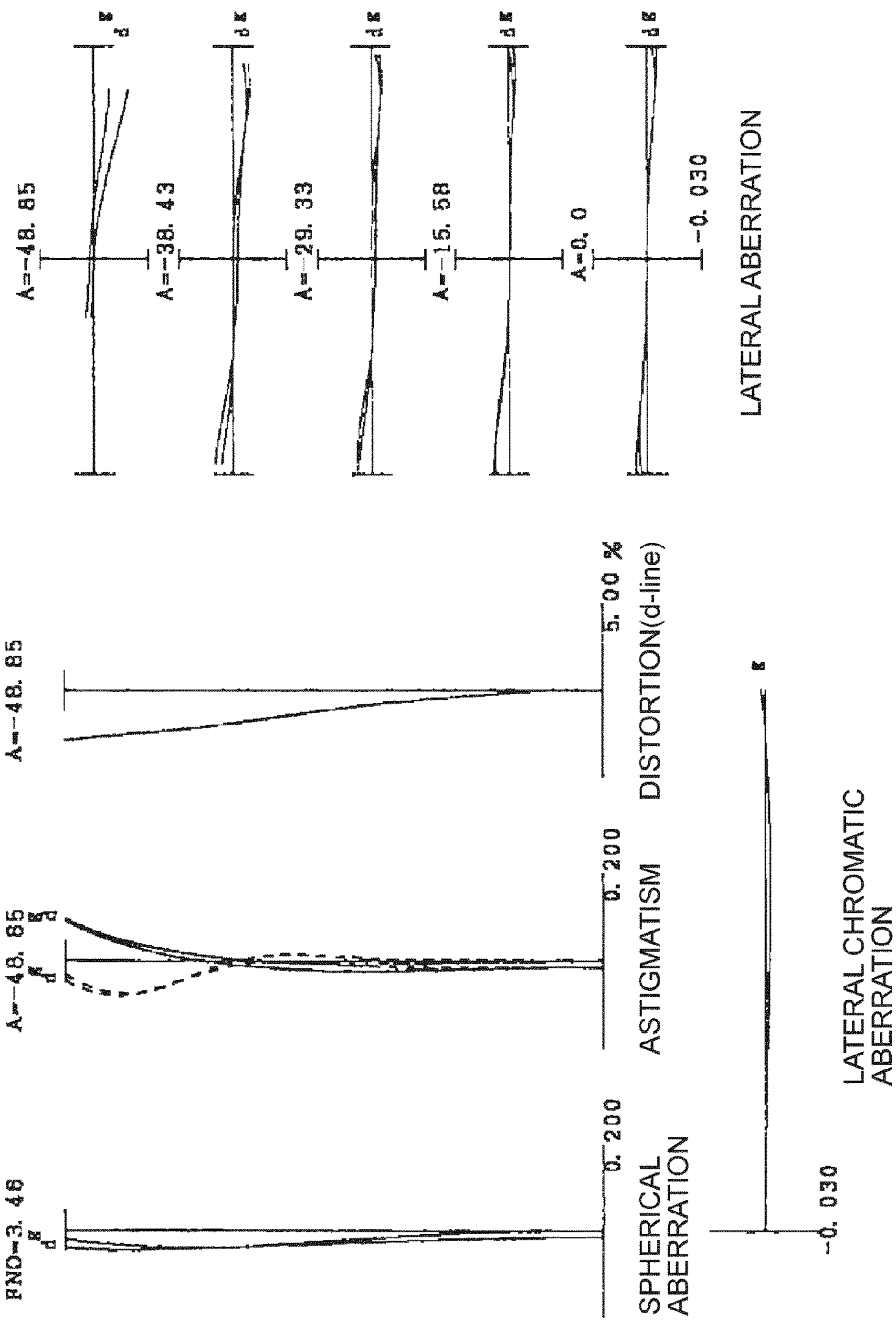
FIGS. 38A, 38B and 38C illustrate a graph showing aberrations in an infinity focusing state of the optical system according to Example 7 in case the object side medium is air, where
Figure 38B:
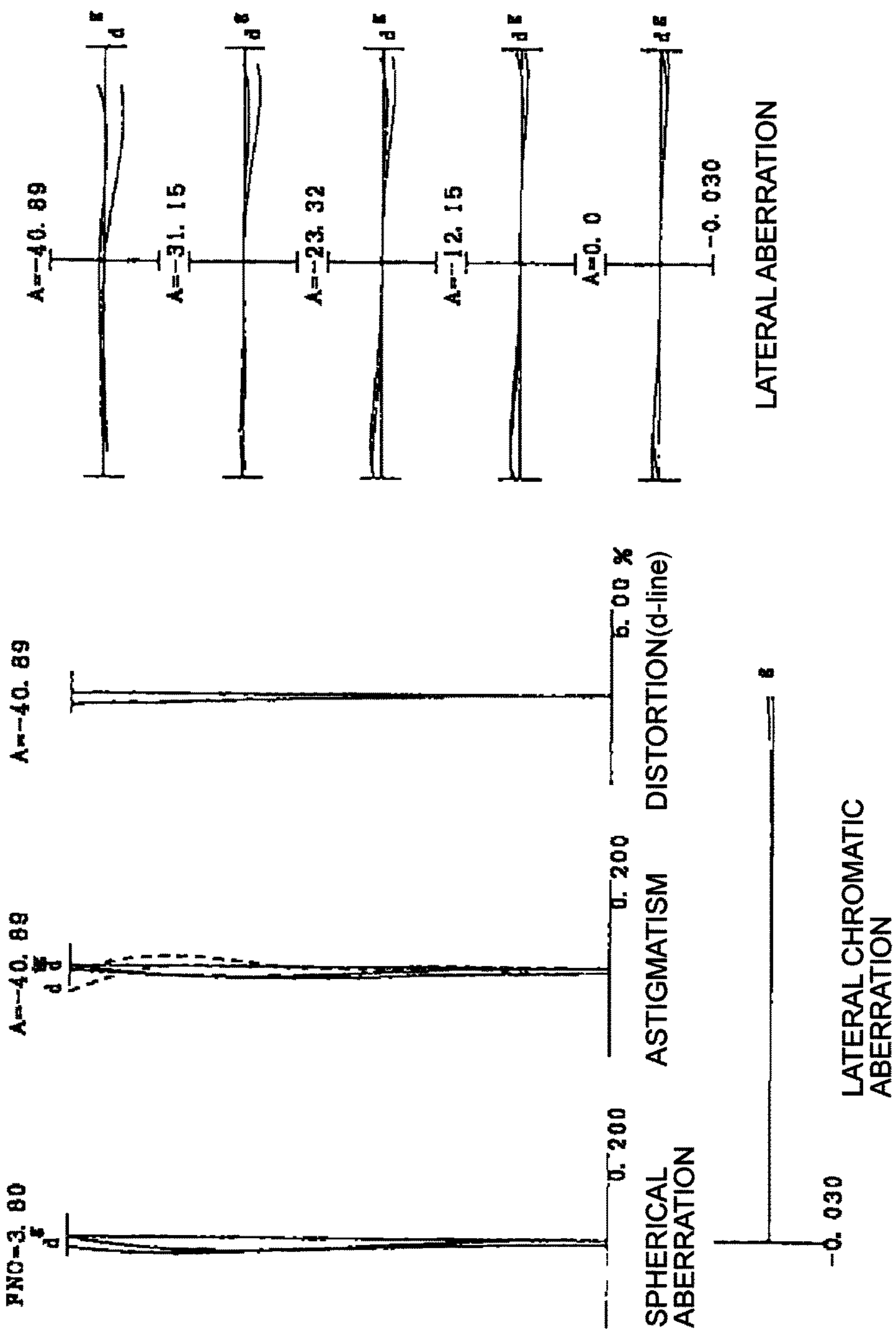
Figure 38C:
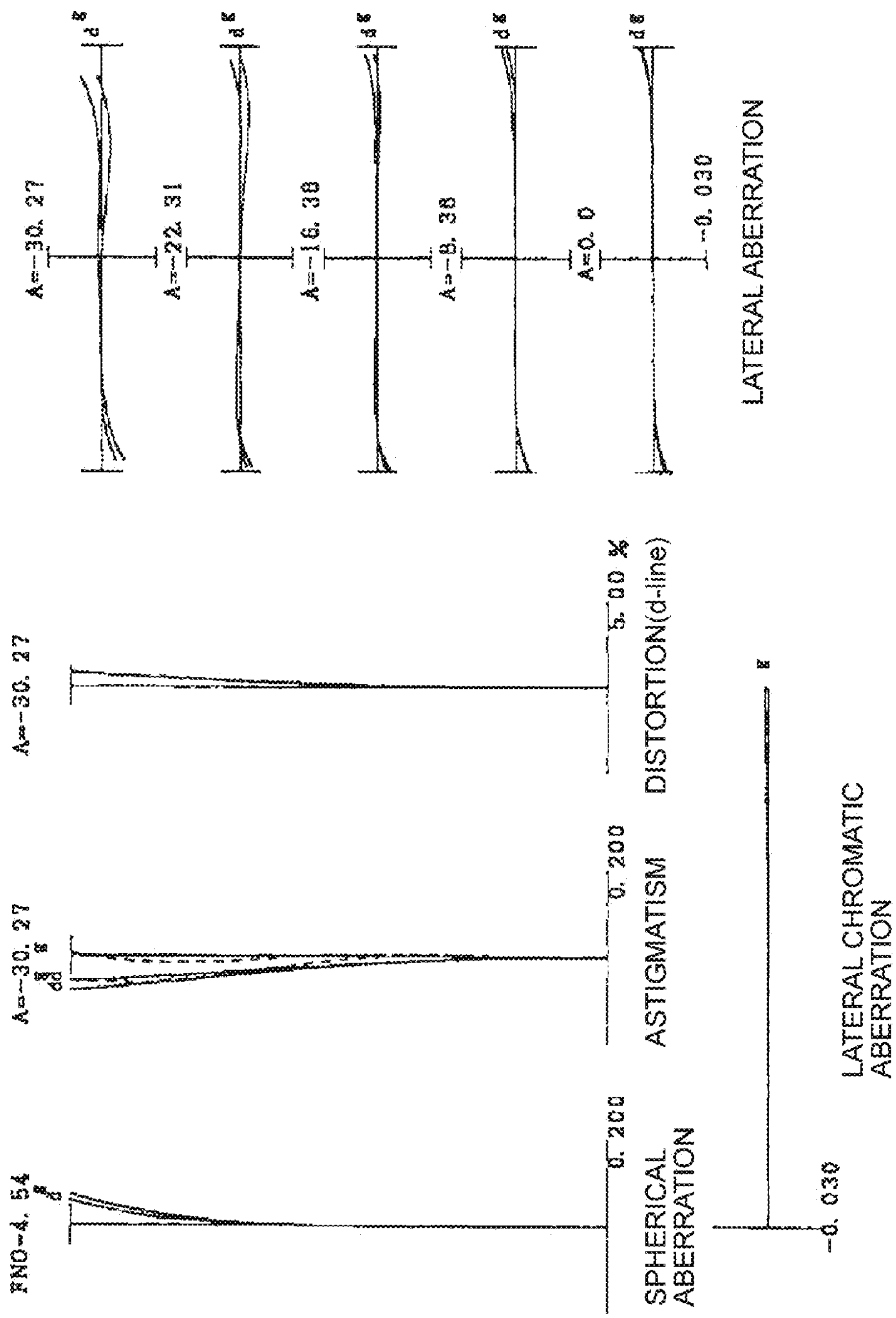
Figure 41A:
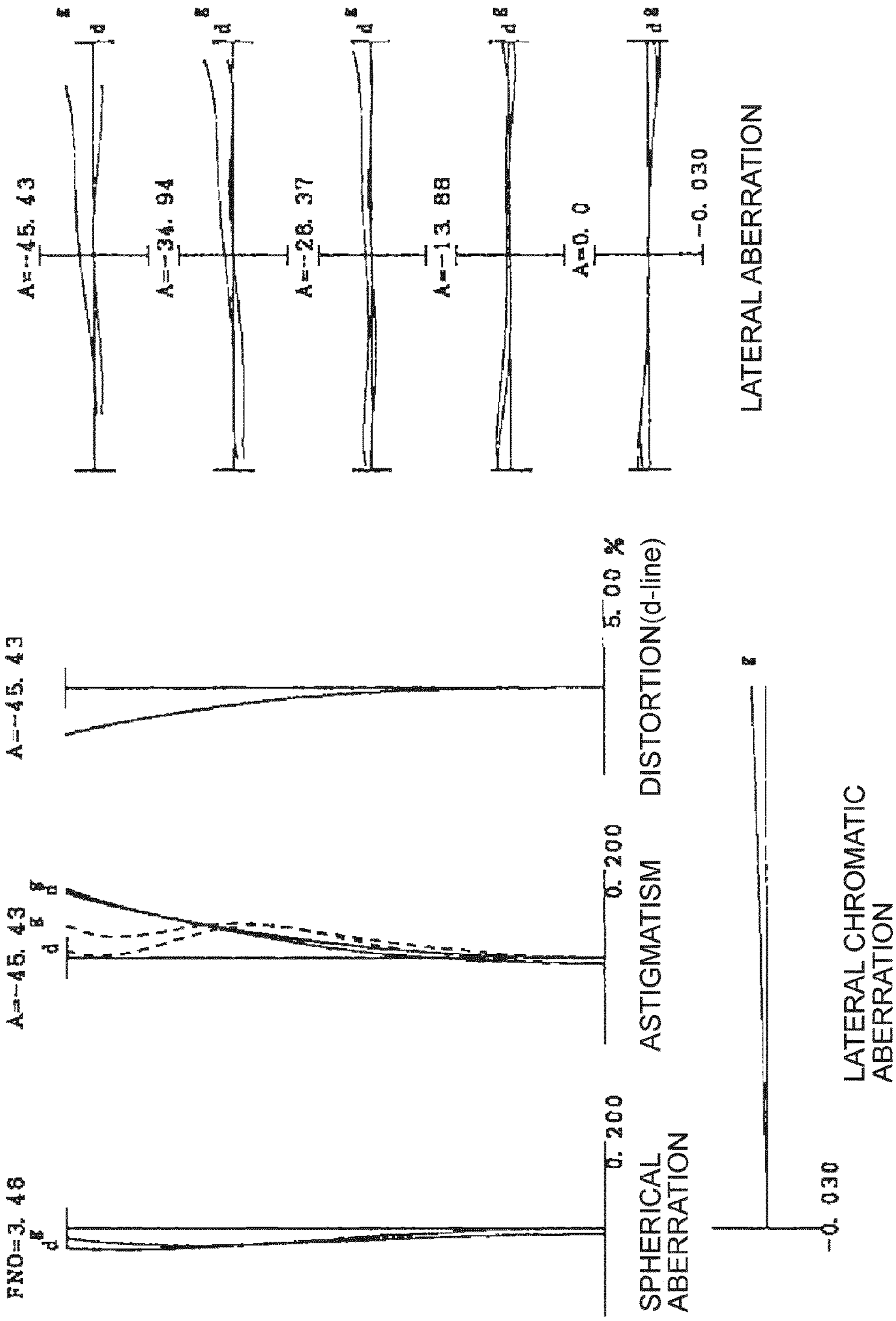
FIGS. 41A, 41B and 41C illustrate a graph showing aberrations in an infinity focusing state of the optical system according to Example 7 in case the object side medium is water, where
Figure 41B:
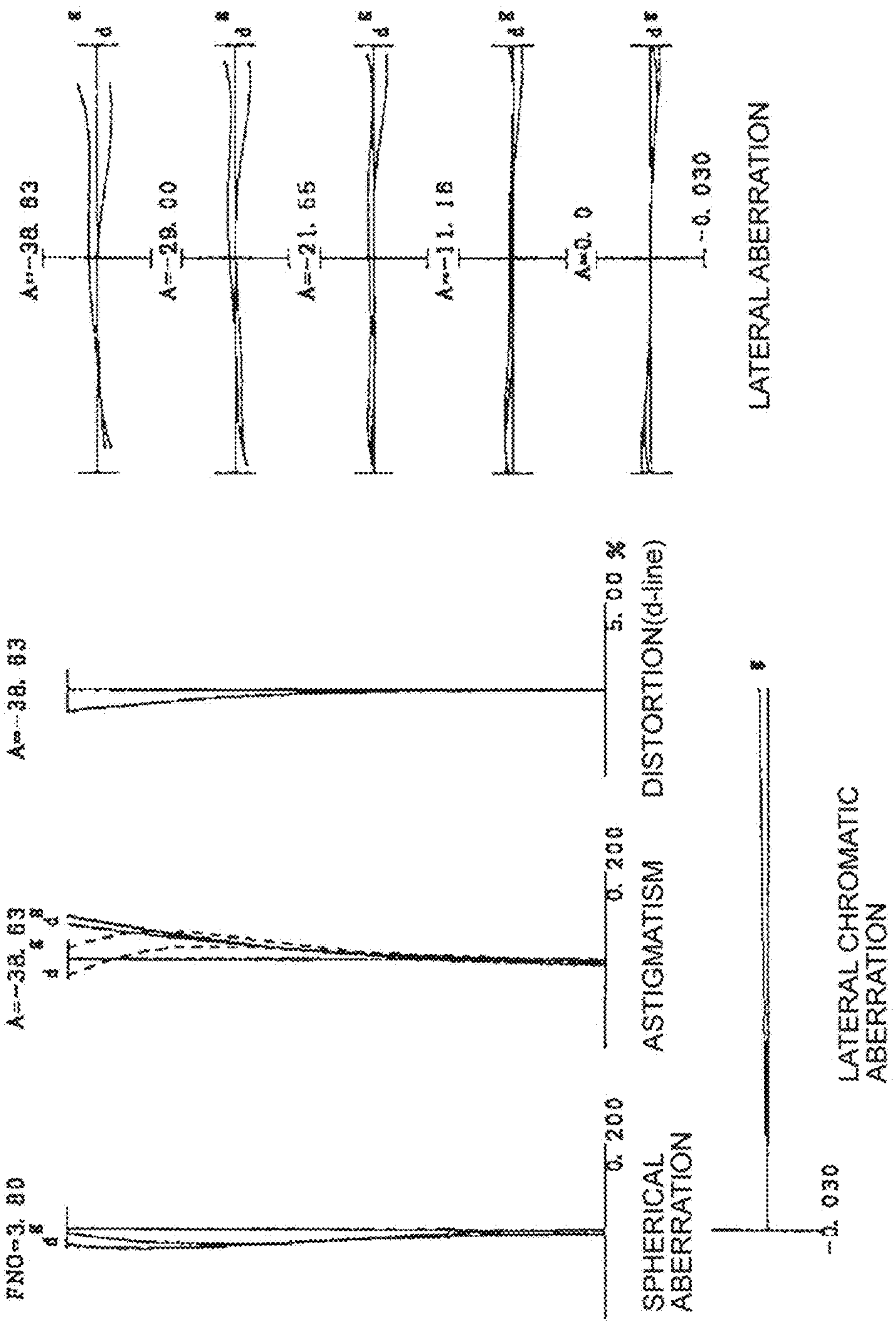
Figure 41C:
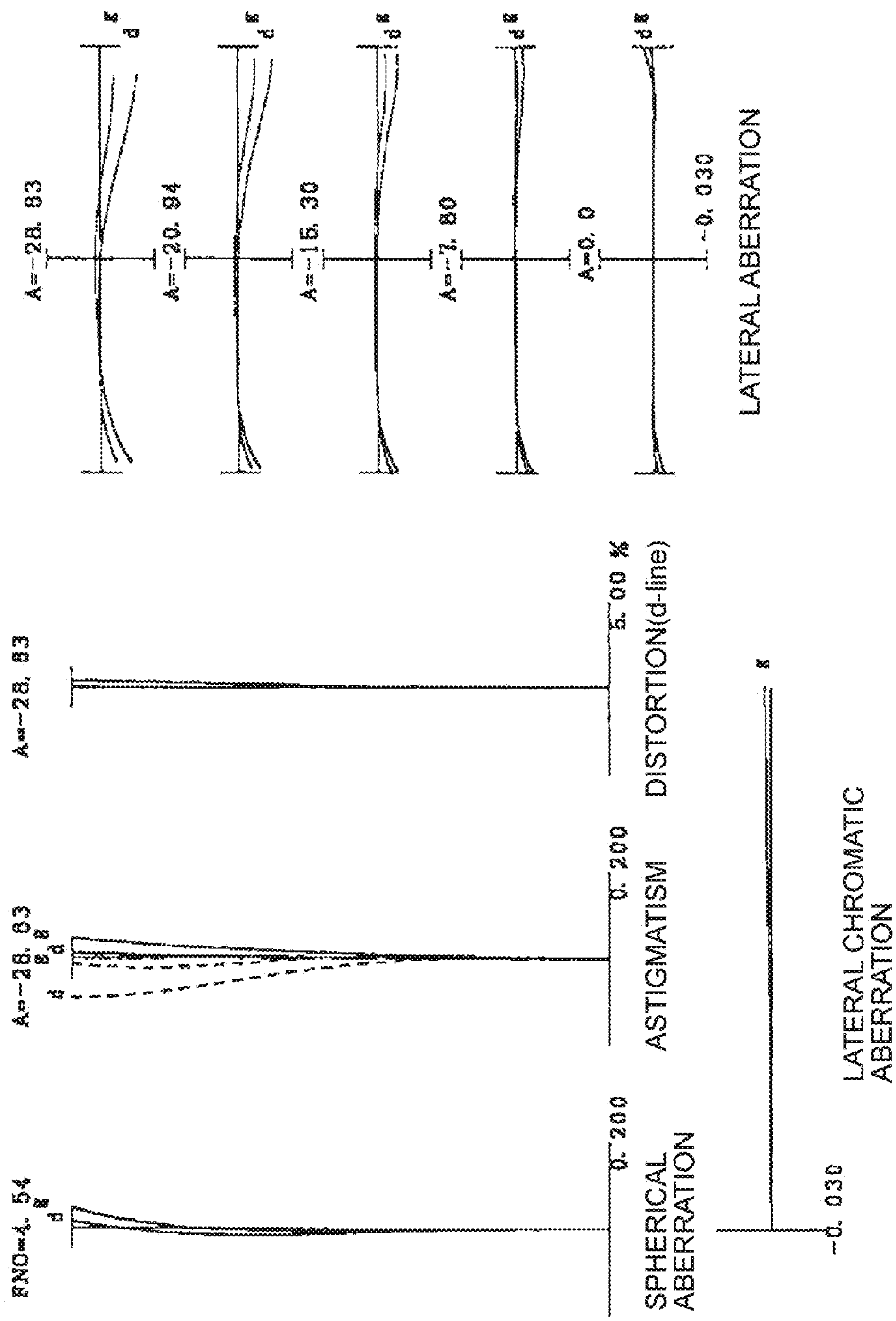
Figure 42A:
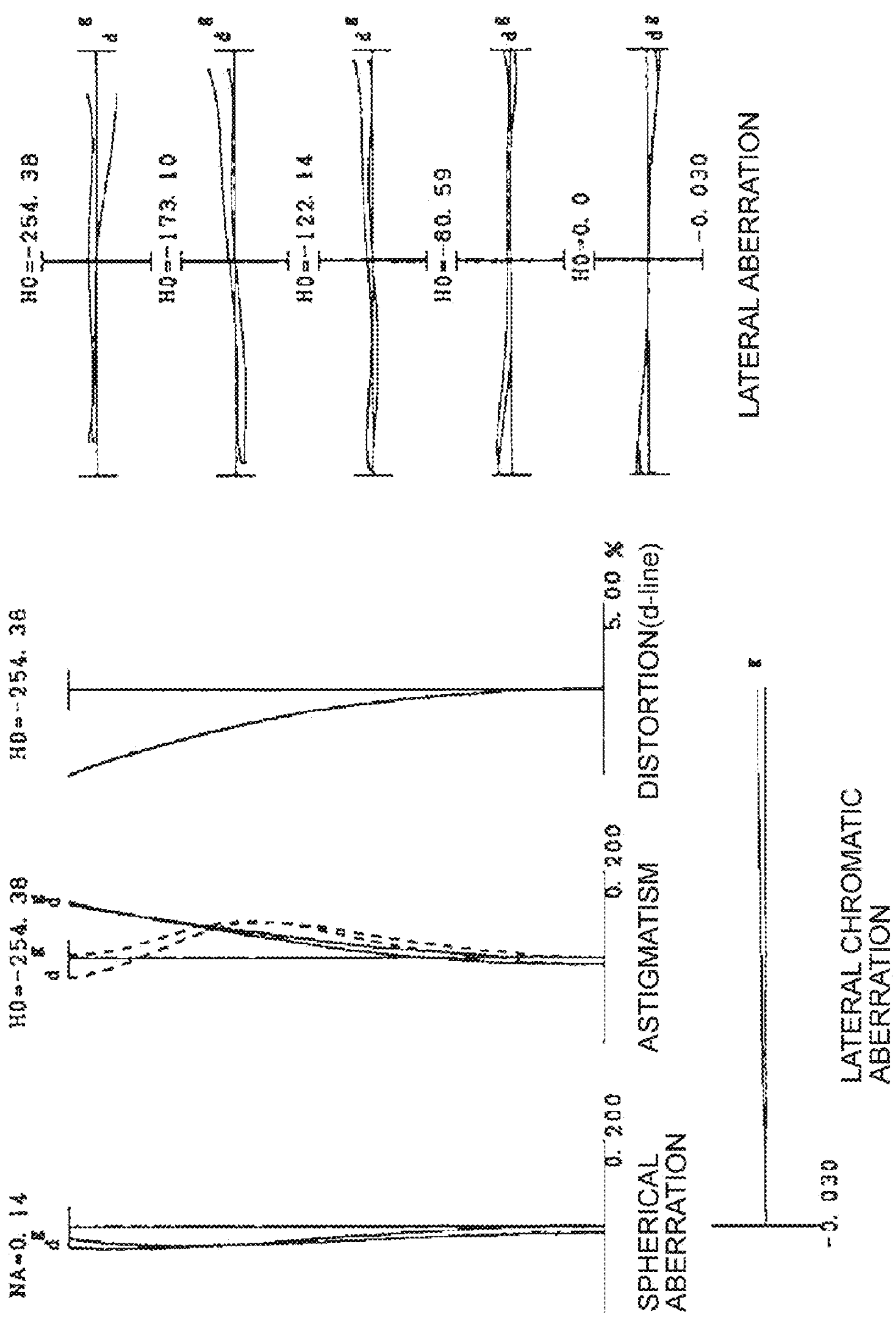
FIGS. 42A, 42B and 42C illustrate a graph showing aberrations in a point-blank range focusing state of the optical system according to Example 7 in case the object side medium is water, where
Figure 42B:
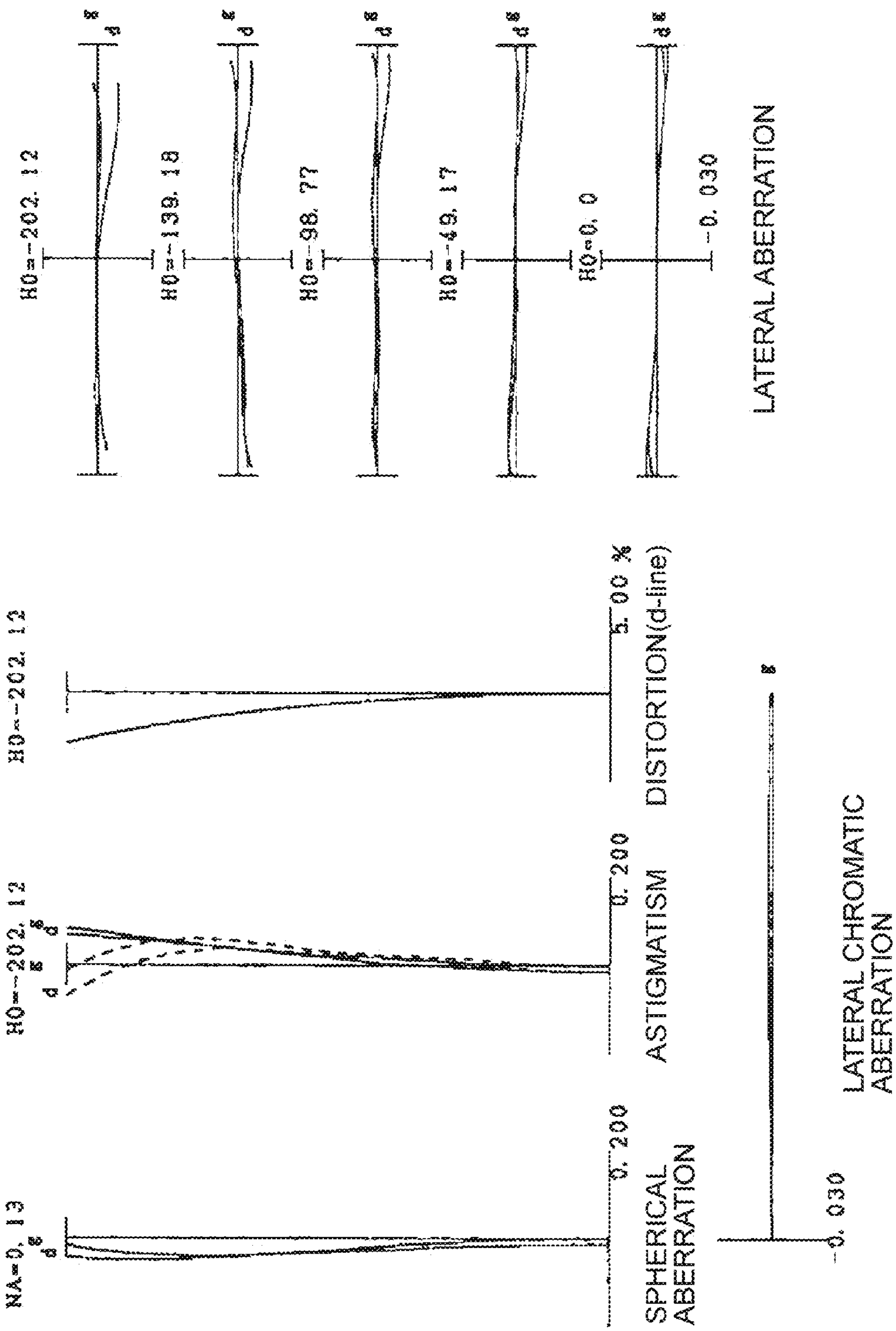
Figure 42C:
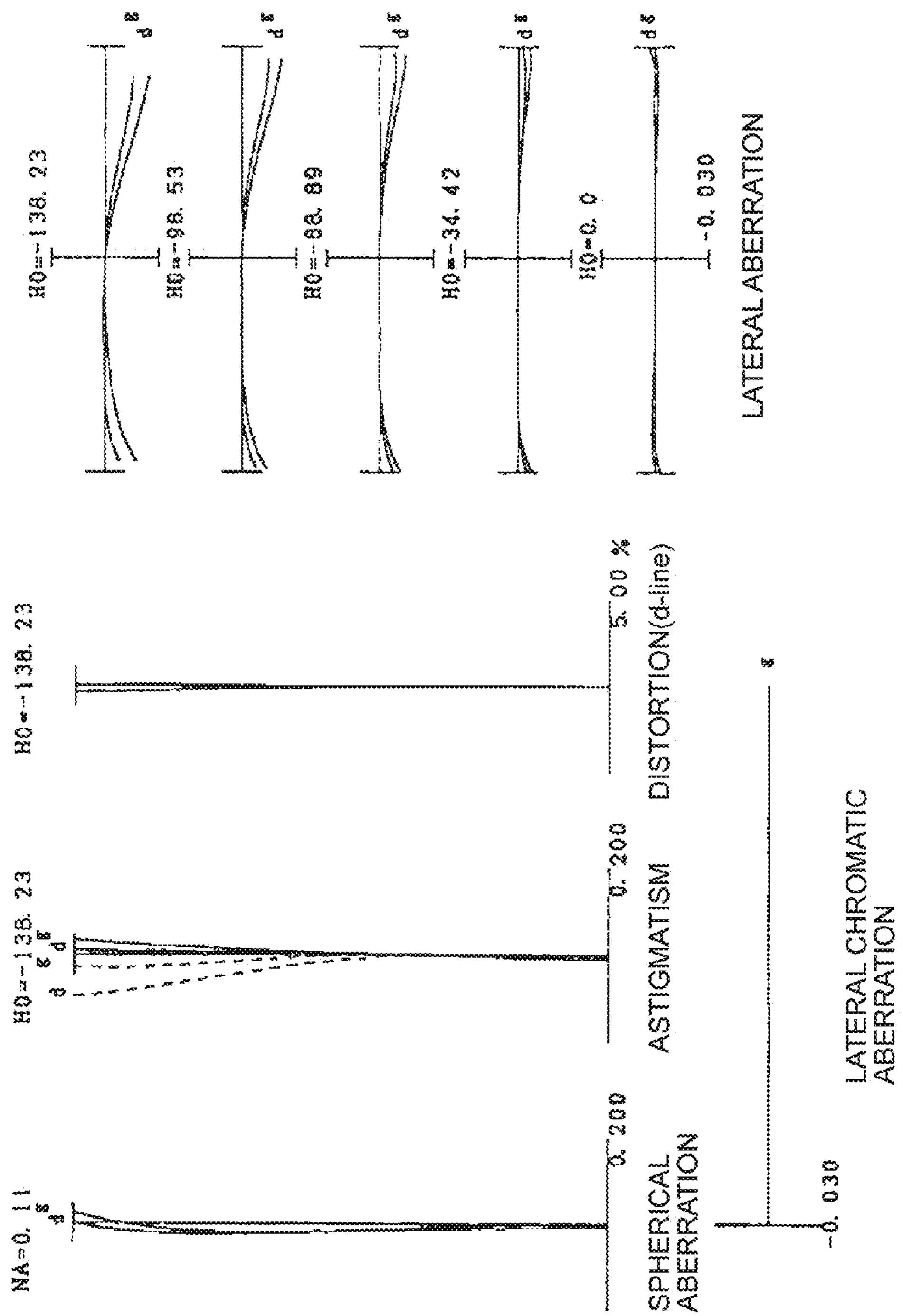

FIGS. 38A, 38B and 38C illustrate a graph showing various aberrations in an infinity focusing state of the optical system ZL7 according to Example 7 in case the object side medium is air, where FIG. 38A depicts the wide-angle end state, FIG. 38B depicts the intermediate focal length state, and FIG. 38C depicts the telephoto end state. FIGS. 39A, 39B and 39C illustrate a graph showing various aberrations in a point-blank range focusing state of the optical system ZL7 according to Example 7 in case the object side medium is air, where FIG. 39A depicts the wide-angle end state, FIG. 39B depicts the intermediate focal length state, and FIG. 39C depicts the telephoto end state. FIGS. 41A, 41B and 41C illustrate a graph showing various aberrations in an infinity focusing state of the optical system ZL7 according to Example 7 in case the object side medium is water, where FIG. 41A depicts the wide-angle end state, FIG. 41B depicts the intermediate focal length state, and FIG. 41C depicts the telephoto end state. FIGS. 42A, 42B and 42C illustrate a graph showing various aberrations in a point-blank range focusing state of the optical system ZL7 according to Example 7 in case the object side medium is water, where FIG. 42A depicts the wide-angle end state, FIG. 42B depicts the intermediate focal length state, and FIG. 42C depicts the telephoto end state.

According to each graph showing aberrations in FIGS. 38A, 38B and 38C, FIGS. 39A, 39B and 39C, FIGS. 41A, 41B and 41C, and FIGS. 42A, 42B and 42C, in the optical system ZL7 according to Example 1, it is possible to appropriately correct, regardless of the object side medium, various aberrations in any imaging states covering a range from a wide-angle end state to a telephoto end state and a range from an infinity focusing state to a point-blank focusing state, and have good optical performance.

EXAMPLE 8

Figure 43:
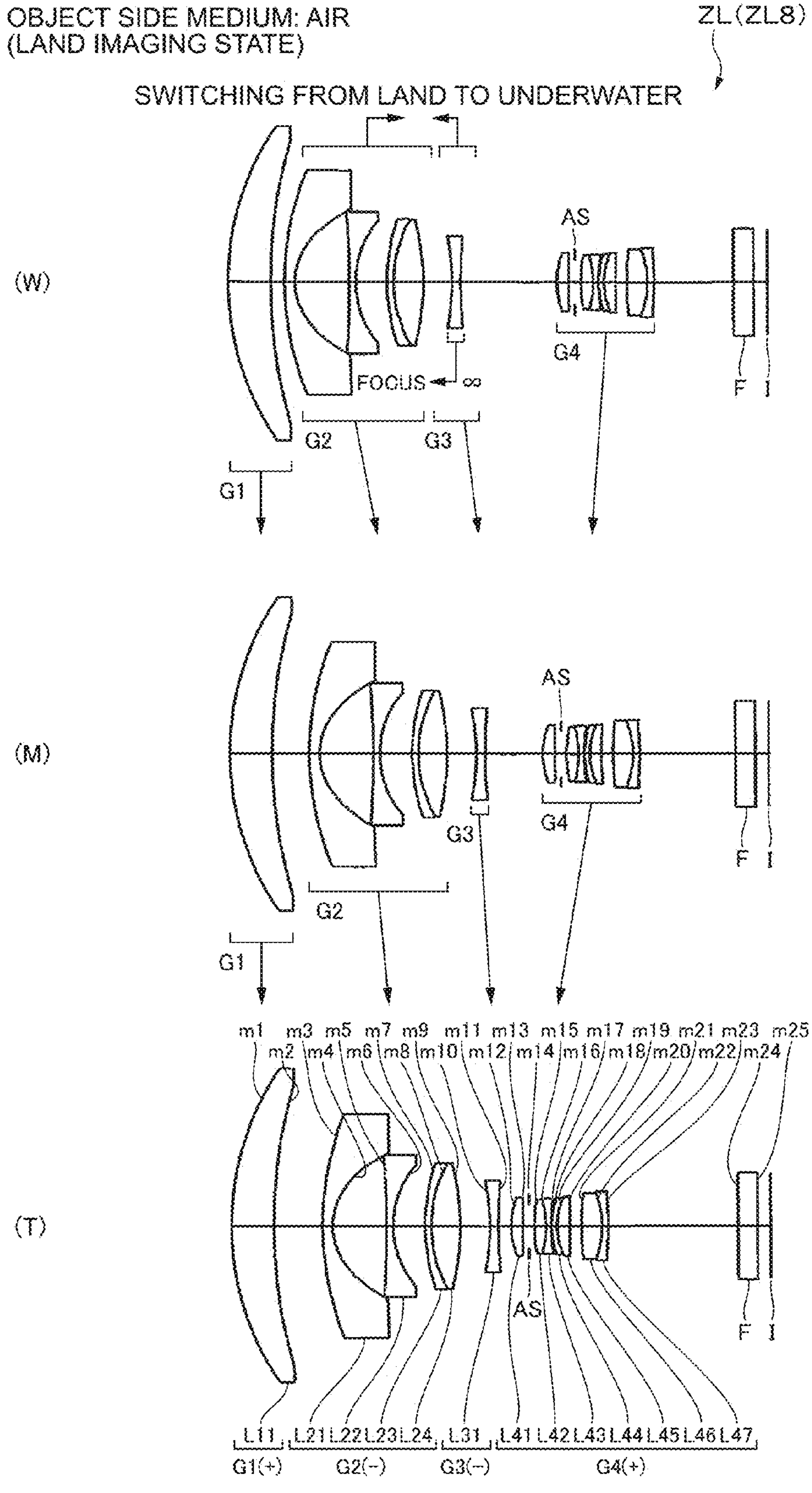
FIG. 43 illustrates a sectional view showing the lens configuration of the optical system according to Example 8 in case the object side medium is air, and a diagram showing a moving locus of each group from a wide-angle end state (W) to a telephoto end state (T) through an intermediate focal length state (M).
Figure 45A:
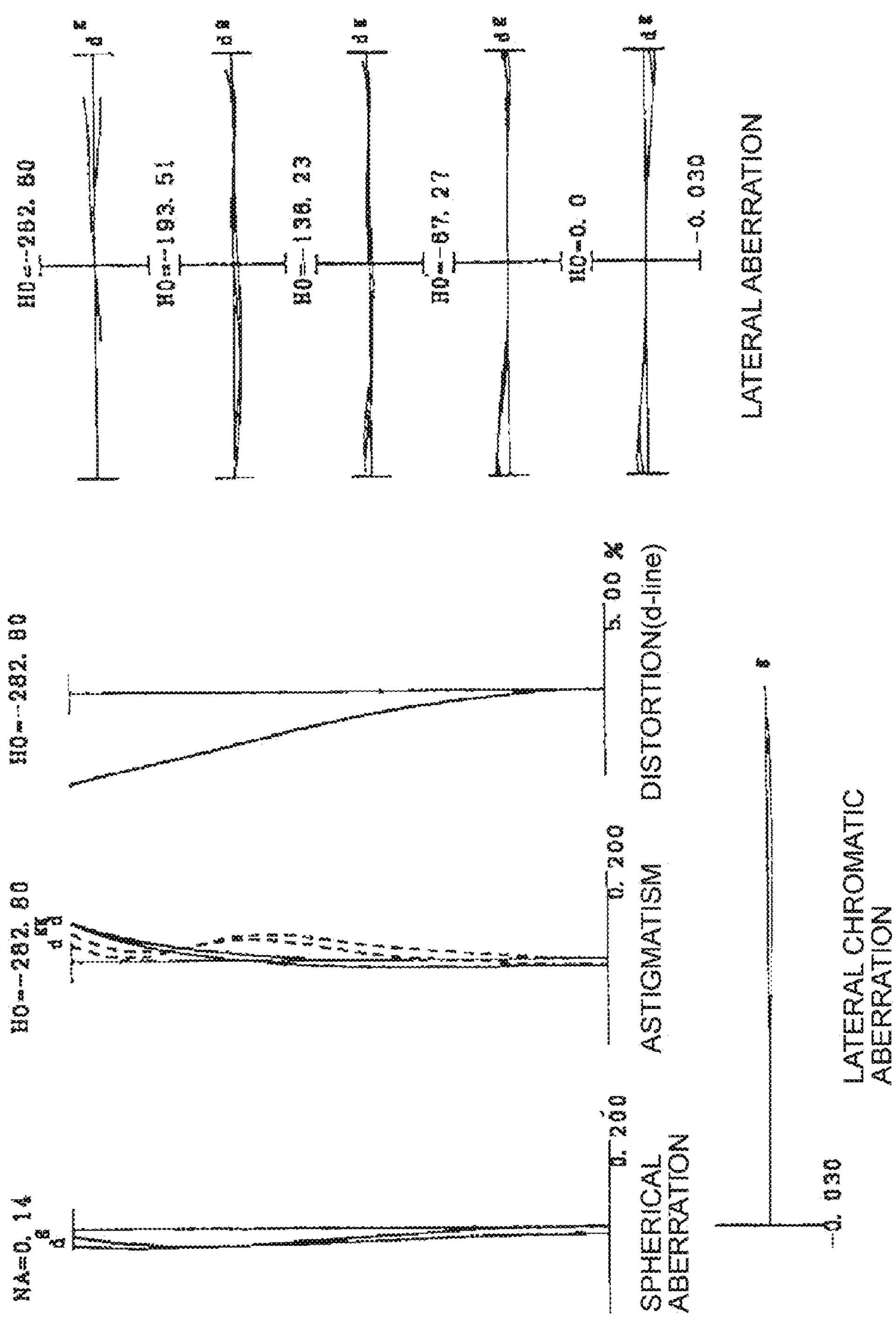
FIGS. 45A, 45B and 45C illustrate a graph showing aberrations in a point-blank range focusing state of the optical system according to Example 8 in case the object side medium is air, where
Figure 45B:
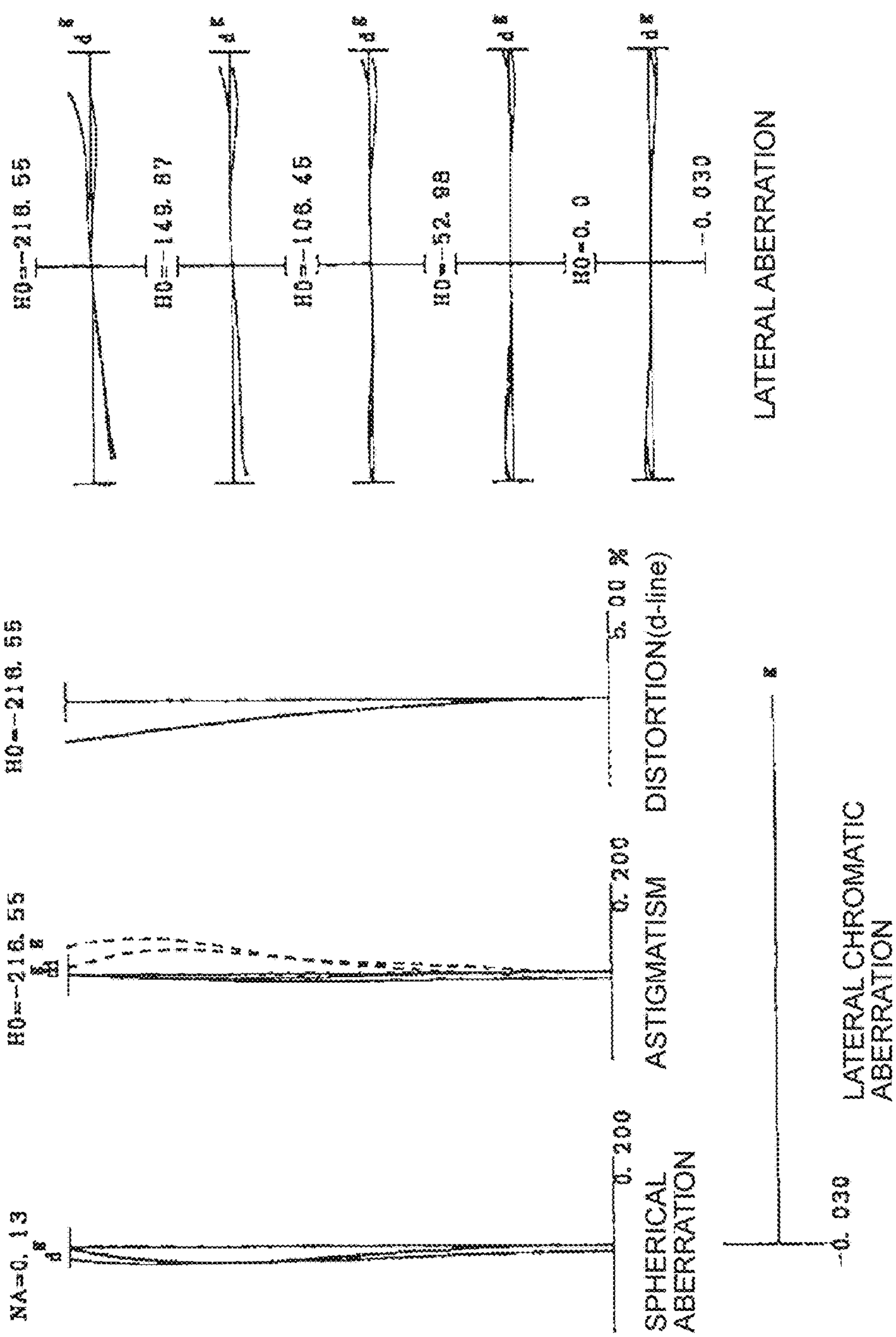
Figure 45C:
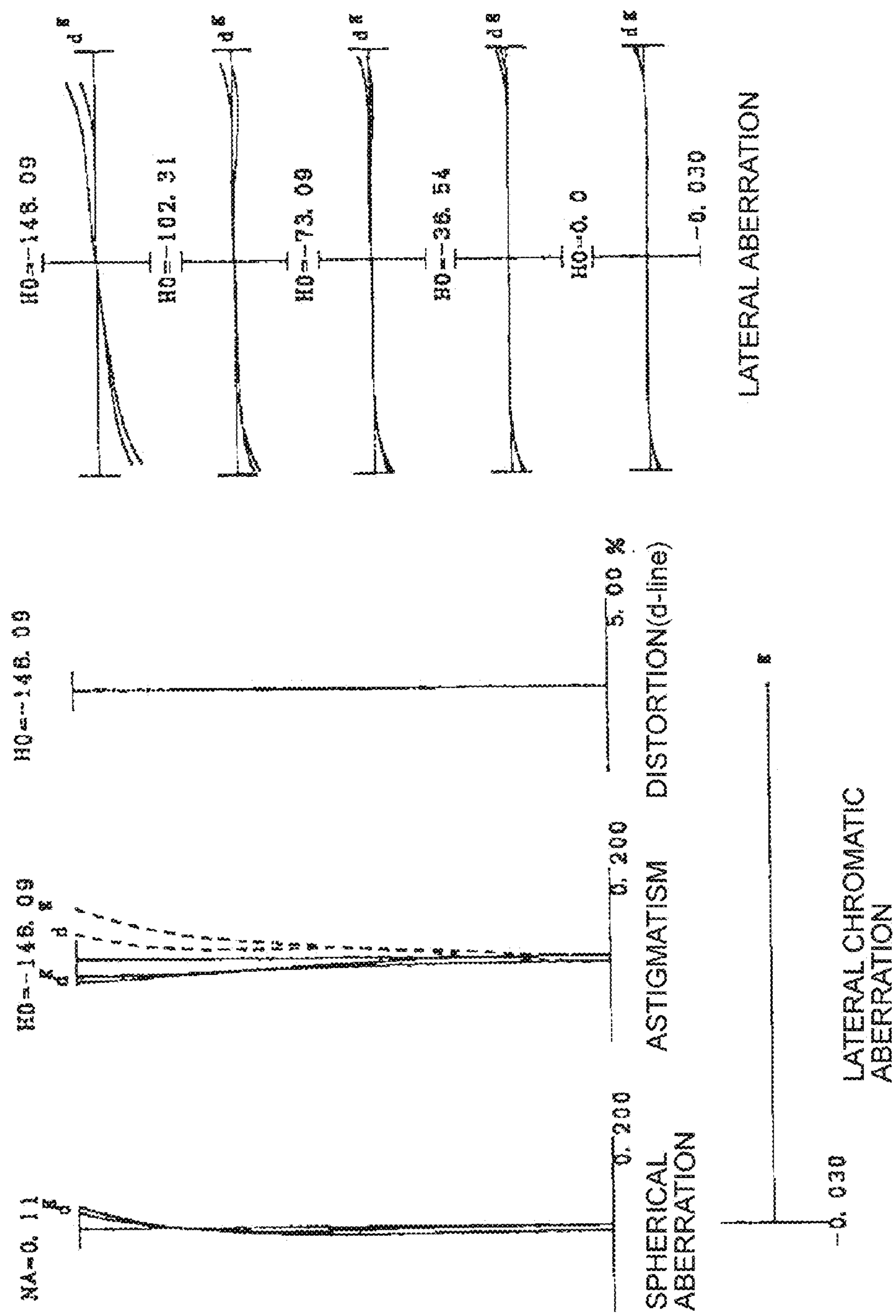
Figure 46:
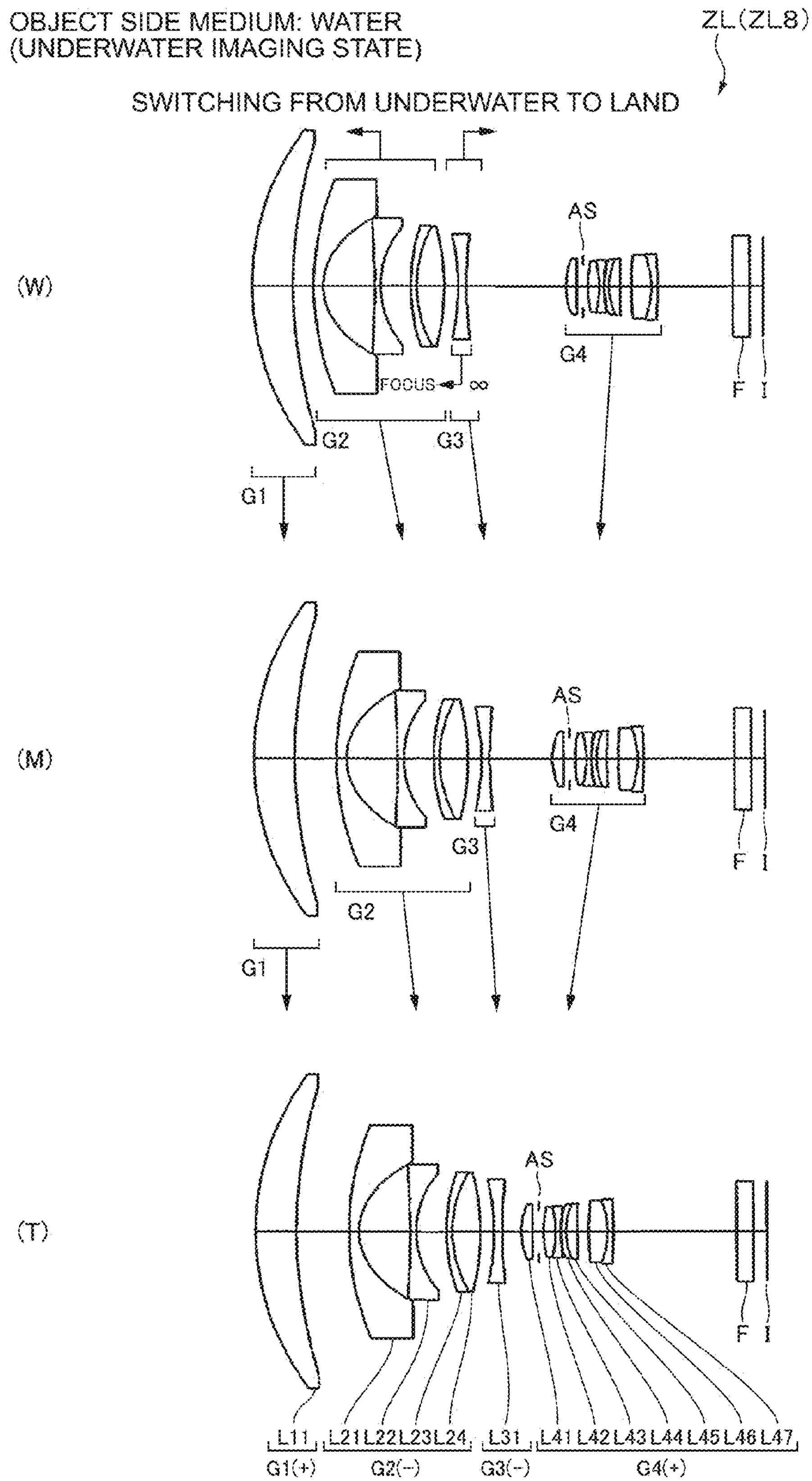
FIG. 46 illustrates a sectional view showing a lens configuration of the optical system according to Example 8 in case the object side medium is water, and a diagram showing a moving locus of each group from the wide-angle end state (W) to the telephoto end state (T) through the intermediate focal length state (M).

Example 8 is described with reference to FIG. 43 to FIGS. 48A, 48B and 48C, and Table 8. An optical system ZL (ZL8) according to the present example is an optical system capable of imaging in two object side media whose refractive indexes are different from each other. Note that the object side medium of a low refractive index is "air," while the object side medium of a high refractive index is "water." FIG. 43 illustrates a sectional view showing a lens configuration of the optical system according to Example 8 in case the object side medium is air (land imaging state). FIG. 46 illustrates a sectional view showing a lens configuration of the optical system according to Example 8 in case the object side medium is water (underwater imaging state).

The optical system ZL8 according to Example 8 is composed of, as shown in FIG. 43 and FIG. 46, in order from an object, a first lens group G1 having positive refractive power, a second lens group G2 having negative refractive power, a third lens group G3 having negative refractive power, and a fourth lens group G4 having positive refractive power.

The first lens group G1 is composed of a positive meniscus lens L11 having a convex surface facing the object.

The second lens group G2 is composed of, in order from the object, a negative meniscus lens L21 having a concave surface facing an image, a biconcave lens L22, and a cemented lens composed of a negative meniscus lens L23 having a concave surface facing the image and a biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from the object, a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens composed of a biconvex lens L46 and a negative meniscus lens L47 having a concave surface facing the object. The image side surface of the negative meniscus lens L47 is an aspherical surface.

A filter group F is disposed on the image side of the fourth lens group G4. The filter group F is composed of a low-pass filter for cutting a spatial frequency more than a marginal dissector of image sensors such as a CCD disposed at the image surface I, and a CMOS, a cover-glass of an image sensor, etc.

The image surface I is formed on the image sensor which is composed of unillustrated CCDs, CMOSs, etc.

A position of the first lens group G1 on the optical axis is fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state) and it is in the infinity focusing state, the second lens group G2 and the third lens group G3 are independently moved upon zooming. In case the object side medium is water (underwater imaging state), the second lens group G2 and the third lens group G3 are independently moved upon zooming. Note that in the present embodiment, when changing the object side media the second lens group G2 is moved along the optical axis (cam drive is possible), and even the object side medium is air or water the second lens group G2 is configured so that the same moving locus is drawn upon zooming. Moreover, in case the object side medium is any one of air and water (also in any one of the land underwater imaging states), the fourth lens group G4 is moved upon zooming so that the same locus is drawn.

Upon focusing on from an infinity object to a point-blank range object, the third lens group G3 is moved to the object side.

When changing the object side media, the second lens group G2 and the third lens group G3 are moved along the optical axis. When changing the object side media from air (land imaging state) having a low refractive index medium to water (underwater imaging state) having a high refractive index medium, as shown in FIG. 37, the second lens group G2 is moved to the image side, and the third lens group G3 is moved to the object side. Moreover, when changing the object side media from water (underwater imaging state) having a high refractive index medium to air (land imaging state) having a low refractive index medium, as shown in FIG. 40, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes between when zooming and when changing the object side media. The distance between the second lens group G2 and the third lens group G3 changes between when zooming and when changing the object side media. The distance of the third lens group G3 and the fourth lens group G4 changes between when zooming and when changing the object side media.

The following table 8 illustrates values of each general data in Example 8. The surface numbers 1 to 25 in Table 8 correspond to each optical surface of m1 to m25 shown in FIG. 43.

TABLE 8

[Object side medium]

Medium 1: Air　　n(d) = 1.00000

[Lens data]

| Surface number | R | D | n(d) | νd |
|---|---|---|---|---|
| 1 | 42.65815 | 6.558 | 1.51680 | 63.9 |
| 2 | 80.60018 | (D2) | 1.00000 | |
| 3 | 44.16103 | 1.600 | 1.69412 | 53.4 |
| *4 | 9.29586 | 8.371 | 1.00000 | |
| 5 | −152.33044 | 1.000 | 1.77387 | 47.2 |
| *6 | 14.78941 | 4.904 | 1.00000 | |
| 7 | 29.27332 | 1.000 | 1.49782 | 82.6 |
| 8 | 19.69276 | 4.554 | 1.83400 | 37.2 |
| 9 | −36.86910 | (D9) | 1.00000 | |
| 10 | −36.56262 | 1.350 | 1.80400 | 46.6 |
| 11 | 77.16815 | (D11) | 1.00000 | |

TABLE 8-continued

| | | | | |
|---|---|---|---|---|
| 12 | 11.89331 | 1.778 | 1.51680 | 63.9 |
| 13 | 528.19182 | 1.000 | 1.00000 | |
| 14 | (Aperture stop AS) | 0.800 | 1.00000 | |
| 15 | 20.09023 | 1.851 | 1.49782 | 82.6 |
| 16 | −16.05685 | 0.800 | 1.74400 | 44.8 |
| 17 | 28.18479 | 0.100 | 1.00000 | |
| 18 | 14.01844 | 0.800 | 1.85026 | 32.4 |
| 19 | 10.86335 | 1.796 | 1.51680 | 63.9 |
| 20 | 194.82571 | 1.856 | 1.00000 | |
| 21 | 43.23112 | 3.213 | 1.49782 | 82.6 |
| 22 | −13.10143 | 1.000 | 1.77387 | 47.2 |
| *23 | −33.27452 | (D23) | 1.00000 | |
| 24 | 0.00000 | 2.790 | 1.51680 | 64.1 |
| 25 | 0.00000 | (D25) | 1.00000 | |

[Aspheric surface data]

| Surface | κ | A4 | A6 | A8 | A10 |
|---|---|---|---|---|---|
| 4 | −1.14130e+00 | 2.57064e−04 | −1.06797e−06 | 9.82867e−09 | −3.52025e−11 |
| 6 | −4.22670e+00 | 2.12677e−04 | −1.26074e−06 | 1.00378e−08 | −3.40501e−11 |
| 23 | 7.54800e−01 | 1.89011e−04 | 7.24378e−07 | 2.68376e−08 | −2.25934e−10 |

[Various data]

| | W | M | T |
|---|---|---|---|
| (Medium 1: Air) | | | |
| f | 7.20 | 9.30 | 13.60 |
| FNo | 3.45 | 3.79 | 4.51 |
| ω | 48.8 | 40.9 | 30.2 |
| Y | 8.00 | 8.00 | 8.00 |
| TL | 83.000 | 83.000 | 83.000 |
| BF | 17.127 | 19.583 | 24.870 |
| BF (Air) | 16.176 | 18.632 | 23.919 |
| (Medium 2: Water) | | | |
| f | 6.09 | 7.62 | 10.96 |
| FNo | 3.45 | 3.79 | 4.51 |
| ω | 45.4 | 38.6 | 28.6 |
| Y | 8.00 | 8.00 | 8.00 |
| TL | 83.000 | 83.000 | 83.000 |
| BF | 17.127 | 19.583 | 24.870 |
| BF (Air) | 16.176 | 18.632 | 23.919 |

[Variable distance data]

| | Upon focusing on infinity | | | Upon focusing on point-blank range | | |
|---|---|---|---|---|---|---|
| | W | M | T | W | M | T |
| (Medium 1: Air) | | | | | | |
| D0 | ∞ | ∞ | ∞ | 217.00 | 217.00 | 217.00 |
| β | — | — | — | −0.0299 | −0.0378 | −0.0548 |
| f | 7.20 | 9.30 | 13.60 | — | — | — |
| D2 | 2.088 | 5.570 | 7.299 | 2.088 | 5.570 | 7.299 |
| D9 | 4.501 | 4.501 | 4.501 | 3.839 | 3.819 | 3.809 |
| D11 | 14.954 | 9.016 | 2.000 | 15.616 | 9.698 | 2.692 |
| D23 | 12.237 | 14.693 | 19.980 | 12.237 | 14.693 | 19.980 |
| D25 | 2.100 | 2.100 | 2.100 | 2.100 | 2.100 | 2.100 |
| (Medium 2: Water) | | | | | | |
| D0 | ∞ | ∞ | ∞ | 217.00 | 217.00 | 217.00 |
| β | — | — | — | −0.0331 | −0.0407 | −0.0581 |
| f | 6.09 | 7.62 | 10.96 | — | — | — |
| D2 | 3.290 | 6.772 | 8.501 | 3.290 | 6.772 | 8.501 |
| D9 | 2.225 | 2.205 | 2.197 | 1.600 | 1.600 | 1.600 |
| D11 | 16.028 | 10.109 | 3.102 | 16.653 | 10.715 | 3.699 |
| D23 | 12.237 | 14.693 | 19.980 | 12.237 | 14.693 | 19.980 |
| D25 | 2.100 | 2.100 | 2.100 | 2.100 | 2.100 | 2.100 |

TABLE 8-continued

| [Lens group data] (Medium 1: Air) | | |
|---|---|---|
| Lens group | Front end surface | Focal length |
| First lens group | 1 | 165.59 |
| Second lens group | 3 | −83.07 |
| Third lens group | 10 | −30.69 |
| Fourth lens group | 12 | 16.47 |

[Values corresponding to the conditional expressions]

Conditional expression (1) R1/Ymax = 5.332
Conditional expression (2) f2/f3 = 2.706
Conditional expression (3) R1/R2 = 0.529

Medium 2: Water n(d)=1.33306, νd=54.0

Based on Table 8, the optical system ZL8 according to Example 8 it is understandable that the conditional expressions (1) to (3) are satisfied.

Figure 44A:
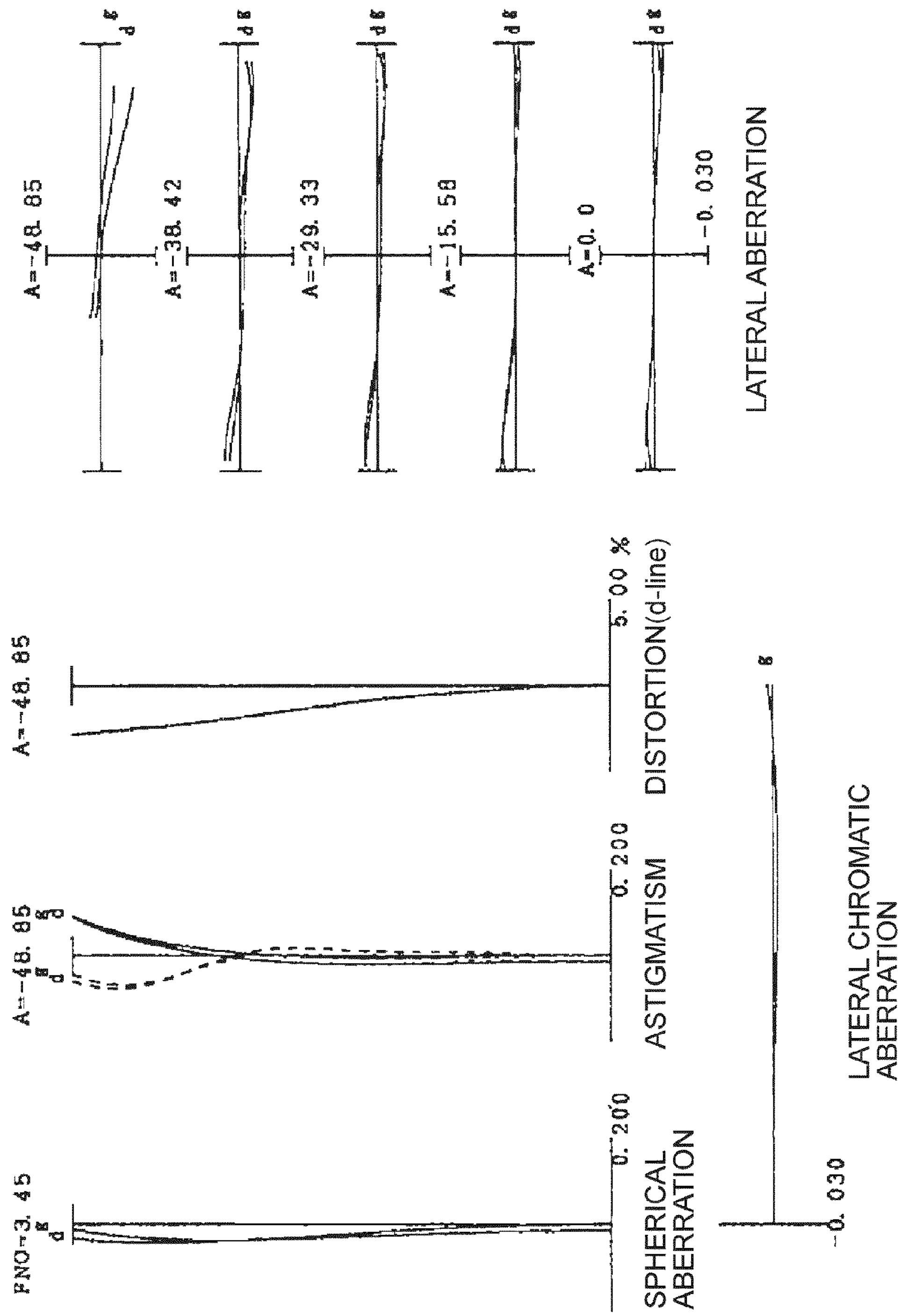
FIGS. 44A, 44B and 44C illustrate a graph showing aberrations in an infinity focusing state of the optical system according to Example 8 in case the object side medium is air, where
Figure 44B:
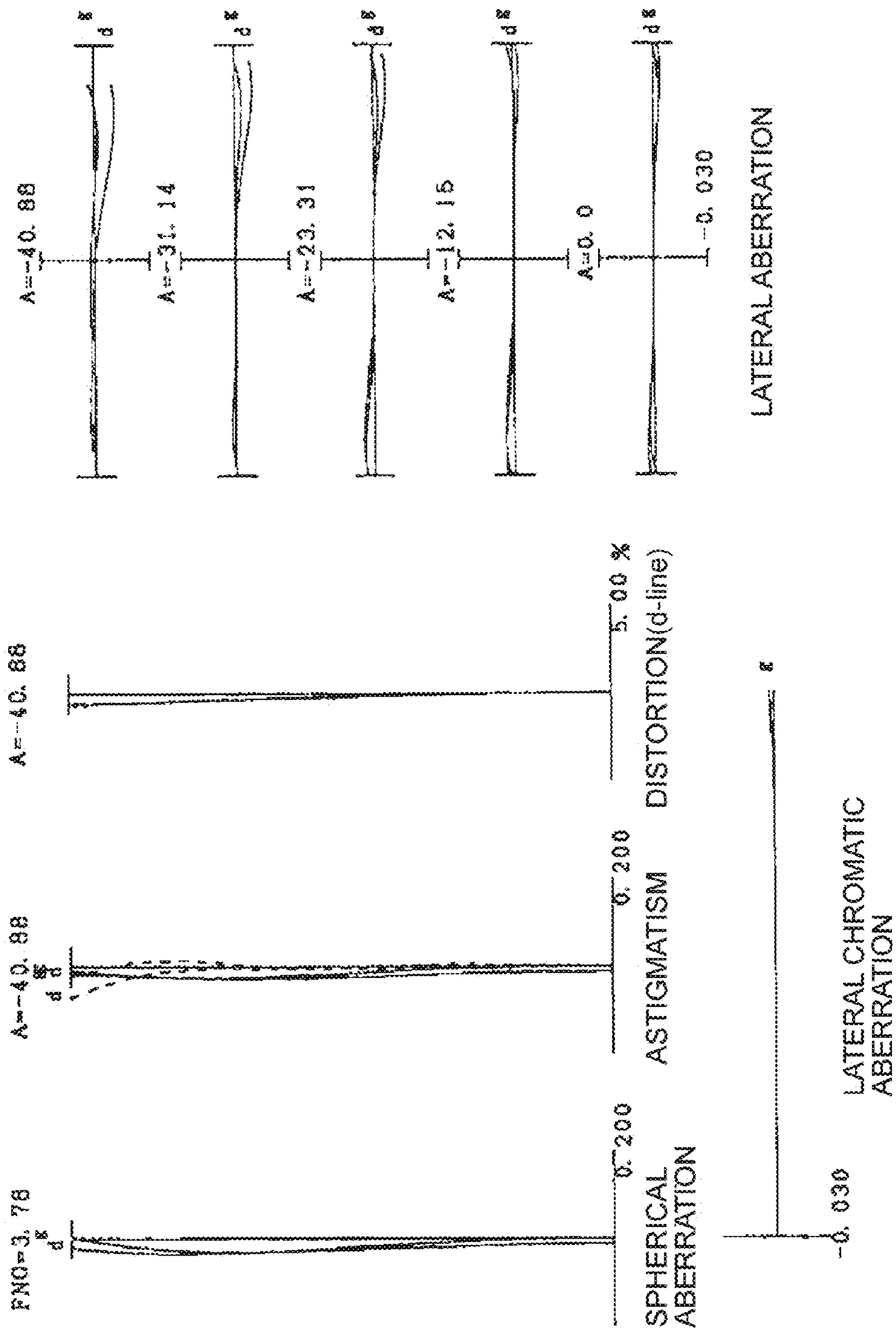
Figure 44C:
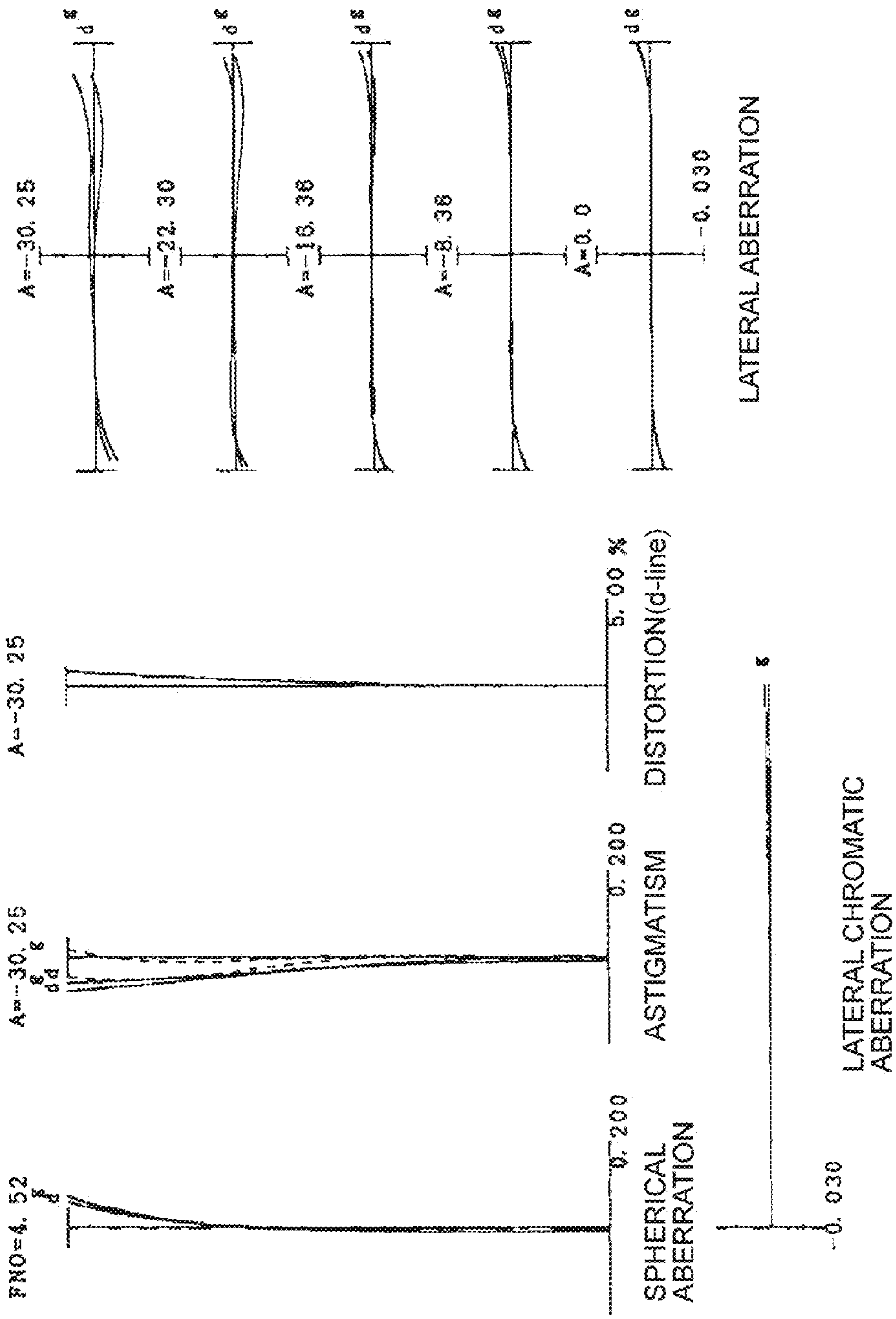
Figure 47A:
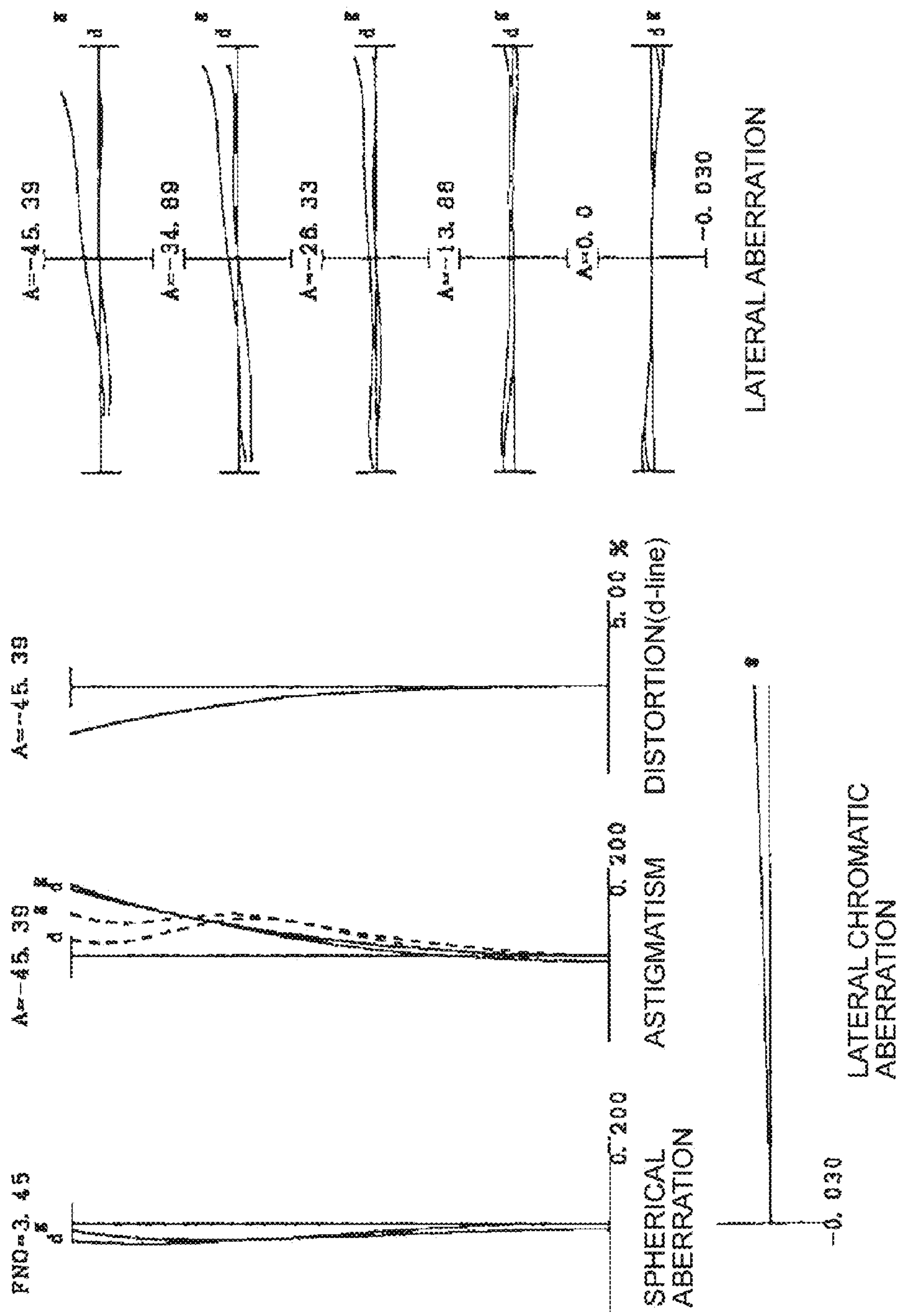
FIGS. 47A, 47B and 47C illustrate a graph showing aberrations in an infinity focusing state of the optical system according to Example 8 in case the object side medium is water, where
Figure 47B:
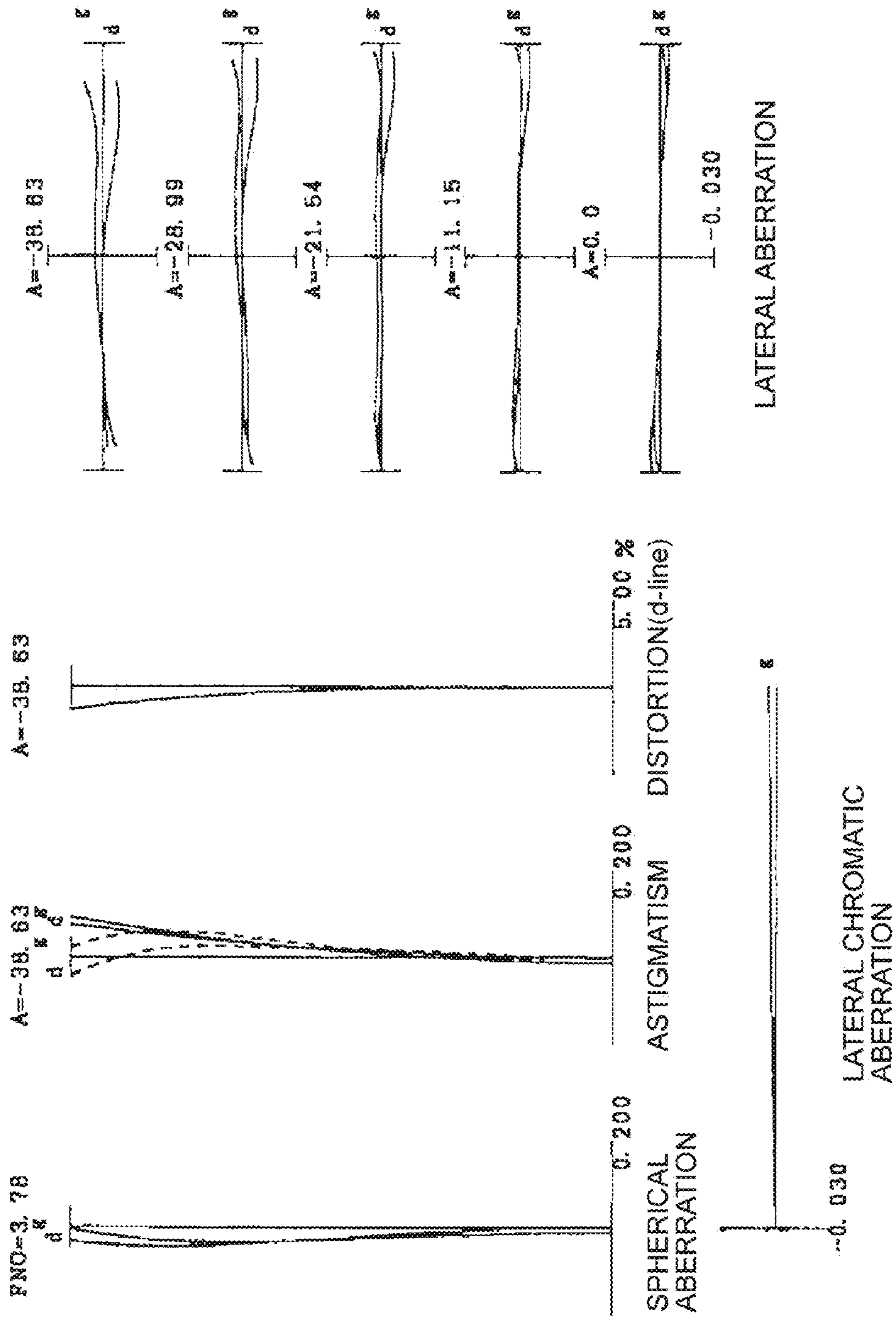
Figure 47C:
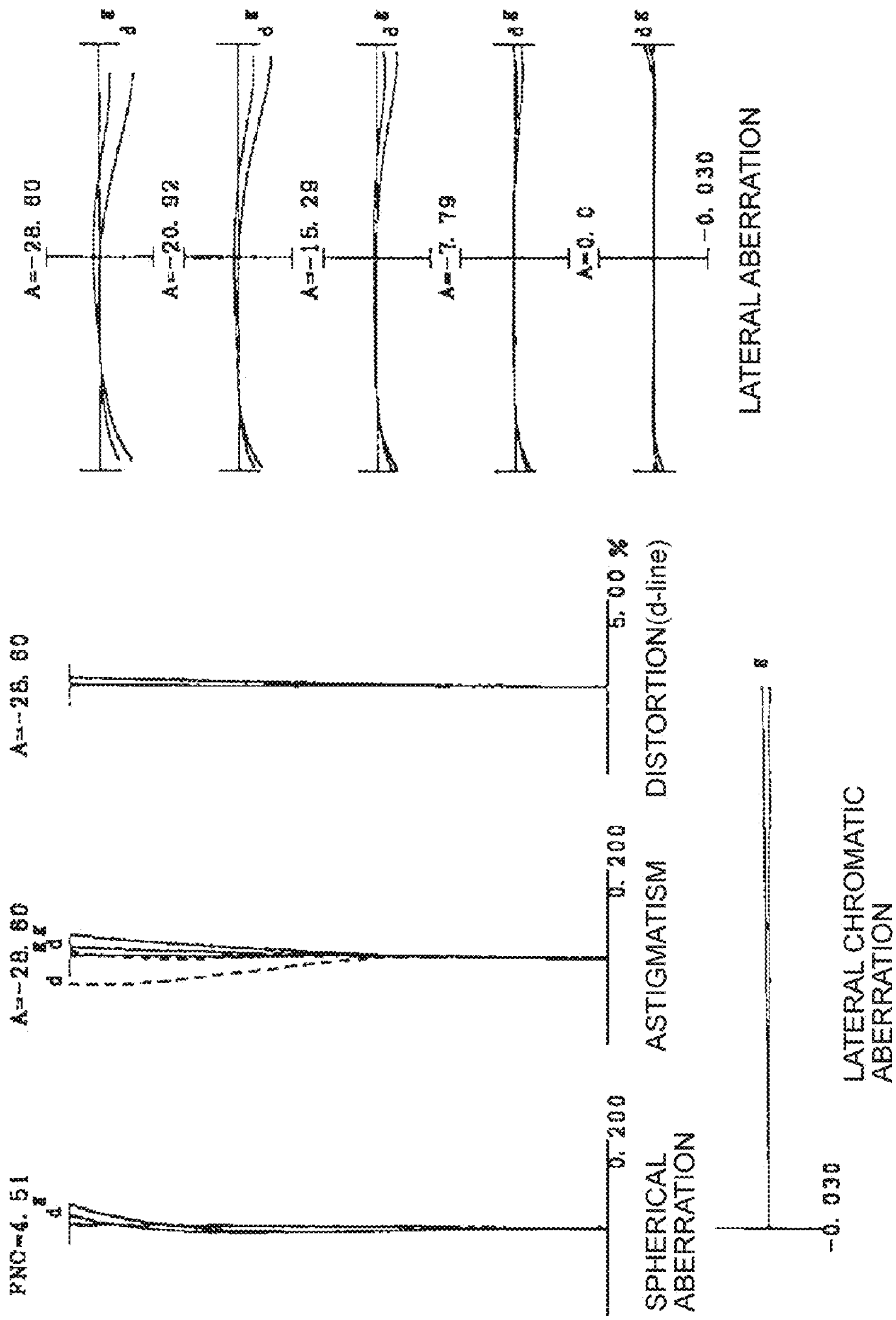
Figure 48A:
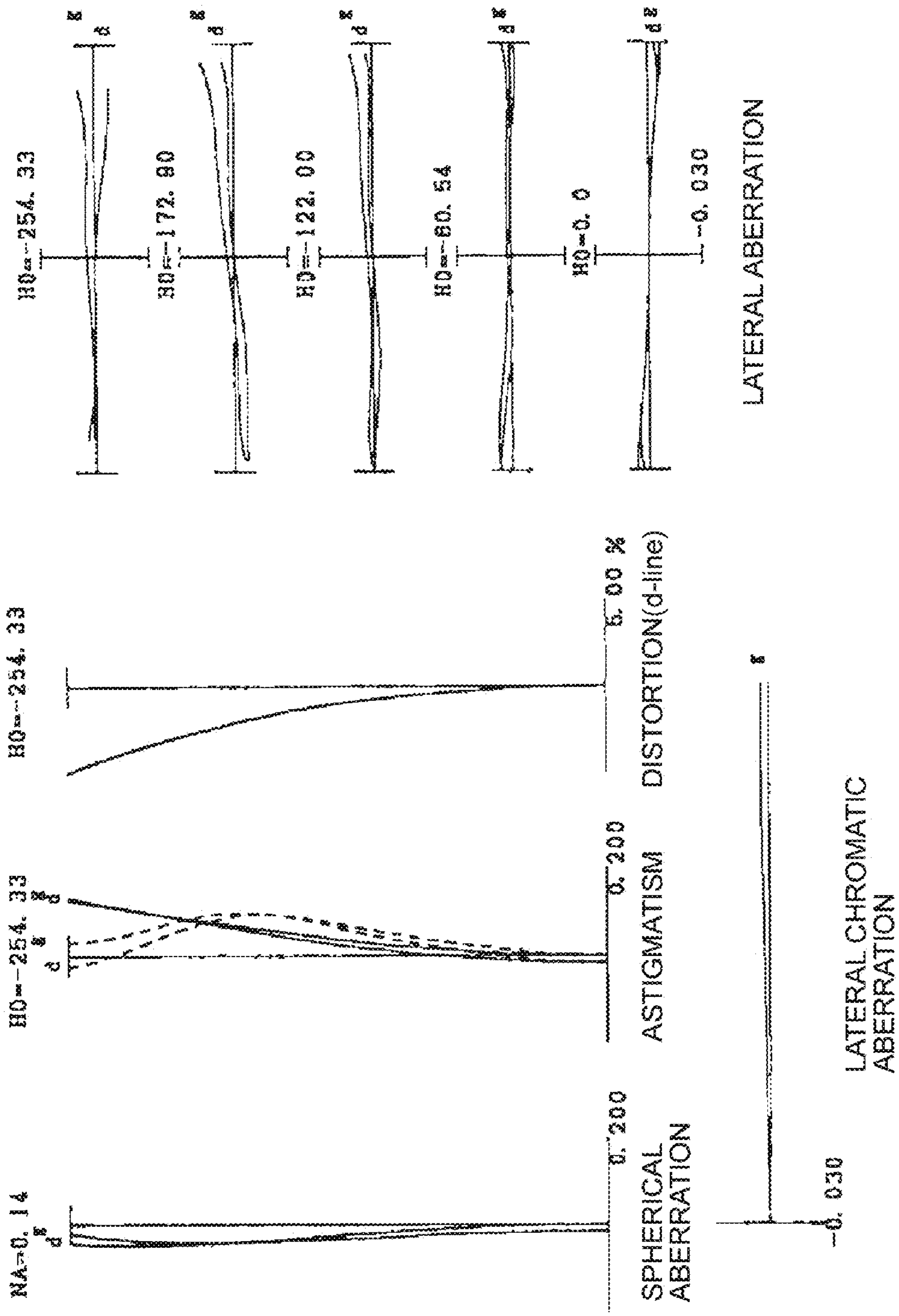
FIGS. 48A, 48B and 48C illustrate a graph showing aberrations in a point-blank range focusing state of the optical system according to Example 8 in case the object side medium is water, where
Figure 48B:
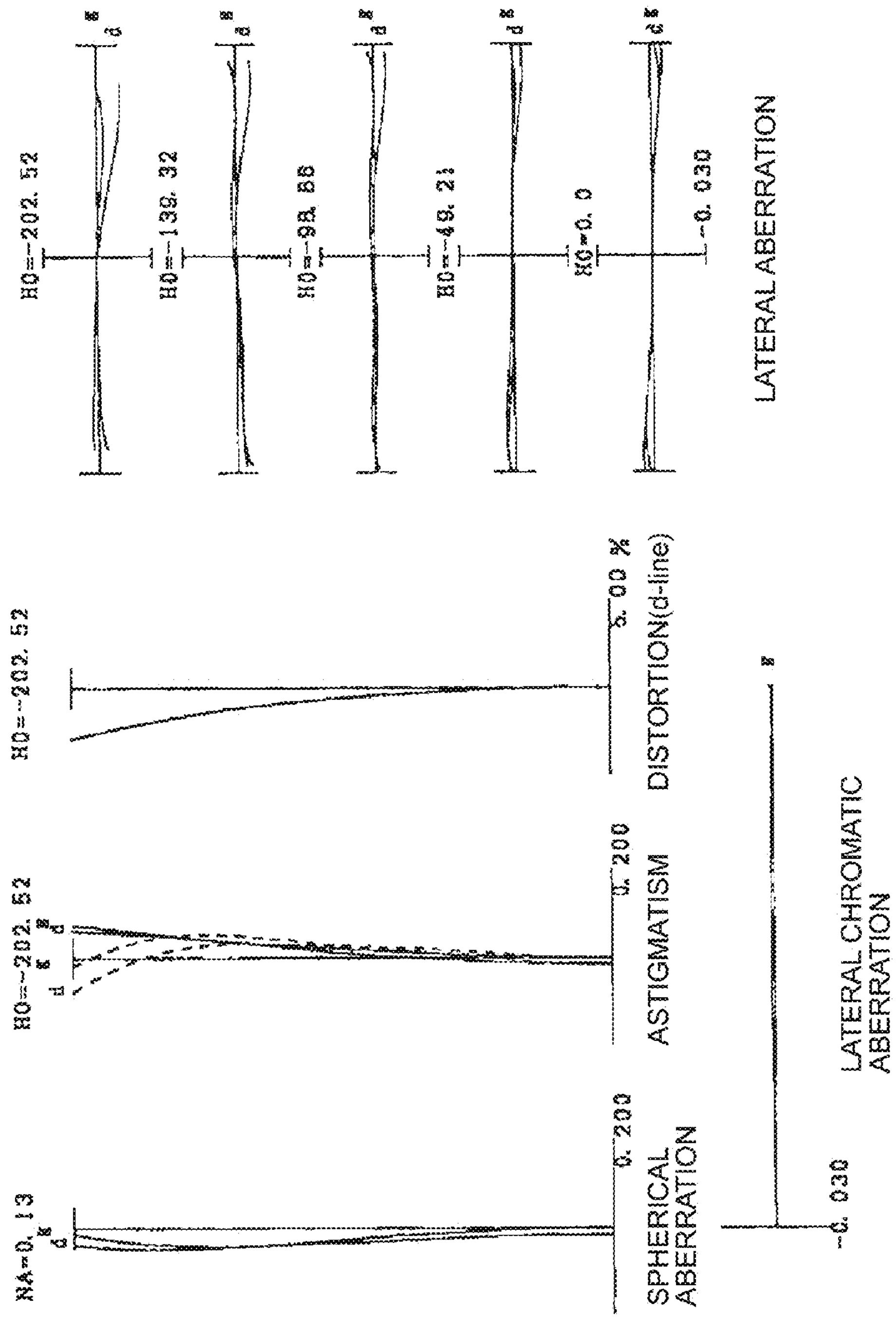
Figure 48C:
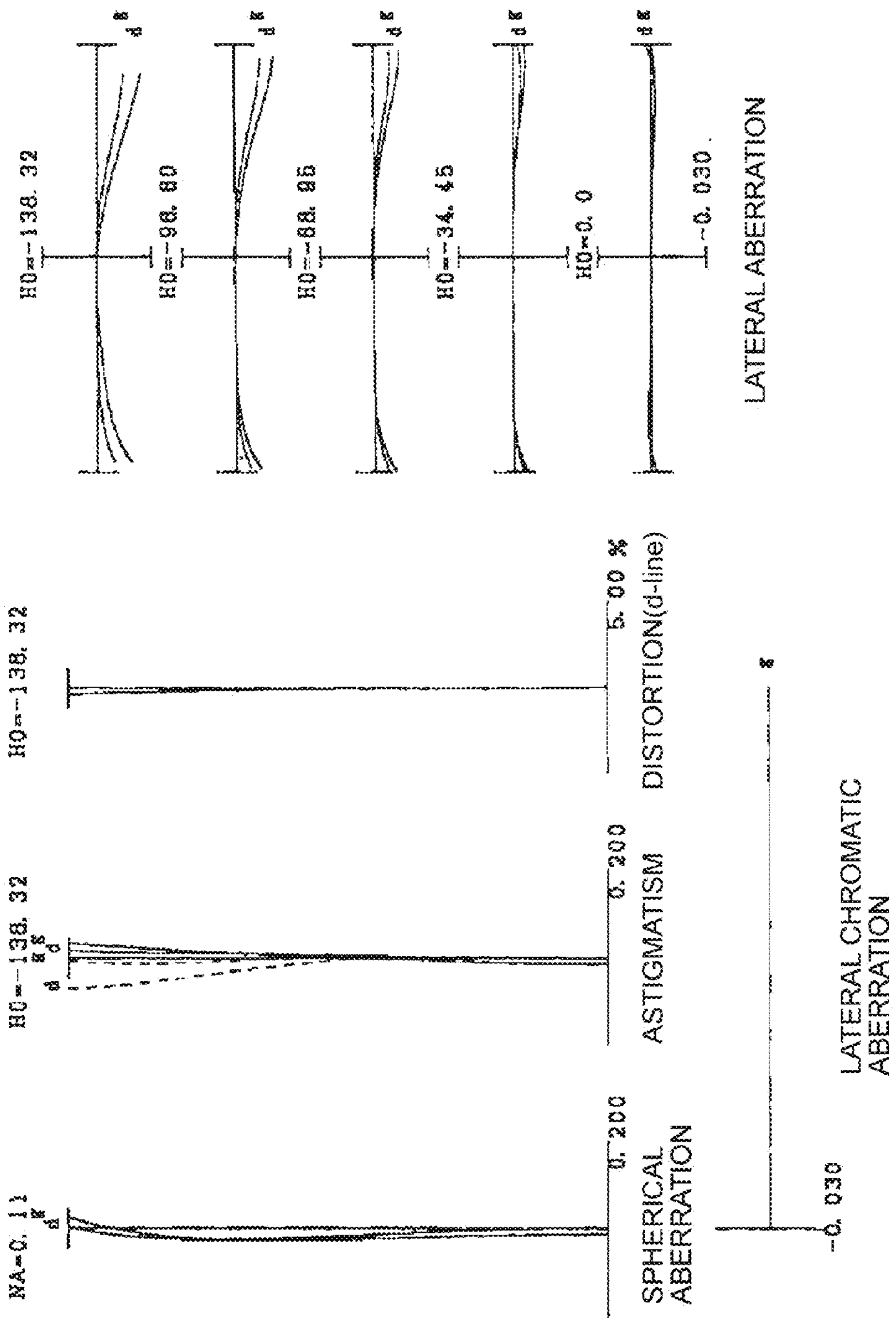

FIGS. 44A, 44B and 44C illustrate a graph showing various aberrations in an infinity focusing state of the optical system ZL8 according to Example 8 in case the object side medium is air, where FIG. 44A depicts the wide-angle end state, FIG. 44B depicts the intermediate focal length state, and FIG. 44C depicts the telephoto end state. FIGS. 45A, 45B and 45C illustrate a graph showing various aberrations in a point-blank range focusing state of the optical system ZL8 according to Example 8 in case the object side medium is air, and FIG. 45A depicts the wide-angle end state, FIG. 45B depicts the intermediate focal length state, and FIG. 45C depicts the telephoto end state. FIGS. 47A, 47B and 47C illustrate a graph showing various aberrations in an infinity focusing state of the optical system ZL8 according to Example 8 in case the object side medium is water, where FIG. 47A depicts the wide-angle end state, FIG. 47B depicts the intermediate focal length state, and FIG. 47C depicts the telephoto end state. FIGS. 48A, 48B and 48C illustrate a graph showing various aberrations in a point-blank range focusing state of the optical system ZL8 according to Example 8 in case the object side medium is water, where FIG. 48A depicts the wide-angle end state, FIG. 48B depicts the intermediate focal length state, and FIG. 48C depicts the telephoto end state.

According to each graph showing aberrations in FIGS. 44A, 44B and 44C, FIGS. 45A, 45B and 45C, FIGS. 47A, 47B and 47C, and FIGS. 48A, 48B and 48C, in the optical system ZL8 according to Example 8, it is possible to appropriately correct, regardless of the object side medium, various aberrations in any imaging states covering a range from a wide-angle end state to a telephoto end state and a range from an infinity focusing state to a point-blank focusing state, and have good optical performance.

EXAMPLE 9

Figure 49:
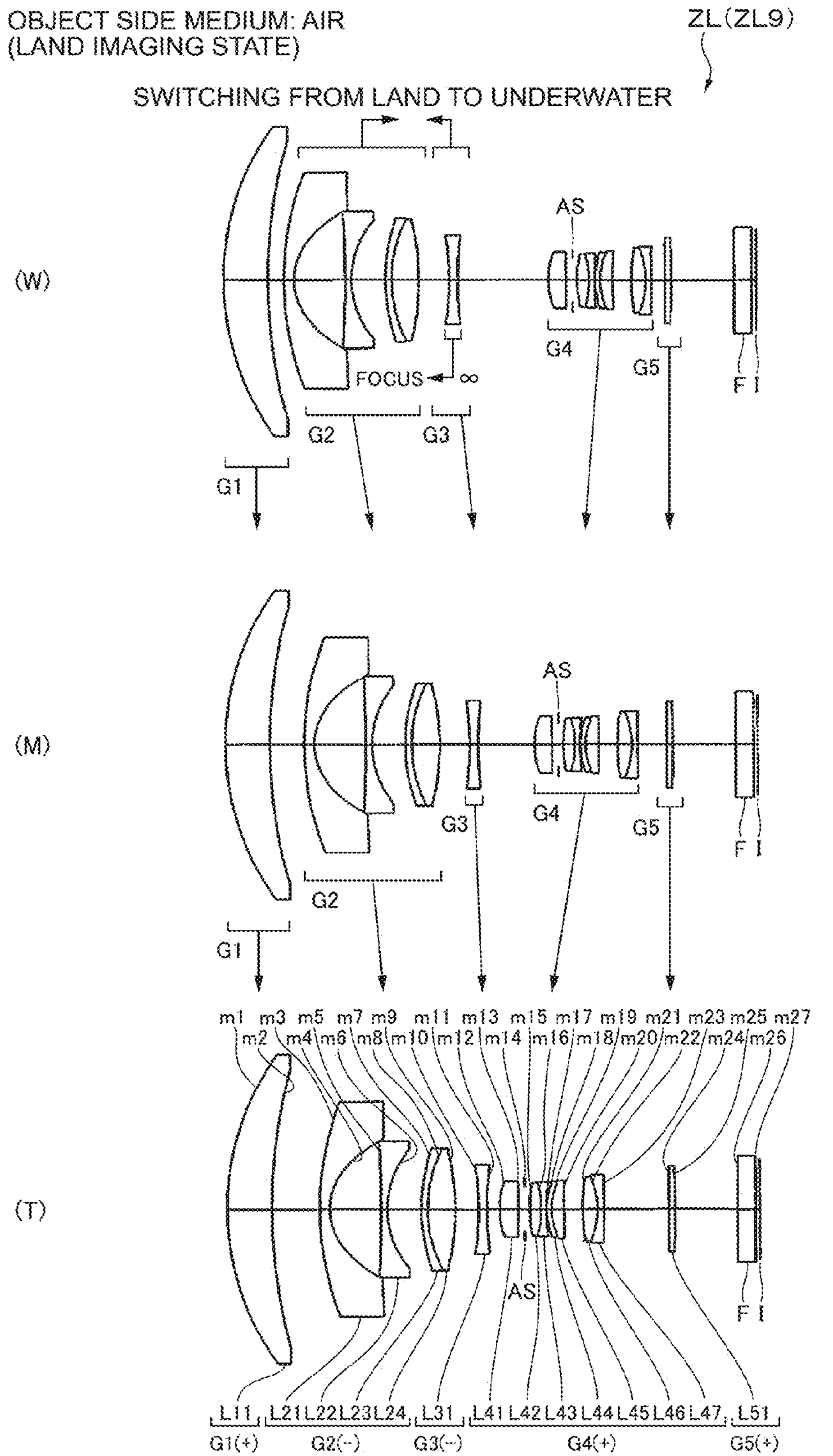
FIG. 49 illustrates a sectional view showing a lens configuration of the optical system according to Example 9 in case the object side medium is air, and a diagram showing the moving locus of each group from a wide-angle end state (W) to a telephoto end state (T) through an intermediate focal length state (M).
Figure 51A:
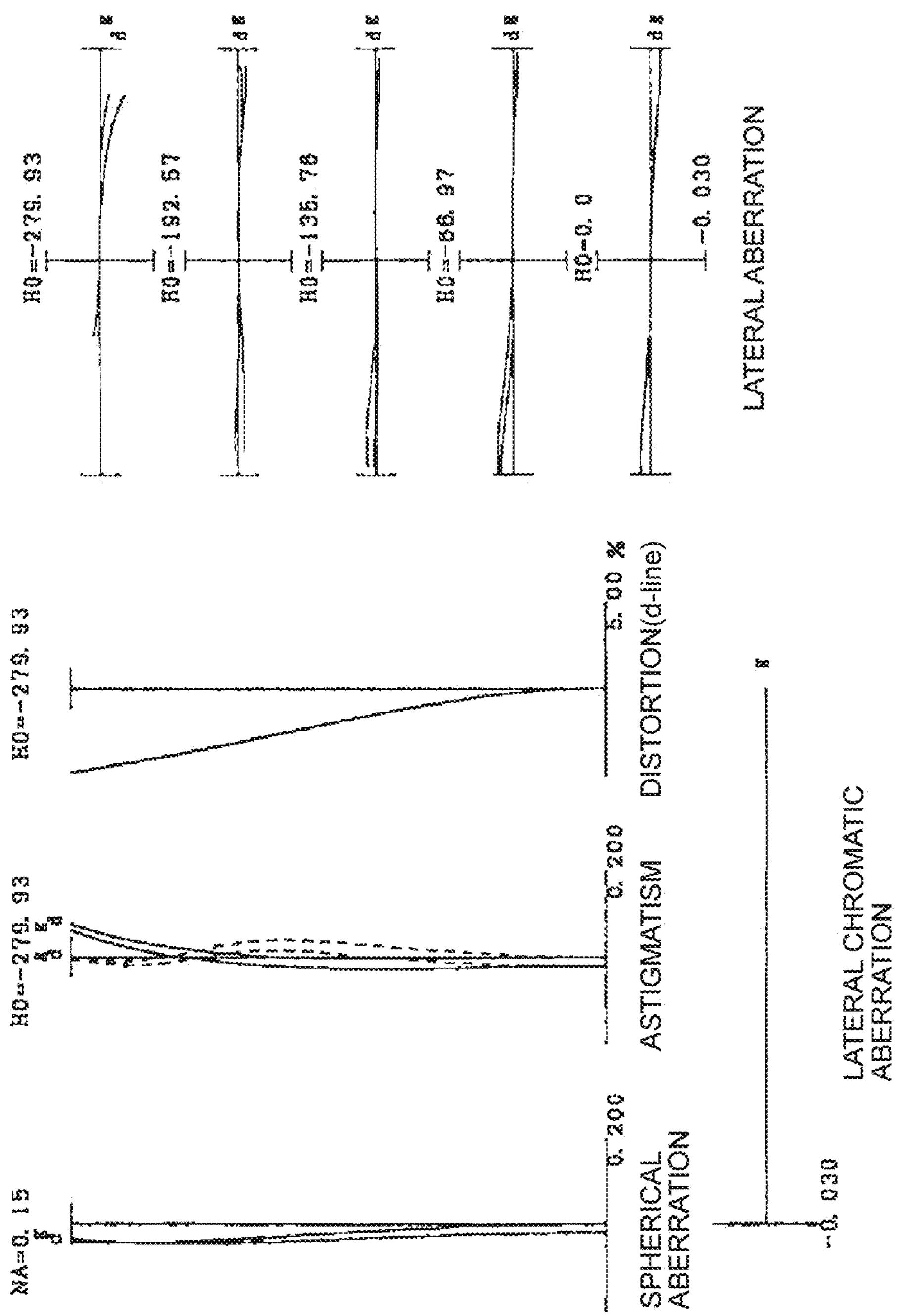
FIGS. 51A, 51B and 51C illustrate a graph showing aberrations in a point-blank range focusing state of the optical system according to Example 9 in case the object side medium is air, where
Figure 51B:
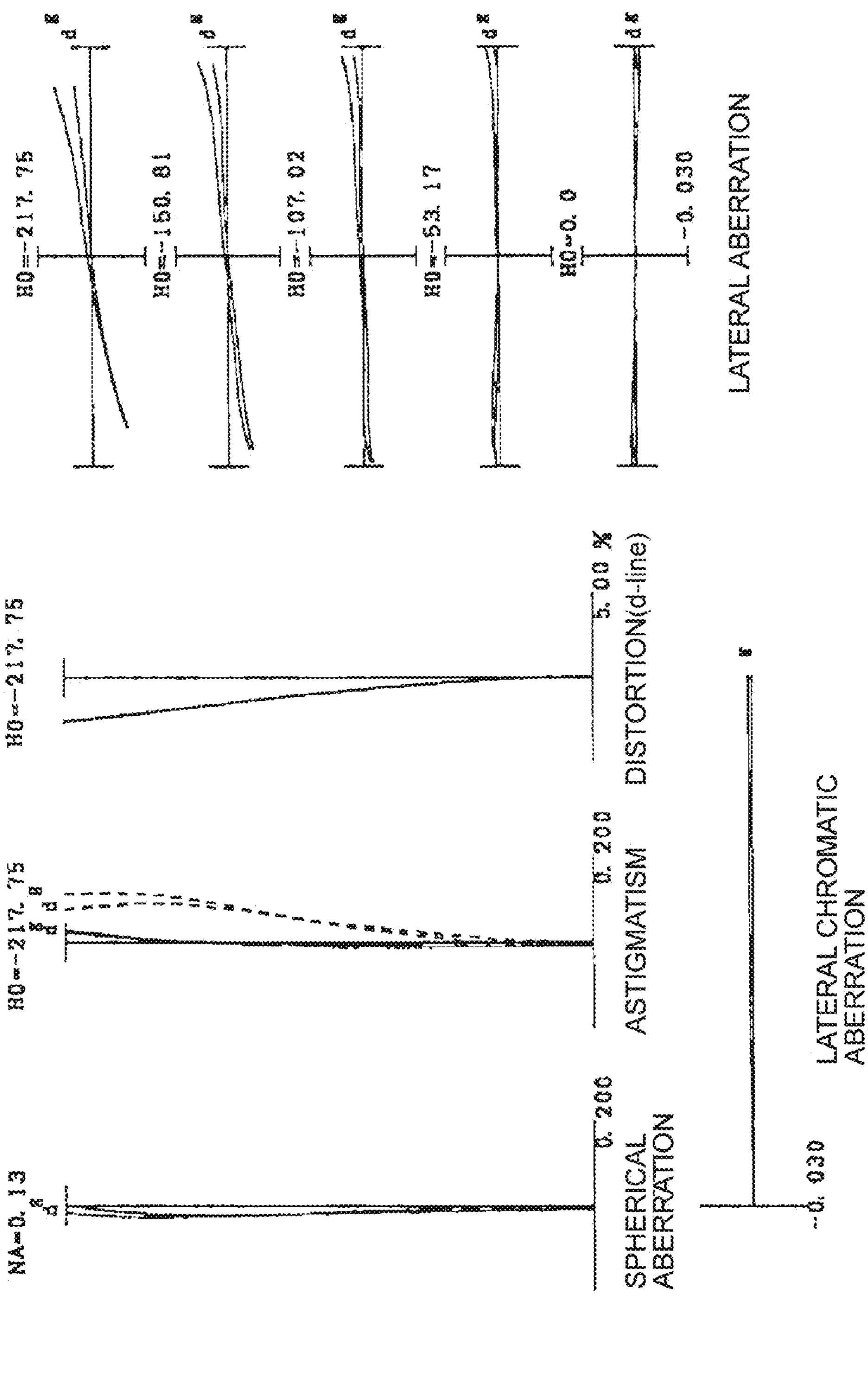
Figure 51C:
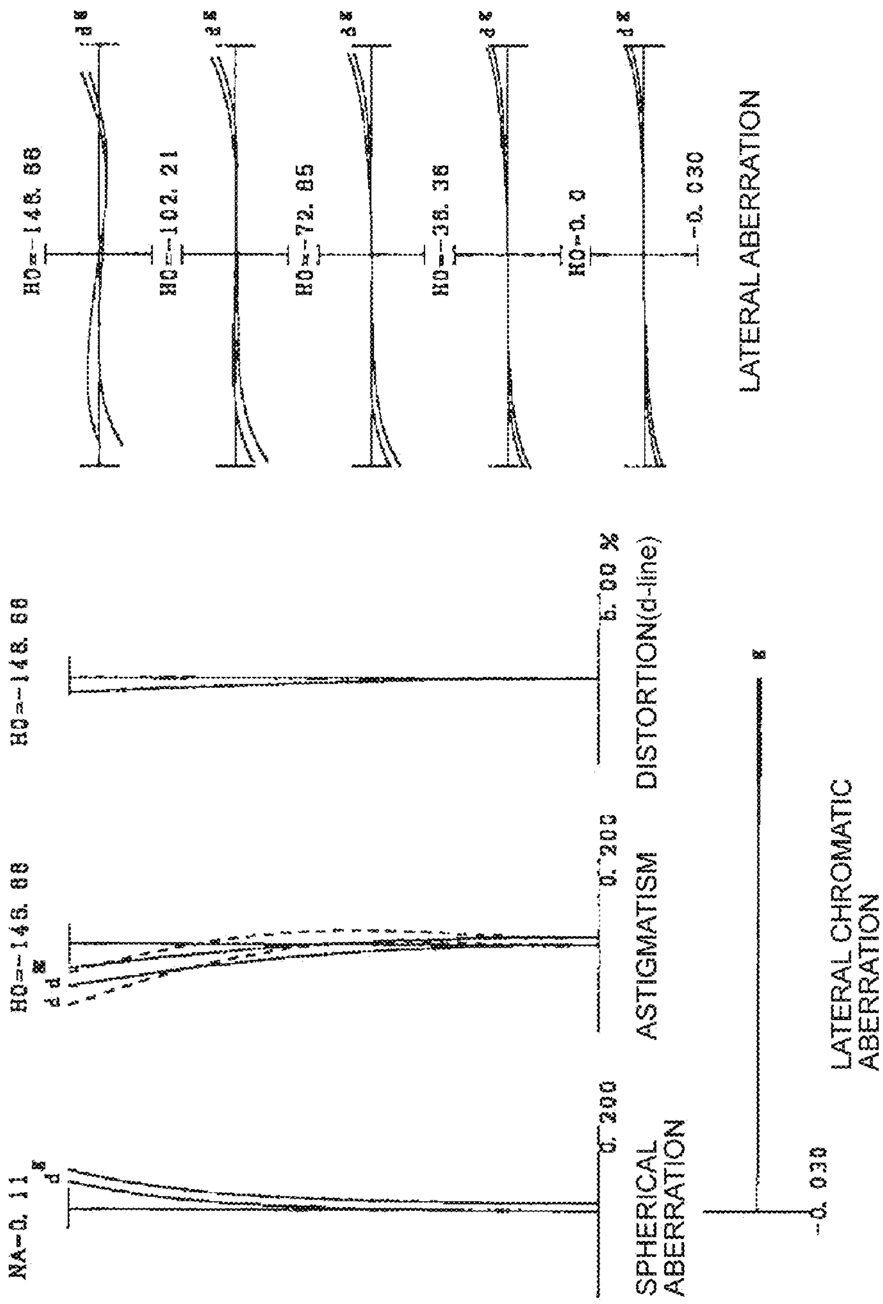
Figure 52:
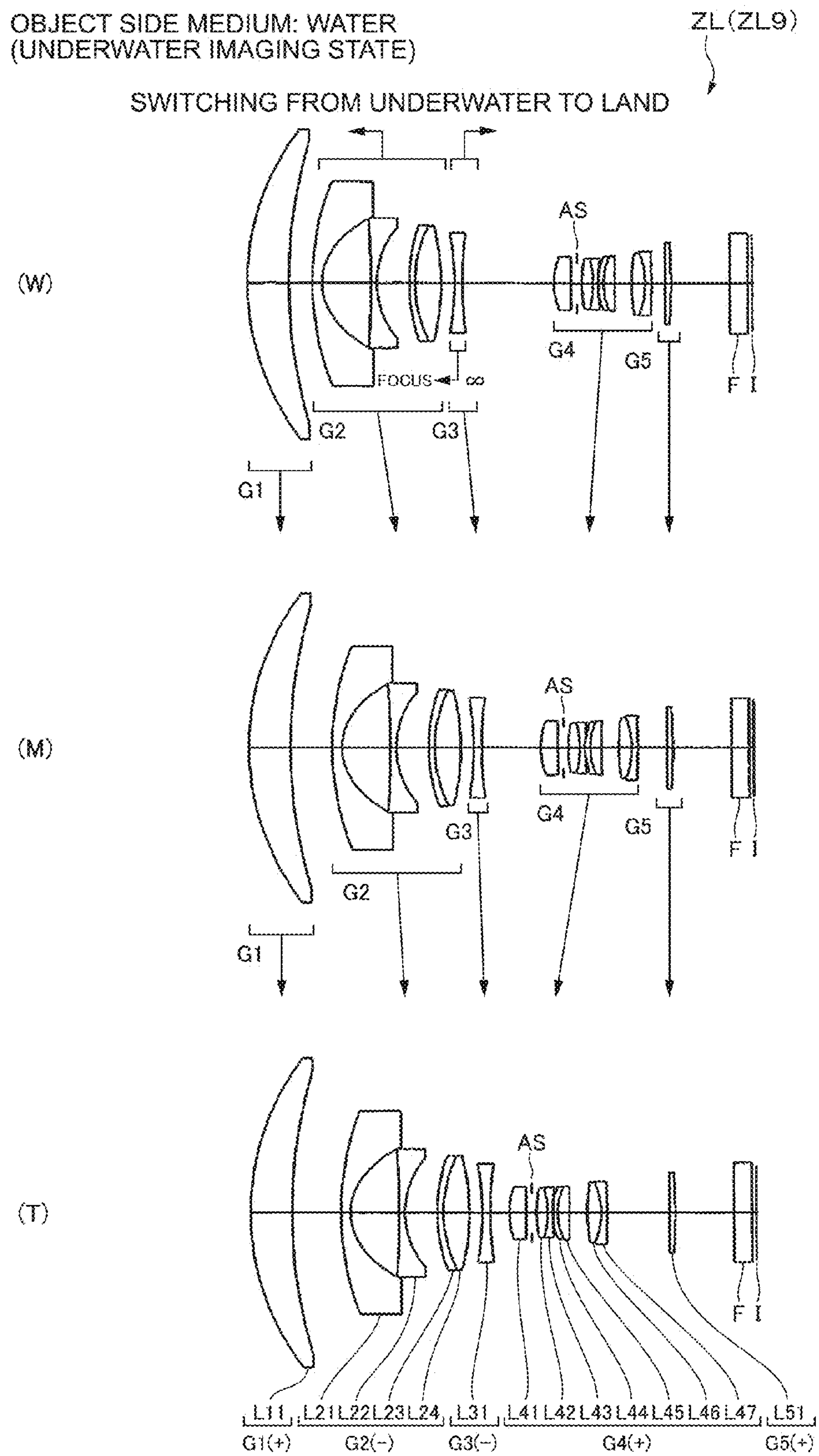
FIG. 52 illustrates a sectional view showing the lens configuration of the optical system according to Example 9 in case the object side medium is water, and a diagram showing a moving locus of each group from the wide-angle end state (W) to the telephoto end state (T) through the intermediate focal length state (M).

Example 9 is described with reference to FIG. 49 to FIGS. 54A, 54B and 54C, and Table 9. An optical system ZL (ZL2) according to the present example is an optical system capable of imaging in two object side media whose refractive indexes are different from each other. Note that the object side medium of a low refractive index is "air," while the object side medium of a high refractive index is "water." FIG. 49 illustrates a sectional view showing a lens configuration of the optical system according to Example 9 in case the object side medium is air (land imaging state). FIG. 52 illustrates a sectional view showing a lens configuration of the optical system according to Example 9 in case the object side medium is water (underwater imaging state).

The optical system ZL9 according to Example 9 is composed of, as shown in FIG. 49 and FIGS. 52A, 52B and 52C, in order from an object, a first lens group G1 having positive refractive power, a second lens group G2 having negative refractive power, a third lens group G3 having negative refractive power, a fourth lens group G4 having positive refractive power, and a fifth lens group G5 having positive refractive power.

The first lens group G1 is composed of a positive meniscus lens L11 having convex surface facing the object.

The second lens group G2 is composed of, in order from the object, a negative meniscus lens L21 having a concave surface facing the image, a biconcave lens L22, and a cemented lens composed of a negative meniscus lens L23 having a concave surface facing the image and a biconvex lens L24. The image side surface of the negative meniscus lens L21 is an aspherical surface. The image side surface of the biconcave lens L22 is an aspherical surface.

The third lens group G3 is composed of a biconcave lens L31.

The fourth lens group G4 is composed of, in order from the object, a positive meniscus lens L41 having a convex surface facing the object, an aperture stop AS, a cemented lens composed of a biconvex lens L42 and a biconcave lens L43, a cemented lens composed of a negative meniscus lens L44 having a concave surface facing the image and a positive meniscus lens L45 having a convex surface facing the object, and a cemented lens composed of a biconvex lens L46 and a negative meniscus lens L47 having a concave surface facing the object. The image side surface of the negative meniscus lens L47 is an aspherical surface.

The fifth lens group G5 is composed of a planoconvex lens L51 having a convex surface facing the image. The image side surface of the planoconvex lens L51 is an aspherical surface.

A filter group F is disposed on the image side of the fifth lens group G5. The filter group F is composed of a low-pass filter for cutting a spatial frequency more than a marginal dissector of image sensors such as a CCD disposed at the image surface I, and a CMOS, a cover-glass of an image sensor, etc.

The image surface I is formed on the image sensor configured with unillustrated CCDs, CMOSs, etc.

A position of the first lens group G1 on the optical axis is fixed against the image surface I, the second lens group G2 is moved to the image side, the third lens group G3 is moved to the image side, the fourth lens group G4 is moved to the object side so that distances between each lens group change upon zooming from a wide-angle end state to a telephoto end state.

However, in case the object side medium is air (land imaging state) and it is in the infinity focusing state, the second lens group G2 and the third lens group G3 are independently moved upon zooming. In case the object side medium is water (underwater imaging state), the second lens group G2 and the third lens group G3 are independently moved upon zooming. Moreover, in case the object side medium is any one of air and water (also in any one of the land underwater imaging states), the fourth lens group G4 is moved upon zooming so that the same locus is drawn.

Upon focusing on from infinity to a point-blank range object, the third lens group G3 is moved to the object side.

When changing the object side media, the second lens group G2 and the third lens group G3 are independently moved on the optical axis. When changing the object side media, for example, from air (land imaging state) having a low refractive index medium to water (underwater imaging state) having a high refractive index medium, as shown in FIG. 7, the second lens group G2 is moved to the image side, and the third lens group G3 is moved to the object side. Moreover, when changing an object side media from water (underwater imaging state) having a high refractive index medium to air (land imaging state) having a low refractive index medium, as shown in FIG. 10, the second lens group G2 is moved to the object side, and the third lens group G3 is moved to the image side.

As described above, in the present example, by changing positions of the second lens group G2 and the third lens group G3 respectively against the plurality of object side media whose refractive indexes are different from each other, it is possible to appropriately correct various aberrations such as curvature of image surface while constantly maintaining an image-forming position, in imaging states in any media.

The distance between the first lens group G1 and the second lens group G2 changes upon zooming and when changing the object side media. The distance between the second lens group G2 and the third lens group G3 changes upon zooming and when changing the object side media. The distance between the third lens group G3 and the fourth lens group G4 changes upon zooming and when changing the object side media. The distance of the fourth lens group G4 and the fifth lens group G5 changes upon zooming.

The following table 9 illustrates values of each general data in Example 9. The surface numbers 1 to 27 in Table 9 correspond to each optical surface of m1 to m27 shown in FIG. 49.

TABLE 9

[Object side medium]

| | |
|---|---|
| Medium 1: Air | n(d) = 1.00000 |
| Medium 2: Water | n(d) = 1.33306, νd = 54.0 |

[Lens data]

| Surface number | R | D | n(d) | νd |
|---|---|---|---|---|
| 1 | 42.35551 | 6.984 | 1.51680 | 63.9 |
| 2 | 82.40886 | (D2) | 1.00000 | |
| 3 | 46.95598 | 1.600 | 1.69412 | 53.4 |
| *4 | 9.29586 | 8.149 | 1.00000 | |
| 5 | −172.71059 | 1.000 | 1.77387 | 47.2 |
| *6 | 14.38232 | 5.436 | 1.00000 | |
| 7 | 28.52907 | 1.000 | 1.49782 | 82.6 |
| 8 | 21.42619 | 4.411 | 1.83400 | 37.2 |
| 9 | −38.35978 | (D9) | 1.00000 | |
| 10 | −44.93763 | 1.350 | 1.80400 | 46.6 |
| 11 | 61.10045 | (D11) | 1.00000 | |
| 12 | 12.41083 | 2.897 | 1.51680 | 63.9 |
| 13 | 518.34690 | 1.000 | 1.00000 | |
| 14 | (Aperture stop AS) | 0.800 | 1.00000 | |
| 15 | 21.84556 | 1.878 | 1.49782 | 82.6 |
| 16 | −15.18291 | 0.800 | 1.74400 | 44.8 |
| 17 | 34.45197 | 0.100 | 1.00000 | |
| 18 | 13.10401 | 0.800 | 1.85026 | 32.4 |
| 19 | 10.46518 | 1.966 | 1.51680 | 63.9 |
| 20 | 199.02580 | 3.000 | 1.00000 | |
| 21 | 32.13197 | 2.334 | 1.49782 | 82.6 |
| 22 | −12.79119 | 1.000 | 1.77387 | 47.2 |
| *23 | −60.85497 | (D23) | 1.00000 | |
| 24 | 0.00000 | 1.000 | 1.51680 | 64.1 |
| *25 | −128.67642 | 10.074 | 1.00000 | |
| 26 | 0.00000 | 2.790 | 1.51680 | 64.1 |
| 27 | 0.00000 | (D27) | 1.00000 | |

[Aspheric surface data]

| Surface | κ | A4 | A6 | A8 | A10 |
|---|---|---|---|---|---|
| 4 | −1.14130e+00 | 2.64350e−04 | −1.04329e−06 | 9.14541e−09 | −3.22606e−11 |
| 6 | −4.22670e+00 | 2.15726e−04 | −1.28852e−06 | 1.01118e−08 | −3.48640e−11 |
| 23 | 7.54800e−01 | 1.97665e−04 | 5.56764e−07 | 3.33742e−08 | −4.47633e−10 |
| 25 | 1.00000e+00 | −6.63136e−06 | −1.11015e−07 | −2.85857e−10 | −1.12464e−12 |

TABLE 9-continued

| [Various data] | | | |
|---|---|---|---|
| | W | M | T |
| (Medium 1: Air) | | | |
| f | 7.20 | 9.20 | 13.59 |
| FNo | 3.43 | 3.77 | 4.55 |
| ω | 48.8 | 41.3 | 30.5 |
| Y | 8.00 | 8.00 | 8.00 |
| TL | 84.999 | 84.999 | 84.999 |
| BF | 13.635 | 13.629 | 13.638 |
| BF (Air) | 12.684 | 12.679 | 12.688 |
| (Medium 2: Water) | | | |
| f | 6.06 | 7.53 | 10.88 |
| FNo | 3.43 | 3.78 | 4.56 |
| ω | 45.5 | 39.0 | 28.9 |
| Y | 8.00 | 8.00 | 8.00 |
| TL | 84.999 | 84.999 | 84.999 |
| BF | 13.635 | 13.629 | 13.638 |
| BF(Air) | 12.684 | 12.679 | 12.688 |

| [Variable distance data] | | | | | | |
|---|---|---|---|---|---|---|
| | Upon focusing on infinity | | | Upon focusing on point-blank range | | |
| | W | M | T | W | M | T |
| (Medium 1: Air) | | | | | | |
| D0 | ∞ | ∞ | ∞ | 215.00 | 215.00 | 215.00 |
| β | — | — | — | −0.0300 | −0.0377 | −0.0551 |
| f | 7.20 | 9.20 | 13.59 | — | — | — |
| D2 | 2.490 | 5.472 | 7.647 | 2.490 | 5.472 | 7.647 |
| D9 | 4.788 | 4.821 | 3.794 | 4.128 | 4.143 | 3.096 |
| D11 | 14.481 | 8.895 | 2.000 | 15.141 | 9.574 | 2.698 |
| D23 | 2.100 | 4.679 | 10.435 | 2.100 | 4.679 | 10.435 |
| D27 | 0.770 | 0.770 | 0.770 | 0.770 | 0.770 | 0.770 |
| (Medium 2: Water) | | | | | | |
| D0 | ∞ | ∞ | ∞ | 215.00 | 215.00 | 215.00 |
| β | — | — | — | −0.0331 | −0.0405 | −0.0582 |
| f | 6.06 | 7.53 | 10.88 | — | — | — |
| D2 | 3.974 | 6.991 | 8.132 | 3.974 | 6.991 | 8.132 |
| D9 | 2.218 | 2.199 | 2.199 | 1.599 | 1.596 | 1.602 |
| D11 | 15.558 | 9.995 | 3.098 | 16.177 | 10.598 | 3.695 |
| D23 | 2.100 | 4.679 | 10.435 | 2.100 | 4.679 | 10.435 |
| D27 | 0.770 | 0.770 | 0.770 | 0.770 | 0.770 | 0.770 |

| [Lens group data] (Medium 1: Air) | | |
|---|---|---|
| Lens group | Front end surface | Focal length |
| First lens group | 1 | 159.17 |
| Second lens group | 3 | −71.91 |
| Third lens group | 10 | −32.02 |
| Fourth lens group | 12 | 16.94 |
| Fifth lens group | 24 | 248.99 |

| [Values corresponding to the conditional expressions] |
|---|
| Conditional expression (1) R1/Ymax = 5.294 |
| Conditional expression (2) f2/f3 = 2.246 |
| Conditional expression (3) R1/R2 = 0.514 |

Based on Table 9, in the optical system ZL9 according to Example 9 it is understandable that the conditional expressions (1) to (3) are satisfied.

Figure 50A:
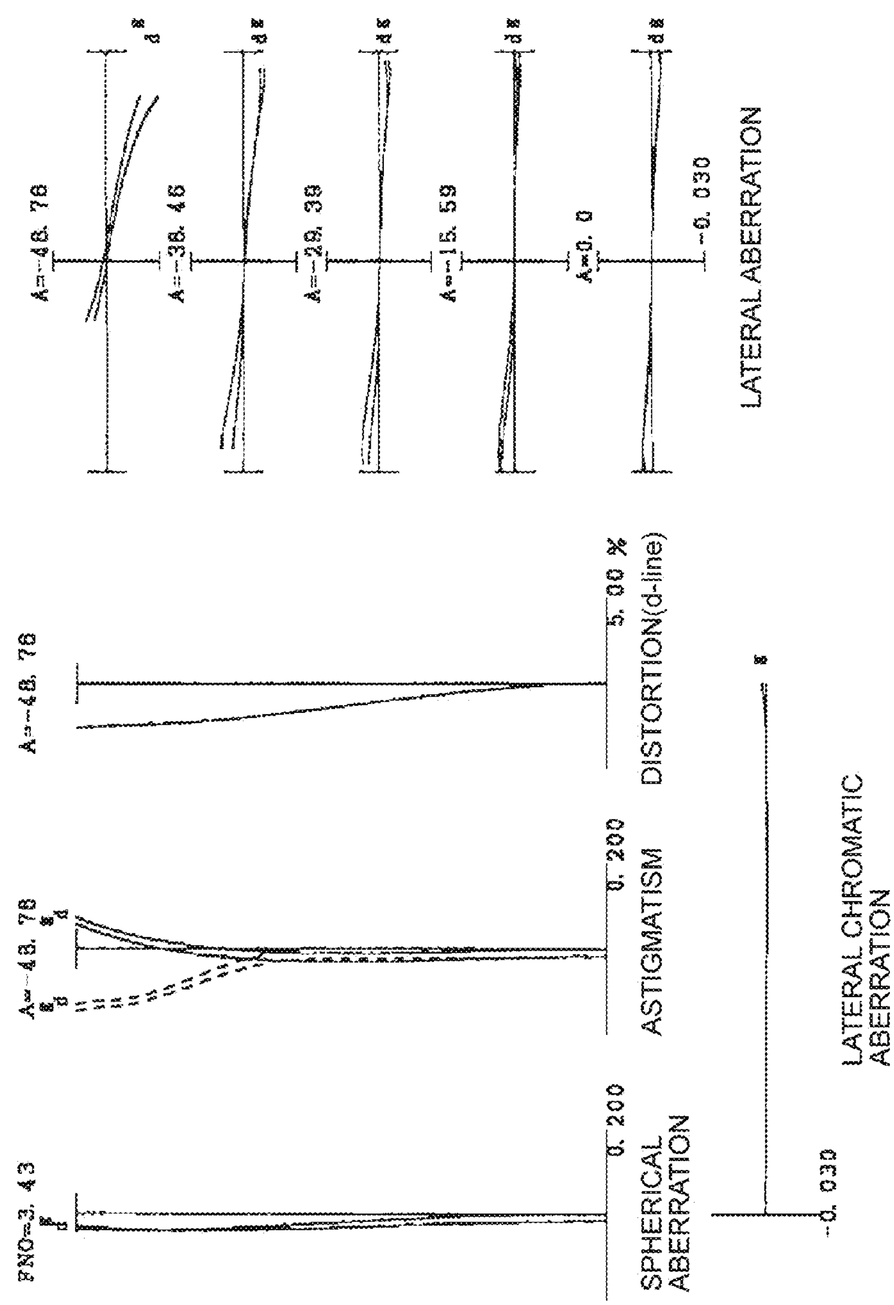
FIGS. 50A, 50B and 50C illustrate a graph showing aberrations in an infinity focusing state of the optical system according to Example 9 in case the object side medium is air, where
Figure 50B:
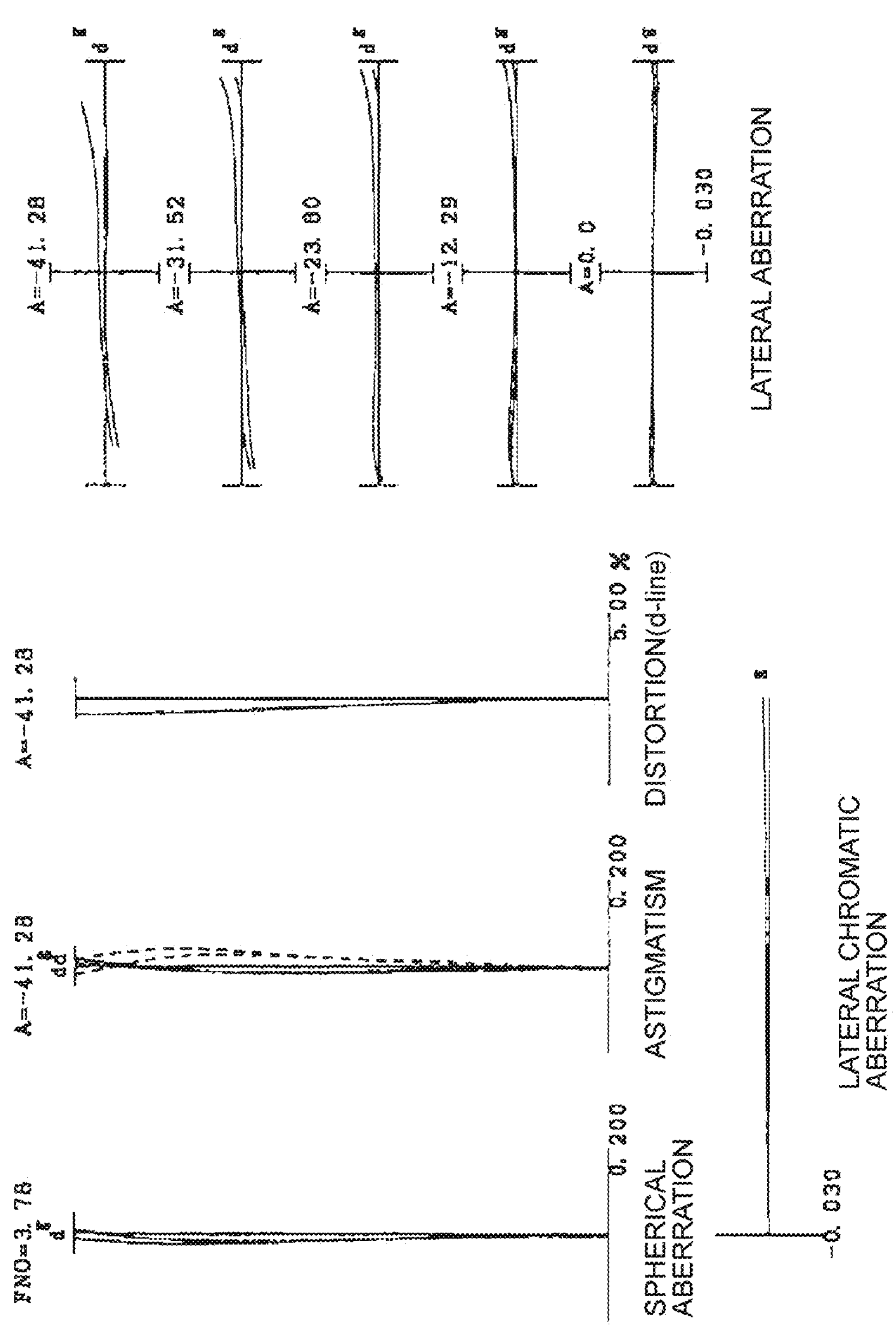
Figure 50C:
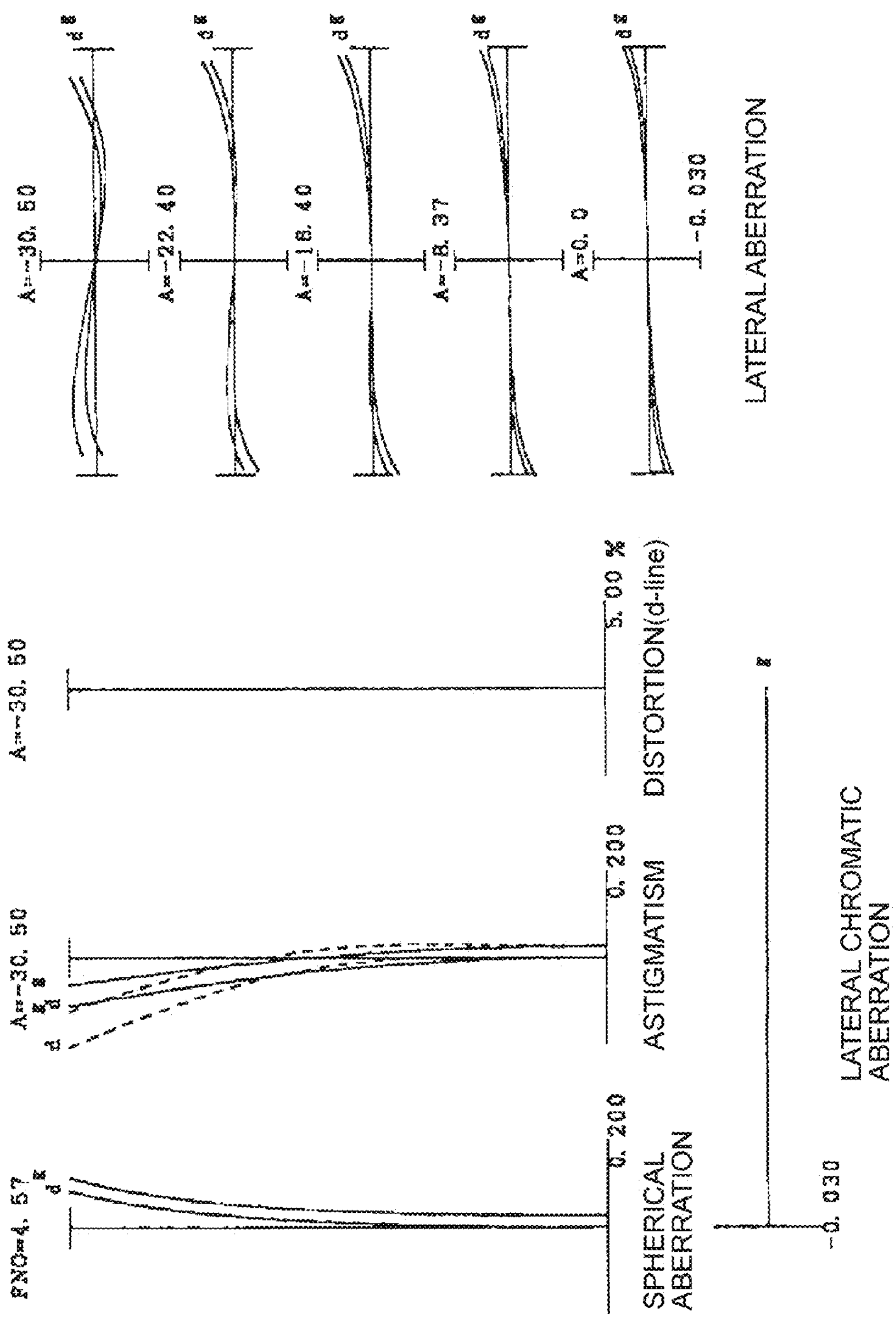
Figure 53A:
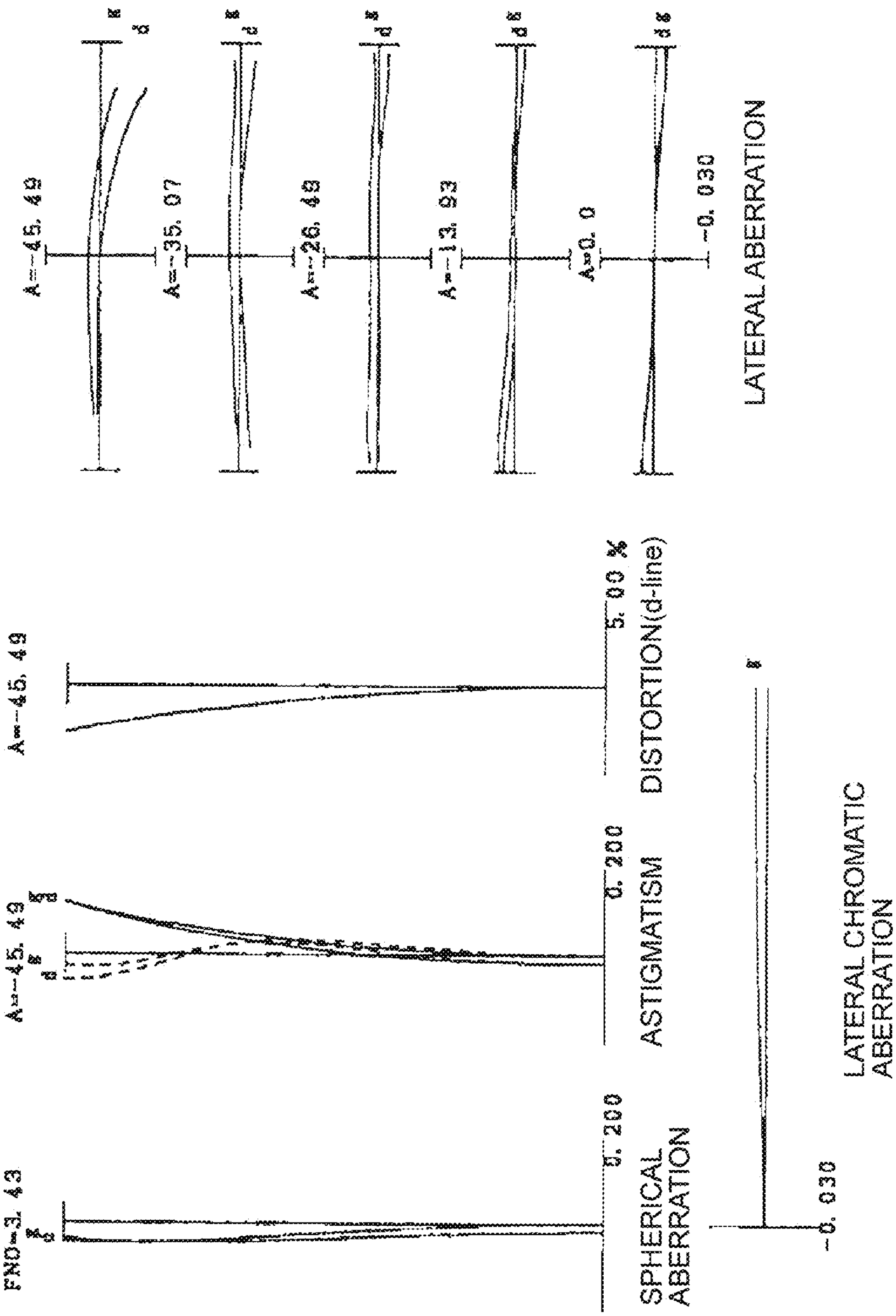
FIGS. 53A, 53B and 53C illustrate a graph showing aberrations in an infinity focusing state of the optical system according to Example 9 in case the object side medium is water, where
Figure 53B:
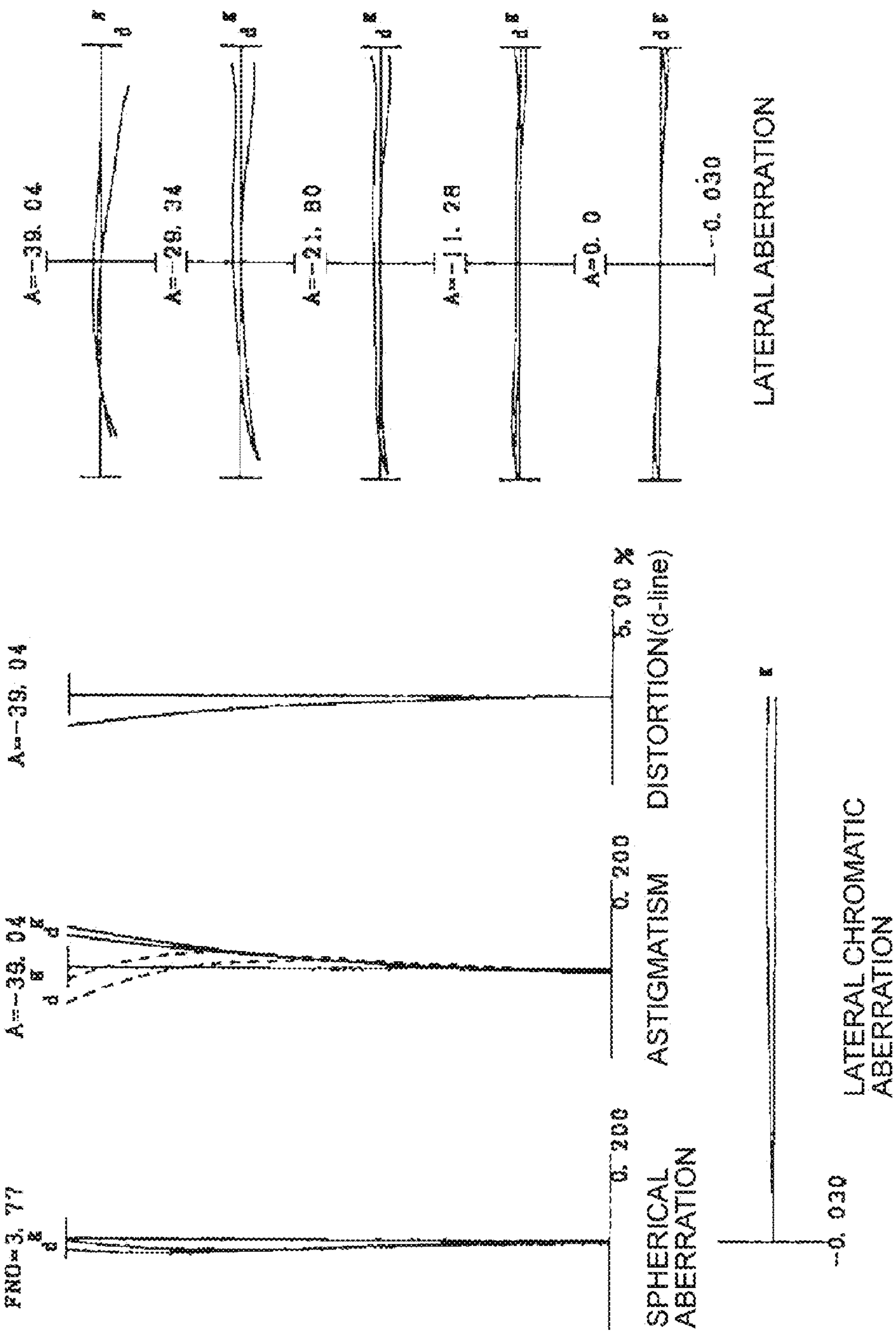
Figure 53C:
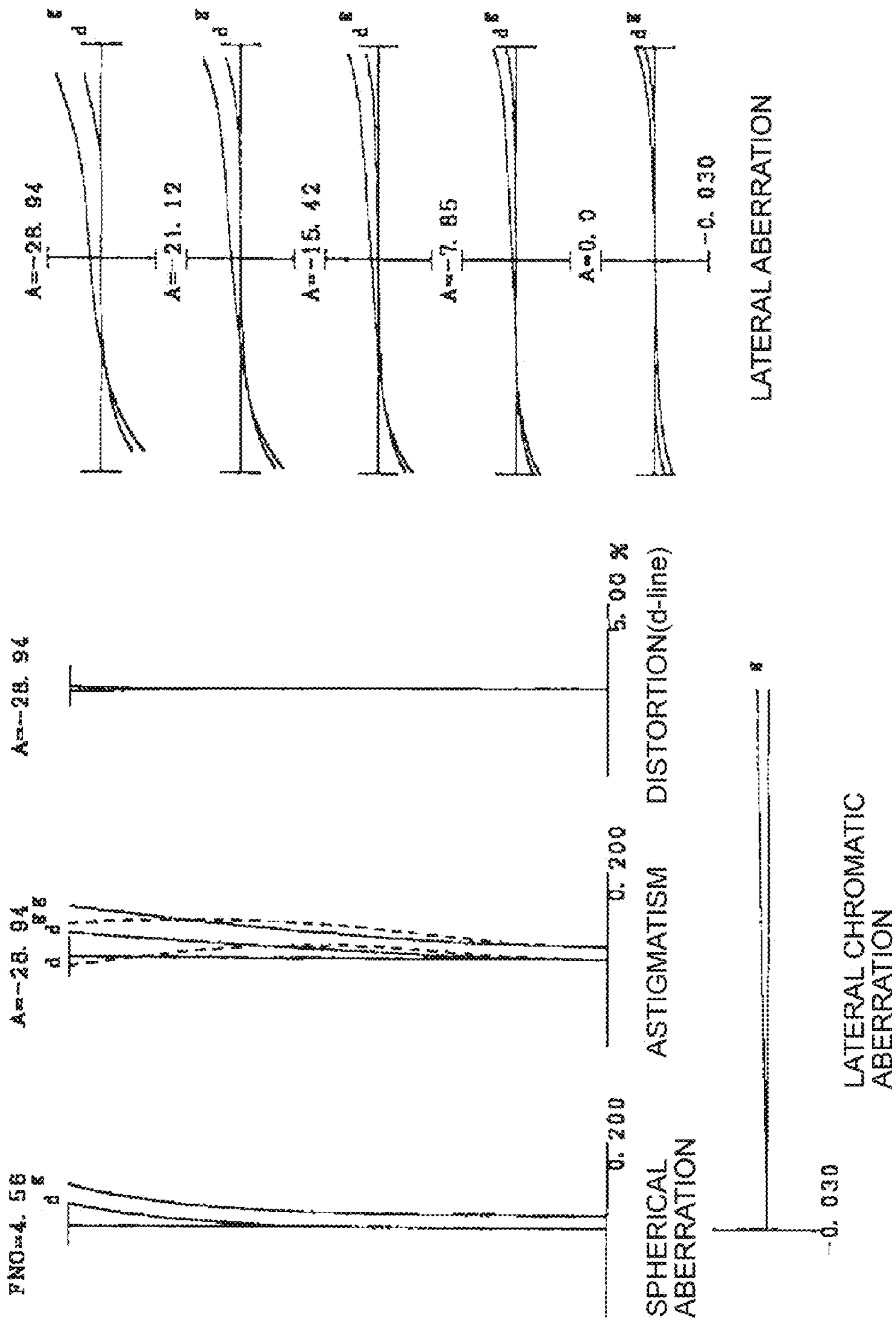
Figure 54A:
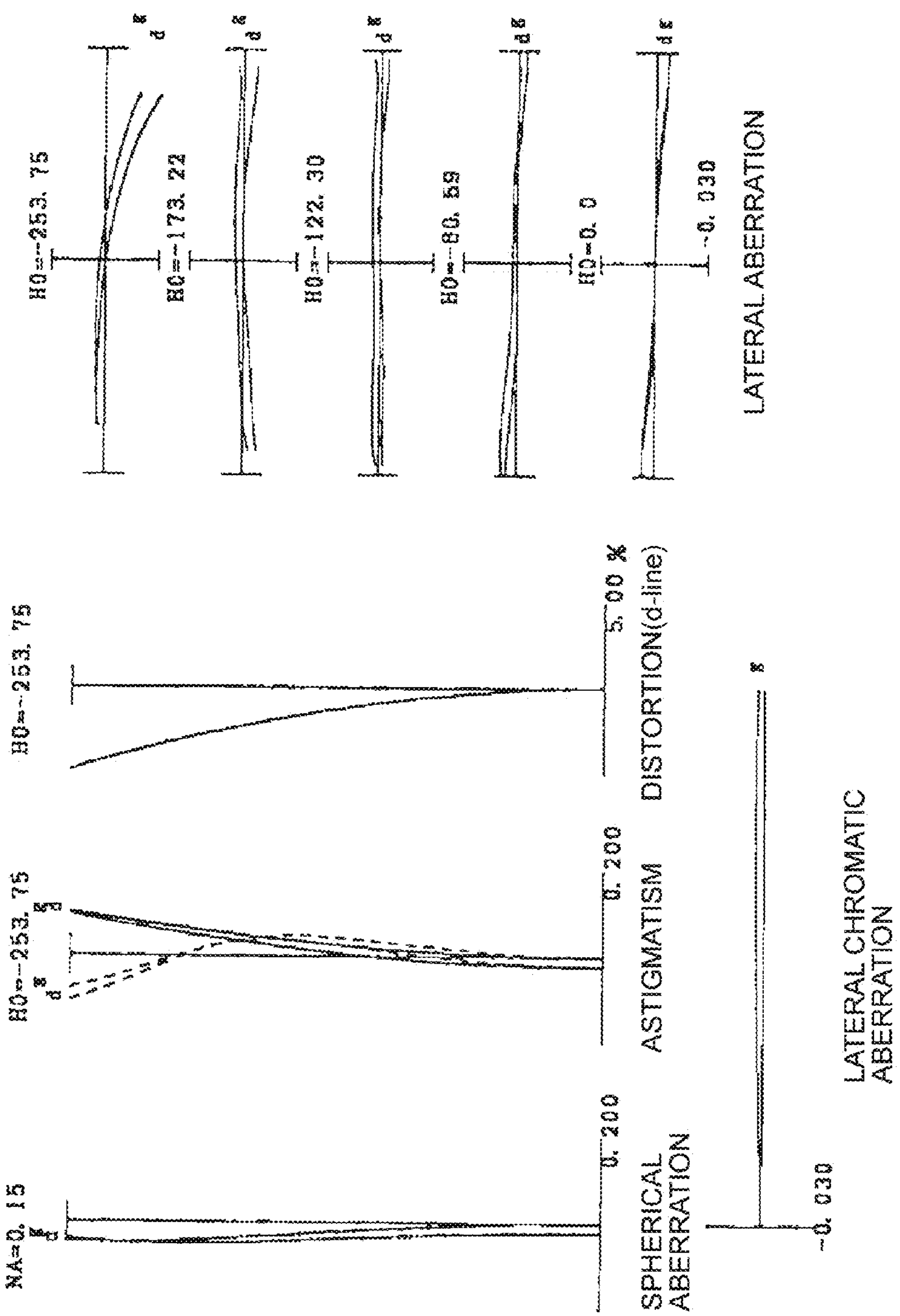
FIGS. 54A, 54B and 54C illustrate a graph showing aberrations in a point-blank range focusing state of the optical system according to Example 9 in case the object side medium is water, where
Figure 54B:
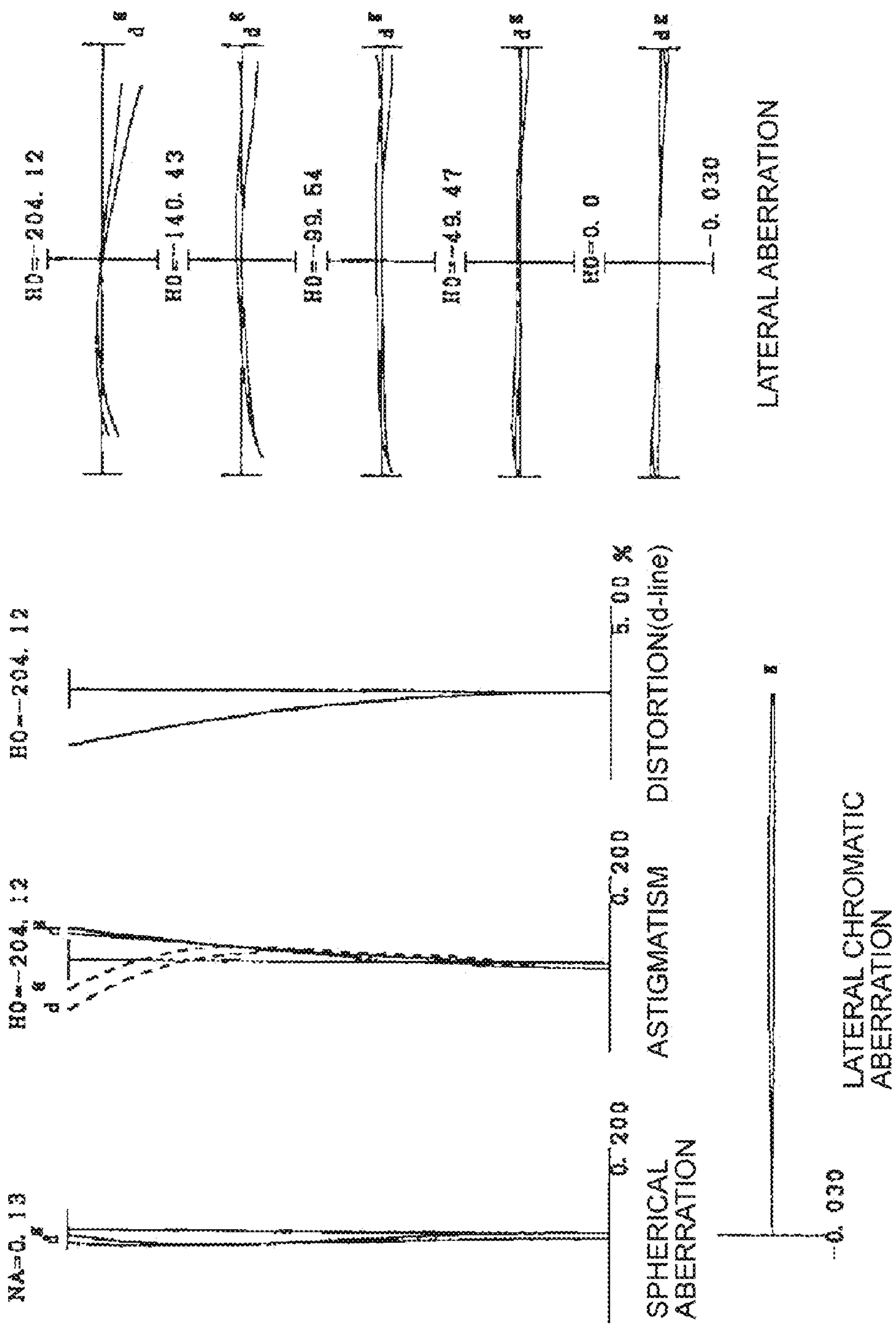
Figure 54C:
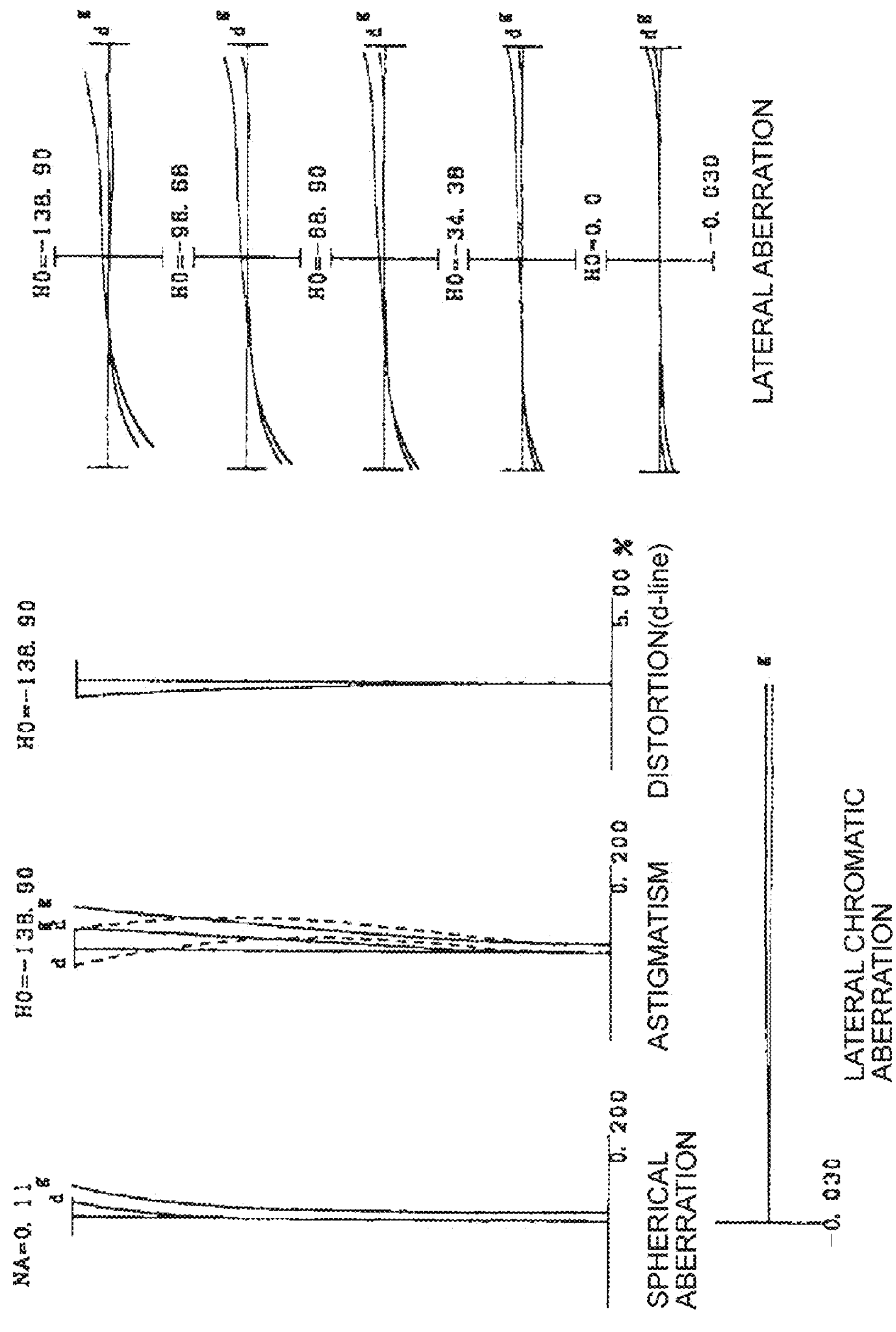

FIGS. 50A, 50B and 50C illustrate a graph showing various aberrations in an infinity focusing state of the optical system ZL9 according to Example 9 in case the object side medium is air, where FIG. 50A depicts the wide-angle end state, FIG. 50B depicts the intermediate focal length state, and FIG. 50C depicts the telephoto end state. FIGS. 51A, 51B and 51C illustrate a graph showing various aberrations in a point-blank range focusing state of the optical system ZL9 according to Example 9 in case the object side medium is air, where FIG. 51A depicts the wide-angle end state, FIG. 51B depicts the intermediate focal length state, and FIG. 51C depicts the telephoto end state. FIGS. 53A, 53B and 53C illustrate a graph showing various aberrations in an infinity focusing state of the optical system ZL9 according to Example 9 in case the object side medium is water, where FIG. 53A depicts the wide-angle end state, FIG. 53B depicts the intermediate focal length state, and FIG. 53C depicts the telephoto end state. FIGS. 54A, 54B and 54C illustrate a graph showing various aberrations in a point-blank range focusing state of the optical system ZL9 according to Example 9 in case the object side medium is water, where FIG. 54A depicts the wide-angle end state, FIG. 54B depicts the intermediate focal length state, and FIG. 54C depicts the telephoto end state.

According to each graph showing aberrations in FIGS. 50A, 50B and 50C, FIGS. 51A, 51B and 51C, FIGS. 53A, 53B and 53C and FIGS. 54A, 54B and 54C, in the optical system ZL9 according to Example 2, it is possible to appropriately correct, regardless of the object side medium, various aberrations in any imaging states covering a range from a wide-angle end state to a telephoto end state and a range from an infinity focusing state to a point-blank focusing state, and have good optical performance.

According to each example, it is possible to shoot, while ensuring an ultra wide-angle of view of more than approximately 90 degrees and a more than approximately 1.8 times zooming ratio, in any of the plurality of media whose refractive indexes are different from each other, appropriately correct various aberrations in any imaging states, and realize an optical system having good optical performance.

As described above with elements of the embodiment attached in order to make the present invention understandable, however the present invention is not limited to the above. The following contents can be suitably adopted within a scope which does not spoil the optical performance of the optical system of the present application.

Although described with the four groups and the five groups configurations as numerical examples of the optical system ZL according to the first embodiment, it is not limited to the above, thus this applicable to another group configuration (for instance, six groups, etc.). Specifically, this applicable to a configuration in which a lens or a lens group is added closest to the object, or a configuration in which a lens or a lens group is added closest to the image. Note that a lens group means a part having at least one lens separated with air interval which changes upon zooming or focusing.

In the optical system ZL according to the first embodiment, in order to focusing on from infinity to a short distance object, a part of a lens group, one whole lens group, or a plurality of lens groups is (are) configured to be moved to the optical direction as a focusing lens group. Moreover, the focusing lens group is applicable to autofocus, and also suitable for driving by the motors for autofocus (for instance, an ultrasonic motor, etc.). In particular, at least a part of the third lens group G3 is used as a focusing lens group.

In the optical system ZL according to the first embodiment, a lens surface may be formed with an spherical surface or a plane, or formed with an aspherical surface. In case a lens surface has a spherical surface or a plane, it is possible to easily have lens processing and an assembly adjustment, and to prevent degradation of optical performance due to errors of processing and an assembly adjustment, thus it is preferable. Moreover, it is preferable because there is less degradation of the depiction performance when an image surface is shifted. In case a lens surface has an aspherical surface, the aspherical surface may be formed with any one of an aspherical surface which is formed through grinding processing, a glass mold aspherical surface in which glass is formed into an aspherical surface configuration using a mold, and a complexed aspherical surface in which a resin is formed on a surface of glass and formed into an aspherical surface configuration. Moreover, a lens surface may be formed as a diffractive surface, additionally a lens may be formed as a graded-index lens (GRIN lens) or a plastic lens.

In the optical system ZL according to the first embodiment, in order to reduce flare and ghost and to attain good optical performance of high contrast, a reflection reducing film having high transitivity within a broad wavelength band may be applied to each lens surface.

In the optical system ZL according to the first embodiment, a zooming ratio is approximately 1.5 to 2.5 times.

The optical system ZL according to the first embodiment may be a single focus lens or a zoom lens.

Second Embodiment

Figure 57:
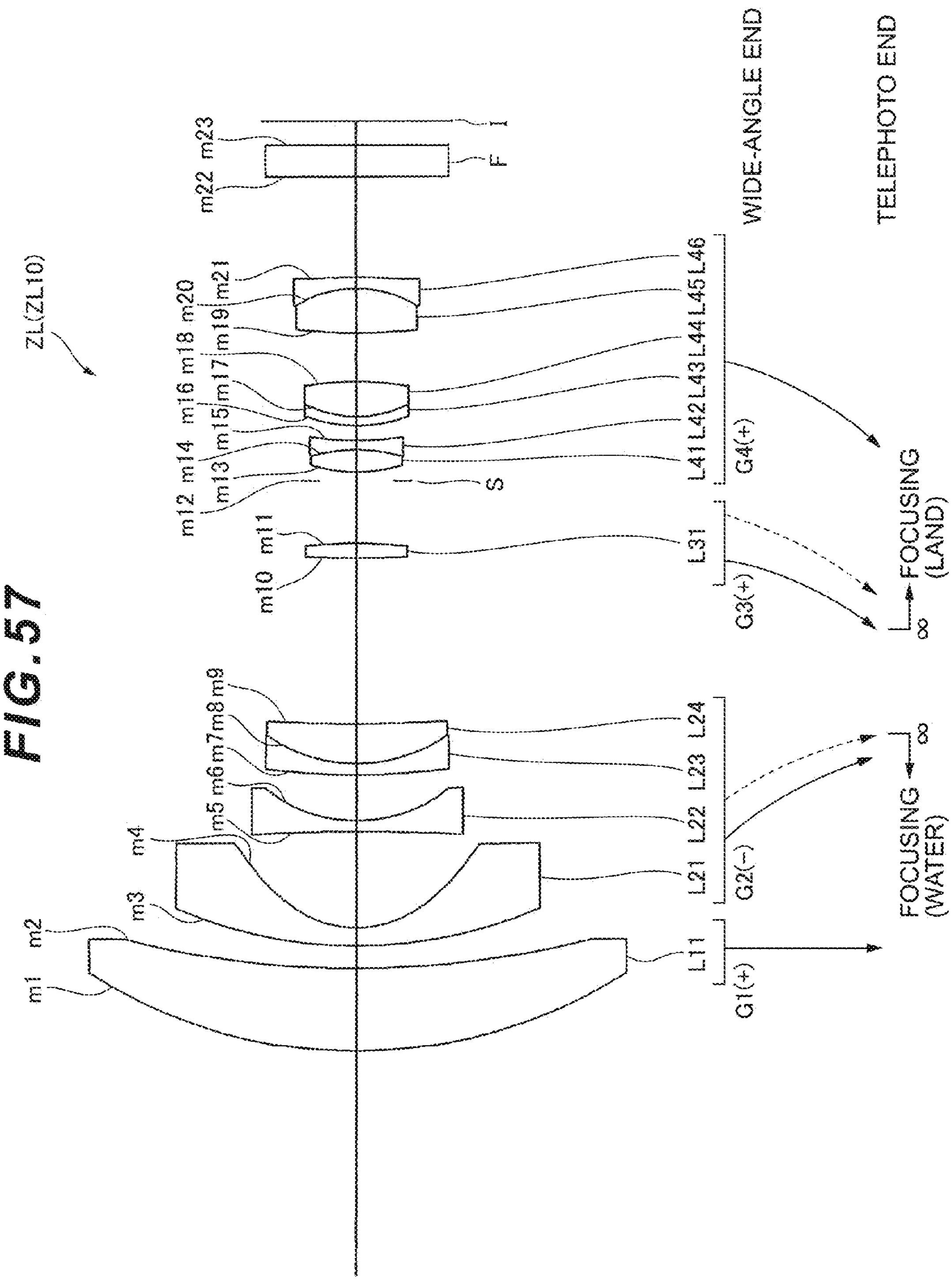
FIG. 57 illustrates a sectional view showing a configuration of the amphibious zoom lens according to Example 10, and a diagram showing the moving locus (arrow) of each group from a wide-angle end state to a telephoto end state.

Hereinafter, a second embodiment will be now described with reference to drawings. An anphibious zoom lens ZL according to the second embodiment is capable of imaging in water and on land, and comprises, as shown in FIG. 57, in order from an object, a first lens group G1 having positive or negative refractive power, a second lens group G2 having negative refractive power, a third lens group G3 having positive refractive power, and a fourth lens group G4 having positive refractive power, wherein a lens surface m1 closest to the object in the first lens group G1 has a configuration having a convex surface facing the object, wherein upon zooming from a wide-angle end state to a telephoto end state the lens group G1 is fixed, and the second lens group G2, the third lens group G3 and the fourth lens group G4 move, wherein the second lens group G2 and the third lens group G3 move in an image direction when switching from the land imaging state to the underwater imaging state.

Note that switching from the land imaging state to the underwater imaging state, for example, there are a method in which a photographer manually performs with a switch operation, etc., and a method of providing a sensor, etc. and automatically performing. However, it is not limited to these methods.

In the second embodiment, hermetic in the underwater imaging state is secured by fixing the first lens group G1. Moreover, the zooming action is mainly achieved by the second lens group G2 having negative refractive power, the third lens group G3 having positive refractive power, and the fourth lens group G4, and is attained especially by changing the distance between the second lens group G2 and the third lens group G3. Such a configuration is advantageous for a wide-angle zoom lens.

In the second embodiment, by configuring the lens surface closest to the object in the amphibious zoom lens ZL with a convex configuration facing the object, it is possible suppress a change of an angle of view when putting in water, and generation of distortion and chromatic aberration. On the other hand, with the lens surface closest to the object having curvature, when put in water, this causes a change of an image-forming position and generation of curvature of image surface.

Then, in the amphibious zoom lens ZL of the second embodiment, upon switching from the land imaging state to the underwater imaging state, by moving the second lens group G2 and the third lens group G3 in the image surface direction, a correction of a focal position and a correction of the curvature of image surface are synchronously corrected. With this arrangement, it is possible to concurrently correct various aberrations such as distortion, chromatic aberration, and curvature of image surface both in the land imaging state and the underwater imaging state.

In the amphibious zoom lens ZL according to the second embodiment, it is appreciated that the distance between the second lens group G2 and the third lens group G3 decreases upon zooming from a wide-angle end state to a telephoto end state. With this arrangement, zooming is efficiently performed, and it is advantageous to downsizing the zoom lens.

In the amphibious zoom lens ZL according to the second embodiment, it is more preferable that the third lens group G3 and the fourth lens group G4 move in an object direction upon zooming from a wide-angle end state to a telephoto end state. With this arrangement, it is possible to efficiently perform zooming, and it is advantageous to downsizing the zoom lens.

In the amphibious zoom lens ZL according to the second embodiment, it is appreciated that the following conditional expression (4) is satisfied.

$$1.00<R1/Enpw<4.00 \qquad (4)$$

where, R1 denotes a radius of curvature of the lens surface closest to the object in first lens group G1, and Enpw denotes a distance on the optical axis from a lens surface closest to the object in the first lens group G1 to a paraxial incident pupil position in an infinity imaging state in a wide-angle end state of a land imaging state in the amphibious zoom lens ZL.

The conditional expressions (4) defines a condition for concurrently satisfying corrections of distortion, chromatic aberration and curvature of image surface when imaging in water. In case of deceeding the lower limit of the conditional expression (4), upon switching from the underwater imaging state to the underwater imaging, the power of the lens surface closest to the object in the first lens group G1 greatly changes, therefore curvature of image surface is greatly generated in the underwater imaging state, even if trying to correct them by moving the second lens group G2 and the third lens group G3 in a different moving locus from that in the land imaging state, it is not possible to completely correct them. In case of exceeding the upper limit of the conditional expression (4), this becomes similar to a case in which the lens surface closest to the object in the first lens group G1 is configured with a plane, therefore this causes to increase chromatic aberration and positive distortion generated in the lens closest to the object in the first lens group, it is not possible to completely correct them.

In order to ensure the advantageous effect of the second embodiment, it is preferable to set the lower limit of the conditional expression (4) to 1.30. In order to ensure the advantageous effect of the second embodiment, it is preferable to set the upper limit of the conditional expression (4) to 3.50.

In the amphibious zoom lens ZL according to the second embodiment, it is appreciated that the following conditional expression (5) is satisfied.

$$-0.15<\varphi 1/\varphi w<0.15 \qquad (5)$$

where, φ1 denotes refractive power in the air in the first lens group G1, and

φw denotes refractive power in a wide-angle end state in the land imaging state in the amphibious zoom lens ZL.

The conditional expression (5) defines a condition for contributing both of downsizing and suppressing fluctuation of various aberrations such as axial chromatic aberration and chromatic aberration upon zooming from a wide-angle end state to a telephoto end state in the anphibious zoom lens ZL. In case of exceeding any of the lower limit and the upper limit of the conditional expression (5), this causes to increase refractive power of the first lens group G1, thus the lens configuration is complicated for suppressing fluctuation of various aberrations such as chromatic aberration and axial chromatic aberration upon zooming from a wide-angle end state to a telephoto end state. With this arrangement, this cause to increase both an axial thickness and a diameter of the first lens group G1, and it becomes impossible to downsize.

In order to ensure the advantageous effect of the second embodiment, it is preferable to set the lower limit of the conditional expression (5) to −0.10. In order to ensure the advantageous effect of the second embodiment, it is preferable to set the upper limit of the conditional expression (5) to 0.10.

In the amphibious zoom lens ZL according to the second embodiment, it is appreciated that the following conditional expression (6) is satisfied.

$$0.30<\Delta 2w/\Delta 3w<1.20 \qquad (6)$$

where, Δ2w denotes amount of movement of the second lens group G2 when switching from an infinity imaging state in a wide-angle end state in a land imaging state to an infinity imaging state in a wide-angle end state in the underwater imaging state, and Δ3w denotes amount of movement of the third lens group G3 when switching from an infinity imaging state in a wide-angle end state in a land imaging state to an infinity imaging state in a wide-angle end state in the underwater imaging state.

The conditional expressions (6) defines a condition for suppressing a change of an image-forming position while appropriately correcting curvature of image surface both in the land imaging state and the underwater imaging state. In case of exceeding any of the lower limit and the upper limit of the conditional expression (6), it becomes difficult to contribute both of appropriately correcting curvature of image surface and suppression of a change of the image-forming position respectively in the land imaging state and the underwater imaging state.

In order to ensure the advantageous effect of the second embodiment, it is preferable to set the lower limit of the conditional expression (6) to 0.50. In order to ensure the advantageous effect of the second embodiment, it is preferable to set the upper limit of the conditional expression (6) to 1.00.

In the amphibious zoom lens ZL according to the second embodiment, it is appreciated that the first lens group G1 is composed of a meniscuses lens facing a convex surface facing the object. With this arrangement, it is advantageous to correcting distortion, chromatic aberration, and curvature of image surface.

In the amphibious zoom lens ZL according to the second embodiment, it is appreciated that the following conditional expression (7) is satisfied.

$$-1.00<\varphi 2/\varphi w<-0.30 \qquad (7)$$

where, φ2 denotes refractive power in the air in the second lens group G2, and

φw denotes refractive power in a wide-angle end state in the land imaging state of the amphibious zoom lens ZL.

The conditional expressions (7) defines a condition for obtaining an ultra wide-angle view in a wide-angle end state, and a preferable zooming ratio. In case of deceeding the lower limit of the conditional expression (7), refractive power of the second lens group G2 excessively becomes large, this causes a difficulty to correct various aberrations such as spherical aberration and distortion. In case of exceeding the upper limit of the conditional expression (7), this causes a difficulty to achieve an ultra wide-angle of view or a preferable zooming ratio.

In order to ensure the advantageous effect of the second embodiment, it is preferable to set the lower limit of the conditional expression (7) to −0.80. In order to ensure the advantageous effect of the second embodiment, it is preferable to set the upper limit of the conditional expression (7) to −0.40.

In the amphibious zoom lens ZL according to the second embodiment, it is appreciated that a lens closest to the object in the second lens group G2 is a meniscus negative lens having a concave surface facing the image surface. With this arrangement, it is possible to appropriately correct various aberrations such as spherical aberration and distortion.

In the amphibious zoom lens ZL according to the second embodiment, it is appreciated that the following conditional expression (8) is satisfied.

$$0.20<\varphi 3/\varphi 4<1.00 \quad (8)$$

where, φ3 denotes refractive power in the air in the third lens group G3, and

φ4 denotes refractive power in the air in the fourth lens group G4.

The conditional expression (8) defines a condition to appropriately correct curvature of image surface both in the land imaging state and the underwater imaging state. Even in case of exceeding any of the lower limit and the upper limit of the conditional expression (8), this causes a difficulty to appropriately correct curvature of image surface respectively in the land imaging state and the underwater imaging state.

In order to ensure the advantageous effect of the second embodiment, it is preferable to set the lower limit of the conditional expression (8) to 0.30. In order to ensure the advantageous effect of the second embodiment, it is preferable to set the upper limit of the conditional expression (8) to 0.70.

In the amphibious zoom lens ZL according to the second embodiment, the third lens group G3 is composed of a biconvex positive lens. With this arrangement, it is possible to simplify a lens configuration, downsizing, and cost reduction.

In the amphibious zoom lens ZL according to the second embodiment, it is preferable that in a land imaging state, upon focusing on from an infinity object to a short distance object, the third lens group G3 moves in the image surface direction, and in the underwater imaging state, upon focusing on from an infinity object to a short distance object, the second lens group G2 moves in an object direction.

As mentioned above, by adopting the different focusing methods in the land imaging state and the underwater imaging state, it is possible to appropriately correct fluctuation of curvature of image surface upon focusing both in the land imaging state and the underwater imaging state. Moreover, in order to switch from the land imaging state to the underwater imaging state, the second lens group G2 and the third lens group G3 are necessary to be moved in the image surface direction, the distance between the third lens group G3 and the fourth lens group G4 is relatively large in the land imaging state, while the distance of the first lens group G1 and the second lens group G2 is relatively large in the underwater imaging state. Because focusing is performed making use of the relatively enlarged distances, it is possible to maintain to realize focusing sufficiently close to a short distance object while downsizing a total length of the amphibious zoom lens ZL.

In the amphibious zoom lens ZL according to the second embodiment, it is appreciated that the second lens group G2 moves in the object direction upon focusing on from an infinity object to a short distance object both in the land imaging state and the underwater imaging state. As mentioned above, by adopting the same focusing methods in the land imaging state and the underwater imaging state, it is possible to have a simply configured focusing mechanism, thus it is advantageous to cost reduction.

In the amphibious zoom lens ZL according to the second embodiment, it is appreciated that the distance between the third lens group G3 and the fourth lens group G4 changes when switching from the land imaging state to the underwater imaging state, while when zooming from a wide-angle end state to a telephoto end state in an infinity imaging state in the land imaging state the distance above is constant. With this arrangement, it is possible to configure to move the third lens group G3 and the fourth lens group G4 together, simplify a mechanism, downsize it, and have cost reduction.

In the amphibious zoom lens ZL according to the second embodiment, it is appreciated that the distance between the third lens group G3 and the fourth lens group G4 changes from the land imaging state to the underwater imaging state, while the distance above is constant upon zooming from a wide-angle end state to a telephoto end state in an infinity imaging state in the underwater imaging state. With this arrangement, it is possible to configure to move the third lens group G3 and the fourth lens group G4 together upon zooming in the underwater imaging state, simplify a mechanism, downsize, and have cost reduction.

In the amphibious zoom lens ZL according to the second embodiment, “underwater imaging state” is equivalent to a first imaging state set forth in claims, and “land imaging state” is equivalent to a second imaging state set forth in claims. That is, “water (a refractive index=1.333 in d-line)” is equivalent to a first medium having a first refractive index set forth in claims, and “air (a refractive index=1.000 in d-line)” is equivalent to a second medium having a second refractive index.

Moreover, as the first and second object side media, it can be considered to adopt various gas and liquid such as ethanol (refractive index=1.362 in d-line), kerosene (refractive index=1.447 in d-line), and benzene (refractive index=1.501 in d-line), etc., other than water and air, any of the above are available in the optical system ZL according to the second embodiment. Note that water is not limited to fresh water, however aqueous solution such as sea water may be adopted.

According to the amphibious zoom lens ZL according to the second embodiment equipped with the above configurations, although configurations are simplified, it is possible to realize the amphibious zoom lens which can perform zooming both in the land imaging state and the underwater imaging state, and has good optical performance.

Next, a camera (imaging device) equipped with the anphibious zoom lens ZL according to the second embodiment is described with reference to FIG. 55. This camera CAM has, except for having the amphibious zoom lens ZL as the photographing lens 11, the same as that in the first embodiment, however, the explanation thereof is omitted at this stage because this configuration has been described before.

Note that in the second embodiment there are several methods of identifying if the imaging state is land (in the air) or underwater, such as a method in which two terminals exposed from the camera CAM are prepared and whether the camera CAM is put in water or not is automatically detected by whether the two terminals become conductive when the camera CAM is put in water, or a method in which a mode switching switch manipulated by the photographer when switching between a land imaging mode and a underwater imaging mode is prepared and the mode is identified in response to manual manipulation by the photographer, etc. However, it is not limited to these methods.

According to the camera CAM equipped with the above configurations in the second embodiment, by having the optical system ZL mentioned above as the imaging lens 11, although configurations are simplified, it is possible to perform zooming both in the land imaging state and the underwater imaging state, and realize a camera having good optical performance.

Note that the camera CAM set forth in FIG. 55 may be not only a type in which the optical system ZL is provided in an attachable and detachable manner, but also a type in which the camera body is integrated with the optical system ZL. Moreover, the camera CAM may be a so-called single-lens reflex camera having a quick return mirror, or a video camera which primarily performs moving imaging.

Figure 77:
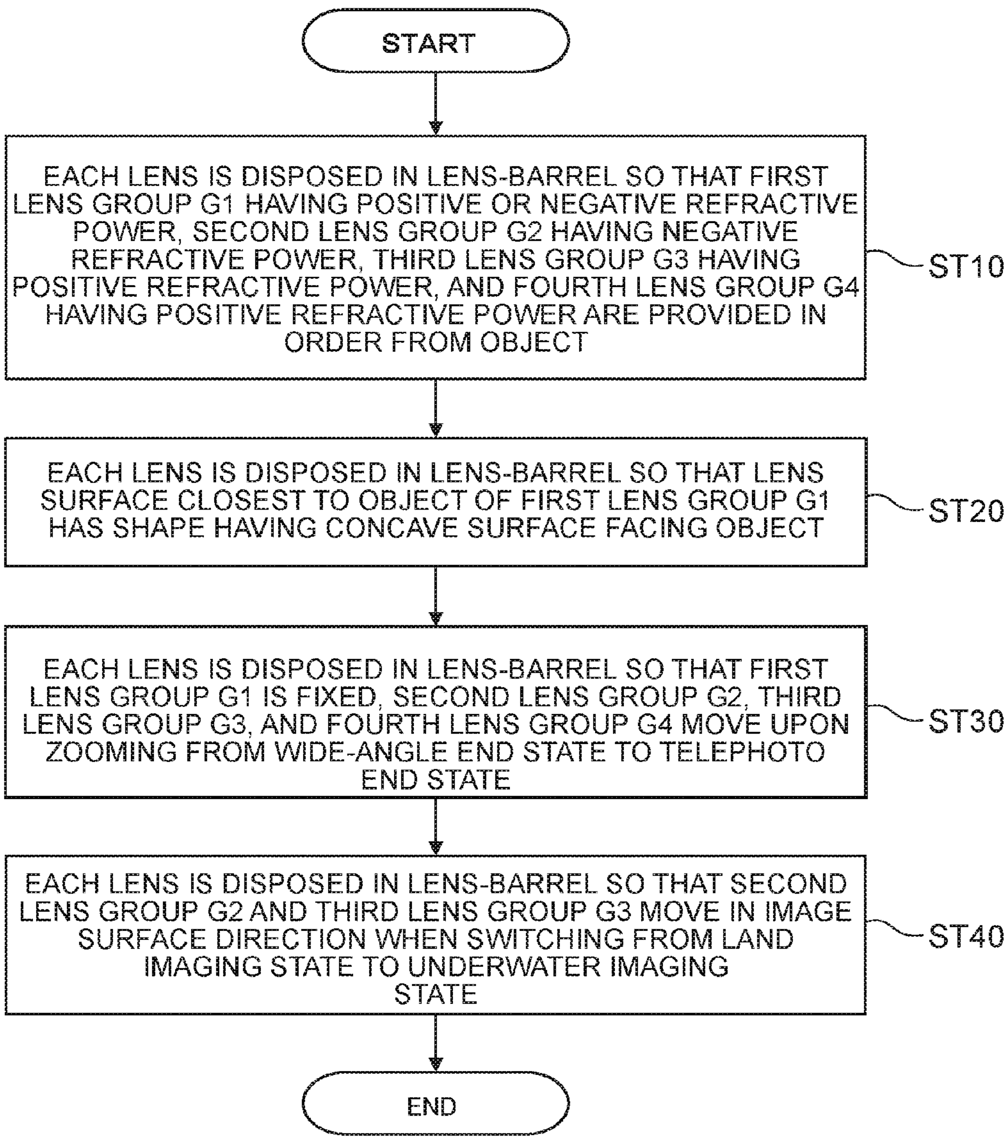
FIG. 77 illustrates a flowchart which shows a method for manufacturing an anphibious zoom lens according to a second embodiment.

Next, a method for manufacturing the amphibious zoom lens ZL is outlined with reference to FIG. 77. Firstly, each lens is disposed in a lens-barrel so that a first lens group G1 having positive or negative refractive power, a second lens group G2 having negative refractive power, a third lens group G3 having positive refractive power, and a fourth lens group G4 having positive refractive power (Step ST10). Upon dosing so, a lens is disposed so that a lens surface closest to the object in the first lens group G1 is configured to have a convex face facing the object (Step ST20). Upon zooming from a wide-angle end state to a telephoto end state, each lens is disposed so that the first lens group G1 is fixed, and the second lens group G2, the third lens group G3, and the fourth lens group G4 are moved (Step ST30). Moreover, upon switching from the land imaging state to the underwater imaging state, each lens is disposed so that the second lens group G2 and the third lens group G3 move in the image surface direction (Step ST40).

Note that the above-mentioned "underwater imaging state" is equivalent to the first imaging state in a first medium (water (refractive index=1.333 in d-line)) in claims, and "land imaging state" is equivalent to the second imaging state in a second medium (air (refractive index=1.000 in d-line)).

Exampling a lens arrangement in the second embodiment, in the anphibious zoom lens ZL illustrated in FIG. 57, a positive meniscus lens L11 having a convex surface facing the object is disposed as the first lens group G1. As the second lens group G2, a negative meniscus lens L21 having a concave surface facing the image surface, a biconcave negative lens L22, and a cemented lens composed of a negative meniscus lens L23 having a concave surface facing the image surface and a positive meniscus lens L24 having a convex surface facing the object are disposed in order from the object. As the third lens group G3, a biconvex positive lens L31 is disposed. As the fourth lens group G4, a cemented negative lens composed of a biconvex positive lens L41 and a biconcave negative lens L42, a cemented positive lens composed of a negative meniscus lens L43 having a concave surface facing the image surface and a biconvex positive lens L44, and a cemented negative lens composed of a biconvex positive lens L45 and a negative meniscus lens L46 having a concave surface facing the object are disposed in order from the object. These lenses are disposed so that upon zooming from a wide-angle end state to a telephoto end state, the first lens group G1 is fixed, and the second lens group G2, the third lens group G3, and the fourth lens group G4 move, additionally, upon switching from the land imaging state to the underwater imaging state, the second lens group G2 and the third lens group G3 are moved in the image surface direction.

According to such a method for manufacturing, although configurations are simplified, it is possible to manufacture the amphibious zoom lens which can perform zooming both in the land imaging state and the underwater imaging state, and has good optical performance.

Examples According to the Second Embodiment

Each example according to a second embodiment is described with reference to drawings. FIGS. 57, 62, 67, and 72 illustrate a sectional view showing a configuration of the anphibious zoom lens ZL (ZL10 to ZL13) according to each example. However, Example 10 illustrated in FIG. 57 corresponds not only to the second embodiment but also to the third embodiment mentioned below. Moreover, Example 11 illustrated in FIG. 62 corresponds not only to the second embodiment but also to the fourth embodiment mentioned below. Other examples correspond only to the second embodiment. Moreover, Tables 10 to 13 are illustrated below, these are tables showing each general data in Examples 10 to 13.

Note that each reference sign to FIG. 57 according to Example 10 is used independently for every example, in order to avoid complicating explanations due to swelling of the digit number of reference signs. Therefore, even if attached with the same reference signs as those in drawings according to other examples, this does not necessarily mean the same configurations as those in the other examples.

In each example, d-line (wave length of 587.5620 nm) and g-line (wave length of 435.8350 nm) are selected as subjects for calculating aberration characteristics.

In the [Lens data] in tables, a surface number means an order of each optical surface from the object side along a direction light travels, R means a radius of curvature of each optical surface, D means a surface distance on the optical axis from each optical surface to the next optical surface (or image surface), nd means a refractive index in d-line of a material of a light member, and νd means an Abbe number on the basis of d-line of a material of the light member. Object surface means an object surface, (Variable) means a variable distance between surfaces, "∞" of a radius of curvature means a plane or an aperture, (Aperture stop) means an iris stopper S, and an image surface means an image surface I. The refractive index "1.000000" of air is omitted. In case the optical surface is an aspherical surface, a sign "*" is assigned to the surface number and a paraxial radius of curvature is shown in a column of a radius of curvature R.

In [aspherical surface data] in tables, regarding the aspherical surfaces in the [Lens data], the configuration is defined by the following expression (b). X(y) means a distance along the optical axis direction from a tangent plane in a vertex of the aspherical surface to a position on the aspherical surface in height y, and R means a radius of curvature (paraxial radius of curvature) of a criterion spherical surface, κ means a conic constant, and, Ai means an i-th aspherical surface coefficient. "E-n" means "$\times 10^{-n}$." For example, it is 1.234E-05=$1.234\times 10^{-5}$.

$$X(y)=(y^2/R)/\{1+(1-\kappa\times y^2/R^2)^{1/2}\}+A4\times y^4+A6\times y^6+A8\times +A10\times y^{10} \quad (b)$$

In [Various data] in tables, f means a focal length of a lens whole system, and FNo means a f number, 2ω means an angle of view (unit: degree), Y means an image height, TL means a total length of a lens (a distance from a lens surface closest to a paraxial image surface on the optical axis), and BF means backfocus. Moreover, Di means a variable distance, a variable distance between an i-th surface and an (i+1)-th surface.

In [Amount of movement upon focusing] in tables means amount of movement of each lens group upon focusing on from an object distance infinity to an object distance of 300 mm (however, a positive symbol means amount of movement in the image surface direction, while a negative symbol means amount of movement in the object direction).

[Lens group data] in tables shows a front end surface number (a number of a lens surface closest to the object), of a rear end surface number (a number of a lens closest to the image surface), and a focal length in the air, in each lens group.

[Position data of each lens group] in tables shows a position of each lens group in an infinity imaging state in each focal length of the land imaging state and the underwater imaging state, on the basis of a position of each lens group in an infinity imaging state in a wide-angle end state in the land imaging state. In symbols the image surface direction is positive.

[Values corresponding to the conditional expressions] in tables shows values corresponding to the conditional expressions (4) to (8).

Hereinafter, in all general data values, regarding the focal length f, a radius of curvature R, a distance D, and other lengths, etc., "mm" is generally used except a specific request, however an optical system is not limited to the above, since equivalent optical performance can be obtained even if the optical system is proportionally enlarged or proportionally shrinked. Moreover, the unit is not limited to "mm," another appropriate unit is available, instead.

The explanations concerning the tables are common among all the examples, thus hereinafter the explanations are omitted.

EXAMPLE 10

Example 10 is described with reference to FIGS. 57 to 61A, 61B and 61C, and Table 10. Note that in FIG. 57, a solid-line shows a moving locus in the land imaging state of the second lens group G2 and the third lens group G3, and a dotted-line shows a moving locus in the underwater imaging state.

The amphibious zoom lens ZL (ZL10) according to Example 10 is composed of, as shown in FIG. 57, in order from an object, a first lens group G1 having positive refractive power, a second lens group G2 having negative refractive power, a third lens group G3 having positive refractive power, and a fourth lens group G4 having positive refractive power.

The first lens group G1 is composed of a positive meniscus lens L11 having a convex surface facing the object.

The second lens group G2 is composed of, in order from the object, a negative meniscus lens L21 having a concave surface facing the image surface, a biconcave negative lens L22, a cemented lens composed of a negative meniscus lens L23 having a concave surface facing the image surface and a positive meniscus lens L24 having a convex surface facing the object. Note that the image side surface of the negative meniscus lens L21 is an aspherical surface. Moreover, the image side surface of the biconcave negative lens L22 is an aspherical surface.

The third lens group G3 is composed of a biconvex positive lens L31.

The fourth lens group G4 is composed of, in order from the object, a cemented negative lens composed of a biconvex positive lens L41 and a biconcave negative lens L42, a cemented positive lens composed of a negative meniscus lens L43 having a concave surface facing an image surface and a biconvex positive lens L44, and a cemented negative lens composed of a biconvex positive lens L45 and a negative meniscus lens L46 having a concave surface facing the object. The image side surface of the negative meniscus lens L46 is an aspherical surface.

An iris stopper S is disposed closer to the object of the fourth lens group G4.

The filter group F is disposed closer to the image of the fourth lens group G4. The filter group F is composed of a low-pass filter for cutting a spatial frequency more than a marginal dissector of image sensors such as a CCD and CMOS disposed on the image surface I, a cover-glass of an image sensor, etc.

The image surface I is formed on the image sensor which is composed of unillustrated CCDs, CMOSs, etc.

In the amphibious zoom lens ZL10 configured above, the first lens group G1 is always fixed against the image surface I on the axis optical direction, upon switching from the land imaging state to the underwater imaging state, upon zooming from the wide-angle end state to the telephoto end state in each imaging state, and upon focusing on from an infinity object to a short distance object in each imaging state.

The second lens group G2 moves in the image surface direction upon switching from the land imaging state to the underwater imaging state, moves in the image surface direction upon zooming from a wide-angle end state to a telephoto end state in each imaging state, and moves in the object direction upon focusing on from an infinity object to a short distance object in the underwater imaging state.

The third lens group G3 moves in the image surface direction upon switching from the land imaging state to the underwater imaging state, moves in the object direction upon zooming from a wide-angle end state to a telephoto end state in each imaging state, and moves in the image surface direction upon focusing on from an infinity object to a short distance object in the land imaging state.

The fourth lens group G4 moves in the object direction upon zooming from a wide-angle end state to a telephoto end state in each imaging state.

The distance between the first lens group G1 and the second lens group G2 is enlarged when switching from the land imaging state to the underwater imaging state, and is enlarged upon zooming from a wide-angle end state to a telephoto end state in each imaging state. The distance between the second lens group G2 and the third lens group G3 is enlarged when switching from the land imaging state to the underwater imaging state, and decreases upon zooming from a wide-angle end state to a telephoto end state in each imaging state. The distance between the third lens group G3 and the fourth lens group G4 decreases when switching from the land imaging state to the underwater imaging state, decreases upon zooming from a wide-angle end state to a telephoto end state in a land imaging state, and is constant upon zooming from a wide-angle end state to a telephoto end state in the underwater imaging state.

In the present example, it is possible to appropriately correct various aberrations such as curvature of image surface both in the land imaging state and the underwater imaging by changing positions of the second lens group G2 and the third lens group G3 in the land imaging state and the underwater imaging, while constantly maintaining an image-forming position both in the land imaging state and the underwater imaging state.

The following Table 10 illustrates values of each general data in Example 10. The surface numbers 1 to 23 in Table 10 correspond to each optical surfaces of m1 to m23 illustrated in FIG. 57.

TABLE 10

[Lens data]

| Surface number | R | D | nd | νd |
|---|---|---|---|---|
| Object surface | ∞ | | | |
| 1 | 44.7198 | 7.4084 | 1.516800 | 63.88 |
| 2 | 85.2163 | D2 (Variable) | | |
| 3 | 40.9646 | 1.6000 | 1.694120 | 53.35 |
| *4 | 9.2893 | 8.5100 | | |
| 5 | −185.3860 | 1.0000 | 1.773870 | 47.25 |
| *6 | 13.9269 | 4.1000 | | |
| 7 | 59.8385 | 1.0000 | 1.497820 | 82.57 |
| 8 | 14.0189 | 3.5500 | 1.834000 | 37.18 |
| 9 | 123.5879 | D9 (Variable) | | |
| 10 | 79.9753 | 1.3500 | 1.581440 | 40.98 |
| 11 | −39.3744 | D11 (Variable) | | |
| 12 | ∞ | 0.8000 | (Aperture stop S) | |
| 13 | 13.2562 | 2.0000 | 1.497820 | 82.57 |
| 14 | −15.0400 | 0.8000 | 1.744000 | 44.80 |
| 15 | 26.7221 | 1.3300 | | |
| 16 | 13.3337 | 0.8000 | 1.850260 | 32.35 |
| 17 | 10.0972 | 3.1500 | 1.516800 | 63.88 |
| 18 | −24.7694 | 4.4400 | | |
| 19 | 53.6117 | 4.0000 | 1.497820 | 82.57 |
| 20 | −10.0893 | 1.0000 | 1.773870 | 47.25 |
| *21 | −46.0788 | D21 (Variable) | | |
| 22 | ∞ | 2.7900 | 1.516800 | 64.11 |
| 23 | ∞ | Bf | | |
| Image surface | ∞ | | | |

[Aspheric surface data]

The fourth surface

κ = −1.1413
A4 = +2.64855E−04
A6 = −1.38810E−06
A8 = +1.32889E−08
A10 = −6.76083E−11

The sixth surface

κ = −4.2267
A4 = +2.73709E−04
A6 = −1.40274E−06
A8 = +1.65481E−08
A10 = −4.59585E−11

The 21st surface

κ = +0.7548
A4 = +1.41639E−04
A6 = +1.03122E−06
A8 = −6.77508E−09
A10 = +2.70786E−10

[Various data]

(Land imaging state)

| | | | |
|---|---|---|---|
| f | 7.20 | 9.20 | 13.60 |
| FNO | 3.55 | 3.85 | 4.55 |
| 2ω | 96.87 | 81.79 | 60.29 |
| Y | 8.00 | 8.00 | 8.00 |

TABLE 10-continued

| | | | |
|---|---|---|---|
| TL | 83.05 | 83.05 | 83.05 |
| D2 | 2.002 | 6.557 | 9.751 |
| D9 | 14.725 | 8.893 | 1.600 |
| D11 | 5.585 | 4.566 | 3.468 |
| D21 | 8.950 | 11.247 | 16.443 |
| Bf | 2.162 | 2.162 | 2.162 |

(Underwater imaging state)

| | | | |
|---|---|---|---|
| f | 6.10 | 7.56 | 10.93 |
| FNO | 3.54 | 3.85 | 4.54 |
| 2ω | 90.47 | 77.30 | 57.21 |
| Y | 8.00 | 8.00 | 8.00 |
| TL | 83.05 | 83.05 | 83.05 |
| D2 | 5.528 | 8.768 | 10.717 |
| D9 | 15.785 | 10.099 | 2.995 |
| D11 | 1.000 | 1.149 | 1.108 |
| D21 | 8.950 | 11.247 | 16.443 |
| Bf | 2.162 | 2.162 | 2.162 |

[Amount of movement upon focusing]

(Land imaging state)

| | | | |
|---|---|---|---|
| f | 7.20 | 9.20 | 13.60 |
| First lens group | 0.000 | 0.000 | 0.000 |
| Second lens group | 0.000 | 0.000 | 0.000 |
| Third lens group | 0.679 | 0.733 | 0.836 |
| Fourth lens group | 0.000 | 0.000 | 0.000 |

(Underwater imaging state)

| | | | |
|---|---|---|---|
| f | 6.10 | 7.56 | 10.93 |
| First lens group | 0.000 | 0.000 | 0.000 |
| Second lens group | −0.618 | −0.600 | −0.590 |
| Third lens group | 0.000 | 0.000 | 0.000 |
| Fourth lens group | 0.000 | 0.000 | 0.000 |

[Lens group data]

| Group | Front end surface | Rear end surface | Group focus length |
|---|---|---|---|
| First lens group | 1 | 2 | 171.404 |
| Second lens group | 3 | 9 | −10.875 |
| Third lens group | 10 | 11 | 45.567 |
| Fourth lens group | 13 | 21 | 22.715 |

[Position data of each lens group]

(Land imaging state)

| | | | |
|---|---|---|---|
| f | 7.20 | 9.20 | 13.60 |
| First lens group | 0.000 | 0.000 | 0.000 |
| Second lens group | 0.000 | 4.555 | 7.749 |
| Third lens group | 0.000 | −1.278 | −5.376 |
| Fourth lens group | 0.000 | −2.297 | −7.493 |

(Underwater imaging state)

| | | | |
|---|---|---|---|
| f | 6.10 | 7.56 | 10.93 |
| First lens group | 0.000 | 0.000 | 0.000 |
| Second lens group | 3.526 | 6.766 | 8.715 |
| Third lens group | 4.585 | 2.139 | −3.016 |
| Fourth lens group | 0.000 | −2.297 | −7.493 |

[Values corresponding to the conditional expressions]

Conditional expression (4) $R1/Enpw = 2.109$
Conditional expression (5) $\varphi 1/\varphi w = 0.042$
Conditional expression (6) $\Delta 2w/\Delta 3w = 0.769$
Conditional expression (7) $\varphi 2/\varphi w = -0.662$
Conditional expression (8) $\varphi 3/\varphi 4 = 0.498$
$R1 = 44.720$
$Enpw = 21.203$
$\varphi 1 = 0.0058$
$\varphi w = 0.139$
$\Delta 2w = 3.526$
$\Delta 3w = 4.585$
$\varphi 2 = -0.092$
$\varphi 3 = 0.0219$
$\varphi 4 = 0.0440$ Based on Table 10, in the amphibious zoom lens ZL10 according to the present example, the conditional expressions (4) to (8) are satisfied.

Figure 58A:
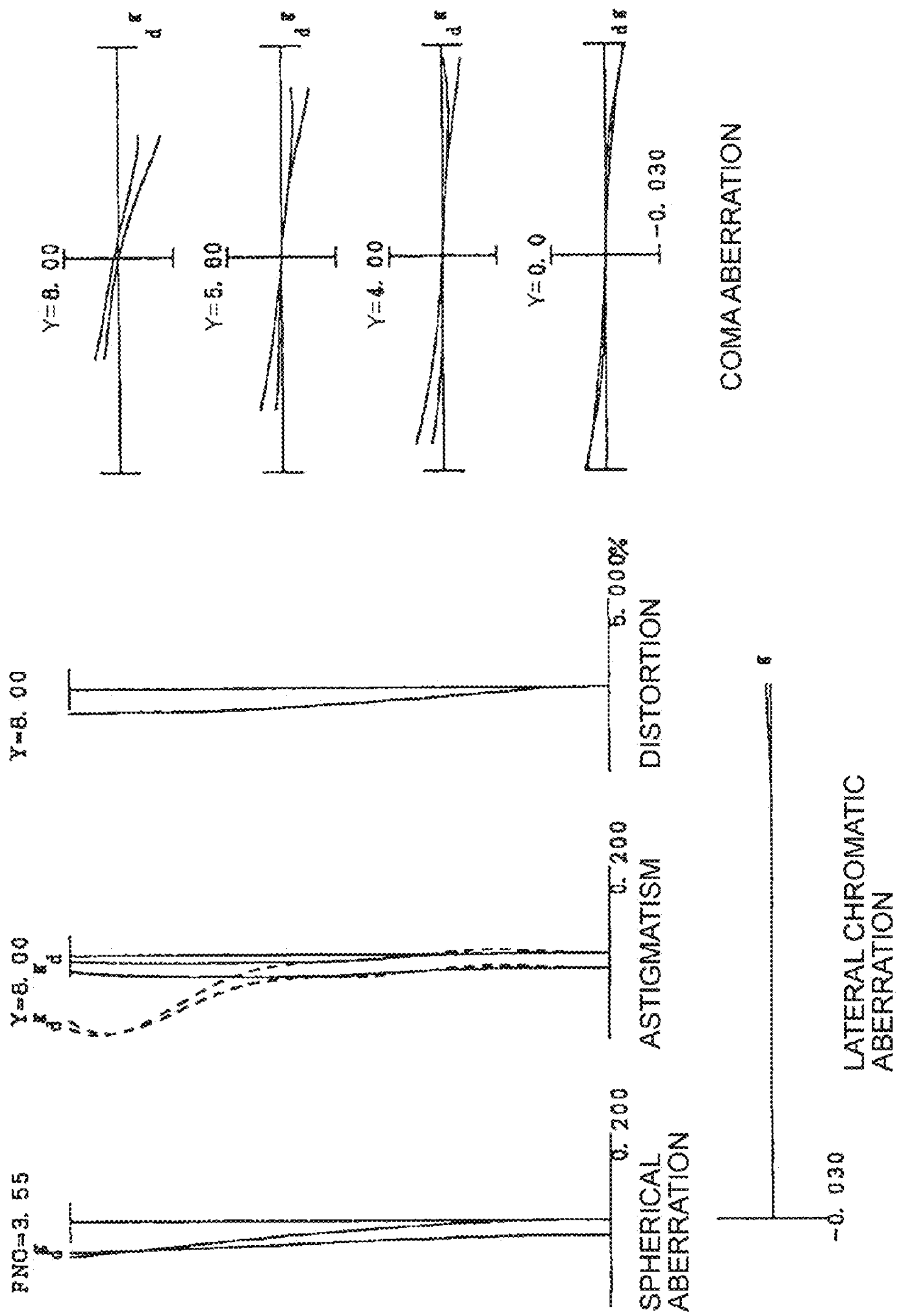
FIGS. 58A, 58B and 58C illustrate a graph showing aberrations in an infinity focusing state in a land imaging state of the amphibious zoom lens according to Example 10, where
Figure 58B:
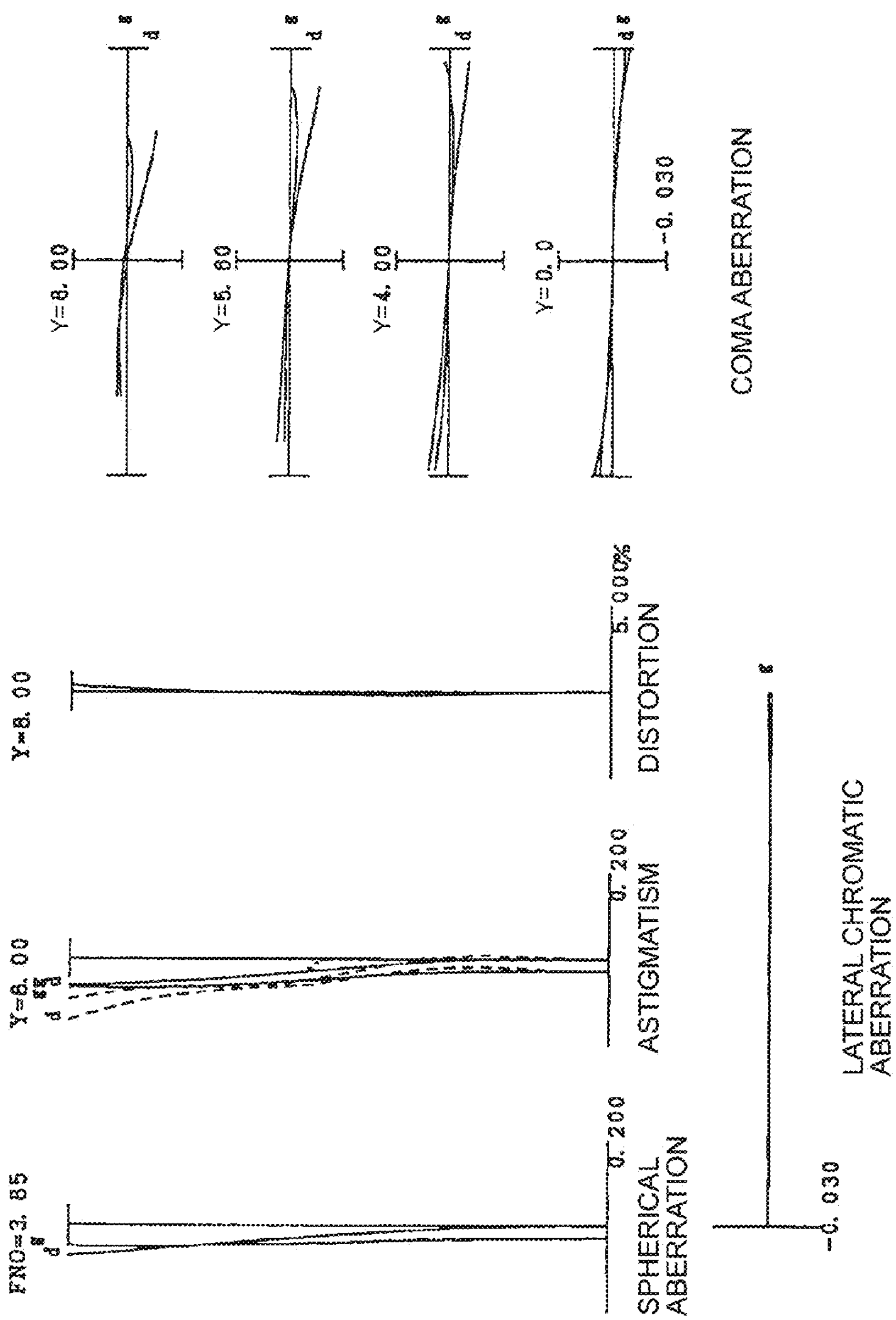
Figure 58C:
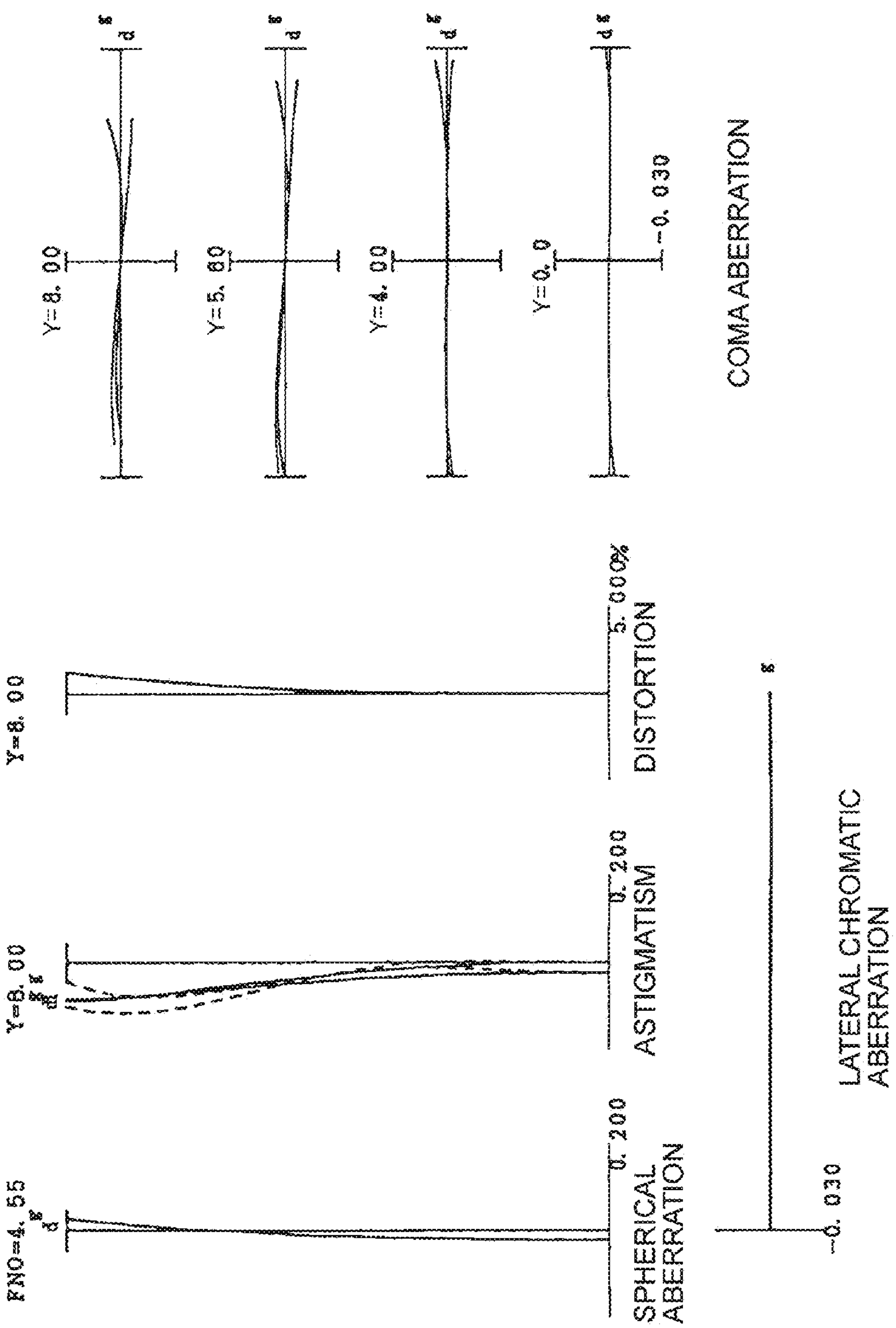
Figure 59A:
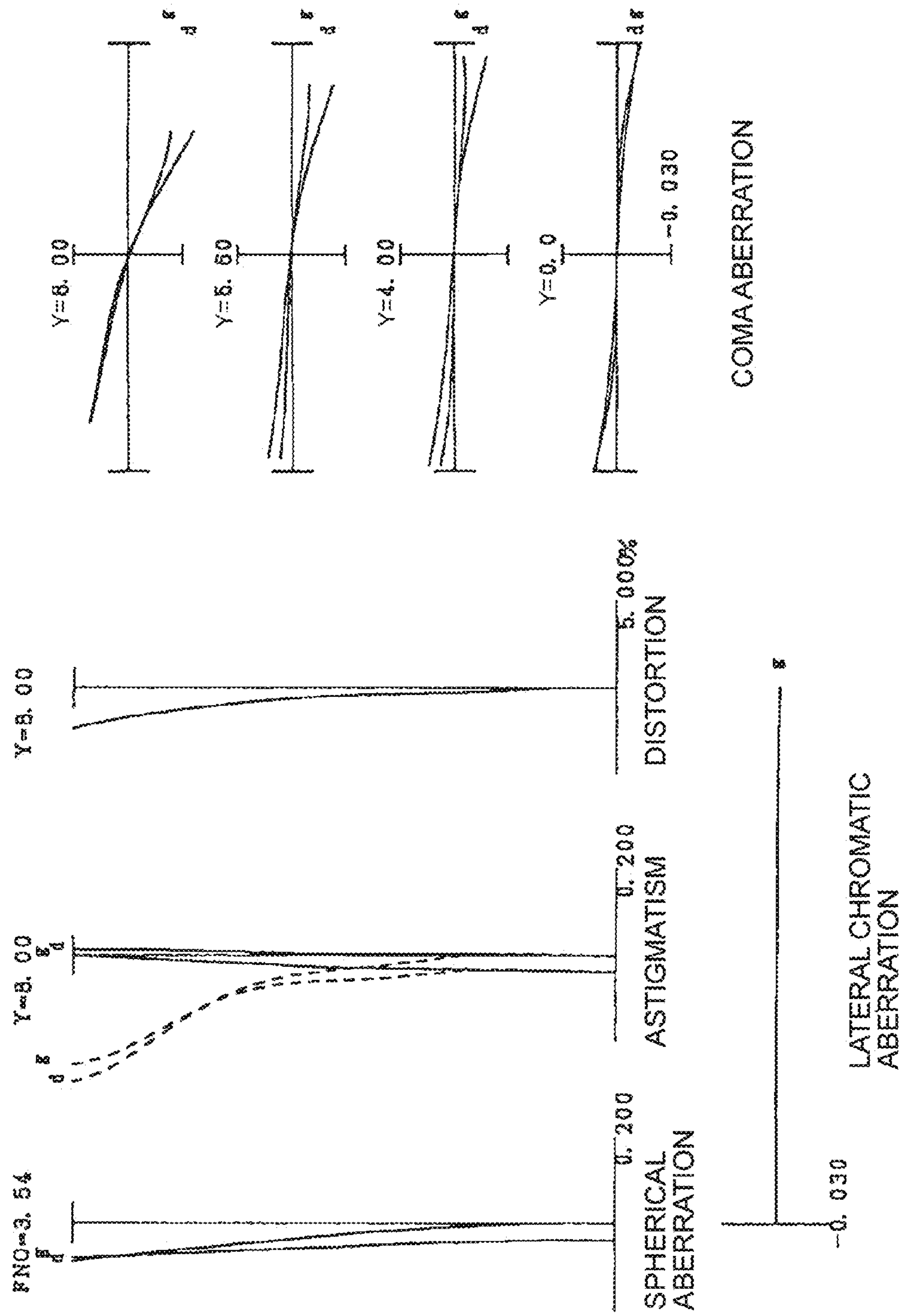
FIGS. 59A, 59B and 59C illustrate a graph showing aberrations in an infinity focusing state in an underwater imaging state of the amphibious zoom lens according to Example 10, where
Figure 59B:
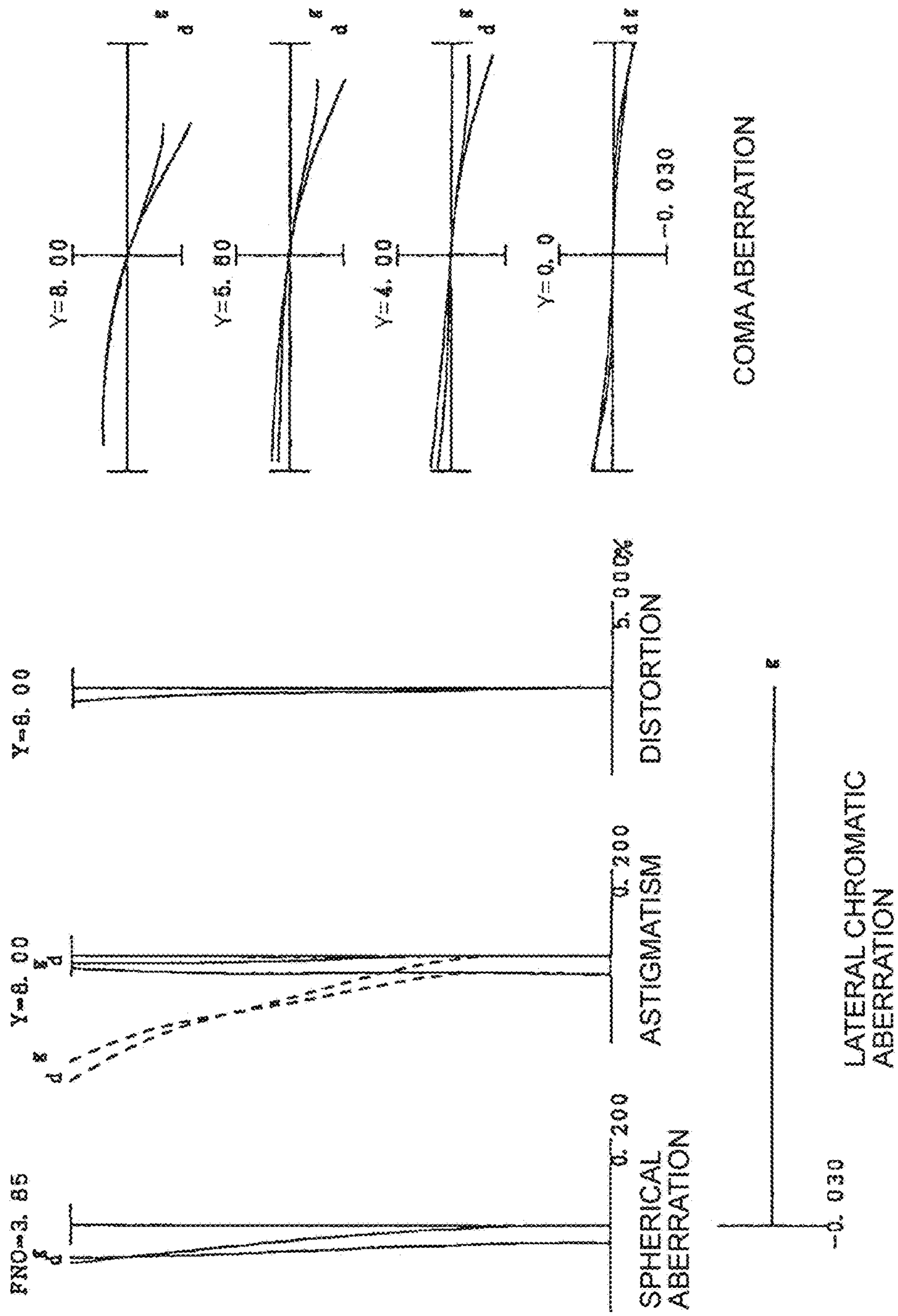
Figure 59C:
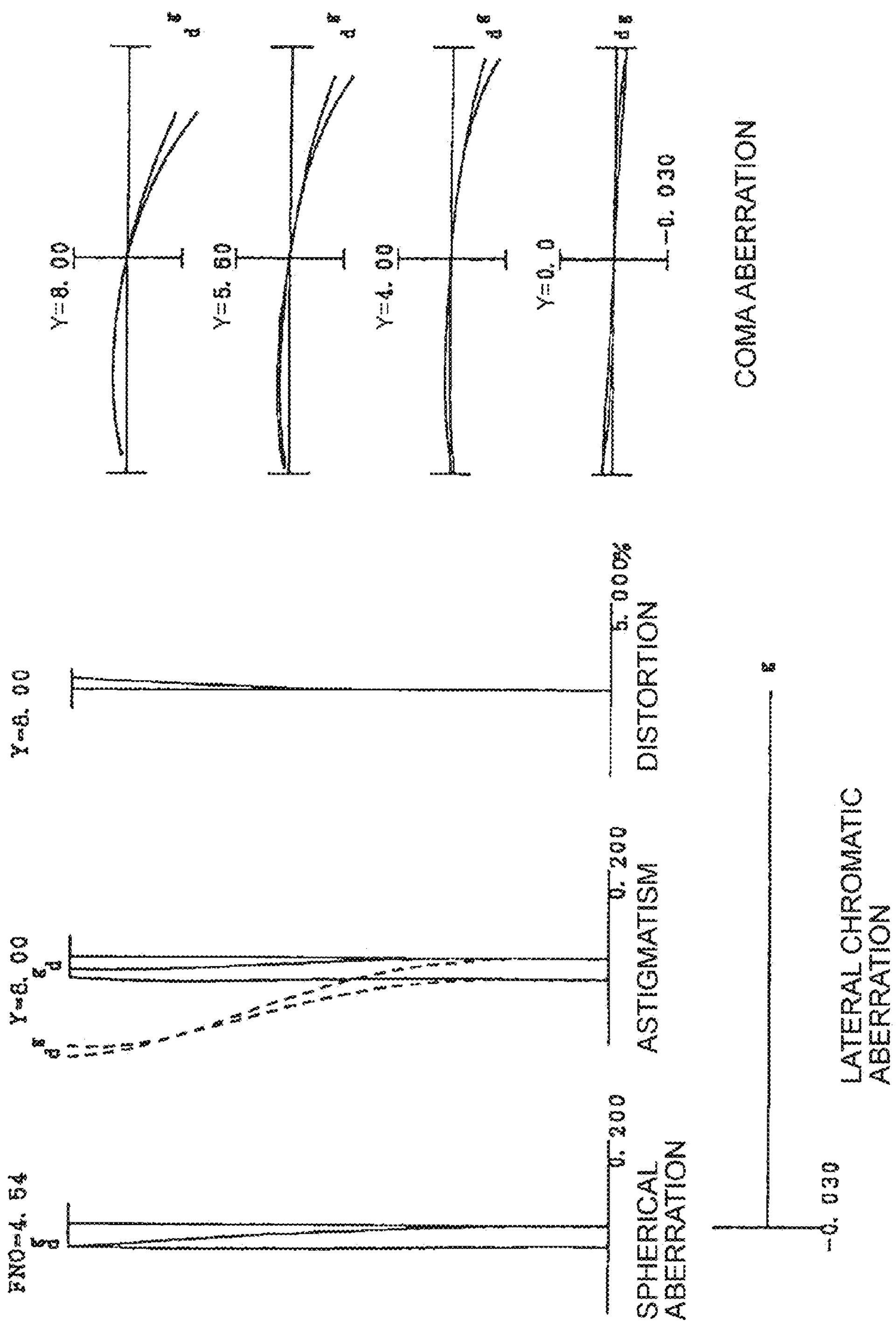
Figure 60A:
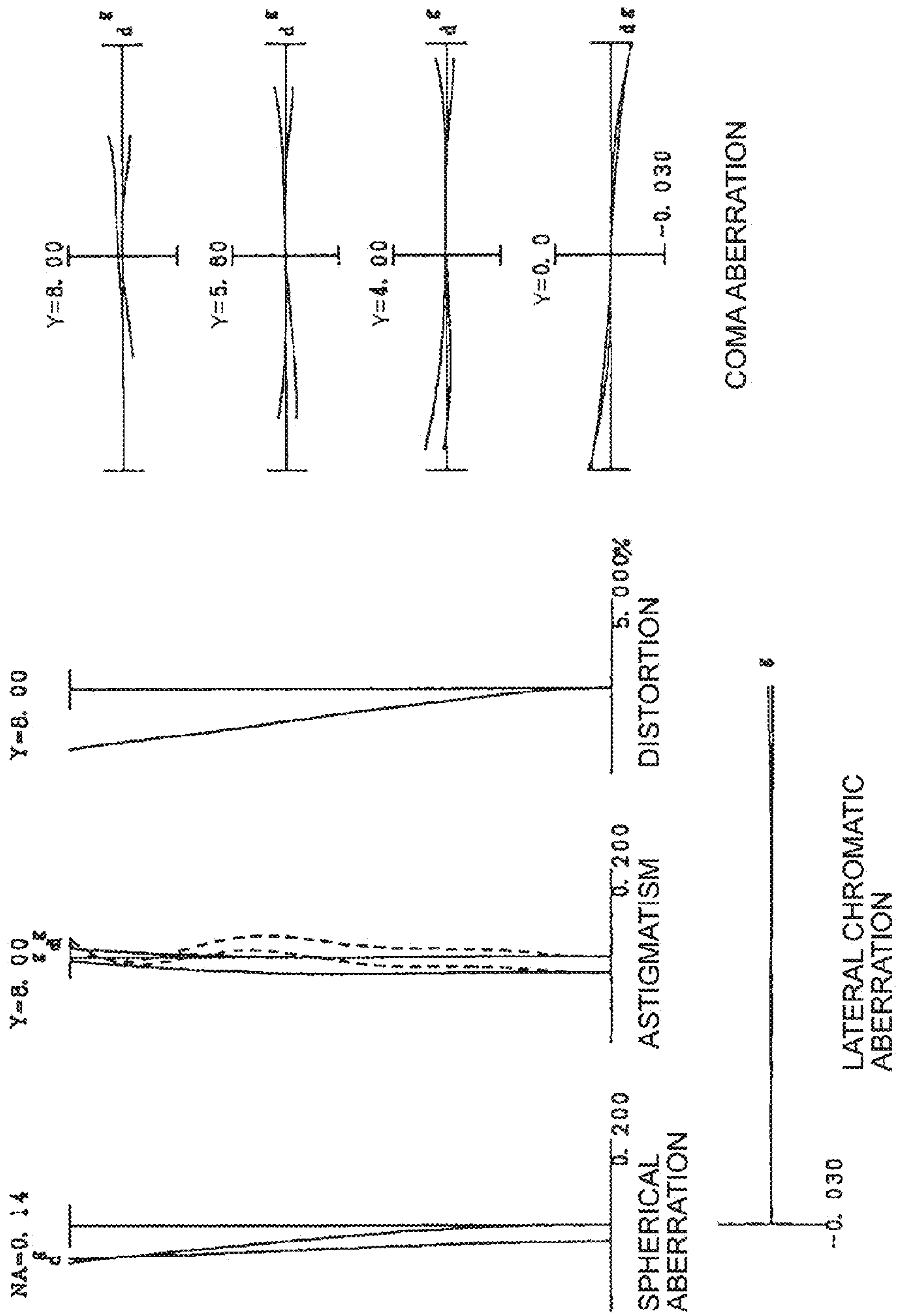
FIGS. 60A, 60B and 60C illustrate a graph showing aberrations in a short distance focusing state of 300 mm of distance between object images in the land imaging state of the amphibious zoom lens according to Example 10, where
Figure 60B:
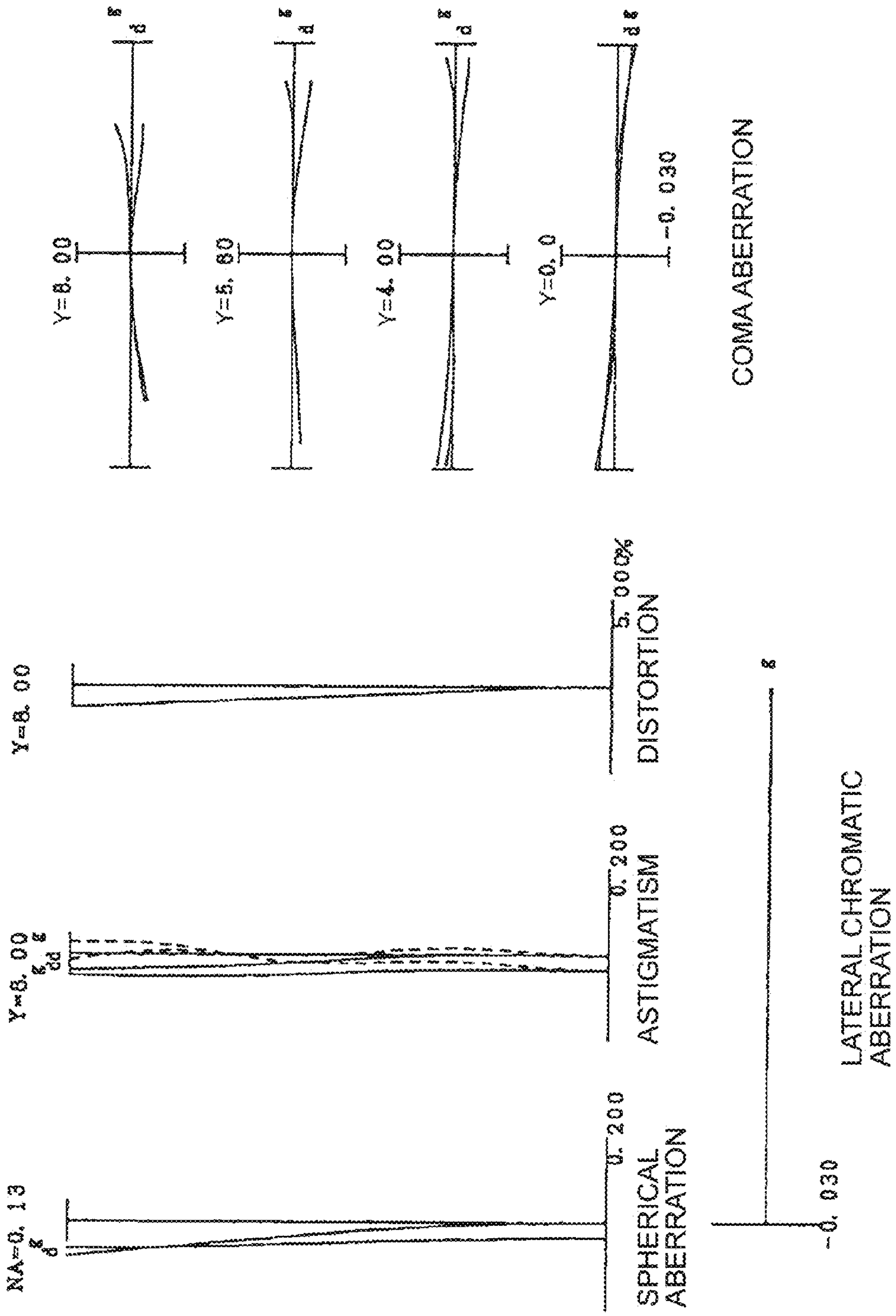
Figure 60C:
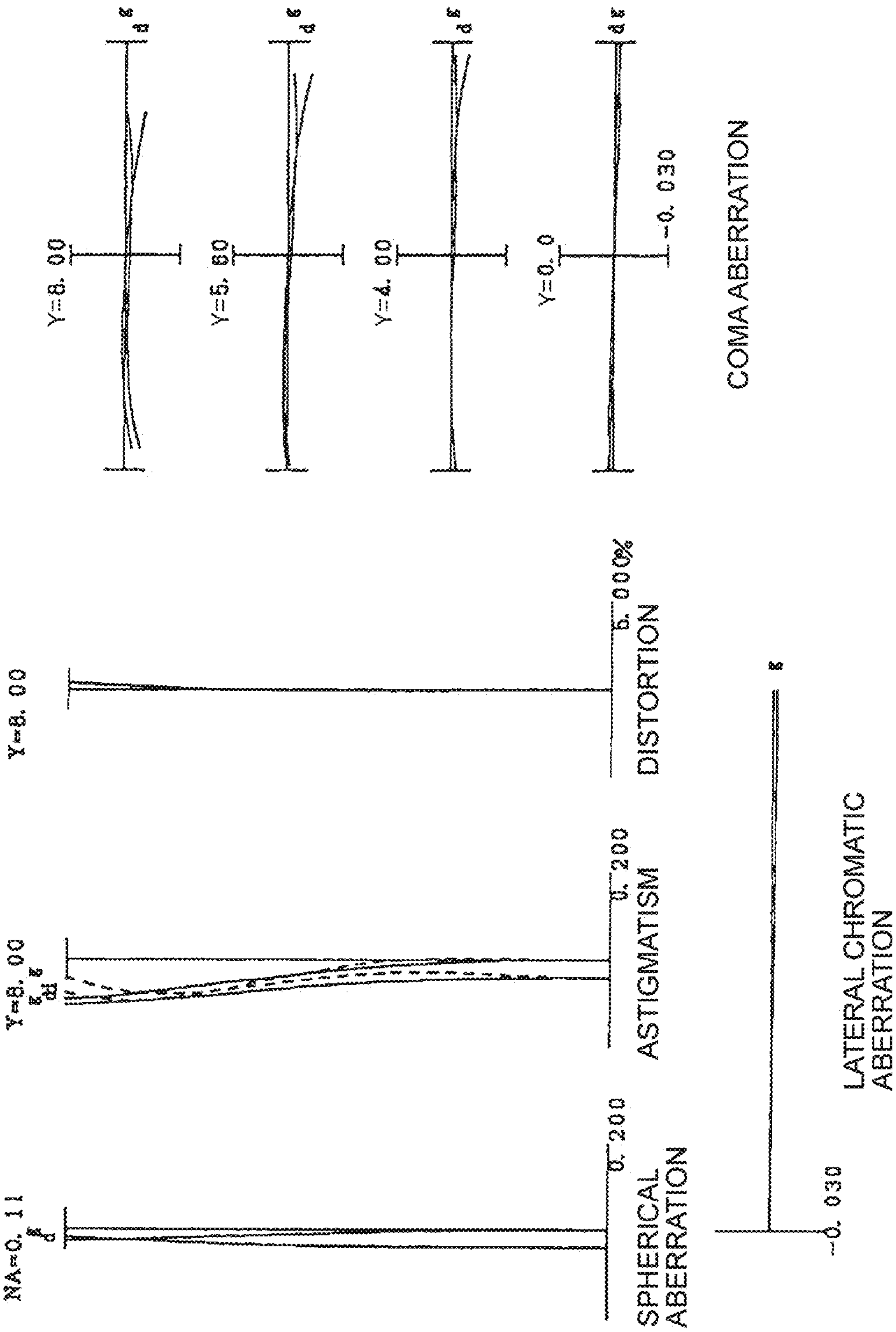
Figure 61A:
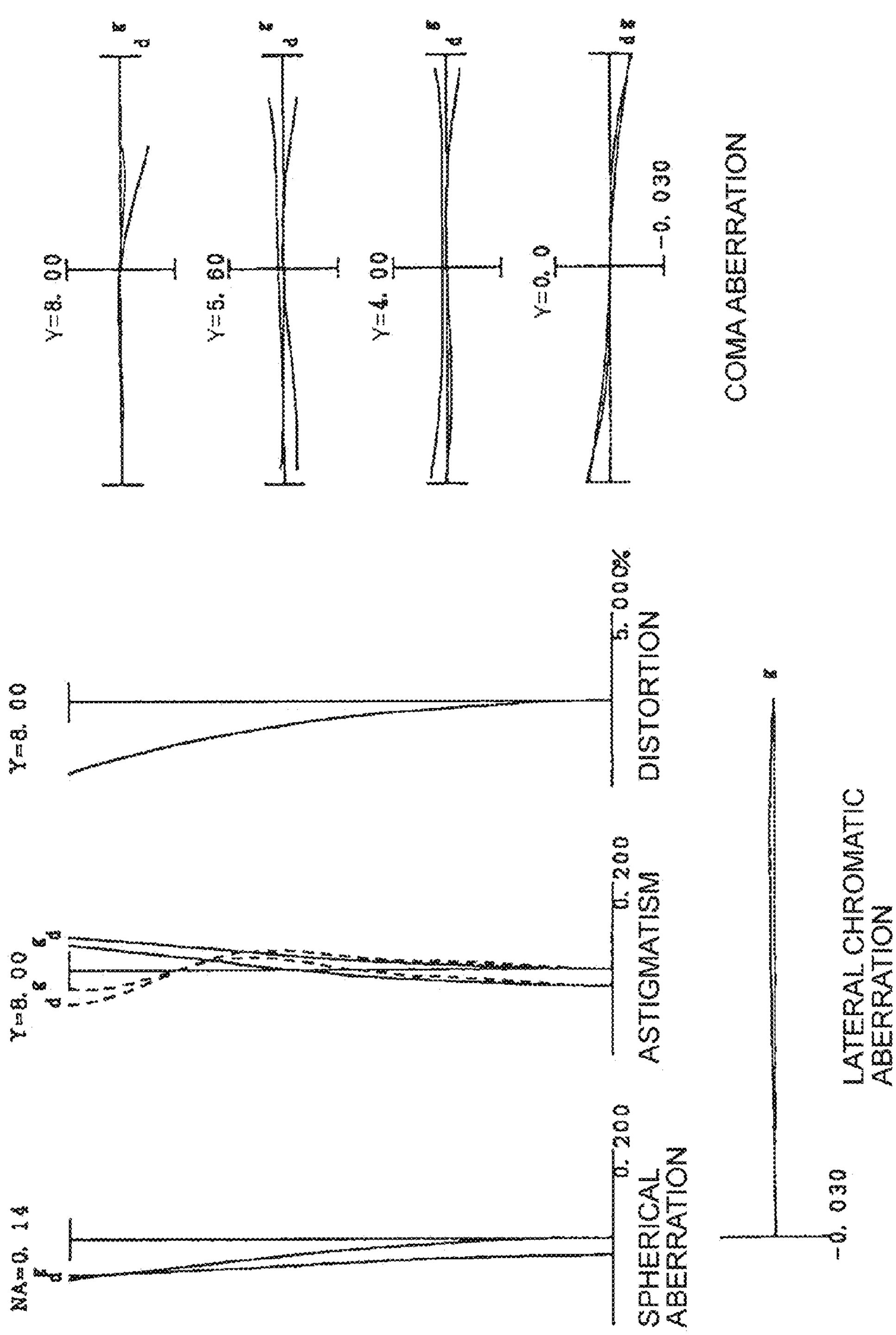
FIGS. 61A, 61B and 61C illustrate a graph showing aberrations in a short distance focusing state of 300 mm of distance between object images in the underwater imaging state of the amphibious zoom lens according to Example 10, where
Figure 61B:
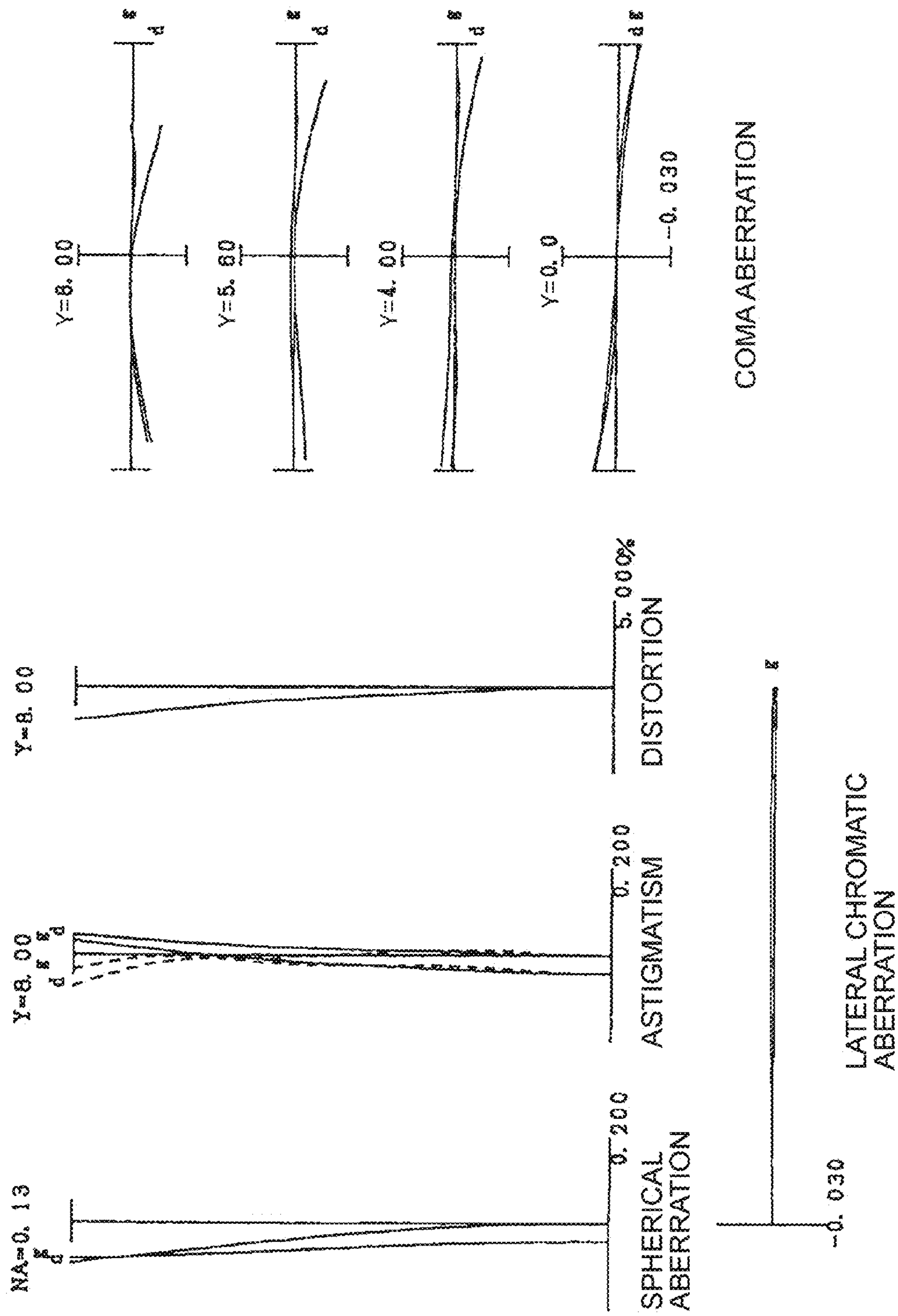
Figure 61C:
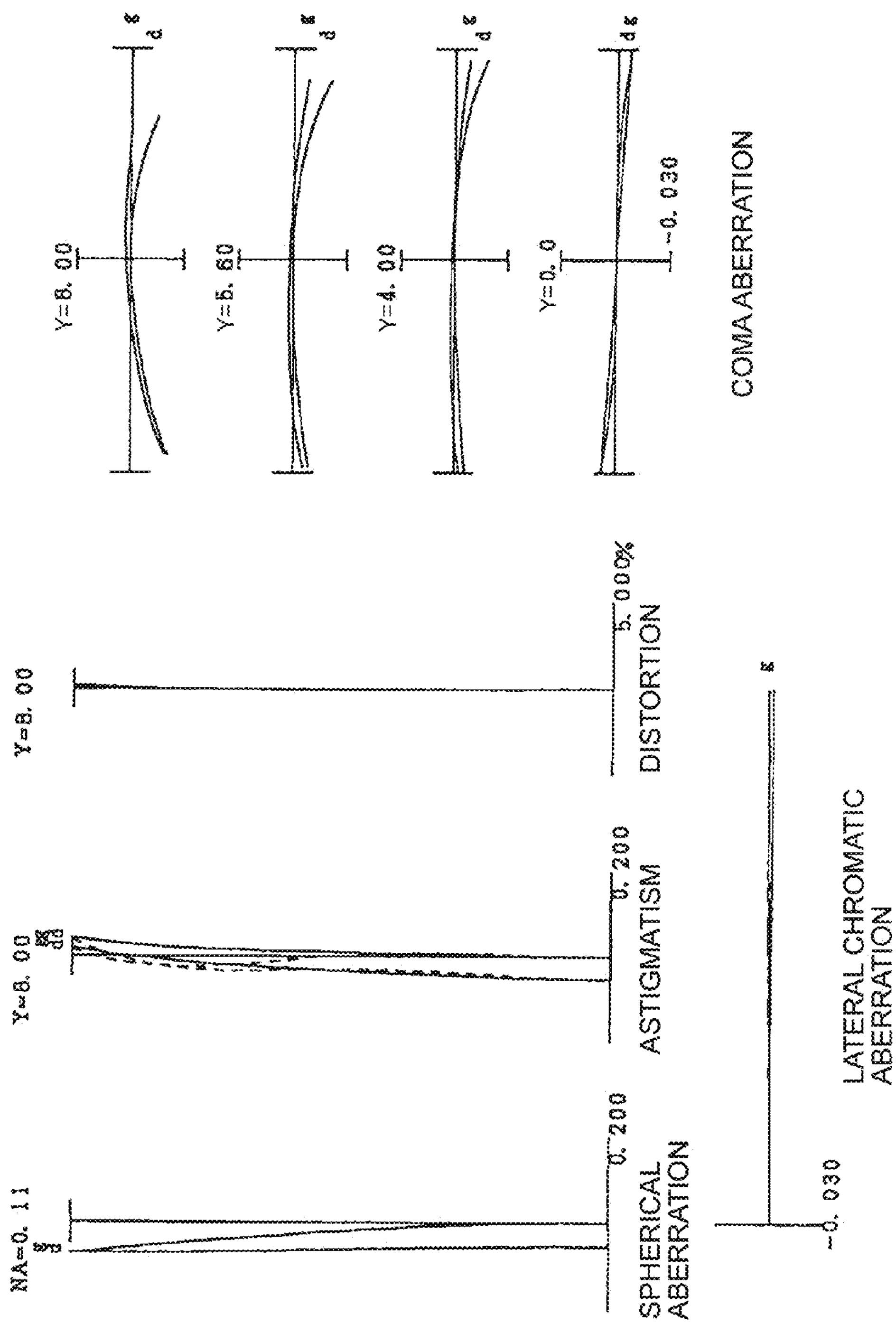

FIGS. 58A, 58B and 58C illustrate a graph showing aberrations in an infinity focusing state in a land imaging state base on design values of the amphibious zoom lens according to Example 10, where FIG. 58A depicts a wide-angle end state, FIG. 58B depicts an intermediate focal length state, and FIG. 58C depicts a telephoto end state. FIGS. 59A, 59B and 59C illustrate a graph showing aberrations in an infinity focusing state in an underwater imaging state base on design values of the amphibious zoom lens according to Example 10, where FIG. 59A depicts the wide-angle end state, FIG. 59B depicts the intermediate focal length state, and FIG. 59C depicts the telephoto end state. FIGS. 60A, 60B and 60C illustrate a graph showing aberrations in a short distance focusing state of 300 mm of distance between object images in the land imaging state base on design values of the amphibious zoom lens according to Example 10, where FIG. 60A depicts the wide-angle end state, FIG. 60B depicts the intermediate focal length state, and FIG. 60C depicts the telephoto end state. FIGS. 61A, 61B and 61C illustrate a graph showing aberrations in a short distance focusing state of 300 mm of distance between object images in the underwater imaging state base on design values of the amphibious zoom lens according to Example 10, where FIG. 61A depicts the wide-angle end state, FIG. 61B depicts the intermediate focal length state, and FIG. 61C depicts the telephoto end state.

In each graph showing aberrations, FNO means a f number and Y means an image height. Moreover, d means an aberration of d-line, and g means an aberration of g-line. Moreover, what are described without those mean aberrations of d-line. In a graph showing astigmatism, a solid-line shows a sagittal image surface, and a dashed-line shows a meridional image surface.

The descriptions mentioned above can also be applied to other examples mentioned below.

Based on each graph showing aberrations, regarding the amphibious zoom lens ZL10 according to Example 10, it is possible to appropriately correct aberrations such as distortion and curvature of image surface, etc. covering a whole zooming range from the infinity focusing state to the short distance focusing state both in the land imaging state and the underwater imaging state, and obtain high image-forming performance.

Note that in amphibious zoom lens ZL10 according to Example 10, the second lens group G2 and the third lens group G3 are needed to move with different moving loci in the land imaging state and the underwater imaging state upon zooming from a wide-angle end state to a telephoto end state, and also move upon focusing in the land imaging state or the underwater imaging state. Therefore, it is appreciated that the second lens group G2 and the third lens group G3 has a structure to be hang by a guide axis movable straight, and has a structure independently movable by drive means such as a stepping motor, etc. Or, it is appreciated that the third lens group G3 has a structure mutually movable against the fourth lens group G4.

EXAMPLE 11

Example 11 is described with reference to FIG. 62 to FIGS. 66A, 66B and 66C, and Table 11. Note that in FIG. 62, a solid-line shows a moving locus in the land imaging state, and a dotted-line shows a moving locus in the underwater imaging state of the second lens group G2 and the third lens group G3.

Figure 62:
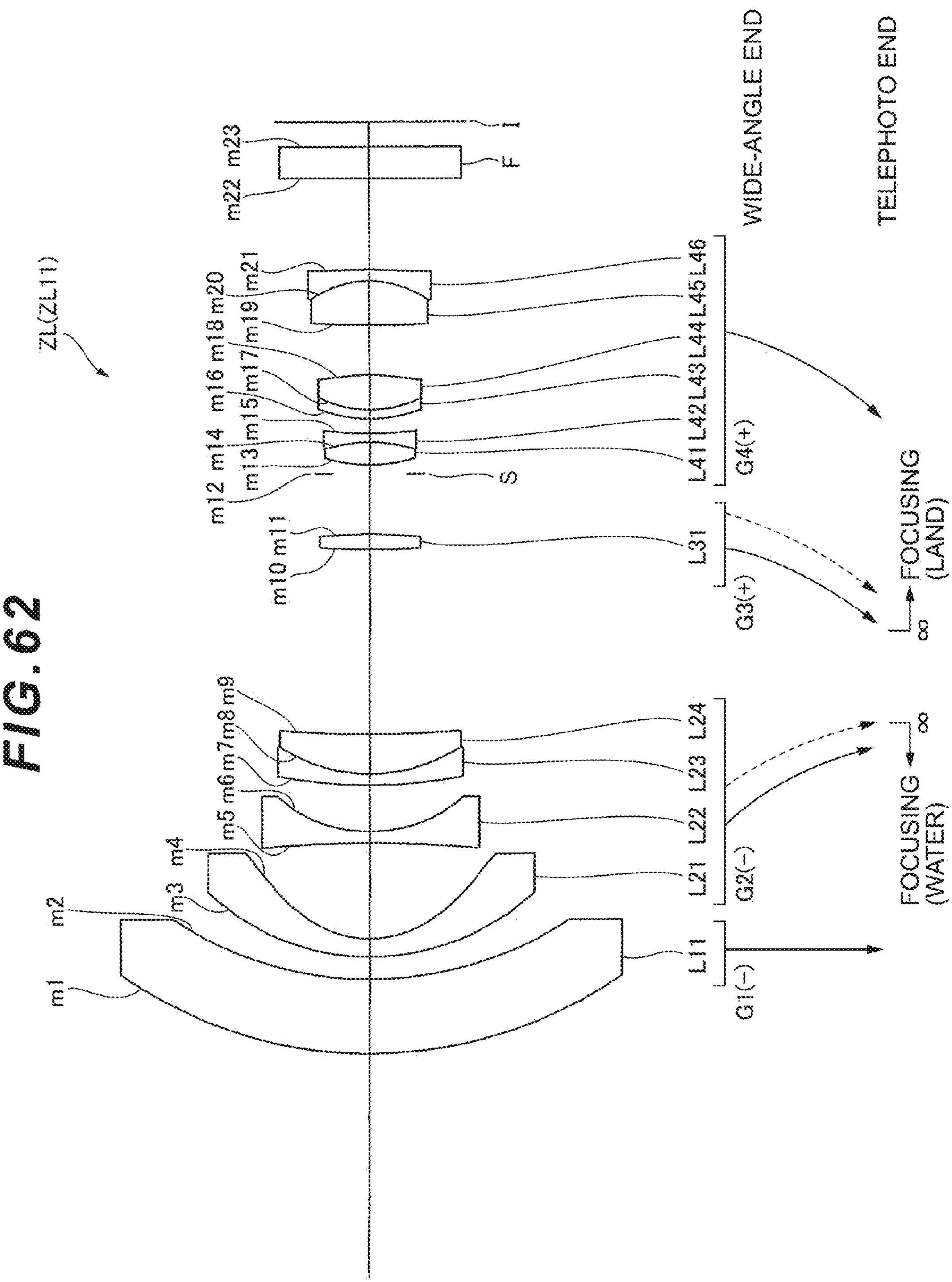
FIG. 62 illustrates a sectional view showing the configuration of the amphibious zoom lens according to Example 11, and a diagram showing a moving locus (arrow) of each group from a wide-angle end state to a telephoto end state.

The amphibious zoom lens ZL (ZL11) according to Example 11 is composed of, as shown in FIG. 62, in order from an object, a first lens group G1 having negative refractive power, a second lens group G2 having negative refractive power, a third lens group G3 having positive refractive power, and a fourth lens group G4 having positive refractive power.

The first lens group G1 is composed of a negative meniscus lens L11 having a convex surface facing the object.

The second lens group G2 is composed of, in order from the object, a negative meniscus lens L21 having a concave surface facing the image surface, a biconcave negative lens L22, and a cemented positive lens composed of a negative meniscus lens L23 having a concave surface facing the image and a positive meniscus lens L24 having a convex surface facing the object. Note that the image side surface of the negative meniscus lens L21 is an aspherical surface. Moreover, the image side surface of the biconcave negative lens L22 is an aspherical surface.

The third lens group G3 is composed of a biconvex positive lens L31.

The fourth lens group G4 is composed of, in order from the object, a cemented negative lens composed of a biconvex positive lens L41 and a biconcave negative lens L42, a cemented positive lens composed of a negative meniscus lens L43 having a concave surface facing an image and a biconvex positive lens L44, and a cemented negative lens composed of a biconvex positive lens L45 and a negative meniscus lens L46 having a concave surface facing the object. The image side surface of the negative meniscus lens L46 is an aspherical surface.

An iris stopper S is disposed close to the object of the fourth lens group G4.

A filter group F is disposed on the image side of the fourth lens group G4. The filter group F is composed of a low-pass filter for cutting a spatial frequency more than a marginal dissector of image sensors such as a CCD and CMOS disposed on the image surface I, a cover-glass of an image sensor, etc.

The image surface I is formed on the image sensor which is composed of unillustrated CCDs, CMOSs, etc.

In the amphibious zoom lens ZL11 configured above, the first lens group G1 is always fixed against the image surface I on the axis optical direction, upon switching from the land imaging state to the underwater imaging state, upon zooming from the wide-angle end state to the telephoto end state in each imaging state, and upon focusing on from an infinity object to a short distance object in each imaging state.

The second lens group G2 moves in the image surface direction upon switching from the land imaging state to the underwater imaging state, moves in the image surface direction upon zooming from a wide-angle end state to a telephoto end state in each imaging state, and moves in the object direction upon focusing on from an infinity object to a short distance object in the underwater imaging state.

The third lens group G3 moves in the image surface direction upon switching from the land imaging state to the underwater imaging state, moves in the object direction upon zooming from a wide-angle end state to a telephoto end state in each imaging state, and moves in the image surface direction upon focusing on from an infinity object to a short distance object in the land imaging state.

The fourth lens group G4 moves in the object direction upon zooming from a wide-angle end state to a telephoto end state in each imaging state.

The distance between the first lens group G1 and the second lens group G2 is enlarged when switching from the land imaging state to the underwater imaging state, and is enlarged upon zooming from a wide-angle end state to a telephoto end state in each imaging state. The distance between the second lens group G2 and the third lens group G3 is enlarged when switching from the land imaging state to the underwater imaging state, and decreases upon zooming from a wide-angle end state to a telephoto end state in each imaging state. The distance between the third lens group G3 and the fourth lens group G4 decreases when switching from the land imaging state to the underwater imaging state, decreases upon zooming from a wide-angle end state to a telephoto end state in a land imaging state, and is constant upon zooming from a wide-angle end state to a telephoto end state in the underwater imaging state.

In the present example, it is possible to appropriately correct various aberrations such as curvature of image surface both in the land imaging state and the underwater imaging by changing positions of the second lens group G2 and the third lens group G3 in the land imaging state and the underwater imaging, while constantly maintaining an image-forming position both in the land imaging state and the underwater imaging state.

The following Table 11 illustrates values of each general data in Example 11. The surface numbers 1 to 23 in Table 11 correspond to each optical surfaces of m1 to m23 illustrated in FIG. 62.

TABLE 11

[Lens data]

| Surface number | R | D | nd | νd |
|---|---|---|---|---|
| Object surface | ∞ | | | |
| 1 | 39.4129 | 6.5983 | 1.516800 | 63.88 |
| 2 | 32.2463 | D2 (Variable) | | |
| 3 | 21.3416 | 1.6000 | 1.694120 | 53.35 |
| *4 | 9.1366 | 8.5100 | | |
| 5 | −101.6596 | 1.0000 | 1.773870 | 47.25 |
| *6 | 13.7116 | 4.1000 | | |
| 7 | 42.4699 | 1.0000 | 1.497820 | 82.57 |
| 8 | 14.6837 | 3.5500 | 1.834000 | 37.18 |
| 9 | 108.9141 | D9 (Variable) | | |
| 10 | 72.2919 | 1.3500 | 1.581440 | 40.98 |
| 11 | −43.0390 | D11 (Variable) | | |
| 12 | ∞ | 0.8000 | (Aperture stop S) | |
| 13 | 14.4857 | 2.0000 | 1.497820 | 82.57 |
| 14 | −14.0908 | 0.8000 | 1.744000 | 44.80 |
| 15 | 33.6293 | 1.3300 | | |
| 16 | 12.9152 | 0.8000 | 1.850260 | 32.35 |
| 17 | 10.0596 | 3.1500 | 1.516800 | 63.88 |
| 18 | −23.5021 | 4.4400 | | |
| 19 | 78.9820 | 4.0000 | 1.497820 | 82.57 |
| 20 | −8.9039 | 1.0000 | 1.773870 | 47.25 |
| *21 | −50.0522 | D21 (Variable) | | |
| 22 | ∞ | 2.7900 | 1.516800 | 64.11 |
| 23 | ∞ | Bf | | |
| Image surface | ∞ | | | |

[Aspheric surface data]

The fourth surface

κ = −1.1413
A4 = +2.71136E−04
A6 = −1.43827E−06

TABLE 11-continued

A8 = +1.29997E−08
A10 = −7.11747E−11

The sixth surface

κ = −4.2267
A4 = +2.90451E−04
A6 = −1.49834E−06
A8 = +1.79993E−08
A10 = −6.44088E−11

The 21st surface

κ = +0.7548
A4 = +1.63105E−04
A6 = +9.56800E−07
A8 = +5.91250E−09
A10 = +3.58088E−11

[Various data]

(Land imaging state)

| | | | |
|---|---|---|---|
| f | 7.20 | 9.20 | 13.60 |
| FNO | 3.55 | 3.93 | 4.76 |
| 2ω | 96.99 | 81.30 | 60.09 |
| Y | 8.00 | 8.00 | 8.00 |
| TL | 83.07 | 83.07 | 83.07 |
| D2 | 2.003 | 6.774 | 9.923 |
| D9 | 16.478 | 9.353 | 1.600 |
| D11 | 5.416 | 5.079 | 4.001 |
| D21 | 8.177 | 10.868 | 16.551 |
| Bf | 2.178 | 2.178 | 2.178 |

(Underwater imaging state)

| | | | |
|---|---|---|---|
| f | 5.82 | 7.33 | 10.77 |
| FNO | 3.55 | 3.93 | 4.75 |
| 2ω | 92.95 | 78.21 | 57.48 |
| Y | 8.00 | 8.00 | 8.00 |
| TL | 83.07 | 83.07 | 83.07 |
| D2 | 5.205 | 9.229 | 11.137 |
| D9 | 17.690 | 10.673 | 3.116 |
| D11 | 1.003 | 1.305 | 1.271 |
| D21 | 8.177 | 10.868 | 16.551 |
| Bf | 2.178 | 2.178 | 2.178 |

[Amount of movement upon focusing]

(Land imaging state)

| | | | |
|---|---|---|---|
| f | 7.20 | 9.20 | 13.60 |
| First lens group | 0.000 | 0.000 | 0.000 |
| Second lens group | 0.000 | 0.000 | 0.000 |
| Third lens group | 0.736 | 0.740 | 0.806 |
| Fourth lens group | 0.000 | 0.000 | 0.000 |

(Underwater imaging state)

| | | | |
|---|---|---|---|
| f | 5.82 | 7.33 | 10.77 |
| First lens group | 0.000 | 0.000 | 0.000 |
| Second lens group | −0.634 | −0.580 | −0.557 |
| Third lens group | 0.000 | 0.000 | 0.000 |
| Fourth lens group | 0.000 | 0.000 | 0.000 |

[Lens group data]

| Group | Front end surface | Rear end surface | Group focus length |
|---|---|---|---|
| First lens group | 1 | 2 | −499.997 |
| Second lens group | 3 | 9 | −13.044 |
| Third lens group | 10 | 11 | 46.599 |
| Fourth lens group | 13 | 21 | 22.986 |

[Position data of each lens group]

(Land imaging state)

| | | | |
|---|---|---|---|
| f | 7.20 | 9.20 | 13.60 |
| First lens group | 0.000 | 0.000 | 0.000 |
| Second lens group | 0.000 | 4.771 | 7.920 |
| Third lens group | 0.000 | −2.354 | −6.959 |
| Fourth lens group | 0.000 | −2.691 | −8.374 |

TABLE 11-continued

| (Underwater imaging state) | | | |
|---|---|---|---|
| f | 5.82 | 7.33 | 10.77 |
| First lens group | 0.000 | 0.000 | 0.000 |
| Second lens group | 3.202 | 7.226 | 9.134 |
| Third lens group | 4.414 | 1.421 | −4.228 |
| Fourth lens group | 0.000 | −2.691 | −8.374 |

[Values corresponding to the conditional expressions]

Conditional expression (4) R1/Enpw = 1.861
Conditional expression (5) φ1/φw = −0.014
Conditional expression (6) φ2/φw = −0.552
Conditional expression (7) φ3/φ4 = 0.494
Conditional expression (8) Δ2w/Δ3w = 0.725
R1 = 39.413
Enpw = 21.183
φ1 = −0.0020
φw = 0.139
φ2 = −0.0767
φ3 = 0.0215
φ4 = 0.0435
Δ2w = 3.202
Δ3w = 4.414

Based on Table 11, the amphibious zoom lens ZL11 according to the present example, the conditional expressions (4) to (8) are satisfied.

Figure 63A:
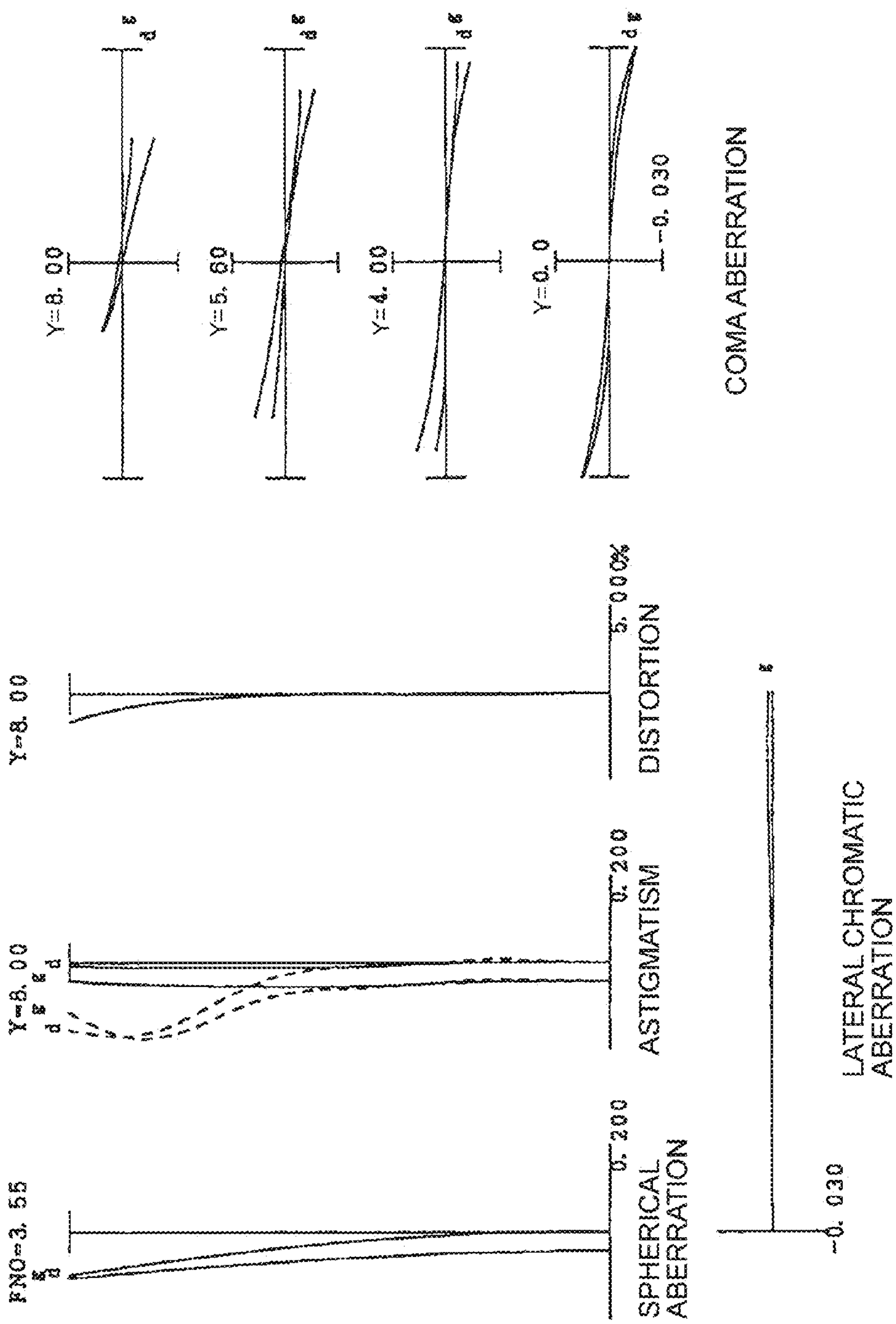
FIGS. 63A, 63B and 63C illustrate a graph showing aberrations in an infinity focusing state in the land imaging state of the amphibious zoom lens according to Example 11, where
Figure 63B:
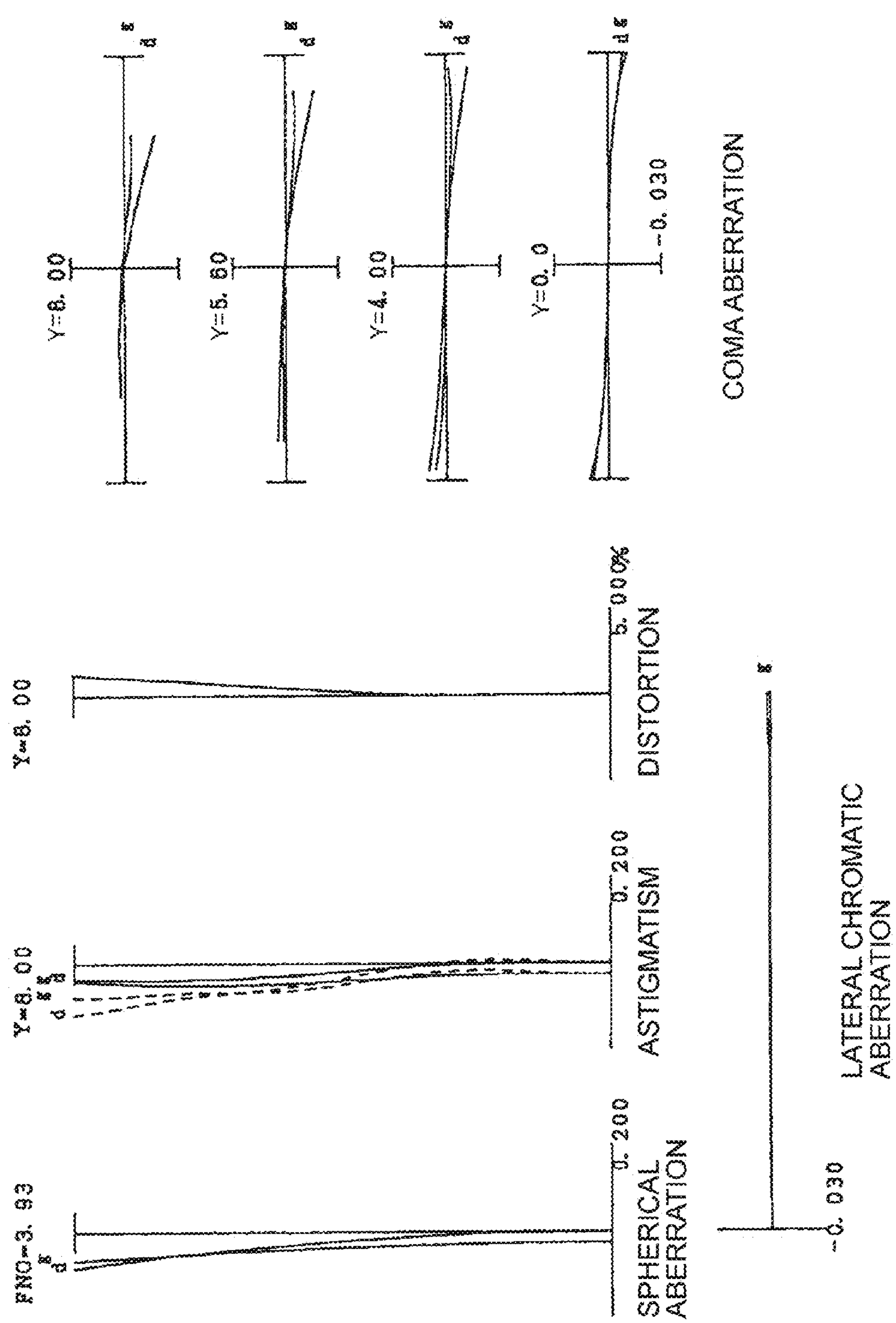
Figure 63C:
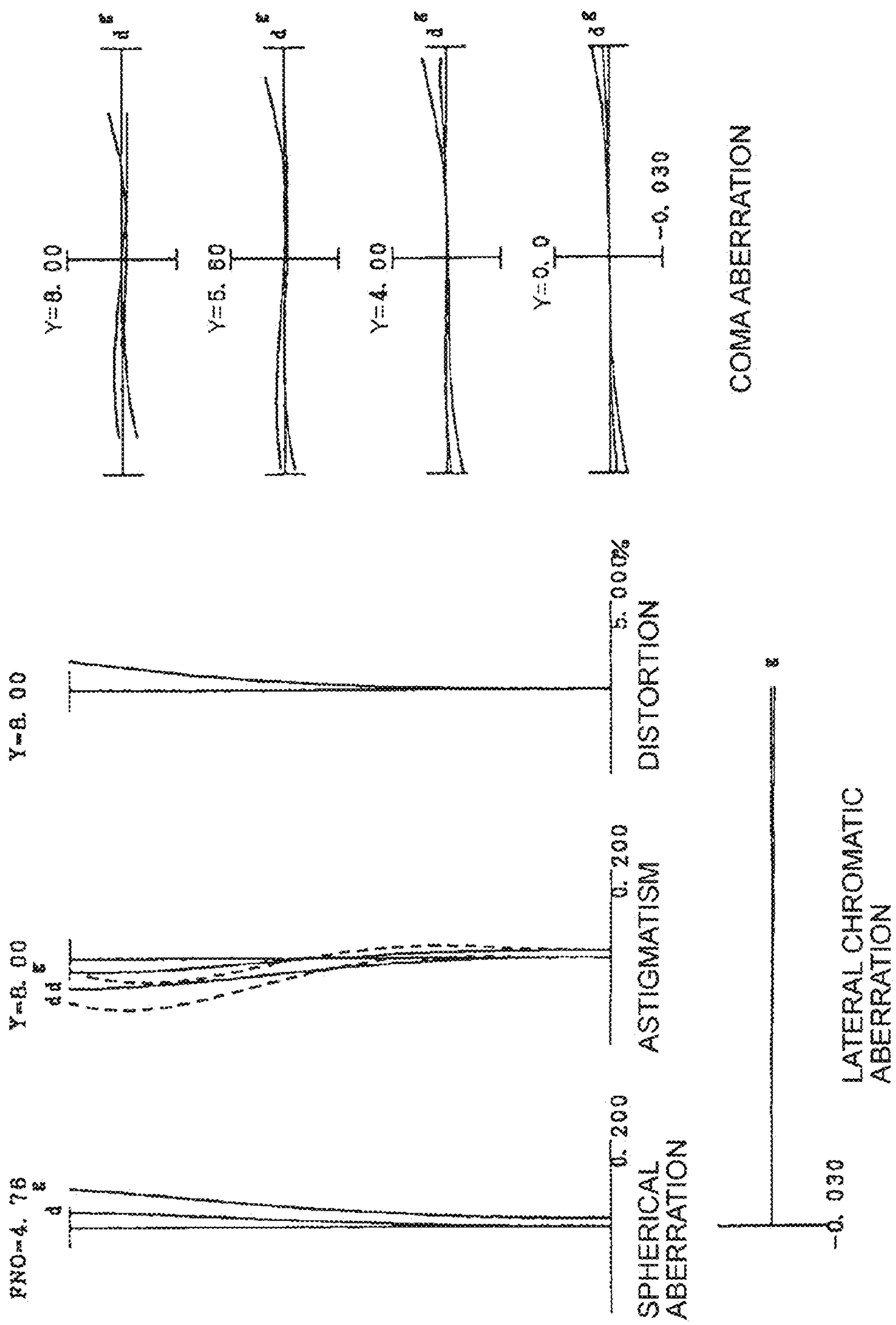
Figure 64A:
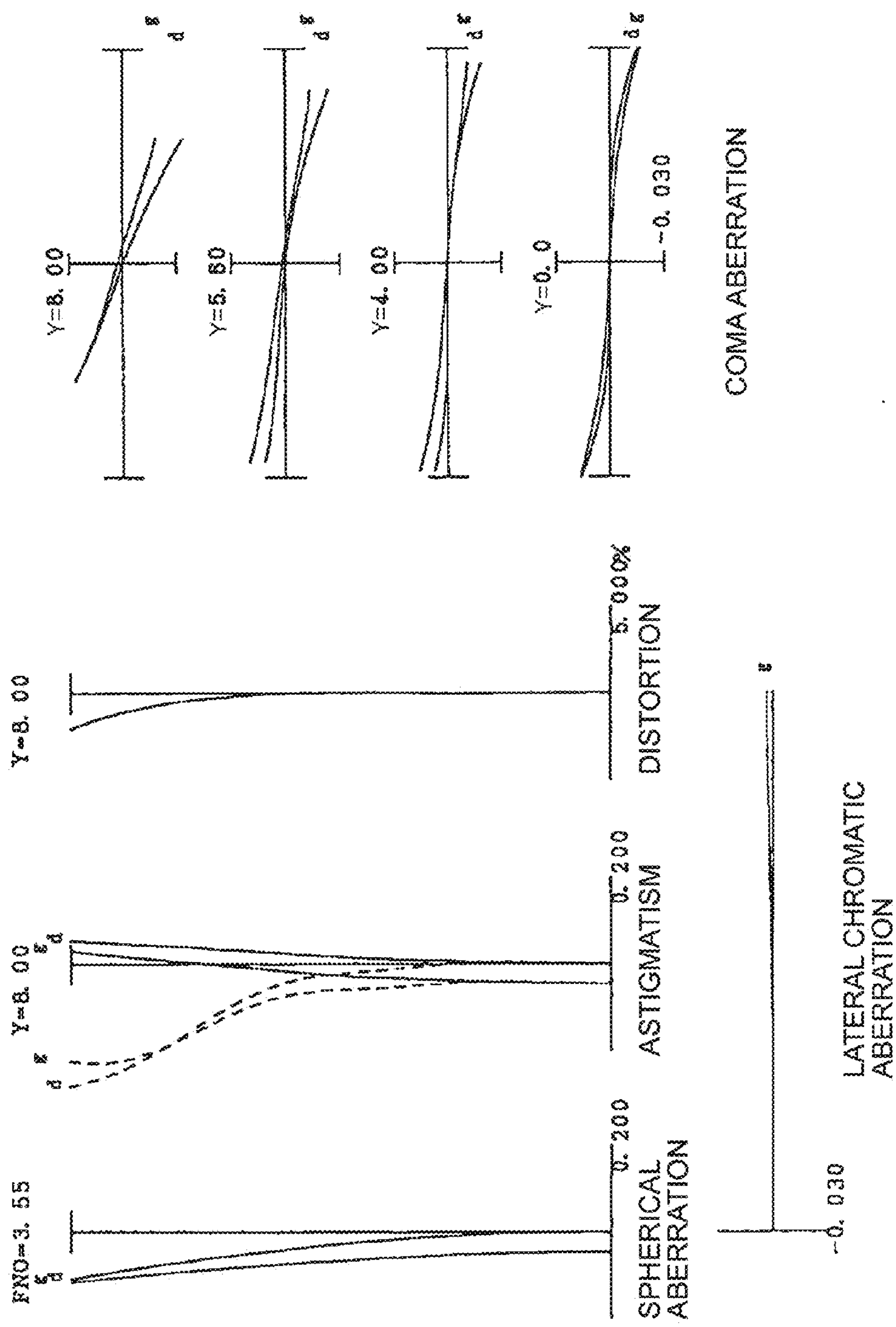
FIGS. 64A, 64B and 64C illustrate a graph showing aberrations in an infinity focusing state in the underwater imaging state of the amphibious zoom lens according to Example 11, where
Figure 64B:
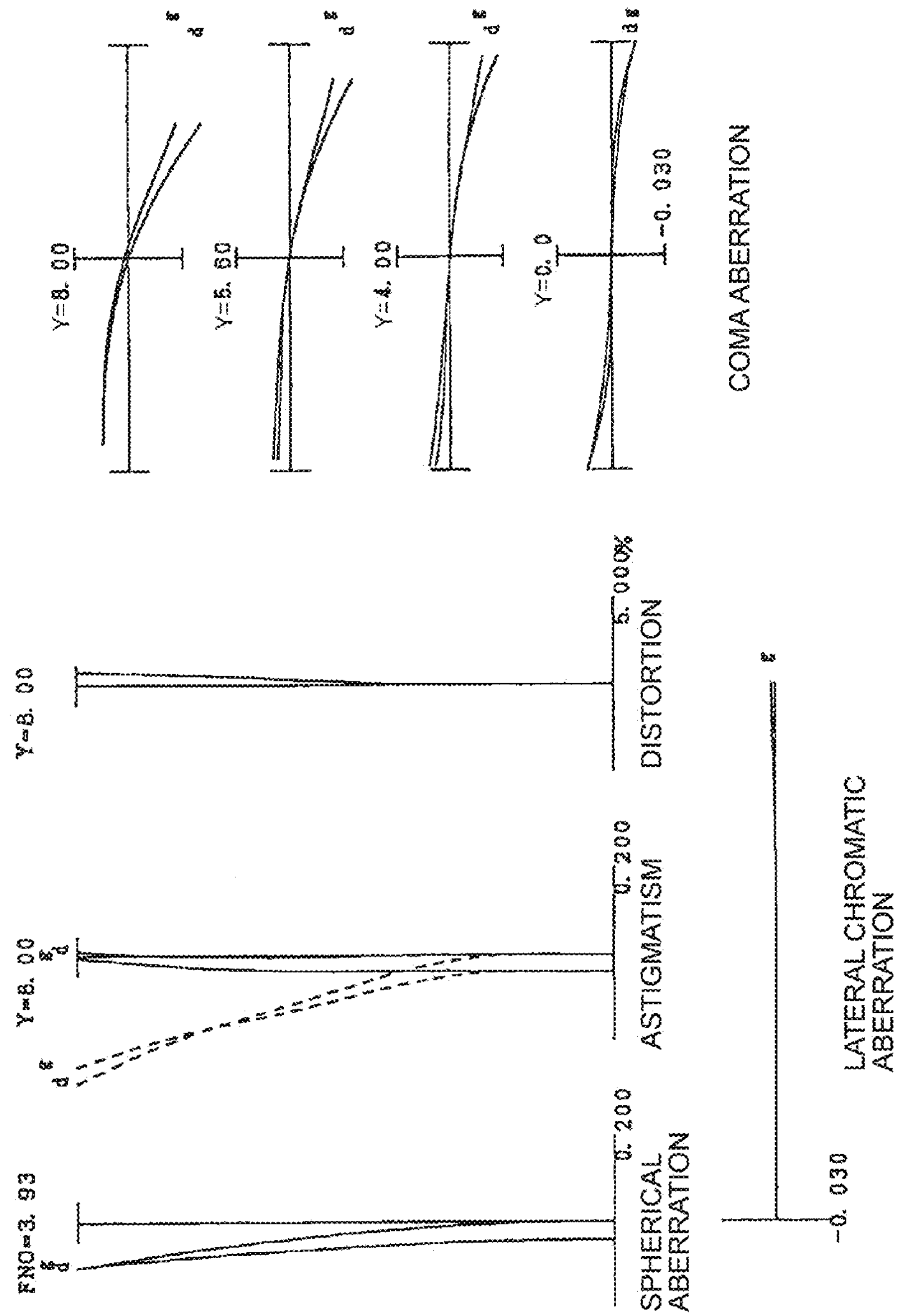
Figure 64C:
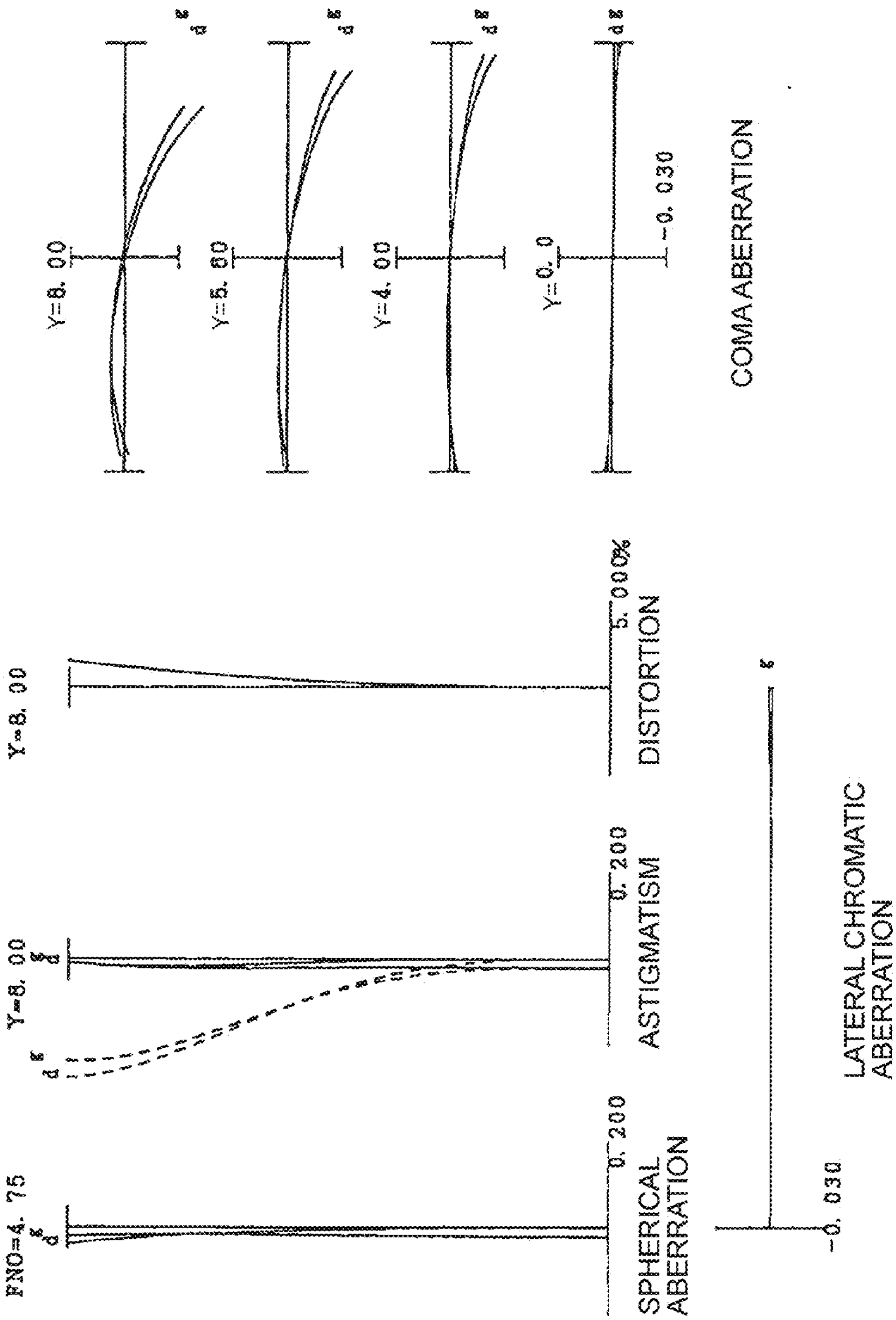
Figure 65A:
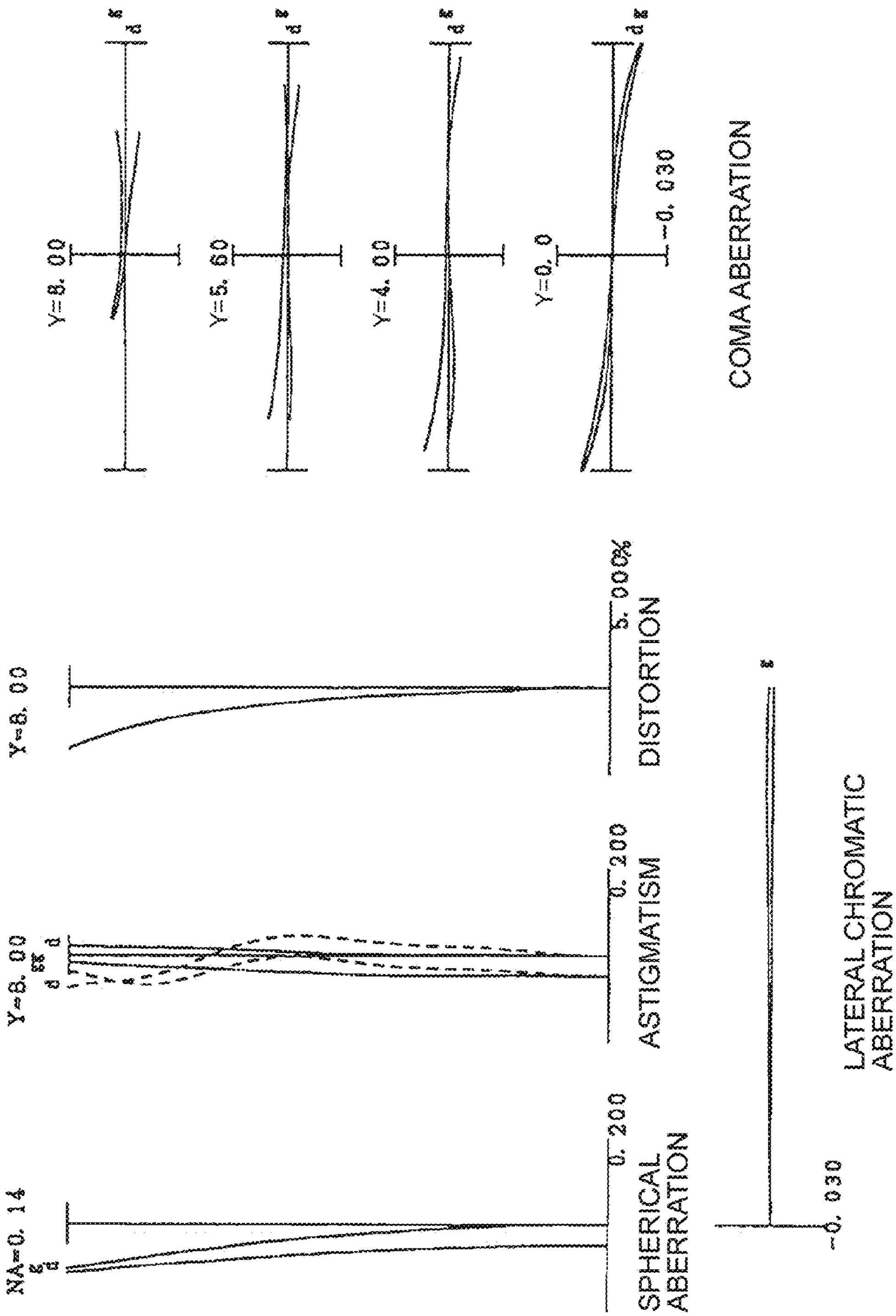
FIGS. 65A, 65B and 65C illustrate a graph showing aberrations in a short distance focusing state of 300 mm of distance between object images in the land imaging state of the amphibious zoom lens according to Example 11, where
Figure 65B:
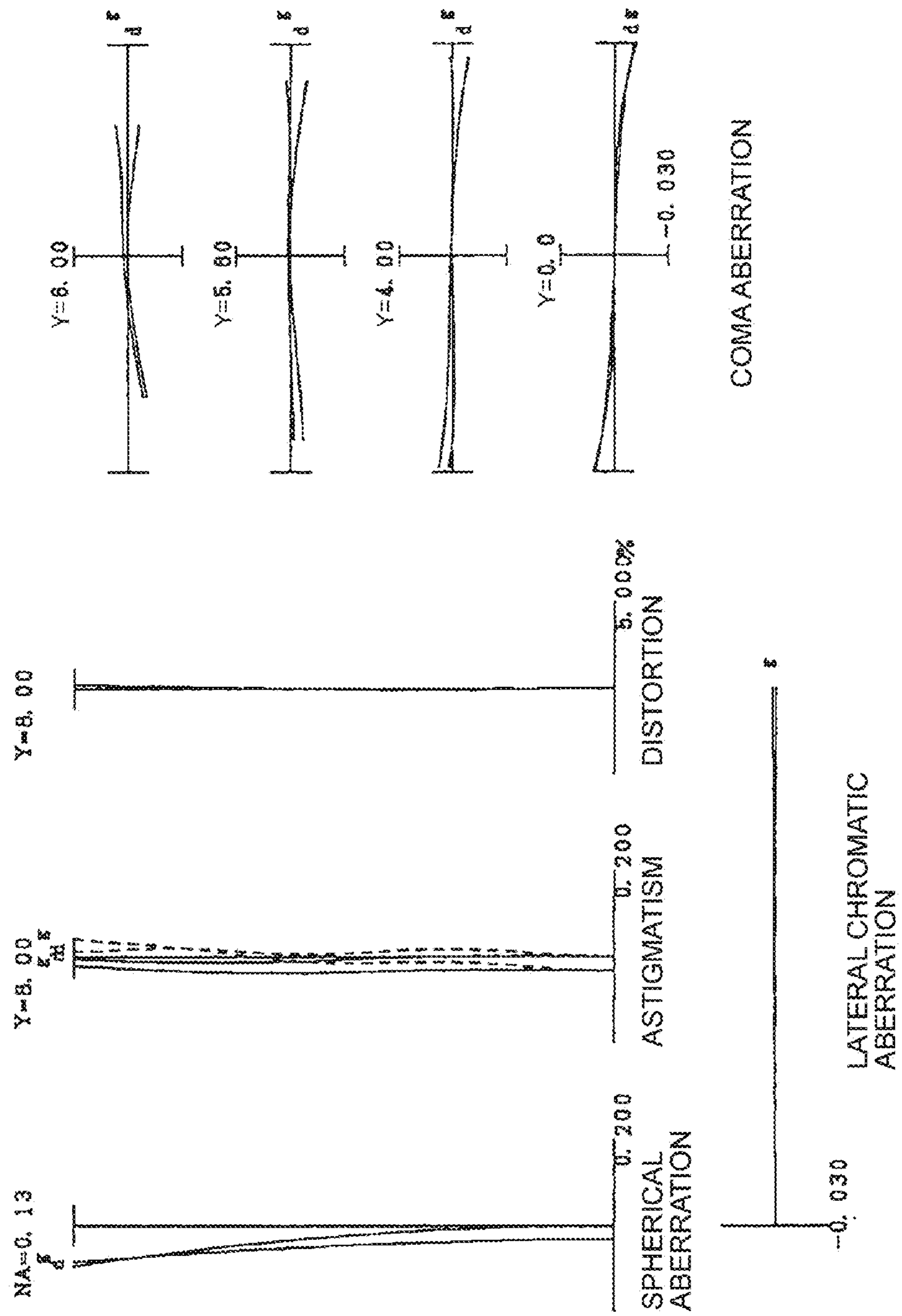
Figure 65C:
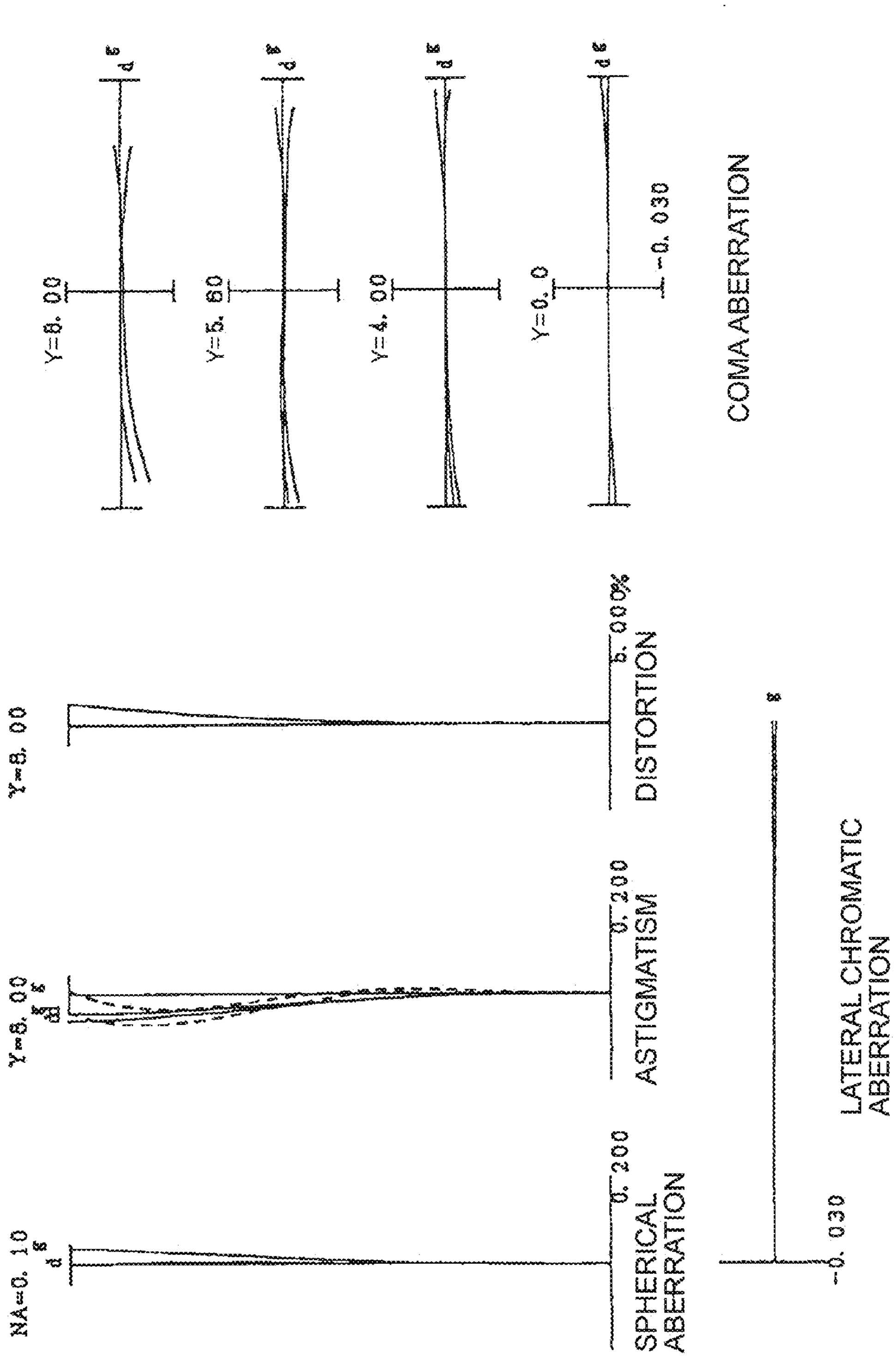
Figure 66A:
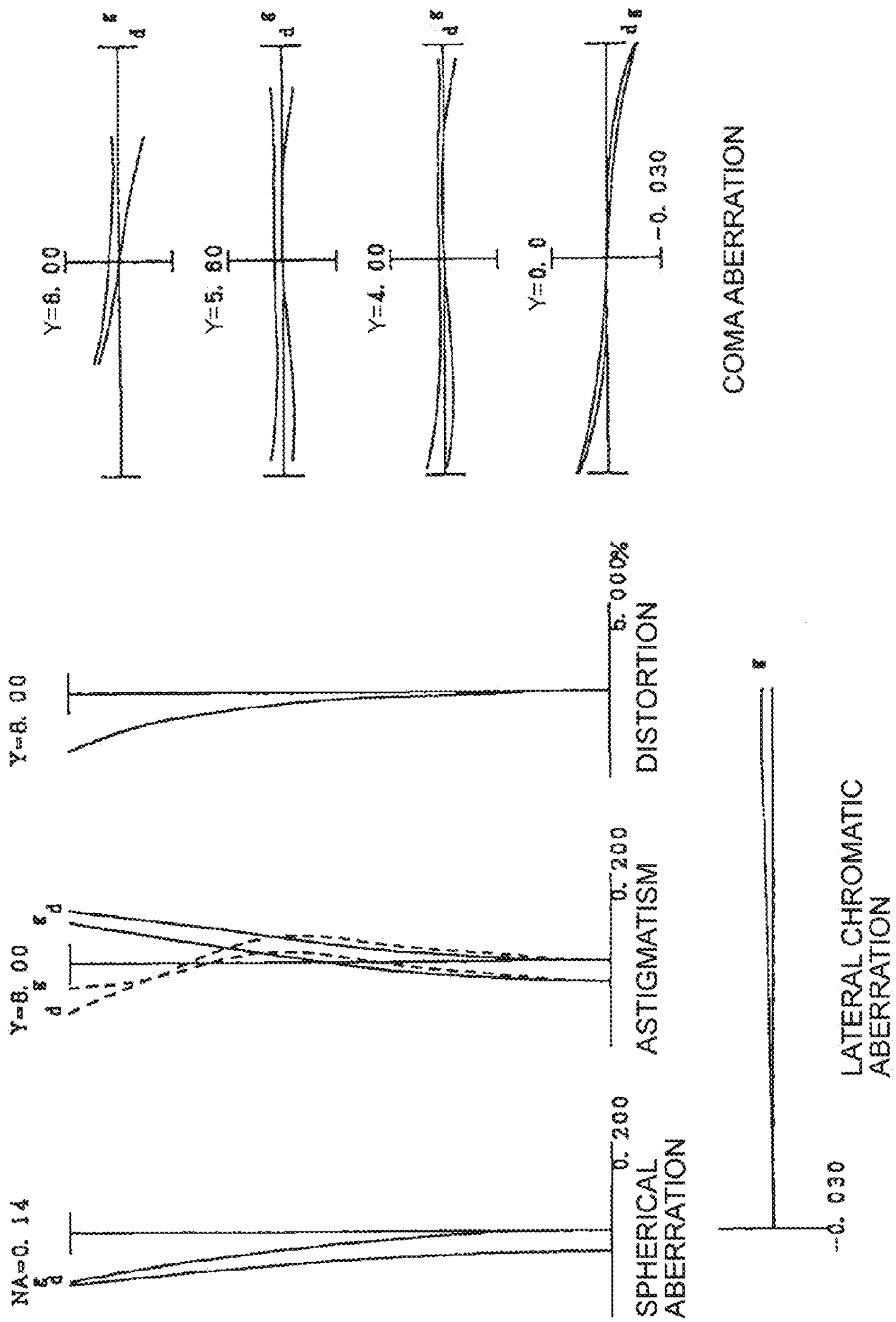
FIGS. 66A, 66B and 66C illustrate a graph showing aberrations in a short distance focusing state of 300 mm of distance between object images in the underwater imaging state of the amphibious zoom lens according to Example 11, where
Figure 66B:
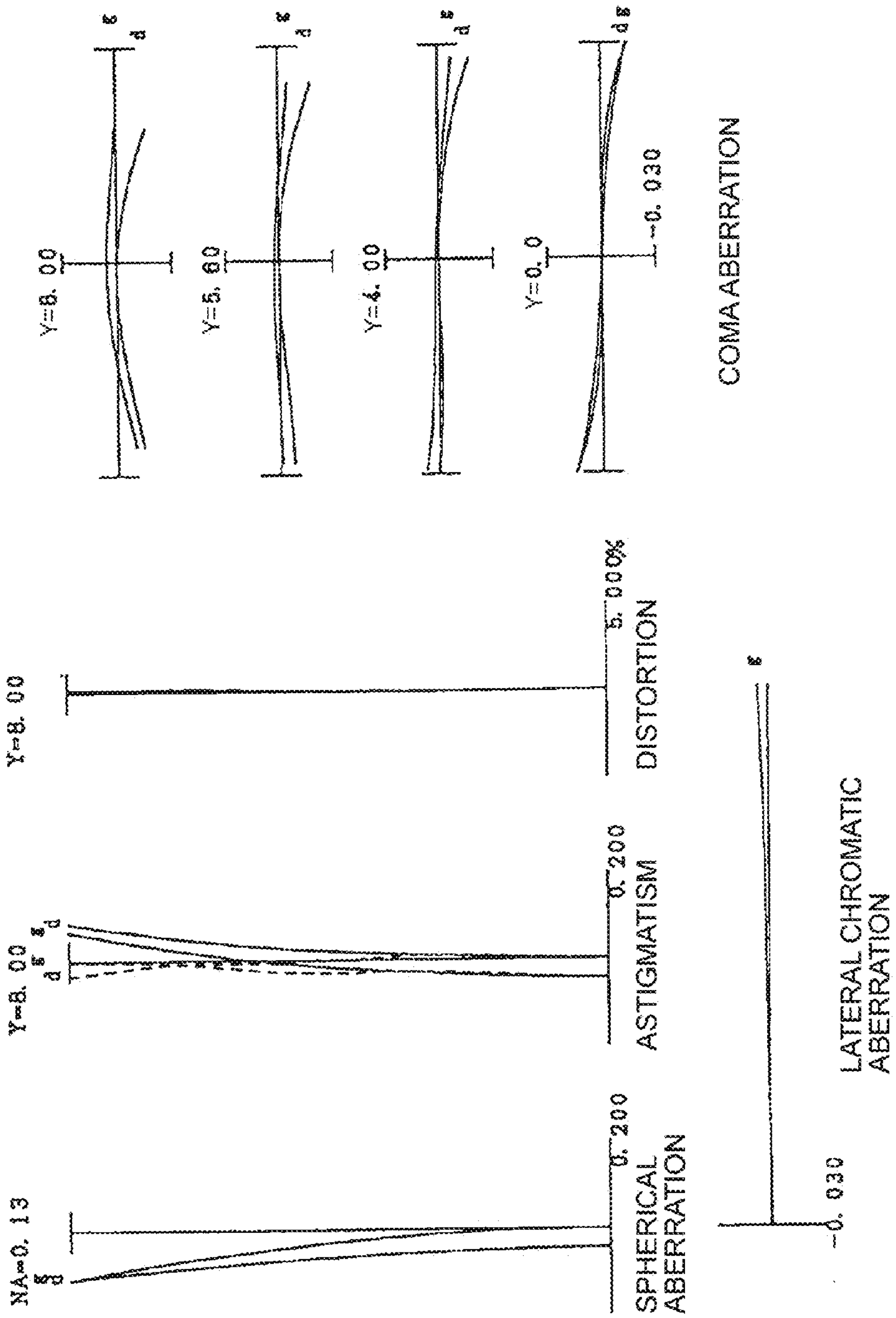
Figure 66C:
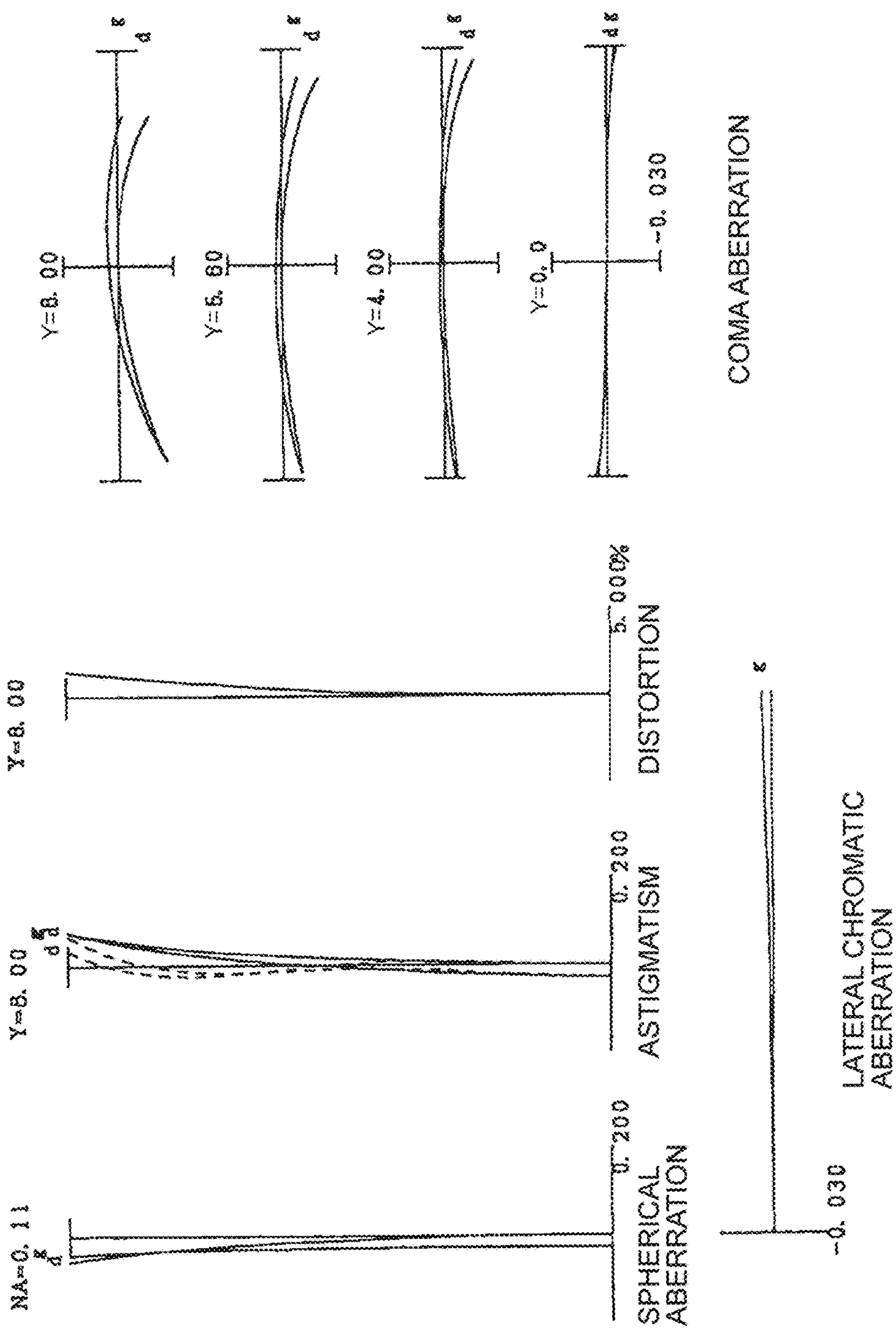

FIGS. 63A, 63B and 63C illustrate a graph showing aberrations in an infinity focusing state in the land imaging state of the anphibious zoom lens according to Example 11, where FIG. 63A depicts a wide-angle end state, FIG. 63B depicts an intermediate focal length state, and FIG. 63C depicts a telephoto end state. FIGS. 64A, 64B and 64C illustrate a graph showing aberrations in an infinity focusing state in the underwater imaging state based on design values of the amphibious zoom lens according to Example 11, where FIG. 64A depicts the wide-angle end state, FIG. 64B depicts the intermediate focal length state, and FIG. 64C depicts the telephoto end state. FIGS. 65A, 65B and 65C illustrate a graph showing aberrations in a short distance focusing state of 300 mm of distance between object images in the land imaging state based on design values of the anphibious zoom lens according to Example 11, where FIG. 65A depicts the wide-angle end state, FIG. 65B depicts the intermediate focal length state, and FIG. 65C depicts the telephoto end state. FIGS. 66A, 66B and 66C illustrate a graph showing aberrations in a short distance focusing state of 300 mm of distance between object images in the underwater imaging state based on design values of the amphibious zoom lens according to Example 11, where FIG. 66A depicts the wide-angle end state, FIG. 66B depicts the intermediate focal length state, and FIG. 66C depicts the telephoto end state.

Based on each graph showing aberrations, regarding the amphibious zoom lens ZL11 according to Example 11, it is possible to appropriately correct aberrations such as distortion and curvature of image surface, etc. covering a range from the infinity focusing state to the short distance focusing state both in the land imaging state and the underwater imaging state, and obtain high image-forming performance.

EXAMPLE 12

Example 12 is described with reference to FIG. 67 to FIGS. 71A, 71B and 71C, and Table 12. Note that in FIG. 67, a solid-line shows a moving locus in the land imaging state of the second lens group G2 and the third lens group G3, and a dotted-line shows a moving locus in the underwater imaging state.

Figure 67:
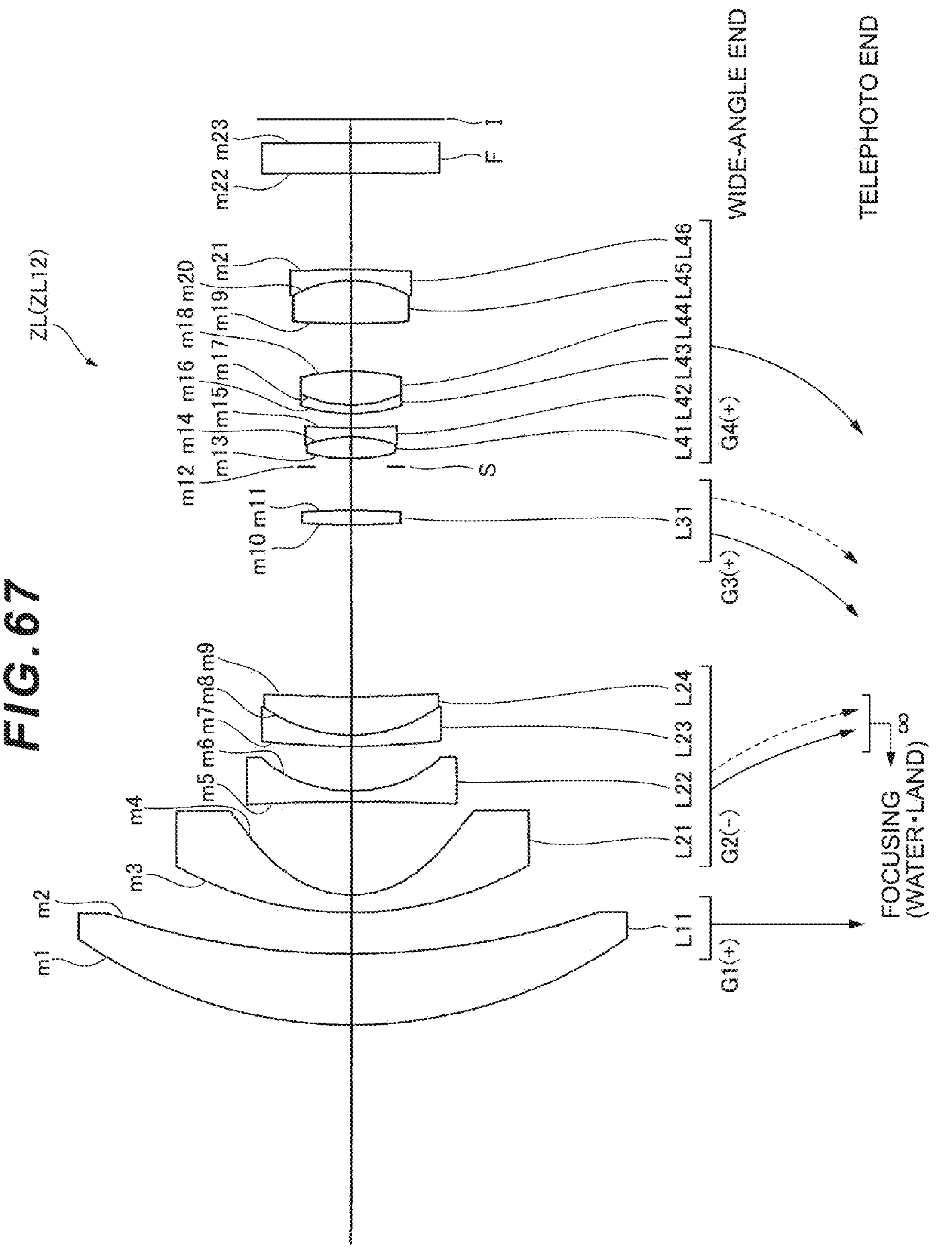
FIG. 67 illustrates a sectional view showing the configuration of the amphibious zoom lens according to Example 12, and a diagram showing a moving locus (arrow) of each group from a wide-angle end state to a telephoto end state.

The amphibious zoom lens ZL (ZL12) according to Example 12 is composed of, as shown in FIG. 67, in order from an object, a first lens group G1 having positive refractive power, a second lens group G2 having negative refractive power, a third lens group G3 having positive refractive power, and a fourth lens group G4 having positive refractive power.

The first lens group G1 is composed of a positive meniscus lens L11 having a convex surface facing the object.

The second lens group G2 is composed of, in order from the object, a negative meniscus lens L21 having a concave surface facing the image surface, a biconcave negative lens L22, a cemented positive lens composed of a negative meniscus lens L23 having a concave surface facing the image surface and a positive meniscus lens L24 having a convex surface facing the object. Note that the image side surface of the negative meniscus lens L21 is an aspherical surface. Moreover, the image side surface of the bi concave negative lens L22 is an aspherical surface.

The third lens group G3 is composed of a biconvex positive lens L31.

The fourth lens group G4 is a cemented negative lens composed of a biconvex positive lens L41 and a biconcave negative lens L42, a cemented positive lens composed of a negative meniscus lens L43 having a concave surface facing the image surface and a biconvex positive lens L44, and a cemented negative lens composed of a biconvex positive lens L45 and a negative meniscus lens L46 having a concave surface facing the object. The image side surface of the negative meniscus lens L46 is an aspherical surface.

An iris stopper S is disposed close to the object of the fourth lens group G4.

A filter group F is disposed on the image side of the fourth lens group G4. The filter group F is composed of a low-pass filter for cutting a spatial frequency more than a marginal dissector of image sensors such as a CCD and CMOS disposed on the image surface I, a cover-glass of an image sensor, etc.

The image surface I is formed on the image sensor which is composed of unillustrated CCDs, CMOSs, etc.

In the amphibious zoom lens ZL12 configured above, the first lens group G1 is always fixed against the image surface I on the axis optical direction, upon switching from the land imaging state to the underwater imaging state, upon zooming from the wide-angle end state to the telephoto end state in each imaging state, and upon focusing on from an infinity object to a short distance object in each imaging state.

The second lens group G2 moves in the image surface direction upon switching from the land imaging state to the underwater imaging state, moves in the image surface direction upon zooming from a wide-angle end state to a telephoto end state in each imaging state, and moves in the object direction upon focusing on from an infinity object to a short distance object in the underwater imaging state.

The third lens group G3 moves in the image surface direction upon switching from the land imaging state to the underwater imaging state, moves in the object direction upon zooming from a wide-angle end state to a telephoto end state in each imaging state, and moves in the image surface direction upon focusing on from an infinity object to a short distance object in the land imaging state.

The fourth lens group G4 moves in the object direction upon zooming from a wide-angle end state to a telephoto end state in each imaging state.

The distance between the first lens group G1 and the second lens group G2 is enlarged when switching from the land imaging state to the underwater imaging state, and is enlarged upon zooming from a wide-angle end state to a telephoto end state in each imaging state. The distance between the second lens group G2 and the third lens group G3 is enlarged when switching from the land imaging state to the underwater imaging state, and decreases upon zooming from a wide-angle end state to a telephoto end state in each imaging state. The distance between the third lens group G3 and the fourth lens group G4 decreases when switching from the land imaging state to the underwater imaging state, decreases upon zooming from a wide-angle end state to a telephoto end state in a land imaging state, and is constant upon zooming from a wide-angle end state to a telephoto end state in the underwater imaging state.

In the present example, it is possible to appropriately correct various aberrations such as curvature of image surface both in the land imaging state and the underwater imaging by changing positions of the second lens group G2 and the third lens group G3 in the land imaging state and the underwater imaging, while constantly maintaining an image-forming position both in the land imaging state and the underwater imaging state.

The following Table 12 illustrates values of each general data in Example 12. The surface numbers 1 to 23 in Table 12 correspond to each optical surfaces of m1 to m23 illustrated in FIG. 57.

TABLE 12

[Lens data]

| Surface number | R | D | nd | νd |
|---|---|---|---|---|
| Object surface | ∞ | | | |
| 1 | 43.9692 | 6.5093 | 1.516800 | 63.88 |
| 2 | 70.1229 | D2 (Variable) | | |
| 3 | 32.9319 | 1.6000 | 1.694120 | 53.35 |
| *4 | 9.2229 | 8.5100 | | |
| 5 | −171.8200 | 1.0000 | 1.773870 | 47.25 |
| *6 | 14.1608 | 4.1000 | | |
| 7 | 70.3709 | 1.0000 | 1.497820 | 82.57 |
| 8 | 13.5161 | 3.5500 | 1.834000 | 37.18 |
| 9 | 120.5189 | D9 (Variable) | | |
| 10 | 65.9078 | 1.3500 | 1.581440 | 40.98 |
| 11 | −47.4499 | D11 (Variable) | | |
| 12 | ∞ | 0.8000 | (Aperture stop S) | |
| 13 | 15.9664 | 2.0000 | 1.497820 | 82.57 |
| 14 | −11.9898 | 0.8000 | 1.744000 | 44.80 |
| 15 | 49.2044 | 1.3300 | | |
| 16 | 14.8640 | 0.8000 | 1.850260 | 32.35 |
| 17 | 11.0117 | 3.1500 | 1.516800 | 63.88 |
| 18 | −19.0727 | 4.4400 | | |
| 19 | 83.0724 | 4.0000 | 1.497820 | 82.57 |
| 20 | −10.8705 | 1.0000 | 1.773870 | 47.25 |
| *21 | −58.7999 | D21 (Variable) | | |
| 22 | ∞ | 2.7900 | 1.516800 | 64.11 |
| 23 | ∞ | Bf | | |
| Image surface | ∞ | | | |

[Aspheric surface data]

The fourth surface

κ = −1.1413
A4 = +2.66088E−04
A6 = −1.52598E−06
A8 = +1.49703E−08
A10 = −7.82000E−11

The sixth surface

κ = −4.2267
A4 = +2.82881E−04
A6 = −1.25698E−06
A8 = +1.49915E−08
A10 = −1.65036E−11

TABLE 12-continued

The 21st surface

κ = +0.7548
A4 = +1.46866E−04
A6 = +5.96991E−07
A8 = +1.12606E−08
A10 = −7.38845E−11

[Various data]

(Land imaging state)

| | | | |
|---|---|---|---|
| f | 7.20 | 9.30 | 13.61 |
| FNO | 3.51 | 3.84 | 4.55 |
| 2ω | 97.11 | 80.99 | 60.04 |
| Y | 8.00 | 8.00 | 8.00 |
| TL | 83.07 | 83.07 | 83.07 |
| D2 | 3.753 | 7.823 | 10.234 |
| D9 | 15.689 | 9.189 | 1.600 |
| D11 | 3.924 | 3.924 | 3.924 |
| D21 | 8.795 | 11.225 | 16.403 |
| Bf | 2.178 | 2.178 | 2.178 |

(Underwater imaging state)

| | | | |
|---|---|---|---|
| f | 6.00 | 7.55 | 10.94 |
| FNO | 3.51 | 3.84 | 4.54 |
| 2ω | 91.27 | 77.05 | 56.97 |
| Y | 8.00 | 8.00 | 8.00 |
| TL | 83.07 | 83.07 | 83.07 |
| D2 | 5.546 | 9.468 | 11.581 |
| D9 | 16.820 | 10.468 | 3.177 |
| D11 | 1.000 | 1.000 | 1.000 |
| D21 | 8.795 | 11.225 | 16.403 |
| Bf | 2.178 | 2.178 | 2.178 |

[Amount of movement upon focusing]

(Land imaging state)

| | | | |
|---|---|---|---|
| f | 7.20 | 9.30 | 13.61 |
| First lens group | 0.000 | 0.000 | 0.000 |
| Second lens group | −0.717 | −0.734 | −0.744 |
| Third lens group | 0.000 | 0.000 | 0.000 |
| Fourth lens group | 0.000 | 0.000 | 0.000 |

(Underwater imaging state)

| | | | |
|---|---|---|---|
| f | 6.00 | 7.55 | 10.94 |
| First lens group | 0.000 | 0.000 | 0.000 |
| Second lens group | −0.647 | −0.621 | −0.607 |
| Third lens group | 0.000 | 0.000 | 0.000 |
| Fourth lens group | 0.000 | 0.000 | 0.000 |

[Lens group data]

| Group | Front end surface | Rear end surface | Group focus length |
|---|---|---|---|
| First lens group | 1 | 2 | 210.283 |
| Second lens group | 3 | 9 | −11.412 |
| Third lens group | 10 | 11 | 47.656 |
| Fourth lens group | 13 | 21 | 22.360 |

[Position data of each lens group]

(Land imaging state)

| | | | |
|---|---|---|---|
| f | 7.20 | 9.30 | 13.61 |
| First lens group | 0.000 | 0.000 | 0.000 |
| Second lens group | 0.000 | 4.070 | 6.481 |
| Third lens group | 0.000 | −2.431 | −7.608 |
| Fourth lens group | 0.000 | −2.431 | −7.608 |

(Underwater imaging state)

| | | | |
|---|---|---|---|
| f | 6.00 | 7.55 | 10.94 |
| First lens group | 0.000 | 0.000 | 0.000 |
| Second lens group | 1.793 | 5.715 | 7.829 |
| Third lens group | 2.924 | 0.493 | −4.684 |
| Fourth lens group | 0.000 | −2.431 | −7.608 |

TABLE 12-continued

| [Values corresponding to the conditional expressions] |
|---|
| Conditional expression (4) R1/Enpw = 1.923 |
| Conditional expression (5) φ1/φw = 0.035 |
| Conditional expression (6) φ2/φw = −0.630 |
| Conditional expression (7) φ3/φ4 = 0.470 |
| Conditional expression (8) Δ2w/Δ3w = 0.613 |
| R1 = 43.969 |
| Enpw = 22.865 |
| φ1 = 0.0048 |
| φw = 0.139 |
| φ2 = −0.0876 |
| φ3 = 0.0210 |
| φ4 = 0.0447 |
| Δ2w = 1.793 |
| Δ3w = 2.924 |

Based on Table 12, the amphibious zoom lens ZL12 according to the present example, the conditional expressions (4) to (8) are satisfied.

Figure 68A:
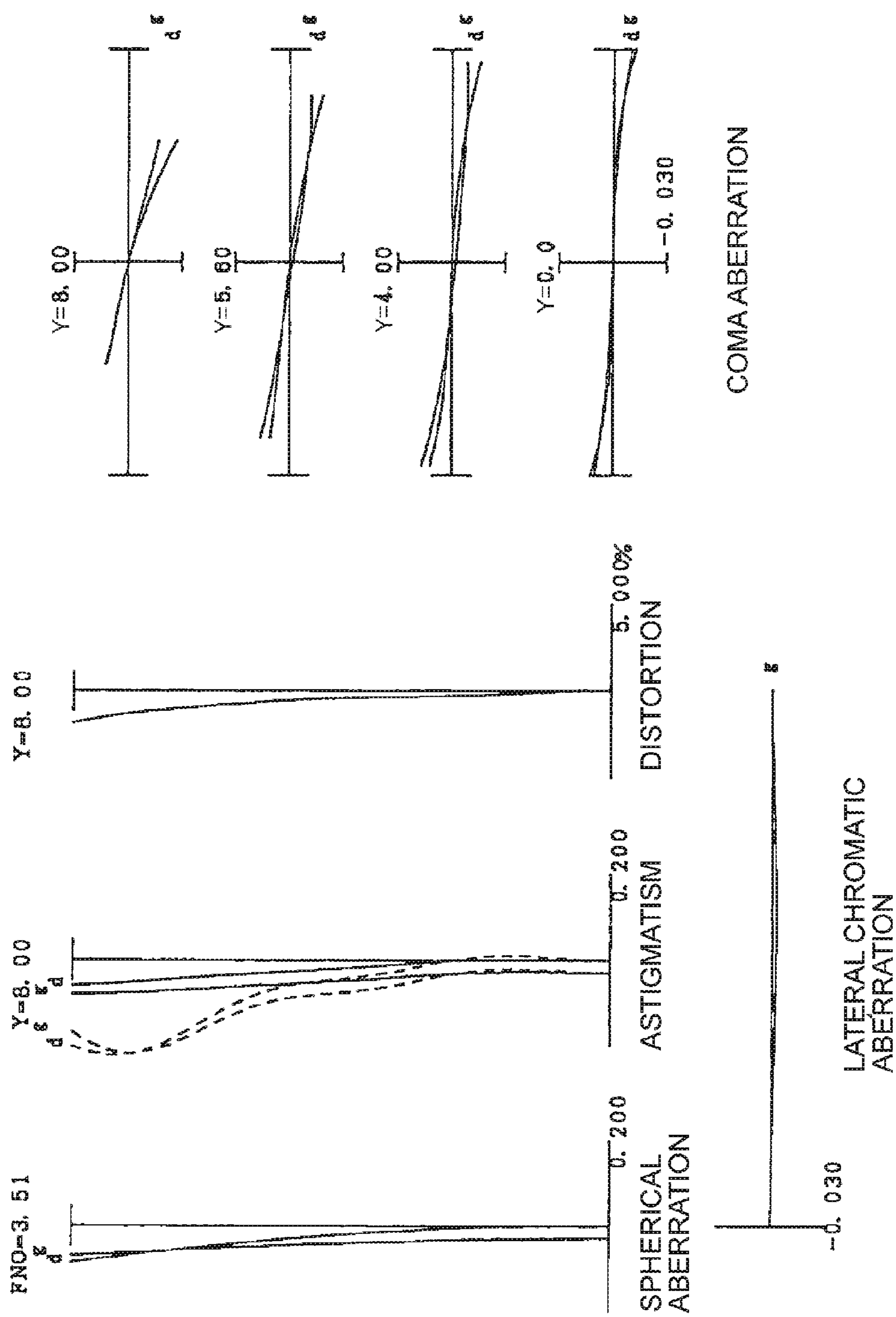
FIGS. 68A, 68B and 68C illustrate a graph showing aberrations in an infinity focusing state in the land imaging state of the amphibious zoom lens according to Example 12, where
Figure 68B:
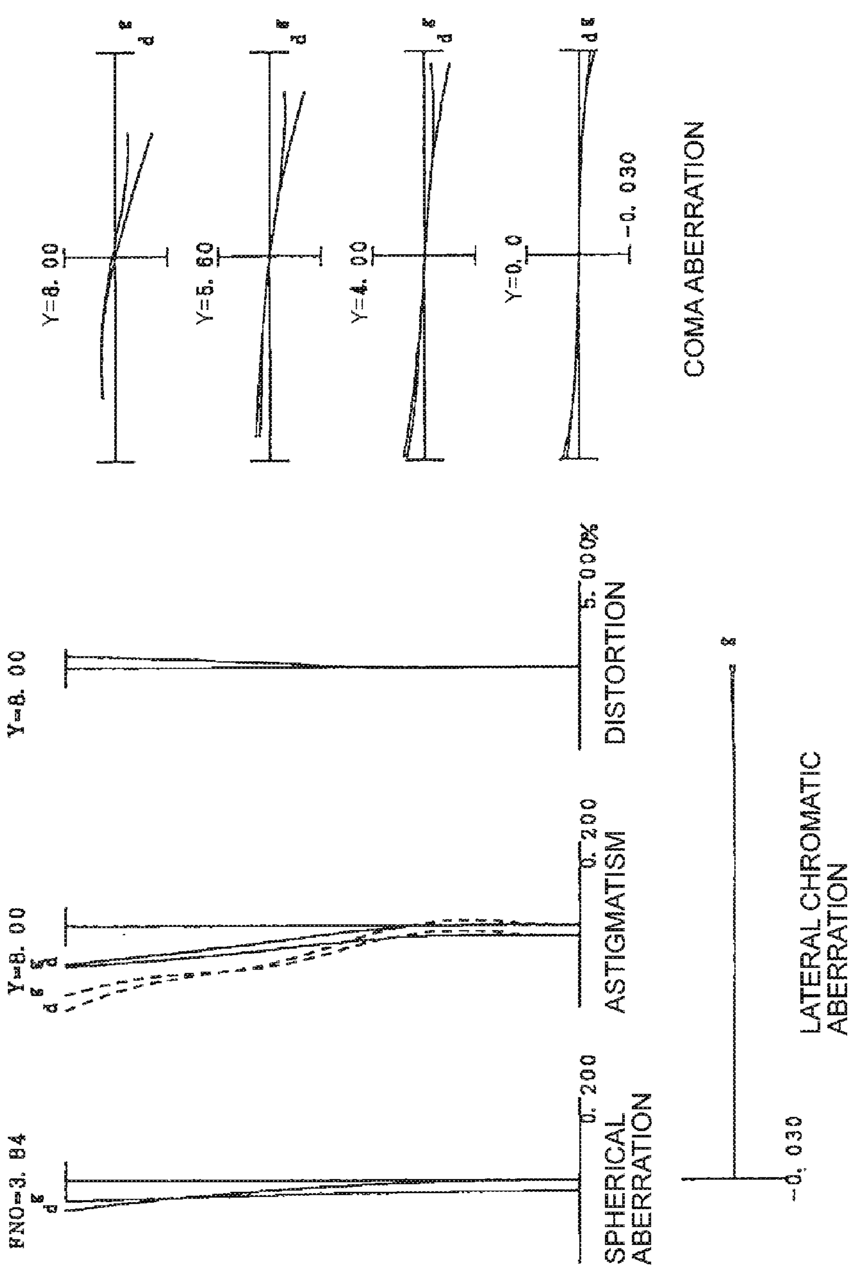
Figure 68C:
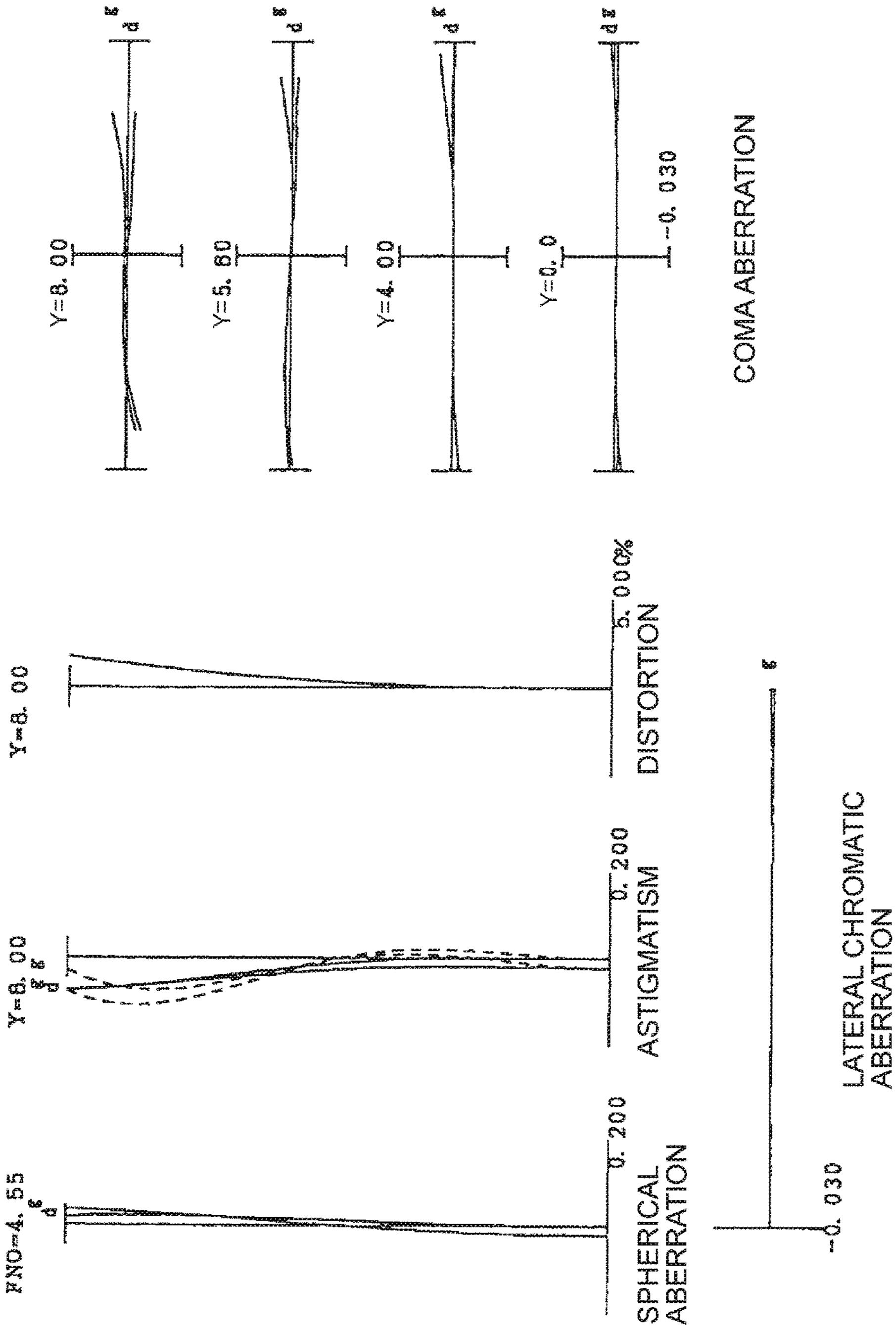
Figure 69A:
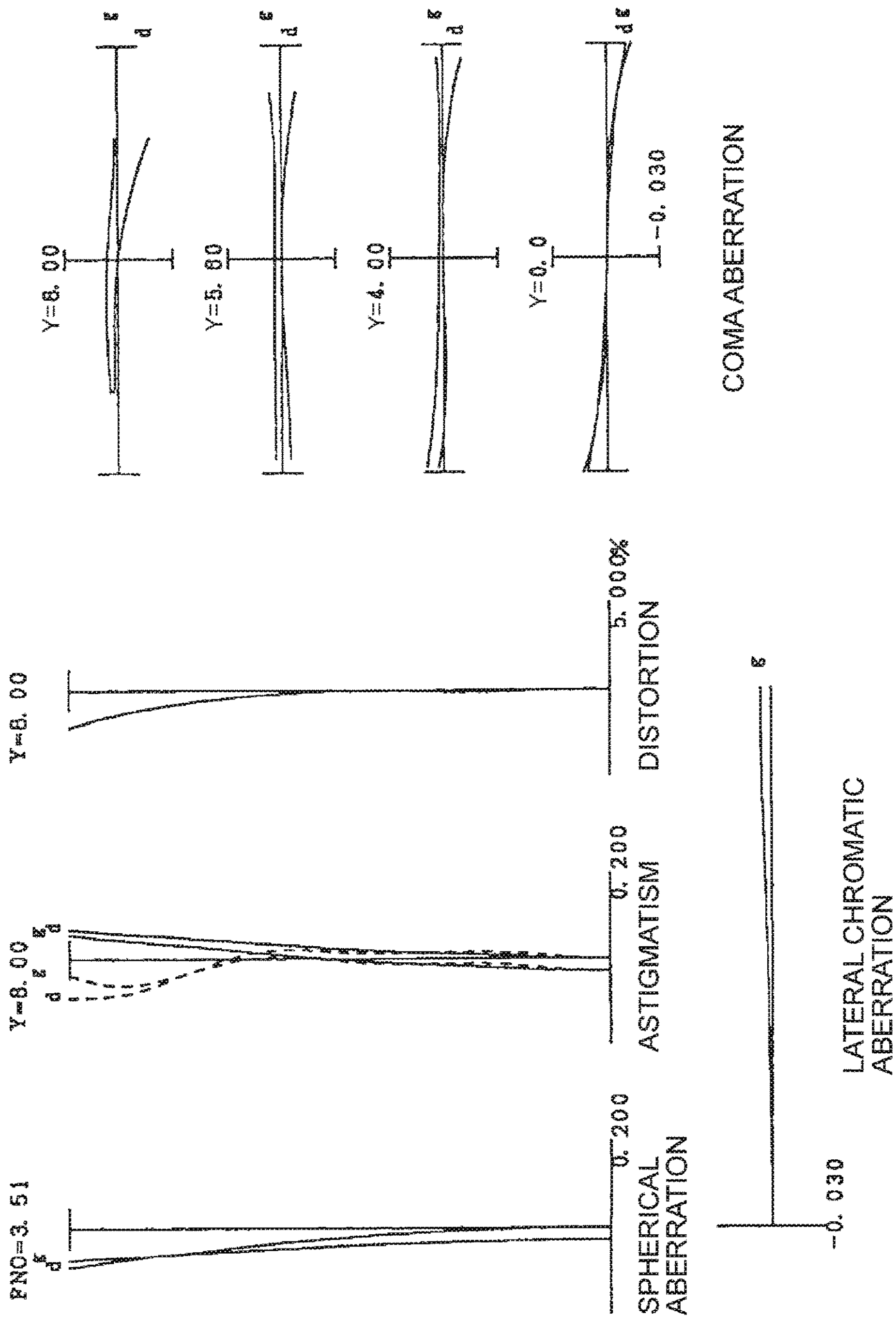
FIGS. 69A, 69B and 69C illustrate a graph showing aberrations in an infinity focusing state in the underwater imaging state of the amphibious zoom lens according to Example 12, where
Figure 69B:
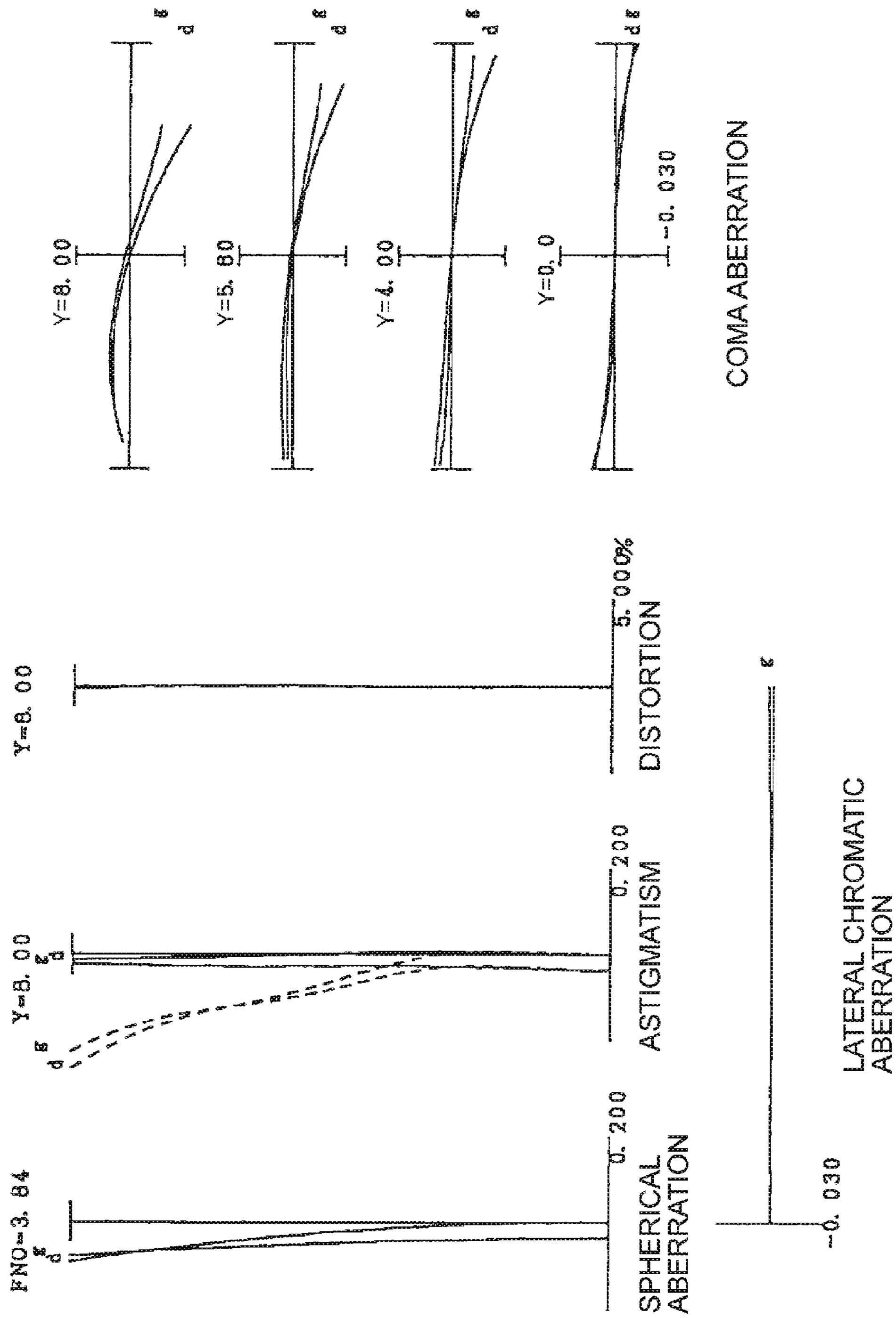
Figure 69C:
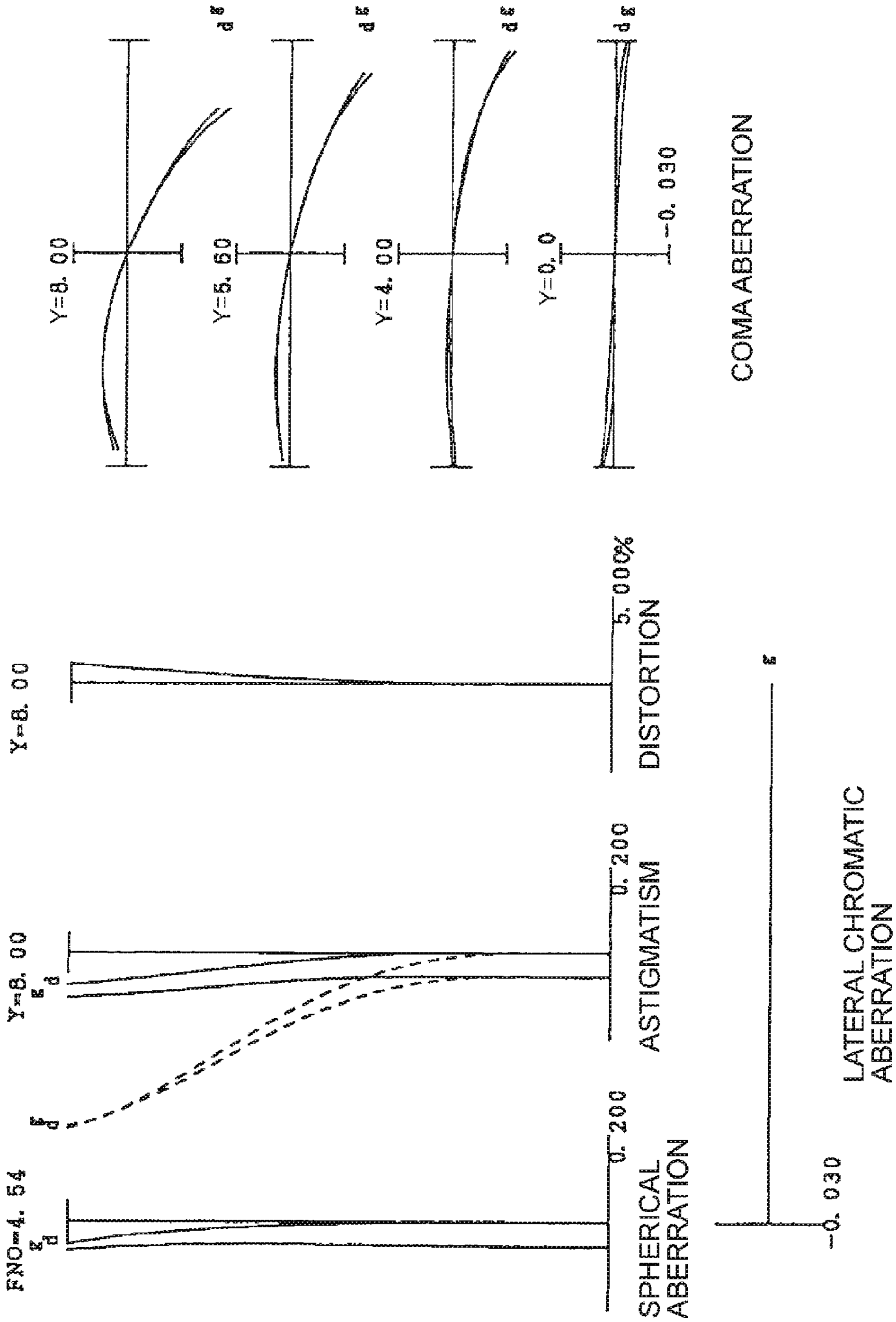
Figure 70A:
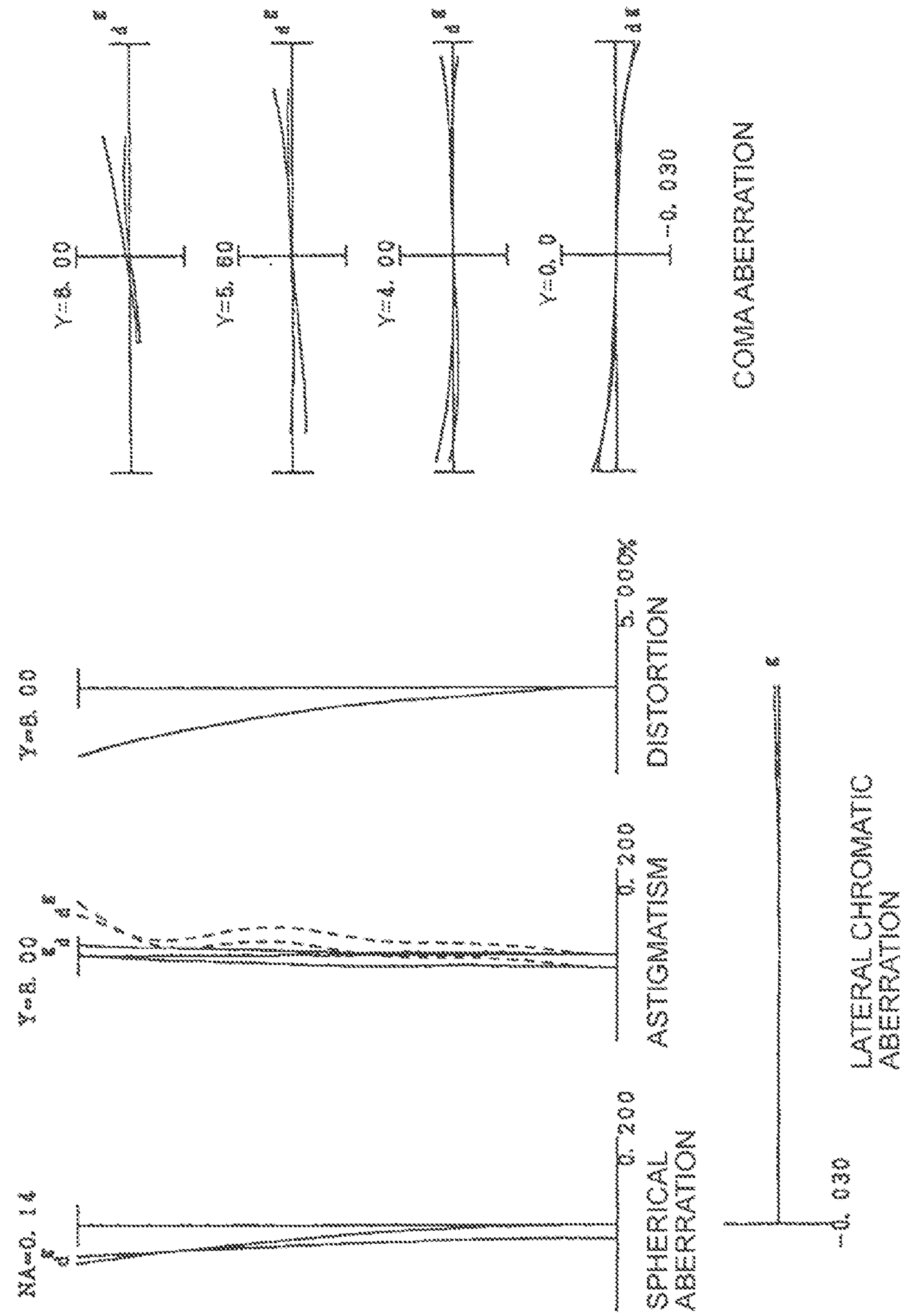
FIGS. 70A, 70B and 70C illustrate a graph showing aberrations in a short distance focusing state of 300 mm of distance between object images in the land imaging state of the amphibious zoom lens according to Example 12, where
Figure 70B:
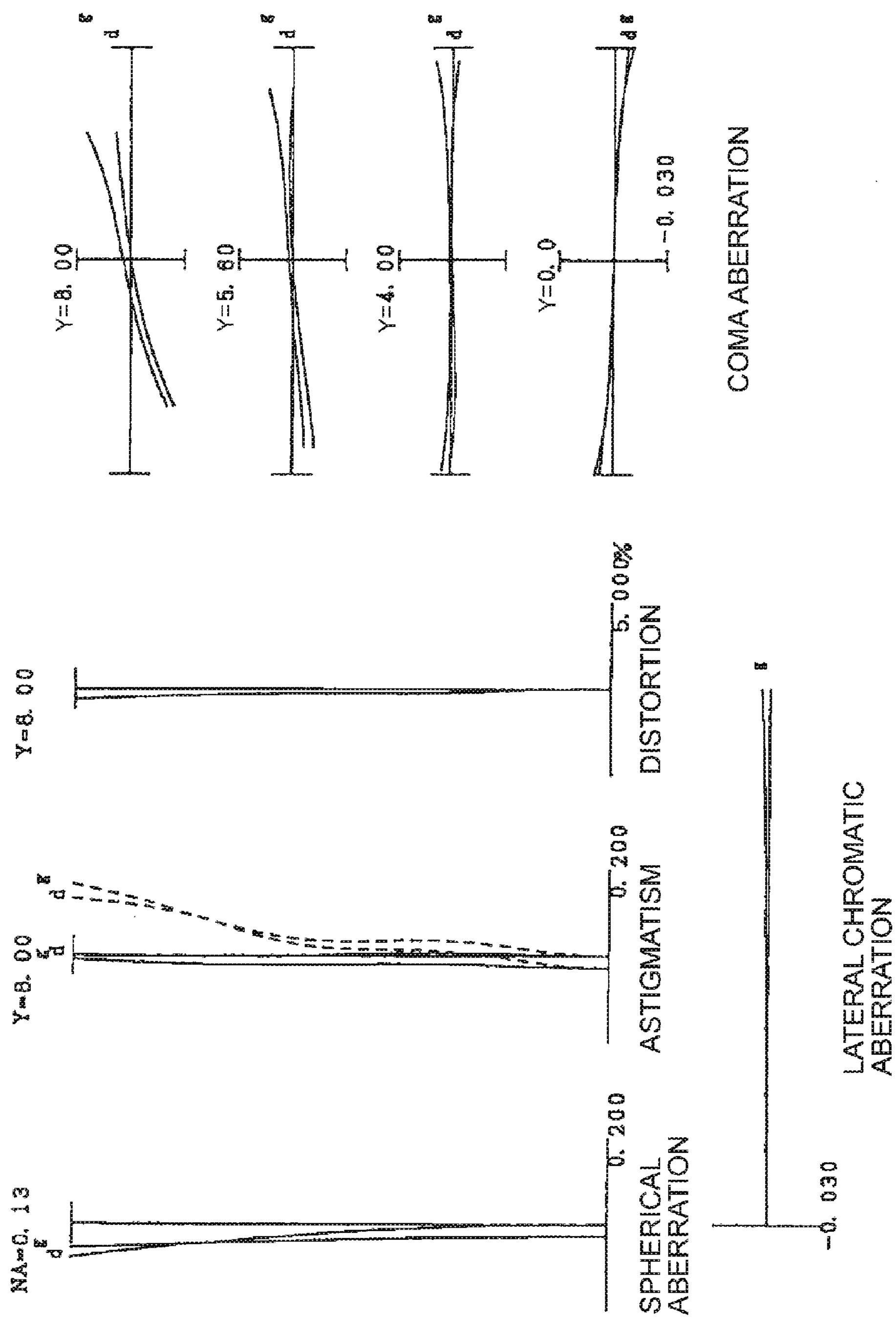
Figure 70C:
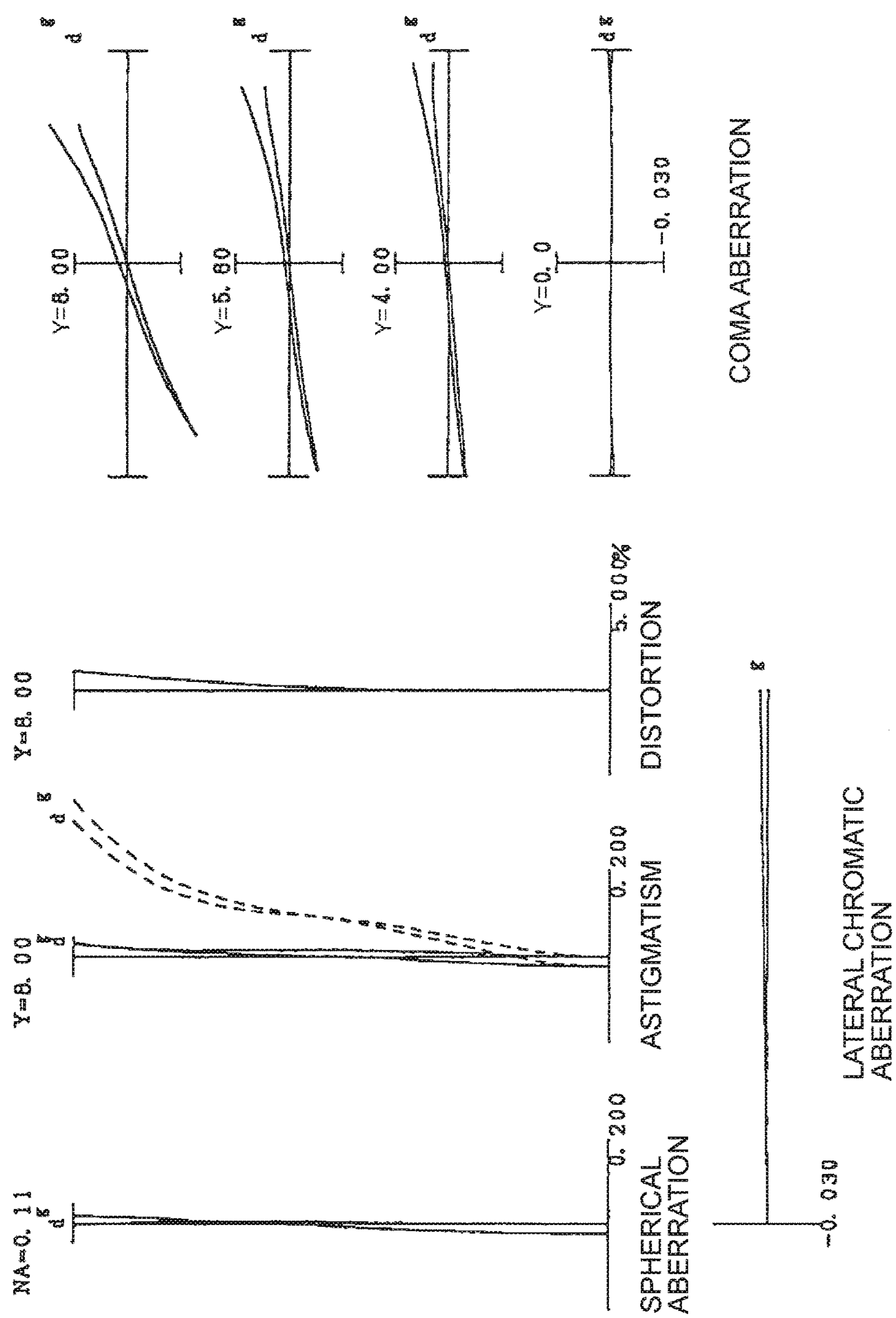
Figure 71A:
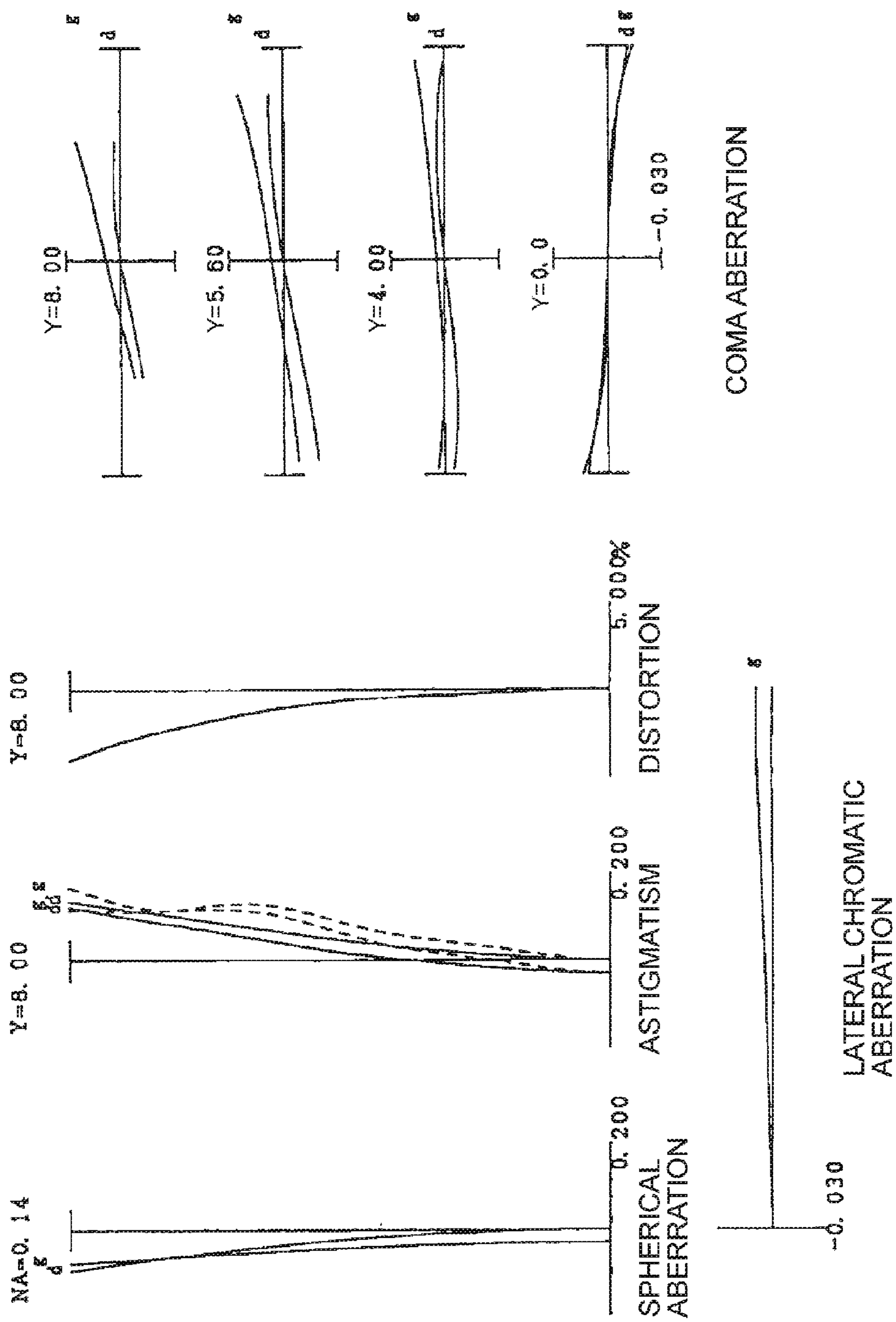
FIGS. 71A, 71B and 71C illustrate a graph showing aberrations in a short distance focusing state of 300 mm of distance between object images in the underwater imaging state of the amphibious zoom lens according to Example 12, where
Figure 71B:
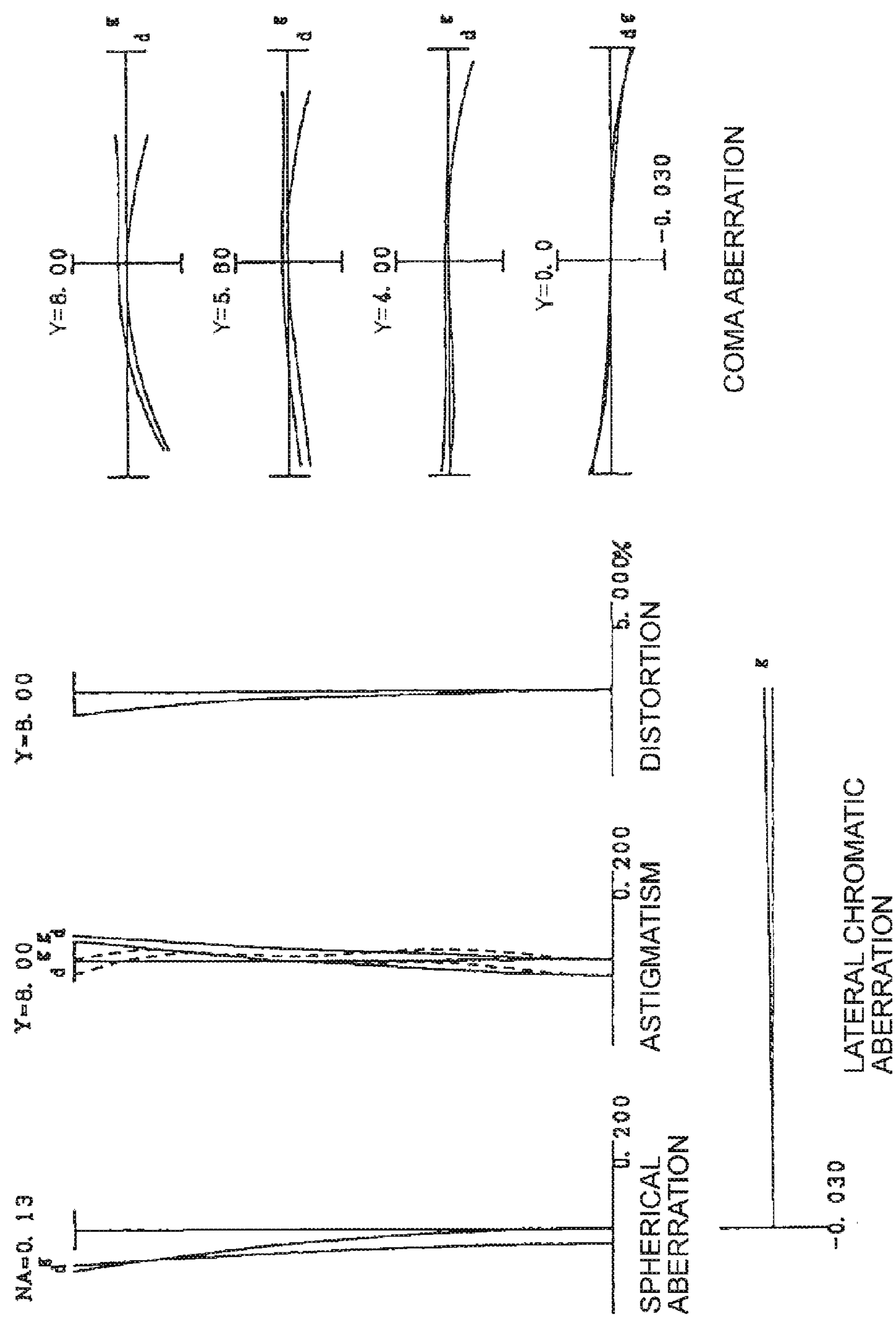
Figure 71C:
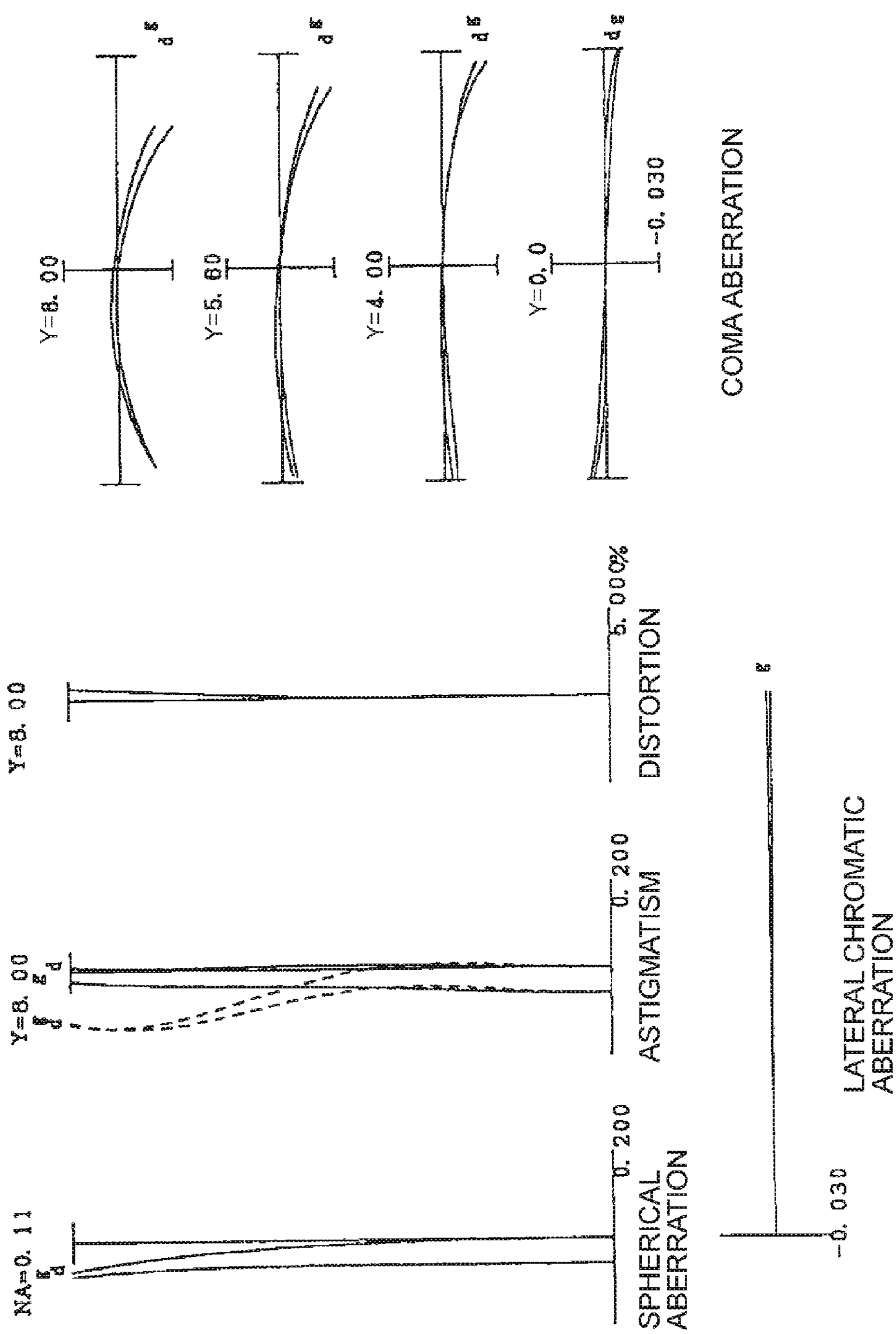

FIGS. 68A, 68B and 68C illustrate a graph showing aberrations in an infinity focusing state in the land imaging state based on design values of the amphibious zoom lens according to Example 12, where FIG. 68A depicts the wide-angle end state, FIG. 68B depicts the intermediate focal length state, and FIG. 68C depicts the telephoto end state. FIGS. 69A, 69B and 69C illustrate a graph showing aberrations in an infinity focusing state in the underwater imaging state based on design values of the anphibious zoom lens according to Example 12, where FIG. 69A depicts the wide-angle end state, FIG. 69B depicts the intermediate focal length state, and FIG. 69C depicts the telephoto end state. FIGS. 70A, 70B and 70C illustrate a graph showing aberrations in a short distance focusing state of 300 mm of distance between object images in the land imaging state based on design values of the amphibious zoom lens according to Example 12, where FIG. 70A depicts the wide-angle end state, FIG. 70B depicts the intermediate focal length state, and FIG. 70C depicts the telephoto end state. FIGS. 71A, 71B and 71C illustrate a graph showing aberrations in a short distance focusing state of 300 mm of distance between object images in the underwater imaging state based on design values of the amphibious zoom lens according to Example 12, where FIG. 71A depicts the wide-angle end state, FIG. 71B depicts the intermediate focal length state, and FIG. 71C depicts the telephoto end state.

Based on each graph showing aberrations, regarding the amphibious zoom lens ZL12 according to Example 12, it is possible to appropriately correct aberrations such as distortion and curvature of image surface, etc. covering a range from the infinity focusing state to the short distance focusing state both in the land imaging state and the underwater imaging state, and obtain high image-forming performance.

Note that in the amphibious zoom lens ZL12 according to Example 12, focusing is performed by moving the second lens group G2 in the object direction in the land imaging state and the underwater imaging state, and it is not necessary to have a different focusing mechanism in the underwater imaging state and the land imaging state, and obtain the advantageous effect to simplify a configuration.

Moreover, in the amphibious zoom lens ZL12 according to Example 12, a position of the third lens group G3 against the fourth lens group G4 changes when switching from the land imaging state to the underwater imaging state, and does not change upon zooming from a wide-angle end state to a telephoto end state and upon focusing. Accordingly, by adopting a mechanism in which the position of the third lens group G3 against the fourth lens group G4 changes in association with switching from the land imaging state to the underwater imaging state, a dedicated movement mechanism is not needed, thus it is possible to obtain a benefit of simplifying a configuration.

Moreover, in the amphibious zoom lens ZL12 according to Example 12, as same as Examples 10 and 11, focusing can be performed by moving the third lens group G3 in the image surface direction in the land imaging state, while focusing can be performed by moving the second lens group G2 in the Object direction in the underwater imaging state. With this arrangement, it is possible to further improve image-forming performance in the short distance imaging state in the land imaging state.

EXAMPLE 13

Example 13 is described with reference to FIG. 72 to FIGS. 76A, 76B and 76C, and Table 13. Note that in FIG. 72, a solid-line shows a moving locus in the land imaging state, and a dotted-line shows a moving locus in an underwater imaging state of the second lens group G2 and the third lens group G3.

Figure 72:
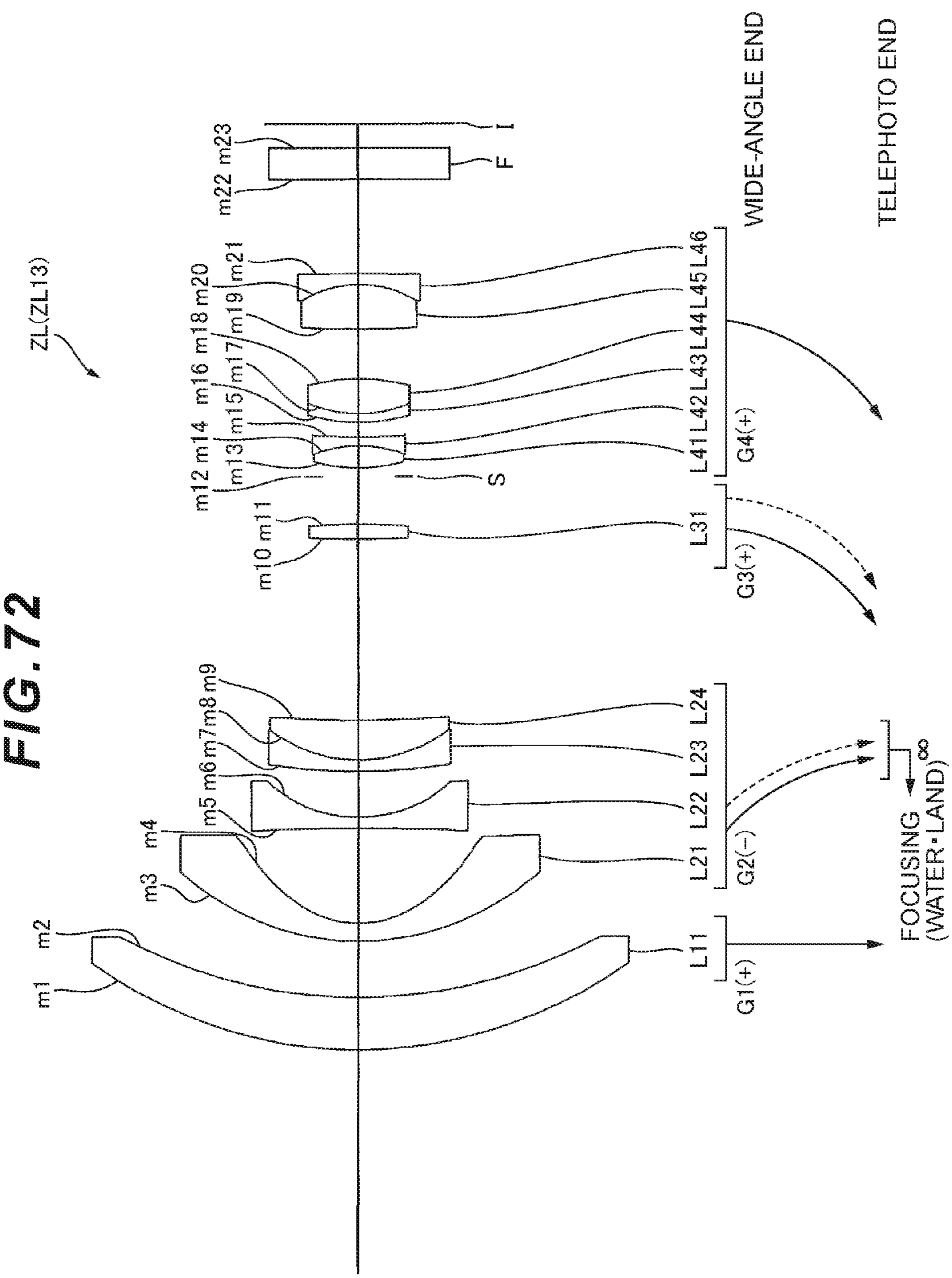
FIG. 72 illustrates a sectional view showing the configuration of the amphibious zoom lens according to Example 13, and a diagram showing a moving locus (arrow) of each group from a wide-angle end state to a telephoto end state.

The amphibious zoom lens ZL (ZL13) according to Example 13, as shown in FIG. 72, in order from an object, a first lens group G1 having positive refractive power, a second lens group G2 having negative refractive power, a third lens group G3 having positive refractive power, and a fourth lens group G4 having positive refractive power.

The first lens group G1 is composed of a positive meniscus lens L11 having a convex surface facing the object.

The second lens group G2 is composed of, in order from the object, a negative meniscus lens L21 having a concave surface facing an image surface, a biconcave negative lens L22, and a cemented positive lend composed of a negative meniscus lens L23 having a concave surface facing the image surface and a positive meniscus lens L24 having a convex surface facing the object. Note that the image side surface of the negative meniscus lens L21 is an aspherical surface. Moreover, the image side surface of the biconcave negative lens L22 is an aspherical surface.

The third lens group G3 is composed of a biconvex positive lens L31.

The fourth lens group G4 is composed of, in order from the object, a cemented positive lens composed of a biconvex positive lens L41 and a bi concave negative lens L42, a cemented positive lens composed of a negative meniscus lens L43 having a concave surface facing the image surface and a biconvex positive lens L44, and a cemented negative lens composed of a biconvex positive lens L45 and a negative meniscus lens L46 having a concave surface facing the object. The image side surface of the negative meniscus lens L46 is an aspherical surface.

An iris stopper S is disposed close to the object of the fourth lens group G4.

A filter group F is disposed on the image side of the fourth lens group G4. The filter group F is composed of a low-pass filter for cutting a spatial frequency more than a marginal dissector of image sensors such as a CCD and CMOS disposed on the image surface I, a cover-glass of an image sensor, etc.

The image surface I is formed on the image sensor which is composed of unillustrated CCDs, CMOSs, etc.

In the amphibious zoom lens ZL13 configured above, the first lens group G1 is always fixed against the image surface I on the axis optical direction, upon switching from the land imaging state to the underwater imaging state, upon zooming from the wide-angle end state to the telephoto end state in each imaging state, and upon focusing on from an infinity object to a short distance object in each imaging state.

The second lens group G2 moves in the image surface direction upon switching from the land imaging state to the underwater imaging state, moves in the image surface direction upon zooming from a wide-angle end state to a telephoto end state in each imaging state, and moves in the object direction upon focusing on from an infinity object to a short distance object in the underwater imaging state.

The third lens group G3 moves in the image surface direction upon switching from the land imaging state to the underwater imaging state, moves in the object direction upon zooming from a wide-angle end state to a telephoto end state in each imaging state.

The fourth lens group G4 moves in the object direction upon zooming from a wide-angle end state to a telephoto end state in each imaging state.

The distance between the first lens group G1 and the second lens group G2 is enlarged when switching from the land imaging state to the underwater imaging state, and is enlarged upon zooming from a wide-angle end state to a telephoto end state in each imaging state. The distance between the second lens group G2 and the third lens group G3 is enlarged when switching from the land imaging state to the underwater imaging state, and decreases upon zooming from a wide-angle end state to a telephoto end state in each imaging state. The distance between the third lens group G3 and the fourth lens group G4 decreases when switching from the land imaging state to the underwater imaging state, decreases upon zooming from a wide-angle end state to a telephoto end state in a land imaging state, and is constant upon zooming from a wide-angle end state to the telephoto end state in the underwater imaging state.

In the present example, it is possible to appropriately correct various aberrations such as curvature of image surface both in the land imaging state and the underwater imaging by changing positions of the second lens group G2 and the third lens group G3 in the land imaging state and the underwater imaging, while constantly maintaining an image-forming position both in the land imaging state and the underwater imaging state.

The following Table 13 illustrates values of each general data in Example 13. The surface numbers 1 to 23 in Table 13 correspond to each optical surfaces of m1 to m23 illustrated in FIG. 72.

TABLE 13

[Lens data]

| Surface number | R | D | nd | νd |
|---|---|---|---|---|
| Object surface | ∞ | | | |
| 1 | 41.3436 | 4.6806 | 1.516800 | 63.88 |
| 2 | 45.8639 | D2 (Variable) | | |
| 3 | 24.1612 | 1.6000 | 1.694120 | 53.35 |
| *4 | 9.1144 | 8.5100 | | |
| 5 | −195.2351 | 1.0000 | 1.773870 | 47.25 |
| *6 | 13.4279 | 4.1000 | | |
| 7 | 56.0101 | 1.0000 | 1.497820 | 82.57 |
| 8 | 13.4601 | 3.5500 | 1.834000 | 37.18 |
| 9 | 103.3689 | D9 (Variable) | | |
| 10 | 82.5542 | 1.3500 | 1.581440 | 40.98 |
| 11 | −46.0399 | D11 (Variable) | | |
| 12 | ∞ | 0.8000 | (Aperture stop S) | |
| 13 | 14.9939 | 2.0000 | 1.497820 | 82.57 |
| 14 | −11.7422 | 0.8000 | 1.744000 | 44.80 |
| 15 | 59.5219 | 1.3300 | | |
| 16 | 16.1639 | 0.8000 | 1.850260 | 32.35 |
| 17 | 12.1436 | 3.1500 | 1.516800 | 63.88 |
| 18 | −18.4745 | 4.4400 | | |
| 19 | 101.1717 | 4.0000 | 1.497820 | 82.57 |
| 20 | −10.0028 | 1.0000 | 1.773870 | 47.25 |
| *21 | −63.0947 | D21 (Variable) | | |
| 22 | ∞ | 2.7900 | 1.516800 | 64.11 |
| 23 | ∞ | Bf | | |
| Image surface | ∞ | | | |

TABLE 13-continued

[Aspheric surface data]

The fourth surface

κ = −1.1413
A4 = +2.77199E−04
A6 = −1.54599E−06
A8 = +1.54168E−08
A10 = −7.92362E−11

The sixth surface

κ = −4.2267
A4 = +3.16984E−04
A6 = −1.83400E−06
A8 = +2.26955E−08
A10 = −7.17311E−11

The 21st surface

κ = +0.7548
A4 = +1.53565E−04
A6 = +6.44429E−07
A8 = +1.23132E−08
A10 = −1.03969E−10

[Various data]

(Land imaging state)

| | | | |
|---|---|---|---|
| f | 7.20 | 9.20 | 13.61 |
| FNO | 3.55 | 3.89 | 4.67 |
| 2ω | 92.00 | 77.97 | 57.18 |
| Y | 8.00 | 8.00 | 8.00 |
| TL | 83.09 | 83.09 | 83.09 |
| D2 | 5.026 | 9.224 | 11.700 |
| D9 | 16.198 | 9.548 | 1.600 |
| D11 | 4.290 | 4.290 | 4.290 |
| D21 | 8.506 | 10.958 | 16.430 |
| Bf | 2.173 | 2.173 | 2.173 |

(Underwater imaging state)

| | | | |
|---|---|---|---|
| f | 5.92 | 7.40 | 10.86 |
| FNO | 3.55 | 3.89 | 4.66 |
| 2ω | 92.00 | 77.97 | 57.18 |
| Y | 8.00 | 8.00 | 8.00 |
| TL | 83.09 | 83.09 | 83.09 |
| D2 | 7.068 | 11.103 | 13.232 |
| D9 | 17.446 | 10.959 | 3.358 |
| D11 | 1.000 | 1.000 | 1.000 |
| D21 | 8.506 | 10.958 | 16.430 |
| Bf | 2.173 | 2.173 | 2.173 |

[Amount of movement upon focusing]

(Land imaging state)

| | | | |
|---|---|---|---|
| f | 7.20 | 9.20 | 13.61 |
| First lens group | 0.000 | 0.000 | 0.000 |
| Second lens group | −0.733 | −0.730 | −0.728 |
| Third lens group | 0.000 | 0.000 | 0.000 |
| Fourth lens group | 0.000 | 0.000 | 0.000 |

(Underwater imaging state)

| | | | |
|---|---|---|---|
| f | 5.92 | 7.40 | 10.86 |
| First lens group | 0.000 | 0.000 | 0.000 |
| Second lens group | −0.645 | −0.605 | −0.585 |
| Third lens group | 0.000 | 0.000 | 0.000 |
| Fourth lens group | 0.000 | 0.000 | 0.000 |

TABLE 13-continued

[Lens group data]

| Group | Front end surface | Rear end surface | Group focus length |
|---|---|---|---|
| First lens group | 1 | 2 | 600.000 |
| Second lens group | 3 | 9 | −12.375 |
| Third lens group | 10 | 11 | 51.030 |
| Fourth lens group | 13 | 21 | 22.082 |

[Position data of each lens group]

(Land imaging state)

| | | | |
|---|---|---|---|
| f | 7.20 | 9.20 | 13.61 |
| First lens group | 0.000 | 0.000 | 0.000 |
| Second lens group | 0.000 | 4.198 | 6.674 |
| Third lens group | 0.000 | −2.452 | −7.924 |
| Fourth lens group | 0.000 | −2.452 | −7.924 |

(Underwater imaging state)

| | | | |
|---|---|---|---|
| f | 5.92 | 7.40 | 10.86 |
| First lens group | 0.000 | 0.000 | 0.000 |
| Second lens group | 2.042 | 6.076 | 8.206 |
| Third lens group | 3.290 | 0.838 | −4.634 |
| Fourth lens group | 0.000 | −2.452 | −7.924 |

[Values corresponding to the conditional expressions]

Conditional expression (4) R1/Enpw = 1.923
Conditional expression (5) φ1/φw = 0.012
Conditional expression (6) φ2/φw = −0.581
Conditional expression (7) φ3/φ4 = 0.433
Conditional expression (8) Δ2w/Δ3w = 0.621
R1 = 41.344
Enpw = 22.784
φ1 = 0.0017
φw = 0.139
φ2 = −0.0808
φ3 = 0.0196
φ4 = 0.0453
Δ2w = 2.042
Δ3w = 3.290

Based on Table 13, the amphibious zoom lens ZL13 according to the present example, the conditional expressions (4) to (8) are satisfied.

Figure 73A:
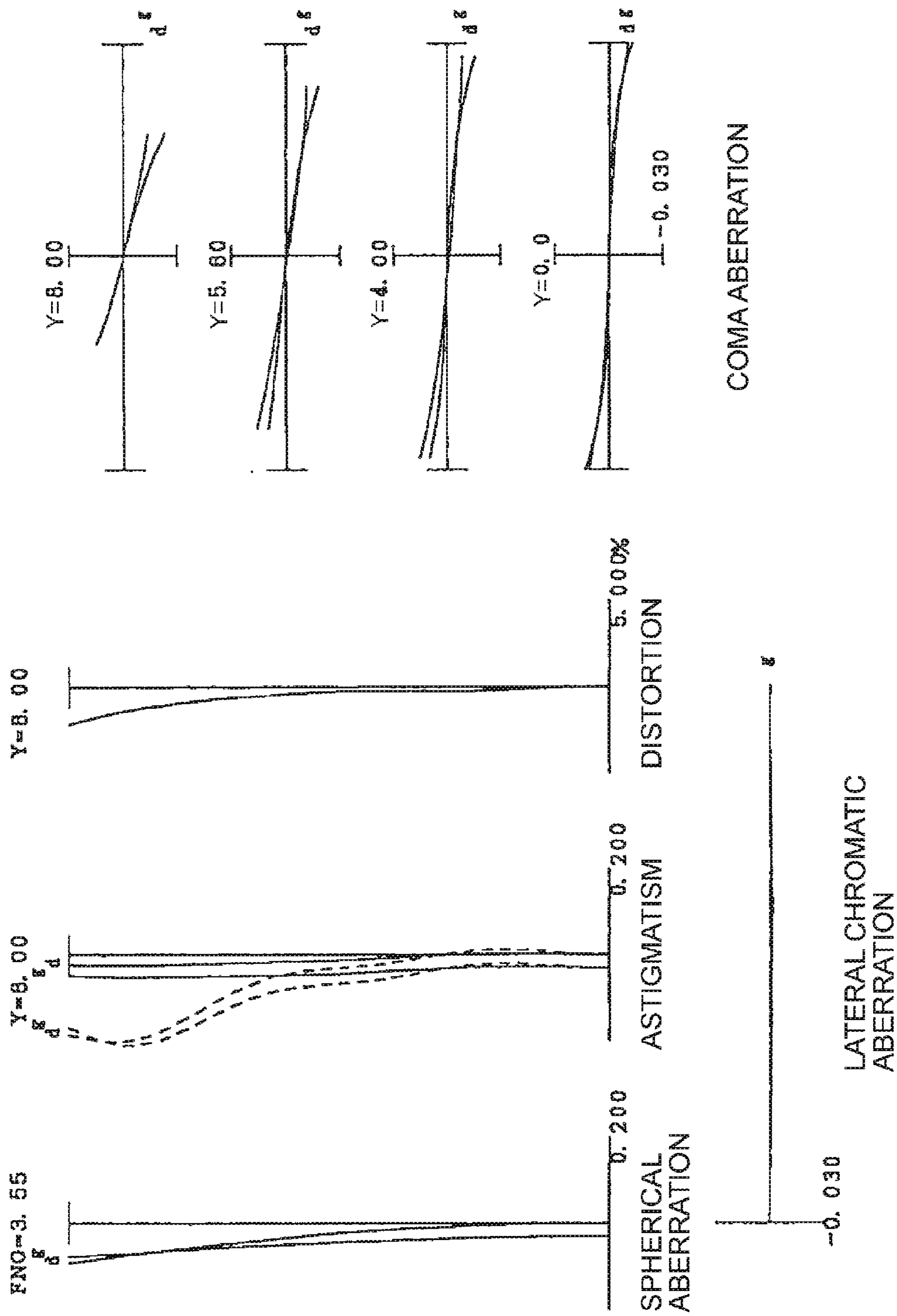
FIGS. 73A, 73B and 73C illustrate a graph showing aberrations in an infinity focusing state in the land imaging state of the amphibious zoom lens according to Example 13, where
Figure 73B:
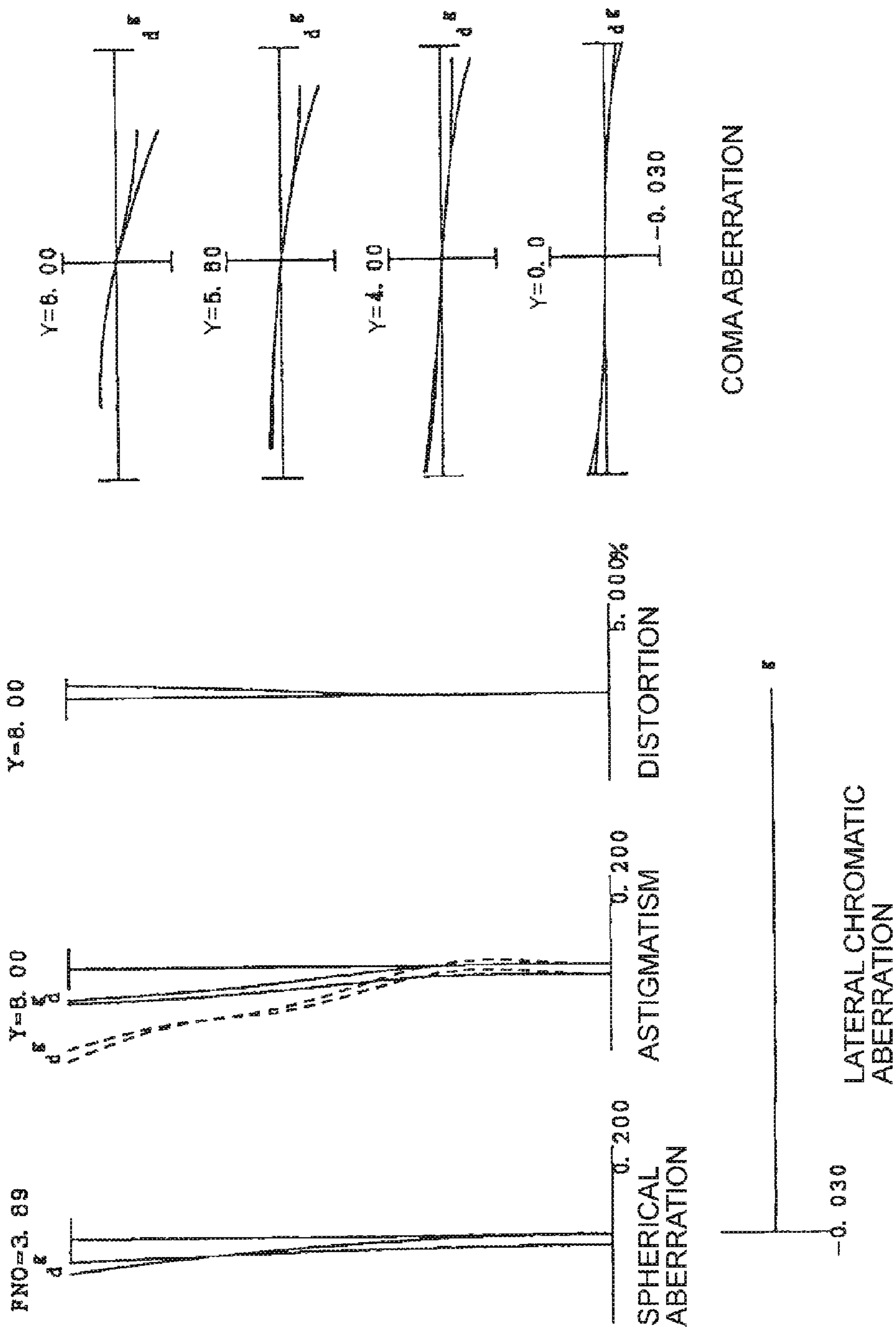
Figure 73C:
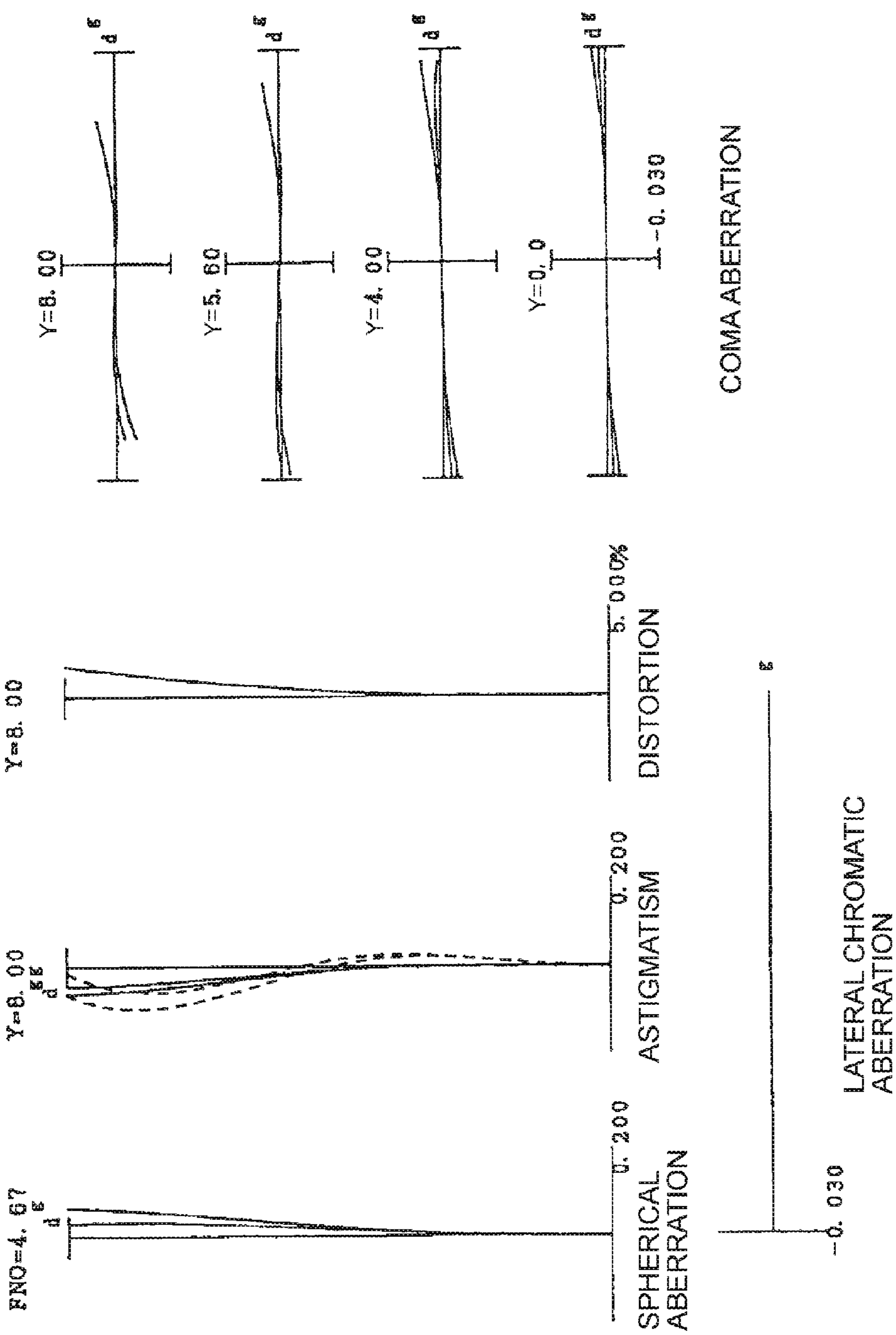
Figure 74A:
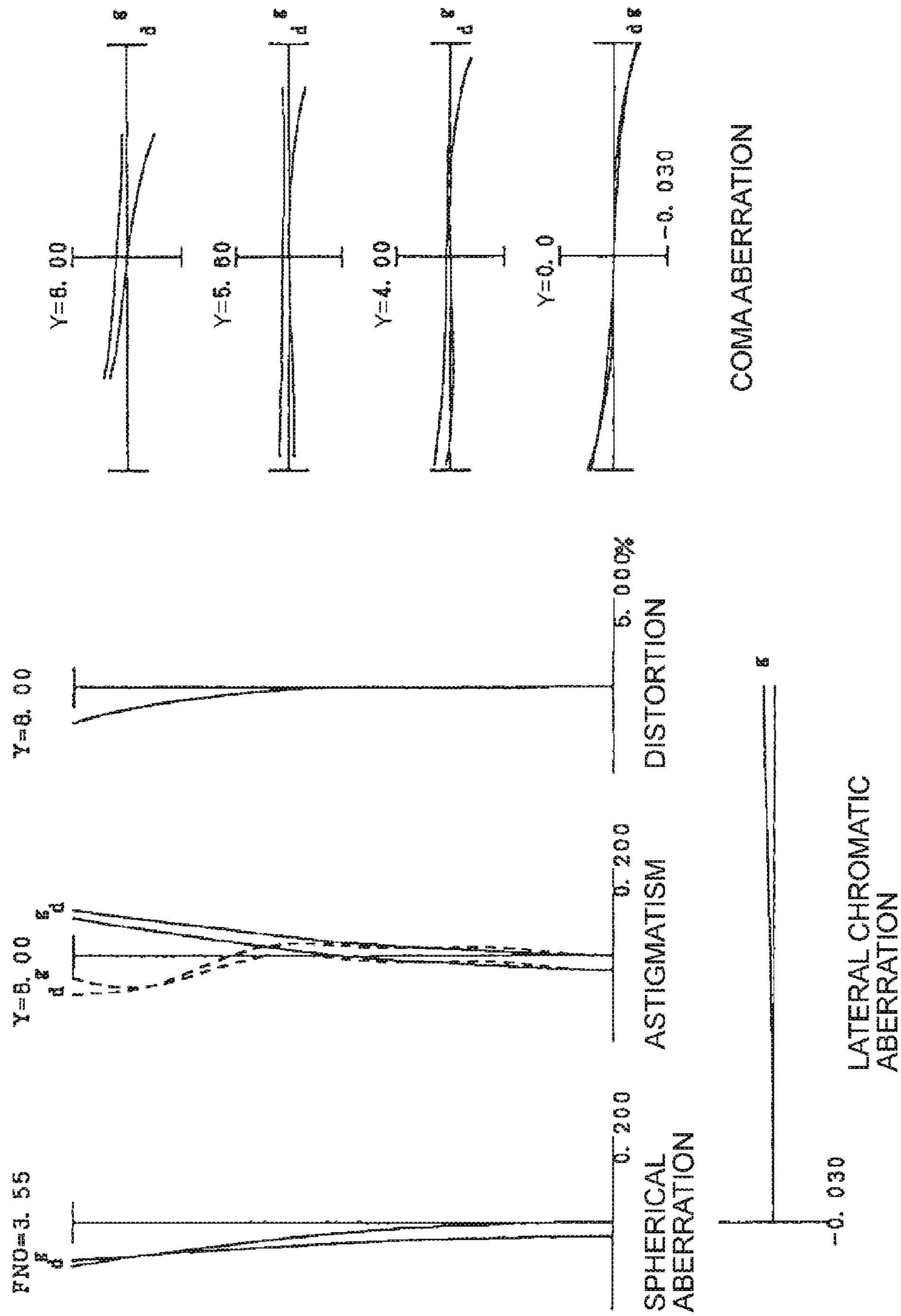
FIGS. 74A, 74B and 74C illustrate a graph showing aberrations in an infinity focusing state in the underwater imaging state of the amphibious zoom lens according to Example 13, where
Figure 74B:
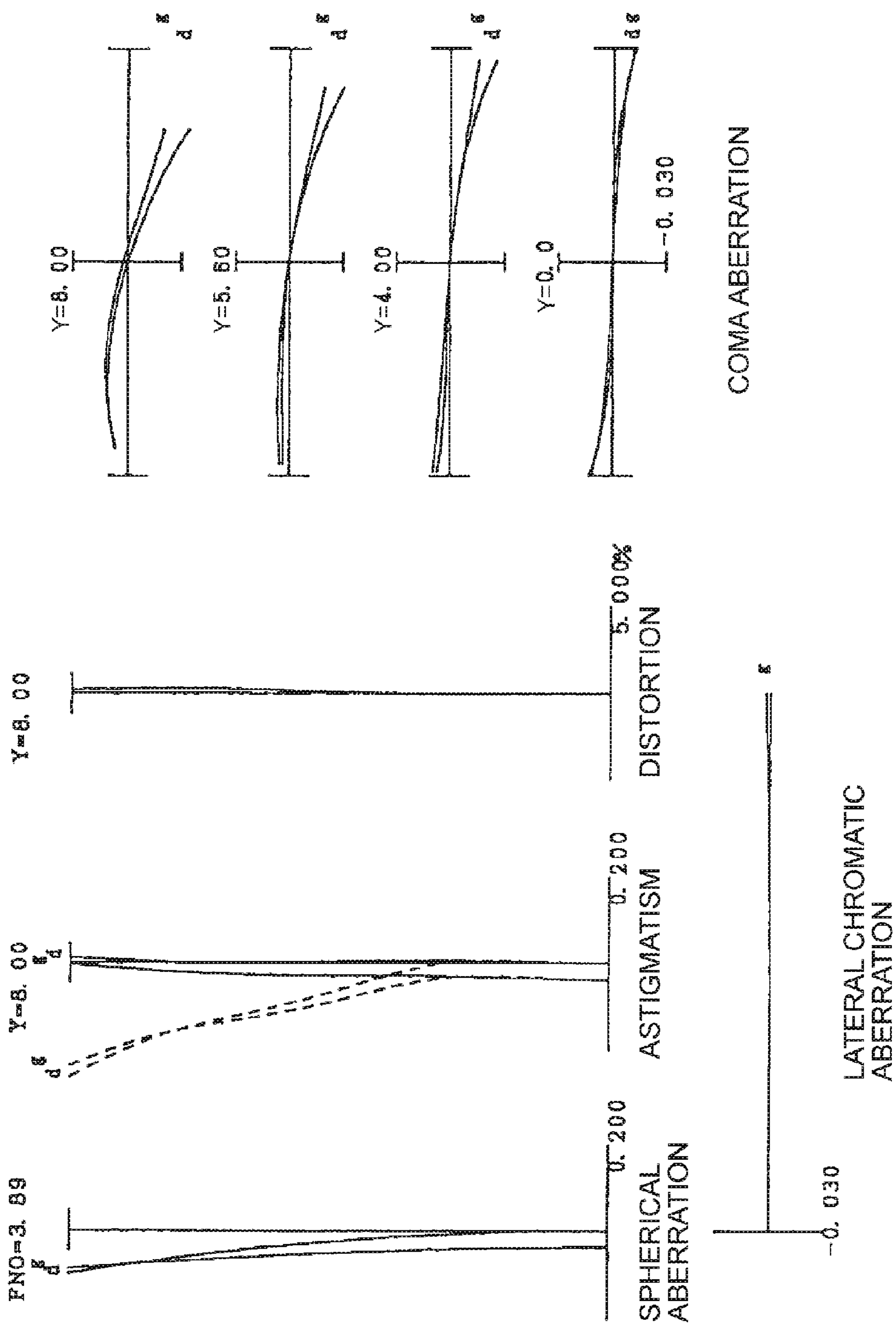
Figure 74C:
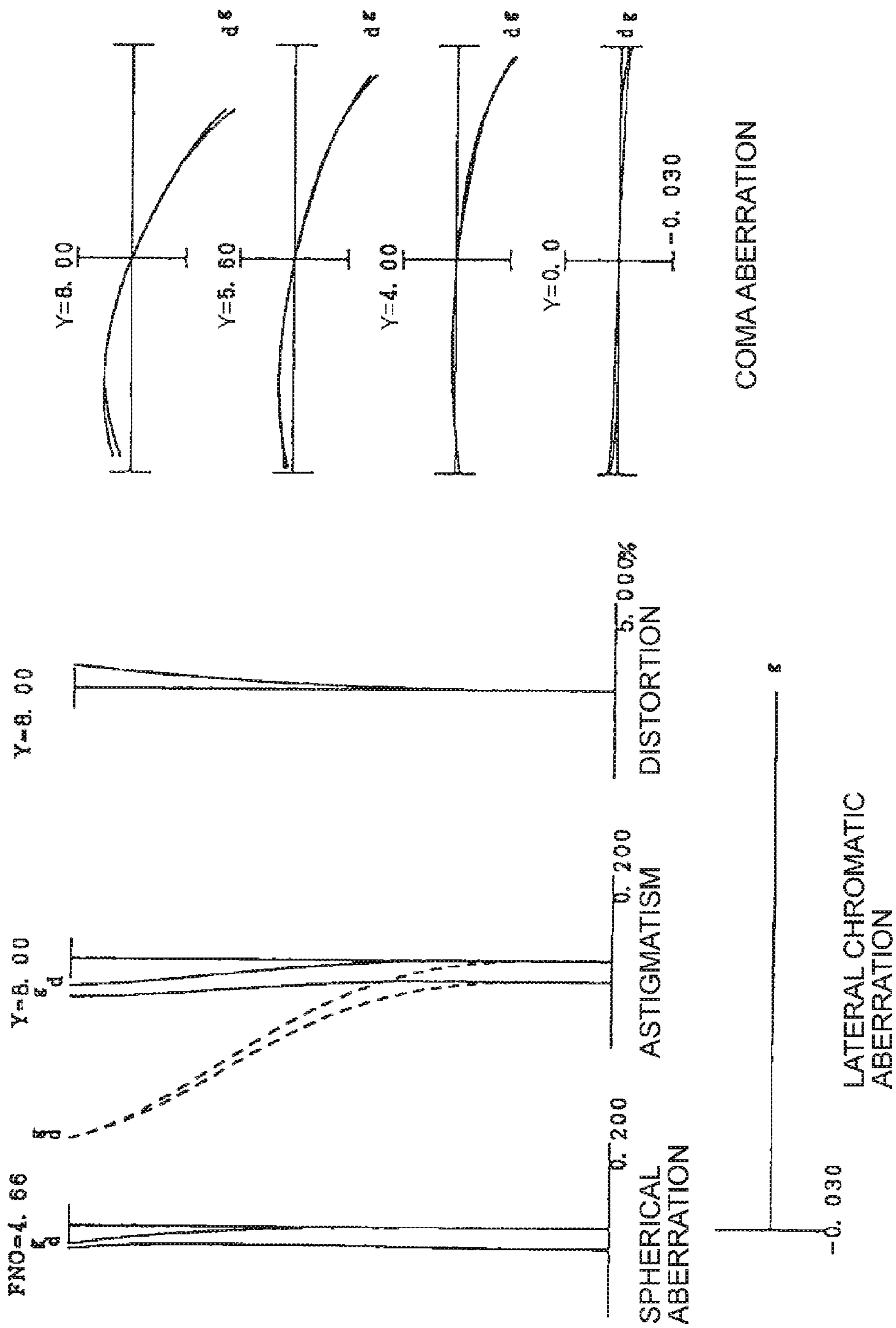
Figure 75A:
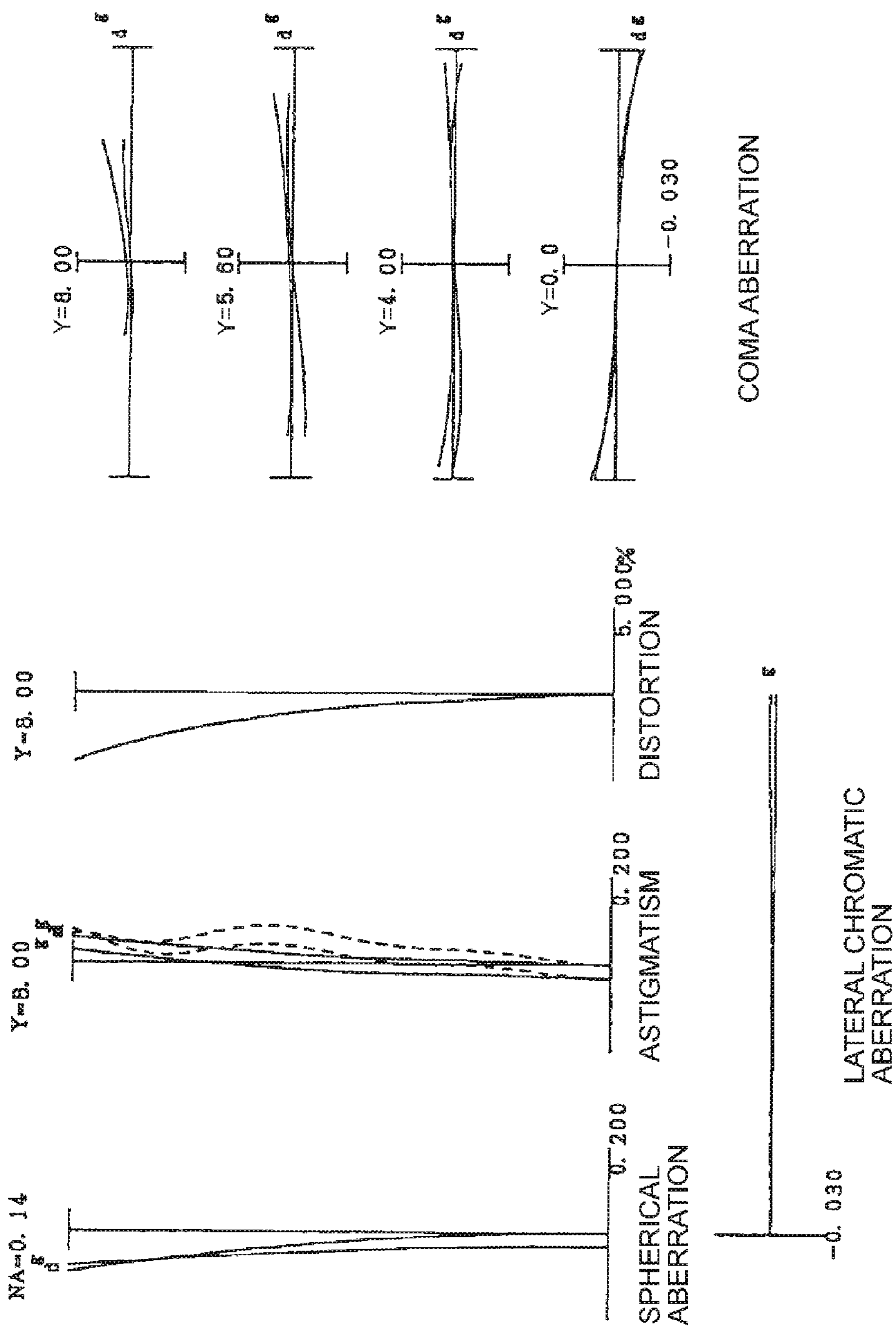
FIGS. 75A, 75B and 75C illustrate a graph showing aberrations in a short distance focusing state of 300 mm of distance between object images in the land imaging state of the anphibious zoom lens according to Example 13, where
Figure 75B:
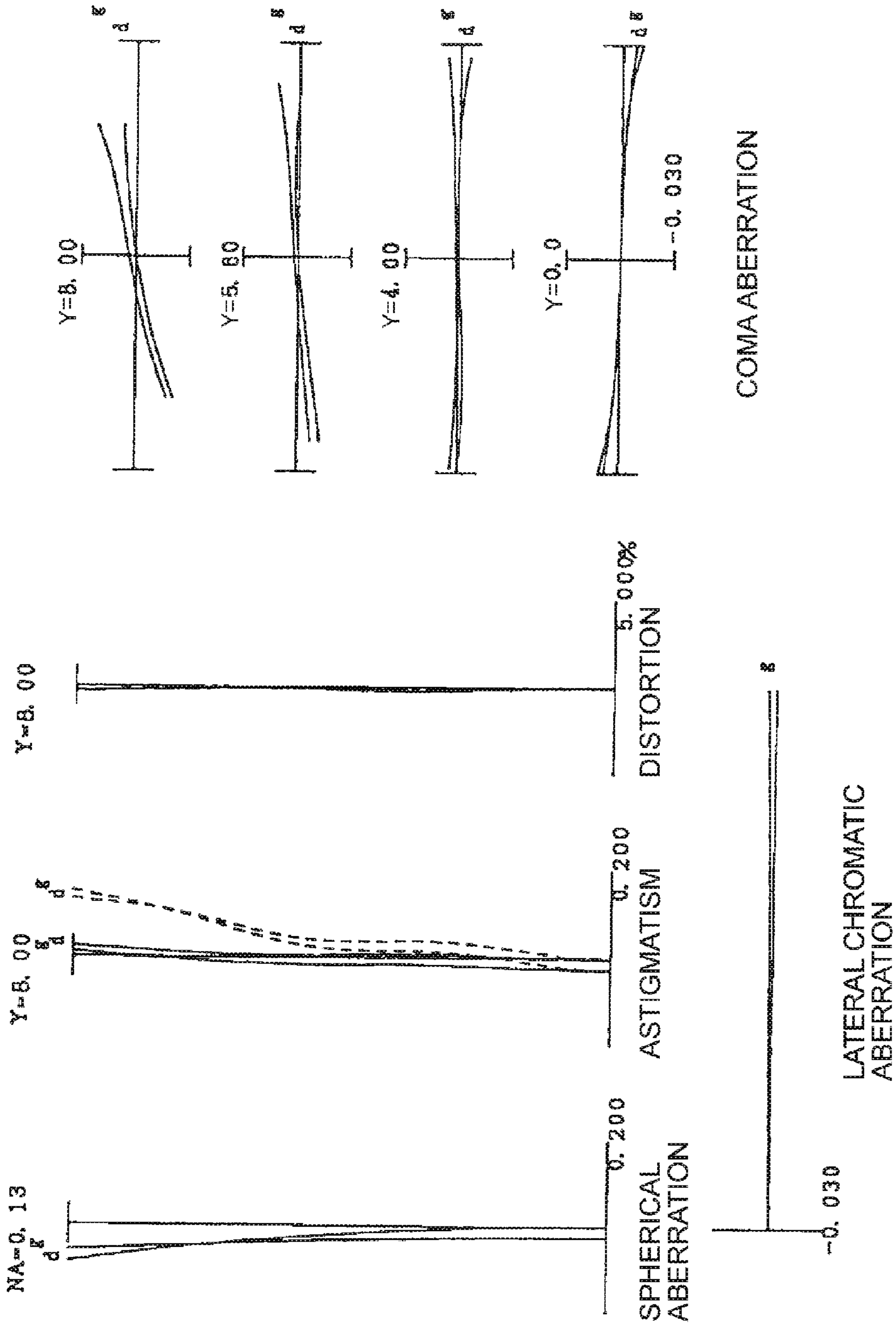
Figure 75C:
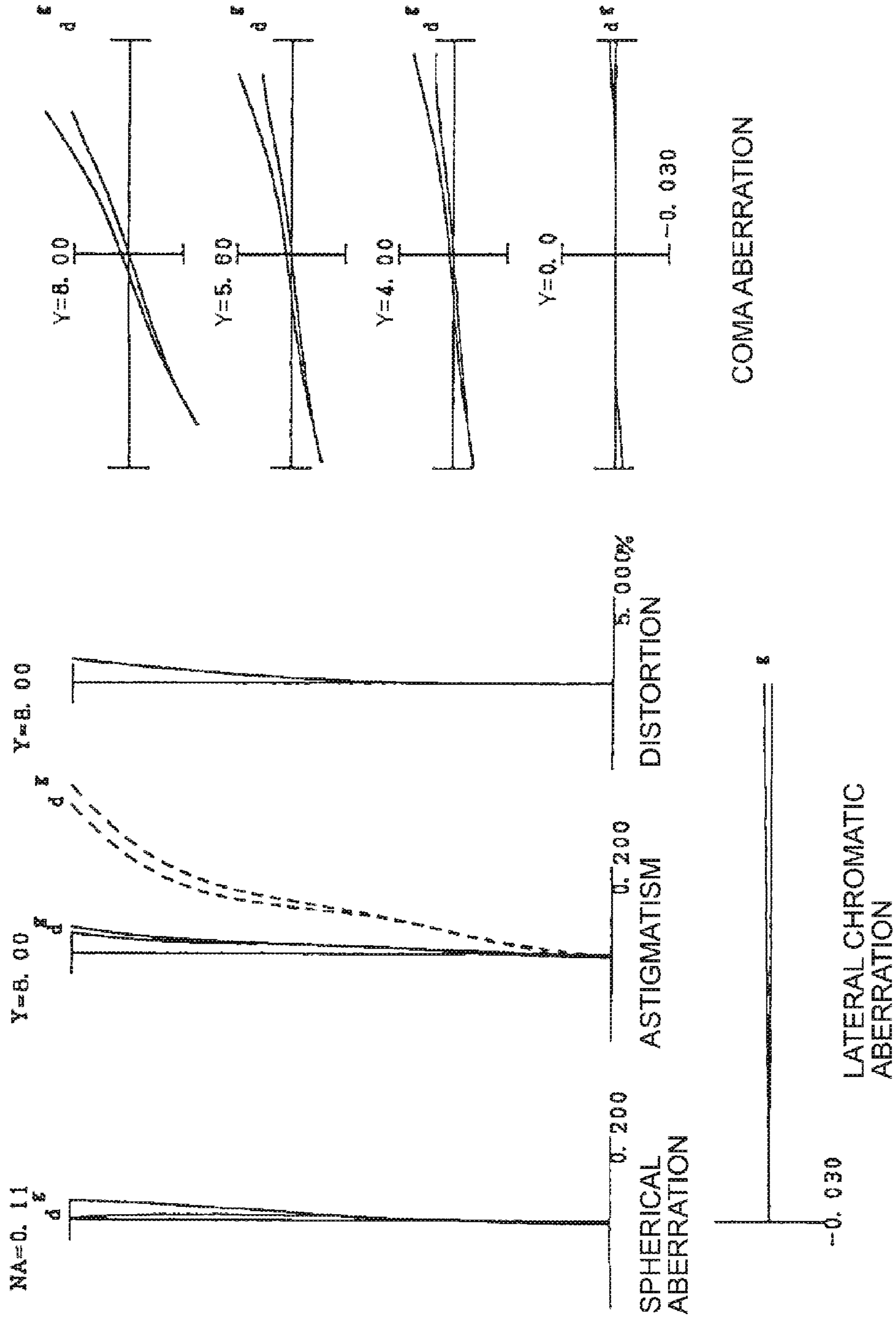
Figure 76A:
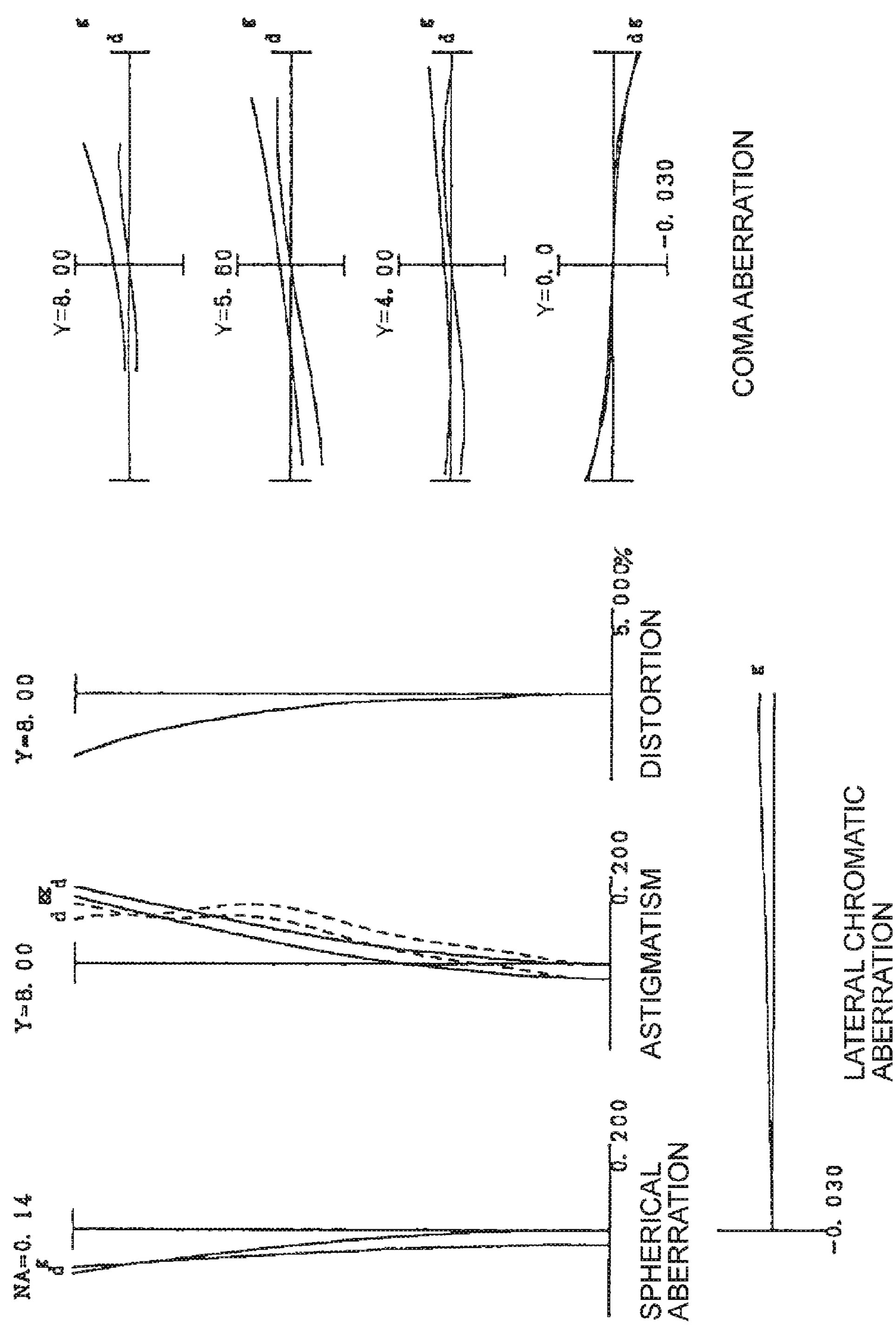
FIGS. 76A, 76B and 76C illustrate a graph showing aberrations in a short distance focusing state of 300 mm of distance between object images in the underwater imaging state of the anphibious zoom lens according to Example 13, where
Figure 76B:
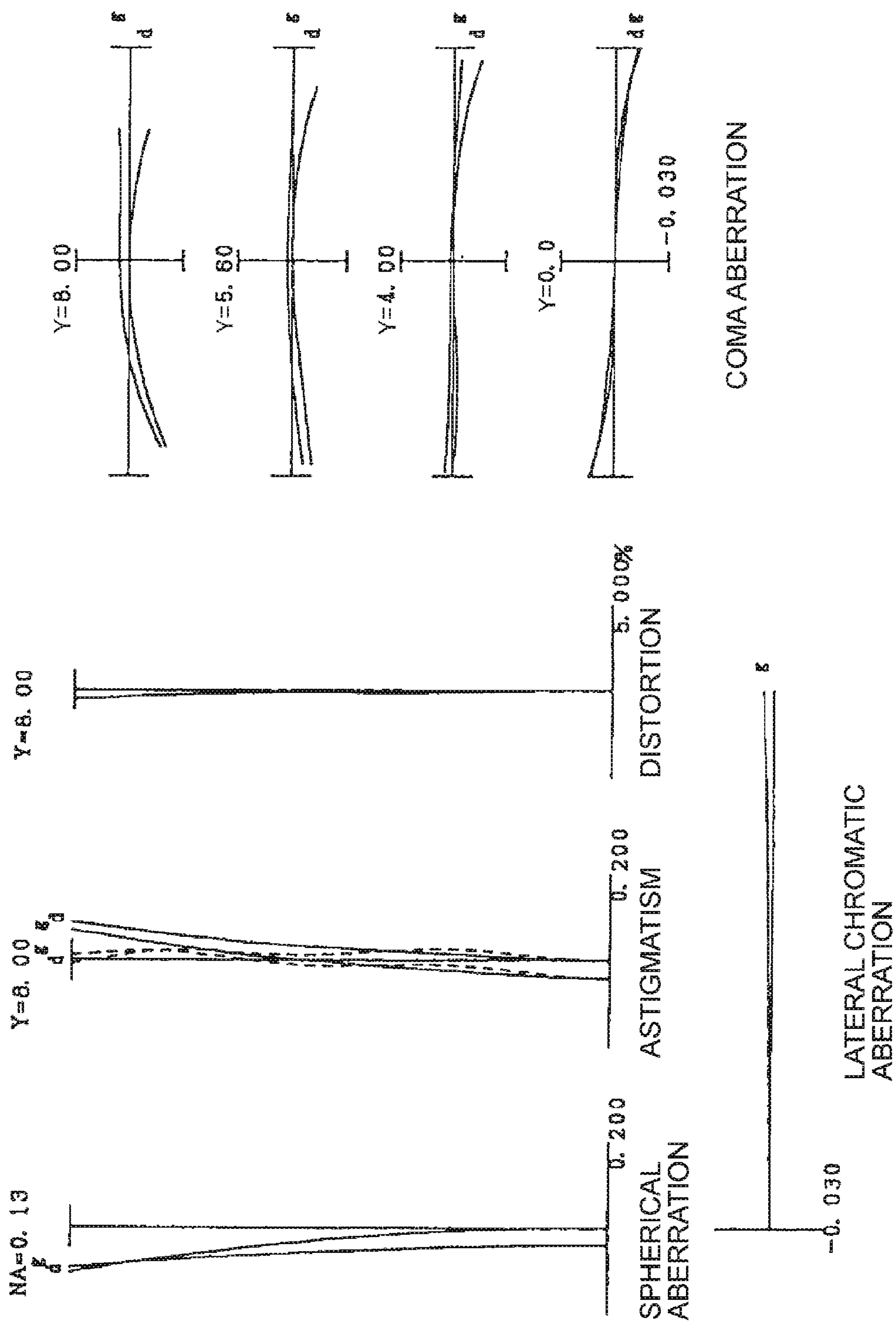
Figure 76C:
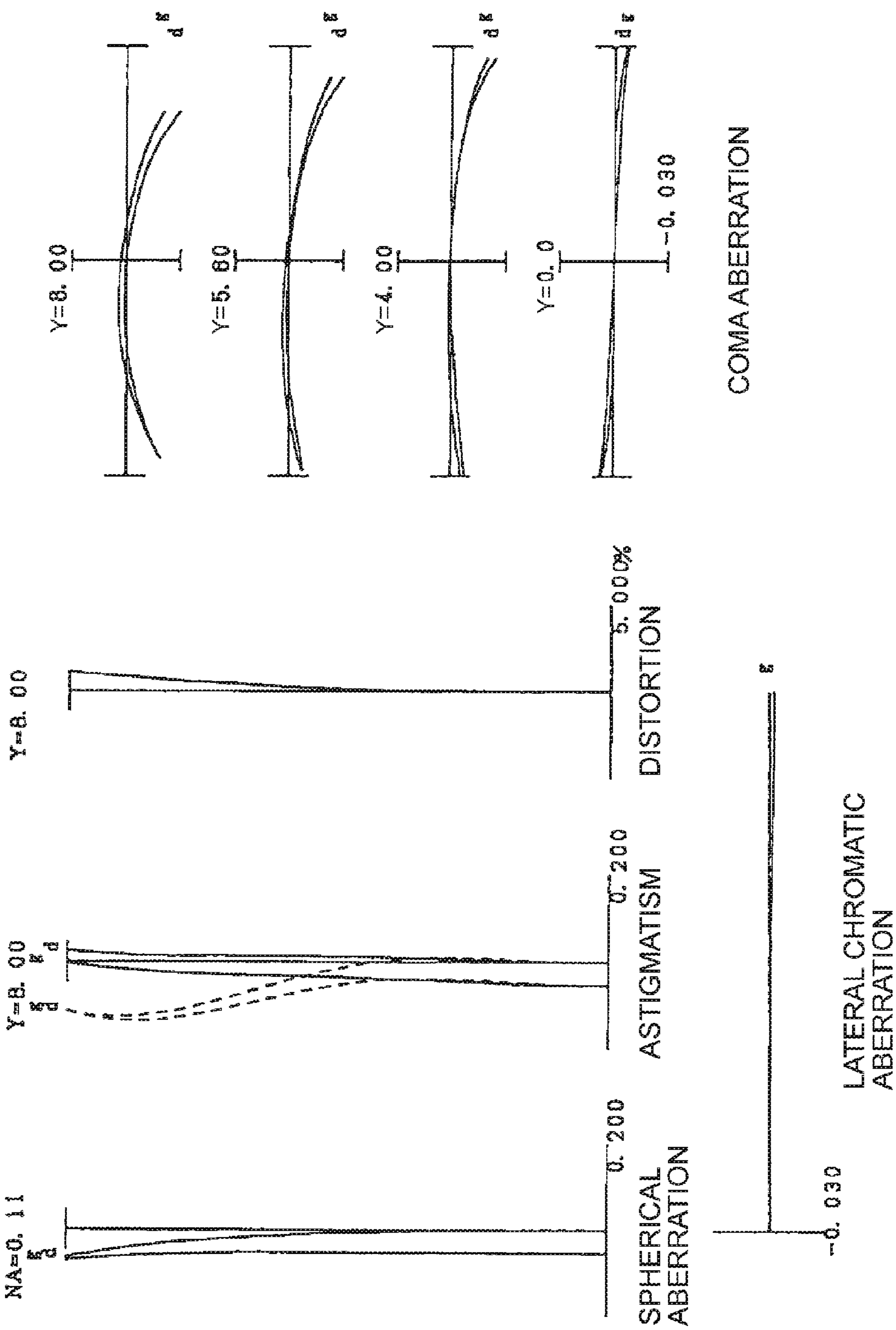

FIGS. 73A, 73B and 73C illustrate a graph showing aberrations in an infinity focusing state in the land imaging state based on design values of the amphibious zoom lens according to Example 13, where FIG. 73A depicts a wide-angle end state, FIG. 73B depicts an intermediate focal length state, and FIG. 73C depicts a telephoto end state. FIGS. 74A, 74B and 74C illustrate a graph showing aberrations in an infinity focusing state in the underwater imaging state based on design values of the amphibious zoom lens according to Example 13, where FIG. 74A depicts the wide-angle end state, FIG. 74B depicts the intermediate focal length state, and FIG. 74C depicts the telephoto end state. FIGS. 75A, 75B and 75C illustrate a graph showing aberrations in a short distance focusing state of 300 mm of distance between object images in the land imaging state based on design values of the amphibious zoom lens according to Example 13, where FIG. 75A depicts the wide-angle end state, FIG. 75B depicts the intermediate focal length state, and FIG. 75C depicts the telephoto end state. FIGS. 76A, 76B and 76C illustrate a graph showing aberrations in a short distance focusing state of 300 mm of distance between object images in the underwater imaging state based on design values of the amphibious zoom lens according to Example 13, where FIG. 76A depicts the wide-angle end state, FIG. 76B depicts the intermediate focal length state, and FIG. 76C depicts the telephoto end state.

Based on each graph showing aberrations, regarding the amphibious zoom lens ZL13 according to Example 13, it is possible to appropriately correct aberrations such as distortion and curvature of image surface, etc. covering a whole zooming range from the infinity focusing state to the short distance focusing state both in the land imaging state and the underwater imaging state, and obtain high image-forming performance.

According to each example, it is possible to provide the amphibious zoom lenses ZL10 to ZL13 capable of, although configurations are simplified, zooming both in the land imaging state and the underwater imaging state while ensuring an ultra wide-angle of view of more than approximately 90 degrees and a more than approximately 1.8 times zooming ratio, and have good optical performance.

As described above with elements of the embodiment attached in order to make the present invention understandable, however the present invention is not limited to the above.

For example, in the examples described above, an example having four group configuration is shown but this can be applied to other group configuration. For instance, this can be applied to an amphibious zoom lens having five group configuration or a six group configuration by adding one lens group or a plurality of lens groups to the fourth lens group G4, adding a lens group having small power between the second lens group and the third lens group, or, respectively adding the each configuration to the each lens groups. Note that a lens group means a component having at least one lens separated with an air interval which changes upon focusing and zooming Moreover, it is appreciated that a focusing lens group is configured to focus from an infinity object on a short distance object by moving a single or a plurality of lens group, or a partial lens group in an optical axis direction. This focusing lens group is also applicable to autofocus, and is also suitable for motor drive for autofocus (using an ultrasonic motor, etc.). In particular, it is preferable that a focusing lens group is configured with the second lens group G2 or the third lens group G3, or both of them.

Moreover, a lens surface may be configured with a spherical surface or a plane, or an aspherical surface. In case a lens surface has a spherical surface or a plane, it is possible to easily have lens processing and an assembly adjustment, and to prevent degradation of optical performance due to errors of processing and an assembly adjustment, thus it is preferable. Moreover, it is preferable because there is less degradation of the depiction performance when an image surface is shifted. In case a lens surface has an aspherical surface, the aspherical surface may be formed with any one of an aspherical surface which is formed through grinding processing, a glass mold aspherical surface in which glass is formed into an aspherical surface configuration using a mold, and a complexed aspherical surface in which a resin is formed on a surface of glass and formed into an aspherical surface configuration. Moreover, a lens surface may be formed as a diffractive surface, additionally a lens may be formed as a graded-index lens (GRIN lens) or a plastic lens.

In each embodiment, a reflection reducing film having high transmissivity within a broad wavelength band may be applied to each lens surface, in order to reduce flare and ghost and to attain good optical performance of high contrast.

Third and Fourth Embodiments

Hereinafter, third and fourth embodiments are described with reference to drawings. Firstly, a characteristic configuration of an optical system common to each embodiment according to the present invention are described. Next, the third embodiment according to the present invention is described with reference to FIG. 57 to FIGS. 61A, 61B and 61C, FIGS. 78 and 79. The fourth embodiment according to the present invention is described with reference to FIG. 62 to FIGS. 66A, 66B and 66C, FIGS. 80 and 81. An imaging device according to these embodiments is described with reference to FIG. 82. Methods for manufacturing according to these embodiments are described with reference to FIG. 83.

As mentioned above, the optical system ZL (ZL10) illustrated in FIG. 57 is also equivalent to Example 10 according to the second embodiment. The optical system ZL (ZL11) illustrated in FIG. 62 is also equivalent to Example 11 according to the second embodiment.

A characteristic configuration of the optical system ZL common to the amphibious zoom lens apparatuses 10 and 100 according to the third and fourth embodiments are described (refer to FIGS. 57 and 62). Note that in FIGS. 57 and 62, a dotted-line shows a moving locus of a lens group in the underwater imaging state, and a solid-line shows a moving locus of a lens group in the land imaging state.

The amphibious zoom lens apparatuses 10 and 100 are capable of imaging in water and on land, and have an optical system ZL comprises, in order from an object along an optical axis, a first lens group G1, and at least three moving lens groups (for instance, a second lens group G2, a third lens group G3, and a fourth lens group G4), wherein zooming is performed by moving the moving lens groups along the optical axis with the lens group G1 fixed, wherein focusing is performed by moving a different moving lens group respectively in the land imaging state and the underwater imaging state (for example, the third lens group G3 in the land imaging state (corresponding to a second focusing lens group in claims) and the second lens group G2 in the underwater imaging state (corresponding to a first focusing lens group in claims)), and the second lens group G2 and the third lens group G3 move in an image direction when switching from the land imaging state to the underwater imaging state.

In the optical system ZL, hermetic in the underwater imaging state is secured by fixing the first lens group G1. Moreover, a zooming action is contributed by the at least three moving lens groups so that zooming is efficiently performed. Moreover, this configuration is advantageous to downsize the optical system. An optimal focusing group can be chosen in accordance with a imaging state by focusing by moving the different moving lens group along the optical axis respectively in the land imaging state and the under water imaging state, therefore, it is possible to suppress a change of an image-forming position while appropriately correct especially curvature of image surface and astigmatism both in the land imaging state and the underwater imaging state.

The optical systems ZL according to the third and fourth embodiments, focusing is performed in the underwater imaging state by moving the moving lens group (for example, the second lens group G2) disposed closest to the object and having negative refractive power, and focusing is performed in the land imaging state by moving the moving lens group (for example, the third lens group G3) disposed in the second closest to the object.

By adopting a focusing method in the land imaging state and the underwater imaging state as mentioned above, it is possible to appropriately correct fluctuation of curvature of image surface upon focusing both in the land imaging state and the underwater imaging state. Especially, in the third and fourth embodiments, as same as an example mentioned below, when switching from the land imaging state to the underwater imaging state, the second lens group G2 and the third lens group G3 are moved in the image surface direction, and when switching from the underwater imaging state to the land imaging state, the second lens group G2 and the third lens group G3 are moved in the object direction, thus the distance between the third lend group G3 and the fourth lens group G4 is relatively wide in the land imaging state, the distance between the first lens group G1 and the second lens group G2 is relatively wide in the underwater imaging state. That is, a distance relatively widen in accordance with a imaging state, therefore, it is possible to sufficiently realize focusing to a short distance object while downsizing a total length of the optical system ZL.

In the optical systems ZL according to the third and fourth embodiments, when a imaging state changes between the land imaging state and the underwater imaging state, it is preferable that at least two lens groups (for instance, the second lens group G2 and the third lens group G3) of the moving lens groups are moved along the optical axis move. Note that when switching from the land imaging state to the underwater imaging state, it is more preferable that the second lens group G2 and the third lens group G3 are moved in the image surface direction along the optical axis. Moreover, when switching from the underwater imaging state to the land imaging state, it is more preferable that the second lens group G2 and the third lens group G3 are moved in the object direction along the optical axis.

With this arrangement, it is possible to concurrently perform a correction of a focusing position, and corrections of various aberrations such as curvature of image surface and distortion in the land imaging state and the underwater imaging state.

The optical systems ZL according to the third and fourth embodiments comprise, in order from an object, a first lens group G1 having positive or negative refractive power, a second lens group G2 having negative refractive power, and a third lens group G3 having positive refractive power, and a fourth lens group G4 having positive refractive power, and it is preferable that zooming is performed by changing an air interval between the first lens group G1 and the second lens group G2, and an air interval between the second lens group G2 and the third lens group G3. An air interval between the third lens group G3 and the fourth lens group G4 may be constant, or changed.

With this arrangement, it is possible to efficiently perform zooming and advantageous to downsizing and widening an angle of the optical system ZL.

In the optical systems ZL according to the third and fourth embodiments, it is preferable that the first lens group G1 is composed of a meniscus lens having a convex surface facing the object. With this arrangement, it is possible to suppress a change of an angle of view when put in water, and suppress a generation of chromatic aberration of distortion, magnification and curvature of image surface.

In the optical systems ZL according to the third and fourth embodiments, it is preferable that s lens disposed closest to the object of the second lens group G2 is a meniscus negative lens having a concave surface facing the image surface. With this arrangement, it is possible to appropriately correct aberrations such as spherical aberration and distortion, etc.

In the optical systems ZL according to the third and fourth embodiments, it is preferable that third lens group G3 is composed of a biconvex positive lens. With this arrangement, it is possible to simplify and downsize a lens configuration, and have cost reduction.

In the optical systems ZL according to the third and fourth embodiments, the first focusing lens group or the second focusing lens group may have a configuration composed of one lens, a plurality of lens groups, or more than one lens which is a part of the lens group.

The optical systems ZL according to the third and fourth embodiments, concerning the first focusing lens and the second focusing lens group, configurations may entirely different from each other (for example, a part of the first focusing lens group may be the second focusing lens groups, or a part of the second focusing lens group may be the first focusing lens group), or moving loci may be different from each other although configurations are same as each other.

In the optical system ZL according to the third and the fourth embodiments, concerning the first focusing lens group and the second focusing lens group, these moving loci may be partially different from each other, moving directions may be different from each other, or the configurations are different from each other although the moving loci are same as each other.

In the optical systems ZL according to the third and fourth embodiments, the first lens group G1 may be a protective glass which does not have refractive power, or a protective glass having weak refractive power.

In the optical systems ZL according to the third and fourth embodiments, "underwater imaging state" is equivalent to a first imaging state set forth in claims, and "land imaging state" is equivalent to a second imaging state set forth in claims. That is, "water (refractive index=1.333 in d-line)" is equivalent to a first medium having first refractive index in claims, and "air (refractive index=1.000 in d-line)" is equivalent to a second medium which has a second refractive index.

Moreover, as first and second object side media, it can be considered to adopt various gas and liquid such as, ethanol (refractive index=1.362 in d-line), kerosene (refractive index=1.447 in d-line), and benzene (refractive index=1.501 in d-line), etc., other than water and air, any of the above are available in the optical system ZL according to the third and fourth embodiments. Note that water is not limited to fresh water, however aqueous solution such as sea water may be adopted.

According to the amphibious zoom lens apparatus 10 and 100 according to the third and fourth embodiments having the optical system ZL having the above configuration, although configurations are simplified, it is possible to zoom and focus both in the land imaging state and the underwater imaging state, and achieve good optical performance.

Third Embodiment

Figure 78:
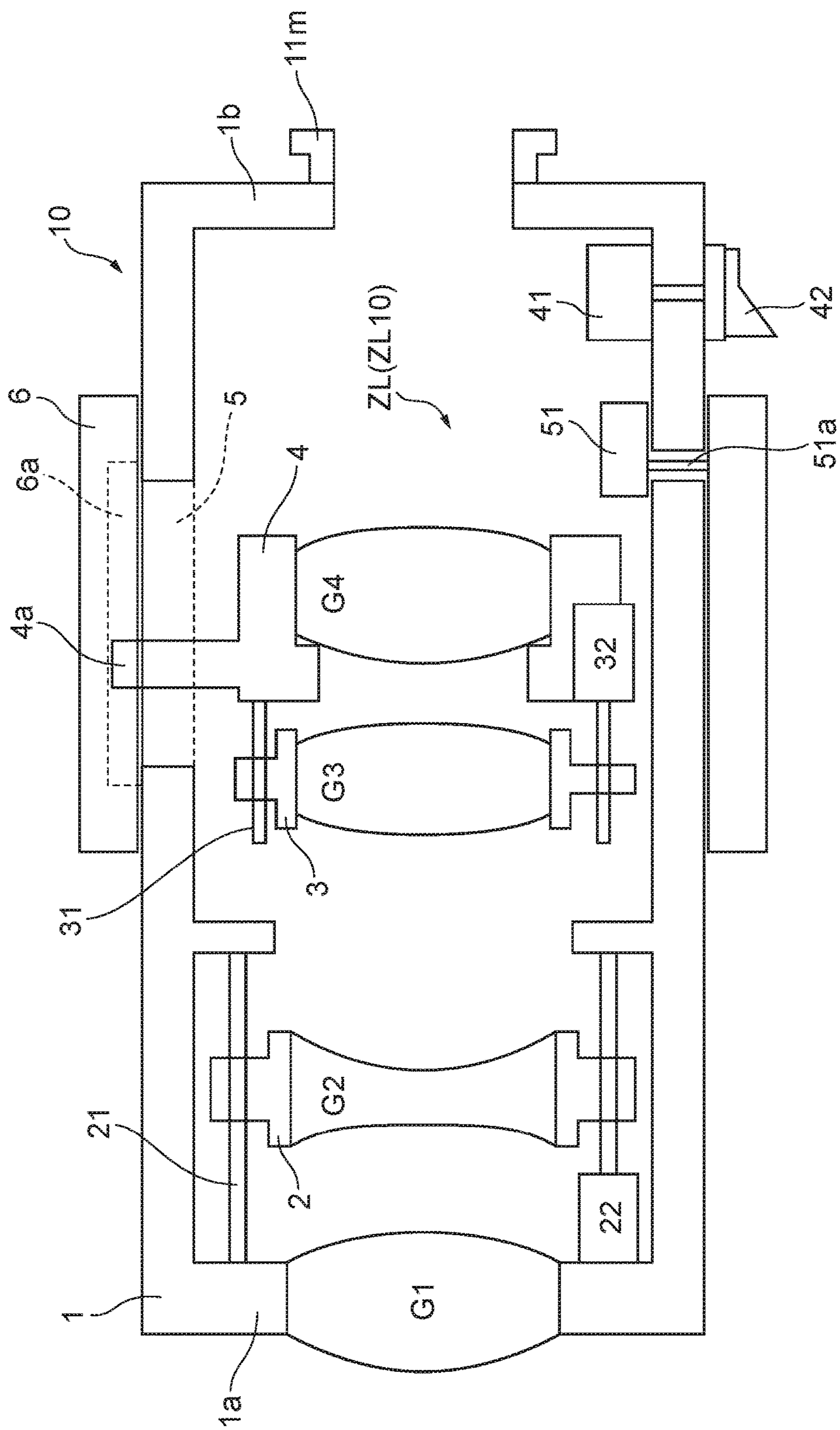
FIG. 78 illustrates a cross-sectional configuration diagram of the anphibious zoom lens apparatus according to a third embodiment.

An amphibious zoom lens apparatus 10 according to the third embodiment is described. as shown in FIG. 78, the amphibious zoom lens apparatus 10 of the third embodiment has an optical system ZL (ZL10) comprising in a body 1, in order from an object, a first lens group G1 having positive refractive power, a second lens group G2 having negative refractive power, a third lens group G3 having positive refractive power, and a fourth lens group G4 having positive refractive power.

The first lens group G1 is fixed in the body 1 on the optical axis via a first lens group holding part 1*a*, and the second lens group G2, the third lens group G3, and the fourth lens group G4 are held by a member mentioned below in the body 1 in a movable manner along the optical axis.

A mount member 11*m* is fixed to an image side end 1*b* of the body 1, and the amphibious zoom lens apparatus 10 is fixed to an imaging device mentioned below by the mount member 11*m*.

Figure 79:
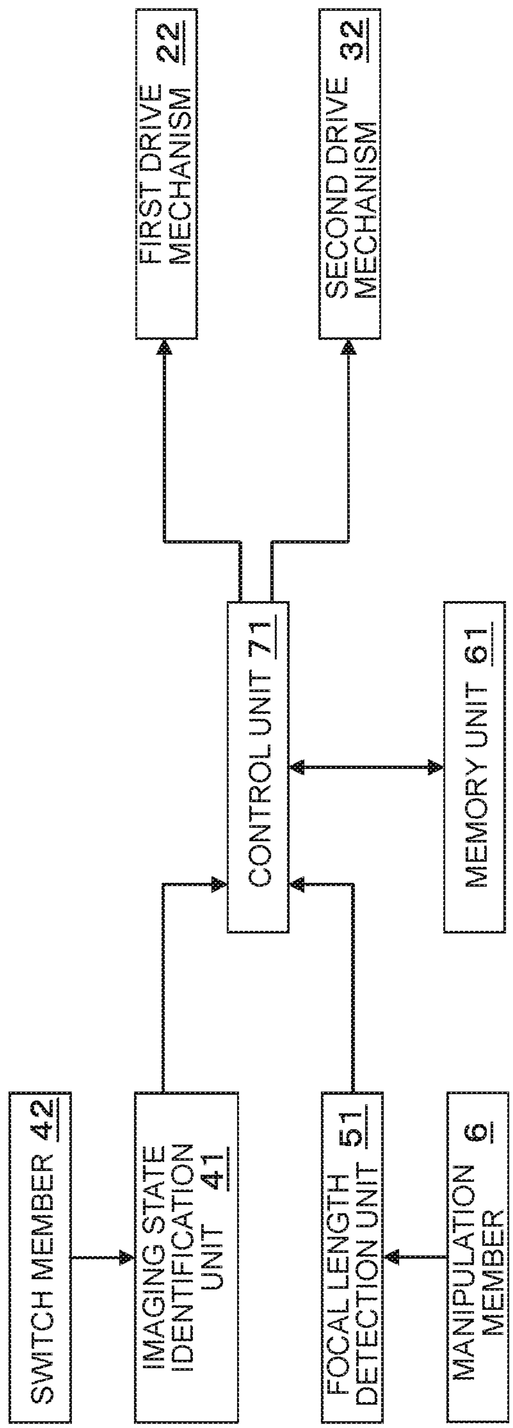
FIG. 79 illustrates a diagram showing a transmission relationship between informational and control of the anphibious zoom lens apparatus according to the third embodiment.

The second lens group G2 is held by a second lens group lens frame 2, the lens frame 2 is held in a sliding manner against a first support member 21 arranged in the body 1, and is configured to move along the optical axis by a first drive mechanism 22 based on a control signal from a control unit 71 shown in FIG. 79.

The fourth lens group G4 is held to the fourth lens group lens frame 4, and a pin 4*a* extending in an radius direction from the lens frame 4 is engaged in a cam groove 6*a* formed on an manipulation member 6 for changing a focal length via a long hole 5 formed on the body 1. The pin 4*a* moves along the cam groove formed on an inner wall of the manipulation member 6 when rotating the manipulation member 6, thereby the fourth lens group G4 moves along the optical axis.

The manipulation member 6 is connected to a focal length detection unit 51 disposed in the body 1 via an interlocking member 51*a*. The focal length detection unit 51 detects a change request of a focal length via the interlocking member 51*a* when the manipulation member 6 is manipulated, and outputs a value of the focal length in response to amount of rotation of the manipulation member 6.

An unillustrated rubber ring is inserted into the the slide part between the manipulation member 6 and the body 1, and this structure prevents water from entering when imaging in water.

A switch member 42 for switching between the land imaging state and the underwater imaging state is provided on an outer surface of the body 1. A imaging state identification unit 41, which identifies a imaging state switched by the switch member 42, is disposed in the body 1. Note that although in the third embodiment switching between the land imaging state and the underwater imaging state is performed by the switch member 42, and a imaging state is identified by the imaging state identification unit 41, it is also considered that whether in the land imaging state or in the underwater imaging state is automatically identified by a sensor, etc.

While the third lens group G3 is held by the third lens group lens frame 3, and the lens frame 3 is supported in a sliding manner against the second support member 31 fixed and disposed by the fourth lens group frame 4, furthermore, is configured to move along the optical axis by a second drive mechanism 32 based on a control signal from the control 71 shown in FIG. 79.

The amphibious zoom lens apparatus 10 according to the third embodiment memorizes, in a memory unit 61 illustrated in FIG. 79, positional information on the optical axis regarding the second lens group G2 and the third lens group G3, set depending on focal lengths, respectively in the land imaging state and the underwater imaging state. Positional information of the second lens group G2 and the third lens group G3 having not memorized focal lengths can be set by performing interpolation processing, etc. by the control unit 71 based on the memorized positional information.

Thus, the amphibious zoom lens apparatus 10 according to the third embodiment is configured.

In the anphibious zoom lens apparatus 10 according to the third embodiment, as shown in FIG. 79, a imaging state identified by the imaging state identification unit 41 when manipulated with the switch member 42 are transmitted to the control unit 71. Moreover, a focal length detected by the focal length detection unit 51 when manipulated with the manipulation member 6 is transferred to the control unit 71.

The control unit 71 reads the positional information on the optical axis regarding the optical axis of the second lens group G2 and the third lens group G3 corresponding to the transferred imaging state and focal length, and respectively independently move the second lens group G2 via the first mechanism 22, and the third lens group G3 via the second mechanism 32 along the optical axis.

Upon focusing, based on the imaging state identified by the imaging state identification unit 41, the control unit 71 performs focusing in the underwater imaging state by moving the second lens group G2 via the first mechanism 22, while the control unit 71 performs focusing in the land imaging state by moving the third lens group G3 via the second drive mechanism 32.

Moreover, when switching a imaging state identified by the imaging state identification unit 41 when manipulated with the switch member 42, the control unit 71 refers to the memory unit 61, moves the second lens group G2 via the first drive mechanism, and moves the third lens group G3 via the second drive mechanism, thereby a change of curvature of image surface and a change of the image-forming position upon switching the imaging state are corrected. More specifically, when switched from the land imaging state to the underwater imaging state, the second lens group G2 and the third lens group G3 are driven in the image surface direction, meanwhile when switched from the underwater imaging state to the land imaging state, the second lens group G2 and the third lens group G3 are driven in the object direction, thereby a change of curvature of image surface and a change of the image-forming position upon switching the imaging state are corrected. Note that when a imaging state is automatically switched using a sensor without providing the switch member 42 the following arrangements are available such as the land imaging state may be switched to the underwater state after detecting the optical system ZL is completely in water, the land imaging state may be switched to the underwater state after detecting the optical system ZL is partially in water, or the underwater state may be switched to the land imaging state after detecting the optical system ZL is completely in water.

Next, an optical system ZL10 having the anphibious zoom lens apparatus 10 according to the third embodiment is described with reference to FIG. 57 to FIGS. 61A, 61B and 61C, and Table 14. A characteristic configuration having the optical system ZL10 which is common with that of the fourth embodiment is previously described.

In each example, d-line (wave length of 587.5620 nm) and g-line (wave length of 435.8350 nm) are selected as subjects for calculating aberration characteristics.

The optical system ZL10 of the anphibious zoom lens apparatus 10 according to the third embodiment is composed of, as shown in FIG. 57, in order from an object, a first lens group G1 having positive refractive power, a second lens group G2 having negative refractive power, a third lens group G3 having positive refractive power, and a fourth lens group G4 having positive refractive power.

The first lens group G1 is composed of a positive meniscus lens L11 having convex surface facing the object.

The second lens group G2 is composed of, in order from the object, a negative meniscus lens L21 having a concave surface facing the image surface, a biconcave negative lens L22, and a cemented positive lens composed of a negative meniscus lens L23 having a concave surface facing the image surface and a positive meniscus lens L24 having a convex surface facing the object. The image side surface of the negative meniscus lens L21 is an aspherical surface. The image side surface of the biconcave negative lens L22 is an aspherical surface.

The third lens group G3 is composed of a biconvex positive lens L31.

The fourth lens group G4 is composed of, in order from the object, a cemented negative lens composed of a biconvex positive lens L41 and a biconcave negative lens L42, a cemented positive lens composed of a negative meniscus lens L43 having a concave surface facing the image surface and a biconvex positive lens L44, and a cemented negative lens composed of a biconvex positive lens L45 and a negative meniscus lens L46 having a concave surface facing the object. The image side surface of the negative meniscus lens L46 is an aspherical surface.

An iris stopper S is disposed close to the object of the fourth lens group G4.

A filter group F is disposed at the image side of the fourth lens group G4. The filter group F is composed of a low-pass filter for cutting a spatial frequency more than a marginal dissector of image sensors such as a CCD and CMOS disposed on the image surface I, a cover-glass of an image sensor, etc.

The image surface I is formed on the image sensor which is composed of unillustrated CCDs, CMOSs, etc.

The first lens group G1 is always fixed against the image surface I in the optical axis direction.

The second lens group G2 is moved by the first drive mechanism 22, and moves in the image surface direction both in the land imaging state and the underwater imaging state, upon zooming from a wide-angle end state to a telephoto end state. Upon focusing on from an infinity object to a short distance object, this does not move in the land imaging state, while moves in the object direction in the underwater imaging state. Moreover, when switching from the land imaging state to the underwater state, this moves in the image surface direction. Upon switching from the underwater imaging state to the land imaging state, this moves in the object direction.

The third lens group G3 moves by the second drive mechanism 32, and follows movement of the fourth lens group G4 in an optical axis direction upon zooming from a wide-angle end state to a telephoto end state, in the land imaging state and the underwater imaging state. Upon focusing on from an infinity object to a short distance object, in the land imaging state, this moves in the image surface direction, however does not move in the underwater imaging state. Moreover, when switching from the land imaging state to the underwater state, this moves in the image surface direction. Upon switching from the underwater imaging state to the land imaging state, this moves in the object direction.

The fourth lens group G4 moves in association with rotation manipulation of the manipulation member 6, and moves in the object direction both in the land imaging state and the underwater imaging state upon zooming from a wide-angle end state to a telephoto end state.

In the optical system ZL10 of the amphibious zoom lens apparatus 10 according to the third embodiment, fluctuation of focusing of curvature of image surface is suppressed both in the land imaging state and the underwater state by switching a lens group moving upon focusing in the land imaging state and underwater imaging, thereby it is possible to achieve good image-forming performance covering a whole imaging distance from an infinity distance to a short distance in a whole zoom range.

Moreover, in the optical system ZL10, upon switching between the land imaging state and the underwater imaging state, by changing positions of the second lens group G2 and the third lens group G3, it is possible to appropriately correct various aberrations such as curvature of image surface both in the land imaging state and underwater state, while constantly maintaining an image-forming position in the land imaging state and underwater state.

The following Table 14 shows various values of the optical system ZL10 of the amphibious zoom lens apparatus 10 according to the third embodiment. The surface numbers 1 to 23 in Table 14 correspond to each optical surface of m1 to m23 shown in FIG. 57.

In the [Lens data] in tables, a surface number means an order of each optical surface from the object side along a direction light travels, R means a radius of curvature of each optical surface, D means a surface distance on the optical axis from each optical surface to the next optical surface (or image surface), nd means a refractive index in d-line of a material of a light member, and νd means an Abbe number on the basis of d-line of a material of the light member. Object surface means an object surface, (Variable) means a variable distance between surfaces, "∞" of a radius of curvature means a plane or an aperture, (Aperture stop S) means an iris stopper S, and an image surface means an image surface I. The refractive index "1.000000" of air is omitted. In case the optical surface is an aspherical surface, a sign "*" is assigned to the surface number and a paraxial radius of curvature is shown in a column of a radius of curvature R.

In [aspherical surface data] in tables, regarding the aspherical surfaces in the [Lens data], the configuration is defined by the following expression (c). X(y) means a distance along the optical axis direction from a tangent plane in a vertex of the aspherical surface to a position on the aspherical surface in height y, and R means a radius of curvature (paraxial radius of curvature) of a criterion spherical surface, κ means a conic constant, and, Ai means an i-th aspherical surface coefficient. "E-n" means "$\times 10^{-n}$." For example, it is 1.234E-05=$1.234\times 10^{-5}$.

$$X(y)=(y^2/R)/\{1+(1-\kappa\times y^2/R^2)^{1/2}\}+A4\times y^4+A6\times y^6+A8\times y^8+A10\times y^{10} \quad \text{(c)}$$

In [Various data] in tables, f means a focal length of a lens whole system, and FNo means a f number, 2ω means an angle of view (unit: degree), Y means an image height, TL means a total length of a lens (a distance from a lens surface closest to a paraxial image surface on the optical axis), and BF means backfocus. Moreover, Di means a variable distance, a variable distance between an i-th surface and an (i+1)-th surface.

In [Amount of movement upon focusing] in tables means amount of movement of each lens group upon focusing from an object distance infinity to an object distance of 300 mm (however, a positive symbol means amount of movement in the image surface direction, while a negative symbol means amount of movement in the object direction).

[Lens group data] in tables shows a front end surface number (a number of a lens surface closest to the object), a rear end surface number (a number of a lens closest to the image surface), and a focal length in the air, in each lens group.

[Position data of each lens group] in tables shows a position of each lens group in an infinity imaging state in each focal length of the land imaging state and the underwater imaging state, on the basis of a position of each lens group in an infinity imaging state in a wide-angle end state in the land imaging state. In symbols the image surface direction is positive.

Hereinafter, in all general data values, regarding the focal length f, a radius of curvature R, a distance D, and other lengths, etc. "mm" is generally used except a specific request, however an optical system is not limited to the above, since equivalent optical performance can be obtained even if the optical system is proportionally enlarged or proportionally shrinked. Moreover, the unit is not limited to "mm," another appropriate unit is available, instead.

The explanations concerning the tables are common among all the examples.

TABLE 14

[Lens data]

| Surface number | R | D | nd | νd |
|---|---|---|---|---|
| Object surface | ∞ | | | |
| 1 | 44.7198 | 7.4084 | 1.516800 | 63.88 |
| 2 | 85.2163 | D2 (Variable) | | |
| 3 | 40.9646 | 1.6000 | 1.694120 | 53.35 |
| *4 | 9.2893 | 8.5100 | | |
| 5 | −185.3860 | 1.0000 | 1.773870 | 47.25 |
| *6 | 13.9269 | 4.1000 | | |
| 7 | 59.8385 | 1.0000 | 1.497820 | 82.57 |
| 8 | 14.0189 | 3.5500 | 1.834000 | 37.18 |
| 9 | 123.5879 | D9 (Variable) | | |
| 10 | 79.9753 | 1.3500 | 1.581440 | 40.98 |
| 11 | −39.3744 | D11 (Variable) | | |
| 12 | ∞ | 0.8000 | (Aperture stop S) | |
| 13 | 13.2562 | 2.0000 | 1.497820 | 82.57 |
| 14 | −15.0400 | 0.8000 | 1.744000 | 44.80 |
| 15 | 26.7221 | 1.3300 | | |
| 16 | 13.3337 | 0.8000 | 1.850260 | 32.35 |
| 17 | 10.0972 | 3.1500 | 1.516800 | 63.88 |
| 18 | −24.7694 | 4.4400 | | |
| 19 | 53.6117 | 4.0000 | 1.497820 | 82.57 |
| 20 | −10.0893 | 1.0000 | 1.773870 | 47.25 |
| *21 | −46.0788 | D21 (Variable) | | |
| 22 | ∞ | 2.7900 | 1.516800 | 64.11 |
| 23 | ∞ | Bf | | |
| Image surface | ∞ | | | |

[Aspheric surface data]

The fourth surface

κ = −1.1413
A4 = +2.64855E−04
A6 = −1.38810E−06
A8 = +1.32889E−08
A10 = −6.76083E−11

The sixth surface

κ = −4.2267
A4 = +2.73709E−04
A6 = −1.40274E−06
A8 = +1.65481E−08
A10 = −4.59585E−11

The 21st surface

κ = +0.7548
A4 = +1.41639E−04
A6 = +1.03122E−06
A8 = −6.77508E−09
A10 = +2.70786E−10

TABLE 14-continued

[Various data]

(Land imaging state)

| | | | |
|---|---|---|---|
| f | 7.20 | 9.20 | 13.60 |
| FNO | 3.55 | 3.85 | 4.55 |
| 2ω | 96.87 | 81.79 | 60.29 |
| Y | 8.00 | 8.00 | 8.00 |
| TL | 83.05 | 83.05 | 83.05 |
| D2 | 2.002 | 6.557 | 9.751 |
| D9 | 14.725 | 8.893 | 1.600 |
| D11 | 5.585 | 4.566 | 3.468 |
| D21 | 8.950 | 11.247 | 16.443 |
| Bf | 2.162 | 2.162 | 2.162 |

(Underwater imaging state)

| | | | |
|---|---|---|---|
| f | 6.10 | 7.56 | 10.93 |
| FNO | 3.54 | 3.85 | 4.54 |
| 2ω | 90.47 | 77.30 | 57.21 |
| Y | 8.00 | 8.00 | 8.00 |
| TL | 83.05 | 83.05 | 83.05 |
| D2 | 5.528 | 8.768 | 10.717 |
| D9 | 15.785 | 10.099 | 2.995 |
| D11 | 1.000 | 1.149 | 1.108 |
| D21 | 8.950 | 11.247 | 16.443 |
| Bf | 2.162 | 2.162 | 2.162 |

[Amount of movement upon focusing]

(Land imaging state)

| | | | |
|---|---|---|---|
| f | 7.20 | 9.20 | 13.60 |
| First lens group | 0.000 | 0.000 | 0.000 |
| Second lens group | 0.000 | 0.000 | 0.000 |
| Third lens group | 0.679 | 0.733 | 0.836 |
| Fourth lens group | 0.000 | 0.000 | 0.000 |

(Underwater imaging state)

| | | | |
|---|---|---|---|
| f | 6.10 | 7.56 | 10.93 |
| First lens group | 0.000 | 0.000 | 0.000 |
| Second lens group | −0.618 | −0.600 | −0.590 |
| Third lens group | 0.000 | 0.000 | 0.000 |
| Fourth lens group | 0.000 | 0.000 | 0.000 |

[Lens group data]

| Group | Front end surface | Rear end surface | Group focus length |
|---|---|---|---|
| First lens group | 1 | 2 | 171.404 |
| Second lens group | 3 | 9 | −10.875 |
| Third lens group | 10 | 11 | 45.567 |
| Fourth lens group | 13 | 21 | 22.715 |

[Position data of each lens group]

(Land imaging state)

| | | | |
|---|---|---|---|
| f | 7.20 | 9.20 | 13.60 |
| First lens group | 0.000 | 0.000 | 0.000 |
| Second lens group | 0.000 | 4.555 | 7.749 |
| Third lens group | 0.000 | −1.278 | −5.376 |
| Fourth lens group | 0.000 | −2.297 | −7.493 |

(Underwater imaging state)

| | | | |
|---|---|---|---|
| f | 6.10 | 7.56 | 10.93 |
| First lens group | 0.000 | 0.000 | 0.000 |
| Second lens group | 3.526 | 6.766 | 8.715 |
| Third lens group | 4.585 | 2.139 | −3.016 |
| Fourth lens group | 0.000 | −2.297 | −7.493 |

FIGS. 58A, 58B and 58C illustrate a graph showing aberrations in an infinity focusing state in a land imaging state based on design values of the optical system ZL10 of the amphibious zoom lens 10 according to the third embodiment, where FIG. 58A depicts a wide-angle end state, FIG. 58B depicts an intermediate focal length state, and FIG. 58C depicts a telephoto end state. FIGS. 59A, 59B and 59C illustrate a graph showing aberrations in an infinity focusing state in an underwater imaging state based on design values of the optical system ZL10 of the anphibious zoom lens 10 according to the third embodiment, where FIG. 59A depicts the wide-angle end state, FIG. 59B depicts the intermediate focal length state, and FIG. 59C depicts the telephoto end state. FIGS. 60A, 60B and 60C illustrate a graph showing aberrations in a short distance focusing state of 300 mm of distance between object images in the land imaging state based on design values of the optical system ZL10 of the amphibious zoom lens 10 according to the third embodiment, where FIG. 60A depicts the wide-angle end state, FIG. 60B depicts the intermediate focal length state, and FIG. 60C depicts the telephoto end state. FIGS. 61A, 61B and 61C illustrate a graph showing aberrations in a short distance focusing state of 300 mm of distance between object images in the underwater imaging state based on design values of the optical system ZL10 of the amphibious zoom lens 10 according to the third embodiment, where FIG. 61A depicts the wide-angle end state, FIG. 61B depicts the intermediate focal length state, and FIG. 61C depicts the telephoto end state.

In each graph showing aberrations, FNO means a f number and Y means an image height. Moreover, d means an aberration of d-line, and g means an aberration of g-line. What are described without those d and g mean aberrations of d-line. In a graph showing astigmatism, a solid-line shows a sagittal image surface, and a dashed-line shows a meridional image surface.

The descriptions mentioned above can also be applied to other examples mentioned below.

Based on each graph showing aberrations, regarding the optical system ZL10 of the amphibious zoom lens ZL10 according to the third embodiment, it is possible to appropriately correct aberrations such as distortion and curvature of image surface, etc. covering a whole zooming range from the infinity focusing state to the short distance focusing state both in the land imaging state and the underwater imaging state, and obtain high image-forming performance.

Note that in the third embodiment as a method for identifying whether the land imaging state or the underwater state, as described above, the switch member 42 is provided in the body 1 and the method for identifying in response to switching manipulation of a photographer, however, it is not limited to the above. For example, it is possible to provide two terminals exposed from the body 1, and adopt a method for automatically identifying by measuring electrical resistance between the two terminals. With this arrangement, it is possible to improve convenience upon using.

Fourth Embodiment

Figure 80:
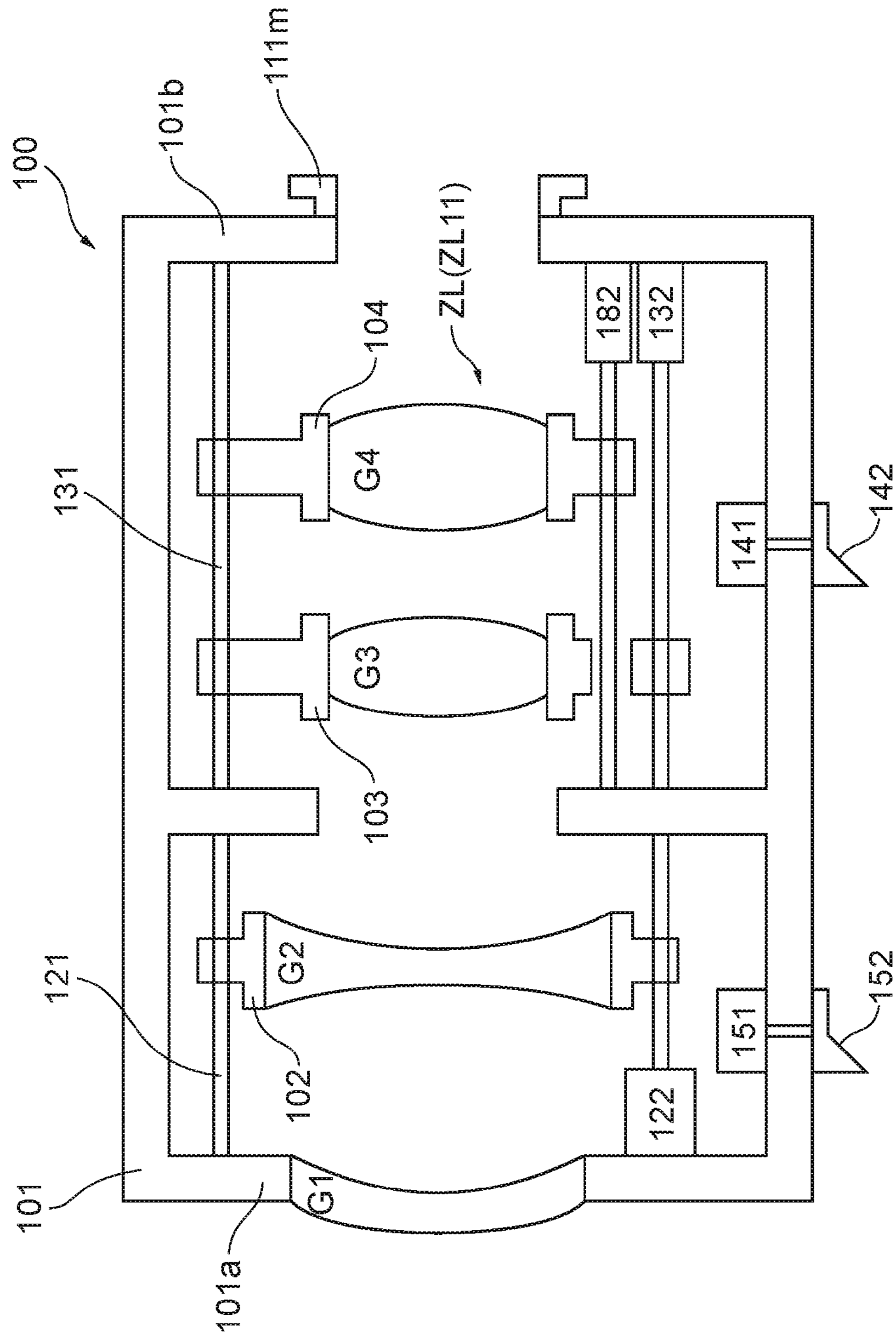
FIG. 80 illustrates a cross-sectional configuration diagram of the amphibious zoom lens apparatus according to a fourth embodiment.

An amphibious zoom lens apparatus according to a fourth embodiment is described. as shown in FIG. 80, the amphibious zoom lens apparatus 100 according to the fourth embodiment comprises an optical system ZL (ZL11) in a body 101, which is composed of, in order from an object, a first lens group G1 having negative refractive power, a second lens group G2 having negative refractive power, a third lens group G3 having positive refractive power, and a fourth lens group G4 having positive refractive power.

The first lens group G1 is fixed in the body 101 via a lens group holding part 101*a* on the optical axis, and the second lens group G2, the third lens group G3, and the fourth lens group G4 are supported in the body 101 by a member described below in a manner of respectively independently movable along the optical axis.

A focal length change switch member 152 for changing a focal length is provided on the outer surface of the body 101. The focal length detection unit 151, which detects a change request of a focal length in response to manipulation of the focal length change switch member 152, is disposed in the body 101.

An imaging state switch member 142 for switching between the underwater imaging state and the land imaging state is provided on the outer surface of the body 101. An imaging state identification unit 141, which identifies an imaging state switched by the imaging state switch member 142, is disposed in the body 101.

A mount member 111*m* is fixed to the image side end 101*b* of the body 101, and the amphibious zoom lens apparatus 100 is fixed to an imaging device mentioned below by the mount member 111*m*.

Figure 81:
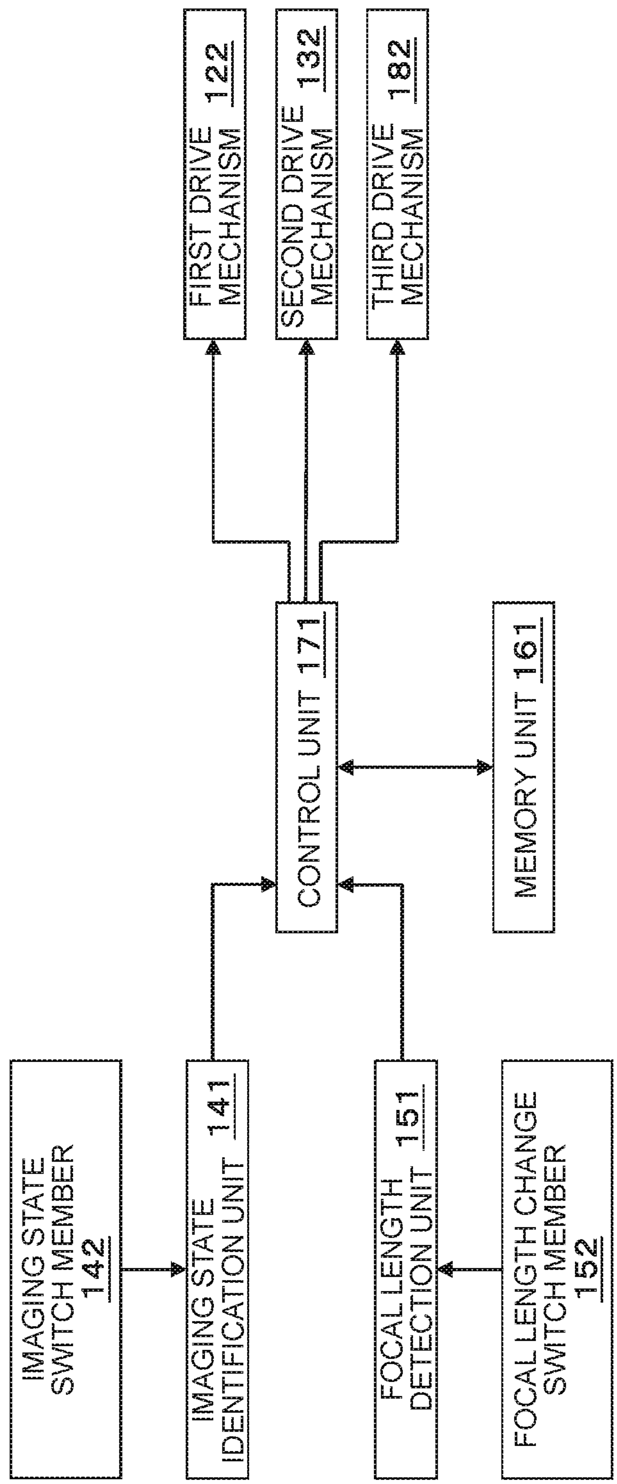
FIG. 81 illustrates a diagram showing the transmission relationship between the informational and control of the amphibious zoom lens apparatus according to the fourth embodiment.

The second lens group G2 is held at the second lens group lens frame 102, and this lens frame 102 is supported in a manner of sliding the first support member 121 disposed in the body 101, and is configured to move along the optical axis by the first drive mechanism 122 based on a control signal from the control unit 171 illustrated in FIG. 81.

The third lens group G3 is held at the third lens group lens frame 103, and this lens frame 103 is supported in a manner of sliding the second support member 131 disposed in the body 101, and is configured to move along the optical axis by the second drive mechanism 132 based on a control signal from the control unit 171.

The fourth lens group G4 is held at the fourth lens group lens frame 104, and this lens frame 104 is supported in a manner of sliding the third support member 141 disposed in the body 101, and is configured to move along the optical axis by the third drive mechanism 182 based on a control signal from the control unit 171.

The amphibious zoom lens apparatus 100 according to the fourth embodiment memorizes, in a memory unit 161 illustrated in FIG. 81, positional information on the optical axis of the second lens group G2, the third lens group G3 and the fourth lens group G4, set depending on focal lengths, respectively in the land imaging state and the underwater imaging state. Positional information of the second lens group G2, the third lens group G3, and the fourth lens group G4 having not memorized focal lengths can be set by performing interpolation processing, etc. by the control unit 171 based on the memorized positional information.

Thus, the amphibious zoom lens apparatus 100 according to the fourth embodiment is configured.

In the amphibious zoom lens apparatus 100 according to the fourth embodiment, as shown in FIG. 81, an imaging state identified by the imaging state identification unit 141 when manipulated with the switch member 142 are transmitted to the control unit 171. A focal length change request detected by the focal length detection unit 151 when the focal length change switch member 152 is manipulated is transmitted to the control unit 171.

The control unit 171 reads the positional information on the optical axis regarding the optical axis of the second lens group G2, the third lens group G3, and the third lens group G4 corresponding to the transferred imaging state and the focal length change request, and respectively independently move the second lens group G2 via the first mechanism 122, the third lens group G3 via the second mechanism 132, and the fourth lens group G4 via the third mechanism 182 to a certain optical axial position.

Upon focusing, based on the imaging state identified by the imaging state identification unit 141, the control unit 171 performs focusing in the underwater imaging state by moving the second lens group G2 via the first mechanism 122, while the control unit 171 performs focusing in the land imaging state by moving the third lens group G3 via the second drive mechanism 132.

Moreover, when switching an imaging state identified by the imaging state identification unit 141 when manipulated with the switch member 142, the control unit 171 refers to the memory unit 161, moves the second lens group G2 via the first drive mechanism 122, and moves the third lens group G3 via the second drive mechanism 132, thereby a change of curvature of image surface and a change of the image-forming position upon switching the imaging state are corrected. More specifically, when switched from the land imaging state to the underwater imaging state, the second lens group G2 and the third lens group G3 are driven in the image surface direction, meanwhile when switched from the underwater imaging state to the land imaging state, the second lens group G2 and the third lens group G3 are driven in the object direction, thereby a change of curvature of image surface and a change of the image-forming position upon switching the imaging state are corrected.

Next, the optical system ZL11 with having the amphibious zoom lens apparatus 100 according to the fourth embodiment is described with reference to FIG. 62 to FIGS. 66A, 66B and 66C, and Table 15. A characteristic configuration having the optical system ZL11 which is common with that of the fourth embodiment is previously described.

The optical system ZL11 of the amphibious zoom lens apparatus 100 according to the fourth embodiment is composed of, as shown in FIG. 62, in order from an object, a first lens group G1 having negative refractive power, a second lens group G2 having negative refractive power, a third lens group G3 having positive refractive power, and a fourth lens group G4 having positive refractive power.

The first lens group G1 is composed of a negative meniscus lens L11 having a convex surface facing the object.

The second lens group G2 is composed of, in order from an object, a negative meniscus lens L21 having a concave surface facing the image surface, a biconcave negative lens L22, and a cemented positive lens composed of a negative meniscus lens L23 having a concave surface facing the image surface and a positive meniscus lens L24 having a convex surface facing the object. The image side surface of the negative meniscus lens L21 is an aspherical surface. The image side surface of the biconcave negative lens L22 is an aspherical surface.

The third lens group G3 is composed of a biconvex positive lens L31.

The fourth lens group G4 is composed of, in order from the object, a cemented negative lens composed of a biconvex positive lens L41 and a biconcave negative lens L42, a cemented positive lens composed of a negative meniscus lens L43 having a concave surface facing the image surface and a biconvex positive lens L44, and a cemented negative lens composed of a biconvex positive lens L45 and a negative meniscus lens L46 having a concave surface facing the object. The image side surface of the negative meniscus lens L46 is an aspherical surface.

An iris stopper S is disposed close to the object of the fourth lens group G4.

A filter group F is arranged at the image side of the fourth lens group G4. The filter group F is composed of a low-pass filter for cutting a spatial frequency more than a marginal dissector of image sensors such as a CCD and CMDS disposed on the image surface I, a cover-glass of an image sensor, etc.

The image surface I is formed on the image sensor which is composed of unillustrated CCDs, CMOSs, etc.

The first lens group G1 is always fixed against the image surface I in the optical axis direction.

The second lens group G2 is moved by the first drive mechanism 122, and moves in the image surface direction both in the land imaging state and the underwater imaging state upon zooming from a wide-angle end state to a telephoto end state. Upon focusing on from an infinity object to a short distance object, this does not move in the land imaging state, while moves in the object direction in the underwater imaging state. Moreover, when switching from the land imaging state to the underwater state, this moves in the image surface direction. Upon switching from the underwater imaging state to the land imaging state, this moves in the object direction.

The third lens group G3 moves by the second drive mechanism 132, and moves, upon zooming from a wide-angle end state to a telephoto end state, to the image side in the land imaging state and the underwater imaging state. Upon focusing on from an infinity object to a short distance object, in the land imaging state, this moves in the image surface direction, and does not move in the underwater imaging state. Moreover, when switching from the land imaging state to the underwater state, this moves in the image surface direction. Upon switching from the underwater imaging state to the land imaging state, this moves in the object direction.

The fourth lens group G4 is moved by the third drive mechanism 182, and moves in the object direction both in the land imaging state and the underwater imaging state upon zooming from a wide-angle end state to a telephoto end state.

In the optical system ZL11 of the amphibious zoom lens apparatus 100 according to the fourth embodiment, fluctuation of focusing of curvature of image surface is suppressed both in the land imaging state and the underwater state by switching a lens group moving upon focusing in the land imaging state and underwater imaging, thereby it is possible to achieve good image-forming performance covering whole imaging distance from an infinity distance to a short distance in a whole zoom range.

Moreover, in the optical system ZL11, upon switching between the land imaging state and the underwater imaging state, by changing positions of the second lens group G2 and the third lens group G3, it is possible to appropriately correct various aberrations such as curvature of image surface both in the land imaging state and underwater state, while constantly maintaining an image-forming position in the land imaging state and underwater state.

The following Table 15 shows various values of the optical system ZL11 of the amphibious zoom lens apparatus 100 according to the fourth embodiment. The surface numbers 1 to 23 in Table 15 correspond to each optical surface of m1 to m23 shown in FIG. 62.

TABLE 15

[Lens data]

| Surface number | R | D | nd | νd |
|---|---|---|---|---|
| Object surface | ∞ | | | |
| 1 | 39.4129 | 6.5983 | 1.516800 | 63.88 |
| 2 | 32.2463 | D2 (Variable) | | |
| 3 | 21.3416 | 1.6000 | 1.694120 | 53.35 |
| *4 | 9.1366 | 8.5100 | | |
| 5 | −101.6596 | 1.0000 | 1.773870 | 47.25 |
| *6 | 13.7116 | 4.1000 | | |
| 7 | 42.4699 | 1.0000 | 1.497820 | 82.57 |
| 8 | 14.6837 | 3.5500 | 1.834000 | 37.18 |
| 9 | 108.9141 | D9 (Variable) | | |
| 10 | 72.2919 | 1.3500 | 1.581440 | 40.98 |
| 11 | −43.0390 | D11 (Variable) | | |
| 12 | ∞ | 0.8000 | (Aperture stop S) | |
| 13 | 14.4857 | 2.0000 | 1.497820 | 82.57 |
| 14 | −14.0908 | 0.8000 | 1.744000 | 44.80 |
| 15 | 33.6293 | 1.3300 | | |
| 16 | 12.9152 | 0.8000 | 1.850260 | 32.35 |
| 17 | 10.0596 | 3.1500 | 1.516800 | 63.88 |
| 18 | −23.5021 | 4.4400 | | |
| 19 | 78.9820 | 4.0000 | 1.497820 | 82.57 |
| 20 | −8.9039 | 1.0000 | 1.773870 | 47.25 |
| *21 | −50.0522 | D21 (Variable) | | |
| 22 | ∞ | 2.7900 | 1.516800 | 64.11 |
| 23 | ∞ | Bf | | |
| Image surface | ∞ | | | |

[Aspheric surface data]

The fourth surface

κ = −1.1413
A4 = +2.71136E−04
A6 = −1.43827E−06
A8 = +1.29997E−08
A10 = −7.11747E−11

The sixth surface

κ = −4.2267
A4 = +2.90451E−04
A6 = −1.49834E−06
A8 = +1.79993E−08
A10 = −6.44088E−11

The 21st surface

κ = +0.7548
A4 = +1.63105E−04
A6 = +9.56800E−07
A8 = +5.91250E−09
A10 = +3.58088E−11

[Various data]

(Land imaging state)

| | | | |
|---|---|---|---|
| f | 7.20 | 9.20 | 13.60 |
| FNO | 3.55 | 3.93 | 4.76 |
| 2ω | 96.99 | 81.30 | 60.09 |
| Y | 8.00 | 8.00 | 8.00 |
| TL | 83.07 | 83.07 | 83.07 |
| D2 | 2.003 | 6.774 | 9.923 |
| D9 | 16.478 | 9.353 | 1.600 |
| D11 | 5.416 | 5.079 | 4.001 |
| D21 | 8.177 | 10.868 | 16.551 |
| Bf | 2.178 | 2.178 | 2.178 |

(Underwater imaging state)

| | | | |
|---|---|---|---|
| f | 5.82 | 7.33 | 10.77 |
| FNO | 3.55 | 3.93 | 4.75 |
| 2ω | 92.95 | 78.21 | 57.48 |
| Y | 8.00 | 8.00 | 8.00 |
| TL | 83.07 | 83.07 | 83.07 |
| D2 | 5.205 | 9.229 | 11.137 |
| D9 | 17.690 | 10.673 | 3.116 |
| D11 | 1.003 | 1.305 | 1.271 |
| D21 | 8.177 | 10.868 | 16.551 |
| Bf | 2.178 | 2.178 | 2.178 |

[Amount of movement upon focusing]

(Land imaging state)

| | | | |
|---|---|---|---|
| f | 7.20 | 9.20 | 13.60 |
| First lens group | 0.000 | 0.000 | 0.000 |
| Second lens group | 0.000 | 0.000 | 0.000 |

TABLE 15-continued

| | | | |
|---|---|---|---|
| Third lens group | 0.736 | 0.740 | 0.806 |
| Fourth lens group | 0.000 | 0.000 | 0.000 |
| (Underwater imaging state) | | | |
| f | 5.82 | 7.33 | 10.77 |
| First lens group | 0.000 | 0.000 | 0.000 |
| Second lens group | −0.634 | −0.580 | −0.557 |
| Third lens group | 0.000 | 0.000 | 0.000 |
| Fourth lens group | 0.000 | 0.000 | 0.000 |

[Lens group data]

| Group | Front end surface | Rear end surface | Group focus length |
|---|---|---|---|
| First lens group | 1 | 2 | −499.997 |
| Second lens group | 3 | 9 | −13.044 |
| Third lens group | 10 | 11 | 46.599 |
| Fourth lens group | 13 | 21 | 22.986 |

[Position data of each lens group]

| (Land imaging state) | | | |
|---|---|---|---|
| f | 7.20 | 9.20 | 13.60 |
| First lens group | 0.000 | 0.000 | 0.000 |
| Second lens group | 0.000 | 4.771 | 7.920 |
| Third lens group | 0.000 | −2.354 | −6.959 |
| Fourth lens group | 0.000 | −2.691 | −8.374 |
| (Underwater imaging state) | | | |
| f | 5.82 | 7.33 | 10.77 |
| First lens group | 0.000 | 0.000 | 0.000 |
| Second lens group | 3.202 | 7.226 | 9.134 |
| Third lens group | 4.414 | 1.421 | −4.228 |
| Fourth lens group | 0.000 | −2.691 | −8.374 |

FIGS. 63A, 63B and 63C illustrate a graph showing aberrations against d-line and g-line in an infinity focusing state in the land imaging state based on design values of the amphibious zoom lens ZL11 according to Example 11, where FIG. 63A depicts a wide-angle end state, FIG. 63B depicts an intermediate focal length state, and FIG. 63C depicts a telephoto end state. FIGS. 64A, 64B and 64C illustrate a graph showing aberrations against d-line and g-line in the infinity focusing state in the underwater imaging state based on design values of the amphibious zoom lens ZL11 according to Example 11, where FIG. 64A depicts the wide-angle end state, FIG. 64B depicts the intermediate focal length state, and FIG. 64C depicts the telephoto end state. FIGS. 65A, 65B and 65C illustrate a graph showing aberrations against d-line and g-line in a short distance focusing state of 300 mm of distance between object images in the land imaging state based on design values of the amphibious zoom lens ZL11 according to Example 11, where FIG. 65A depicts the wide-angle end state, FIG. 65B depicts the intermediate focal length state, and FIG. 65C depicts the telephoto end state. FIGS. 66A, 66B and 66C illustrate a graph showing aberrations against d-line and g-line in the short distance focusing state of 300 mm of distance between object images in the underwater imaging state based on design values of the amphibious zoom lens ZL11 according to Example 11, where FIG. 66A depicts the wide-angle end state, FIG. 66B depicts the intermediate focal length state, and FIG. 66C depicts the telephoto end state.

Based on each graph showing aberrations, in the optical system ZL11 of the amphibious zoom lens 100 according to the fourth embodiment, it is possible to appropriately correct aberrations such as distortion and curvature of image surface, etc. covering a whole zooming range from the infinity focusing state to the short distance focusing state both in the land imaging state and the underwater imaging state, and have high image-forming performance.

Note that in the fourth embodiment, as a method for identifying whether the land imaging state or the underwater state, as described above, the switch member 142 is provided in the body 101 and the method for identifying in response to switching manipulation of a photographer, however, it is not limited to the above. For example, it is possible to provide two terminals exposed from the body 101, and adopt a method for automatically identifying by measuring electrical resistance between the two terminals. With this arrangement, it is possible to improve convenience upon using.

Next, a camera (imaging device) 90 having the amphibious zoom lens apparatus according to each embodiment is described with reference to FIG. 82. Here, a case in which the amphibious zoom lens apparatus 10 according to the third embodiment is described, however, this is applicable to the amphibious zoom lens apparatus 100 according to the fourth embodiment.

Figure 82:
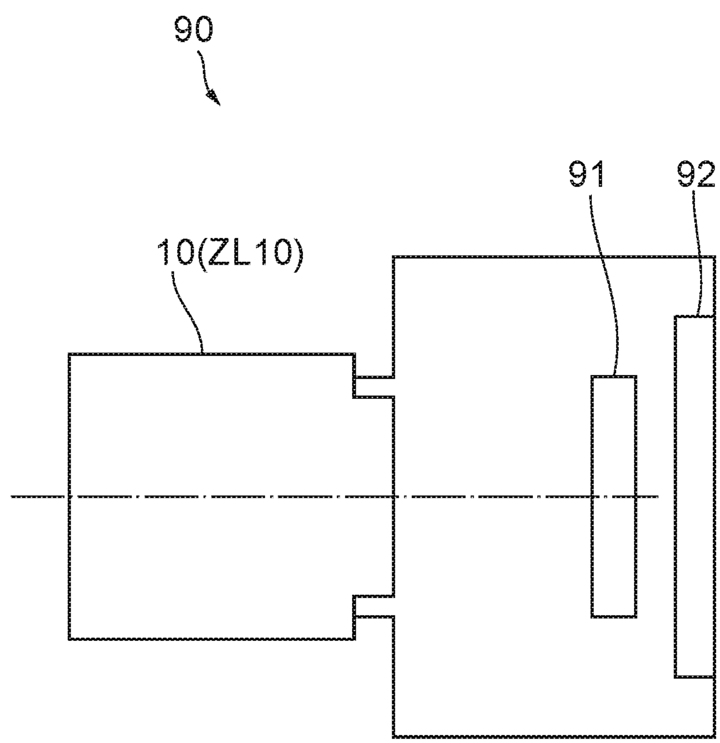
FIG. 82 illustrates a diagram showing a configuration of the camera equipped with the anphibious zoom lens apparatuses according to the third and fourth embodiments.

The camera 90 is, as shown in FIG. 82, an interchangeable lens type amphibious camera which holds the amphibious zoom lens apparatus 10 according to the third embodiment in an attachable and detachable manner. In this camera 90, light from an unillustrated photographic subject is condensed by the optical system ZL10 of the amphibious zoom lens apparatus 10, and is imaged on the image sensor 91. An image of the photographic subject imaged on the image sensor 91 is converted into a video signal by an unillustrated electric circuit, and is displayed on a monitoring screen 92, then is observable by a photographer. The photographer sets an imaging state by manipulating the switch member 42 (shown in FIG. 78), and decides an imaging composition after setting a focusing length by manipulating the manipulating member 6 (shown in FIG. 78), while half-pressing an unillustrated release button. Next, if the release button is fully pressed by the photographer, in camera 90 the light from the photographic subject is received by the image sensor 91 so that an imaging picture is acquired and recorded on an unillustrated memory.

According to the anphibious camera 90 equipped with the above configuration, by having the amphibious zoom lens apparatus 10 according to the third embodiment, although configurations are simplified, it is possible to perform zooming and focusing both in the land imaging state and the underwater imaging state, and realize a camera which has good optical performance.

Note that the camera CAM set forth in FIG. 82 may be not only a type in which the amphibious zoom lens apparatus 10 is provided in an attachable and detachable manner, but also a type in which the camera body is integrated with the amphibious zoom lens apparatus 10. Moreover, the camera 90 may be a so-called single-lens reflex camera having a quick return mirror, or a video camera which primarily performs moving imaging.

Figure 83:
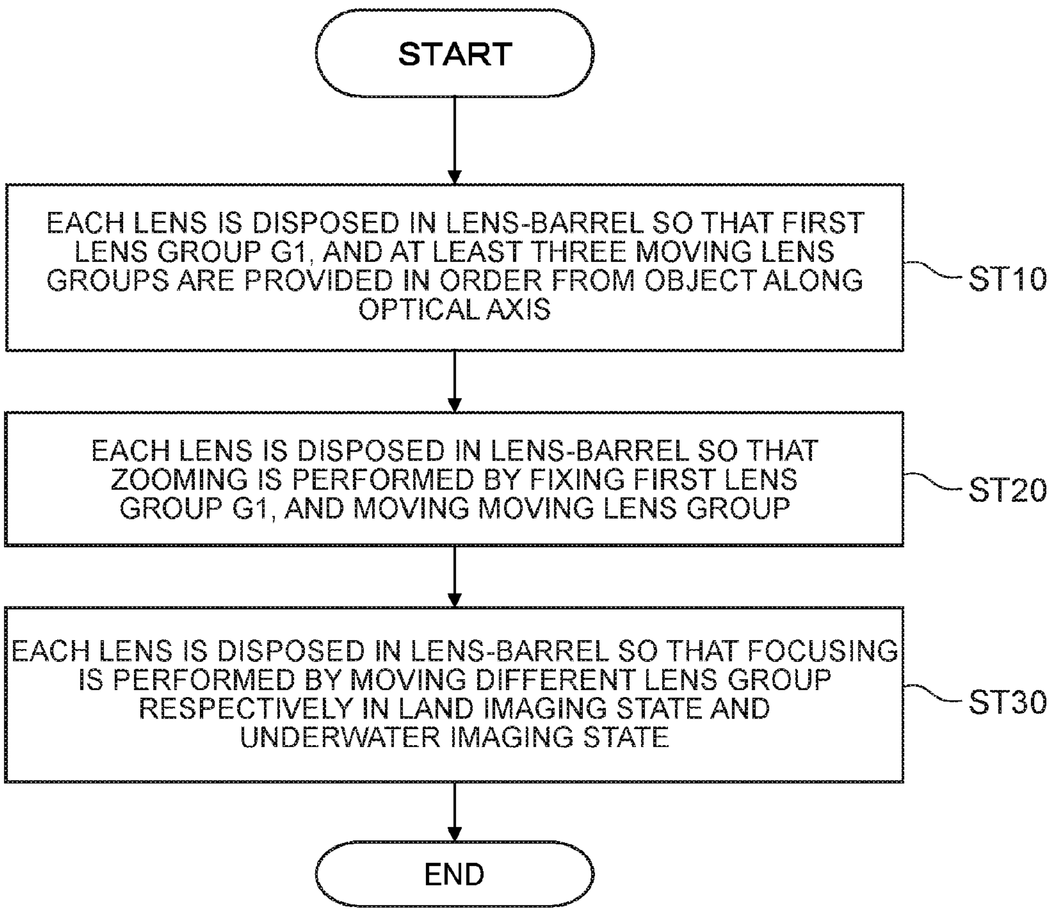
FIG. 83 illustrates a flowchart showing a method for manufacturing the anphibious zoom lens apparatuses according to the third and fourth embodiments.

Next, a method for manufacturing the amphibious zoom lens apparatus according to each embodiment is described with reference to FIG. 83. Here, a case in which the amphibious zoom lens apparatus 10 according to the third embodiment is manufactured is described, this is applicable to the amphibious zoom lens apparatus 100 according to the fourth embodiment.

Firstly, each lens is disposed in the body 1 so that the first lens group, and at least three moving lens groups (for instance, the second lens group G2, the third lens group G3, and the fourth lens group G4) are disposed in order from the object along the optical axis (Step ST10). Upon doing so, each lens is disposed in the body 1 so that zooming is performed by fixing the first lens group G1, and moving the moving lens group along the optical axis (Step ST20). Moreover, focusing is performed by moving a different moving lens group respectively in the land imaging state and the underwater imaging state (for example, the third lens group G3 in the land imaging state and the second lens group G2 in the underwater imaging state), when switching from the land imaging state to the underwater imaging state.

Note that the above-mentioned "underwater imaging state" is equivalent to the first imaging state in a first medium (water (refractive index=1.333 in d-line)) in claims, and "land imaging state" is equivalent to the second imaging state in a second medium (air (refractive index=1.000 in d-line)).

Here, exampling a lens arrangement, in the amphibious zoom lens apparatus 10 according to a third embodiment, as mentioned above (refer to FIG. 57), a positive meniscus lens L11 having a convex surface facing the object is disposed in the body 1, as the first lens group G1. As the second lens group G2, a negative meniscus lens L21 having a concave surface facing the image surface, a biconcave negative lens L22, and a cemented positive lens composed of a negative meniscus lens L23 having a concave surface facing the image surface and a positive meniscus lens L24 having a convex surface facing the object are disposed in order from the object. As third lens group G3, a biconvex positive lens L31 is disposed in the body 1. As the fourth lens group G4, a cemented negative lens composed of a biconvex positive lens L41 and a biconcave negative lens L42, a cemented positive lens composed of a negative meniscus lens L43 having a concave surface facing the image surface and a biconvex positive lens L44, and a cemented negative lens composed of a biconvex positive lens L45 and a negative meniscus lens L46 having a concave surface facing the object are disposed in the body 1.

According to such a method for manufacturing, although configurations are simplified, it is possible to manufacture the amphibious zoom lens apparatus 10 which can perform zooming both in the land imaging state and the underwater imaging state, and have good optical performance.

As described above with elements of the embodiment attached in order to make the present invention understandable, however the present invention is not limited to the above.

For example, in each embodiment an optical system having four groups configuration is described, however this can be applied to other group configuration such as five or more groups configuration. Moreover, this applicable to a configuration in which a lens or a lens group is added closest to the object, or a configuration in which a lens or a lens group is added closest to the image. Moreover, a lens group means a part having at least one lens separated with air interval which changes upon zooming or focusing. Note that in the five or more groups configuration, not only three but also four or more is available in the moving lens group. Moreover, in case a moving lens group is configured with four or more, it is possible to have the same advantageous effect as the embodiments above, by memorizing positional information of 2 to 4, or 4 or more moving lens groups in the memory unit 61, 161.

Moreover, it is appreciated that a focusing lens group is configured to focus from an infinity object on a short distance object by moving a single or a plurality of lens group, or a partial lens group in an optical axis direction. This focusing lens group is also applicable to autofocus, and is also suitable for motor drive for autofocus (using an ultrasonic motor, etc.). In particular, it is preferable that a focusing lens group is configured with the second lens group G2 or the third lens group G3, or both of them.

Moreover, a lens surface may be configured with a spherical surface or a plane, or an aspherical surface. In case a lens surface has a spherical surface or a plane, it is possible to easily have lens processing and an assembly adjustment, and to prevent degradation of optical performance due to errors of processing and an assembly adjustment, thus it is preferable. Moreover, it is preferable because there is less degradation of the depiction performance when an image surface is shifted. In case a lens surface has an aspherical surface, the aspherical surface may be formed with any one of an aspherical surface which is formed through grinding processing, a glass mold aspherical surface in which glass is formed into an aspherical surface configuration using a mold, and a complexed aspherical surface in which a resin is formed on a surface of glass and formed into an aspherical surface configuration. Moreover, a lens surface may be formed as a diffractive surface, additionally a lens may be formed as a graded-index lens (GRIN lens) or a plastic lens.

In each embodiment, a reflection reducing film having high transmissivity within a broad wavelength band may be applied to each lens surface, in order to reduce flare and ghost and to attain good optical performance of high contrast.

Moreover, "underwater imaging state" means not only an imaging state in fresh water, but also an imaging state in liquid containing impurities.

Moreover, switching between the underwater imaging state and the land imaging state may be rendered by switching an imaging mode using a manipulation member of the imaging apparatus 90 having the optical system ZL or an external device, and the like.

Fifth and Sixth Embodiments

Hereinafter, fifth and sixth embodiments are described with reference to drawings. Firstly, a characteristic configuration of an optical system common to each embodiment according to the present invention are described. Next, the fifth embodiment according to the present invention is described with reference to FIGS. 84 to 89. The sixth embodiment according to the present invention is described with reference to FIGS. 90 to 95. An imaging device according to these embodiments is described with reference to FIG. 96. Methods for manufacturing according to these embodiments are described with reference to FIG. 97.

A characteristic configuration of the optical system ZL common to the amphibious zoom lens apparatus 200 according to the fifth embodiment mentioned below and the amphibious zoom lens apparatus 300 according to the sixth embodiment mentioned below are described (refer to FIGS. 86 and 92).

The amphibious zoom lens apparatuses 200 and 300 have an optical system ZL comprises, in order from an object, a first lens group G1 having a lens in which a convex surface of lens surfaces closest to the object faces the object, at least three moving lens groups (for instance, a second lens group G2, a third lens group G3, a fourth lens group G4, and a fifth lens group G5), and a characteristic configuration in which upon zooming from a wide-angle end state to a telephoto end state, the first lens group G1 is fixed, the moving lens groups mutually independently move along the optical axis, at least two lens group of the moving lens groups (for example, the fourth lens group G4 and the fifth lens group G5) have a different moving locus upon the zooming in the land imaging state and the underwater state. Note that in FIG. 86 and FIG. 92, a solid-line shows a moving locus in the land imaging state of the fourth lens group G4 and the fifth lens group G5, and a dotted-line shows a moving locus in the underwater imaging state.

Hermetic in the underwater imaging state is secured by fixing the first lens group G1. Moreover, a zooming action is mainly contributed by the moving at least three lens group, especially in the present apparatus main zooming is performed by moving the second lens group G2, corrections of various aberrations such as curvature of image in association with zooming and switching between the land imaging state and the underwater imaging state are performed by moving the fourth lens group and the fifth lens group. Moreover, by forming a lens surface (first surface m1) closest to the object in the optical system ZL into a shape having a concave surface facing the object, it is possible to suppress a change of an angle of when putting in water, and generation of distortion and a chromatic aberration of magnification.

As a result, in the amphibious zoom lens apparatus 200 and 300 mentioned below, although configurations are simplified, it is possible to perform zooming both in the land imaging state and the underwater imaging state, and achieve good optical performance.

In each embodiment, in the optical system ZL it is appreciated to the following conditional expression (9) is satisfied.

$$0.80<R1/Enpw<4.00 \quad (9)$$

where, R1 denotes a radius of curvature of a lens surface closest to the object of the first lens group G1, and Enpw denotes a distance on the optical axis from a lens surface closest to the object of the first lens group G1 to an incident pupil position in an infinity imaging state in a wide-angle end state in the land imaging state of the optical system ZL.

The conditional expressions (9) defines a condition for suppressing curvature of image surface when imaging in water, and generation of distortion. In case of deceeding the lower limit of the conditional expression (9), the power of the lens surface closest to the object in the first lens group G1 greatly changes in the land imaging state and the underwater imaging state, thereby curvature of image surface is greatly generated in the underwater imaging state, even if trying to correct this curvature of image surface by moving the moving lens groups with a different moving locus from that in the land imaging state, it is not possible to completely correct it. In case of exceeding the upper limit of the conditional expression (9), this is similar to a case the lens surface closest to the image of the first lens group G1, and this causes to increase positive distortion generated in a lens located closest to the object of the first lens group in the underwater imaging state, thus it is not possible to completely correct it.

In order to ensure the advantageous effects of the fifth and sixth embodiments, it is preferable to set the lower limit of the conditional expression (9) to 1.00. In order to ensure the advantageous effects of the fifth and sixth embodiments, it is preferable to set the upper limit of the conditional expression (9) to 3.50.

In each embodiment, the optical system ZL it is appreciated that the following conditional expressions (10) and (11) are satisfied.

$$-0.90<\Delta 1U/\Delta 1A<0.90 \quad (10)$$

$$0.20<\Delta 2U/\Delta 2A<2.00 \quad (11)$$

where, Δ1U denotes amount of movement necessary to change from an infinity imaging state in a wide-angle end state to an infinity imaging state in a telephoto end state in the underwater imaging state of a lens group located closest to the image among the at least two moving lens groups (however, a positive symbol is assigned to amount of movement in an image surface direction, while a negative symbol is assigned to amount of movement in an object direction), Δ1A denotes amount of movement necessary to change from an infinity imaging state in a wide-angle end state to an infinity imaging state in a telephoto end state in the land imaging state of a lens group located closest to the image among the at least two moving lens groups (however, a positive symbol is assigned to amount of movement in the image surface direction, while a negative symbol is assigned to amount of movement in the object direction), Δ2U denotes amount of movement necessary to change from an infinity imaging state in a wide-angle end state to an infinity imaging state in a telephoto end state in the underwater imaging state of a lens group located in the second closest to the image among the at least two moving lens groups (however, a positive symbol is assigned to amount of movement in the image surface direction, while a negative symbol is assigned to amount of movement in the object direction), and Δ2A denotes amount of movement necessary to change from an infinity imaging state in a wide-angle end state to an infinity imaging state in a telephoto end state in the land imaging state of a lens group located in the second closest to the image among the at least two moving lens groups (however, a positive symbol is assigned to amount of movement in the image surface direction, while a negative symbol is assigned to amount of movement in the object direction).

The conditional expressions (10) and (11) define conditions for appropriately correcting aberrations respectively in the land imaging state and the underwater imaging state. In case of exceeding the upper limit or lower limit of the conditional expression (10), it becomes difficult to correct various aberrations such as curvature of image surface in any one of or both of a wide-angle end state and a telephoto end state in the land imaging state and the underwater imaging end state. Similarly, in case of exceeding the upper limit or deceeding lower limit of the conditional expression (11), it becomes difficult to correct various aberrations such as curvature of image surface in any one of or both of a wide-angle end state and a telephoto end state in the land imaging state and the underwater imaging state.

In each embodiment, the optical system ZL comprises a meniscus lens L11 having a convex surface facing the image, closest to the object, and it is appreciated that the following conditional expression (12) is satisfied.

$$-0.15<\varphi 1/\varphi w<0.15 \quad (12)$$

where, φ1 denotes refractive power in the air of the meniscus lens L11, and φw denotes refractive power in a wide-angle end state in the land imaging state of the optical system ZL.

The conditional expressions (12) defines a condition for downsizing the optical system ZL, eventually, the amphibious zoom lens apparatus 10 and 100. In case of deceeding the lower limit of the conditional expression (12), refractive power of the meniscus lens L11 located closest to the object becomes negatively large, and a diameter of the lens located closer to the image than the meniscus lens L11 is needed to be enlarged, thus it is not preferable. In case of exceeding the upper limit of the conditional expression (12), the refractive power of the meniscus lens L11 located closest to the object becomes positively large, and a diameter of the meniscus lens L11 is needed to be enlarged, thus it is not preferable.

In order to ensure the advantageous effects of the fifth and sixth embodiments, it is preferable to set the lower limit of the conditional expression (12) to −0.10. In order to ensure the advantageous effects of the fifth and sixth embodiments, it is preferable to set the upper limit of the conditional expression (12) to 0.10.

In each embodiment, the optical system ZL comprises a meniscus lens L11 having a convex surface facing the object, closest to the object, and it is appreciated that the following conditional expression (13) is satisfied.

$$0.30<R2/TL<0.90 \quad (13)$$

where, R2 denotes a radius of curvature of the image side surface of the meniscus lens L11, and TL denotes a distance on the optical axis from a lens surface closest to the object of the optical system ZL to an imaging surface.

The conditional expression (13) defines a condition to appropriately correct an aberration when imaging in water. In case of deceeding the lower limit of the conditional expression (13), curvature of image surface generated on the image side surface of the meniscus lens L11 becomes enlarged in the underwater imaging state, it is impossible to completely correct it. In case of exceeding the upper limit of the conditional expression (13), positive distortion generated on the image side surface of the meniscus lens L11 becomes enlarged, it is impossible to completely correct it.

In order to ensure the advantageous effects of the fifth and sixth embodiments, it is preferable to set the lower limit of the conditional expression (13) to 0.34. In order to ensure the advantageous effects of the fifth and sixth embodiments, it is preferable to set the upper limit of the conditional expression (13) to 0.80.

In the optical system ZL according to the fifth and sixth embodiments, “underwater imaging state” is equivalent to a first imaging state set forth in claims, and “land imaging state” is equivalent to a second imaging state set forth in claims. That is, “water (a refractive index=1.333 in d-line)” is equivalent to a first medium having a first refractive index set forth in claims, and “air (a refractive index=1.000 in d-line)” is equivalent to a second medium having a second refractive index.

Moreover, as the first and second object side media, it can be considered to adopt various gas and liquid such ethanol (refractive index=1.362 in d-line), kerosene (refractive index=1.447 in d-line), and benzene (refractive index=1.501 in d-line), etc., other than water and air, any of the above are available in the optical system ZL according to the fifth and sixth embodiments. Note that water is not limited to fresh water, however aqueous solution such as sea water may be adopted.

Fifth Embodiment

Figure 84:
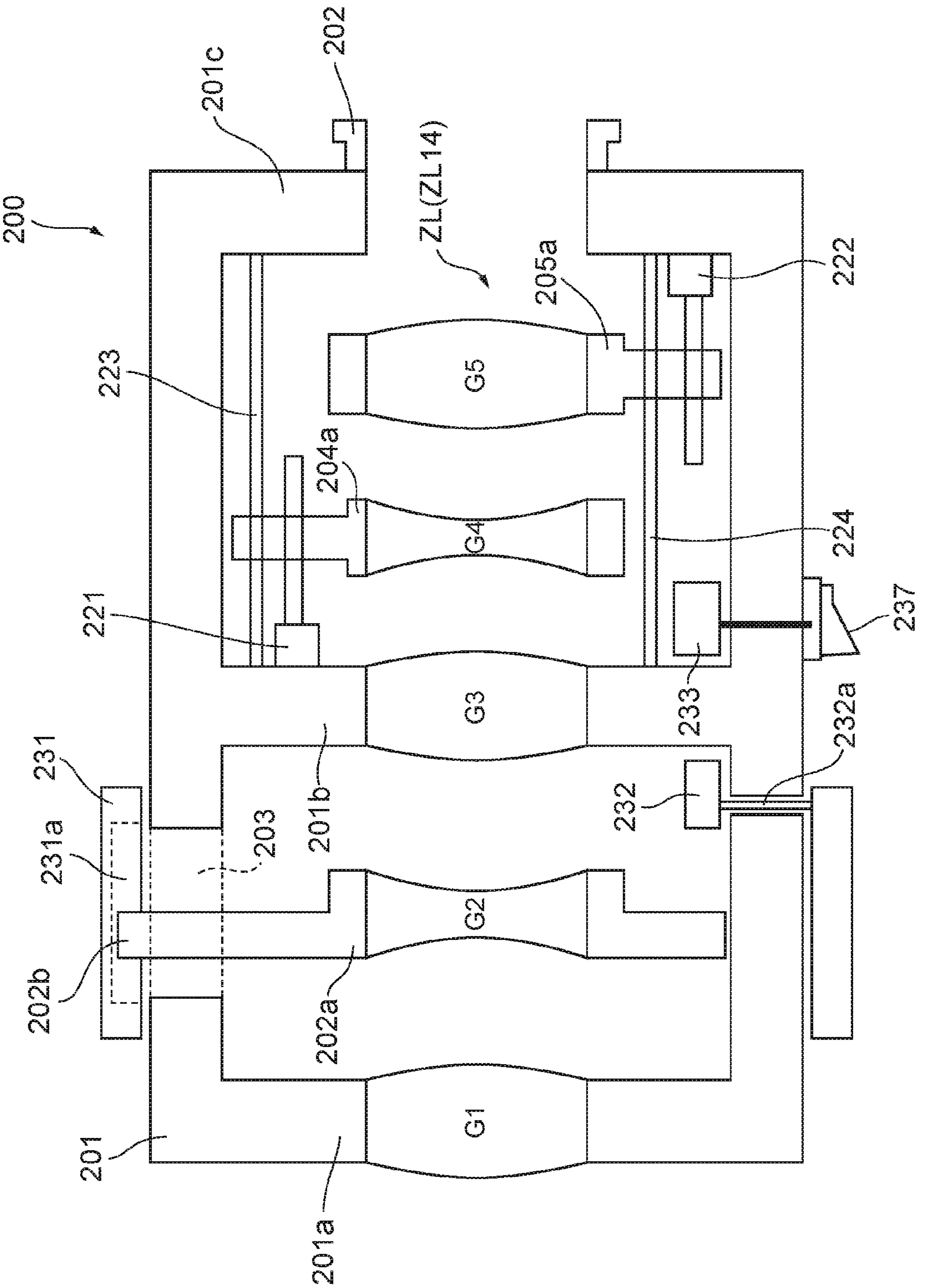
FIG. 84 illustrates a cross-sectional configuration diagram of the amphibious zoom lens apparatus according to a fifth embodiment.

Hereinafter, an amphibious zoom lens apparatus 200 according to the fifth embodiment is described. as shown in FIG. 84, the amphibious zoom lens apparatus 200 of the fifth embodiment comprises an optical system ZL (ZL14) composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power.

Moreover, the first lens group G1 is fixed in the body 201 on an optical axis via a first lens group holding part 201*a*, the third lens group G3 is fixed on the optical axis via a third lens group holding part 201*b*, and the second lens group G2 is held between the first lens group G1 and the third lens group G3 in the body 201 by a below-mentioned member in an manner respectively independently movable on the optical axis, while the fourth lens group G4 and the fifth lens group G5 is held closest to the image of the third lens group G3 in the body 201 by the below-mentioned member in an manner respectively independently movable on the optical axis.

A mount member 202 is fixed to an image side end 201*c* of the body 201, and fixed to an imaging device mentioned below by a mount member 202.

A pin 202*b* extending in a radius direction from a lens frame 202*a* holding the second lens group G2 is mounted to a cam groove 231*a* formed in a manipulation member 231 for changing a focal length via a long hole 203 formed in the body 201. This pin 202*b* moves, when rotating the manipulation member 231, along the cam groove 231*a* formed on an inner wall of the manipulation member 231 rotates the manipulation member 231, thereby the second lens group G2 moves along the optical axis.

The manipulation member 231 is connected to a focal length detection unit 232 disposed in the body 201 via an interlocking member 232*a*. The focal length detection unit 232 detects, when the manipulation member 231 is manipulated, a change request of a focal length via the interlocking member 232*a*, and outputs a value of the focal length in response to an amount of rotations of the manipulation member 231.

Note that an unillustrated rubber ring is inserted into a slide part between the manipulation member 231 and the body 201, and is configure to prevent water from entering when imaging in water.

A switch member 237 for switching the land imaging state and the underwater imaging state is provided outside of the body 201. In the body 201, an imaging state identification unit 233 which identifies an imaging state switched by the switch member 237 is disposed.

Figure 85:
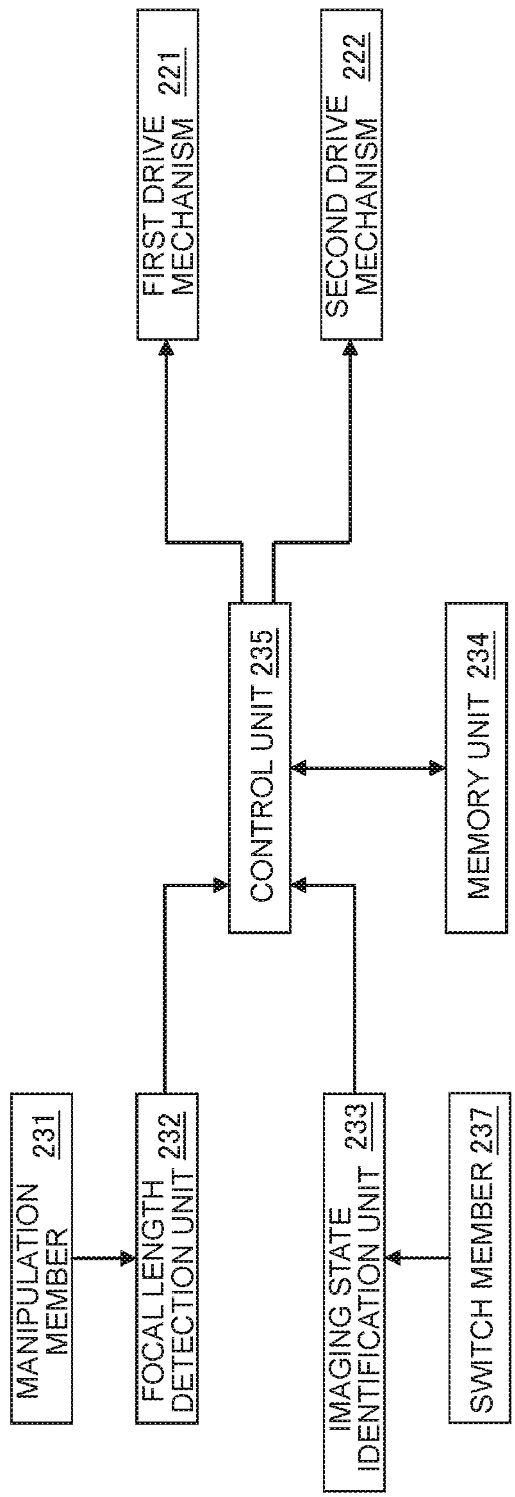
FIG. 85 illustrates a diagram showing a transmission relationship between informational and control of the amphibious zoom lens apparatus according to the fifth embodiment.

The fourth lens group G4 is held at a fourth lens group lens frame 204*a*, and this lens frame 204*a* is supported by the first support member 223 disposed between a third lens group holding part 201*b* and the image side end 201*c* in a slidable manner, and moves along the optical axis by the first drive mechanism 221 based on a control signal from the control unit 235 illustrated in FIG. 85.

The fifth lens group G5 is configured to be held by a fifth lens group lens frame 205*a*, this lens frame 205*a* is supported by a second support member 224 disposed between the third lens group holding part 201*b* and the image side end 201*c* in a sliding manner, and moves along the optical axis by the second drive mechanism 222 based on a control signal from the control unit 235.

In the amphibious zoom lens apparatus 200 according to the fifth embodiment, positional information on the optical axis, which are set depending on focal lengths of at least two moving lens groups moving via the drive mechanism 221 and 222, that is, the fourth lens groups G4 and the fifth lens group in the land imaging state and the underwater imaging state, are memorized to the memory unit 234 shown in FIG. 85. Note that the positional information of the fourth lens group G4 and the fifth lens group G5 regarding the not memorized focal lengths can be set by processing such as interpolation processing, etc. with the control unit 235 based on the memorized positional information.

In the amphibious zoom lens apparatus 200 according to the fifth embodiment having such a configuration, as shown in FIG. 85, an imaging state identified by the imaging state identification unit 233 when manipulated with the switch member 237 is transferred to the control unit 235. Moreover, a focal length detected by the focal length detection unit 232 when manipulated with the manipulation member 231 is transferred to the control unit 235.

The control unit 235 reads positional information corresponding to the transferred imaging state and the focal length on the optical axis regarding the fourth lens group G4 and the fifth lens group G5 from the memory unit 234, and respectively independently moves the fourth lens group G4 via the first drive mechanism 221 and the fifth lens group G5 via the second drive mechanism 222 to a certain optical axial position.

As a result, the amphibious zoom lens apparatus 200 according to the fifth embodiment, when an imaging state is switched by manipulating the switch member 237 and a focal length is changed by manipulating the manipulation member 231, by setting positions of the fourth lens group G4 and the fifth lens group G5 on the optical axis regarding focal lengths of both in the land imaging state and the underwater imaging state based on the positional information memorized in the memory unit 234 by the control unit 235, it is possible to appropriately correct various aberrations such as curvature of image surface covering whole focal length ranges of both of the land imaging state and the underwater imaging state.

Next, an optical system ZL14 equipped with the amphibious zoom lens apparatus 200 according to the fifth embodiment is described using FIG. 86 to FIGS. 88A, 88B and 88C, and Table 16. A characteristic feature common to the sixth embodiment included by the optical system ZL 14 is the same as mentioned above.

Figure 86:
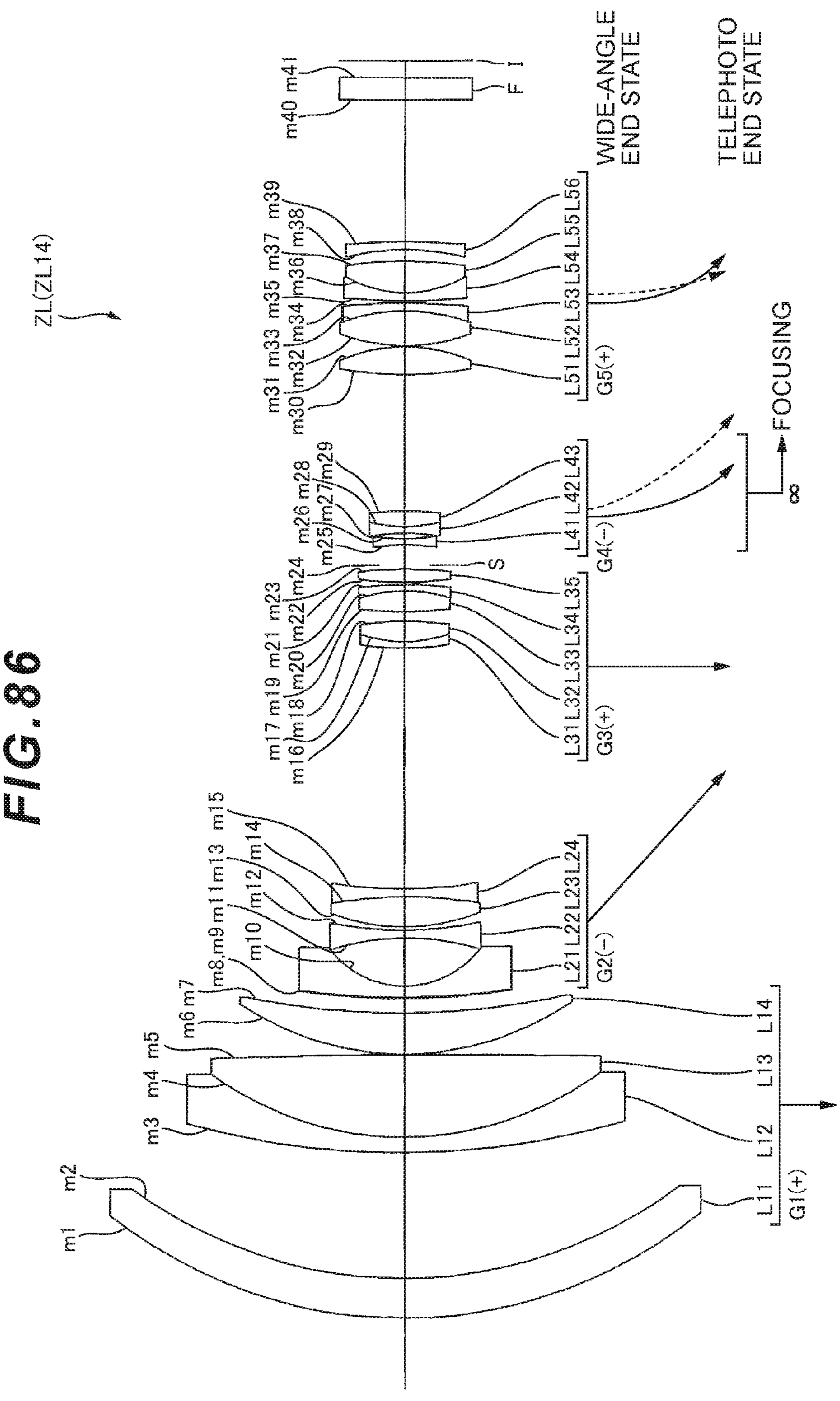
FIG. 86 illustrates a sectional view showing a lens configuration of the amphibious zoom lens apparatus according to the fifth embodiment, and a diagram showing a moving locus of each group from a wide-angle end state to a telephoto end state.

Note that each reference sign in FIG. 86 is used independently for every example, in order to avoid complicating explanations due to swelling of the digit number of reference signs. Therefore, even if reference signs, which are common in drawings according to other embodiments, are attached, they do not necessarily mean common configurations.

An optical system ZL14 equipped with the amphibious zoom lens apparatus 200 according to the fifth embodiment is composed of, as shown in FIG. 86, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a meniscus lens L11 having a convex surface facing the object, a cemented lens composed of a negative meniscus lens L12 having a concave surface facing an image and a biconvex positive lens L13, and a positive meniscus lens L14 having a convex surface facing the object.

The second lens group G2 is composed of, in order from the object, a cemented lens of a negative meniscus lens L21 having a concave surface facing the image, a biconcave negative lens L22, and a cemented lens composed of a biconvex positive lens L23 and a biconcave negative lens L24. The negative meniscus lens L21 have a thin plastic resin layer having an aspherical surface configuration on the object side.

The third lens group G3 is composed of, in order from the object, a cemented lens composed of a negative meniscus lens L31 having a concave surface facing the image and a biconvex positive lens L32, a cemented lens composed of a biconvex positive lens L33 and a negative meniscus lens L34 having a concave surface facing the object, and a biconvex positive lens L35.

The fourth lens group G4 is composed of, in order from the object, a biconcave negative lens L41, and a cemented lens composed of a biconcave negative lens L42 and a biconvex positive lens L43.

The fifth lens group G5 is composed of, in order from the object, a biconvex positive lens L51, a cemented lens composed of a biconvex positive lens L52 and a negative meniscus lens L53 having a concave surface facing the object, a cemented lens composed of a negative meniscus lens L54 having a concave surface facing the image and a biconvex positive lens L55, and a negative meniscus lens L56 having a concave surface facing the object. The image side surface of the biconvex positive lens L51 is an aspherical surface.

An iris stopper S is disposed on the image side of the third lens group G3.

A filter group F is disposed between the fifth lens group G5 and the image surface I. The filter group F is composed of a low-pass filter for cutting a spatial frequency more than a marginal dissector of image sensors such as a CCD and CMOS disposed on the image surface I, a cover-glass of an image sensor, etc.

The image surface I is formed on the image sensor which is composed of unillustrated CCDs, CMOSs, etc.

In the optical system ZL14 configured above, the lens surface closest to the object of the first lens group G1 has a radius of curvature satisfying the above mentioned conditional expression (9), and has a convex surface facing the object. With this arrangement, generation of distortion when imaging in water is suppressed.

The first lens group G1 and the third lens group G3 are always fixed.

The second lens group G2 moves along a cam groove 231*a* in an image surface direction upon zooming from a wide-angle end state to a telephoto end state, both in the land imaging state and the underwater imaging state.

The fourth lens group G4 moves by the first drive mechanism 221 upon zooming from a wide-angle end state to a telephoto end state in a manner of having moving loci different from each other in the land imaging (corresponding to an arrow of a solid-line illustrated in FIG. 86) and in the underwater imaging state (corresponding to an arrow of a dotted-line illustrated in FIG. 86).

The fifth lens group G5 moves by the second drive mechanism 222 upon zooming from a wide-angle end state to a telephoto end state in a manner of having moving loci different from each other in the land imaging (corresponding to an arrow of a solid-line illustrated in FIG. 86) and in the underwater imaging state (corresponding to an arrow of a dotted-line illustrated in FIG. 86).

As described above, by changing the moving loci of the fourth lens group G4 and the fifth lens group G5 whether in the land imaging state or in the underwater imaging state, curvature of image surface can appropriately be corrected both in the land imaging state and the underwater imaging state, while maintaining constant image-forming positions between the land imaging state and the underwater imaging state.

Upon focusing on from an infinity imaging state to a short distance imaging state, the fourth lens group G4 is moved in the image surface direction. Also upon focusing, the fourth lens group G4 is moved by the first drive mechanism 221 as same as upon zooming.

The following Table 16 shows various data of the optical system ZL14 equipped with the amphibious zoom lens apparatus 200 according to the fifth embodiment. The surface numbers 1 to 41 in Table 16 correspond to each optical surfaces of m1 to m41 shown in FIG. 86.

In the [Lens data] in tables, a surface number means an order of each optical surface from the object side along a direction light travels, R means a radius of curvature of each optical surface, D means a surface distance on the optical axis from each optical surface to the next optical surface (or image surface), nd means a refractive index in d-line of a material of a light member, and νd means an Abbe number on the basis of d-line of a material of the light member. Object surface means an object surface, (Variable) means a variable distance between surfaces, "∞" of a radius of curvature means a plane or an aperture, (Aperture stop) means an iris stopper S, and an image surface means an image surface I. The refractive index "1.000000" of air is omitted. In case the optical surface is an aspherical surface, a sign "*" is assigned to the surface number and a paraxial radius of curvature is shown in a column of a radius of curvature R.

In [aspherical surface data] in tables, regarding the aspherical surfaces in the [Lens data], the configuration is defined by the following expression (d). X(y) means a distance along the optical axis direction from a tangent plane in a vertex of the aspherical surface to a position on the aspherical surface in height y, and R means a radius of curvature (paraxial radius of curvature) of a criterion spherical surface, κ means a conic constant, and, Ai means an i-th aspherical surface coefficient. "E-n" means "$\times 10^{-n}$." For example, it is 1.234E-05=$1.234\times 10^{-5}$.

$$X(y)=(y^2/R)/\{1+(1-\kappa\times y^2/R^2)^{1/2}\}+A4\cdot y^4+A6\cdot y^6+A8\cdot y^8+A10\cdot y^{10}+A12\cdot y^{12}+A14\cdot y^{14} \quad (d)$$

In [Various data] in tables, f means a focal length of a lens whole system, and FNo means a f number, 2ω means an angle of view (unit: degree), Y means an image height, TL means a total length of a lens (a distance from a lens surface closest to a paraxial image surface on the optical axis), and BF means backfocus. Moreover, Di means a variable distance, a variable distance between an i-th surface and an (i+1)-th surface.

[lens group data] in tables shows a front end surface number (a surface number of a lens closest to the object), a rear end surface number (a surface number of a lens closest to the image), and a focal length in the air, in each lens group.

[Position data of each lens group] in tables shows a position of each lens group in an infinity imaging state in each focal length of the land imaging state and the underwater imaging state, on the basis of a position of each lens group in an infinity imaging state in a wide-angle end state in the land imaging state. In symbols the image surface direction is positive.

[Values corresponding to the conditional expressions] in tables shows values corresponding to the conditional expressions (9) to (13).

Hereinafter, in all general data values, regarding the focal length f, a radius of curvature R, a distance D, and other lengths, etc. "mm" is generally used except a specific request, however an optical system is not limited to the above, since equivalent optical performance can be obtained even if the optical system is proportionally enlarged or proportionally shrinked. Moreover, the unit is not limited to "mm," another appropriate unit is available, instead.

The explanations concerning the tables are common among all the examples, thus hereinafter the explanations are omitted.

TABLE 16

[Lens data]

| Surface number | R | D | nd | νd |
|---|---|---|---|---|
| 1 | 60.0000 | 5.0000 | 1.516800 | 63.88 |
| 2 | 58.2950 | 15.8000 | | |
| 3 | 102.3091 | 2.0000 | 1.795040 | 28.69 |
| 4 | 41.8010 | 10.4000 | 1.497820 | 82.57 |
| 5 | −1007.6756 | 0.1000 | | |
| 6 | 37.6062 | 5.1500 | 1.834810 | 42.73 |
| 7 | 98.9884 | D7 (Variable) | | |
| *8 | 99.2450 | 0.1500 | 1.553890 | 38.09 |
| 9 | 94.6723 | 1.4000 | 1.834810 | 42.73 |
| 10 | 12.0783 | 6.0000 | | |
| 11 | −32.7960 | 1.0000 | 1.834810 | 42.73 |
| 12 | 46.9143 | 0.4000 | | |
| 13 | 25.5606 | 3.8000 | 1.846660 | 23.78 |
| 14 | −54.2180 | 1.0000 | 1.816000 | 46.59 |
| 15 | 54.1534 | D15 (Variable) | | |
| 16 | 34.7874 | 0.8000 | 1.850260 | 32.35 |
| 17 | 16.6502 | 2.6000 | 1.618000 | 63.34 |
| 18 | −37.1204 | 1.2000 | | |
| 19 | 48.7843 | 2.6000 | 1.497820 | 82.57 |
| 20 | −18.5410 | 0.8000 | 1.850260 | 32.35 |
| 21 | −41.7038 | 0.3000 | | |
| 22 | 47.8525 | 1.6000 | 1.696800 | 55.52 |
| 23 | −59.5425 | 0.5000 | | |
| 24 | ∞ (Aperture stop) | D24 (Variable) | | |
| 25 | −33.1327 | 0.8000 | 1.816000 | 46.59 |
| 26 | 23.8736 | 0.7000 | | |
| 27 | −23.1424 | 0.8000 | 1.816000 | 46.59 |
| 28 | 16.9872 | 2.0000 | 1.808090 | 22.74 |
| 29 | −33.9829 | D29 (Variable) | | |
| 30 | 49.4602 | 3.5000 | 1.589130 | 61.18 |
| *31 | −19.7954 | 0.1000 | | |
| 32 | 23.4122 | 4.4000 | 1.497820 | 82.57 |
| 33 | −23.4006 | 1.0000 | 1.950000 | 29.37 |
| 34 | −80.0819 | 0.3000 | | |
| 35 | 85.4967 | 1.0000 | 1.883000 | 40.66 |
| 36 | 14.9004 | 4.0000 | 1.517420 | 52.20 |
| 37 | −50.2458 | 1.4500 | | |
| 38 | −30.3940 | 1.0000 | 2.000690 | 25.46 |
| 39 | −82.9601 | D39 (Variable) | | |
| 40 | ∞ | 2.7900 | 1.516800 | 63.88 |
| 41 | ∞ | Bf | | |
| Image surface | ∞ | | | |

[Aspheric surface data]

The eighth surface

κ = +15.1751
A4 = +4.64891E−06
A6 = −1.26998E−08
A8 = −3.35661E−10
A10 = +2.59761E−12
A12 = −8.51930E−15
A14 = +1.02560E−17

The 31st surface

κ = +1.2313
A4 = +1.39795E−05
A6 = +3.25121E−08
A8 = 0.00000E+00
A10 = 0.00000E+00
A12 = 0.00000E+00
A14 = 0.00000E+00

TABLE 16-continued

[Various data]

(Land imaging state)

| | | | |
|---|---|---|---|
| f | 10.60 | 19.05 | 45.07 |
| FNO | 4.58 | 4.99 | 5.48 |
| 2ω | 76.48 | 44.65 | 19.40 |
| Y | 8.00 | 8.00 | 8.00 |
| TL | 158.41 | 158.41 | 158.41 |
| D7 | 1.822 | 11.822 | 22.822 |
| D15 | 30.318 | 20.318 | 9.318 |
| D24 | 2.508 | 5.447 | 12.132 |
| D29 | 17.391 | 15.008 | 11.482 |
| D39 | 17.831 | 17.275 | 14.116 |
| Bf | 2.104 | 2.104 | 2.104 |

(Underwater imaging state)

| | | | |
|---|---|---|---|
| f | 8.32 | 13.76 | 30.42 |
| FNO | 4.65 | 5.17 | 6.23 |
| 2ω | 74.34 | 47.24 | 21.89 |
| Y | 8.00 | 8.00 | 8.00 |
| TL | 158.41 | 158.41 | 158.41 |
| D7 | 1.822 | 11.822 | 22.822 |
| D15 | 30.318 | 20.318 | 9.318 |
| D24 | 2.971 | 6.248 | 14.349 |
| D29 | 17.477 | 14.667 | 7.736 |
| D39 | 17.277 | 16.811 | 15.641 |
| Bf | 2.104 | 2.104 | 2.104 |

[Lens group data]

| Group | Front end surface | Rear end surface | Group focus length |
|---|---|---|---|
| First lens group | 1 | 7 | 67.131 |
| Second lens group | 8 | 15 | −10.504 |
| Third lens group | 16 | 23 | 16.830 |
| Fourth lens group | 25 | 29 | −14.660 |
| Fifth lens group | 30 | 39 | 24.633 |

[Position data of each lens group]

(Land imaging state)

| | | | |
|---|---|---|---|
| f | 10.60 | 19.05 | 45.07 |
| Second lens group | 0.000 | 9.999 | 20.998 |
| Fourth lens group | 0.000 | 2.938 | 9.622 |
| Fifth lens group | 0.000 | 0.556 | 3.713 |

(Underwater imaging state)

| | | | |
|---|---|---|---|
| f | 8.32 | 13.76 | 30.42 |
| Second lens group | 0.000 | 9.999 | 20.998 |
| Fourth lens group | 0.463 | 3.744 | 11.845 |
| Fifth lens group | 0.554 | 1.020 | 2.190 |

[Values corresponding to the conditional expressions]

Conditional expression (9) R1/Enpw = 1.126
Conditional expression (10) Δ1U/Δ1A = 0.440
Conditional expression (11) Δ2U/Δ2A = 1.183
Conditional expression (12) φ1/φw = 0.000
Conditional expression (13) R2/TL = 0.368
R1 = 60.000
Enpw = 53.283
Δ1U = 1.636
Δ1A = 3.715
Δ2U = 11.382
Δ2A = 9.622
φ1 = 0.000
φw = 0.094
R2 = 58.295
TL = 158.41

Based on Table 16, in the amphibious zoom lens apparatus 200 according to the fifth embodiment, the conditional expressions (9) to (13) are satisfied.

Figure 87A:
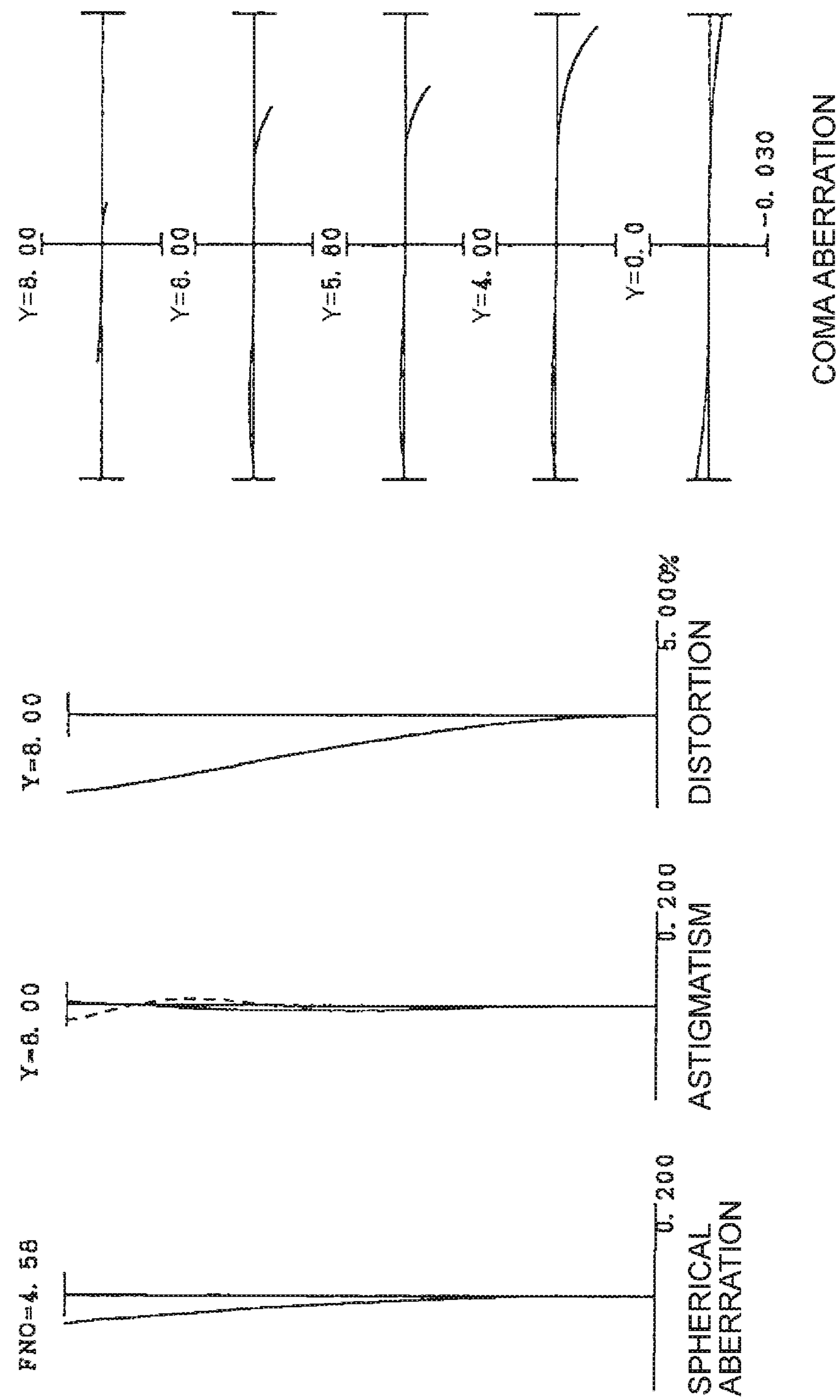
FIGS. 87A, 87B and 87C illustrate a graph showing aberrations to d-line (wave length of 587.6 nm) in an infinity focusing state in the land imaging state of the amphibious zoom lens apparatus according to the fifth embodiment, where
Figure 87B:
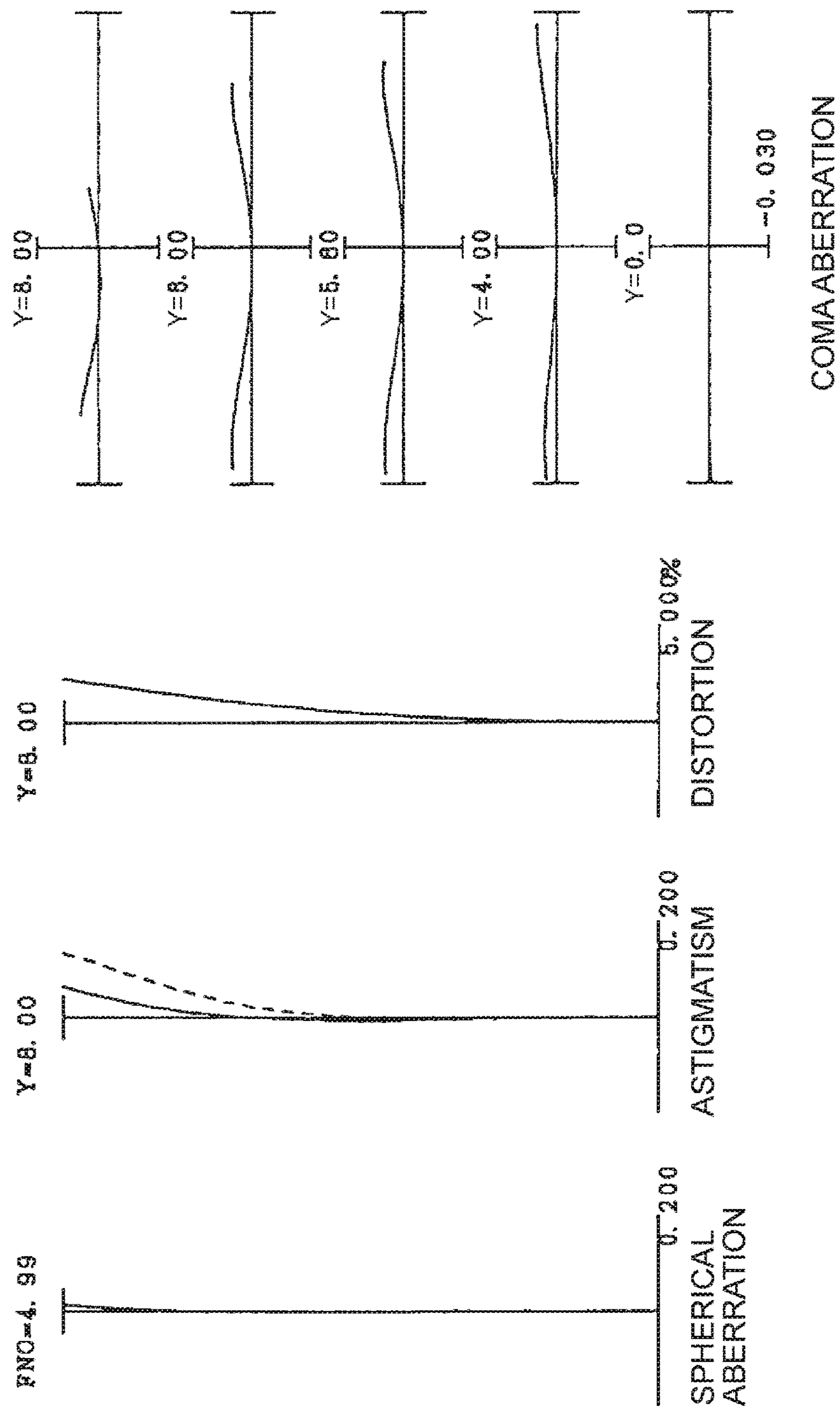
Figure 87C:
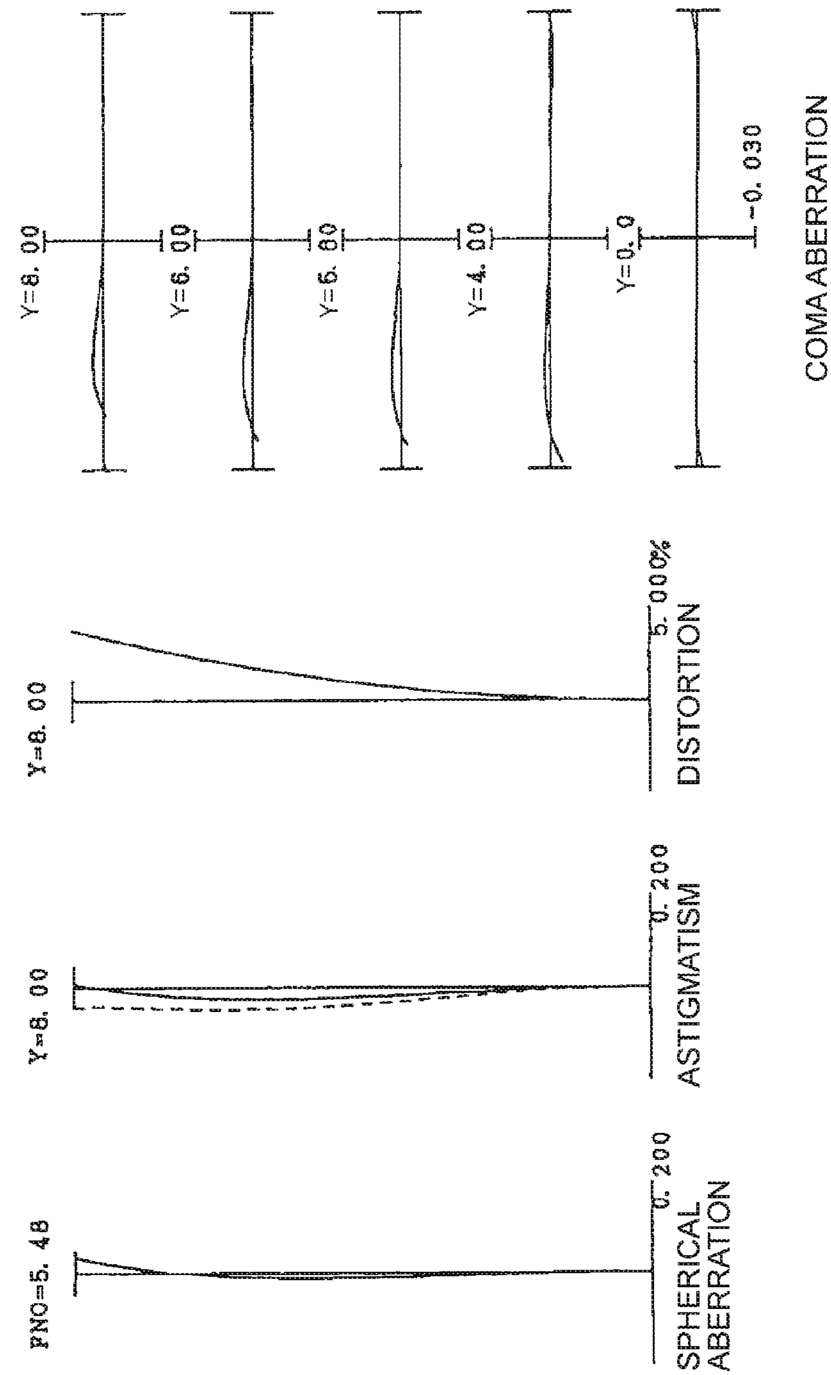
Figure 88A:
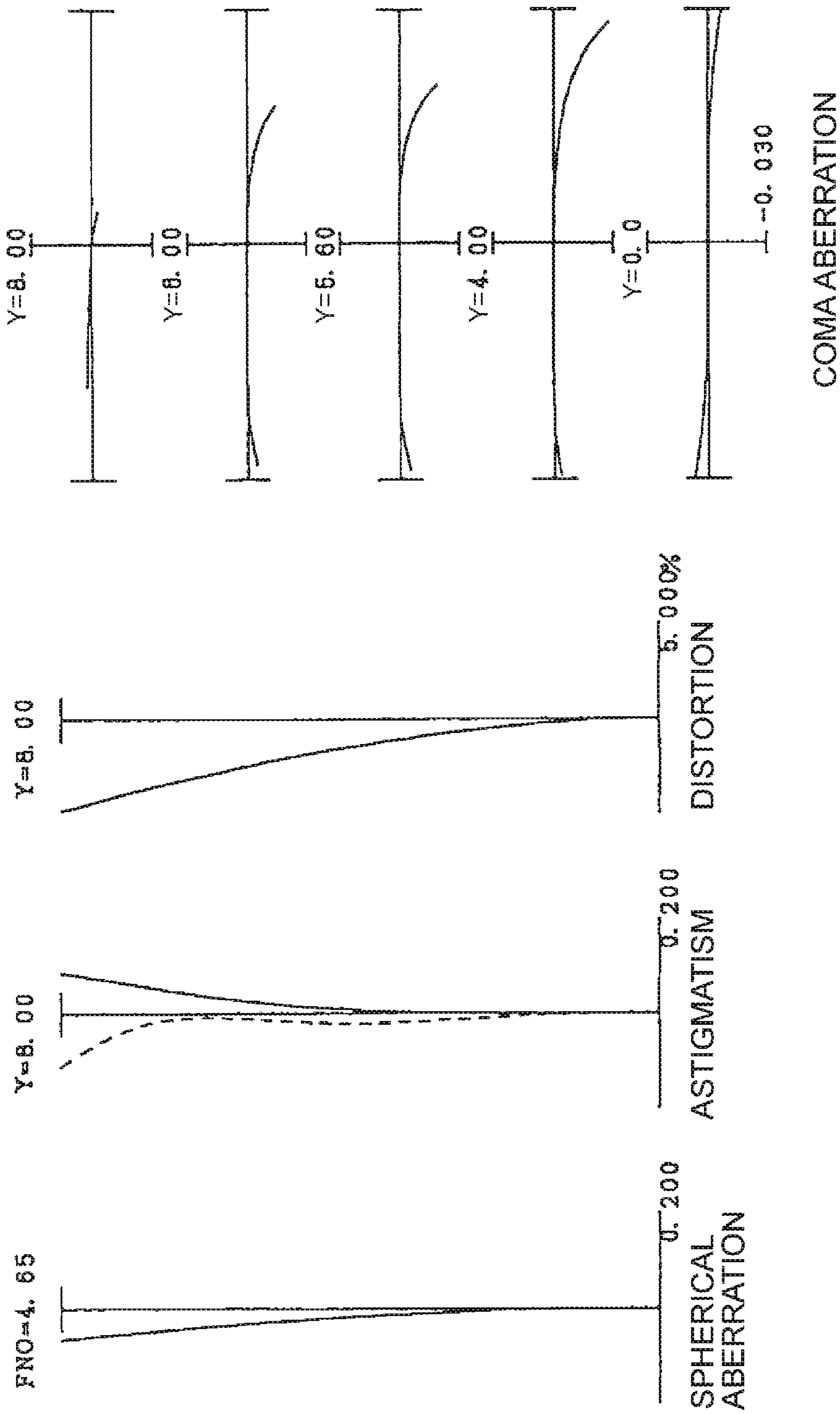
FIGS. 88A, 88B and 88C illustrate a graph showing aberrations to d-line (wave length of 587.6 nm) in an infinity focusing state in the underwater imaging state of the amphibious zoom lens apparatus according to the fifth embodiment, where
Figure 88B:
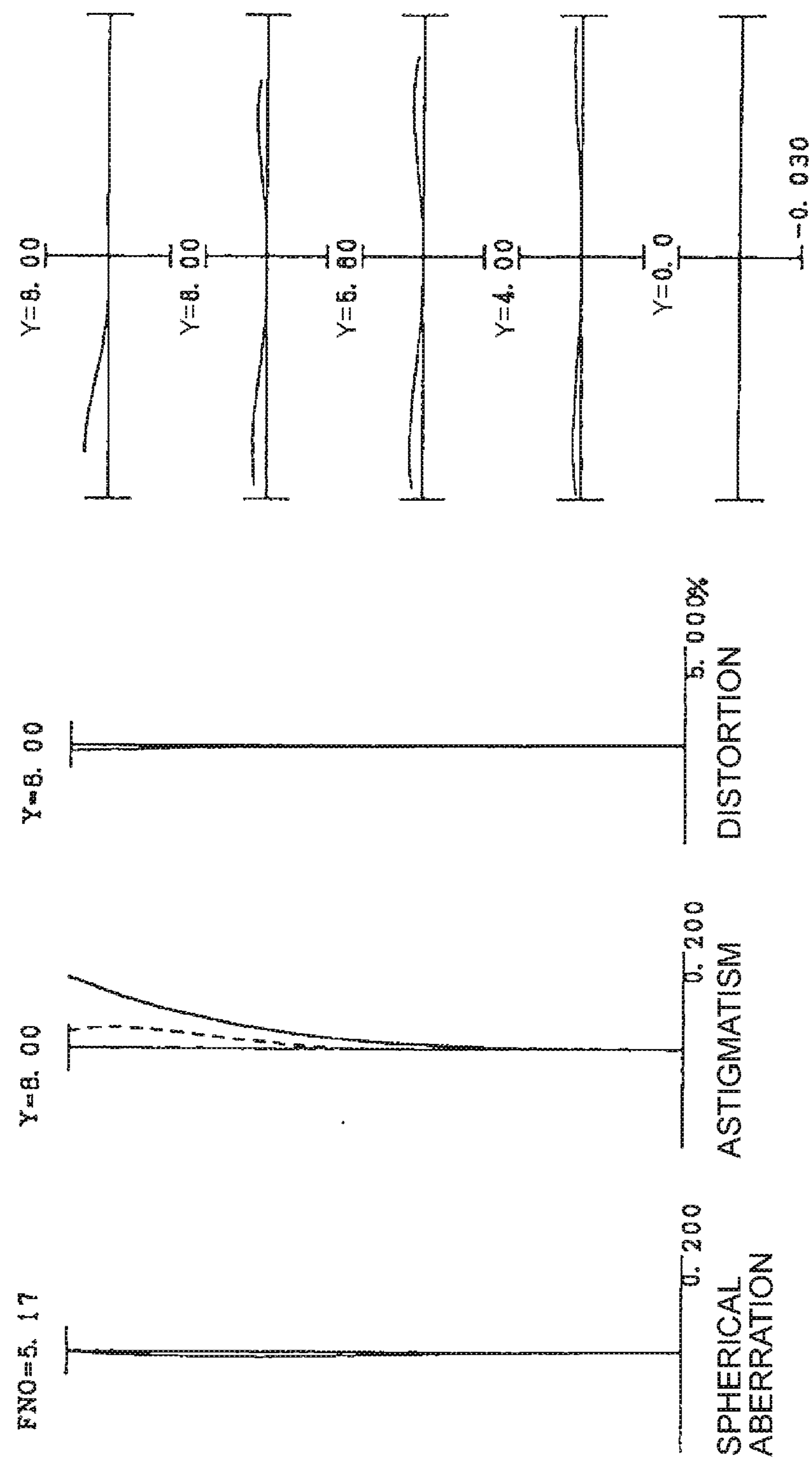
Figure 88C:
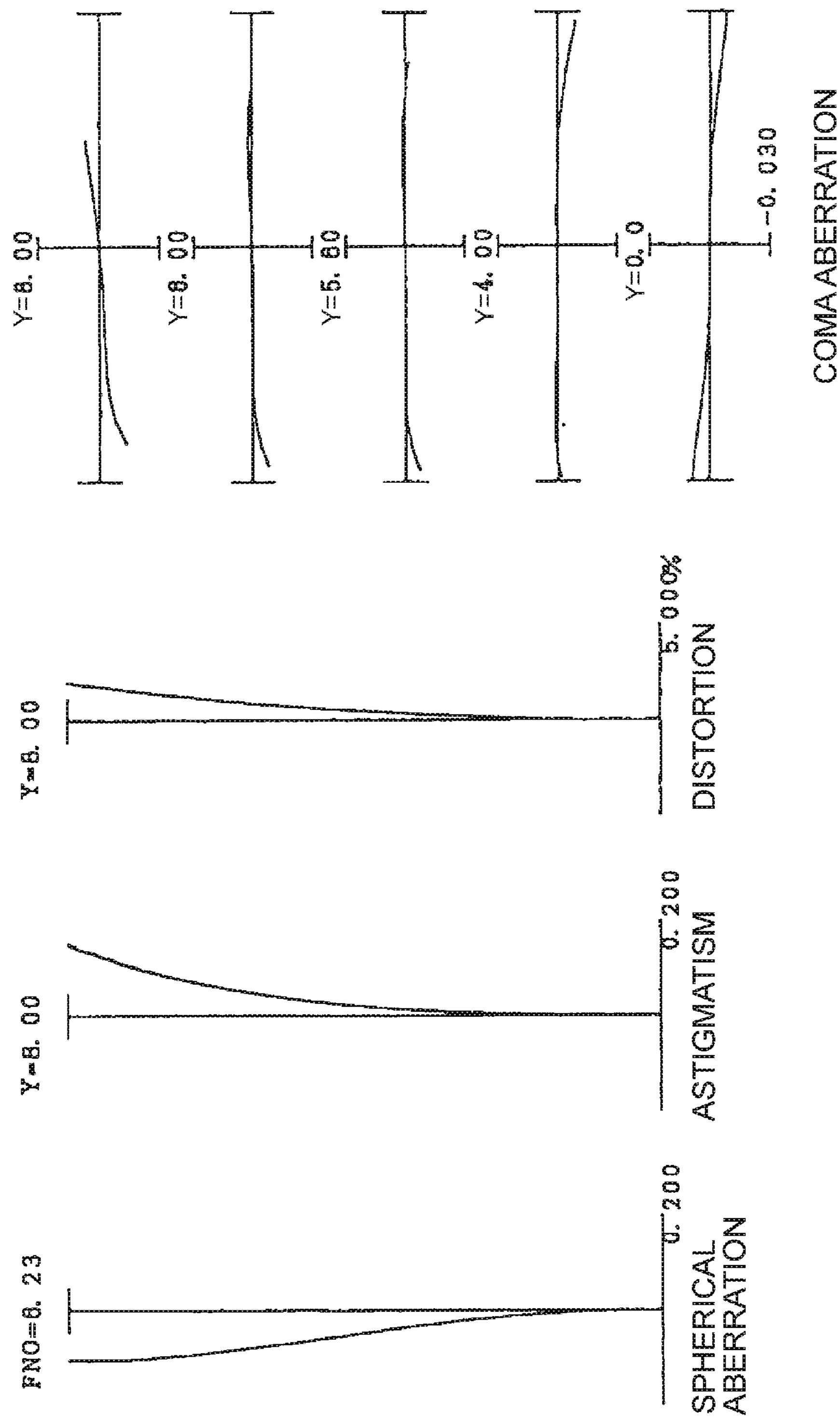
Figure 89:
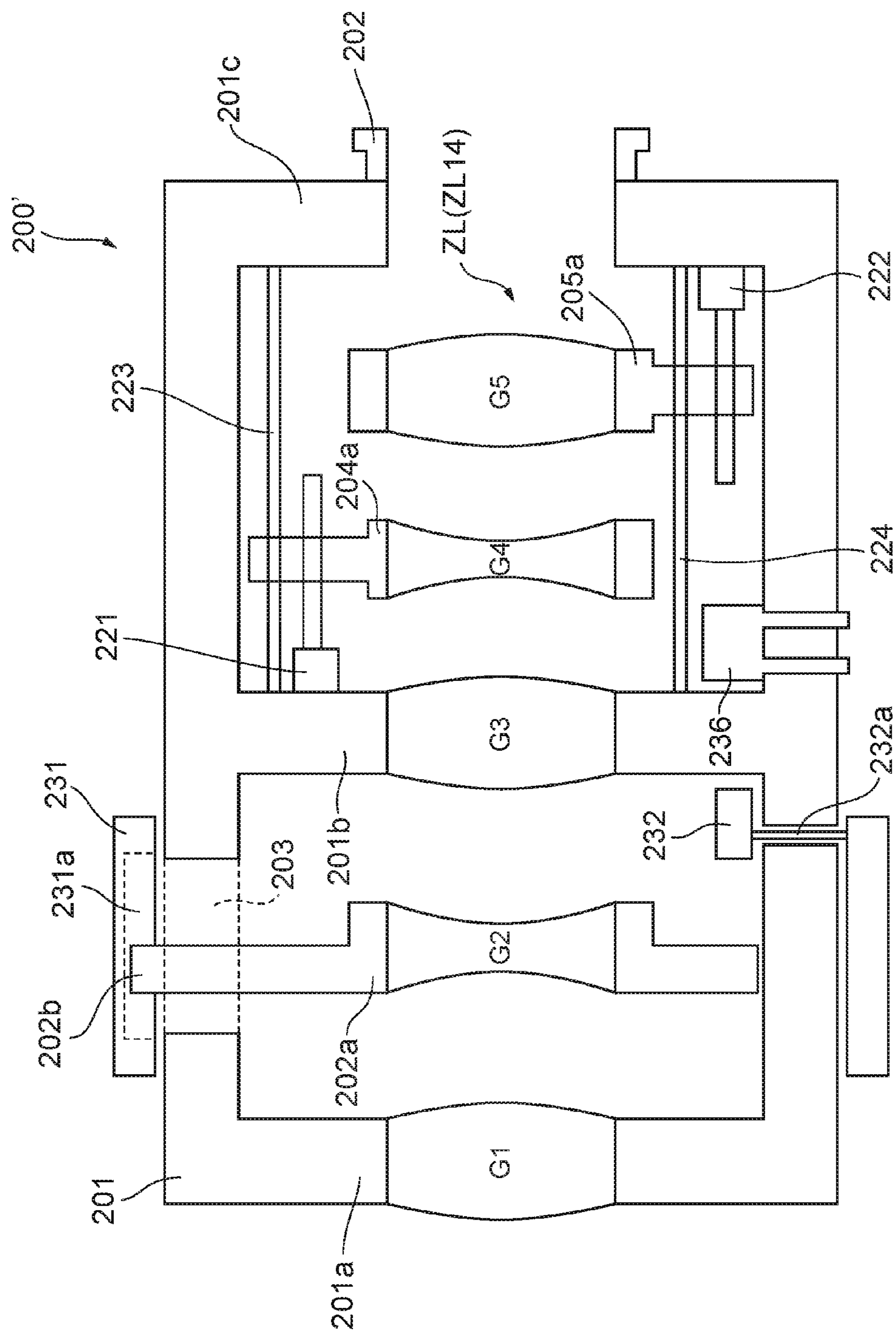
FIG. 89 illustrates a diagram showing a variation of the amphibious zoom lens apparatus according to the fifth embodiment.

FIGS. 87A, 87B and 87C illustrate a graph showing aberrations to d-line (wave length of 587.6 nm) in an infinity focusing state in the land imaging state based on design values of the amphibious zoom lens apparatus 200 according to the fifth embodiment, where FIG. 87A depicts the wide-angle end state, FIG. 87B depicts an intermediate focal length state, and FIG. 87C depicts the telephoto end state. FIGS. 88A, 88B and 88C illustrate a graph showing aberrations to d-line (wave length of 587.6 nm) in an infinity focusing state in the underwater imaging state based on design values of the anphibious zoom lens apparatus 200 according to the fifth embodiment, where FIG. 88A depicts the wide-angle end state, FIG. 88B depicts the intermediate focal length state, and FIG. 88C depicts the telephoto end state.

In each graph showing aberrations, FNO means a f number and Y means an image height. In a graph showing astigmatism, a solid-line shows a sagittal image surface, and a dashed-line shows a meridional image surface. The explanations concerning the tables are common among all the examples.

Based on each graph showing aberrations, regarding the amphibious zoom lens 200 according to the fifth embodiment, it is understandable that this enables to appropriately correct various aberrations such as distortion and curvature of image surface, etc. both in the land imaging state and the underwater imaging state, and obtain high image-forming performance.

Note that in the fifth embodiment as a method for identifying whether the land imaging state or the underwater state, as described above, the switch member 237 is provided in the body 201 and the method for identifying in response to switching manipulation of a photographer, however, it is not limited to the above. For example, as illustrated in the amphibious zoom lens apparatus 200' in FIG. 89, it is possible to provide two terminals 236 exposed from the body 201, and adopt a method for automatically identifying by measuring electrical resistance between the two terminals. With this arrangement, it is possible to improve convenience upon using.

Sixth Embodiment

Figure 90:
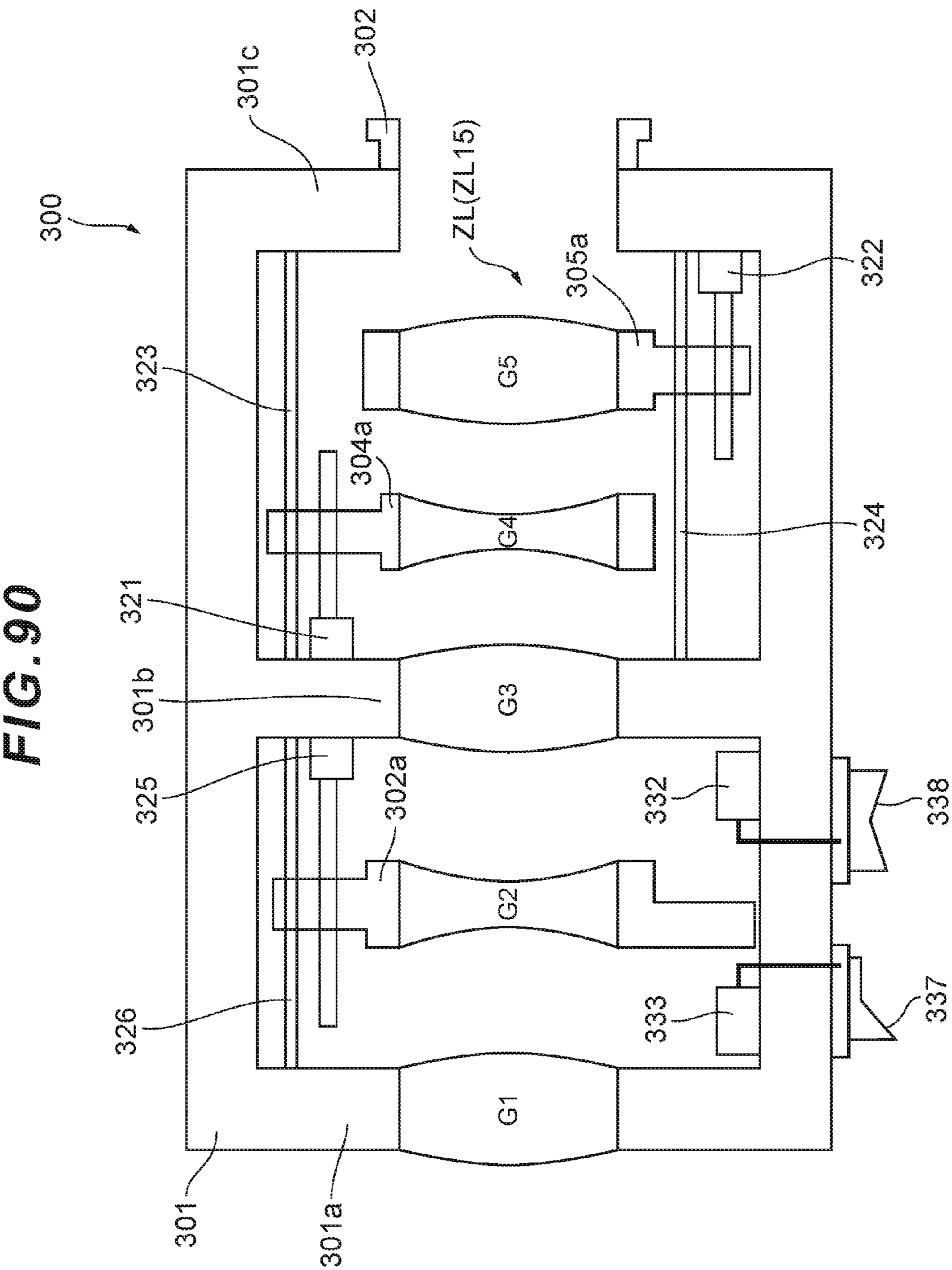
FIG. 90 illustrates a cross-sectional configuration diagram of the amphibious zoom lens apparatus according to a sixth embodiment.

Hereinafter, an amphibious zoom lens apparatus according to the sixth embodiment is described. as shown in FIG. 90, the amphibious zoom lens apparatus 300 of the sixth embodiment have an optical system ZL (ZL15) composed of, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power.

Moreover, the first lens group G1 is fixed in the body 301 on an optical axis via a first lens group holding part 301*a*, the third lens group G3 is fixed on the optical axis via a third lens group holding part 301*b*, and the second lens group G2 is held between the first lens group G1 and the third lens group G3 in the body 301 by a below-mentioned member in an manner respectively independently movable on the optical axis, while the fourth lens group G4 and the fifth lens group G5 is held closest to the image of the third lens group G3 in the body 301 by the member mentioned below in an manner respectively independently movable on the optical axis.

A focal length change switch member 338 for changing a focal length is provided on the outer surface of the body 301. The focal length detection unit 332, which detects a change request of a focal length by manipulation of the focal length change switch member 338, is disposed in the body 301.

An imaging state switch member 337 for switching between the underwater imaging state and the land imaging state is provided on the outer surface of the body 301. An imaging state identification unit 333, which identifies an imaging state switched by the imaging state switch member 337, is disposed in the body 301.

A mount member 302 is fixed to the image side end 301*c* of the body 301, and is fixed to an imaging device mentioned below by the mount member 302.

Figure 91:
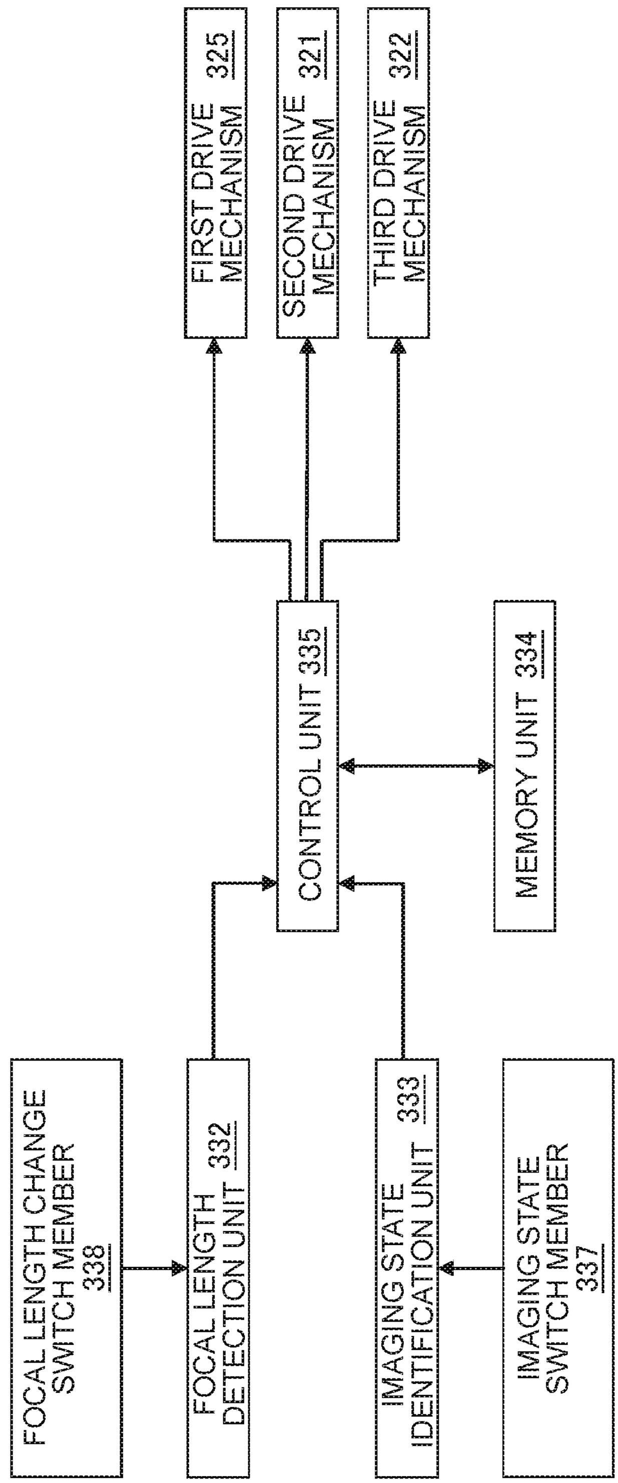
FIG. 91 illustrates a diagram showing a transmission relationship between informational and control of the anphibious zoom lens apparatus according to the sixth embodiment.

The second lens group G2 is held at the second lens group lens frame 302*a*, and this lens frame 302*a* is supported in a manner of sliding the first support member 326 disposed between a first lens group fixing part 301*a* and a third lens group fixing part 301*b*, and is configured to move along the optical axis by the first drive mechanism 325 based on a control signal from the control unit 135 illustrated in FIG. 91.

The fourth lens group G4 is held at the fourth lens group lens frame 304*a*, and this lens frame 304*a* is supported in a manner of sliding the second support member 323 disposed between a third lens group fixing part 301*b* and an image side end 301*c*, and is configured to move along the optical axis by the second drive mechanism 321 based on a control signal from the control unit 335.

The fifth lens group G5 is held at the fifth lens group lens frame 305*a*, and this lens frame 305*a* is supported in a manner of sliding the third support member 324 disposed between the third lens group fixing part 301*b* and the image side end 301*c*, and is configured to move along the optical axis by the third drive mechanism 322 based on a control signal from the control unit 135.

The anphibious zoom lens apparatus 300 according to the sixth embodiment memorizes, in a memory unit 334, positional information on the optical axis of the second lens group G2, the fourth lens group G4, and the fifth lens group G5, set depending on focal lengths, respectively in the land imaging state and the underwater imaging state. Positional information of the second lens group G2, the fourth lens group G4, and the fifth lens group G5 having not memorized focal lengths can be set by performing interpolation processing, etc. by the control unit 335 based on the memorized positional information.

In the amphibious zoom lens apparatus 300 according to the sixth embodiment, as shown in FIG. 91, an imaging state identified by the imaging state identification unit 333 by manipulated by the imaging state switching member 337 are transmitted to the control unit 335. A focal length change request detected by the focal length detection unit 332 with the focal length change switch member 338 manipulated is transmitted to the control unit 335.

The control unit 335 reads the positional information on the optical axis regarding the optical axis of the second lens group G2, the fourth lens group G4, and the fifth lens group G5 corresponding to the transferred imaging state and the focal length change request, and respectively independently move the second lens group G2 via the first mechanism 325, the fourth lens group G4 via the second mechanism 321, and the fifth lens group G5 via the third mechanism 332 to a certain optical axial position.

As a result, the amphibious zoom lens apparatus 300 according to the sixth embodiment, when by switching an imaging state by manipulating the switch member 337 and changing a focal length by manipulating the manipulation member 338, by setting positions of the second lens group G2, the fourth lens group G4 and the fifth lens group G5 on the optical axis based on the positional information memorized in the memory unit 334 by the control unit 335 in focal lengths of both in the land imaging state and the underwater imaging state, it is possible to appropriately correct various aberrations such as curvature of image surface covering whole focal length ranges of both of the land imaging state and the underwater imaging state.

Next, an optical system ZL15 equipped with the amphibious zoom lens apparatus 300 according to the sixth embodiment is described using FIG. 92 to FIGS. 94A, 94B and 94C, and Table 17. A characteristic feature common to the fifth embodiment included by the optical system ZL15 is the same as mentioned above.

Figure 92:
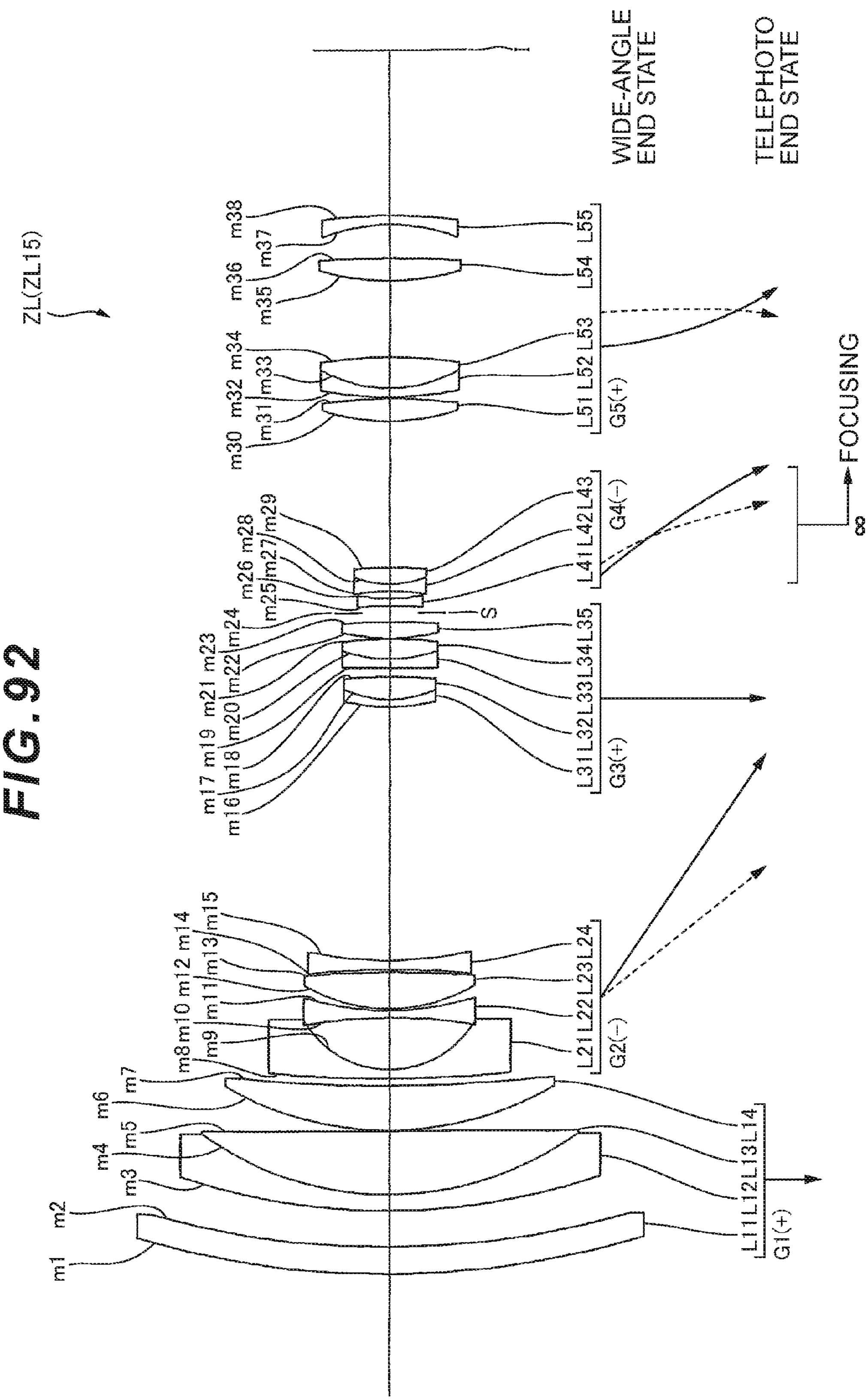
FIG. 92 illustrates a sectional view showing a lens configuration of the anphibious zoom lens apparatus according to the sixth embodiment, and a diagram showing a moving locus of each group from a wide-angle end state to a telephoto end state.

An optical system ZL15 equipped with the amphibious zoom lens apparatus 300 according to the sixth embodiment is composed of, as shown in FIG. 92, in order from an object, a first lens group G1 having positive refractive power, a second lens group G2 having negative refractive power, a third lens group G3 having positive refractive power, a fourth lens group G4 having negative refractive power, and a fifth lens group G5 having positive refractive power.

The first lens group G1 is composed of, in order from the object, a meniscus lens L11 having a convex surface facing the object, a cemented lens composed of a negative meniscus lens L12 having a concave surface facing an image and a positive meniscus lens L13 having a convex surface facing the object, and a positive meniscus lens L14 having a convex surface facing the object.

The second lens group G2 is composed of, in order from the object, a negative meniscus lens L21 having a concave surface facing the image, a biconcave negative lens L22, a biconvex positive lens L23, and a biconcave negative lens L24. The object side surface of the negative meniscus lens L21 is an aspherical surface.

The third lens group G3 is composed of, in order from the object, a cemented lens composed of a negative meniscus lens L31 having a concave surface facing the image and a biconvex positive lens L32, a cemented lens composed of a negative meniscus lens L33 having a concave surface facing to the image and a biconvex positive lens L34, and a biconvex positive lens L35.

The fourth lens group G4 is composed of, in order from, a biconcave negative lens L41, and a cemented lens composed of a biconcave negative lens L42 and a biconvex positive lens L43.

The fifth lens group G5 is composed of, in order from the object, a biconvex positive lens L51, a cemented lens composed of a negative meniscus lens L52 having a concave surface facing the image and a biconvex positive lens L53, a biconvex positive lens L54, and a negative meniscus lens L55 having a concave surface facing the object.

An iris stopper S is disposed on the image side of the third lens group G3.

The image surface I is formed on the image sensor which is composed of unillustrated CCDs, CMOSs, etc.

In the optical system ZL15 configured above, the lens surface closest to the object of the first lens group G1 has a radius of curvature satisfying the above mentioned conditional expression (9), and has a convex surface facing the object. With this arrangement, generation of distortion when imaging in water is suppressed.

The first lens group G1 and the third lens group G3 are always fixed.

The second lens group G2 moves in the image surface direction by the first drive mechanism 325 upon zooming from a wide-angle end state to a telephoto end state. However, moving ranges in the underwater imaging state from the land imaging state of the second lens group G2 are different from each other.

The fourth lens group G4 moves by the second drive mechanism 321 upon zooming from a wide-angle end state to a telephoto end state in a manner of having moving loci different from each other in the land imaging (corresponding to an arrow of a solid-line illustrated in FIG. 92) and in the underwater imaging state (corresponding to an arrow of a dotted-line illustrated in FIG. 92).

The fifth lens group G5 moves by the third drive mechanism 322 upon zooming from a wide-angle end state to a telephoto end state in a manner of having moving loci different from each other in the land imaging (corresponding to an arrow of a solid-line illustrated in FIG. 92) and in the underwater imaging state (corresponding to an arrow of a dotted-line illustrated in FIG. 92).

As described above, by changing the moving loci of the fourth lens group G4 and the fifth lens group G5 whether in the land imaging state or in the underwater imaging state, curvature of image surface can appropriately be corrected both in the land imaging state and the underwater imaging state, while maintaining constant image-forming positions between the land imaging state and the underwater imaging state.

Upon focusing on from an infinity imaging state to a short distance imaging state, the fourth lens group G4 is moved in the image surface direction. Also upon focusing, the fourth lens group G4 is moved by the second drive mechanism 321 as same as upon zooming.

The following Table 17 shows various data of the optical system ZL15 equipped with the amphibious zoom lens apparatus 300 according to the sixth embodiment. The surface numbers 1 to 38 in Table 17 correspond to each optical surfaces of m1 to m38 shown in FIG. 92.

TABLE 17

[Lens data]

| Surface number | r | d | nd | νd |
|---|---|---|---|---|
| 1 | 100.0000 | 3.0000 | 1.516800 | 63.88 |
| 2 | 98.9800 | 4.0000 | | |
| 3 | 74.1356 | 1.8000 | 1.850260 | 32.35 |
| 4 | 36.0351 | 7.0000 | 1.497820 | 82.51 |
| 5 | 3038.1597 | 0.1000 | | |
| 6 | 36.3362 | 5.0000 | 1.729157 | 54.66 |
| 7 | 170.0064 | D7 (Variable) | | |
| *8 | 159.7676 | 1.0000 | 1.816000 | 46.62 |
| 9 | 11.1111 | 5.7573 | | |
| 10 | −57.3031 | 0.8000 | 1.816000 | 46.62 |
| 11 | 32.0791 | 0.2020 | | |
| 12 | 18.8298 | 4.0000 | 1.846660 | 23.78 |
| 13 | −127.9381 | 0.3170 | | |
| 14 | −90.0599 | 1.0000 | 1.816000 | 46.62 |
| 15 | 41.7316 | D15 (Variable) | | |
| 16 | 22.5107 | 0.8000 | 1.834000 | 37.16 |
| 17 | 12.0861 | 2.5000 | 1.603001 | 65.46 |
| 18 | −69.1710 | 1.0000 | | |
| 19 | 864.1596 | 1.0000 | 1.850260 | 32.35 |
| 20 | 16.8557 | 2.2000 | 1.603001 | 65.46 |
| 21 | −47.4738 | 0.1000 | | |
| 22 | 24.2921 | 1.8000 | 1.729157 | 54.66 |
| 23 | −67.1681 | 1.0000 | | |
| 24 | ∞ (Aperture stop) | D24 (Variable) | | |
| 25 | −43.6868 | 0.8000 | 1.834807 | 42.72 |
| 26 | 22.6901 | 0.8000 | | |
| 27 | −25.0831 | 0.8000 | 1.834807 | 42.72 |
| 28 | 11.7100 | 1.8000 | 1.846660 | 23.78 |
| 29 | −48.7106 | D29 (Variable) | | |
| 30 | 24.1884 | 2.5000 | 1.497820 | 82.51 |
| 31 | −58.4609 | 0.2000 | | |
| 32 | 40.9485 | 1.0000 | 1.834807 | 42.72 |
| 33 | 15.4156 | 3.5000 | 1.497820 | 82.51 |

TABLE 17-continued

| Surface number | r | d | nd | νd |
|---|---|---|---|---|
| 34 | −46.0872 | 8.5639 | | |
| 35 | 28.3973 | 2.5000 | 1.497820 | 82.51 |
| 36 | −123.1319 | 3.7652 | | |
| 37 | −20.5259 | 1.0000 | 1.846660 | 23.78 |
| 38 | −54.7499 | Bf | | |
| Image surface | ∞ | | | |

[Aspheric surface data]

The eighth surface

κ = −20.0000
A4 = +4.26826E−06
A6 = −9.97395E−09
A8 = +1.52813E−11
A10 = −3.70867E−14
A12 = 0.00000E+00
A14 = 0.00000E+00

[Various data]

(Land imaging state)

| | | | |
|---|---|---|---|
| f | 10.41 | 45.47 | 98.00 |
| FNO | 4.60 | 5.15 | 5.89 |
| 2ω | 77.37 | 19.45 | 9.06 |
| Y | 8.00 | 8.00 | 8.00 |
| TL | 135.78 | 135.78 | 135.78 |
| D7 | 0.800 | 20.355 | 28.029 |
| D15 | 28.052 | 8.497 | 0.823 |
| D24 | 0.800 | 8.210 | 13.112 |
| D29 | 16.136 | 9.093 | 6.831 |
| Bf | 18.391 | 18.023 | 15.383 |

(Underwater imaging state)

| | | | |
|---|---|---|---|
| f | 9.50 | 16.43 | 38.02 |
| FNO | 4.65 | 4.95 | 5.67 |
| 2ω | 64.38 | 39.34 | 17.66 |
| Y | 8.00 | 8.00 | 8.00 |
| TL | 135.78 | 135.78 | 135.78 |
| D7 | 0.800 | 10.200 | 20.355 |
| D15 | 28.052 | 18.652 | 8.497 |
| D24 | 1.618 | 4.381 | 10.362 |
| D29 | 16.899 | 13.919 | 7.212 |
| Bf | 16.809 | 17.026 | 17.762 |

[Lens group data]

| Group | Front end surface | Rear end surface | Group focus length |
|---|---|---|---|
| First lens group | 1 | 7 | 58.171 |
| Second lens group | 8 | 15 | −10.550 |
| Third lens group | 16 | 23 | 16.309 |
| Fourth lens group | 25 | 29 | −14.362 |
| Fifth lens group | 30 | 38 | 24.289 |

[Position data of each lens group]

(Land imaging state)

| | | | |
|---|---|---|---|
| f | 10.41 | 45.47 | 98.00 |
| Second lens group | 0.000 | 19.555 | 27.230 |
| Fourth lens group | 0.000 | 7.411 | 12.313 |
| Fifth lens group | 0.000 | 0.368 | 3.008 |

(Underwater imaging state)

| | | | |
|---|---|---|---|
| f | 9.50 | 16.43 | 38.02 |
| Second lens group | 0.000 | 9.400 | 19.555 |
| Fourth lens group | 0.818 | 3.581 | 9.562 |
| Fifth lens group | 1.582 | 1.365 | 0.629 |

[Values corresponding to the conditional expressions]

Conditional expression (9) R1/Enpw = 3.014
Conditional expression (10) Δ1U/Δ1A = −0.317
Conditional expression (11) Δ2U/Δ2A = 0.710
Conditional expression (12) φ1/φw = 0.000
Conditional expression (13) R2/TL = 0.729

TABLE 17-continued

| |
|---|
| R1 = 100.000 |
| Enpw = 33.183 |
| Δ1U = −0.953 |
| Δ1A = 3.008 |
| Δ2U = 8.744 |
| Δ2A = 12.313 |
| φ1 = 0.000 |
| φw = 0.096 |
| R2 = 98.98 |
| TL = 135.78 |

Based on Table 17, in the amphibious zoom lens apparatus 300 according to the sixth embodiment, the conditional expressions (9) to (13) are satisfied.

Figure 93A:
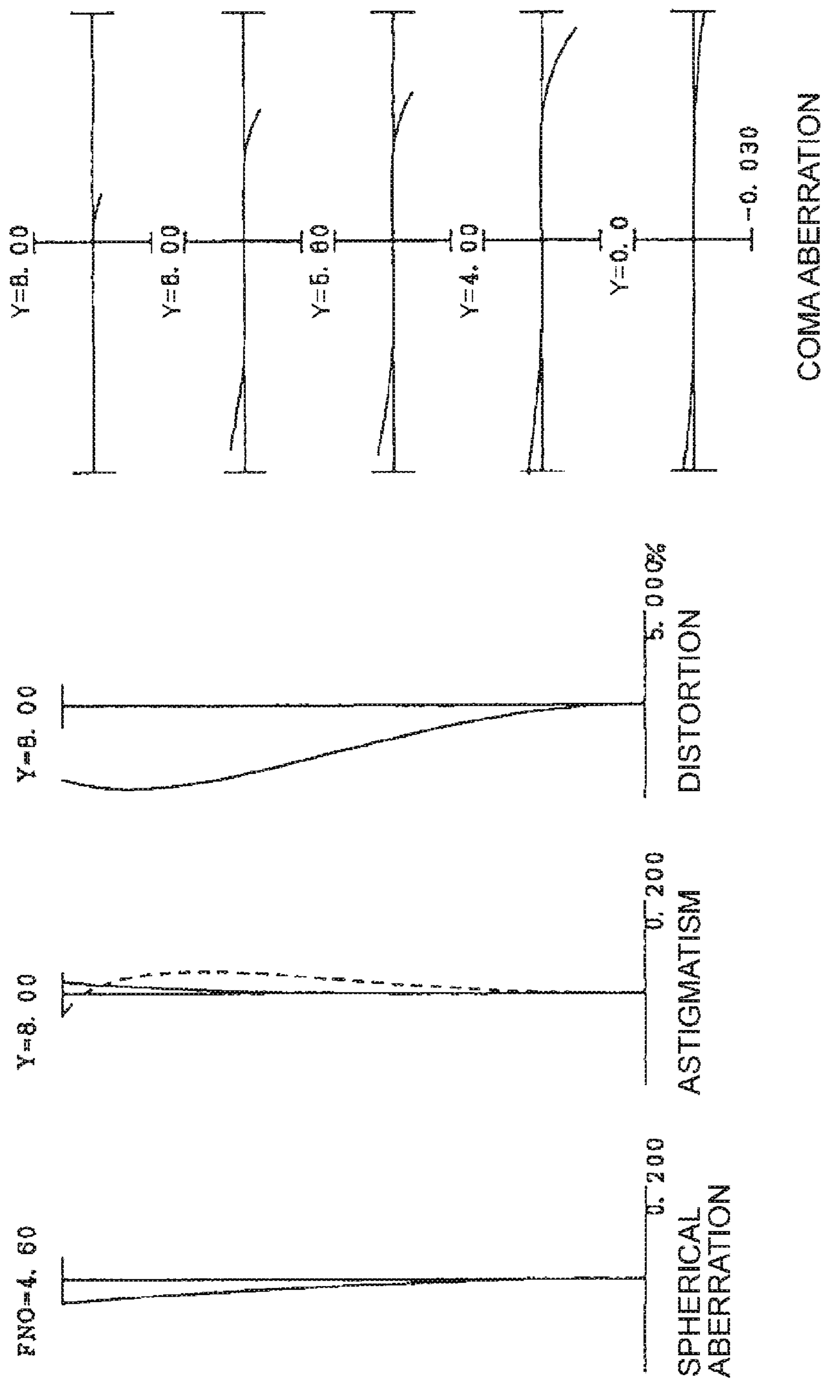
FIGS. 93A, 93B and 93C illustrate a graph showing aberrations to d-line (wave length of 587.6 nm) in an infinity focusing state in the land imaging state of the amphibious zoom lens apparatus according to the sixth embodiment, where
Figure 93B:
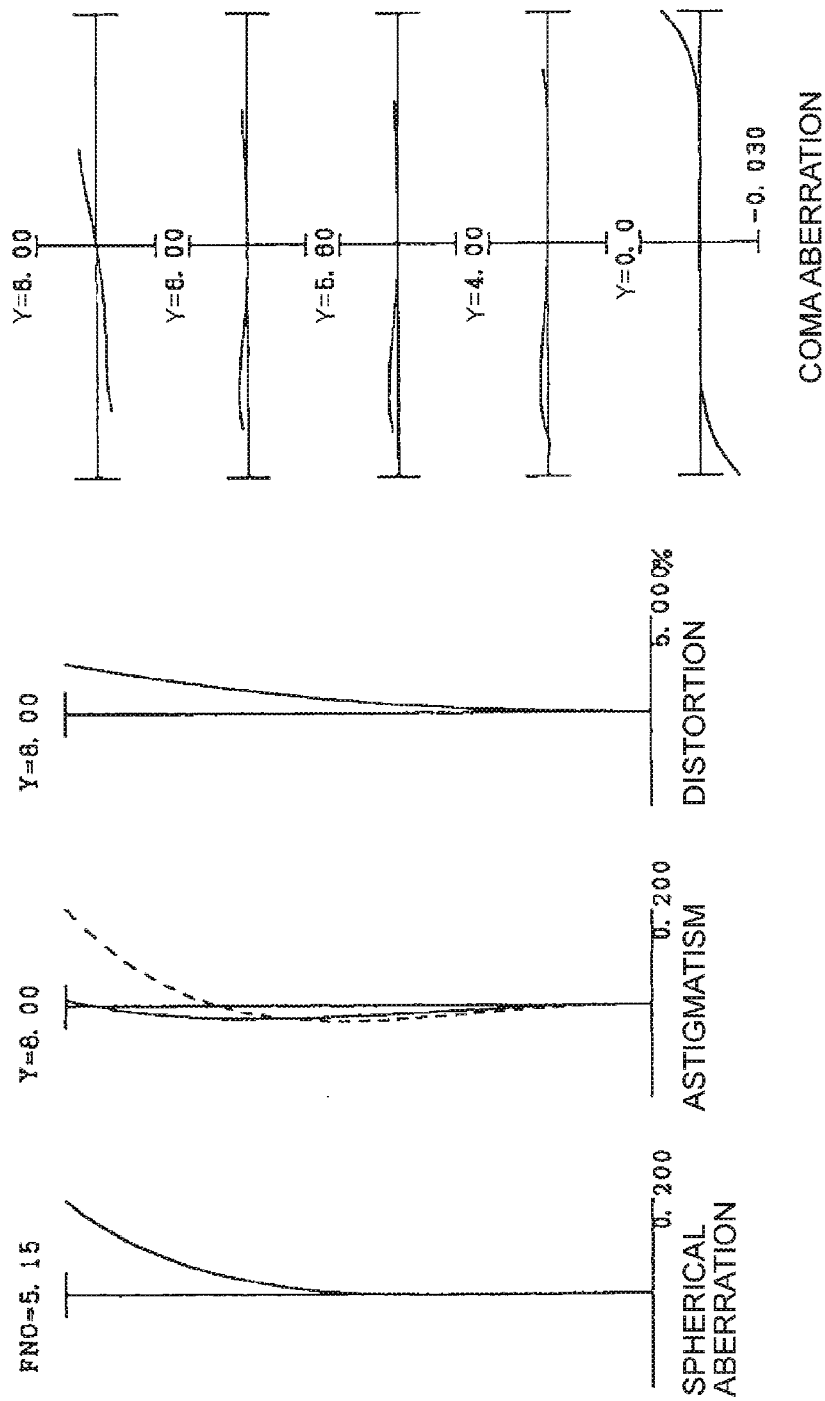
Figure 93C:
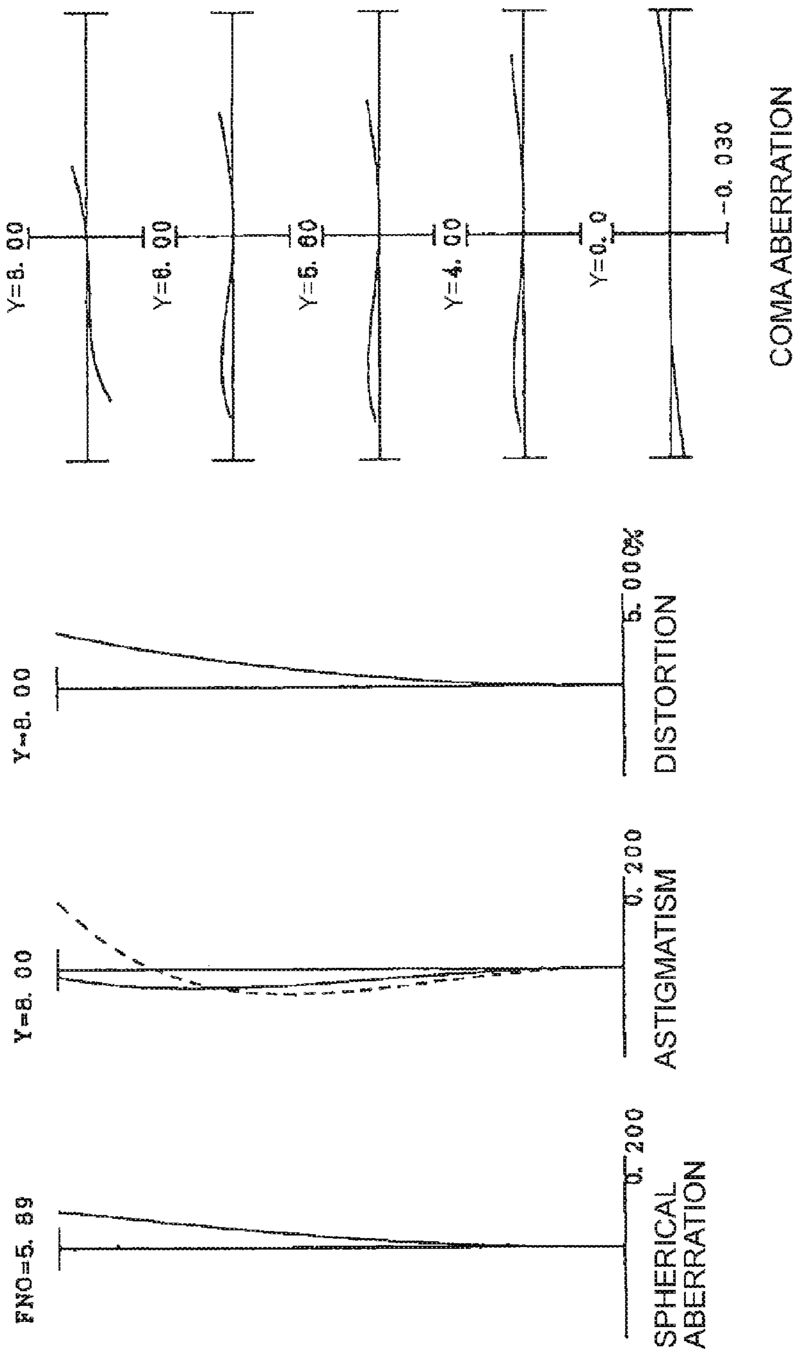
Figure 94A:
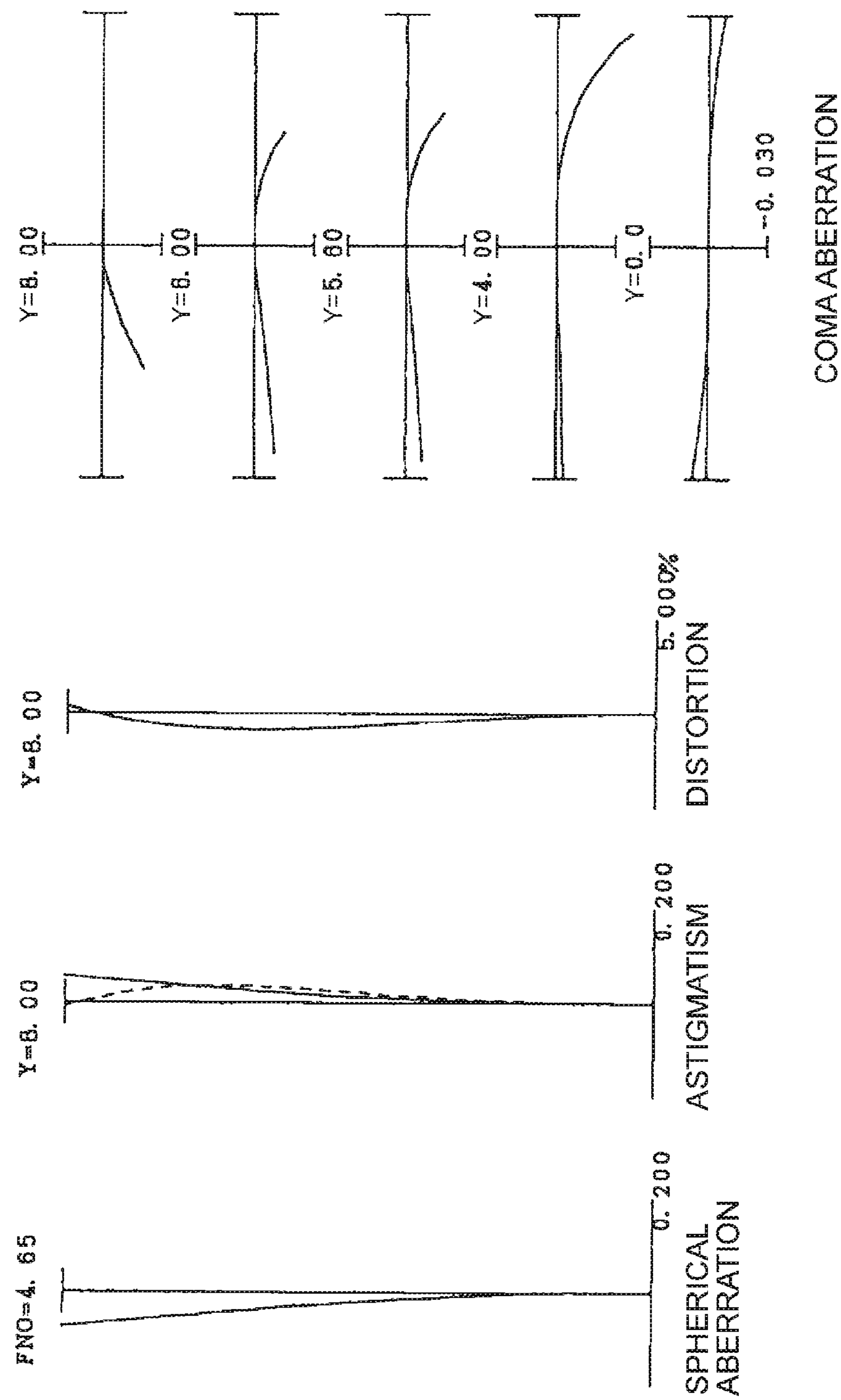
FIGS. 94A, 94B and 94C illustrate a graph showing aberrations to d-line (wave length of 587.6 nm) in an infinity focusing state in the underwater imaging state of the amphibious zoom lens apparatus according to the sixth embodiment, where
Figure 94B:
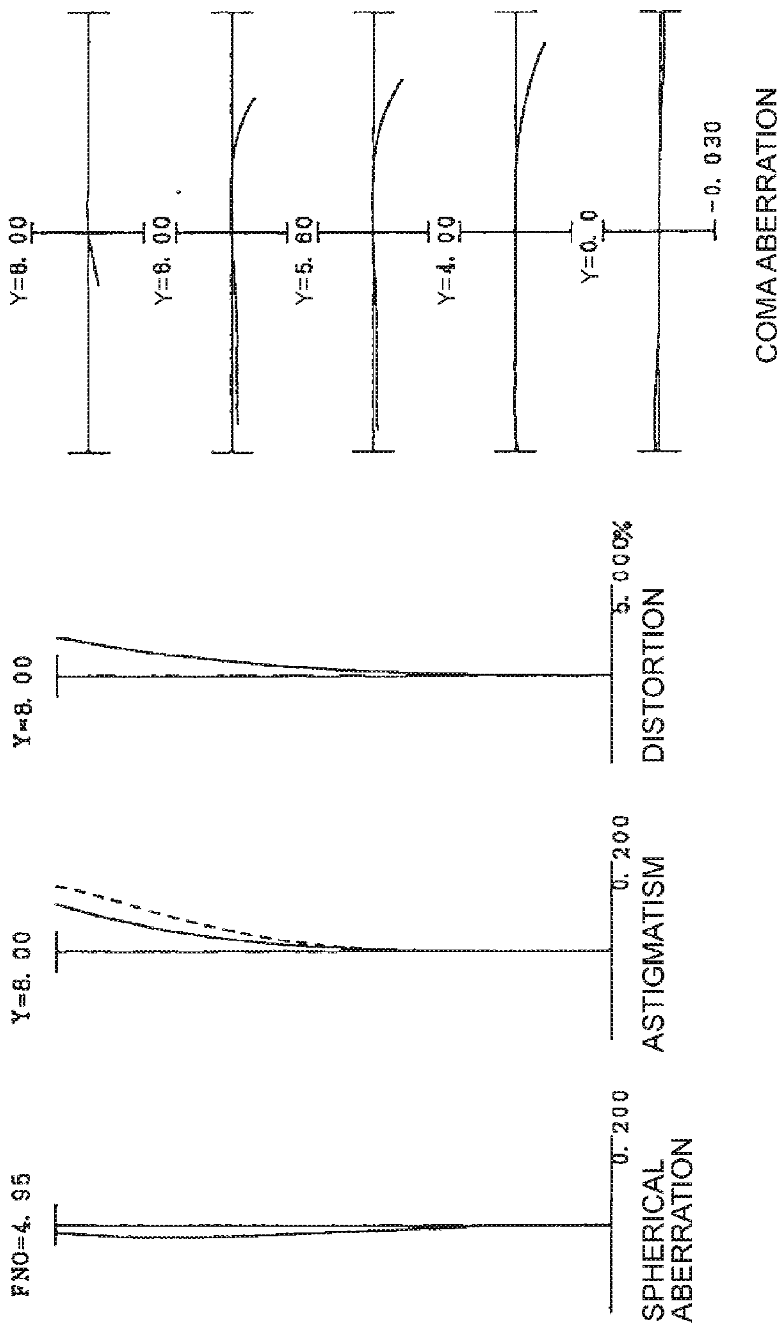
Figure 94C:
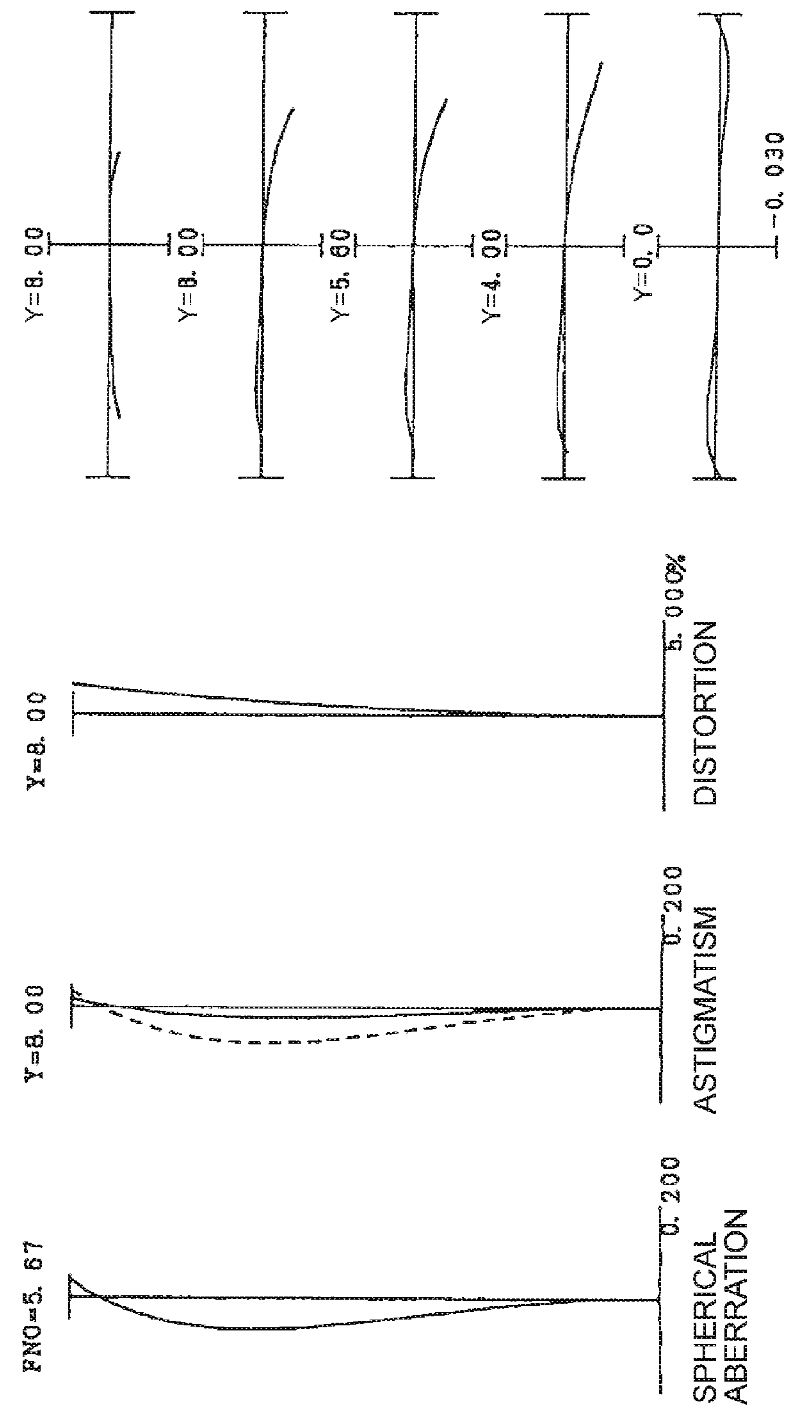
Figure 95:
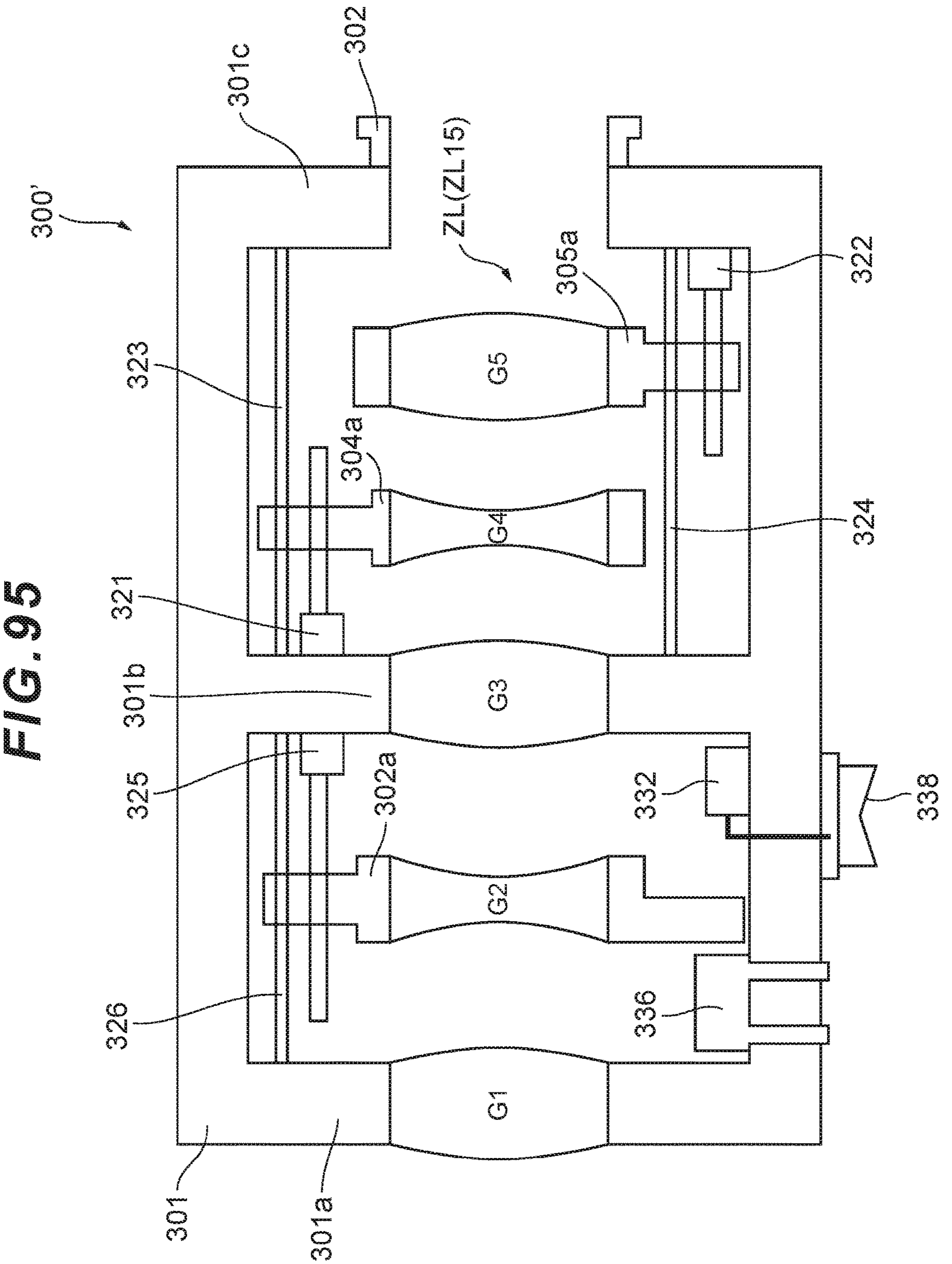
FIG. 95 illustrates a diagram showing the modification of the amphibious zoom lens apparatus according to the sixth embodiment.

FIGS. 93A, 93B and 93C illustrate a graph showing aberrations to d-line (wave length of 587.6 nm) in an infinity focusing state in the land imaging state based on design values of the amphibious zoom lens apparatus 300 according to the sixth embodiment, where FIG. 93A depicts the wide-angle end state, FIG. 93B depicts an intermediate focal length state, and FIG. 93C depicts the telephoto end state. FIGS. 94A, 94B and 94C illustrate a graph showing aberrations to d-line (wave length of 587.6 nm) in an infinity focusing state in the underwater imaging state based on design values of the anphibious zoom lens apparatus 300 according to the sixth embodiment, where FIG. 94A depicts the wide-angle end state, FIG. 94B depicts the intermediate focal length state, and FIG. 94C depicts the telephoto end state.

Based on each graph showing aberrations, regarding the amphibious zoom lens 300 according to the sixth embodiment, it is possible to appropriately correct various aberrations such as distortion and curvature of image surface, etc. both in the land imaging state and the underwater imaging state, and obtain high image-forming performance.

Note that in the sixth embodiment as a method for identifying whether the land imaging state or the underwater state, as described above, the imaging state switch member 337 is provided in the body 301 and the method for identifying in response to switching manipulation of a photographer, however, it is not limited to the above. For example, as illustrated in the amphibious zoom lens apparatus 300' in FIG. 95, it is possible to provide two terminals 336 exposed from the body 301, and adopt a method for automatically identifying by measuring electrical resistance between the two terminals. With this arrangement, it is possible to improve convenience upon using.

Next, a camera (imaging device) 240 equipped with the amphibious zoom lens apparatus 240 according to the fifth and sixth embodiments is described with reference to FIG. 96. Here, a case in which the amphibious zoom lens apparatus 200 (refer to FIG. 84) according to the fifth embodiment is described, however, this applicable to the fifth embodiment.

Figure 96:
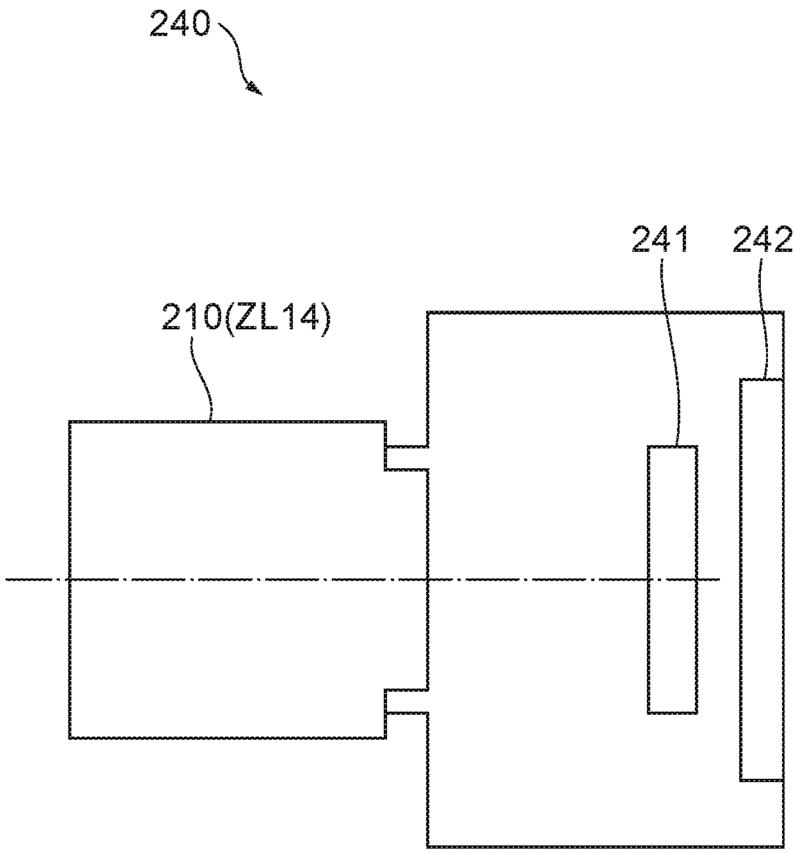
FIG. 96 illustrates a diagram showing a configuration of a camera (imaging device) equipped with the amphibious zoom lens apparatuses according to the fifth and sixth embodiments.

The camera 40 is, as shown in FIG. 96, an interchangeable lens type amphibious camera which holds the amphibious zoom lens apparatus 200 according to the fifth embodiment in an attachable and detachable manner. In this camera 240, light from an unillustrated photographic subject is condensed by the optical system ZL14 of the amphibious zoom lens apparatus 200, and is imaged on the image sensor 241. An image of the photographic subject imaged on the image sensor 241 is converted into a video signal by an unillustrated electric circuit, and is displayed on a monitoring screen 242, then is observable by a photographer. The photographer sets an imaging state by manipulating the switch member 237 (shown in FIG. 84), and decides an imaging composition after setting a focusing length by manipulating the manipulating member 231 (shown in FIG. 84), while half-pressing an unillustrated release button. Next, if the release button is fully pressed by the photographer, in camera 240 the light from the photographic subject is received by the image sensor 241 so that an imaging picture is acquired and recorded on an unillustrated memory.

According to the amphibious camera 240 equipped with the above configuration, although configurations are simplified by having the amphibious zoom lens apparatus 200 according to the third embodiment, it is possible to perform zooming both in the land imaging state and the underwater imaging state, and realize a camera which has good optical performance.

Note that the camera 240 set forth in FIG. 96 may be not only a type in which the amphibious zoom lens apparatus 200 is provided in an attachable and detachable manner, but also a type in which the camera body is integrated with the amphibious zoom lens apparatus 200. Moreover, the camera 240 may be a so-called single-lens reflex camera having a quick return mirror, or a video camera which primarily performs moving imaging.

Figure 97:
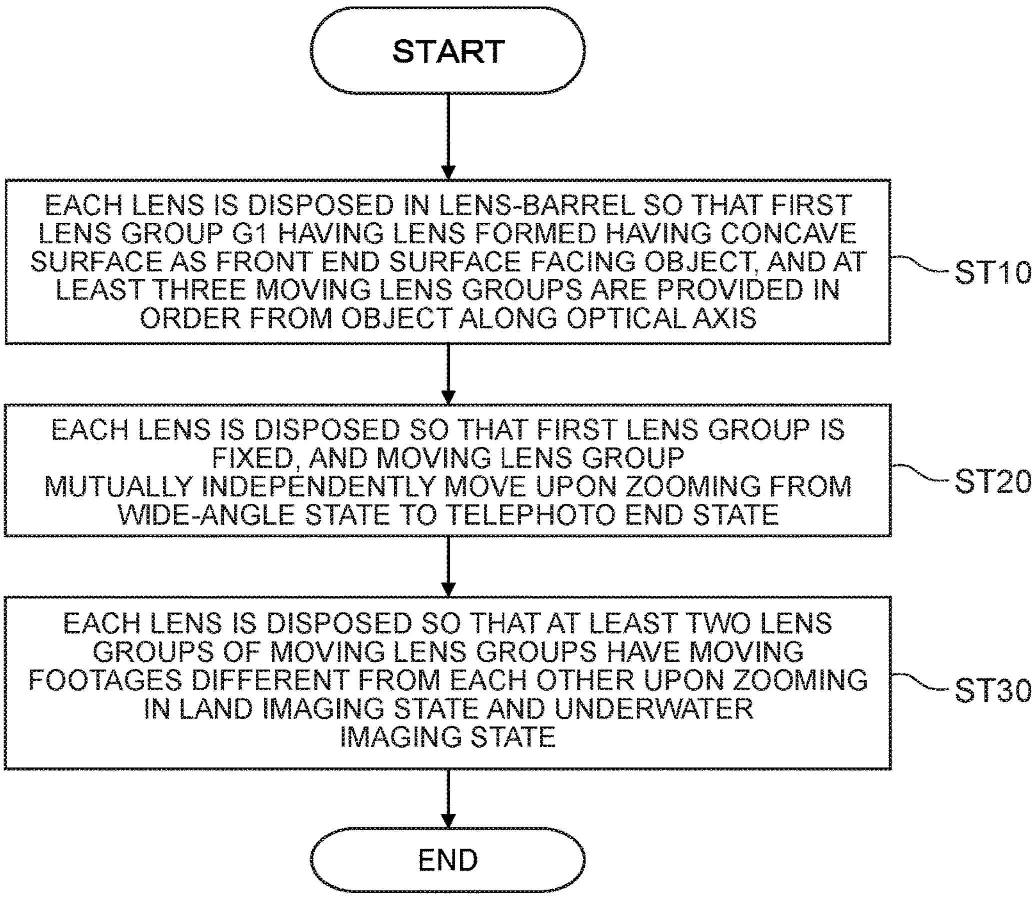
FIG. 97 illustrates a flowchart showing a method for manufacturing the anphibious zoom lens apparatuses according to the fifth and sixth embodiments.

Next, a method for manufacturing the amphibious zoom lens apparatuses according to the fifth and sixth embodiments are described with reference to FIG. 97. Here, a case in which the amphibious zoom lens apparatus 200 according to the fifth embodiment is manufactured is described, this is applicable to the amphibious zoom lens apparatus 200 (refer to FIG. 84) according to the fifth embodiment.

Firstly, each lens is disposed in the body 1 so that a first lens group having a lens in which a convex surface of lens surfaces closest to the object faces the object, and at least three moving lens groups are arranged in order from the object along the optical axis (Step ST10). At this point, each lens is disposed so that upon zooming from a wide-angle end state to a telephoto end state, the first lens group G1 is fixed, the moving lens group (for example, the second lens group G2, the fourth lens group G4, the fifth lens group G5) mutually independently move (Step ST20). Moreover, each lens is disposed so that at least two lens groups (for instance, the fourth lens group G4 and the fifth lens group G5) of the moving lens group have moving loci upon zooming which are different from each other in the land imaging state and the underwater imaging state (Step ST30).

Note that the above-mentioned “underwater imaging state” is equivalent to the first imaging state in a first medium (water (refractive index=1.333 in d-line)) in claims, and “land imaging state” is equivalent to the second imaging state in a second medium (air (refractive index=1.000 in d-line)).

Here, exampling a lens arrangement, in the amphibious zoom lens apparatus 200 according to the fifth embodiment, as mentioned above (refer to FIG. 86), a positive meniscus lens L11 having a convex surface facing the object, a cemented lens composed of a negative meniscus lens having a concave surface facing to the image and a biconvex positive lens L13, and a positive meniscus lens having a convex surface facing the object are disposed in order from the object in the body 1, as the first lens group G1. As the second lens group G2, a cemented lens composed of a positive meniscus lens L21 having a convex surface facing the object and a negative meniscus lens having a concave surface facing the image, and a biconcave negative lens L23, and a cemented positive lens composed of a biconvex positive meniscus lens L24 and a biconcave negative lens L25 are disposed in order from the object. As the third lens group G3, a cemented lens composed of a negative meniscus lens L31 having a concave surface facing the image and a biconvex positive lens L32, a cemented lens composed of a biconvex positive lens L33 and a negative meniscus lens L34 having a concave surface facing the object, and a biconvex positive lens L35 are disposed in order from the object in the body 1. As the fourth lens group G4, a biconcave negative lens L41, a cemented lens composed of a biconcave negative lens L42 and a biconvex positive lens L43 is disposed in the body 1 in order from the object. As the fifth lens group G5, a biconvex positive lens L51, a cemented lens composed of a biconvex positive lens L52 and a negative meniscus lens L53 having a concave surface facing the object, a cemented lens composed of a negative meniscus lens L54 having a concave surface facing the image and a biconvex positive lens L55, and a negative meniscus lens L56 having a concave surface facing the object.

According to such a method for manufacturing, although configurations are simplified, it is possible to manufacture the amphibious zoom lens 200 which can perform zooming both in the land imaging state and the underwater imaging state, and has good optical performance.

As described above with elements of the embodiment attached in order to make the present invention understandable, however the present invention is not limited to the above.

For example, in each embodiment an optical system having five groups configuration is described, however this can be applied to other group configuration such as four, or six or more groups configuration. Moreover, this applicable to a configuration in which a lens or a lens group is added closest to the object, or a configuration in which a lens or a lens group is added closest to the image. Moreover, a lens group means a part having at least one lens separated with air interval which changes upon zooming or focusing. Note that in the six or more groups configuration, the moving lens group may have not only a three group configuration but also a four or more configuration. Moreover, in case a moving lens group is configured with four or more, it is possible to have the same advantageous effect as the embodiments above, by memorizing positional information of 2 to 4 moving lens groups in the memory unit 34, 134.

Moreover, it is appreciated that a focusing lens group is configured to focus from an infinity object on a short distance object by moving a single or a plurality of lens group, or a partial lens group in an optical axis direction. This focusing lens group is also applicable to autofocus, and is also suitable for motor drive for autofocus (using an ultrasonic motor, etc.). In particular, it is preferable that a focusing lens group is configured with the fourth lens group G4.

Moreover, a lens surface may be configured with a spherical surface or a plane, or an aspherical surface. In case a lens surface has a spherical surface or a plane, it is possible to easily have lens processing and an assembly adjustment, and to prevent degradation of optical performance due to errors of processing and an assembly adjustment, thus it is preferable. Moreover, it is preferable because there is less degradation of the depiction performance when an image surface is shifted. In case a lens surface has an aspherical surface, the aspherical surface may be formed with any one of an aspherical surface which is formed through grinding processing, a glass mold aspherical surface in which glass is formed into an aspherical surface configuration using a mold, and a complexed aspherical surface in which a resin is formed on a surface of glass and formed into an aspherical surface configuration. Moreover, a lens surface may be formed as a diffractive surface, additionally a lens may be formed as a graded-index lens (GRIN lens) or a plastic lens.

In each embodiment, a reflection reducing film having high transitivity within a broad wavelength band may be applied to each lens surface, in order to reduce flare and ghost and to attain good optical performance of high contrast.

EXPLANATION OF NUMERALS AND CHARACTERS

ZL (ZL1 to ZL9) Optical system (first embodiment)
G1 First lens group
G2 Second lens group
G3 Third lens group
G4 Fourth lens group
AS Aperture stop
F Filter group
I image surface
CAM Camera (imaging device)
ZL (ZL10 to ZL13) Amphibious zoom lens (second embodiment)
S Iris stopper
10 and 100 Amphibious zoom lens apparatus
1 and 101 Body
11*m* and 111*m* Mount member
2 and 102 Second lens group lens frame
3 and 103 The third lens group lens frame
4 and 104 Fourth lens group lens frame
5 Long hole
6 Manipulation member (for a focal length modification)
22 and 122 First drive mechanism
32 and 132 Second drive mechanism
51 and 151 Focal length detection unit
41 and 141 Imaging state identification unit
61 and 161 Memory unit
71 and 171 Control unit
42 and 142 Switch member (for switching an imaging state)
152 Switch member (for a focal length modification)
182 Third drive mechanism
90 Amphibious camera (imaging device)
91 Image sensor
92 Monitoring screen
ZL (ZL10, ZL11) Optical system (third and fourth embodiments)
200, 200', 300, and 300' amphibious zoom lens apparatus
201 and 301 Body
221 and 325 First drive mechanism
222 and 321 Second drive mechanism
231 Manipulation member (for changing a focal length)
202*a* Lens frame (movement mechanism)
202*b* Pin (movement mechanism)
231*a* Cam groove (movement mechanism)
232 and 332 Focal length detection unit
233 and 333 Imaging state identification unit
234 and 334 Memory unit
235 and 335 Control unit
237 and 337 Switch member (for switching an imaging state)
240 Amphibious camera (imaging device)
241 Image sensor
242 Monitoring screen
322 Third drive mechanism
338 Switch member (for changing a focal length)

ZL (ZL14 and ZL15) Optical system (fifth and sixth embodiments)

The invention claimed is:

1. An optical system capable of imaging in a plurality of object side media of which refractive indexes are different from each other, and comprising, in order from an object:

a front lens group which is fixed in position along an optical axis, and a rear lens group, the rear lens group including at least two moving lens groups, the at least two moving lens groups in the rear lens group moving along the optical axis when an object side medium is switched a among the plurality of object side media.

2. An optical system according to claim 1, wherein the rear lens group comprises at least two negative lens groups that are moved along the optical axis when the object side media switched.

3. An optical system according to claim 1, wherein the following conditional expression is satisfied:

$$2.000<R1/Ymax<8.000$$

where R1 denotes a radius of curvature of an object side surface of a lens component disposed closest to the object in the front lens group, and Ymax denotes a maximum image height.

4. An optical system according to claim 1, wherein the optical system comprises, in order from the object, a first lens group whose position in an optical axis direction is fixed, a second lens group, a third lens group, and a fourth lens group, wherein the front lens group is composed of the first lens group, the rear lens group comprises the second lens group, the third lens group, and the fourth lens group, and the second lens group and the third lens group are moved along the optical axis when the object side medium is switched.

5. An optical system according to claim 4, wherein zooming can be performed by moving the second lens group, the third lens group, and the fourth lens group along the optical axis when imaging in each of the object side media.

6. An optical system according to claim 4, wherein a distance between the first lens group and the second lens group is changed upon zooming and when the object side medium switched, a distance between the second lens group and the third lens group is changed when the object side medium is switched, and a distance between the third lens group and the fourth lens group is changed upon zooming and when the object side medium is switched.

7. An optical system according to claim 4, wherein when the object side medium is switched from a low refractive index medium to a high refractive index medium, the second lens group is moved toward an image surface along the optical axis, and the third lens group is moved toward the object along the optical axis.

8. An optical system according to claim 4, wherein when the object side medium is switched, the distance between the second lens group and the third lens group is maintained constant upon zooming in an infinity imaging state both before and after the object side medium is switched.

9. An optical system according to claim 4, wherein when the object side medium is switched from a low refractive index medium to a high refractive index medium, a moving locus of the second lens group upon zooming in an imaging state in the low refractive index medium is identical to a moving locus of the second lens group upon zooming in an imaging state in the high refractive index medium.

10. An optical system according to claim 4, wherein focusing is performed by moving the third lens group along the optical axis as a focusing lens group, when imaging in each of the object side media.

11. An optical system according to claim 10, wherein the following conditional expression is satisfied:

$$1.000<f2/f3<6.000$$

where f2 denotes a focal length of the second lens group, and f3 denotes a focal length of the third lens group.

12. An optical system according to claim 1, wherein a lens component disposed closest to the object in the front lens group has a meniscuses configuration having a convex surface facing the object.

13. An optical system according to claim 1, wherein the following conditional expression is satisfied:

$$0.200<R1/R2<2.000$$

where R1 denotes a radius of curvature of an object side surface of a lens component disposed closest to the object in the front lens group, and R2 denotes a radius of curvature of an image side surface of the lens component disposed closest to the object in the front lens group.

14. An optical system according to claim 1, wherein at least one of moving lens groups in the rear lens group is moved along the optical axis as a focusing lens group when imaging in each of the object side media.

15. An imaging apparatus comprising an optical system according to claim 1.

16. An optical system capable of switching between a first imaging state in a first medium having a first refractive index and a second imaging state in a second medium having a second refractive index which is different from the first refractive index, the optical system comprising, in order from an object, a first lens group whose position is fixed along an optical axis, an intermediate group having negative refractive power, and an image side group, a lens component disposed closest to an image in the intermediate group being a lens component arranged closest to the image in a focusing lens group for at least one of the first imaging state and the second imaging state, at least one of a distance between the first lens group and the intermediate group and a distance between the intermediate group and the image side group being changed when switching from the first imaging state to the second imaging state.

17. An imaging apparatus comprising an optical system according to claim 16.

18. An optical system capable of switching between a first imaging state in a first medium having a first refractive index and a second imaging state in a second medium having a second refractive index which is different from the first refractive index, the optical system comprising, a first lens group disposed closest to an object and fixed in position along an optical axis, and a focusing lens group disposed closest to an image in another lens group, and being moved along the optical axis upon focusing in both the first imaging state and the second imaging state, and the focusing lens group having negative refractive power.

19. An imaging apparatus comprising an optical system according to claim 18.

20. A method for manufacturing an optical system capable of imaging in a plurality of object side media whose refractive indexes are different from each other, the optical system comprising, in order from an object:

a front lens group which is fixed in position an optical axis, and a rear lens group, each lens group being disposed in a lens-barrel so that at least two moving lens groups in the rear lens group are moved along the optical axis when an object side medium is switched among the plurality of object side media.

21. An optical system capable of switching between a first imaging state in a first medium having a first refractive index, and a second imaging state in a second medium having a second refractive index which is different from the first refractive index, the optical system comprising a first lens group, and a second lens group disposed closer than the first lens group to an image, a distance between the first lens group and the second lens group being changed upon zooming in the first imaging state and upon zooming in the second imaging state, the distance between the first lens group and the second lens group being changed when switching the first imaging state to the second imaging state, while not changing a focal length of the optical system.

22. An optical system according to claim 21, wherein a position of a lens group disposed closest to an object is fixed along an optical axis upon zooming.

23. An optical system according to claim 21, wherein the optical system comprises, in order from an object, the first lens group, the second lens group, a third lens group and a fourth lens group, the first lens group having positive refractive power, the second lens group having negative refractive power, the third lens group having positive refractive power, and the fourth lens group having positive refractive power.

24. An optical system according to claim 23, wherein the second lens group and the third lens group are moved along the optical axis when switching from the first imaging state to the second imaging state.

25. An optical system according to claim 23, wherein the following conditional expression is satisfied:

$$0.30<\Delta 2w/\Delta 3w<1.20$$

where Δ2w denotes amount of movement of the second lens group when changing from an infinity imaging state in a wide-angle end state of the optical system in the second imaging state to an infinity imaging state in a wide-angle end state of the optical system in the first imaging state, and Δ3w denotes amount of movement of the third lens group when changing from the infinity imaging state in the wide-angle end state of optical system in the second imaging state to the infinity imaging state in the wide-angle end state of the optical system in the first imaging state.

26. An optical system according to claim 23, wherein the following conditional expression is satisfied:

$$0.20<\varphi 3/\varphi 4<1.00$$

where φ3 denotes refractive power of the third lens group in the second medium, and φ4 denotes refractive power of the fourth lens group in the second medium.

27. An optical system according to claim 21, wherein the following conditional expression is satisfied:

$$1.00<R1/Enpw<4.00$$

where R1 denotes a radius of curvature of a lens surface closest to an object in the first lens group, and Enpw denotes a distance on an optical axis from the lens surface closest to the object in the first lens group to a paraxial incident pupil position in an infinity imaging state in a wide-angle end state of the optical system in the second imaging state.

28. An optical system according to claim 21, wherein the following conditional expression is satisfied;

$$-0.15<\varphi 1/\varphi w<0.15$$

where φ1 denotes refractive power of the first lens group in the second medium, and φw denotes refractive power of the optical system in a wide-angle end state in the second imaging state.

29. An optical system according to claim 21, wherein the following conditional expression is satisfied:

$$-1.00<\varphi 2/\varphi w<-0.30$$

where φ2 denotes refractive power of the second lens group in the second medium, and φw denotes refractive power of the optical system in a wide-angle end state in the second imaging state.

30. An optical system according to claim 21, wherein the first medium having the first refractive index is water, and the second medium having the second refractive index is air.

31. An imaging device comprising the optical system according to claim 21.

32. A method for manufacturing an optical system capable of switching between a first imaging state in a first medium having a first refractive index and a second imaging state in a second medium having a second refractive index which is different from the first refractive index, the method comprising:

arranging a first lens group and a second lens group in a lens barrel such that:

the second lens group is disposed closer than the first lens group to an image, a distance between the first lens group and the second lens group changes upon zooming in the first imaging state and upon zooming in the second imaging state, and distance between the first lens group and the second lens group changes when switching from the first imaging state to the second imaging state while not changing a focal length of the optical system.

33. An optical system capable of switching between a first imaging state in a first medium having a first refractive index and a second imaging state in a second medium having a second refractive index which is different from the first refractive index, the optical system comprising, in order from an object along an optical axis, a first lens group, and at least three more lens groups, zooming being performed by moving at least one of the three lens groups along the optical axis with a position of the first lens group along the optical axis being fixed, focusing being performed in the first imaging state by moving at least a part of the three lens groups along the optical axis as a first focusing lens group, focusing being performed in the second imaging state by moving at least a part of the three lens groups along the optical axis as a second focusing lens group, and at least one of respective configurations of the first focusing lens group and the second focusing lens group and respective moving loci of the first focusing lens group and the second lens group being different from each other.

34. An optical system according to claim 33, wherein a closest negative lens group to the object among the three lens groups is the first focusing lens group, and a lens group arranged closer than the first focusing lens group to an image is the second focusing lens group.

35. An optical system according to claim 33, wherein when switched between the first imaging state and the second imaging state, at least two lens groups of the three lens groups are moved along the optical axis.

36. An optical system according to claim 33, wherein the three lens groups are composed of, in order from the object, a second lens group having negative refractive power, a third lens group having positive refractive power, and a fourth lens group having positive refractive power, and wherein zooming is performed by changing a distance between the first lens group and the second lens group and a distance between the second lens group and the third lens group.

37. An optical system according to claim 33, wherein the first medium having the first refractive index is water, and the second medium having the second refractive index is air.

38. An imaging apparatus comprising the optical system according to claim 33.

39. A method for manufacturing an optical system capable of switching between a first imaging state in a first medium having a first refractive index and a second imaging state in a second medium having a second refractive index which is different from the first refractive index, the method comprising:

arranging a first lens group and at least three more lens groups in a lens barrel, in order along an optical axis, such that:

zooming is performed by moving at least one of the three lens groups along the optical axis with the first lens group being fixed in position along the optical axis, focusing is performed in the first imaging state by moving at least one of the three lens groups along the optical axis as a first focusing lens group, focusing is performed in the second imaging state by moving at least one of the three lens groups along the optical axis as a second focusing lens group, and at least one of respective configurations of the first focusing lens group and the second focusing lens group and respective moving loci of the first focusing lens group and the second focusing lens group are different from each other.

40. An optical system capable of switching between a first imaging state in a first medium having a first refractive index and a second imaging state in a second medium having a second refractive index which is different from the first refractive index, the optical system comprising a moving lens group which changes position relative to an image surface along an optical axis upon zooming in the first imaging state and upon zooming in the second imaging state, and a moving locus of the moving lens group upon zooming in the first imaging state is different from that of the moving lens group upon zooming in the second imaging state.

41. An optical system according to claim 40, including a plurality of the moving lens groups.

42. An optical system according to claim 40, further comprising a first lens group closest to an object, wherein the following conditional expression is satisfied:

$$0.80 < R1/Enpw < 4.00$$

where R1 denotes a radius of curvature of a lens surface closest to the object in the first lens group, and Enpw denotes a distance on the optical axis from the lens surface closest to the object in the first lens group to a paraxial incident pupil position in the infinity imaging state in a wide-angle end state of the optical system in the second imaging state.

43. An optical system according to claim 40, including a plurality of the moving lens groups, and wherein the following conditional expressions are satisfied:

$$-0.90 < \Delta 1U/\Delta 1A < 0.90$$

$$0.20 < \Delta 2U/\Delta 2A < 2.00$$

where Δ1U denotes, for a lens group closest to the image surface among the plurality of moving lens groups, an amount of movement necessary for changing from an infinity imaging state in a wide-angle end state of the optical system to an infinity imaging state in a telephoto end state of the optical system in the first imaging state, Δ1 denotes, for the lens group located closest to the imaging surface among the plurality of moving lens groups, an amount of movement necessary for changing from an infinity imaging state in a wide-angle end state of the optical system to an infinity imaging state in a telephoto end state of the optical system in the second imaging state Δ2U denotes, for a lens group located second closest to the image surface among the plurality of moving lens groups, an amount of movement necessary for changing from the infinity imaging state the wide-angle end state of the optical system to the infinity imaging state in the telephoto end state of the optical system in the first imaging state, Δ2A denotes, for the lens group located second closest to the image surface among the plurality of lens groups, an amount of movement necessary for changing from the infinity imaging state in the wide-angle end state of the optical system to the infinity imaging state in the telephoto end state of the optical system in the second imaging state, and where movement in a direction toward the image surface is taken as positive and movement in a direction toward an object is taken as negative.

44. An optical system according to claim 40, wherein the first medium having the first refractive index is water, and the second medium having the second refractive index is air.

45. An optical imaging apparatus comprising the optical system according to claim 40.

46. A method for manufacturing an optical system capable of switching between a first imaging state in a first medium having a first refractive index and a second imaging state in a second medium having a second refractive index which is different from the first refractive index, the method comprising:

arranging a moving lens group in a lens barrel such that:

a position of the moving lens group relative to an image surface in an optical axis direction changes upon zooming in the first imaging state and upon zooming in the second imaging state, and a moving locus of the moving lens group upon zooming in the first imaging state different from a moving locus of the moving lens group upon zooming in the second imaging state.

47. A zooming optical system capable of switching between a first state for use in a first object-side medium having a first refractive index, and a second state for use in a second object-side medium having a second refractive index which is different from the first refractive index, the zooming optical system comprising a first lens group, and a second lens group disposed closer to an image than the first lens group, a distance between the first lens group and the second lens group being changed upon zooming in the first state and upon zooming in the second state, and the distance between the first lens group and the second lens group in the first state being different from the distance between the first lens group and the second lens group in the second state.

48. A zooming optical system according to claim 47, wherein a focal length of the zooming optical system is kept unchanged when switching between the first state and the second state.

49. A zooming optical system comprising a first lens group, and a second lens group disposed closer to an image than the first lens group, a distance between the first lens group and the second lens group being changed upon zooming, wherein a first mode of zooming is performed by moving the second lens group along a first moving locus, a second mode of zooming is performed by moving the second lens group along a second moving locus, and a distance between the first lens group and the second lens group changes differently between the first zooming mode and the second zooming mode.

50. A zooming optical system according to claim 49, wherein a focal length of the zooming optical system is kept unchanged when switching the optical system between a configuration for using the first zooming mode and a configuration for using the second zooming mode.

51. A method for manufacturing a zooming optical system capable of switching between a first state for use in a first object-side medium having a first refractive index, and a second state for use in a second object-side medium having a second refractive index which is different from the first refractive index, the method comprising:

arranging a first lens group and a second lens group in a lens barrel such that:

the second lens group is disposed closer to an image than the first lens group, a distance between the first lens group and the second lens group is changed upon zooming in the first state and upon zooming in the second state, and the distance between the first lens group and the second lens group in the first state is different from the distance between the first lens group and the second lens group in the second state.

52. A method for manufacturing a zooming optical system, comprising:

arranging a first lens group and a second lens group in a lens barrel such that:

the second lens group is disposed closer to an image than the first lens group, a distance between the first lens group and the second lens group changes upon zooming, a first mode of zooming is performed by moving the second lens group along a first moving locus, a second mode of zooming is performed by moving the second lens group along a second moving locus, and the distance between the first lens group and the second lens group changes differently between the first zooming mode and the second zooming mode.

* * * * *